US009335924B2

(12) United States Patent

Jobs et al.

(10) Patent No.: US 9,335,924 B2

(45) Date of Patent: May 10, 2016

(54) TOUCH SCREEN DEVICE, METHOD, AND GRAPHICAL USER INTERFACE FOR CUSTOMIZING DISPLAY OF CONTENT CATEGORY ICONS

(71) Applicant: Apple Inc., Cupertino, CA (US)

(72) Inventors: Steven P. Jobs; Scott Forstall, Los Altos, CA (US); Greg Christie, San Jose, CA (US); Stephen O. Lemay, San Francisco, CA (US); Scott Herz, San Jose, CA (US); Marcel van Os, San Francisco, CA (US); Bas Ording, San Francisco, CA (US); Gregory Novick, San Francisco, CA (US); Wayne C. Westerman, San Francisco, CA (US); Imran Chaudhri, San Francisco, CA (US); Patrick Lee Coffman, San Francisco, CA (US); Kenneth Kocienda, San Jose, CA (US); Nitin K. Ganatra, San Jose, CA (US); Freddy Allen Anzures, San Francisco, CA (US); Jeremy A. Wyld, San Diego, CA (US); Jeffrey Bush, San Jose, CA (US); Michael Matas, San Francisco, CA (US); Paul D. Marcos, Los Altos, CA (US); Charles J. Pisula, Bethesda, MD (US); Virgil S. King, Mountain View, CA (US); Chris Blumenberg, San Francisco, CA (US); Francisco Ryan Tolmasky, San Francisco, CA (US); Richard Williamson, Los Gatos, CA (US); Andre M. J. Boule, Sunnyvale, CA (US); Henri C. Lamiraux, Menlo Park, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/056,350

(22) Filed: Oct. 17, 2013

(65) Prior Publication Data

US 2014/0327629 A1 Nov. 6, 2014

Related U.S. Application Data

(63) Continuation-in-part of application No. 11/850,635, filed on Sep. 5, 2007, now Pat. No. 8,564,544.

(60) Provisional application No. 60/937,991, filed on Jun. 29, 2007, provisional application No. 60/937,993, filed on Jun. 29, 2007, provisional application No. 60/879,469, filed on Jan. 8, 2007, provisional application No. 60/879,253, filed on Jan. 7, 2007, provisional application No. 60/824,769, filed on Sep. 6, 2006.

(51) Int. Cl.

| | |
|---|---|
| ***G06F 3/048*** | (2013.01) |
| ***G06F 3/0488*** | (2013.01) |
| ***H04M 1/725*** | (2006.01) |

(52) U.S. Cl.

CPC .......... *G06F 3/04883* (2013.01); *G06F 3/0488* (2013.01); *G06F 3/04886* (2013.01); *H04M 1/72522* (2013.01); *H04M 1/72552* (2013.01)

(58) Field of Classification Search

CPC ......... G06F 3/0488–3/04886; H04M 1/72522; H04M 1/72552

USPC ........................... 345/173–178; 715/863–866

See application file for complete search history.

(56) References Cited

U.S. PATENT DOCUMENTS

| | | | |
|---|---|---|---|
| 3,010,371 | A | 11/1961 | Riedel et al. |
| 3,049,247 | A | 8/1962 | Lemelson |
| 3,113,404 | A | 12/1963 | Narel et al. |
| RE25,886 | E | 10/1965 | Cargill |
| 3,245,144 | A | 4/1966 | Kumagai et al. |
| 3,271,840 | A | 9/1966 | Solski et al. |
| RE26,770 | E | 1/1970 | Lemelson |
| 3,519,151 | A | 7/1970 | Lemelson |
| 3,854,889 | A | 12/1974 | Lemelson |
| 4,481,382 | A | 11/1984 | Villa-Real |
| 4,644,100 | A | 2/1987 | Brenner et al. |

| | | | |
|---|---|---|---|
| 4,746,770 | A | 5/1988 | Mcavinney |
| 4,821,029 | A | 4/1989 | Logan et al. |
| 4,862,498 | A | 8/1989 | Reed |
| 5,146,556 | A | 9/1992 | Hullot et al. |
| 5,185,599 | A | 2/1993 | Doornink et al. |
| 5,196,838 | A | 3/1993 | Meier et al. |
| 5,227,771 | A | 7/1993 | Kerr et al. |
| 5,252,951 | A | 10/1993 | Tannenbaum et al. |
| 5,303,388 | A | 4/1994 | Kreitman et al. |
| 5,347,295 | A | 9/1994 | Agulnick et al. |
| 5,428,736 | A | 6/1995 | Kahl et al. |
| 5,432,531 | A | 7/1995 | Calder et al. |
| 5,452,414 | A | 9/1995 | Rosendahl et al. |
| 5,463,725 | A | 10/1995 | Henckel et al. |
| 5,526,018 | A | 6/1996 | Fisher |
| 5,528,260 | A | 6/1996 | Kent |
| 5,543,591 | A | 8/1996 | Gillespie et al. |
| 5,579,037 | A | 11/1996 | Tahara et al. |
| 5,581,677 | A | 12/1996 | Myers et al. |
| 5,581,681 | A | 12/1996 | Tchao et al. |
| 5,602,981 | A | 2/1997 | Hargrove |
| 5,611,060 | A | 3/1997 | Belfiore et al. |
| 5,612,719 | A | 3/1997 | Beernink et al. |
| 5,633,912 | A | 5/1997 | Tsoi |
| 5,640,522 | A | 6/1997 | Warrin |
| 5,644,739 | A | 7/1997 | Moursund |
| 5,655,094 | A | 8/1997 | Cline et al. |
| 5,657,050 | A | 8/1997 | Mccambridge et al. |
| 5,678,015 | A | 10/1997 | Goh |
| 5,726,687 | A | 3/1998 | Belfiore et al. |
| 5,734,597 | A | 3/1998 | Molnar et al. |
| 5,737,555 | A | 4/1998 | Gregg et al. |
| 5,745,739 | A | 4/1998 | Wang et al. |
| 5,745,910 | A | 4/1998 | Piersol et al. |
| 5,754,179 | A | 5/1998 | Hocker et al. |
| 5,757,371 | A | 5/1998 | Oran et al. |
| 5,760,773 | A | 6/1998 | Berman et al. |
| 5,796,401 | A | 8/1998 | Winer |
| 5,805,161 | A | 9/1998 | Tiphane |
| 5,812,862 | A | 9/1998 | Smith et al. |
| 5,825,349 | A | 10/1998 | Meier et al. |
| 5,825,352 | A | 10/1998 | Bisset et al. |
| 5,825,357 | A | 10/1998 | Malamud et al. |
| 5,831,594 | A | 11/1998 | Tognazzini et al. |
| 5,831,614 | A | 11/1998 | Tognazzini et al. |
| 5,835,079 | A | 11/1998 | Shieh |
| 5,838,320 | A | 11/1998 | Matthews et al. |
| 5,838,889 | A | 11/1998 | Booker |
| 5,844,547 | A | 12/1998 | Minakuchi et al. |
| 5,845,122 | A | 12/1998 | Nielsen et al. |
| 5,867,150 | A | 2/1999 | Bricklin et al. |
| 5,874,936 | A | 2/1999 | Berstis et al. |
| 5,874,948 | A | 2/1999 | Shieh |
| 5,877,765 | A | 3/1999 | Dickman et al. |
| 5,896,126 | A | 4/1999 | Shieh |
| 5,909,213 | A | 6/1999 | Martin |
| 5,914,716 | A | 6/1999 | Rubin et al. |
| 5,914,717 | A | 6/1999 | Kleewein et al. |
| 5,923,327 | A | 7/1999 | Smith et al. |
| 5,943,043 | A | 8/1999 | Furuhata et al. |
| 5,943,052 | A | 8/1999 | Allen et al. |
| 5,949,408 | A | 9/1999 | Kang et al. |
| 5,959,628 | A | 9/1999 | Cecchini et al. |
| 5,963,964 | A | 10/1999 | Nielsen |
| 5,995,106 | A | 11/1999 | Naughton et al. |
| 6,006,227 | A | 12/1999 | Freeman et al. |
| 6,018,333 | A | 1/2000 | Denber |
| 6,043,818 | A | 3/2000 | Nakano et al. |
| 6,049,336 | A | 4/2000 | Liu et al. |
| 6,057,840 | A | 5/2000 | Durrani et al. |
| 6,057,845 | A | 5/2000 | Dupouy |
| 6,067,068 | A | 5/2000 | Hussain |
| 6,069,626 | A | 5/2000 | Cline et al. |
| 6,072,486 | A | 6/2000 | Sheldon et al. |
| 6,094,197 | A | 7/2000 | Buxton et al. |
| 6,111,573 | A | 8/2000 | Mccomb et al. |
| 6,115,482 | A | 9/2000 | Sears et al. |
| 6,124,861 | A | 9/2000 | Lebovitz et al. |
| 6,133,914 | A | 10/2000 | Rogers et al. |
| 6,144,863 | A | 11/2000 | Charron |
| 6,154,205 | A | 11/2000 | Carroll et al. |
| 6,181,339 | B1 | 1/2001 | DeCarmo et al. |
| 6,195,094 | B1 | 2/2001 | Celebiler |
| 6,219,028 | B1 | 4/2001 | Simonson |
| 6,219,034 | B1 | 4/2001 | Elbing et al. |
| 6,229,542 | B1 | 5/2001 | Miller |
| 6,259,436 | B1 | 7/2001 | Moon et al. |
| 6,271,854 | B1 | 8/2001 | Light |
| 6,275,935 | B1 | 8/2001 | Barlow et al. |
| 6,278,443 | B1 | 8/2001 | Amro et al. |
| 6,278,454 | B1 | 8/2001 | Krishnan |
| 6,285,916 | B1 | 9/2001 | Kadaba et al. |
| 6,288,704 | B1 | 9/2001 | Flack et al. |
| 6,292,188 | B1 | 9/2001 | Carlson et al. |
| 6,310,610 | B1 | 10/2001 | Beaton et al. |
| 6,313,853 | B1 | 11/2001 | Lamontagne et al. |
| 6,323,846 | B1 | 11/2001 | Westerman et al. |
| 6,330,009 | B1 | 12/2001 | Murasaki et al. |
| 6,331,840 | B1 | 12/2001 | Nielson et al. |
| 6,331,863 | B1 | 12/2001 | Meier et al. |
| 6,331,866 | B1 | 12/2001 | Eisenberg |
| 6,353,451 | B1 | 3/2002 | Teibel et al. |
| 6,377,698 | B1 | 4/2002 | Cumoli et al. |
| 6,380,931 | B1 | 4/2002 | Gillespie et al. |
| 6,396,520 | B1 | 5/2002 | Ording |
| 6,433,801 | B1 | 8/2002 | Moon et al. |
| 6,466,203 | B2 | 10/2002 | Van Ee |
| 6,504,530 | B1 | 1/2003 | Wilson et al. |
| 6,545,669 | B1 | 4/2003 | Kinawi et al. |
| 6,559,869 | B1 | 5/2003 | Lui et al. |
| 6,559,896 | B1 | 5/2003 | Zwartenkot et al. |
| 6,570,557 | B1 | 5/2003 | Westerman et al. |
| 6,570,594 | B1 | 5/2003 | Wagner |
| 6,590,568 | B1 | 7/2003 | Astala et al. |
| 6,597,345 | B2 | 7/2003 | Hirshberg |
| 6,651,111 | B2 | 11/2003 | Sherman et al. |
| 6,657,615 | B2 | 12/2003 | Harada |
| 6,677,932 | B1 | 1/2004 | Westerman |
| 6,683,628 | B1 | 1/2004 | Nakagawa et al. |
| 6,690,387 | B2 | 2/2004 | Zimmerman et al. |
| 6,763,388 | B1 | 7/2004 | Tsimelzon |
| 6,768,722 | B1 | 7/2004 | Katseff et al. |
| 6,771,280 | B2 | 8/2004 | Fujisaki et al. |
| 6,775,014 | B2 | 8/2004 | Foote et al. |
| 6,781,575 | B1 | 8/2004 | Hawkins et al. |
| 6,920,619 | B1 | 7/2005 | Milekic |
| 6,931,601 | B2 | 8/2005 | Vronay et al. |
| 6,934,911 | B2 | 8/2005 | Salmimaa et al. |
| 6,970,749 | B1 | 11/2005 | Chinn et al. |
| 6,972,749 | B2 | 12/2005 | Hinckley et al. |
| 6,976,210 | B1 | 12/2005 | Silva et al. |
| 6,978,127 | B1 | 12/2005 | Bulthuis et al. |
| 6,985,137 | B2 | 1/2006 | Kaikuranta |
| 7,007,239 | B1 | 2/2006 | Hawkins et al. |
| 7,030,861 | B1 | 4/2006 | Westerman et al. |
| 7,038,659 | B2 | 5/2006 | Rajkowski |
| 7,071,943 | B2 | 7/2006 | Adler |
| 7,079,110 | B2 | 7/2006 | Ledbetter et al. |
| 7,084,859 | B1 | 8/2006 | Pryor |
| 7,088,344 | B2 | 8/2006 | Maezawa et al. |
| 7,093,201 | B2 | 8/2006 | Duarte |
| 7,093,203 | B2 | 8/2006 | Mugura et al. |
| 7,134,095 | B1 | 11/2006 | Smith et al. |
| 7,138,983 | B2 | 11/2006 | Wakai et al. |
| 7,184,064 | B2 | 2/2007 | Zimmerman et al. |
| 7,185,291 | B2 | 2/2007 | Wu et al. |
| 7,202,857 | B2 | 4/2007 | Hinckley et al. |
| 7,231,229 | B1 | 6/2007 | Hawkins et al. |
| 7,231,231 | B2 | 6/2007 | Kokko et al. |
| 7,254,774 | B2 | 8/2007 | Cucerzan et al. |
| 7,274,377 | B2 | 9/2007 | Ivashin et al. |
| 7,283,845 | B2 | 10/2007 | De Bast |
| 7,352,365 | B2 | 4/2008 | Trachte |
| 7,355,593 | B2 | 4/2008 | Hill et al. |
| 7,362,331 | B2 | 4/2008 | Ording |
| 7,408,538 | B2 | 8/2008 | Hinckley et al. |
| 7,411,575 | B2 | 8/2008 | Hill et al. |
| 7,432,928 | B2 | 10/2008 | Shaw et al. |

7,434,173 B2 10/2008 Jarrett et al.
7,434,177 B1 10/2008 Ording et al.
7,487,467 B1 2/2009 Kawahara et al.
7,490,295 B2 2/2009 Chaudhri et al.
7,493,573 B2 2/2009 Wagner
7,506,268 B2 3/2009 Jennings et al.
7,509,588 B2 3/2009 Van Os et al.
7,512,898 B2 3/2009 Jennings et al.
7,526,738 B2 4/2009 Ording et al.
7,545,366 B2 6/2009 Sugimoto et al.
7,546,548 B2 6/2009 Chew et al.
7,546,554 B2 6/2009 Chiu et al.
7,561,874 B2 7/2009 Wang et al.
7,581,186 B2 8/2009 Dowdy et al.
7,614,008 B2 11/2009 Ording
7,619,618 B2 11/2009 Westerman et al.
7,623,119 B2 11/2009 Autio et al.
7,624,357 B2 11/2009 De Bast
7,633,076 B2 12/2009 Huppi et al.
7,642,934 B2 1/2010 Scott
7,650,137 B2 1/2010 Jobs et al.
7,653,883 B2 1/2010 Hotelling et al.
7,657,849 B2 2/2010 Chaudhri et al.
7,663,607 B2 2/2010 Hotelling et al.
7,671,756 B2 3/2010 Herz et al.
7,681,142 B2 3/2010 Jarrett et al.
7,683,889 B2 3/2010 Rimas Ribikauskas et al.
7,694,231 B2 4/2010 Kocienda et al.
7,719,523 B2 5/2010 Hillis
7,719,542 B1 5/2010 Gough et al.
7,728,812 B2 6/2010 Sato et al.
7,728,821 B2 6/2010 Hillis et al.
7,730,401 B2 6/2010 Gillespie et al.
7,735,021 B2 6/2010 Padawer et al.
7,747,289 B2 6/2010 Wang et al.
7,768,501 B1 * 8/2010 Maddalozzo et al. ........ 345/173
7,783,990 B2 8/2010 Amadio et al.
7,786,975 B2 8/2010 Ording et al.
7,805,684 B2 9/2010 Arvilommi
7,810,038 B2 10/2010 Matsa et al.
7,840,901 B2 11/2010 Lacey et al.
7,844,914 B2 11/2010 Andre et al.
7,853,972 B2 12/2010 Brodersen et al.
7,856,602 B2 12/2010 Armstrong
7,856,605 B2 12/2010 Ording et al.
7,877,705 B2 1/2011 Chambers et al.
7,884,804 B2 2/2011 Kong
7,889,184 B2 2/2011 Blumenberg et al.
7,889,185 B2 2/2011 Blumenberg et al.
7,890,778 B2 2/2011 Jobs et al.
7,940,250 B2 5/2011 Forstall
7,957,762 B2 6/2011 Herz et al.
7,957,955 B2 6/2011 Christie et al.
7,996,792 B2 8/2011 Anzures et al.
8,006,002 B2 8/2011 Kalayjian et al.
8,014,760 B2 9/2011 Forstall et al.
8,074,172 B2 12/2011 Kocienda et al.
8,091,045 B2 1/2012 Christie et al.
8,214,768 B2 7/2012 Boule et al.
8,239,784 B2 8/2012 Hotelling et al.
8,279,180 B2 10/2012 Hotelling et al.
8,381,135 B2 2/2013 Hotelling et al.
2001/0024195 A1 9/2001 Hayakawa
2001/0024212 A1 9/2001 Ohnishi
2002/0015024 A1 2/2002 Westerman et al.
2002/0015042 A1 2/2002 Robotham et al.
2002/0024506 A1 2/2002 Flack et al.
2002/0024540 A1 2/2002 McCarthy
2002/0030667 A1 * 3/2002 Hinckley et al. .............. 345/173
2002/0036618 A1 * 3/2002 Wakai et al. .................. 345/157
2002/0038299 A1 3/2002 Zernik et al.
2002/0054090 A1 5/2002 Silva et al.
2002/0056575 A1 5/2002 Keely et al.
2002/0057260 A1 5/2002 Mathews et al.
2002/0080197 A1 6/2002 Masthoff
2002/0085037 A1 7/2002 Leavitt et al.
2002/0104005 A1 8/2002 Yin et al.
2002/0109687 A1 8/2002 Ishii et al.
2002/0140666 A1 10/2002 Bradski
2002/0140746 A1 10/2002 Gargi
2002/0149605 A1 10/2002 Grossman
2002/0158838 A1 10/2002 Smith et al.
2002/0158908 A1 10/2002 Vaajala et al.
2002/0163545 A1 11/2002 Hii
2002/0167545 A1 11/2002 Kang et al.
2002/0180809 A1 12/2002 Light et al.
2002/0186201 A1 12/2002 Gutta et al.
2002/0186252 A1 12/2002 Himmel et al.
2002/0191029 A1 12/2002 Gillespie et al.
2003/0001898 A1 1/2003 Bernhardson
2003/0016211 A1 1/2003 Woolley
2003/0016241 A1 1/2003 Burke
2003/0016252 A1 1/2003 Noy et al.
2003/0030664 A1 2/2003 Parry
2003/0048295 A1 3/2003 Lilleness et al.
2003/0063073 A1 4/2003 Geaghan et al.
2003/0076364 A1 4/2003 Martinez et al.
2003/0090572 A1 5/2003 Belz et al.
2003/0132974 A1 7/2003 Bodin
2003/0152203 A1 8/2003 Berger et al.
2003/0162569 A1 8/2003 Arakawa et al.
2003/0169298 A1 9/2003 Ording
2003/0174149 A1 9/2003 Fujisaki et al.
2003/0184552 A1 10/2003 Chadha
2003/0184587 A1 10/2003 Ording et al.
2003/0184593 A1 10/2003 Dunlop
2003/0200289 A1 10/2003 Kemp et al.
2003/0206195 A1 11/2003 Matsa et al.
2003/0206197 A1 11/2003 McInerney
2004/0012572 A1 1/2004 Sowden et al.
2004/0021676 A1 2/2004 Chen et al.
2004/0023696 A1 2/2004 Kim
2004/0056837 A1 3/2004 Koga et al.
2004/0100479 A1 5/2004 Nakano et al.
2004/0103156 A1 5/2004 Quillen et al.
2004/0109025 A1 6/2004 Hullot et al.
2004/0119754 A1 6/2004 Bangalore et al.
2004/0121823 A1 6/2004 Noesgaard et al.
2004/0136244 A1 7/2004 Nakamura et al.
2004/0150630 A1 8/2004 Hinckley et al.
2004/0155908 A1 8/2004 Wagner
2004/0155909 A1 8/2004 Wagner
2004/0160420 A1 8/2004 Baharav et al.
2004/0177148 A1 9/2004 Tsimelzon, Jr.
2004/0183833 A1 9/2004 Chua
2004/0215719 A1 10/2004 Altshuler
2004/0222975 A1 11/2004 Nakano et al.
2005/0003851 A1 1/2005 Chrysochoos et al.
2005/0005246 A1 1/2005 Card et al.
2005/0012723 A1 1/2005 Pallakoff
2005/0020317 A1 1/2005 Koyama
2005/0024239 A1 2/2005 Kupka
2005/0024341 A1 2/2005 Gillespie et al.
2005/0026644 A1 2/2005 Lien
2005/0030279 A1 2/2005 Fu
2005/0039134 A1 2/2005 Wiggeshoff et al.
2005/0052427 A1 3/2005 Wu et al.
2005/0052547 A1 3/2005 Minakuti et al.
2005/0057524 A1 3/2005 Hill et al.
2005/0057548 A1 3/2005 Kim
2005/0060664 A1 3/2005 Rogers
2005/0060665 A1 3/2005 Rekimoto
2005/0071761 A1 3/2005 Kontio
2005/0088418 A1 4/2005 Nguyen
2005/0091609 A1 4/2005 Matthews et al.
2005/0097089 A1 5/2005 Nielsen et al.
2005/0120142 A1 6/2005 Hall
2005/0134578 A1 6/2005 Chambers et al.
2005/0154798 A1 7/2005 Nurmi
2005/0190059 A1 9/2005 Wehrenberg
2005/0190144 A1 9/2005 Kong
2005/0192727 A1 9/2005 Shostak et al.
2005/0193351 A1 9/2005 Huoviala
2005/0210403 A1 9/2005 Satanek
2005/0212754 A1 9/2005 Marvit et al.
2005/0229102 A1 10/2005 Watson et al.
2005/0237308 A1 10/2005 Autio et al.
2005/0243069 A1 11/2005 Yorio et al.

2005/0250438 A1 11/2005 Makipaa et al.
2005/0251331 A1 11/2005 Kreft
2005/0251755 A1 11/2005 Mullins et al.
2005/0262448 A1 11/2005 Vronay et al.
2005/0275636 A1 12/2005 Dehlin et al.
2005/0289458 A1 12/2005 Kylmanen
2006/0001650 A1 1/2006 Robbins et al.
2006/0001652 A1* 1/2006 Chiu et al. .................... 345/173
2006/0007176 A1 1/2006 Shen
2006/0007178 A1 1/2006 Davis
2006/0017692 A1 1/2006 Wehrenberg et al.
2006/0022955 A1 2/2006 Kennedy
2006/0026521 A1 2/2006 Hotelling et al.
2006/0026536 A1 2/2006 Hotelling et al.
2006/0028428 A1 2/2006 Dai et al.
2006/0031786 A1 2/2006 Hillis et al.
2006/0033724 A1 2/2006 Chaudhri et al.
2006/0033751 A1 2/2006 Keely et al.
2006/0044259 A1 3/2006 Hotelling et al.
2006/0047386 A1 3/2006 Kanevsky et al.
2006/0049920 A1 3/2006 Sadler et al.
2006/0051073 A1 3/2006 Jung et al.
2006/0055662 A1 3/2006 Rimas-Ribikauskas et al.
2006/0055684 A1 3/2006 Rimas-Ribikauskas et al.
2006/0055685 A1 3/2006 Rimas-Ribikauskas et al.
2006/0075250 A1 4/2006 Liao
2006/0075355 A1 4/2006 Shiono et al.
2006/0080616 A1 4/2006 Vogel et al.
2006/0085763 A1 4/2006 Leavitt et al.
2006/0101354 A1 5/2006 Hashimoto et al.
2006/0112335 A1 5/2006 Hofmeister et al.
2006/0123360 A1 6/2006 Anwar et al.
2006/0132460 A1 6/2006 Kolmykov-Zotov et al.
2006/0161870 A1 7/2006 Hotelling et al.
2006/0164399 A1 7/2006 Cheston et al.
2006/0167754 A1 7/2006 Carro et al.
2006/0174211 A1 8/2006 Hoellerer et al.
2006/0181519 A1 8/2006 Vernier et al.
2006/0197753 A1 9/2006 Hotelling
2006/0202953 A1 9/2006 Pryor et al.
2006/0227116 A1 10/2006 Zotov et al.
2006/0236263 A1 10/2006 Bathiche et al.
2006/0236266 A1 10/2006 Majava
2006/0238625 A1 10/2006 Sasaki et al.
2006/0242596 A1 10/2006 Armstrong
2006/0242604 A1 10/2006 Wong et al.
2006/0242607 A1 10/2006 Hudson
2006/0253793 A1 11/2006 Zhai et al.
2006/0267959 A1 11/2006 Goto et al.
2006/0271864 A1 11/2006 Satterfield et al.
2006/0271874 A1 11/2006 Raiz et al.
2006/0277460 A1 12/2006 Forstall et al.
2006/0278692 A1 12/2006 Matsumoto et al.
2006/0282786 A1 12/2006 Shaw et al.
2006/0282790 A1 12/2006 Matthews et al.
2006/0284852 A1 12/2006 Hofmeister et al.
2006/0288313 A1 12/2006 Hillis
2006/0290661 A1 12/2006 Innanen et al.
2006/0294472 A1 12/2006 Cheng et al.
2007/0013665 A1 1/2007 Vetelainen et al.
2007/0028269 A1 2/2007 Nezu et al.
2007/0030253 A1 2/2007 Chu et al.
2007/0030362 A1 2/2007 Ota et al.
2007/0040812 A1 2/2007 Tang et al.
2007/0055947 A1 3/2007 Ostojic et al.
2007/0061126 A1 3/2007 Russo et al.
2007/0067272 A1 3/2007 Flynt et al.
2007/0067738 A1 3/2007 Flynt et al.
2007/0083911 A1 4/2007 Madden et al.
2007/0101297 A1 5/2007 Forstall et al.
2007/0106950 A1 5/2007 Hutchinson et al.
2007/0118400 A1 5/2007 Morita et al.
2007/0120834 A1 5/2007 Boillot
2007/0124677 A1 5/2007 De Los Reyes et al.
2007/0130532 A1 6/2007 Fuller et al.
2007/0132789 A1 6/2007 Ording et al.
2007/0150826 A1 6/2007 Anzures et al.
2007/0150830 A1 6/2007 Ording et al.
2007/0152980 A1 7/2007 Kocienda et al.
2007/0152984 A1 7/2007 Ording et al.
2007/0156697 A1 7/2007 Tsarkova
2007/0157089 A1 7/2007 Van Os et al.
2007/0177803 A1 8/2007 Elias et al.
2007/0177804 A1 8/2007 Elias et al.
2007/0180395 A1 8/2007 Yamashita et al.
2007/0189737 A1 8/2007 Chaudhri et al.
2007/0192741 A1 8/2007 Yoritate et al.
2007/0220444 A1 9/2007 Sunday et al.
2007/0236475 A1 10/2007 Wherry
2007/0243862 A1 10/2007 Coskun et al.
2007/0245250 A1 10/2007 Schechter et al.
2007/0252821 A1 11/2007 Hollemans et al.
2007/0259716 A1 11/2007 Mattice et al.
2007/0262964 A1 11/2007 Zotov et al.
2007/0266342 A1 11/2007 Chang et al.
2007/0273668 A1 11/2007 Park et al.
2007/0288860 A1 12/2007 Ording et al.
2007/0288862 A1 12/2007 Ording
2008/0005703 A1 1/2008 Radivojevic et al.
2008/0055263 A1 3/2008 Lemay et al.
2008/0082930 A1 4/2008 Omernick et al.
2008/0122786 A1 5/2008 Pryor et al.
2008/0122796 A1 5/2008 Jobs et al.
2008/0125180 A1 5/2008 Hoffman et al.
2008/0161045 A1 7/2008 Vuorenmaa
2008/0167083 A1 7/2008 Wyld et al.
2008/0168367 A1 7/2008 Chaudhri et al.
2008/0168478 A1 7/2008 Platzer et al.
2008/0182628 A1 7/2008 Lee et al.
2008/0184112 A1 7/2008 Chiang et al.
2008/0216017 A1 9/2008 Kurtenbach et al.
2008/0220752 A1 9/2008 Forstall et al.
2008/0225013 A1 9/2008 Muylkens et al.
2008/0259045 A1 10/2008 Kim et al.
2009/0007017 A1 1/2009 Anzures et al.
2009/0064055 A1 3/2009 Chaudhri et al.
2009/0128581 A1 5/2009 Brid et al.
2009/0178008 A1 7/2009 Herz et al.
2009/0199128 A1 8/2009 Matthews et al.
2009/0295753 A1 12/2009 King et al.
2010/0045705 A1 2/2010 Vertegaal et al.
2010/0095238 A1 4/2010 Baudet
2010/0105454 A1 4/2010 Weber et al.
2010/0318709 A1 12/2010 Bell et al.
2011/0007009 A1 1/2011 Ishihara et al.

FOREIGN PATENT DOCUMENTS

AU 200138933 A1 11/2001
CA 2349649 A1 1/2002
CN 1257247 A 6/2000
CN 1940833 A 4/2007
CN 201266371 Y 7/2009
EP 269364 A2 6/1988
EP 626635 A2 11/1994
EP 651544 A2 5/1995
EP 827064 A2 3/1998
EP 827094 A2 3/1998
EP 844553 A1 5/1998
EP 1124175 A2 8/2001
EP 1143334 A2 10/2001
EP 1231763 A1 8/2002
EP 1517228 A2 3/2005
EP 1744242 A2 1/2007
FR 2819675 A1 7/2002
GB 2329813 A 3/1999
GB 2331204 A 5/1999
GB 2347200 A 8/2000
JP 62-251922 A 11/1987
JP 4-55932 A 2/1992
JP 5-91169 A 4/1993
JP 6-95794 A 4/1994
JP 6-149531 A 5/1994
JP 9-73381 A 3/1997
JP 10-154069 A 6/1998
JP 11-143604 A 5/1999
JP 11-338600 A 12/1999
JP 2000-163031 A 6/2000

| | | | |
|---|---|---|---|
| JP | 2000-194493 | A | 7/2000 |
| JP | 2002-99370 | A | 4/2002 |
| JP | 2002-149616 | A | 5/2002 |
| JP | 2003-67135 | A | 3/2003 |
| JP | 2003-330613 | A | 11/2003 |
| JP | 2004-70492 | A | 3/2004 |
| JP | 2004-118434 | A | 4/2004 |
| JP | 2004-164242 | A | 6/2004 |
| JP | 2004-341886 | A | 12/2004 |
| JP | 2004-343662 | A | 12/2004 |
| JP | 2005-44036 | A | 2/2005 |
| JP | 2005-309933 | A | 11/2005 |
| JP | 2005-352924 | A | 12/2005 |
| JP | 2006-164275 | A | 6/2006 |
| KR | 10-1998-0032331 | A | 7/1998 |
| KR | 10-2001-0040410 | A | 5/2001 |
| KR | 10-2002-0095992 | A | 12/2002 |
| KR | 10-2004-0071761 | A | 8/2004 |
| KR | 10-2007-0064869 | A | 6/2007 |
| WO | 99/28815 | A1 | 6/1999 |
| WO | 99/38149 | A1 | 7/1999 |
| WO | 00/08757 | A1 | 2/2000 |
| WO | 01/57716 | A2 | 8/2001 |
| WO | 02/01338 | A1 | 1/2002 |
| WO | 02/08881 | A2 | 1/2002 |
| WO | 02/13176 | A2 | 2/2002 |
| WO | 2004/051392 | A2 | 6/2004 |
| WO | 2004/111816 | A2 | 12/2004 |
| WO | 2005/001680 | A1 | 1/2005 |
| WO | 2005/008444 | A2 | 1/2005 |
| WO | 2005/018129 | A2 | 2/2005 |
| WO | 2005/031551 | A1 | 4/2005 |
| WO | 2005/041020 | A1 | 5/2005 |
| WO | 2005/064587 | A2 | 7/2005 |
| WO | 2005/074268 | A1 | 8/2005 |
| WO | 2006/020304 | A2 | 2/2006 |
| WO | 2006/020305 | A2 | 2/2006 |
| WO | 2006/036069 | A1 | 4/2006 |
| WO | 2006/126055 | A2 | 11/2006 |
| WO | 2007/032843 | A2 | 3/2007 |
| WO | 2007/032972 | A1 | 3/2007 |
| WO | 2007/069835 | A1 | 6/2007 |
| WO | 2007/094894 | A2 | 8/2007 |
| WO | 2009/084147 | A1 | 7/2009 |

OTHER PUBLICATIONS

International Search Report and Written Opinion for International Application PCT/US2007/088885, mailed on Apr. 24, 2008, 10 pages.

International Search Report and Written Opinion received for PCT Patent Application No. PCT/US2007/077639, mailed on Jul. 8, 2008, 7 pages.

International Search Report and Written Opinion received for PCT Patent Application No. PCT/US2007/077777, mailed on Oct. 8, 2009, 15 pages.

International Search Report and Written Opinion received for PCT Patent Application No. PCT/US2008/050430, mailed on Sep. 1, 2008, 13 pages.

International Search Report and Written Opinion received for PCT Patent Application No. PCT/US2008/050431, mailed on Jun. 17, 2008, 10 pages.

International Search Report and Written Opinion received for PCT Patent Application No. PCT/US2008/074341, mailed on Nov. 27, 2009, 12 pages.

International Search Report and Written Opinion received for PCT Patent Application No. PCT/US2009/030225, mailed on Feb. 25, 2010, 15 pages.

International Search Report and Written Opinion received for PCT Patent Application No. PCT/US2007/077643, mailed on May 8, 2008, 11 pages.

Extended European Search Report (includes European Search Report and European Search Opinion) received for European Patent Application No. 12175083.0, mailed on Oct. 26, 2012, 7 pages.

Extended European Search Report (includes European Search Report and European Search Opinion) received for European Patent Application No. 12175086.3, mailed on Dec. 4, 2012, 7 pages.

International Preliminary Report on Patentability received for PCT Patent Application No. PCT/US2008/074625, issued on Mar. 9, 2010, 6 pages.

International Preliminary Report on Patentability received for PCT Patent Application No. PCT/US2009/030225, issued on Jul. 6, 2010, 10 pages.

Invitation to Pay Additional Fees Received received for PCT Patent Application No. PCT/US2008/050430, mailed on Jun. 27, 2008, 7 pages.

Invitation to Pay Additional Fees Received received for PCT Patent Application No. PCT/US2009/030225, mailed on Nov. 16, 2009, 4 pages.

Final Office Action received for U.S. Appl. No. 11/850,635, mailed on Apr. 24, 2012, 10 pages.

Final Office Action received for U.S. Appl. No. 11/850,635, mailed on Jan. 28, 2011, 21 pages.

Office Action received for Australian Patent Application No. 2007286532, mailed on Apr. 2, 2009, 2 pages.

Office ACtion received for Japanese Patent Application No. 2009-527567, mailed on Aug. 31, 2009.

Office Action received for European Patent Application No. 07869934.5, mailed on Dec. 28, 2009.

Office Action received for Australian Patent Application No. 2007286532, mailed on Feb. 19, 2009, 2 pages.

Office Action received for Japanese Patent Application No. 2009-527567, mailed on Jun. 7, 2010.

Office Action received for Canadian Patent Application No. 2658413, mailed on Mar. 2, 2010.

Office Action received for Korean Patent Application No. 10-2009-7003948, mailed on May 18, 2009.

Non-Final Office Action received for U.S. Appl. No. 11/960,675, mailed on Oct. 28, 2010, 13 pages.

Office Action received for Korean Patent Application No. 10-2009-7003948, mailed on Sep. 11, 2009.

Office Action received for European Patent Application No. 07814689.1, mailed on Mar. 4, 2011, 6 pages.

Summons to Attend Oral Proceedings received for European Patent Application No. 07814689.1, mailed on Dec. 1, 2011, 6 pages.

Office Action received for European Patent Application No. 07841984.3, mailed on Jul. 6, 2010, 10 pages.

Summons to Attend Oral Proceedings received for European Patent Application No. 07841984.3, mailed on Jun. 28, 2011, 18 pages.

Office Action received for European Patent Application No. 07869934.5, mailed on Jul. 5, 2011.

Office Action received for European Patent Application No. 09700333.9, mailed on Nov. 26, 2010, 5 pages.

Office Action received for European Patent Application No. 09700333.9, mailed on Jun. 10, 2011, 5 pages.

Summons to Attend Oral Proceedings received for European Patent Application No. 09700333.9, mailed on Sep. 21, 2012, 4 pages.

Office Action received for Korean Patent Application No. 10-2009-7006231, mailed on Apr. 26, 2013, 2 pages.

Office Action received for Korean Patent Application No. 10-2010-7007258, mailed on Aug. 8, 2011, 2 pages.

Office Action received for Korean Patent Application No. 10-2012-7023375, mailed on Dec. 21, 2012, 5 pages.

Office Action received for European Patent Application No. 08829660.3, mailed on Oct. 15, 2010, 8 pages.

Office Action received for Chinese Patent Application No. 200980000229.2, mailed on Oct. 26, 2012, 22 pages.

Final Office Action received for U.S. Appl. No. 11/849,938, mailed on May 27, 2011, 21 pages.

Non-Final Office Action received for U.S. Appl. No. 11/849,938, mailed on Dec. 14, 2011, 26 pages.

Non-Final Office Action received for U.S. Appl. No. 11/849,938, mailed on Oct. 12, 2010, 19 pages.

Final Office Action received for U.S. Appl. No. 11/850,005, mailed on Sep. 14, 2012, 22 pages.

Final Office Action received for U.S. Appl. No. 11/850,010, mailed on Oct. 17, 2011, 11 pages.

Non-Final Office Action received for U.S. Appl. No. 11/850,010, mailed on May 16, 2012, 12 pages.

Non-Final Office Action received for U.S. Appl. No. 11/850,010, mailed on May 2, 2011, 10 pages.
Final Office Action received for U.S. Appl. No. 11/850,011, mailed on Dec. 1, 2010, 16 pages.
Non-Final Office Action received for U.S. Appl. No. 11/850,011, mailed on Aug. 11, 2010, 28 pages.
Notice of Allowance received for U.S. Appl. No. 11/850,011, mailed on Feb. 18, 2011, 9 pages.
Non-Final Office Action received for U.S. Appl. No. 11/850,635, mailed on Jan. 4, 2012, 10 pages.
Non-Final Office Action received for U.S. Appl. No. 11/850,635, mailed on Oct. 6, 2010, 28 pages.
Notice of Allowance received for U.S. Appl. No. 11/850,635, mailed on Jun. 11, 2013, 9 pages.
Notice of Allowance received for U.S. Appl. No. 11/960,675, mailed on Apr. 1, 2011, 9 pages.
Final Office Action received for U.S. Appl. No. 11/969,809, mailed on Jul. 14, 2011, 26 pages.
Non-Final Office Action received for U.S. Appl. No. 11/969,809, mailed on Mar. 14, 2011, 22 pages.
Final Office Action received for U.S. Appl. No. 11/969,912, mailed on Oct. 31, 2011, 14 pages.
Non-Final Office Action received for U.S. Appl. No. 11/969,912, mailed on Apr. 13, 2011, 9 pages.
Notice of Allowance received for U.S. Appl. No. 12/101,832, mailed on Sep. 26, 2008, 9 pages.
Final Office Action received for U.S. Appl. No. 12/217/029, mailed on Oct. 5, 2012, 32 pages.
Non-Final Office Action received for U.S. Appl. No. 12/217,029, mailed on Apr. 18, 2011, 24 pages.
Non-Final Office Action received for U.S. Appl. No. 12/217,029, mailed on Jan. 25, 2012, 24 pages.
Final Office Action received for U.S. Appl. No. 12/242,851, mailed on Dec. 12, 2011, 13 pages.
Non-Final Office Action received for U.S. Appl. No. 12/242,851, mailed on Apr. 15, 2011, 20 pages.
Non-Final Office Action received for U.S. Appl. No. 12/242,851, mailed on Sep. 20, 2012, 19 pages.
Final Office Action received for U.S. Appl. No. 12/364,470, mailed on May 5, 2010, 18 pages.
Final Office Action received for U.S. Appl. No. 12/364,470, mailed on Oct. 19, 2011, 21 pages.
Non-Final Office Action received for U.S. Appl. No. 12/364,470, mailed on Mar. 4, 2011, 17 pages.
Non-Final Office Action received for U.S. Appl. No. 12/364,470, mailed on Nov. 13, 2009, 15 pages.
Non-Final Office Action received for U.S. Appl. No. 12/364,470, mailed on Sep. 2, 2010, 26 pages.
Non-Final Office Action received for U.S. Appl. No. 13/104,903, mailed on Nov. 13, 2012, 9 pages.
Office Action received for Chinese Patent Application No. 200780001219.1, mailed on Dec. 12, 2012.
Office Action received for Chinese Patent Application No. 200780001219.1, mailed on Jan. 18, 2012, 7 pages.
Office Action received for Chinese Patent Application No. 200780041309.3, mailed on Nov. 1, 2012, 5 pages.
Office Action received for Chinese Patent Application No. 200780041309.3, mailed on Jan. 18, 2012, 15 pages.
Office Action received for Chinese Patent Application No. 200780051764.1, mailed on Sep. 15, 2011, 7 pages.
Office Action received for Australian Patent Application No. 2008100179, mailed on Apr. 30, 2008, 1 page.
Notice of Acceptance received for Australian Patent Application No. 2008296445, mailed on Dec. 14, 2011, 3 pages.
Office Action received for Australian Patent Application No. 2008296445, mailed on Oct. 29, 2010, 2 pages.
Decision to Grant received for Chinese Patent Application No. 200880110709.X, mailed on Aug. 6, 2012, 2 pages.
Office Action received for Chinese Patent Application No. 200880112570.2, mailed on Aug. 24, 2011, 6 pages.
Notification of Acceptance received for Australian Patent Application No. 2009204252, mailed on Oct. 17, 2011, 3 pages.
Office Action received for Australian Patent Application No. 2009204252, mailed on Apr. 20, 2010, 3 pages.
Office Action received for Australian Patent Application No. 2009204252, mailed on May 18, 2011, 2 pages.
Office Action received for Australian Patent Application No. 2009233675, mailed on Aug. 31, 2011, 2 pages.
Office Action received for Chinese Patent Application No. 200980000229.2, mailed on Nov. 30, 2011, 24 pages.
Office Action received for Japanese Patent Application No. 2010-227806, mailed on Mar. 18, 2013, 2 pages.
Office Action received for Japanese Patent Application No. 2010-524102, mailed on Feb. 13, 2012, 2 pages.
Office Action received for Japanese Patent Application No. 2010-524102, mailed on Oct. 26, 2012, 4 pages.
Certification of Grant received for Australian Patent Application No. 2011101194, mailed on Mar. 2, 2012, 4 pages.
Office Action received for Australian Patent Application No. 2011101194, mailed on Oct. 21, 2011, 2 pages.
Certificate of Examination received for Australian Patent Application No. 2011101195, mailed on Jan. 6, 2012, 2 pages.
Office Action received for Australian Patent Application No. 2011101197, mailed on Oct. 18, 2011, 2 pages.
Revocation received for Australian Patent Application No. 2011101197, mailed on Apr. 17, 2012, 2 pages.
Certificate of Examination received for Australian Patent Application No. 2012100655, mailed on May 31, 2012, 4 pages.
Notice of Allowance received for Canadian Patent Application No. 2658413, mailed on Feb. 18, 2011, 2 pages.
Office Action received for Canadian Patent Application No. 2658413, mailed on Aug. 4, 2009, 4 pages.
"Asus Eee PC Easy Mode Internet Tab Options", asuseeehacks. blogspot.com, Available at <http://asuseeehacks.blogspot.com/2007/11/asus-eee-pc-user-interface-tour.html>, Nov. 10, 2007, 33 pages.
"Desktop Icon Toy-History", Available at <http://www.idesksoft.com/history.html>, Oct. 8, 2009, 2 pages.
"FingerWorks Announces a Gesture Keyboard for Apple PowerBooks", PR Newswire, Jan. 27, 2004, 2 pages.
"FingerWorks Announces the ZeroForce iGesture Pad", PR Newswire, Feb. 18, 2003, 2 pages.
"Google Maps API—Google Code", Google Inc., Available at <http://www.google.com/apis/maps>, retrieved on Apr. 10, 2008, 1 page.
"Next-Generation Sharp Organiser to Carry Pen Interface", Computergram International, No. 1955, Jul. 2, 1992.
Zhang et al., "An Ergonomics Study of Menu-Operation on Mobile Phone Interface", In Proceedings of the Workshop on Intelligent Information Technology Application, Dec. 2007, 5 pages.
"Screen Can Tell Finger From Stylus", Electronic Engineering Times, No. 858, Jul. 24, 1995, p. 67.
"Sprint Power Vision Smart Device Treo .TM. 700p by Palm", Sprint Nextel, 2006, 432 pages.
Agarawala et al., "Database Compendex/EI", Engineering Information, Inc., Apr. 27, 2006, 1 page.
Agarawala et al., "Keepin' It Real: Pushin the Desktop Metaphor with Physics, Piles and the Pen", CHI 2006, Montreal, CAnada, Apr. 22-27, 2006, pp. 1283-1292.
Andrew'S Widgets, "Developing Dashboard Widgets-What the Heck is a Widget", Available at <http://andrew.hedges.name/widgets/dev/>, Retrieved on Jan. 25, 2008, 9 pages.
Apple Computer, Inc., "Dashboard Tutorial", Apple Computer, Inc.© 2004, 2006, 24 pages.
Apple Computer, Inc., "Welcome to Tiger", available at <http://www.maths.dundee.ac.uk/software/Welcome_to_Mac_OS_X v10.4_Tiger.pdf>, 2005, pp. 1-32.
Apple.Com, "Tiger Developer Overview Series-Developing Dashboard Widgets", Available at <http://developer.apple.com/macosx/dashboard.html>, Jun. 23, 2006, 9 pages.
Athale et al., "One GUI: Method and System for User Interface Synthesis", Motorola, Inc., May 23, 2006, 11 pages.

Baguley, R., "Nokia Handhelds & Palmtops Internet Tablet 770, Nokia's Small, Svelte, Internet-Savvy PDA", Available at <http://www.pcworld.com/printable/article/id124456/printable.html>, Jan. 31, 2006.

Bordovsky et al., "Interpreting Commands from a Graphical User Interface", reproduced from International Technology Disclosures, vol. 9, No. 6, Jun. 25, 1991, 1 page.

Cha, Bonnie, "HTC Touch (sprint)", CNET Reviews, Available at <http://www.cnet.com/products/htc-touch/, Updated on Sep. 12, 2008, 8 pages.

Chang et al., "Animation: From Cartoons to the User Interface", UIST '93 Proceedings of the 6th Annual ACM Symposium on User Interface Software and Technology, Nov. 1993, pp. 45-55.

Chartier, David, "iPhone 1.1.3 Video Brings the Proof", Ars Technica, Available at: <http://arstechnica.com/journals/apple.are/2007/12/30/iphone-1-1-3-video-brings-the-proof>, Dec. 30, 2007, 3 pages.

Cheng et al., "Navigation Control and Gesture Recognition Input Device for Small, Portable User Interfaces", Synaptics Inc. of San Jose, California, 2004, pp. 1-13.

CNET, "Video: Create Custom Widgets with Web Clip", CNET News, Available at <http://news.cnet.com/1606-2-6103525.html>, Aug. 8, 2006, 3 pages.

Delltech, "Working with Graphics", Windows XP: The Complete Reference, Chapter 18, Apr. 5, 2005, 4 pages.

Dodge et al., "Microsoft Office Excel 2003 Office Manual", Microsoft Press, vol. 1, Jul. 12, 2004, 5 pages.

Fondantfancies, "Dash Clipping: Don't Wait for Mac OS X 10.5 Leopard", fondantfancies.com, Available at <http://www.fondantfancies.com/blog/3001239/>, Aug. 8, 2006, 9 pages.

Foo, J., "Jackito-Tactile Digital Assistant", CNET Asia, Available at <http://asia.cnet.com/reviews/gadgetbuzz/0390417493922344200.htm>, retrieved on Mar. 5, 2005, 3 pages.

Gada, Lisa, "HTC Touch (Sprint)—MobileTechReview", Smartphone Reviews by Mobile Tech Review, Available at <http://www.mobiletechreview.com/phones/HTC-Touch.htm>, Nov. 2, 2007, 7 pages.

Gillespie, D., "Novel Touch Screens for Hand-Held Devices", Information Display, vol. 18, No. 2, Feb. 2002, 5 pages.

Hesseldahl, A., "An App the Mac can Brag About", Forbes.com, Available at <http://www.forbes.com/2003/12/15/cx_ah_1215tentech_print.html>, Dec. 15, 2003, 2 pages.

Hoover, J. Nicholas, "Computer GUI Revolution Continues with Microsoft Surface's Touch Screen, Object Recognition", Information week, Available at <http://www.informationweek.com/story/showArticle.jhtml?articleID=199703468>, May 30, 2007.

IBM, "Method to Disable and Enable a Touch Pad Pointing Device or Tablet Input Device Using Gestures", Jun. 11, 2002, pp. 1-3.

Jazzmutant, "Jazzmutant Lemur", Available at <http://64.233.167.104/search?a=cache:3g4wFSaZiXIJ:www.nuloop.c>, Nov. 16, 2005, 3 pages.

Jazzmutant, "The Lemur: Multitouch Control Surface", Available at <http://64233.167.104/search?q=cache:j0_nFbNVzOcJ:www.cycling7>, Nov. 16, 2005, 3 pages.

Johnson, R. C., "Gesture Redefine Computer Interface", Electronic Engineering Times, No. 924, Oct. 21, 1996, p. 42(1).

Korpela, Jukka, "Using Inline Frames (iframe elements) to Embed Documents into HTML Documents", Online available at <http://web.archive.org/web/20060925113551/http://www.cs.tut.-fi/~jkorpela/html/iframe.html>, Sep. 25, 2006.

Macworld, "First Look: Leopard first looks: Dashboard", Available at: <http://www.macworld.com/article/52297/2005/08/leodash.html>, Aug. 9, 2006, 3 pages.

Macworld, "Whip up a widget", Available at: <http://www.macworld.com/article/46622/2005/09/octgeekfactor.html>, Sep. 23, 2005, 5 pages.

Mello, Jr. J., "Tiger's Dashboard Brings Widgets to New Dimension", MacNewsWorld, Available at <http://www.macnewsworld.com/story/42630.html>, Retrieved on Jun. 23, 2006, 3 pages.

Narayanaswamy et al., "User Interface for a PCS Smart Phone", Multimedia Computing and Systems, IEEE Conference 1999, vol. 1, Jun. 7-11, 1999, pp. 777-781.

Opera Software, "Welcome to Widgetize", Copyright© 2006 Opera Software ASA, Available at <http://widgets.opera.com/widgetize>, 2006, 1 page.

Piquepaille, R., "Exclusive Interview with Jackito's Makers", Technology Trends, Available at <http://www.primidi.com/2004/07/21.html>, retrieved on Jul. 21, 2004, 4 pages.

Piquepaille, R., "Forget the PDA, Here Comes the TDA", Sidebars, Available at <http://www.orimidi.com/categories/sidebars/2004/12.html>, retrieved on Jul. 12, 2004, 2 pages.

Poon et al., "Gestural User Interface Technique for Controlling the Playback of Sequential Media", Xerox Disclosure Journal, vol. 19, No. 2, Mar./Apr. 1994, pp. 187-190.

Rubine, D., "Specifying Gestures by Example", Computer Graphics vol. 25, No. 4, Jul. 1991, pp. 329-337.

Rubine, Dean H., "The Automatic Recognition of Gestures", CMU-CS-91-202, Thesis Submitted in Partial Fulfillment of the Requirements for the Degree of Doctor of Philosophy in Computer Science at Carnegie Mellon University, Dec. 1991, 285 pages.

snapfiles.com, "Dexpot", Snapfiles, Oct. 10, 2007, 3 pages.

Tidwell, Jenifer, "Animated Transition", Designing Interfaces, Patterns for effective Interaction Design, First Edition, O'Reilly Media, Inc., Nov. 2005, pp. 84-85.

Westerman, Wayne, "Hand Tracking, Finger Identification, and Chordic Manipulation on a Multi-Touch Surface", 1999, 363 pages.

Widgipedia, "I Need a Bog and a Forum Please?", Available at <http://www.widgipedia.com/widgets/details/adni18/hyalo-weather_27.html>, Oct. 19, 2006, 2 pages.

Wildarya, "iDesksoft Desktop Icon Toy v2.9", Available at <http://www.dl4all.com/10/16/idesksoft_desktoo_icon_toy_v2.9.html>, Oct. 16, 2007, 4 pages.

*Apple Inc. et al.* v. *Motorola Inc. et al.*, 1:11-cv-08540 (N.D. III.), Claim Construction Order (Posner, J.), Mar. 19, 2012, 21 pages.

*Apple Inc. et al.* v. *Motorola Inc. et al.*, 1:11-cv-08540 (N.D. III.), Supplemental Claim Construction Order (Posner, J.), Order of Mar. 29, 2012, 6 pages.

*Apple Inc. et al.* v. *Motorola Inc. et al.*, 1:11-cv-08540 (N.D. III.), Mar. 30, 2012 Order Denying Apple Motion for Reconsideration of Claim Construction Order (Posner, J.), 3 pages.

*Apple Inc. et al.* v. *Motorola Inc. et al.*, 1:11-cv-08540 (N.D. III.), Order Granting in Part Motorola MSJ RE '949 (Posner, J.), Apr. 7, 2012, 1 page.

*Apple Inc. et al.* v. *Motorola Inc. et al.*, 1:11-cv-08540 (N.D. III.), Order Denying Several MSJ, Including Motorola MSJ RE '949 (Posner, J.), Apr. 9, 2012, 2 pages.

*Apple* v. *Motorola*, No. 1:11-cv-08540 (N.D. III.), Motorola's Notice of Prior Art References for Trial Pursuant to the Court's Feb. 21, 2012 Order, Apr. 30, 2012, 5 pages.

*Apple* v. *Motorola*, No. 3:10-cv-00662 (N.D. III.), Exhibit 9 to Apple's Claim Construction Brief, Mar. 9, 2012, 14 pages.

*Apple* v. *Motorola*, No. 3:10-cv-00662 (N.D. III.), Appendix to Apple's Claim Construction Brief Addressing the Terms in the Apple Patents, Mar. 9, 2012, 5 pages.

*Apple* v. *Motorola*, No. 3:10-cv-00662 (N.D. III.), Excerpts of: Apple's Claim Construction Brief Addressing the Terms in the Apple Patents, Mar. 9, 2012.

*Apple* v. *Motorola*, No. 3:10-cv-00662 (N.D. III.), Motorola's Notice of Supplemental Authority with Respect to Claim Construction for Apple's '949 Patent, Mar. 27, 2012, 26 pages.

*Apple* v. *Motorola*, No. 3:10-cv-00662 (N.D. III.), Apple's Motion for Limited Reconsideration of the Court's Construction for the "Next Item" heuristics term in the Apple '949 Patent, Mar. 30, 2012, 9 pages.

*Apple* v. *Motorola*, No. 3:10-cv-00662 (N.D. III.), Motorola's Notice of Prior Art Pursuant to 35 U.S.C. Section 282, May 11, 2012, 7 pages.

*Apple* v. *Motorola*, No. 3:10-cv-00662 (N.D. III.), Opinion and Order, Jun. 22, 2012, 38 pages.

*Apple* v. *Motorola*, No. 3:10-cv-00662 (N.D. III.), Plaintiffs Notice of Appeal, Jul. 20, 2012.

*Apple* v. *Motorola*, No. 3:10-cv-00662 (N.D. III.), Excerpts of: Defendant Motorola Solutions, Inc., (f/k.a Motorola, Inc.) and Motorola Mobility, Inc's Invalidity Contentions to Apple Inc. and Next Software, Inc. fk/a Next Computer, Inc. with Exhibits M-1 to M-6, May 16, 2011 65 pages.
*Apple* v. *Motorola*, No. 3:10-cv-00662 (N.D. III.), Motorola's Corrected Motion for Summary Judgment, Nov. 16, 2011.
*Apple* v. *Motorola*, No. 3:10-cv-00662 (N.D. III.), Exhibits 2, 3, and 8 to Motorola's Memorandum in Opposition to Apple's Motion for Summary Judgment, Jan. 9, 2012, 11 pages.
*Apple* v. *Motorola*, No. 3:10-cv-00662 (N.D. III.), Exhibit 3 to Motorola's Memorandum in Support of Motorola's Motion for Summary Judgment (two parts), Jan. 9, 2012, 121 pages.
*Apple* v. *Motorola*, No. 3:10-cv-00662 (N.D. III.), Exhibits 14, 15, and 17 to Motorola's Memorandum in Support of Motorola's Motion for Summary Judgment, Jan. 9, 2012, 74 pages.
*Apple* v. *Motorola*, No. 3:10-cv-00662 (N.D. III.), Appendix to Motorola's memorandum in Support of Motorola's Motion for Summary Judgment for Invalidity, or in the Alternative, Non-infringement for U.S. Pat. No. 7,479,949, Jan. 9, 2012, 3 pages.
*Apple* v. *Motorola*, No. 3:10-cv-00662 (N.D. III.), Plaintiffs and Counter-Claimants Apple Inc. and Next Software Inc's Glossary of Terms from its Motion for Summary Judgment of U.S. Pat. No. 7,479,949, Jan. 9, 2012, 4 pages.
*Apple* v. *Motorola*, No. 3:10-cv-00662 (N.D. III.), Plaintiffs and Counter-Claimants Apple Inc. and Next Software, Inc's Glossary of Terms Relating to Opposition to Defendant's motion for Summary Judgement on Invalidity, or in the alternative, Non-Infringement of U.S. Pat. No. 7,479,949, Jan. 9, 2012, 4 pages.
*Apple* v. *Motorola*, No. 3:10-cv-00662 (N.D. III.), Joint Motion Regarding Claims 2,9 and 10 of Apple's U.S. Pat. No. 7,479,949, May 16, 2012.
*Apple* v. *Motorola*, No. 3:10-cv-00662 (N.D. III.), Order Denying Motorola's Motion for Summary Judgment, Jan. 17, 2012, pp. 6-8.
*Apple* v. *Motorola*, No. 3:10-cv-00662 (N.D. III.), Order of Apr. 7, 2012, Regarding Apple's Patent '949, Apr. 7, 2012.
*Apple* v. *Motorola*, No. 3:10-cv-00662 (N.D. III.), Order of Apr. 9, 2012 Regarding Apple's Patent '949, Apr. 9, 2012.
*Apple* v. *Samsung* (ITC-796), Exhibit CC. Excerpts from the deposition transcript of Charles Kreitzberg, Oct. 24, 2011, 76 pages.
*Apple* v. *Samsung* (ITC-796), Samsung Rebuttal Claim Construction Brief Exhibit JJ. Excerpts from the deposition transcript of Charles Kreitzberg, Oct. 24, 2011, 76 pages.
*Apple* v. *Samsung* (ITC-796), Updated Joint Claim Construction Chart, Nov. 30, 2011, p. 1.
*Apple* v. *Samsung* (ITC-796), Apple Inc.'s Opening Claim Construction Brief Exhibit 1, Excerpt from the Modern Dictionary of Electronics (7$^{th}$ ed. 1999), Nov. 1, 2011.
*Apple* v. *Samsung* (ITC-796), Apple Inc.'s Opening Claim Construction Brief Exhibit 2. Excerpt from Collins English Dictionary (5$^{th}$ ed. 2000), Nov. 1, 2011.
*Apple* v. *Samsung* (ITC-796), Apple Inc.'s Opening Claim Construction Brief Exhibit 3. Rebuttal Expert Report of Dr. Ravin Balakrishnan, Nov. 1, 2011.
*Apple* v. *Samsung* (ITC-796), Apple Inc.'s Opening Claim Construction Brief Exhibit 4, Rebuttal Expert Report of Charles Kreitzberg, Ph.D., on Claim Construction.
*Apple* v. *Samsung* (ITC-796), Claim Construction Presentation, Nov. 2,1 2011.
*Apple* v. *Samsung* (ITC-796), Claim Construction Tutorial Presentation, Nov. 21, 2011.
*Apple* v. *Samsung* (ITC-796), Commission Investigative Staffs Opening Claim Construction Brief, Nov. 7, 2012.
*Apple* v. *Samsung* (ITC-796), Commission Investigative Staffs Rebuttal Claim Construction Brief, Nov. 17, 2011.
*Apple* v. *Samsung* (ITC-796), Complaintant Apple Inc.'s Opening Claim Construction Brief, Nov. 1, 2011.
*Apple* v. *Samsung* (ITC-796), Deposition of Ravin Balakrishnan, Oct. 21, 2011.
*Apple* v. *Samsung* (ITC-796), Evidentiary Hearing Transcript, Jun. 5, 2012.
*Apple* v. *Samsung* (ITC-796), excerpts from: Complainant Apple Inc.'s Rebuttal Claim Construction Brief.
*Apple* v. *Samsung* (ITC-796), excerpts from: Evidentiary Hearing Transcript, Jun. 6, 2012.
*Apple* v. *Samsung* (ITC-796), excerpts from: Evidentiary Hearing Transcript, Jun. 7, 2012.
*Apple* v. *Samsung* (ITC-796), excerpts from: Evidentiary Hearing Transcript, May 30, 2012.
*Apple* v. *Samsung* (ITC-796), excerpts from: Evidentiary Hearing Transcript, May 31, 2012.
*Apple* v. *Samsung* (ITC-796), excerpts from: Evidentiary Hearing Transcript—Revised and Corrected, Jun. 4, 2012.
*Apple* v. *Samsung* (ITC-796), excerpts from: Tutorial and Marman Hearing Transcript, Nov. 21, 2011.
*Apple* v. *Samsung* (ITC-796), Exhibit 1 to Deposition of Balakrishnan, Oct. 21, 2011.
*Apple* v. *Samsung* (ITC-796), Exhibit 1. Excerpt from Dictionary of Computer Science Engineering and Technology 223 (ed. Phillip Laplante, 2011).
*Apple* v. *Samsung* (ITC-796), Exhibit 10 to Deposition of Balakrishnan, Oct. 21, 2011.
*Apple* v. *Samsung* (ITC-796), Exhibit 17 to Deposition of Van Dam, Apr. 20, 2012.
*Apple* v. *Samsung* (ITC-796), Exhibit 2 to Deposition of Balakrishnan, Oct. 21, 2011.
*Apple* v. *Samsung* (ITC-796), Exhibit 2. Excerpts from Deposition of Charles Kreitzberg, Oct. 24, 2011.
*Apple* v. *Samsung* (ITC-796), Exhibit 3 to Expert Report of Van Dam, Mar. 14, 2012.
*Apple* v. *Samsung* (ITC-796), Exhibit 3. Examination Support Document at 66-67, Jun. 12, 2008.
*Apple* v. *Samsung* (ITC-796), Exhibit 4 to Expert Report of Van Dam, Mar. 14, 2012.
*Apple* v. *Samsung* (ITC-796), Exhibit 5 to Expert Report of Van Dam, Mar. 14, 2012.
*Apple* v. *Samsung* (ITC-796), Exhibit 7 to Deposition of Balakrishnan, Oct. 21, 2011.
*Apple* v. *Samsung* (ITC-796), Exhibit 8 to Deposition of Balakrishnan, Oct. 21, 2011.
*Apple* v. *Samsung* (ITC-796), Exhibit A. Declaration of Charles Kreitzberg, Nov. 1, 2011.
*Apple* v. *Samsung* (ITC-796), Exhibit K. Jun. 12, 2008 Supplemental Accelerated Examination Support Document from the Prosecution History of U.S. Pat. No. 7,479,949, Nov. 1, 2011.
*Apple* v. *Samsung* (ITC-796), Exhibit L. Excerpts from the deposition transcript of Ravin Balakrishnan, Oct. 21, 2011.
*Apple* v. *Samsung* (ITC-796), Notice of Initial Determination, Oct. 24, 2012.
*Apple* v. *Samsung* (ITC-796), Notice of Request for Statements on the Public Interest, Nov. 13, 2012.
*Apple* v. *Samsung* (ITC-796), Samsung Rebuttal Claim Construction Brief, Nov. 14, 2011.
*Apple* v. *Samsung* (ITC-796), Samsung Rebuttal Claim Construction Brief Exhibit 11. Excerpts from the deposition transcript of Ravin Balakrishnan, Oct. 21, 2011.
*Apple* v. *Samsung* (ITC-796), Samsung's Markman Presentation, Nov. 21, 2011.
*Apple* v. *Samsung* (ITC-796), Samsung's Opening Claim Construction Brief, Nov. 1, 2011.
*Apple* v. *Samsung* (ITC-796), Sec 8 Supplemental Responses to Apple's First Set of Interrogatories: Appendix A, Ex. 1.
*Apple* v. *Samsung* (ITC-796), Sec 8 Supplemental Responses to Apple's First Set of Interrogatories: Appendix A, Ex. 2-1.
*Apple* v. *Samsung* (ITC-796), Sec 8 Supplemental Responses to Apple's First Set of Interrogatories: Appendix A, Ex. 2-2.
*Apple* v. *Samsung* (ITC-796), Sec 8 Supplemental Responses to Apple's First Set of Interrogatories: Appendix A, Ex. 3.
*Apple* v. *Samsung* (ITC-796), Sec 8 Supplemental Responses to Apple's First Set of Interrogatories: Appendix A, Ex. 4.
*Apple* v. *Samsung* (ITC-796), Sec 8 Supplemental Responses to Apple's First Set of Interrogatories: Appendix A, Ex. 5.
*Apple* v. *Samsung* (ITC-796), Sec 8 Supplemental Responses to Apple's First Set of Interrogatories: Appendix A, Ex. 6.
*Apple* v. *Samsung* (ITC-796), Sec 8 Supplemental Responses to Apple's First Set of Interrogatories: Appendix A, Ex. 7.
*Apple* v. *Samsung*, No. (P) NSD 1243 of 2011 (Australia), Samsung Particulars of Invalidity Contentions regarding '195.

*Apple* v. *Samsung*, No. (P) NSD 1243 of 2011 (Australia), Samsung Particulars of Invalidity Contentions regarding '532.
Construing Terms of the Asserted Patents, ITC Inv. No. 337-TA-796 (*Apple* v. *HTC*), Order No. 16, Mar. 6, 2012, 47 pages.
Handbook for Palm m500 Series Handhelds, User Manual., 286 pages.
SMART Board Software Version 8.1.3 Introduces Touch Gestures, Smart Technologies, Inc., Issue 5., Aug. 10, 2004, pp. 1-3.
International Preliminary Report on Patentability received for PCT Patent Application No. PCT/US2007/077777, issued on Oct. 13, 2009, 11 pages.
International Preliminary Report on Patentability received for PCT Patent Application No. PCT/US2007/088885, issued on Jul. 7, 2009, 11 pages.
Office Action received for Australian Patent Application No. 2013200529, issued on Dec. 12, 2014, 3 pages.
Notice of Allowance received for Canadian Patent Application No. 2,735,309, mailed on Dec. 9, 2014, 1 page.
Office Action dated Jul. 29, 2013, received in Canadian Patent Application No. 2,735,309, Jul. 29, 2013, 3 pages.
Board Opinion received for Chinese Patent Application No. 200780001219.1, mailed on Sep. 18, 2014, 10 pages (5 pages of English Translation and 5 pages of Official Copy).
Notice of Allowance received for Korean Patent Application No. 10-2009-7006231, mailed on Sep. 23, 2014, 3 pages (Official Copy only). (See Communication under 37 CFR § 1.98(a) (3))
Office Action received for Korean Patent Application No. 10-2009-7006231, mailed on Mar. 19, 2014, 5 pages (1 page of English Translation and 4 pages of Official Copy).
Zinman Aaron, "RadioActive: Enabling Large-Scale Asynchronous Audio Discussions on Mobile Devices", Program in Media Arts and Sciences, Massachusetts Institute of Technology, Aug. 2006, pp. 1-63.
Notice of Allowance received for Korean Patent Application No. 10-2012-7023375, mailed on Sep. 30, 2014, 3 pages (Official Copy only). (See Communication under 37 CFR § 1.98(a) (3)).
Office Action received for Korean Patent Application No. 10-2012-7023375, mailed on Nov. 5, 2013, 8 pages (3 pages of English Translation and 5 pages of Official Copy).
Notice of Allowance received for Korean Patent Application No. 10-2013-7019464, mailed on Sep. 30, 2014, 3 pages (Official Copy only). (See Communication under 37 CFR § 1.98(a) (3)).
Office Action received for Korean Patent Application No. 10-2013-7019464, Nov. 5, 2013, 6 pages (2 pages of English translation & 4 pages of official copy).
Office Action received for Korean Patent Application No. 10-2014-7013454, mailed on Aug. 11, 2014, 11 pages (4 pages of English Translation and 7 pages of Official Copy).
Office Action received for Korean Patent Application No. 10-2014-7013455, mailed on Aug. 11, 2014, 12 pages (5 pages of English Translation and 7 pages of Official copy).
Notice of Allowance received for Korean Patent Application No. 10-2014-7034905, issued on Mar. 13, 2015, 3 pages (Official Copy Only). (See Communication under 37 CFR § 1.98(a) (3)).
Examiner's Pre-Review dated Jul. 19, 2011, received in Japanese Patent Application No. 2009-527567, which corresponds to U.S. Appl. No. 12/101,832, Jul. 19, 2011, 6 pages (3 pages of English Translation and 3 pages of Official Copy).
Office Action received for Japanese Patent Application No. 2009-527567, mailed on Feb. 13, 2012, 48 pages (English Translation only).
Notice of Allowance received for Japanese Patent Application No. 2012-173257, mailed on Dec. 1, 2014, 3 pages (Official Copy only). (See Communication under 37 § 1.98(a) (3)).
Office Action received for Japanese Patent Application No. 2012-173257, mailed on Dec. 13, 2013, 2 pages (English Translation Only).
Notice of Allowance received for U.S. Appl. No. 12/101,832, mailed on Feb. 2, 2009, 6 pages.
Request for Exparte Reexamination received for U.S. Appl. No. 90/009,643 mailed on Feb. 23, 2010, 8 pages.
Alam, Mohammad Badrul., "RPEN: A New 3D Pointing Device", Oct. 3, 1996, 182 pages.
Aliakseyeu et al., "A Computer Support Tool for the Early Stages of Architectural Design", Interacting with Computers, vol. 18, No. 4, Jul. 2006, pp. 528-555.
Arar, Yardena, "Microsoft Reveals Office 2003 Prices, Release", PC World, "http://www.pcworld.com/article/112077/microsoft_reveals_office_2003_prices_release.html", Aug. 19, 2003, 3 pages.
Bandelloni et al., << Flexible Interface Migration >>, IUI,04, Jan. 13-16, 2004, 9 pages.
Berka, "iFuntastic 3 Opens Up New iPhone Functionality", ars 31or the31I, Availale at: "http://arstechnica.com/journals/apple.ars/2007/08/30/ifuntastic-3-opens-up-new-iphone-functionality", Aug. 30, 2007, 1 page.
Bjornskiold et al., "Touchscreen GUI Design and Evaluation of an On-Device Portal", May 2005, 119 pages.
Collberg et al., "TetraTetris: A Study of Multi-User Touch-Based Interaction Using Diamondtouch", 2003, 8 pages.
Dachselt et al., "Three-Dimensional Menus: A Survey and Taxonomy", Computers and Graphics, vol. 31, Jan. 2007, pp. 53-65.
Davidson et al., "Synthesis and Control on Large Scale Multi-Touch Sensing Displays", In Proceedings of the 2006 Conference on New Interfaces for Musical Expression, 2006, pp. 216-219.
Denda et al., "Evaluation of Spoken Dialogue System for a Sightseeing Guidance with Multimodal Interface", Intelligent Multimodal Systems, JSAI, Aug. 23, 1997, pp. 41-48.
Diaz-Marino et al., "Programming for Multiple Touches and Multiple Users: A Toolkit for the DiamondTouch Hardware", Proceedings of ACM UIST'03 User Interface Software and Technology, 2003, 2 pages.
Dietz et al., "DiamondTouch: A Multi-User Touch Technology", Mitsubishi Electric Research Laboratories, Oct. 2003, 11 pp.
Domingues et al., "Collaborative and Transdisciplinary practices in Cyberart: from Multimedia to Software Art Installations", Feb. 2005, pp. 1-19.
Drake, Clare Gwyneth., "Non-Visual User Interfaces", Oct. 31, 2003, 119 pages.
Esenther et al., "DiamondTouch SDK: Support for Multi-User, Multi-Touch Applications", Mistsubishi Electric Research Laboratories, Nov. 2002, 5 pages.
Esenther et al., "Multi-User Multi-Touch Games on Diamond Touch with the DTFlash Toolkit", Dec. 2005, 5 pages.
Everitt, Katherine E., "UbiTable: Impromptu Face-to-Face Collaboration on Horizontal Interactive Surfaces", Mitsubishi Electric Research Laboratories, Sep. 2003, 10 pages.
Fingertapps, "Multi-Touch User Interface Demo Using Fingertapps", "http://www.youtube.com/watch?v=na__32BJCSbk", Apr. 24, 2008.
fingertapps.com, "Creating Engaging Touch Experiences", "http://www.fingertapps.com/, downloaded" Jun. 16, 2008.
Fishkin et al., "Embodied User Interfaces for Really Direct Manipulation", Submitted to Communications of ACM, Version 9, 1999, pp. 1-11.
Forlines et al., "DTLens: Multi-user Tabletop Spatial Data Exploration", UIST'05, Oct. 23-27, 2005, 6 pages.
Forlines et al., "Glimpse: A Novel Input Model for Multi-Level Devices", CHI'2005, Apr. 2-7, 2005, 6 pages.
Forlines et al., "Multi-User, Multi-Display Interaction with a Single-User, Single-Display Geospatial Application", Mitsubishi Electric Research Laboratories, Inc., TR2006-083, Oct. 2006, pp. 797HTC-0043238-797HTC-0043242.
Friedland et al., "Teaching with an Intelligent Electronic Chalkboard", 2004, pp. 16-23.
Fukuchi, Kentaro, "Concurrent Manipulation of Multiple Components on Graphical User Interface", PhD Thesis, Tokyo Institute of Technology, Oct. 23, 2006, 160 pages.
Fukuchi et al., "Interaction Techniques for SmartSkin", In Proceedings of UIST '02, 2002, 2 pages.
Gillespie et al., "The Moose: A Haptic User Interface for Blind Persons with Application to Digital Sound Studio", Center for Computer Research in Music and Acoustics, Oct. 16, 1995, 19 pages.
Han, Jefferson Y., "Low-Cost Multi-Touch Sensing Through Frustrated Total Internal Reflection", Oct. 23, 2005, pp. 115-118.
Han, "Multi-touch Interaction Wall", In ACM SIGGRAPH, 2006, 1 page.

Han, Jeff, "Unveiling the Genius of Multi-touch Interface Design", Ted Ideas Worth Spreading, available at "http://www.ted.com/index.php/talks/view/id/65", Aug. 2006, 1 page.
Hinckley et al., "Touch-Sensing Input Devices", CHI '99, Proceedings of the SIGCHI conference on Human Factors in Computing Systems, May 15-20, 1999, pp. 223-230.
Hughes et al., "Empirical Bi-Action Tables: A Tool for the Evaluation and Optimization of Text Input Systems. Application I: Stylus Keyboards", Human Computer Interaction, vol. 17, 2002, pp. 131-169.
Ical, "Wikipedia, the Free Encyclopedia—Contents: Features, Trivia, See Also, External Links, References", Available at "http://en.wikipedia.orgiwiki/ICal" retrieved on Feb. 4, 2008, 3 pages.
Itoh et al., "A Robust Dialogue System with Spontaneous Speech Understanding and Cooperative Response", 1997, 4 pages.
Jacob, Robert J. K., << New Human-Computer Interaction Techniques >>, 2001, 9 pages.
Jin et al., "GIA: Design of a Gesture-Based Interaction Photo Album", Pers Ubiquit Comput, Jul. 1, 2004, pp. 227-233.
Johnson, Jeff A., "A Comparison of User Interfaces for Panning on a Touch-Controlled Display", CHI '95 Proceedings, Mosaic of Creativity, May 7-11, 1995, pp. 218-225.
Johnson, Chris, "First Workshop on Human Computer Interaction with Mobile Devices", GIST Technical Report G98-1, May 21-23, 1998, pp. 1-49.
Karlson et al., "AppLens and LaunchTile: Two Designs for One-Handed Thumb Use on Small Devices", CHI 2005, Papers: Small Devices 1, Apr. 2-7, 2005, pp. 201-210.
Keahey et al., "Techniques for Non-Linear Magnification Transformations", IEEE Proceedings of Symposium on Information Visualization, Oct. 1996, pp. 38-45.
Kinoma, "Kinoma Player 4 EX Documentation", Available at "http://replay.waybackmachine.org/20061101175306/http://www.kinoma.com/index/pd-player-4", archived on Nov. 1, 2006, Nov. 1, 2006, 28 pages.
Klatzky et al., "Identifying Objects by Touch: An Expert System", Perception and Psychophysics, vol. 37(4), 1985, pp. 299-302.
Klatzky et al., "Representing Spatial Location and Layout From Sparse Kinesthetic Contacts", Joumal of Experimental Psychology: Human Perception and Performance, vol. 29, No. 2, 2003, pp. 310-325.
Kolsch et al., "Vision-Based Interfaces for Mobility", 2004, pp. 1-12.
Krulwich et al., "Intelligent Talk and Touch Interfaces Using Multi-Modal Semantic Grammars", Proceedings, Fourth Bar Ilan Symposium on Foundations of Artificial Intelligence, Feb. 2, 1995, pp. 103-112.
Kurtenbach, Gordon Paul., "The Design and Evaluation of Marking Menus", 1993, 192 pages.
Landragin, Frederic, "The Role of Gesture in Multimodal Referring Actions", Proceedings of the 4th IEEE International Conference on Multimodal Interfaces, available at "http://ieeexplore.iee.org/ie15/8346/26309/01166988pdf?arnumber=1166988", 2002, 6 pages.
Lederman et al., "Spatial and Movement-Based Heuristics for Encoding Pattern Information Through Touch", Journal of Experimental Psychology, vol. 114, No. 1, 1985, pp. 33-49.
Lee et al., "A Multi-Touch Three Dimensional Touch-Sensitive Tablet", CHI '85 Proceedings of the SIGCHI Conference on Human Factors in Computing Systems, Apr. 1985, pp. 21-25.
Lee et al., "Haptic Pen: Tactile Feedback Stylus for Touch Screens", Mitsubishi Electric Research Laboratories, Oct. 2004, 6 pages.
Lie, Hakon Wium., "Cascading Style Sheets", University of Osloensis, MDCCCXI, 2005, pp. 243-247.
Loomis et al., "The Encoding-Error Model of Pathway Completion without Vision", Geographical Analysis, vol. 25, No. 4, Jul. 15, 1992, pp. 295-314.
Luk, Joseph Kurachi., "Using Haptics to Address Mobile Interaction Design Challenges", Jul. 2006, 303 pages.
MacKay et al., "Walk 'n Scroll: A Comparision of Software-based Navigation Techniques for Different Levels of Mobility", Mobile HCI' 05, Sep. 2005, pp. 183-190.
Malik et al., "Visual Touchpad: A Two-Handed Gestural Input Device", ICMI'04 Proceedings of the 6th International Conference on Multimodal Intercases, ACM, Oct. 13-15, 2004, pp. 289-296.
Mankoff et al., "Heuristic Evaluation of Ambient Displays", Apr. 5, 2003, pp. 169-176.
McDonald, Chris, "Hand Interaction in Augmented Reality", Jan. 8, 2003, 128 pages.
Miller et al., "The Design of 3D Haptic Widgets", 1999, pp. 97-102.
Moscovich et al., "Multi-Finger Cursor Techniques", GI '06 Proceedings of Graphics Interface 2006, Quebec City, Quebec, Canada, Jun. 9, 2006, 7 pages.
Muller-Tomfelde et al., "Modeling and Sonifying Pen Strokes on Surfaces", Proceedings of the COST G-6 Conference on Digital Audio Effects, Dec. 2001, pp. DAFX-1-DAFX5.
Myers et al., "Heuristics in Real User Interfaces", Apr. 24, 1993, 4 pages.
Ng et al., "Real-Time Gesture Recognition System and Application", Image and Vision Computing 20, 2002, pp. 993-1007.
Patten et al., "Sensetable: A Wireless Object Tracking Platform for Tangible User Interfaces", Published in the Proceedings of CHI 2001, Mar. 31, 2001, 8 pages.
Plaisant et al., "Touchscreen Toggle Design", CHI'92, May 3-7, 1992, pp. 667-668.
Poupyrev et al., "Tactile Interfaces for Small Touch Screens", 2003, 4 pages.
Raisamo, Roope, "Multimodal Human Computer Interaction—A Constructive and Empirical Study", Academic Dissertation, Department of Computer Science, University of Tampere, 1999, 84 pages.
Rekimoto et al., "SmartSkin: An Infrastructure for Freehand Manipulation on Interactive Surfaces", Proceedings of the SIGCHI conference on Human factors in computing systems, vol. 4, Issue 1, Apr. 25, 2002, pp. 113-120.
Ringel et al., "Release, Relocate, Reorient, Resize: Fluid Techniques for Document Sharing on Multi-User Interactive Tables", Mitsubishi Electric Research Laboratories, Apr. 24, 2004, 5 pages.
Rubine, Dean, "Combining Gestures and Direct Manipulation", CHI '92, May 3-7, 1992, pp. 659-660.
Ruflin, Michael, "Interactive Tables: Docking Table", Sin Diploma Project, Dec. 2005, 71 pages.
Schedlbauer et al., "An Empirically-Derived Model for Predicting Completion Time of Cursor Position Tasks in Dual-Task Environments", Mar. 2006, 189 pages.
Schraefel et al., "An Experimental Comparison of Dial, Scroll and Stroke Gesture Techniques", Oct. 2005, pp. 1-11.
Scott et al., "System Guidelines for Co-located, Collaborative Work on a Tabletop Display", 2003, pp. 159-178.
Shen et al., "DiamondSpin: An Extensible Toolkit for Around-the-Table Interaction", Apr. 24-29, 2004, 8 pages.
Smith et al., "The Radial Scroll Tool: Scrolling Support for Stylus- or Touch-Based Document Navigation", UIST '04 Proceedings of the 17th Annual ACM symposium on User Interface Software and Technology, Santa Fe, New Mexico, Oct. 24-27, 2004, pp, 1-4.
Teixeira et al., "An Integrated Framework for Supporting Photo Retrieval Activities in Home Environments", 2003, pp. 1-11.
Tekinerdogan, Bedir, "ASAAM: Aspectual Software Architecture Analysis Method", Mar. 2003, 10 pages.
The Pondering Primate, "Will Apple Start Selling Concert and Movie Tickets Through iTunes?", "http://theponderingprimate.blogspot.com/2006/03/will-apple-start-selling-concert-and.html", Oct. 17, 2006, 16 pages.
Tse et al., "Enabling Interaction with Single User Applications Through Speech and Gestures on a Multi-User Tabletop", Mitsubishi Electric Research Laboratories, 2005, pp. 336-343.
Tse et al., "SDGToolkit: A Toolkit for Rapidly Prototyping Single Display Groupware", 2002, 3 pages.
Tse, Edward Hiatt., "The Single Display Groupware Toolkit", A Thesis Submitted to the Faculty of Graduate Studies in Partial Fulfilment of the Requirements for the Degree of Master of Science, Calgary, Alberta, Nov. 2004, 130 pages.
Ullmer et al., "The metaDESK: Models and Prototypes for Tangible User Interfaces", UIST '97, Banff, Alberta, Canada, Oct. 14, 1997, pp. 1-10.
Vogel et al., "Distant Freehand Pointing and Clicking on Very Large, High Resolution Displays", UIST' 05, Oct. 23, 2005, pp. 33-42.
Vogel, Daniel John., "Interactive Public Ambient Displays", Oct. 2004, 113 pages.

Washington Beat, Video Harp: Design News, vol. 47, Issue 1, Jan. 7, 1991, 2 pages.
Wellner, Pierre D., "Adaptive Thresholding 41or the Digital Desk", Technical Report, Rank Xerox Research Center, Cambridge Laboratory, Cambridge, United Kingdom (Available online at http://citeseerx.ist.psu.edu/viewdoc/download?doi=10.1.1.71.8970ANDrep=rep1ANDtype=pdf, Jul. 1993, 18 pages.
Wellner, Pierre D., "Interacting with paper on the Digital Desk", Communications of the ACM, Jul. 1993. vol. 36, No. 7, pp. 87-96.
Wellner, Pierre D., "Self Calibration for the DigitalDesk", Technical Report, Rank Xerox Research Centre, Cambridge Laboratory, Cambridge, United Kingdom (Available online at http://citeseerxist/psu.edu/viewdoc/download?doi=10.1.1.44.7371ANDrep=repIANDtype=pdf, last visited Apr. 22, 2010), Jul. 1993, 16 pages.
Wellner, Pierre D., "The DigitalDesk Calculators: Tangible Manipulation on a Desk Top Display", In ACM UIST '91 Proceedings, Nov. 11-13, 1991, pp. 27-33.
Wellner, Pierre D., "The DigitalDesk Calculator: Tactile Manipulation on a Desk Top Display", In Proceedings of UIST'92, the ACM Symposium on User Interface Software and Technology. (Nov), 1991, 7 pages.
Westerman et al., "Multi-Touch: A New Tactile 2-D Gesture Interface for Human-Computer Interaction", Proceedings of the Human Factors and Ergonomics Societ 45$^{th}$ Annual Meeting, 2001, pp. 632-636.
Wilson, Andrew D., "TouchLight: An Imaging Touch Screen and Display for Gesture-Based Interaction", ACM, Oct. 13-15, 2004, 8 pages.
Winckler et al., "Tasks and Scenario-based Evaluation of Information Visualization Techniques", TAMODIA'04, Nov. 15-16, 2004, pp. 165-172.
Worth, Carl D., "xstroke: Full-Screen Gesture Recognition for X", Presented at the Usenix Annual Technical Conference, Apr. 9, 2003, 10 pages.
Wright et al., "Designing an Interactive Decision Explorer", Information Design Journal Document Design, vol. 11, No., 2003, pp. 252-260.
Wu et al., "Gesture Registration, Relaxation, and Reuse for Multi-Point", IEEE, International Workshop on Horizontal Interactive Human-Computer Systems, 2006, 8 pages.
Wu et al., "Multi-Finger and Whole Hand Gestural Interaction Techniques for Multi-User Tabletop Displays", UiST '03, Vancouver, BC, Canada, ACM 2003, Nov. 5-7, 2003, pp. 193-202.
Yee, K., "Two-Handed Interaction on a Tablet Display", SIGCHI 2004, Vienna, Austria, Apr. 2004, 4 pages.
Zhao, Rui, "Incremental Recognition in Gesture-Based and Syntax-Directed Diagram Editors", INTERCHI'93, Cadlab, Apr. 24-29, 1993, pp. 93-100.
Board Opinion received for Chines Patent Application No. 200780001219.1, mailed on Mar. 25, 2015, 7 pages (2 pages of English Translation and 5 pages of Official Copy).
HOWpc, "Windows XP Manual", Available at <http://cfile208.uf.daum.net/attach/152FF50A4968C827141411>, Feb. 2003, pp. 1-4. (See Communiaction under 37 CFR § 1.98(a) (3)).
Office Action received for Korean Patent Application No. 10-2014-7013454, mailed on Apr. 17, 2015, 11 pages (4 pages of English Translation and 7 pages of Official Copy).
Office Action received for Korean Patent Application No. 10-2014-7013455, mailed on Apr. 14, 2015, 8 pages (3 pages of English Translation and 5 pages of Official Copy).
*Apple* V. *Samsung* (ITC-796), Samsung's Technology Tutorial Presentation Nov. 21, 2011.
Office Action Received for European Patent Application No. 121750830, mailed on Nov. 30, 2015, 5 pages.
Notice of Acceptance received for Australian Patent Application No. 2013200529, issued on Feb. 9, 2016, 3 pages.
Office Action received for Korean Patent Application No. 10-2014-7013455, mailed on Jan. 28, 2016, 7 pages (3 pages of English Translation and 4 pages of Official copy).
Office Action received for Japanese Patent Application No. 2014259187, mailed on Mar. 11, 2016, 4 pages (2 pages of English Translation and 2 pages of Official Copy).
Office Action received for Japanese Patent Application No. 2014259188, mailed on Feb. 1, 2016, 8 pages (4 pages of English Translation and 4 pages of Official Copy).
Yoshino, Mariko, "Let's use! Outlook Express", Nikkei PC Beginners, Nikkei Business Publications, Inc., vol. 7, No. 24, p. 75 (see attached 37 CFR § 1.98(a) (3)).

* cited by examiner

*Primary Examiner* — Liliana Cerullo
(74) *Attorney, Agent, or Firm* — Morrison & Foerster LLP

(57) ABSTRACT

A computer-implemented method for use in conjunction with a computing device with a touch screen display comprises: detecting one or more finger contacts with the touch screen display, applying one or more heuristics to the one or more finger contacts to determine a command for the device, and processing the command. The one or more heuristics comprise: a heuristic for determining that the one or more finger contacts correspond to a one-dimensional vertical screen scrolling command, a heuristic for determining that the one or more finger contacts correspond to a two-dimensional screen translation command, and a heuristic for determining that the one or more finger contacts correspond to a command to transition from displaying a respective item in a set of items to displaying a next item in the set of items.

16 Claims, 302 Drawing Sheets

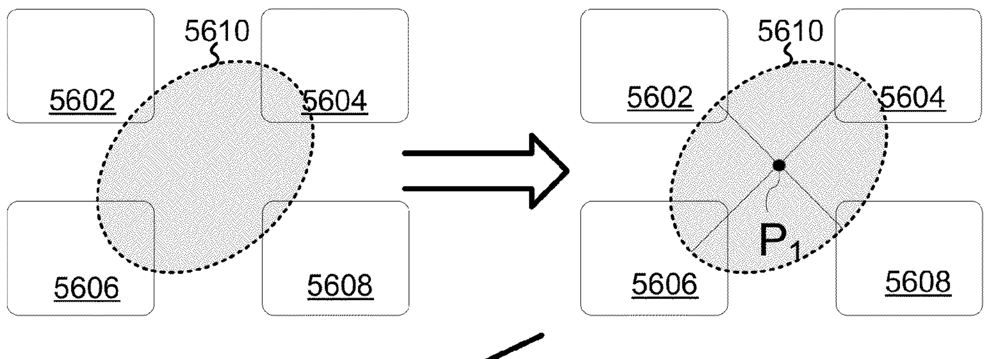
Figure 56A
Figure 56B
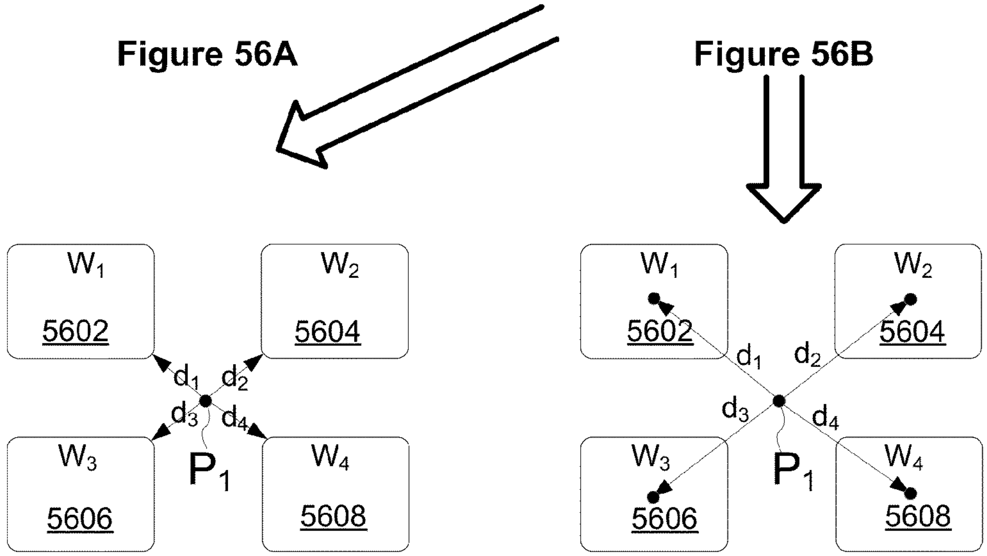
Figure 56C
Figure 56D
$W_1$' and $W_1$" are two numbers with opposite signs
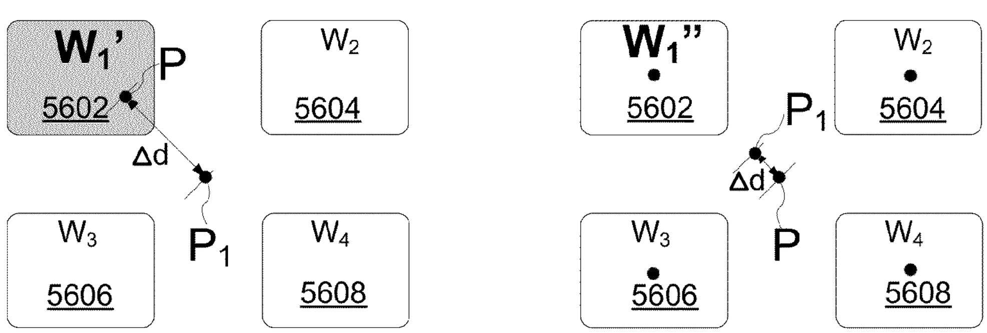
Figure 56E
Figure 56F

Figure 60I
Portable Multifunction Device 100
206
208
208
Speaker 111
Optical Sensor 164
Proximity Sensor 166
6000I
402
Current Time 404
406
New Message
Cancel
To:
6019
Send
6017
back
Y
V
W
X
123!@#
6015
Space
Microphone 113
Home 204
Accelerometer(s) 168

Figure 60K
Portable Multifunction Device
100
206
Speaker 111
Optical Sensor 164
Proximity Sensor 166
6000K
208
208
402
Current Time 404
406
New Message
Cancel
To:
Text box
Send
back
7
8
9
ABC
6025
Space
Microphone 113
Home 204
Accelerometer(s) 168

6430

TOUCH SCREEN DEVICE, METHOD, AND GRAPHICAL USER INTERFACE FOR CUSTOMIZING DISPLAY OF CONTENT CATEGORY ICONS

RELATED APPLICATIONS

This application is a continuation of U.S. application Ser. No. 11/850,635 filed Sep. 5, 2007, which claims priority to U.S. Provisional Patent Application Nos. 60/937,991, "Touch Screen Device, Method, and Graphical User Interface for Determining Commands by Applying Heuristics," filed Jun. 29, 2007; 60/937,993, "Portable Multifunction Device," filed Jun. 29, 2007; 60/879,469, "Portable Multifunction Device," filed Jan. 8, 2007; 60/879,253, "Portable Multifunction Device," filed Jan. 7, 2007; and 60/824,769, "Portable Multifunction Device," filed Sep. 6, 2006. All of these applications are incorporated by referenced herein in their entirety.

This application is related to the following applications: (1) U.S. patent application Ser. No. 10/188,182, "Touch Pad For Handheld Device," filed Jul. 1, 2002; (2) U.S. patent application Ser. No. 10/722,948, "Touch Pad For Handheld Device," filed Nov. 25, 2003; (3) U.S. patent application Ser. No. 10/643,256, "Movable Touch Pad With Added Functionality," filed Aug. 18, 2003; (4) U.S. patent application Ser. No. 10/654,108, "Ambidextrous Mouse," filed Sep. 2, 2003; (5) U.S. patent application Ser. No. 10/840,862, "Multipoint Touchscreen," filed May 6, 2004; (6) U.S. patent application Ser. No. 10/903,964, "Gestures For Touch Sensitive Input Devices," filed Jul. 30, 2004; (7) U.S. patent application Ser. No. 11/038,590, "Mode-Based Graphical User Interfaces For Touch Sensitive Input Devices" filed Jan. 18, 2005; (8) U.S. patent application Ser. No. 11/057,050, "Display Actuator," filed Feb. 11, 2005; (9) U.S. Provisional Patent Application No. 60/658,777, "Multi-Functional Hand-Held Device," filed Mar. 4, 2005; (10) U.S. patent application Ser. No. 11/367,749, "Multi-Functional Hand-Held Device," filed Mar. 3, 2006; and (11) U.S. patent application Ser. No. 29/281,695, "Icons, Graphical User Interfaces, and Animated Graphical User Interfaces For a Display Screen or Portion Thereof," filed Jun. 28, 2007. All of these applications are incorporated by reference herein.

TECHNICAL FIELD

The disclosed embodiments relate generally to electronic devices with touch screen displays, and more particularly, to electronic devices that apply heuristics to detected user gestures on a touch screen display to determine commands.

BACKGROUND

As portable electronic devices become more compact, and the number of functions performed by a given device increase, it has become a significant challenge to design a user interface that allows users to easily interact with a multifunction device. This challenge is particular significant for handheld portable devices, which have much smaller screens than desktop or laptop computers. This situation is unfortunate because the user interface is the gateway through which users receive not only content but also responses to user actions or behaviors, including user attempts to access a device's features, tools, and functions. Some portable communication devices (e.g., mobile telephones, sometimes called mobile phones, cell phones, cellular telephones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

To avoid problems associated with pushbuttons and complex menu systems, portable electronic devices may use touch screen displays that detect user gestures on the touch screen and translate detected gestures into commands to be performed. However, user gestures may be imprecise; a particular gesture may only roughly correspond to a desired command. Other devices with touch screen displays, such as desktop computers with touch screen displays, also may have difficulties translating imprecise gestures into desired commands.

Accordingly, there is a need for touch-screen-display electronic devices with more transparent and intuitive user interfaces for translating imprecise user gestures into precise, intended commands that are easy to use, configure, and/or adapt. Such interfaces increase the effectiveness, efficiency and user satisfaction with portable multifunction devices.

SUMMARY

The above deficiencies and other problems associated with user interfaces for portable devices and touch screen devices are reduced or eliminated by the disclosed multifunction device. In some embodiments, the device is portable. In some embodiments, the device has a touch-sensitive display (also known as a "touch screen") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, the functions may include telephoning, video conferencing, e-mailing, instant messaging, blogging, digital photographing, digital videoing, web browsing, digital music playing, and/or digital video playing. Instructions for performing these functions may be included in a computer readable storage medium or other computer program product configured for execution by one or more processors.

In an aspect of the invention, a computer-implemented method for use in conjunction with a computing device with a touch screen display comprises: detecting one or more finger contacts with the touch screen display, applying one or more heuristics to the one or more finger contacts to determine a command for the device, and processing the command. The one or more heuristics comprise: a heuristic for determining that the one or more finger contacts correspond to a one-dimensional vertical screen scrolling command, a heuristic for determining that the one or more finger contacts correspond to a two-dimensional screen translation command, and a heuristic for determining that the one or more finger contacts correspond to a command to transition from displaying a first item in a set of items to displaying a next item in the set of items.

In another aspect of the invention, a computer-implemented method is performed at a computing device with a touch screen display. While displaying a web browser application, one or more first finger contacts with the touch screen display are detected; a first set of heuristics for the web browser application is applied to the one or more first finger contacts to determine a first command for the device; and the first command is processed. The first set of heuristics comprises: a heuristic for determining that the one or more first finger contacts correspond to a one-dimensional vertical screen scrolling command; a heuristic for determining that the one or more first finger contacts correspond to a two-dimensional screen translation command; and a heuristic for determining that the one or more first finger contacts correspond to a one-dimensional horizontal screen scrolling command. While displaying a photo album application, one or more second finger contacts with the touch screen display are detected; a second set of heuristics for the photo album application is applied to the one or more second finger contacts to determine a second command for the device; and the second command is processed. The second set of heuristics comprises: a heuristic for determining that the one or more second finger contacts correspond to a command to transition from displaying a first image in a set of images to displaying a next image in the set of images; and a heuristic for determining that the one or more second finger contacts correspond to a command to transition from displaying the first image in the set of images to displaying a previous image in the set of images.

In another aspect of the invention, a computing device comprises: a touch screen display, one or more processors, memory, and a program. The program is stored in the memory and configured to be executed by the one or more processors. The program includes: instructions for detecting one or more finger contacts with the touch screen display, instructions for applying one or more heuristics to the one or more finger contacts to determine a command for the device, and instructions for processing the command. The one or more heuristics comprise: a heuristic for determining that the one or more finger contacts correspond to a one-dimensional vertical screen scrolling command, a heuristic for determining that the one or more finger contacts correspond to a two-dimensional screen translation command, and a heuristic for determining that the one or more finger contacts correspond to a command to transition from displaying a first item in a set of items to displaying a next item in the set of items.

In another aspect of the invention, a computing device comprises: a touch screen display; one or more processors; memory; and one or more programs. The one or more programs are stored in the memory and configured to be executed by the one or more processors. The one or more programs include: instructions for detecting one or more first finger contacts with the touch screen display while displaying a web browser application; instructions for applying a first set of heuristics for the web browser application to the one or more first finger contacts to determine a first command for the device; instructions for processing the first command; instructions for detecting one or more second finger contacts with the touch screen display while displaying a photo album application; instructions for applying a second set of heuristics for the photo album application to the one or more second finger contacts to determine a second command for the device; and instructions for processing the second command. The first set of heuristics comprises: a heuristic for determining that the one or more first finger contacts correspond to a one-dimensional vertical screen scrolling command; a heuristic for determining that the one or more first finger contacts correspond to a two-dimensional screen translation command; and a heuristic for determining that the one or more first finger contacts correspond to a one-dimensional horizontal screen scrolling command. The second set of heuristics comprises: a heuristic for determining that the one or more second finger contacts correspond to a command to transition from displaying a first image in a set of images to displaying a next image in the set of images; and a heuristic for determining that the one or more second finger contacts correspond to a command to transition from displaying the first image in the set of images to displaying a previous image in the set of images.

In another aspect of the invention, a computer-program product comprises a computer readable storage medium and a computer program mechanism (e.g., one or more computer programs) embedded therein. The computer program mechanism comprises instructions, which when executed by a computing device with a touch screen display, cause the device to: detect one or more finger contacts with the touch screen display, apply one or more heuristics to the one or more finger contacts to determine a command for the device, and process the command. The one or more heuristics comprise: a heuristic for determining that the one or more finger contacts correspond to a one-dimensional vertical screen scrolling command, a heuristic for determining that the one or more finger contacts correspond to a two-dimensional screen translation command, and a heuristic for determining that the one or more finger contacts correspond to a command to transition from displaying a first item in a set of items to displaying a next item in the set of items.

In another aspect of the invention, a computer-program product comprises a computer readable storage medium and a computer program mechanism (e.g., one or more computer programs) embedded therein. The computer program mechanism comprises instructions, which when executed by a computing device with a touch screen display, cause the device to: detect one or more first finger contacts with the touch screen display while displaying a web browser application; apply a first set of heuristics for the web browser application to the one or more first finger contacts to determine a first command for the device; process the first command; detect one or more second finger contacts with the touch screen display while displaying a photo album application; apply a second set of heuristics for the photo album application to the one or more second finger contacts to determine a second command for the device; and process the second command. The first set of heuristics comprises: a heuristic for determining that the one or more first finger contacts correspond to a one-dimensional vertical screen scrolling command; a heuristic for determining that the one or more first finger contacts correspond to a two-dimensional screen translation command; and a heuristic for determining that the one or more first finger contacts correspond to a one-dimensional horizontal screen scrolling command. The second set of heuristics comprises: a heuristic for determining that the one or more second finger contacts correspond to a command to transition from displaying a first image in a set of images to displaying a next image in the set of images; and a heuristic for determining that the one or more second finger contacts correspond to a command to transition from displaying the first image in the set of images to displaying a previous image in the set of images.

In another aspect of the invention, a computing device with a touch screen display comprises: means for detecting one or more finger contacts with the touch screen display, means for applying one or more heuristics to the one or more finger contacts to determine a command for the device, and means for processing the command. The one or more heuristics comprise: a heuristic for determining that the one or more finger contacts correspond to a one-dimensional vertical screen scrolling command, a heuristic for determining that the one or more finger contacts correspond to a two-dimensional screen translation command, and a heuristic for determining that the one or more finger contacts correspond to a command to transition from displaying a first item in a set of items to displaying a next item in the set of items.

In another aspect of the invention, a computing device with a touch screen display comprises: means for detecting one or more first finger contacts with the touch screen display while displaying a web browser application; means for applying a first set of heuristics for the web browser application to the one or more first finger contacts to determine a first command for the device; means for processing the first command; means for detecting one or more second finger contacts with the touch screen display while displaying a photo album application; means for applying a second set of heuristics for the photo album application to the one or more second finger contacts to determine a second command for the device; and means for processing the second command. The first set of heuristics comprises: a heuristic for determining that the one or more first finger contacts correspond to a one-dimensional vertical screen scrolling command; a heuristic for determining that the one or more first finger contacts correspond to a two-dimensional screen translation command; and a heuristic for determining that the one or more first finger contacts correspond to a one-dimensional horizontal screen scrolling command. The second set of heuristics comprises: a heuristic for determining that the one or more second finger contacts correspond to a command to transition from displaying a first image in a set of images to displaying a next image in the set of images; and a heuristic for determining that the one or more second finger contacts correspond to a command to transition from displaying the first image in the set of images to displaying a previous image in the set of images.

The disclosed heuristics allow electronic devices with touch screen displays to behave in a manner desired by the user despite inaccurate input by the user.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 56A-56L illustrate exemplary methods for determining a cursor position on a touch screen display in accordance with some embodiments.

DESCRIPTION OF EMBODIMENTS

Figure 1A:
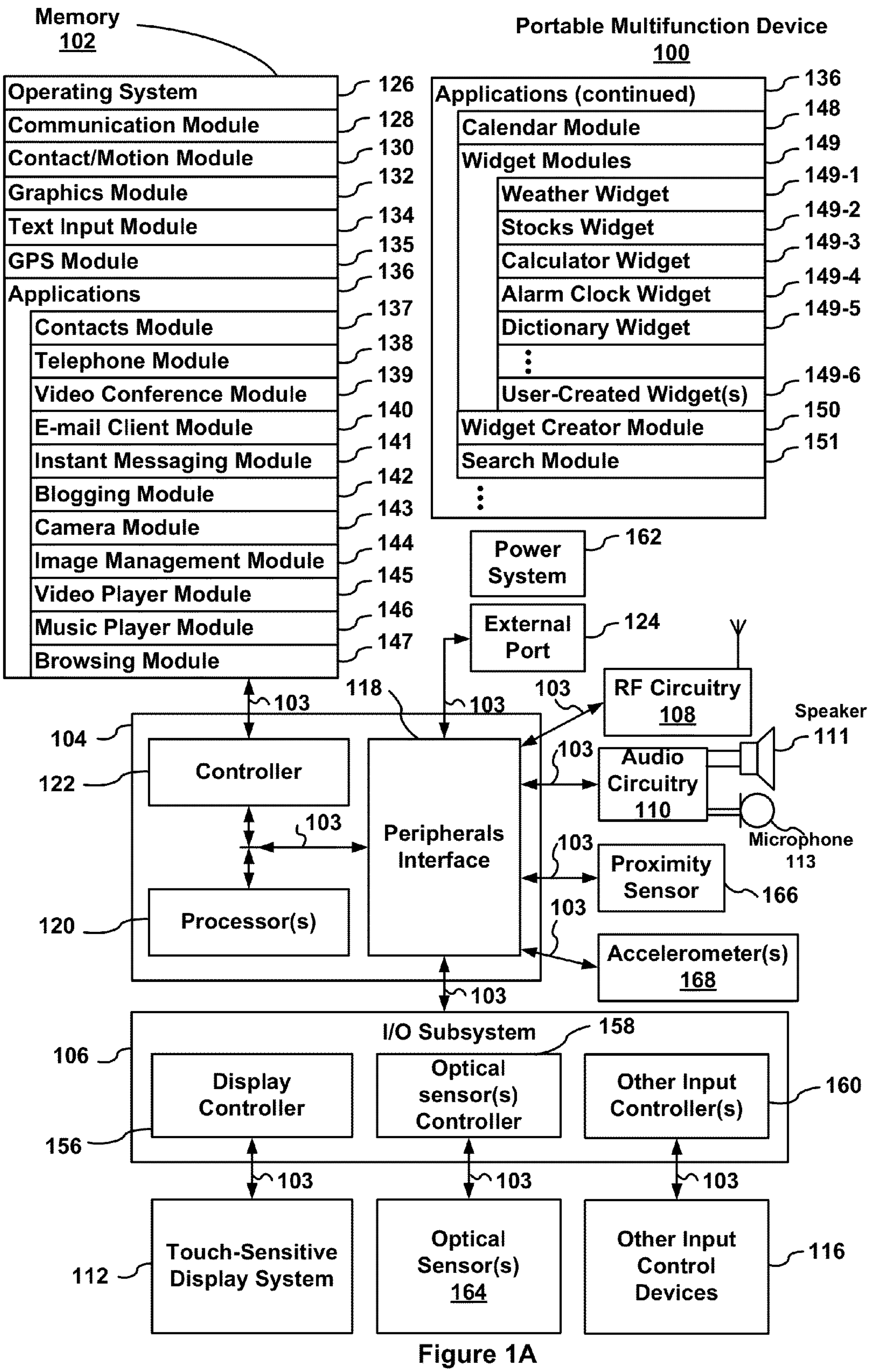
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting

[the stated condition or event]" or "in response to detecting [the stated condition or event]," depending on the context.

Embodiments of a portable multifunction device, user interfaces for such devices, and associated processes for using such devices are described. In some embodiments, the device is a portable communications device such as a mobile telephone that also contains other functions, such as PDA and/or music player functions.

The user interface may include a physical click wheel in addition to a touch screen or a virtual click wheel displayed on the touch screen. A click wheel is a user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. Alternatively, breaking contact with a click wheel image on a touch screen surface may indicate a user command corresponding to selection. For simplicity, in the discussion that follows, a portable multifunction device that includes a touch screen is used as an exemplary embodiment. It should be understood, however, that some of the user interfaces and associated processes may be applied to other devices, such as personal computers and laptop computers, which may include one or more other physical user-interface devices, such as a physical click wheel, a physical keyboard, a mouse and/or a joystick.

The device supports a variety of applications, such as one or more of the following: a telephone application, a video conferencing application, an e-mail application, an instant messaging application, a blogging application, a photo management application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
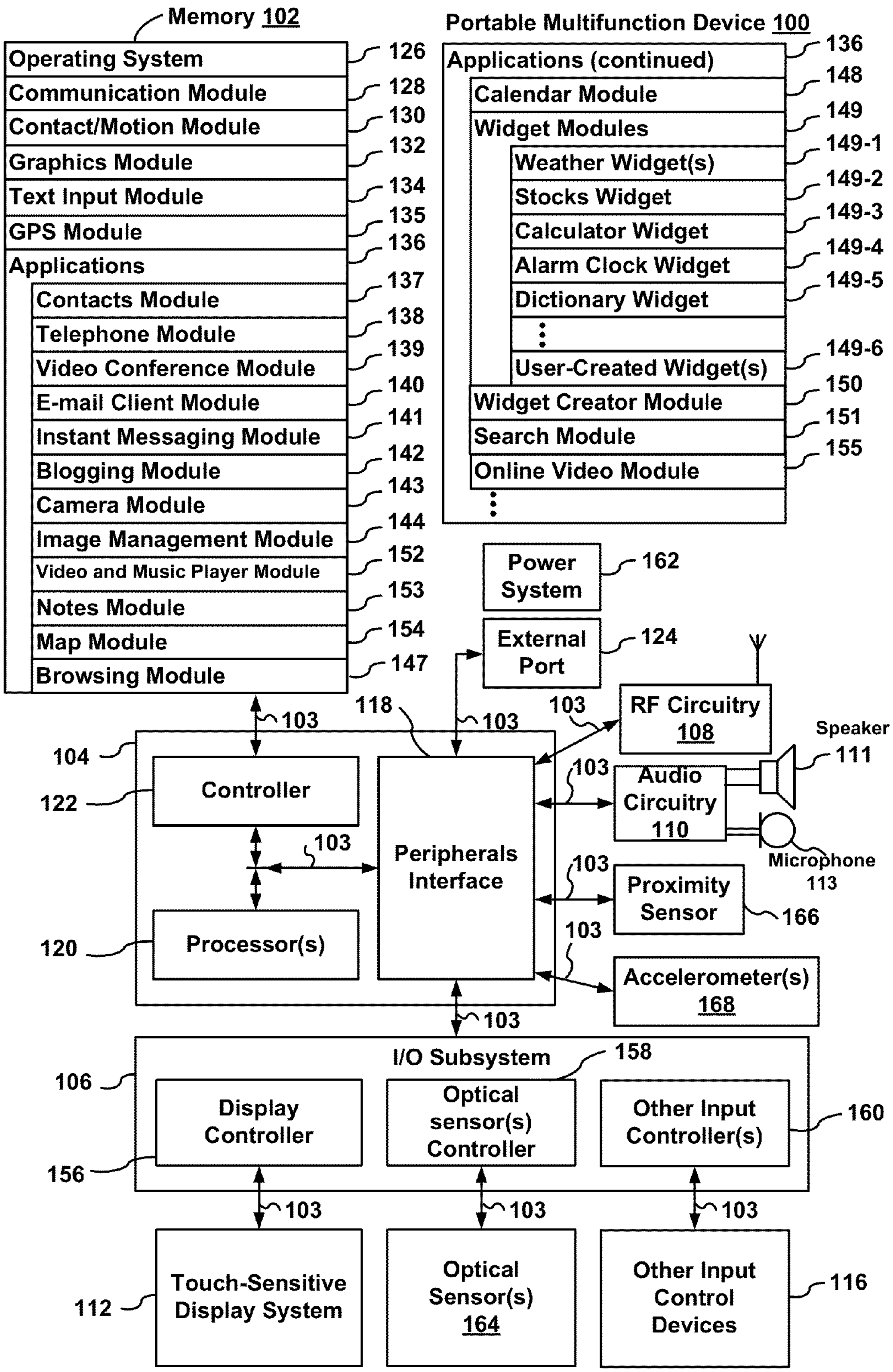

Attention is now directed towards embodiments of the device. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112.

A touch-sensitive display in some embodiments of the touch screen 112 may be analogous to the multi-touch sensitive tablets described in the following U.S. patents: U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference. However, a touch screen 112 displays visual output from the portable device 100, whereas touch sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated herein by reference. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:

- a contacts module 137 (sometimes called an address book or contact list);
- a telephone module 138;
- a video conferencing module 139;
- an e-mail client module 140;
- an instant messaging (IM) module 141;
- a blogging module 142;
- a camera module 143 for still and/or video images;
- an image management module 144;
- a video player module 145;
- a music player module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153; and/or
- map module 154; and/or
- online video module 155.

Examples of other applications 136 that may be stored in memory 102 include other word processing applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth. Embodiments of user interfaces and associated processes using contacts module 137 are described further below.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies. Embodiments of user interfaces and associated processes using telephone module 138 are described further below.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants. Embodiments of user interfaces and associated processes using videoconferencing module 139 are described further below.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143. Embodiments of user interfaces and associated processes using e-mail module 140 are described further below.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS). Embodiments of user interfaces and associated processes using instant messaging module 141 are described further below.

In conjunction with RF circuitry 108, touch screen 112, display controller 156, contact module 130, graphics module 132, text input module 134, image management module 144, and browsing module 147, the blogging module 142 may be used to send text, still images, video, and/or other graphics to a blog (e.g., the user's blog). Embodiments of user interfaces and associated processes using blogging module 142 are described further below.

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102. Embodiments of user interfaces and associated processes using camera module 143 are described further below.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images. Embodiments of user interfaces and associated processes using image management module 144 are described further below.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124). Embodiments of user interfaces and associated processes using video player module 145 are described further below.

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.). Embodiments of user interfaces and associated processes using music player module 146 are described further below.

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages. Embodiments of user interfaces and associated processes using browser module 147 are described further below.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.). Embodiments of user interfaces and associated processes using calendar module 148 are described further below.

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets). Embodiments of user interfaces and associated processes using widget modules 149 are described further below.

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget). Embodiments of user interfaces and associated processes using widget creator module 150 are described further below.

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms). Embodiments of user interfaces and associated processes using search module 151 are described further below.

In conjunction with touch screen 112, display controller 156, contact module 130, graphics module 132, and text input module 134, the notes module 153 may be used to create and manage notes, to do lists, and the like. Embodiments of user interfaces and associated processes using notes module 153 are described further below.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data). Embodiments of user interfaces and associated processes using map module 154 are described further below.

In conjunction with touch screen 112, display system controller 156, contact module 130, graphics module 132, audio circuitry 110, speaker 111, RF circuitry 108, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, the content of which is hereby incorporated by reference.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise rearranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
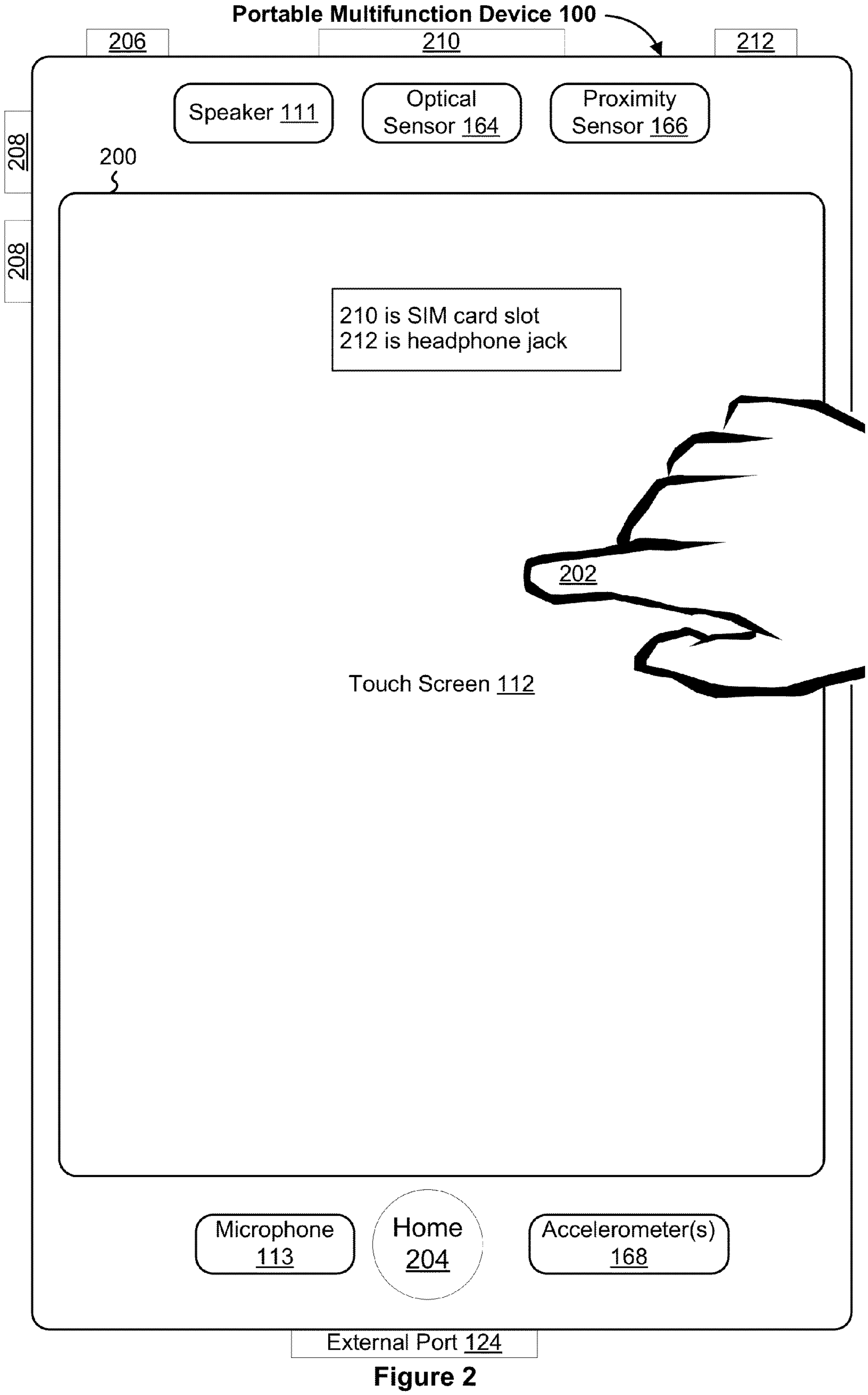
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("UI") and associated processes that may be implemented on a portable multifunction device 100.

Figure 3A:
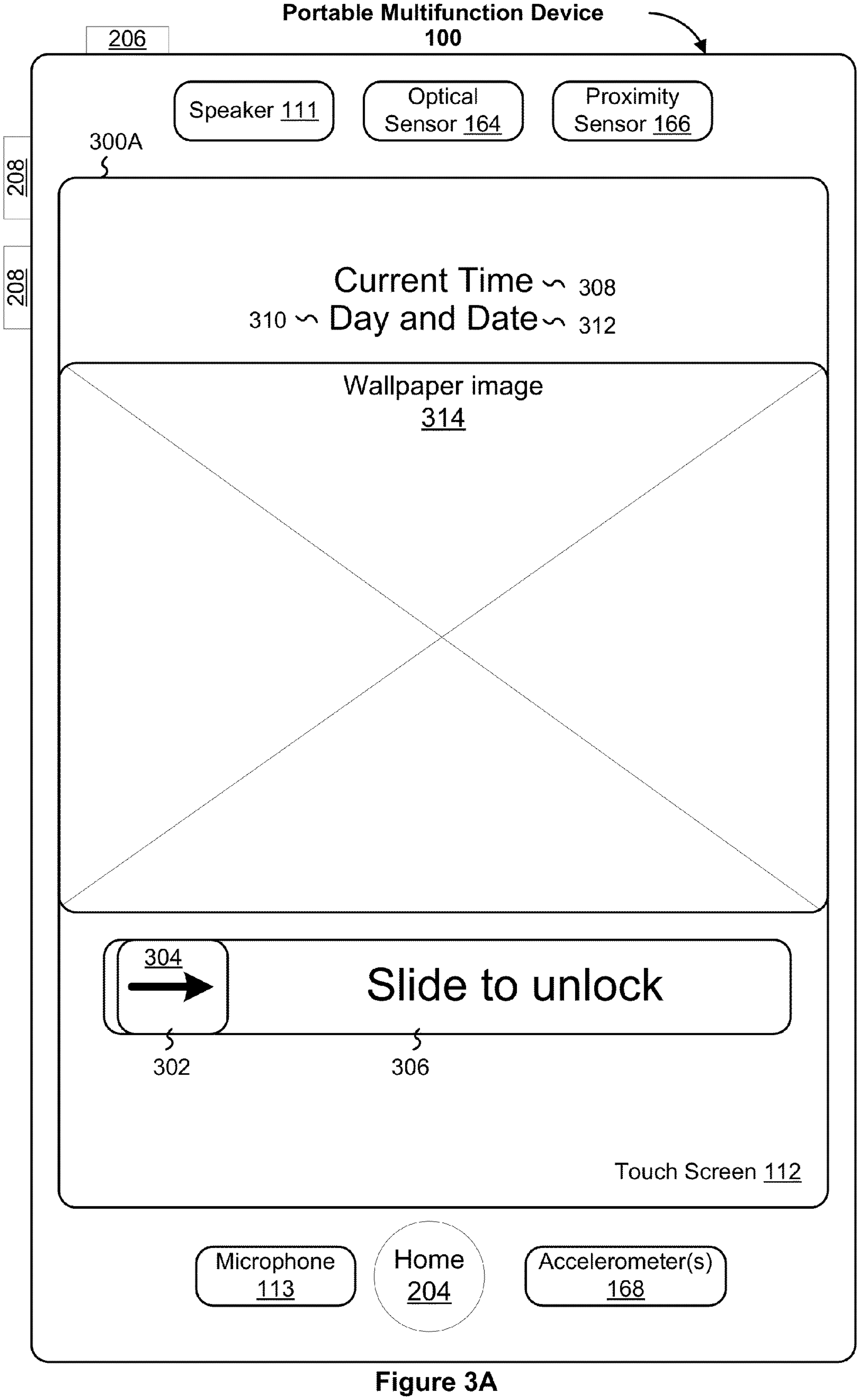
FIGS. 3A-3C illustrate exemplary user interfaces for unlocking a portable electronic device in accordance with some embodiments.
Figure 3B:
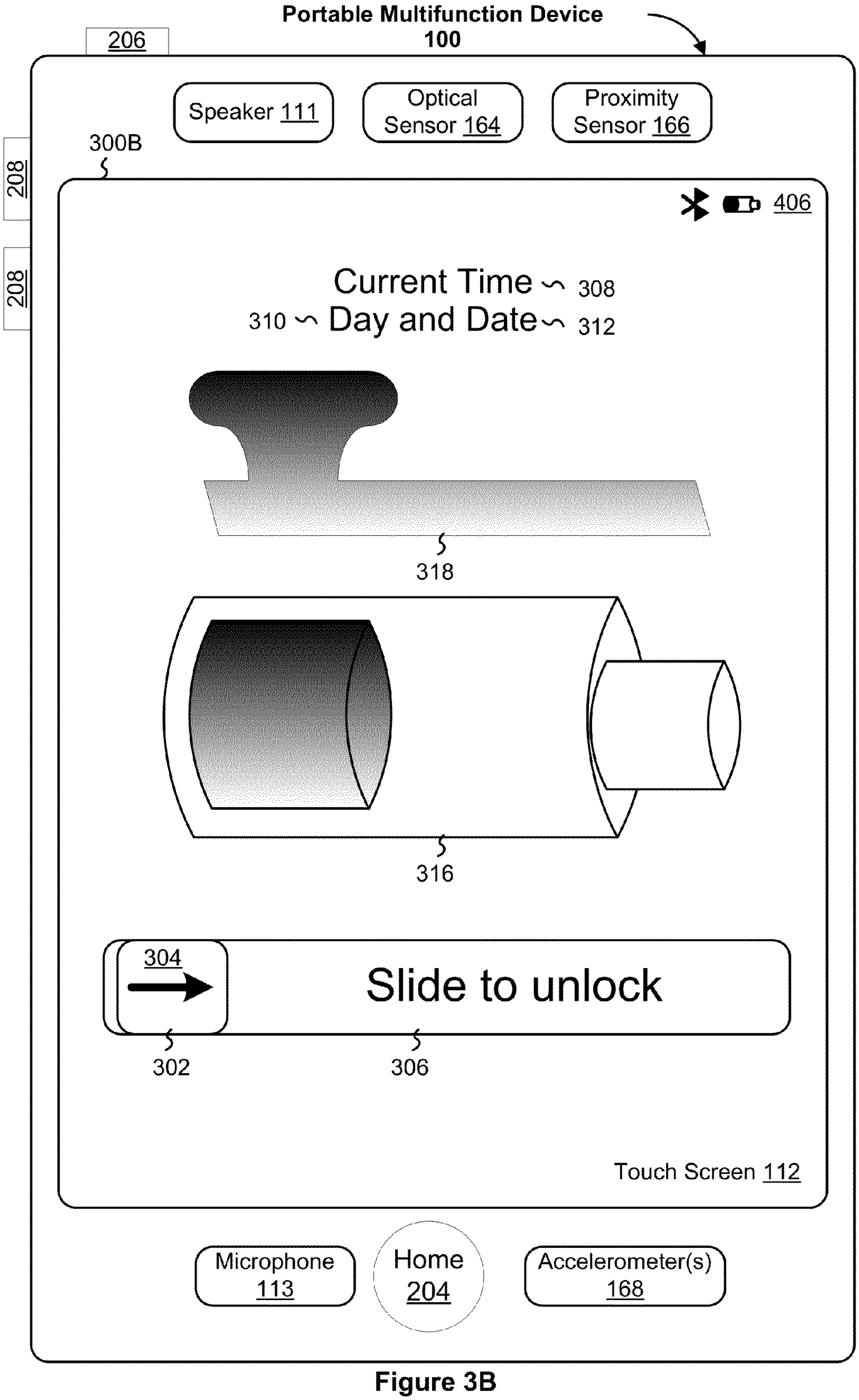
Figure 3C:
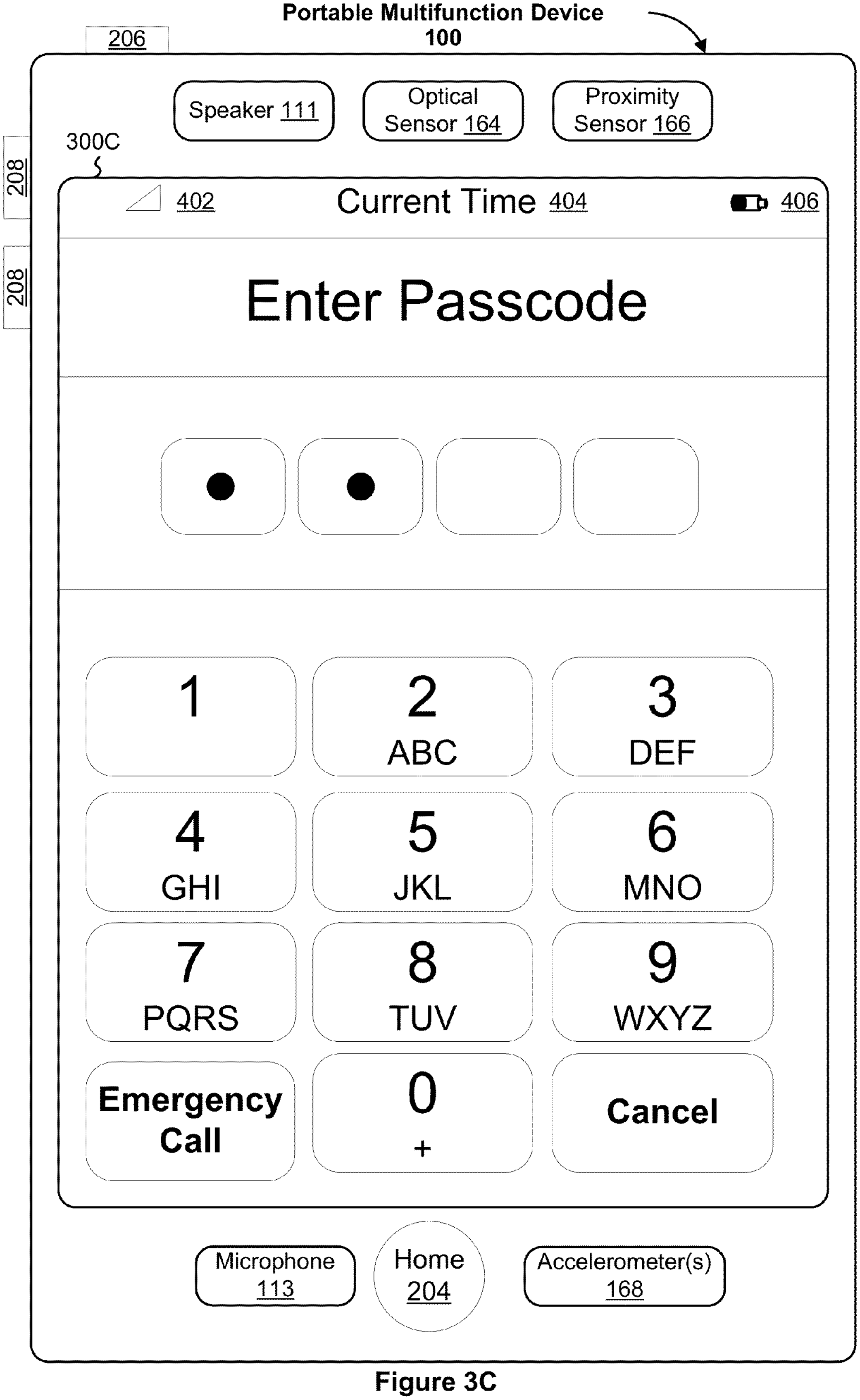

FIGS. 3A-3C illustrate exemplary user interfaces for unlocking a portable electronic device in accordance with some embodiments. In some embodiments, user interface 300A includes the following elements, or a subset or superset thereof:

- Unlock image 302 that is moved with a finger gesture to unlock the device;
- Arrow 304 that provides a visual cue to the unlock gesture;
- Channel 306 that provides additional cues to the unlock gesture;
- Time 308;
- Day 310;
- Date 312; and
- Wallpaper image 314.

In some embodiments, in addition to or in place of wallpaper image 314, an unlock user interface may include a device charging status icon 316 and a headset charging status icon 318 (e.g., UI 300B, FIG. 3B). The device charging status icon 316 indicates the battery status while the device 100 is being recharged (e.g., in a dock). Similarly, headset charging status icon 318 indicates the battery status of a headset associated with device 100 (e.g., a Bluetooth headset) while the headset is being recharged (e.g., in another portion of the dock).

In some embodiments, the device detects contact with the touch-sensitive display (e.g., a user's finger making contact on or near the unlock image 302) while the device is in a user-interface lock state. The device moves the unlock image 302 in accordance with the contact. The device transitions to a user-interface unlock state if the detected contact corresponds to a predefined gesture, such as moving the unlock image across channel 306. Conversely, the device maintains the user-interface lock state if the detected contact does not correspond to the predefined gesture. This process saves battery power by ensuring that the device is not accidentally awakened. This process is easy for users to perform, in part because of the visual cue(s) provided on the touch screen.

In some embodiments, after detecting an unlock gesture, the device displays a passcode (or password) interface (e.g., UI 300C, FIG. 3C) for entering a passcode to complete the unlock process. The addition of a passcode protects against unauthorized use of the device. In some embodiments, the passcode interface includes an emergency call icon that permits an emergency call (e.g., to 911) without entering the passcode. In some embodiments, the use of a passcode is a user-selectable option (e.g., part of settings 412).

As noted above, processes that use gestures on the touch screen to unlock the device are described in U.S. patent application Ser. No. 11/322,549, "Unlocking A Device By Performing Gestures On An Unlock Image," filed Dec. 23, 2005, and Ser. No. 11/322,550, "Indication Of Progress Towards Satisfaction Of A User Input Condition," filed Dec. 23, 2005, which are hereby incorporated by reference.

Figure 4A:
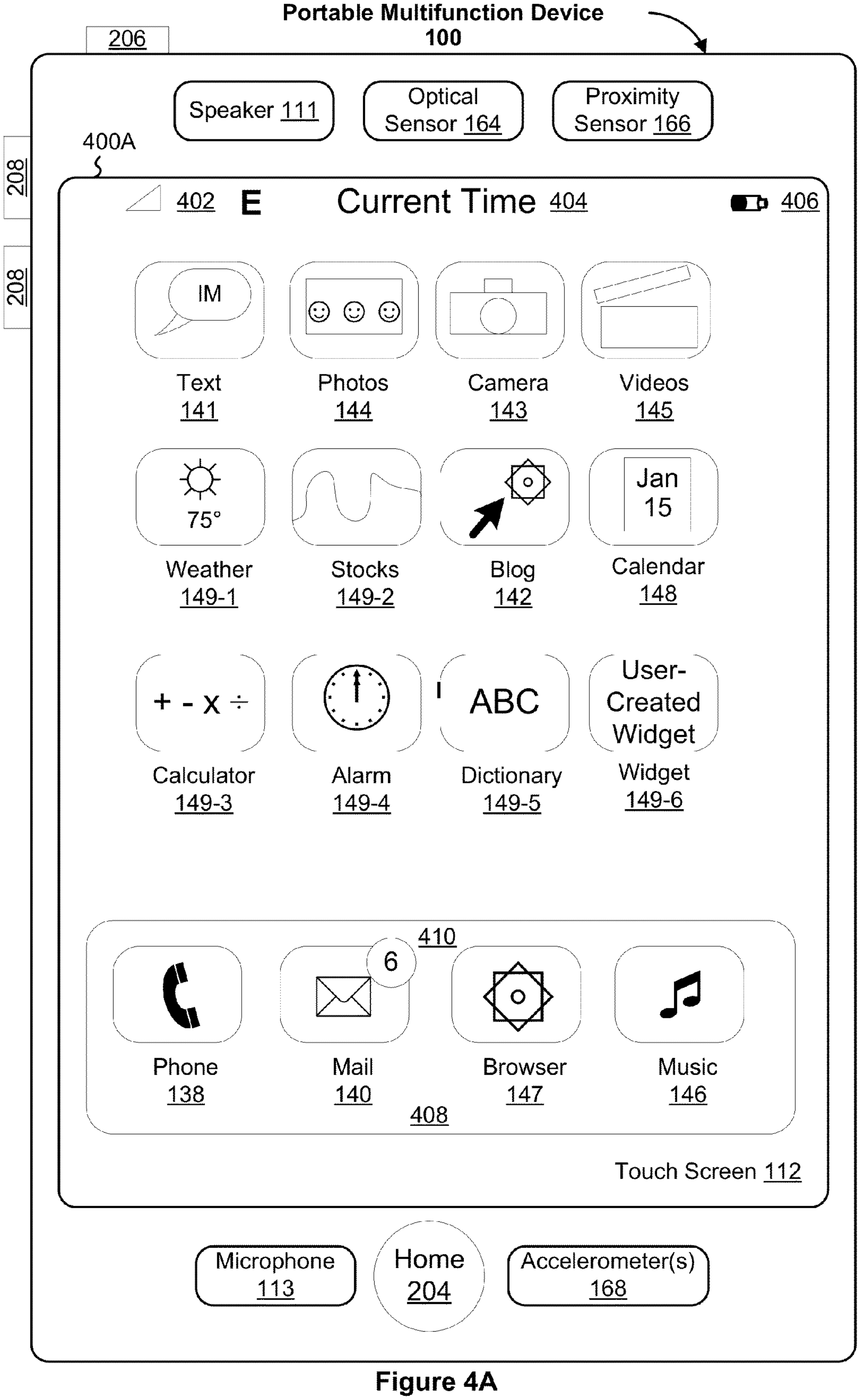
FIGS. 4A and 4B illustrate exemplary user interfaces for a menu of applications on a portable multifunction device in accordance with some embodiments.
Figure 4B:
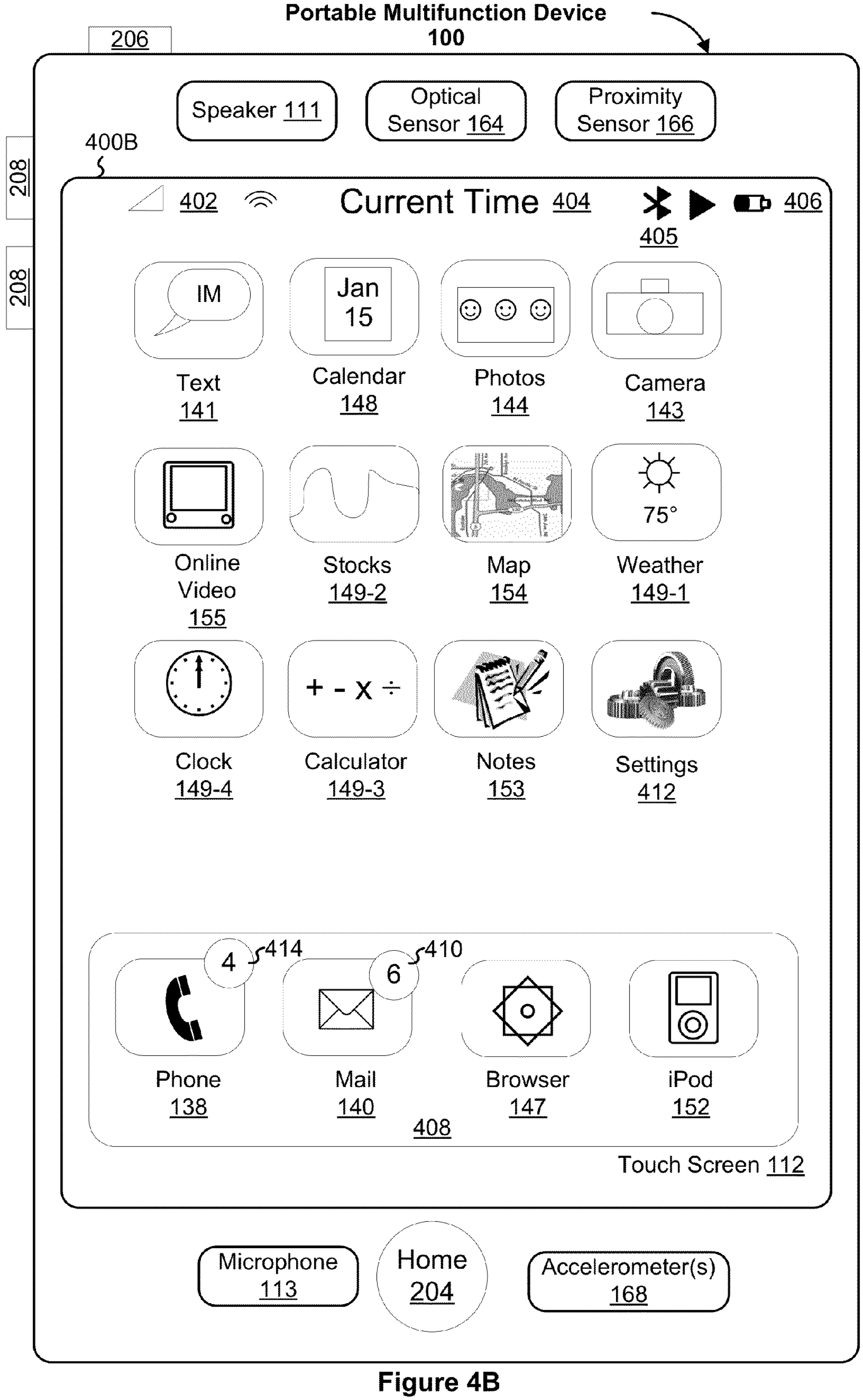

FIGS. 4A and 4B illustrate exemplary user interfaces for a menu of applications on a portable multifunction device in accordance with some embodiments. In some embodiments, user interface 400A includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Phone 138, which may include an indicator 414 of the number of missed calls or voicemail messages;

- E-mail client 140, which may include an indicator 410 of the number of unread e-mails;
- Browser 147; and
- Music player 146; and Icons for other applications, such as:

- IM 141;
- Image management 144;
- Camera 143;
- Video player 145;
- Weather 149-1;
- Stocks 149-2;
- Blog 142;
- Calendar 148;
- Calculator 149-3;
- Alarm clock 149-4;
- Dictionary 149-5; and
- User-created widget 149-6.

In some embodiments, user interface 400B includes the following elements, or a subset or superset thereof:

- 402, 404, 406, 141, 148, 144, 143, 149-3, 149-2, 149-1, 149-4, 410, 414, 138, 140, and 147, as described above;
- Map 154;
- Notes 153;
- Settings 412, which provides access to settings for the device 100 and its various applications 136, as described further below;
- Video and music player module 152, also referred to as iPod (trademark of Apple Computer, Inc.) module 152; and
- Online video module 155, also referred to as YouTube (trademark of Google, Inc.) module 155.

In some embodiments, UI 400A or 400B displays all of the available applications 136 on one screen so that there is no need to scroll through a list of applications (e.g., via a scroll bar). In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other finger gesture on the icon corresponding to the application). In some embodiments, a predefined gesture on the menu button 204 (e.g., a double tap or a double click) acts as a short cut that initiates display of a particular user interface in a particular application. In some embodiments, the short cut is a user-selectable option (e.g., part of settings 412). For example, if the user makes frequent calls to persons listed in a Favorites UI (e.g., UI 2700A, FIG. 27A) in the phone 138, the user may choose to have the Favorites UI be displayed in response to a double click on the menu button. As another example, the user may choose to have a UI with information about the currently playing music (e.g., UI 4300S, FIG. 43S) be displayed in response to a double click on the menu button.

In some embodiments, UI 400A or 400B provides integrated access to both widget-based applications and non-widget-based applications. In some embodiments, all of the widgets, whether user-created or not, are displayed in UI 400A or 400B. In other embodiments, activating the icon for user-created widget 149-6 may lead to another UI that contains the user-created widgets or icons corresponding to the user-created widgets.

In some embodiments, a user may rearrange the icons in UI 400A or 400B, e.g., using processes described in U.S. patent application Ser. No. 11/459,602, "Portable Electronic Device With Interface Reconfiguration Mode," filed Jul. 24, 2006, which is hereby incorporated by reference. For example, a user may move application icons in and out of tray 408 using finger gestures.

In some embodiments, UI 400A or 400B includes a gauge (not shown) that displays an updated account usage metric for an account associated with usage of the device (e.g., a cellular phone account), as described in U.S. patent application Ser. No. 11/322,552, "Account Information Display For Portable Communication Device," filed Dec. 23, 2005, which is hereby incorporated by reference.

In some embodiments, a signal strength indicator 402 (FIG. 4B) for a WiFi network is replaced by a symbol for a cellular network (e.g., the letter "E" for an EDGE network, FIG. 4A) when the device switches from using the WiFi network to using the cellular network for data transmission (e.g., because the WiFi signal is weak or unavailable).

Instant Messaging

Figure 5:
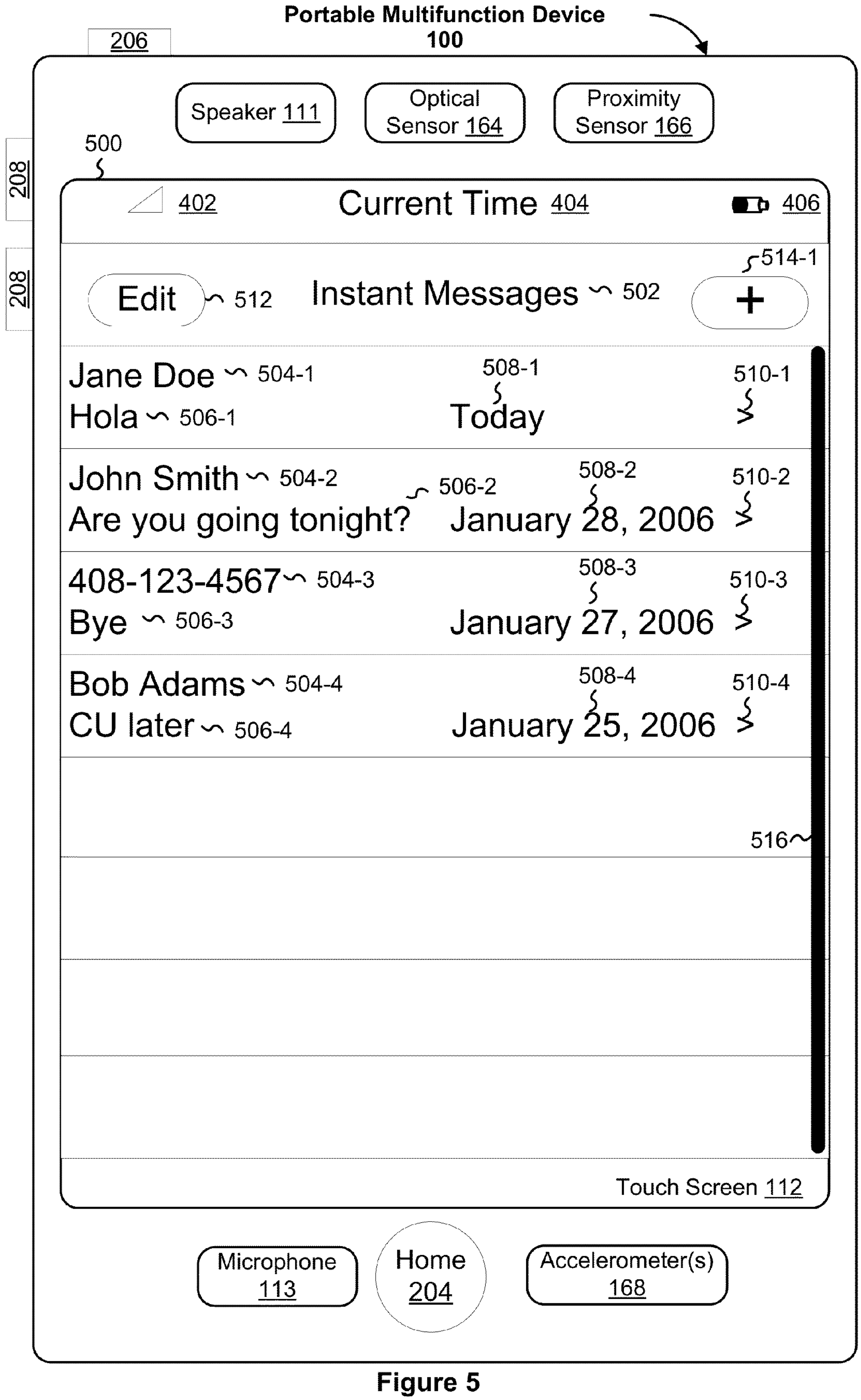
FIG. 5 illustrates an exemplary user interface for listing instant message conversations on a portable multifunction device in accordance with some embodiments.
Figure 6A:
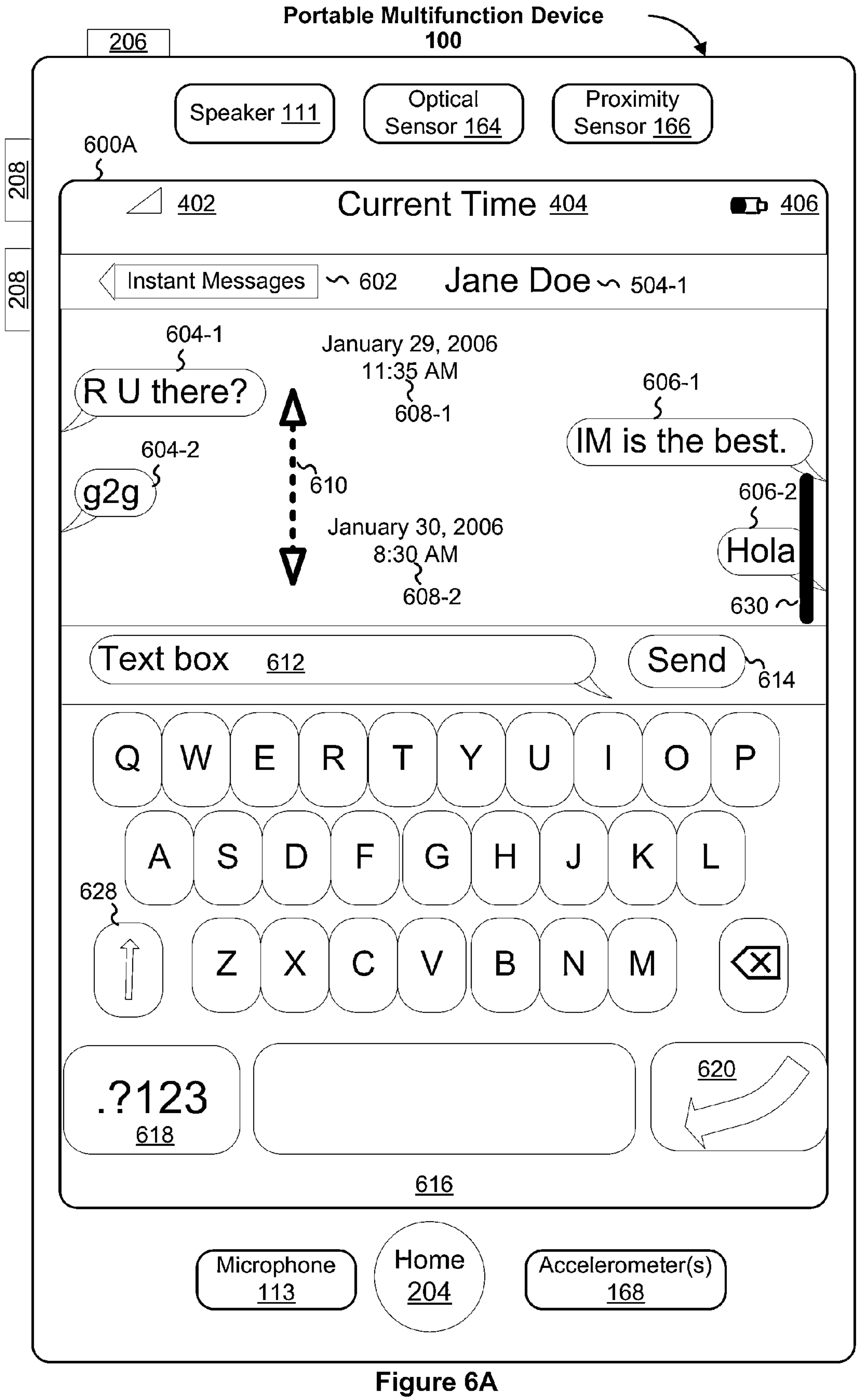
FIGS. 6A-6K illustrate an exemplary user interface for inputting text for an instant message in accordance with some embodiments.
Figure 6B:
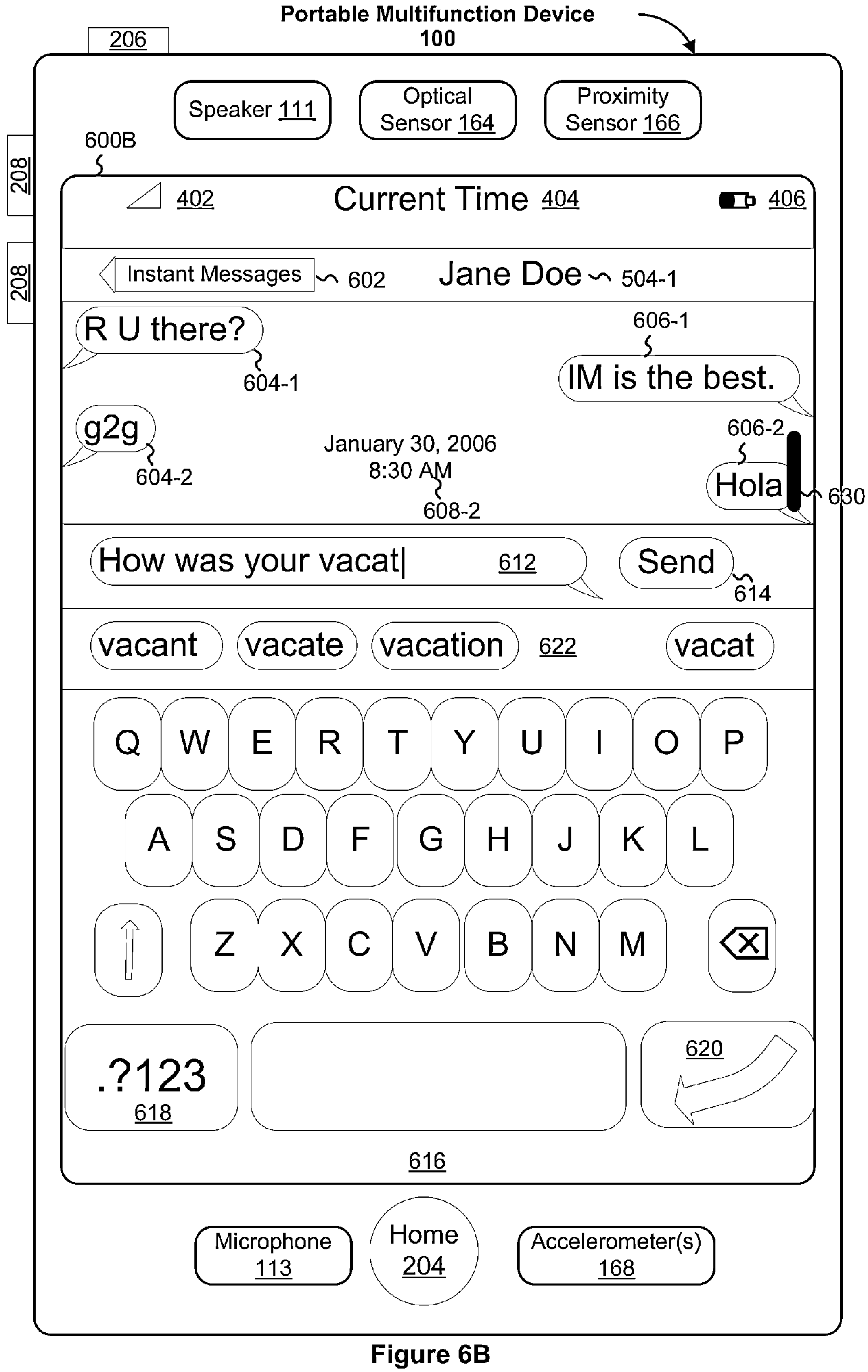

FIG. 5 illustrates an exemplary user interface for listing instant message conversations on a portable multifunction device in accordance with some embodiments. In some embodiments, user interface 500 includes the following elements, or a subset or superset thereof:

- 402, 404, and 406, as described above;
- "Instant Messages" or other similar label 502:
- Names 504 of the people a user is having instant message conversations with (e.g., Jane Doe 504-1) or the phone number if the person's name is not available (e.g., 408-123-4567 504-3);
- Text 506 of the last message in the conversation;
- Date 508 and/or time of the last message in the conversation;
- Selection icon 510 that when activated (e.g., by a finger tap on the icon) initiates transition to a UI for the corresponding conversation (e.g., FIG. 6A for Jane Doe 504-1);
- Edit icon 512 that when activated (e.g., by a finger tap on the icon) initiates transition to a UI for deleting conversations (e.g., FIG. 7);
- Create message icon 514 that when activated (e.g., by a finger tap on the icon) initiates transition to the users contact list (e.g., FIG. 8A); and
- Vertical bar 516 that helps a user understand what portion of the list of instant message conversations is being displayed.

In some embodiments, the name 504 used for an instant message conversation is determined by finding an entry in the user's contact list 137 that contains the phone number used for the instant message conversation. If no such entry is found, then just the phone number is displayed (e.g., 504-3). In some embodiments, if the other party sends messages from two or more different phone numbers, the messages may appear as a single conversation under a single name if all of the phone numbers used are found in the same entry (i.e., the entry for the other party) in the user's contact list 137.

Automatically grouping the instant messages into "conversations" (instant message exchanges with the same user or the same phone number) makes it easier for the user to carry on and keep track of instant message exchanges with multiple parties.

In some embodiments, vertical bar 516 is displayed temporarily after an object is detected on or near the touch screen display (e.g., a finger touch is detected anywhere on the list of instant message conversations). In some embodiments, the vertical bar 516 has a vertical position on top of the displayed portion of the list that corresponds to the vertical position in the list of the displayed portion of the list. In some embodiments, the vertical bar 516 has a vertical length that corresponds to the portion of the list being displayed. In some embodiments, if the entire list of IM conversations can be displayed simultaneously on the touch screen 112, the vertical bar 516 is not displayed. In some embodiments, if the entire list of IM conversations can be displayed simultaneously on the touch screen 112, the vertical bar 516 is displayed with a length that corresponds to the length of the list display area (e.g., as shown in FIG. 5).

FIGS. 6A-6K illustrate an exemplary user interface for inputting text for an instant message in accordance with some embodiments.

In some embodiments, user interface 600A includes the following elements, or a subset or superset thereof:

- 402, 404, and 406, as described above;
- Name 504 corresponding to the phone number used in the instant message conversation (or the phone number itself if the name is not available);
- Instant messages icon 602 that when activated (e.g., by a finger tap on the icon) initiates transition to a UI listing instant message conversations (e.g., UI 500);
- Instant messages 604 from the other party, typically listed in order along one side of UI 600A;
- Instant messages 606 to the other party, typically listed in order along the opposite side of UI 600A to show the back and forth interplay of messages in the conversation;
- Timestamps 608 for at least some of the instant messages;
- Text entry box 612;
- Send icon 614 that when activated (e.g., by a finger tap on the icon) initiates sending of the message in text box 612 to the other party (e.g., Jane Doe 504-1);
- Letter keyboard 616 for entering text in box 612;
- Alternate keyboard selector icon 618 that when activated (e.g., by a finger tap on the icon) initiates the display of a different keyboard (e.g., 624, FIG. 6C);
- Send icon 620 that when activated (e.g., by a finger tap on the icon) initiates sending of the message in text box 612 to the other party (e.g., Jane Doe 504-1);
- Shift key 628 that when activated (e.g., by a finger tap on the icon) capitalizes the next letter chosen on letter keyboard 616; and
- Vertical bar 630 that helps a user understand what portion of the list of instant messages in an IM conversation is being displayed.

In some embodiments, a user can scroll through the message conversation (comprised of messages 604 and 606) by applying a vertical swipe gesture 610 to the area displaying the conversation. In some embodiments, a vertically downward gesture scrolls the conversation downward, thereby showing older messages in the conversation. In some embodiments, a vertically upward gesture scrolls the conversation upward, thereby showing newer, more recent messages in the conversation. In some embodiments, as noted above, the last message in the conversation (e.g., 606-2) is displayed in the list of instant messages 500 (e.g., 506-1).

In some embodiments, keys in keyboards 616 (FIGS. 6A, 6B, 6E-6K), 624 (FIG. 6C), and/or 639 (FIG. 6D) briefly change shade and/or color when touched/activated by a user to help the user learn to activate the desired keys.

In some embodiments, vertical bar 630 is displayed temporarily after an object is detected on or near the touch screen display (e.g., a finger touch is detected anywhere on the list of instant messages). In some embodiments, the vertical bar 630 has a vertical position on top of the displayed portion of the list that corresponds to the vertical position in the list of the displayed portion of the list. In some embodiments, the vertical bar 630 has a vertical length that corresponds to the portion of the list being displayed. For example, in FIG. 6A, the vertical position of the vertical bar 630 indicates that the bottom of the list of messages is being displayed (which correspond to the most recent messages) and the vertical length of the vertical bar 630 indicates that roughly half of the messages in the conversation are being displayed.

In some embodiments, user interface 600B includes the following elements, or a subset or superset thereof:

- 402, 404, 406, 504, 602, 604, 606, 608, 612, 614, 616, 618, 620, and 630 as described above; and
- word suggestion area 622 that provides a list of possible words to complete the word fragment being typed by the user in box 612.

In some embodiments, the word suggestion area does not appear in UI 600B until after a predefined time delay (e.g., 2-3 seconds) in text being entered by the user. In some embodiments, the word suggestion area is not used or can be turned off by the user.

Figure 6C:
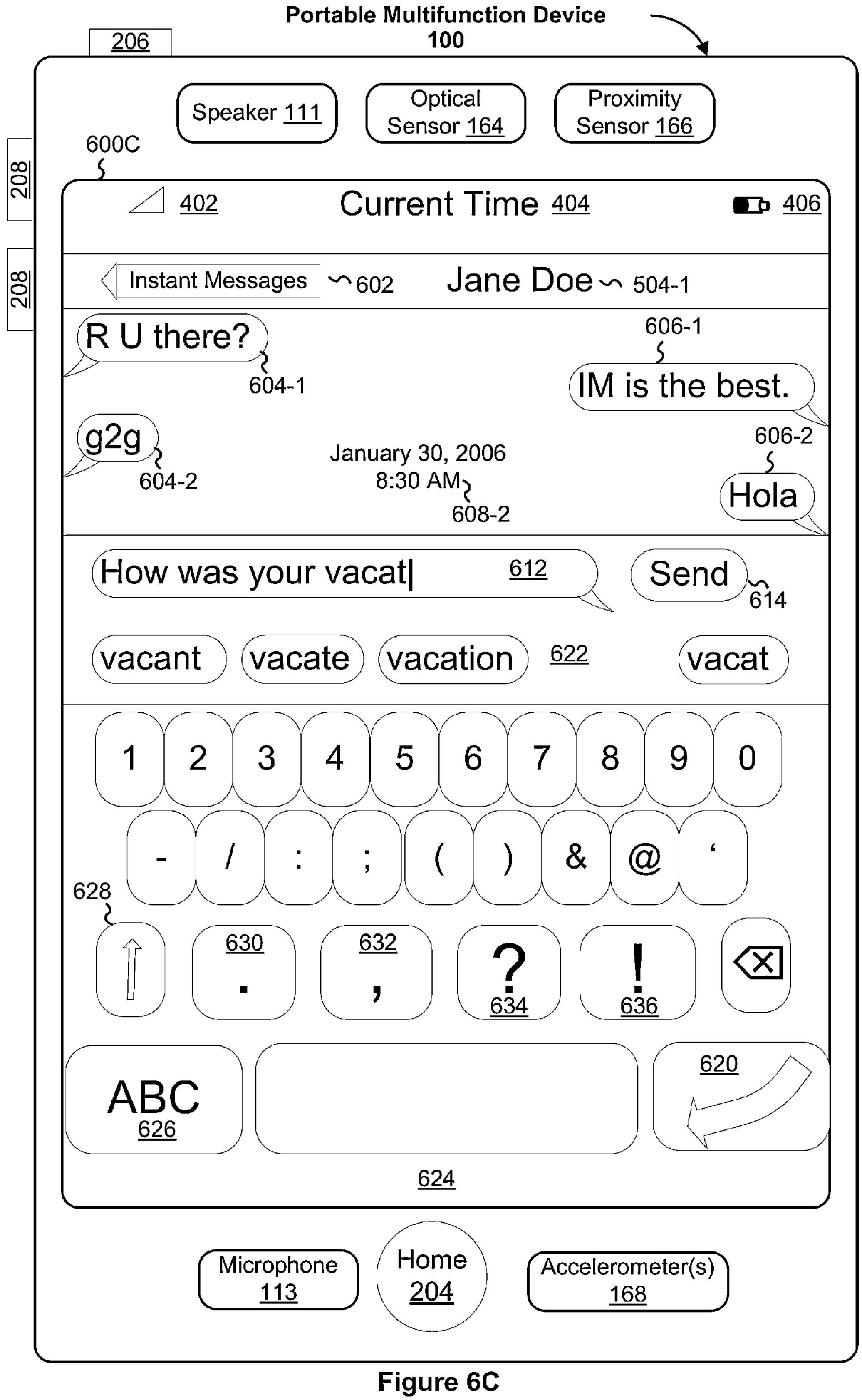
Figure 6D:
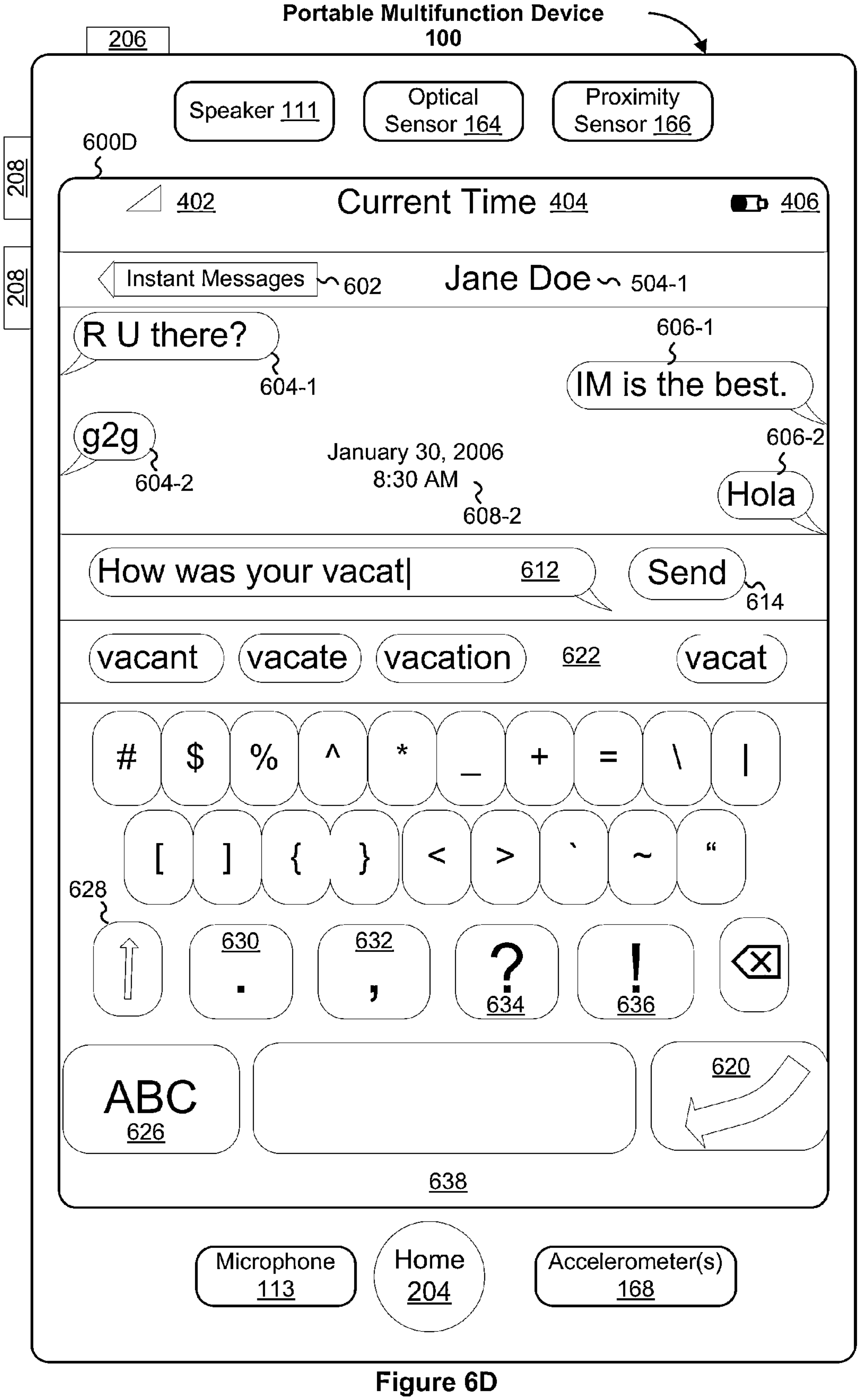

In some embodiments, user interface 600C includes the following elements, or a subset or superset thereof:

- 402, 404, 406, 602, 604, 606, 608, 612, 614, 620, and 622 as described above;
- Alternate keyboard 624, which may be made up primarily of digits and punctuation, with frequently used punctuation keys (e.g., period key 631, comma key 633, question mark key 635, and exclamation point key 637) made larger than the other keys;
- Letter keyboard selector icon 626 that when activated (e.g., by a finger tap on the icon) initiates the display of a letter keyboard (e.g., 616, FIG. 6A); and
- Shift key 628 that when activated (e.g., by a finger tap on the icon) initiates display of yet another keyboard (e.g., 639, FIG. 6D).

In some embodiments, keeping the period key 631 near keyboard selector icon 626 reduces the distance that a user's finger needs to travel to enter the oft-used period.

In some embodiments, user interface 600D includes the following elements, or a subset or superset thereof:

- 402, 404, 406, 504, 602, 604, 606, 608, 612, 614, 620, 622, 626, 628 as described above; and
- Another alternate keyboard 639, which may be made up primarily of symbols and punctuation, with frequently used punctuation keys (e.g., period key 631, comma key 633, question mark key 635, and exclamation point key 637) made larger than the other keys.

In some embodiments, user interface 600E includes the following elements, or a subset or superset thereof:

- 402, 404, 406, 504, 602, 604, 606, 608, 612, 614, 616, 618, and 620, as described above; and
- New instant message 606-3 sent to the other party.

Figure 6E:
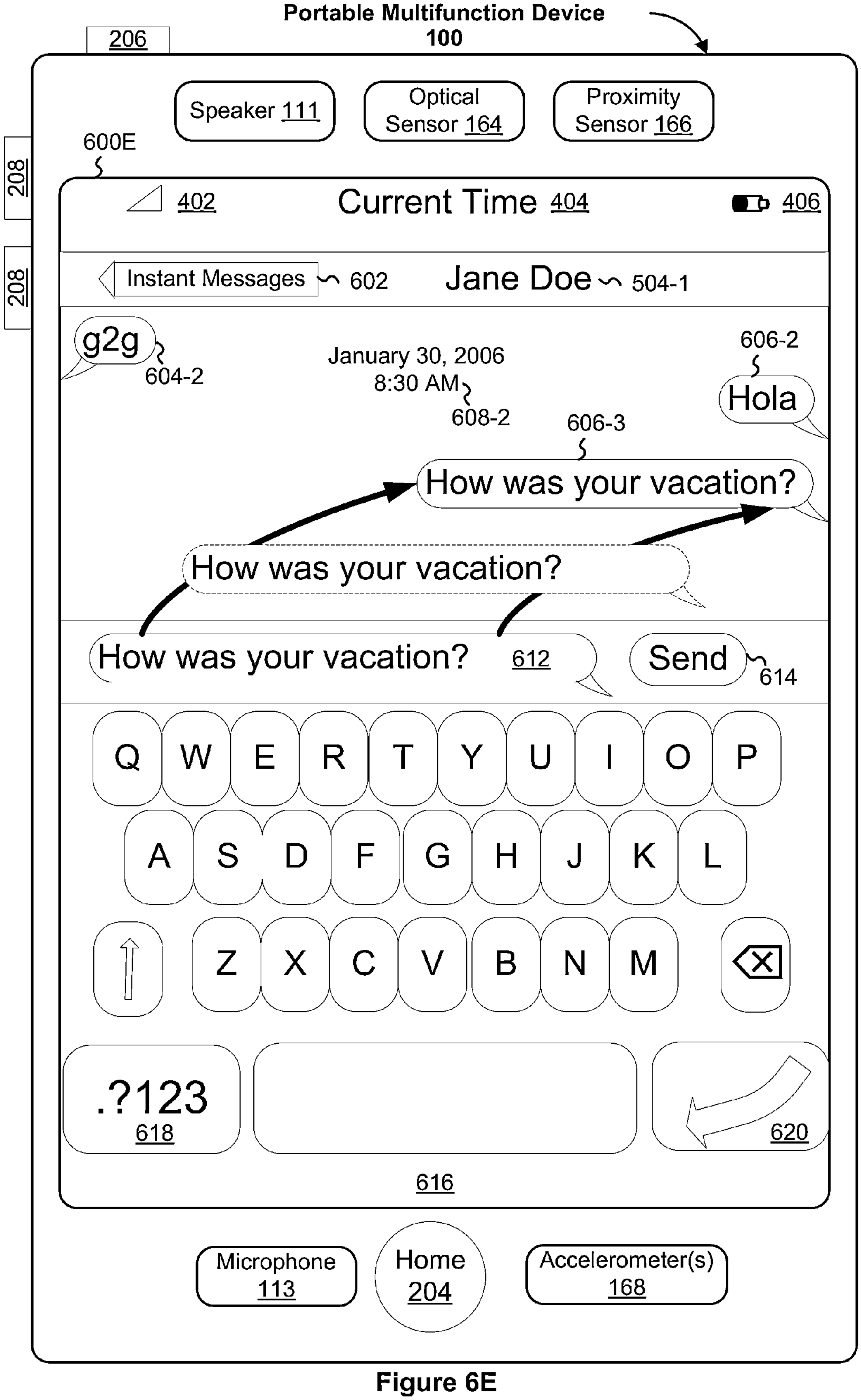
Figure 6F:
Figure 6G:
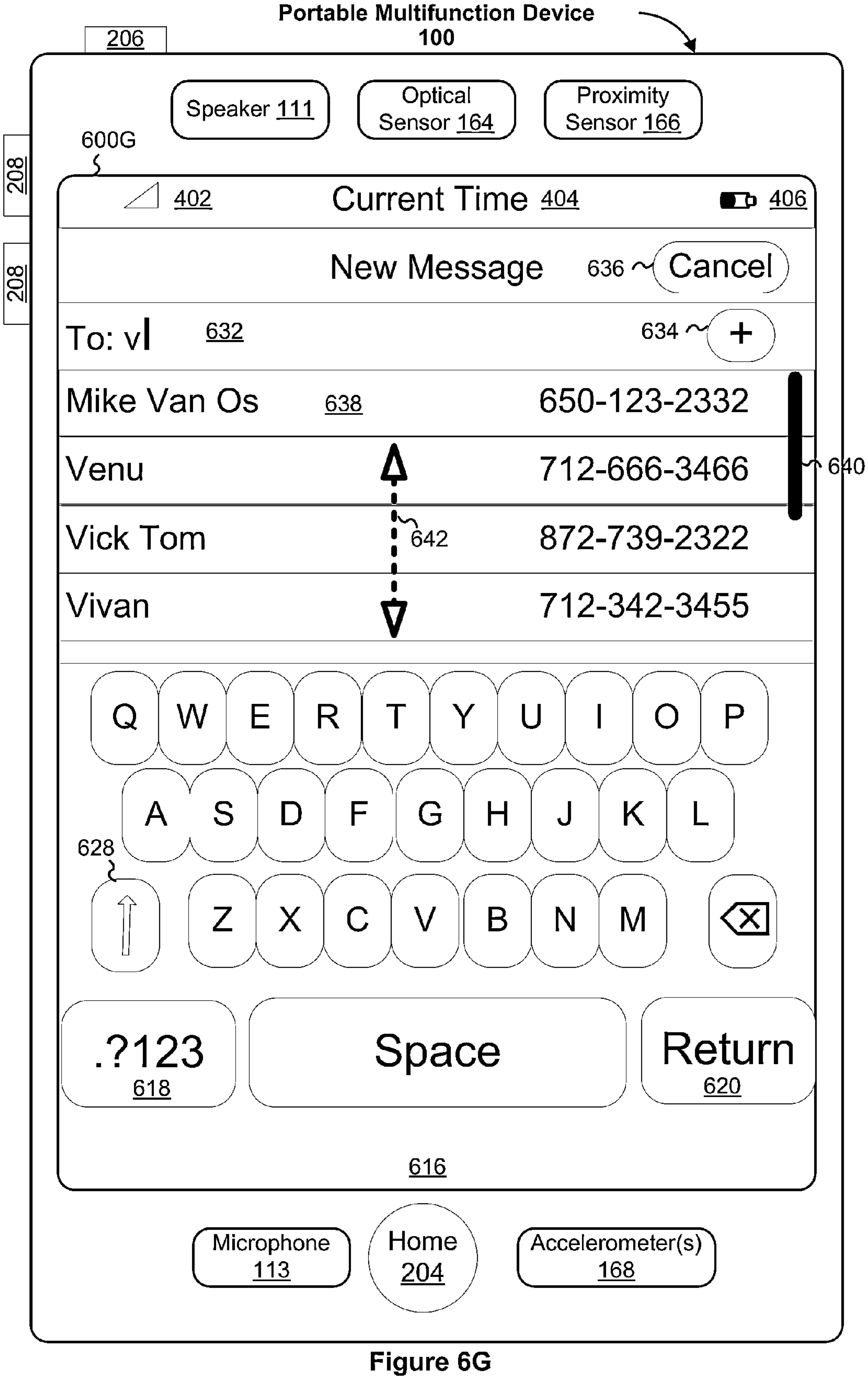
Figure 6H:

In some embodiments, when the user activates a send key (e.g., either 614 or 620), the text in text box 612 "pops" or otherwise comes out of the box and becomes part of the string of user messages 606 to the other party. The black arrows in FIG. 6E illustrate an animated formation of a quote bubble 606-3. In some embodiments, the size of the quote bubble scales with the size of the message. In some embodiments, a sound is also made when the message is sent, such as a droplet sound, to notify the user.

In some embodiments, user interface 600F includes the following elements, or a subset or superset thereof:

- 402, 404, 406, 612, 614, 616, 618, 620, and 628, as described above;
- Recipient input field 632 that when activated (e.g., by a finger tap on the field) receives and displays the phone number of the recipient of the instant message (or the recipient's name if the recipient is already in the user's contact list);

Add recipient icon 634 that when activated (e.g., by a finger tap on the icon) initiates the display of a scrollable list of contacts (e.g., 638, FIG. 6G); and Cancel icon 636 that when activated (e.g., by a finger tap on the icon) cancels the new instant message.

In some embodiments, user interface 600G includes the following elements, or a subset or superset thereof:

402, 404, 406, 612, 614, 616, 618, 620, 628, 632, 634, and 636, as described above;

Scrollable list 638 of contacts that match the input in recipient input field 632; and Vertical bar 640 that helps a user understand how many items in the contact list that match the input in recipient input field 632 are being displayed.

In some embodiments, list 638 contains contacts that match the input in recipient input field 632. For example, if the letter "v" is input, then contacts with either a first name or last name beginning with "v" are shown. If the letters "va" are input in field 632, then the list of contacts is narrowed to contacts with either a first name or last name beginning with "va", and so on until one of the displayed contacts is selected (e.g., by a tap on a contact in the list 638).

In some embodiments, a user can scroll through the list 638 by applying a vertical swipe gesture 642 to the area displaying the list 638. In some embodiments, a vertically downward gesture scrolls the list downward and a vertically upward gesture scrolls the list upward, In some embodiments, vertical bar 640 is displayed temporarily after an object is detected on or near the touch screen display (e.g., a finger touch is detected anywhere on the list 638). In some embodiments, the vertical bar 640 has a vertical position on top of the displayed portion of the list that corresponds to the vertical position in the list of the displayed portion of the list. In some embodiments, the vertical bar 640 has a vertical length that corresponds to the portion of the list being displayed.

In some embodiments, user interfaces 600H and 6001 include the following elements, or a subset or superset thereof:

402, 404, 406, 612, 614, 616, 618, 620, 628, 632, 634, and 636, as described above;

Suggested word 644 adjacent to the word being input;

Suggested word 646 in the space bar in keyboard 616; and/or

Insertion marker 656 (e.g., a cursor, insertion bar, insertion point, or pointer).

In some embodiments, activating suggested word 644 (e.g., by a finger tap on the suggested word) replaces the word being typed with the suggested word 644. In some embodiments, activating suggested word 646 (e.g., by a finger tap on the space bar) replaces the word being typed with the suggested word 646. In some embodiments, a user can set whether suggested words 644 and/or 646 are shown (e.g., by setting a user preference).

In some embodiments, a letter is enlarged briefly after it is selected (e.g., "N" is enlarged briefly after typing "din" in FIG. 6H) to provide feedback to the user.

In some embodiments, user interfaces 600J and 600K include the following elements, or a subset or superset thereof:

402, 404, 406, 612, 614, 616, 618, 620, 628, 632, 634, 636, and 656 as described above; and Expanded portion 650 of graphics that helps a user adjust the position of an expanded insertion marker 657 (sometimes called an "insertion point magnifier"); and Expanded insertion marker 657.

In some embodiments, a finger contact 648-1 on or near the insertion marker 656 initiates display of insertion point magnifier 650 and expanded insertion marker 657-1. In some embodiments, as the finger contact is moved on the touch screen (e.g., to position 648-2), there is corresponding motion of the expanded insertion marker (e.g., to 657-2) and the insertion point magnifier 650. Thus, the insertion point magnifier 650 provides an efficient way to position a cursor or other insertion marker using finger input on the touch screen. In some embodiments, the magnifier 650 remains visible and can be repositioned as long as continuous contact is maintained with the touch screen (e.g., from 648-1 to 648-2 to even 648-3).

Figure 6I:

In some embodiments, a portable electronic device displays graphics and an insertion marker (e.g., marker 656, FIG. 6I) at a first location in the graphics on a touch screen display (e.g., FIG. 6I). In some embodiments, the insertion marker 656 is a cursor, insertion bar, insertion point, or pointer. In some embodiments, the graphics comprise text (e.g., text in box 612, FIG. 6I).

A finger contact is detected with the touch screen display (e.g., contact 648-1, FIG. 6I). In some embodiments, the location of the finger contact is proximate to the location of the insertion marker. In some embodiments, the location of the finger contact is anywhere within a text entry area (e.g., box 612, FIG. 6I).

In response to the detected finger contact, the insertion marker is expanded from a first size (e.g., marker 656, FIG. 6I) to a second size (e.g., marker 657-1, FIG. 6J) on the touch screen display, and a portion (e.g., portion 650-1, FIG. 6J) of the graphics on the touch screen display is expanded from an original size to an expanded size.

In some embodiments, the portion of the graphics that is expanded includes the insertion marker and adjacent graphics. In some embodiments, after the insertion point and the portion of the graphics are expanded, graphics are displayed that include the insertion marker and adjacent graphics at the original size and at the expanded size.

Figure 6J:

Movement of the finger contact is detected on the touch screen display (e.g., from 648-1 to 648-2, FIG. 6J).

The expanded insertion marker is moved in accordance with the detected movement of the finger contact from the first location (e.g., 657-1, FIG. 6J) to a second location in the graphics (e.g., 657-2, FIG. 6J).

In some embodiments, the portion of the graphics that is expanded changes as the insertion marker moves from the first location to the second location (e.g., from 650-1 to 650-2, FIG. 6J). In some embodiments, the portion of the graphics that is expanded is displayed in a predefined shape. In some embodiments the portion (e.g., 650, FIG. 6J) of the graphics that is expanded is displayed in a circle. In some embodiments, the expanded insertion marker 657 is within the circle.

In some embodiments, the detected movement of the finger contact has a horizontal component on the touch screen display and a vertical component on the touch screen display. In some embodiments, moving the expanded insertion marker 657 in accordance with the detected movement of the finger contact includes moving the expanded insertion marker and the expanded portion of the graphics in accordance with the horizontal component of motion of the finger contact if the finger contact moves outside a text entry area without breaking contact. For example, in FIG. 6I, if the finger contact moves from 648-2 (inside the text entry area 612) to 648-3 (in the keyboard area), the expanded insertion point 657 and the expanded portion 650 of the graphics may move horizontally along the lower portion of the text entry area in accordance with the horizontal component of the movement from 648-2 to 648-3 (not shown).

In some embodiments, moving the expanded insertion marker in accordance with the detected movement of the finger contact includes moving the expanded insertion marker in a first area of the touch screen that includes characters entered using a soft keyboard (e.g., text box 612, FIG. 6J), wherein the soft keyboard is located in a second area of the touch screen that is separate from the first area (e.g., keyboard 616, FIG. 6J).

Figure 6K:
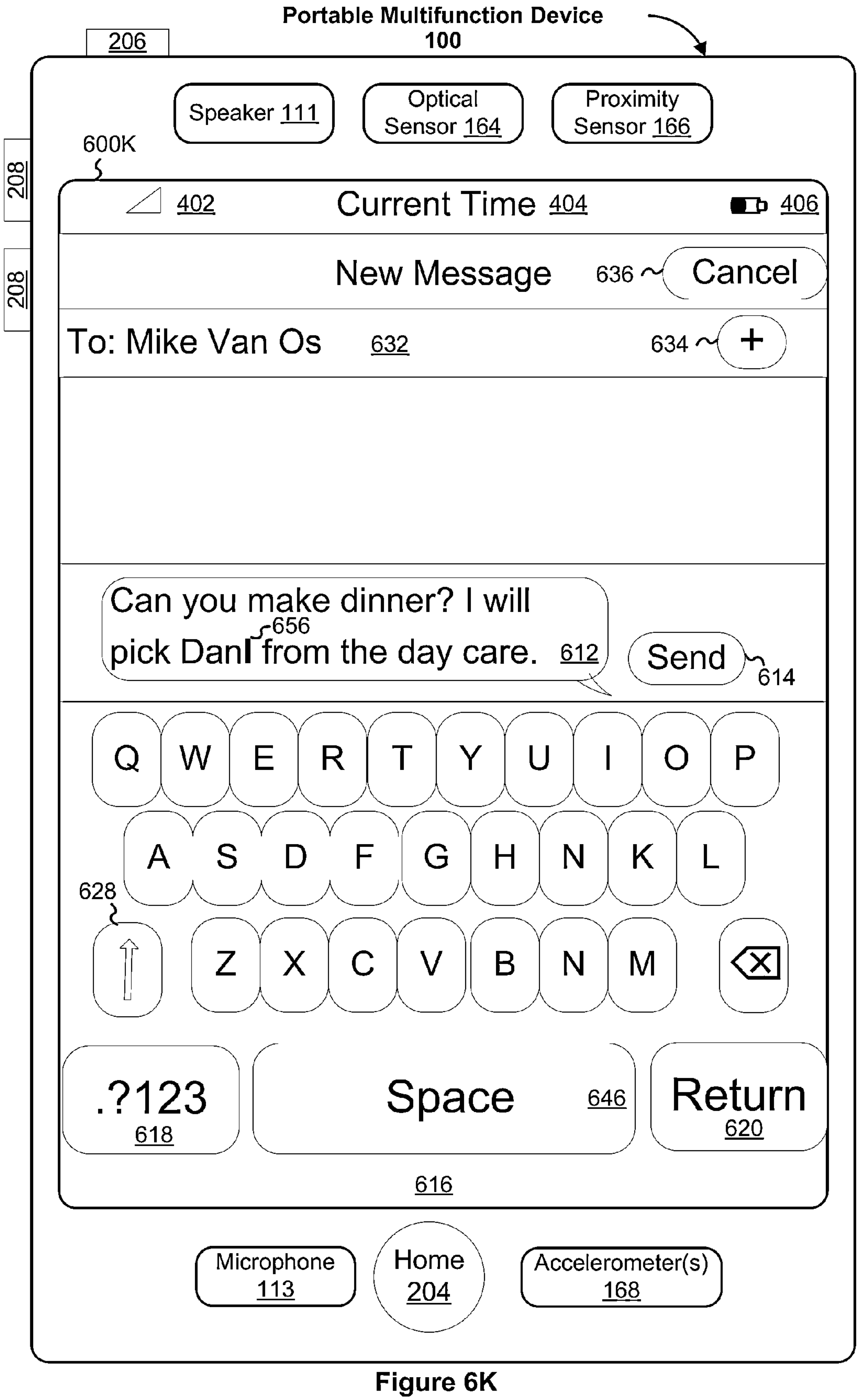

In some embodiments, the expanded insertion marker is contracted from the second size to the first size if finger contact with the touch screen display is broken (e.g., insertion marker 656, FIG. 6K). In some embodiments, the contracting includes an animation of the expanded insertion marker 657 shrinking into the insertion marker 656 at the second location. As used herein, an animation is a display of a sequence of images that gives the appearance of movement, and informs the user of an action that has been performed (such as moving an insertion point). A respective animation that confirms an action by the user of the device typically takes a predefined, finite amount of time, such as an amount of time between 0.2 and 0.5 seconds, between 0.2 and 1.0 seconds, or between 0.5 and 2.0 seconds, depending on the context.

In some embodiments, the expanded portion 650 of the graphics is contracted if finger contact with the touch screen display is no longer detected for a predetermined time.

A graphical user interface on a portable electronic device with a touch screen display comprises an insertion marker and graphics. In response to detecting a finger contact 648 with the touch screen display, the insertion marker is expanded from a first size 656 to a second size 657, and a portion 650 of the graphics is expanded. In response to detecting movement of the finger contact on the touch screen display, the expanded insertion marker is moved in accordance with the detected movement of the finger contact from a first location 657-1 in the graphics to a second location 657-2 in the graphics.

Additional description of insertion marker positioning can be found in U.S. patent application Ser. No. 11/553,436, "Method, System, And Graphical User Interface For Positioning An Insertion Marker In A Touch Screen Display," filed Oct. 26, 2006 and U.S. Provisional Patent Application No. 60/947,382, "Portable Multifunction Device, Method, and Graphical User Interface for Adjusting an Insertion Point Marker," filed Jun. 29, 2007, the contents of which are hereby incorporated by reference.

Additional description of instant messaging on portable electronic devices can be found in U.S. Provisional Patent Application Nos. 60/883,819, "Portable Electronic Device For Instant Messaging," filed Jan. 7, 2007 and 60/946,969, "Portable Electronic Device For Instant Messaging," filed Jun. 28, 2007 the contents of which are hereby incorporated by reference.

Figure 7:
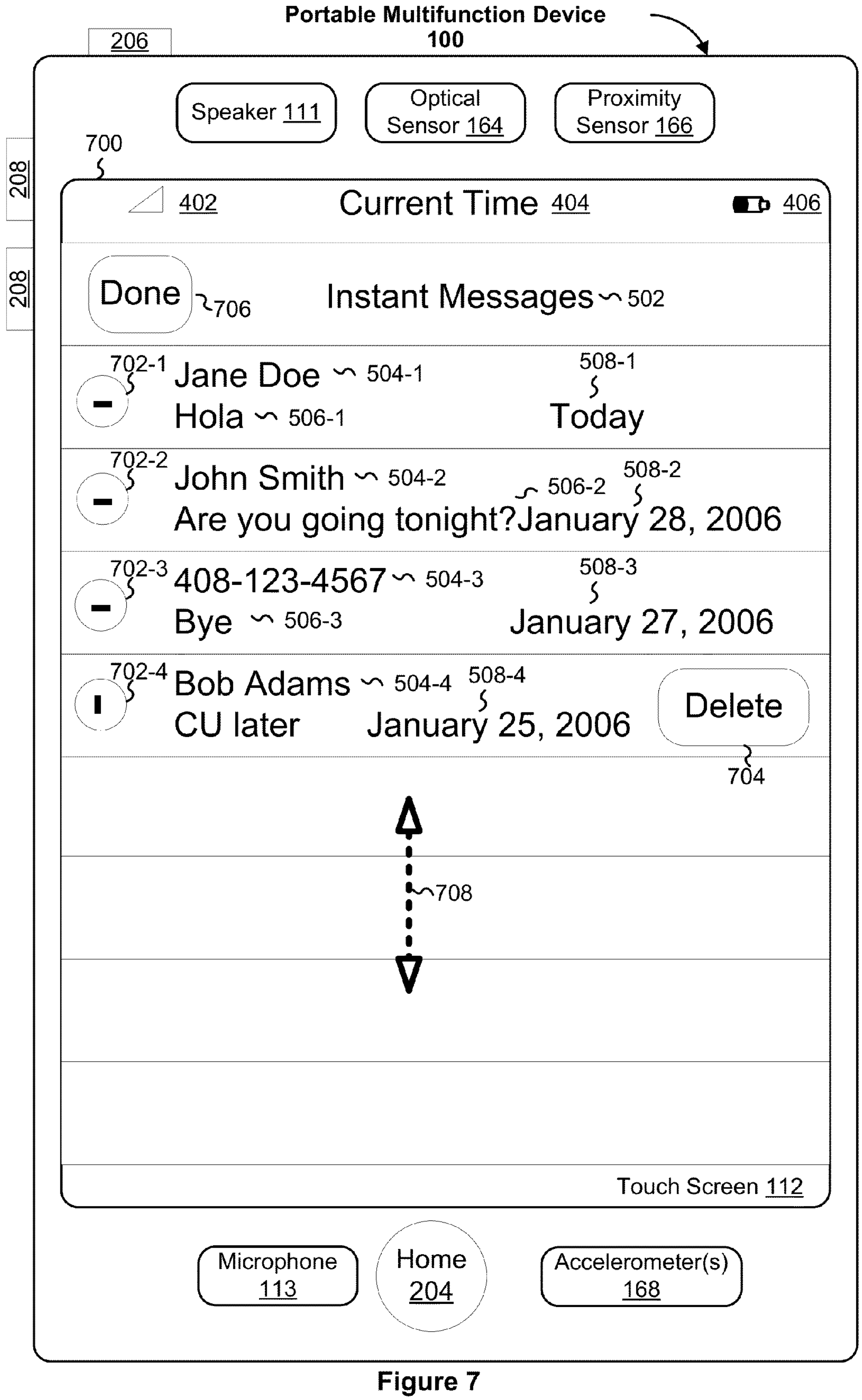
FIG. 7 illustrates an exemplary user interface for deleting an instant message conversation in accordance with some embodiments.

FIG. 7 illustrates an exemplary user interface for deleting an instant message conversation in accordance with some embodiments. In some embodiments, user interface 700 includes the following elements, or a subset or superset thereof:

402, 404, 406, 502, 504, 506, 508, 510, as described above;
Delete icons 702;
Confirm delete icon 704; and
Done icon 706.

In some embodiments, if the user activates edit icon 512 (FIG. 5), the delete icons 702 appear next to each instant message conversation. If a user activates a delete icon (e.g., by tapping it with a finger), the icon may rotate 90 degrees (e.g., 702-4) or otherwise change its appearance and/or a second icon may appear (e.g., confirm delete icon 704). If the user activates the second icon, the corresponding instant message conversation is deleted.

This deletion process, which requires multiple gestures by the user on different parts of the touch screen (e.g., delete icon 702-4 and confirm delete icon 704 are on opposite sides of the touch screen) greatly reduces the chance that a user will accidentally delete a conversation or other similar item.

The user activates the done icon 706 (e.g., by tapping on it with a finger) when the user has finished deleting IM conversations and the device returns to UI 500.

If there is a long list of conversations (not shown) that fill more than the screen area, the user may scroll through the list using vertically upward and/or vertically downward gestures 708 on the touch screen.

Additional description of deletion gestures on portable electronic devices can be found in U.S. Provisional Patent Application Nos. 60/883,814, "Deletion Gestures On A Portable Multifunction Device," filed Jan. 7, 2007 and 60/936,755, "Deletion Gestures On A Portable Multifunction Device," filed Jun. 22, 2007, the contents of which are hereby incorporated by reference.

Figure 8A:
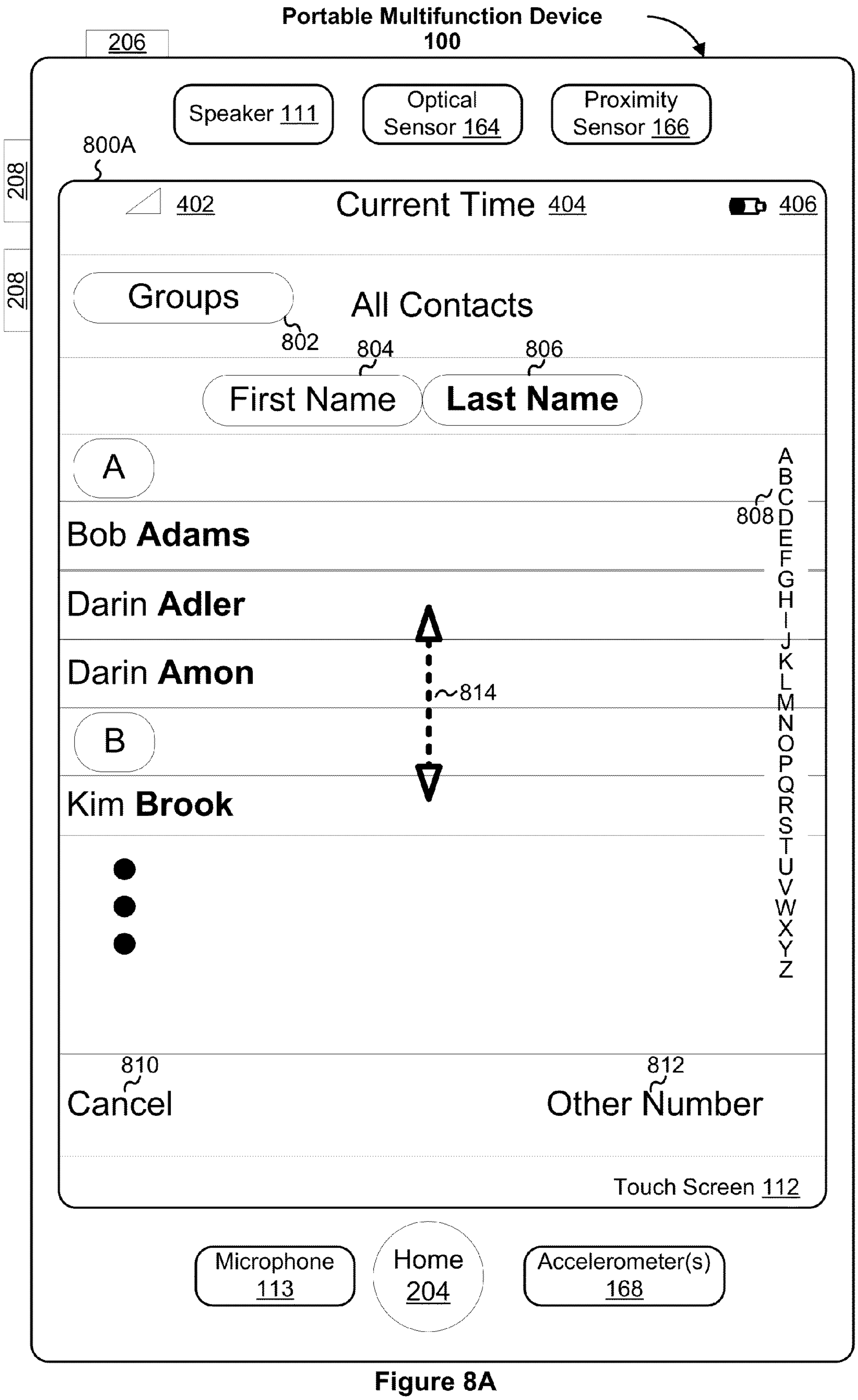
FIGS. 8A and 8B illustrate an exemplary user interface for a contact list in accordance with some embodiments.
Figure 8B:
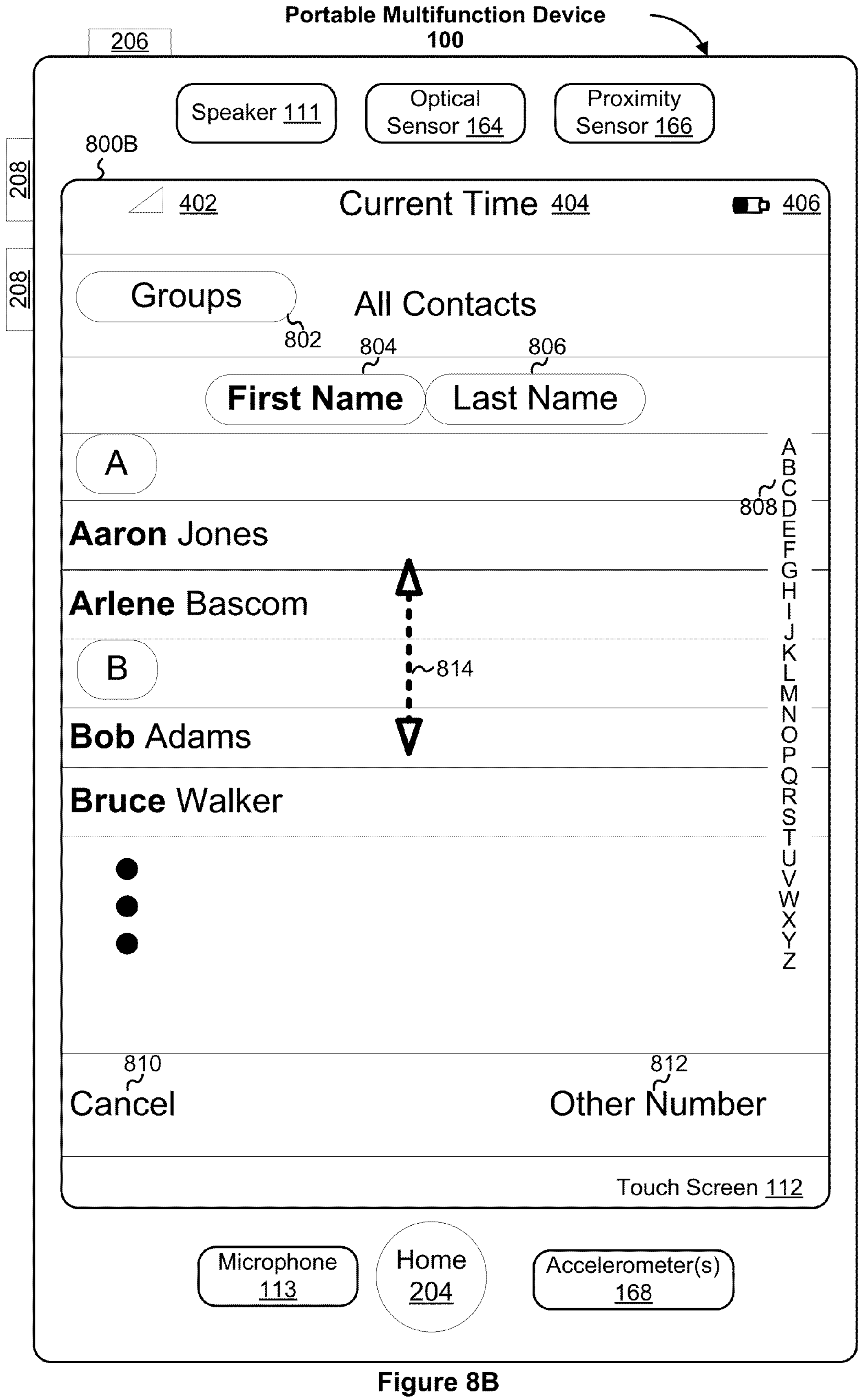

FIGS. 8A and 8B illustrate an exemplary user interface for a contact list in accordance with some embodiments.

In some embodiments, user interfaces 800A and 800B include the following elements, or a subset or superset thereof:

402, 404, 406, as described above;
Groups icon 802 that when activated (e.g., by a finger tap on the icon) initiates display of groups of contacts;
First name icon 804 that when activated (e.g., by a finger tap on the icon) initiates an alphabetical display of the user's contacts by their first names (FIG. 8B);
Last name icon 806 that when activated (e.g., by a finger tap on the icon) initiates an alphabetical display of the user's contacts by their last names (FIG. 8A);
Alphabet list icons 808 that the user can touch to quickly arrive at a particular first letter in the displayed contact list;
Cancel icon 810 that when activated (e.g., by a finger tap on the icon) initiates transfer back to the previous UI (e.g., UI 500); and
Other number icon 812 that when activated (e.g., by a finger tap on the icon) initiates transfer to a UI for entering a phone number for instant messaging, such as a phone number that is not in the user's contact list (e.g., UI 900, FIG. 9).

In some embodiments, the functions of first name icon 804 and last name icon 806 are incorporated into settings 412 (FIG. 4B, e.g., as a user preference setting) rather than being displayed in a contacts list UI (e.g., 800A and 800B).

As described in U.S. patent application Ser. No. 11/322,547, "Scrolling List With Floating Adjacent Index Symbols," filed Dec. 23, 2005; Ser. No. 11/322,551, "Continuous Scrolling List With Acceleration," filed Dec. 23, 2005; and Ser. No. 11/322,553, "List Scrolling In Response To Moving Contact Over List Of Index Symbols," filed Dec. 23, 2005, which are hereby incorporated by reference, the user may scroll through the contact list using vertically upward and/or vertically downward gestures 814 on the touch screen.

Figure 9:
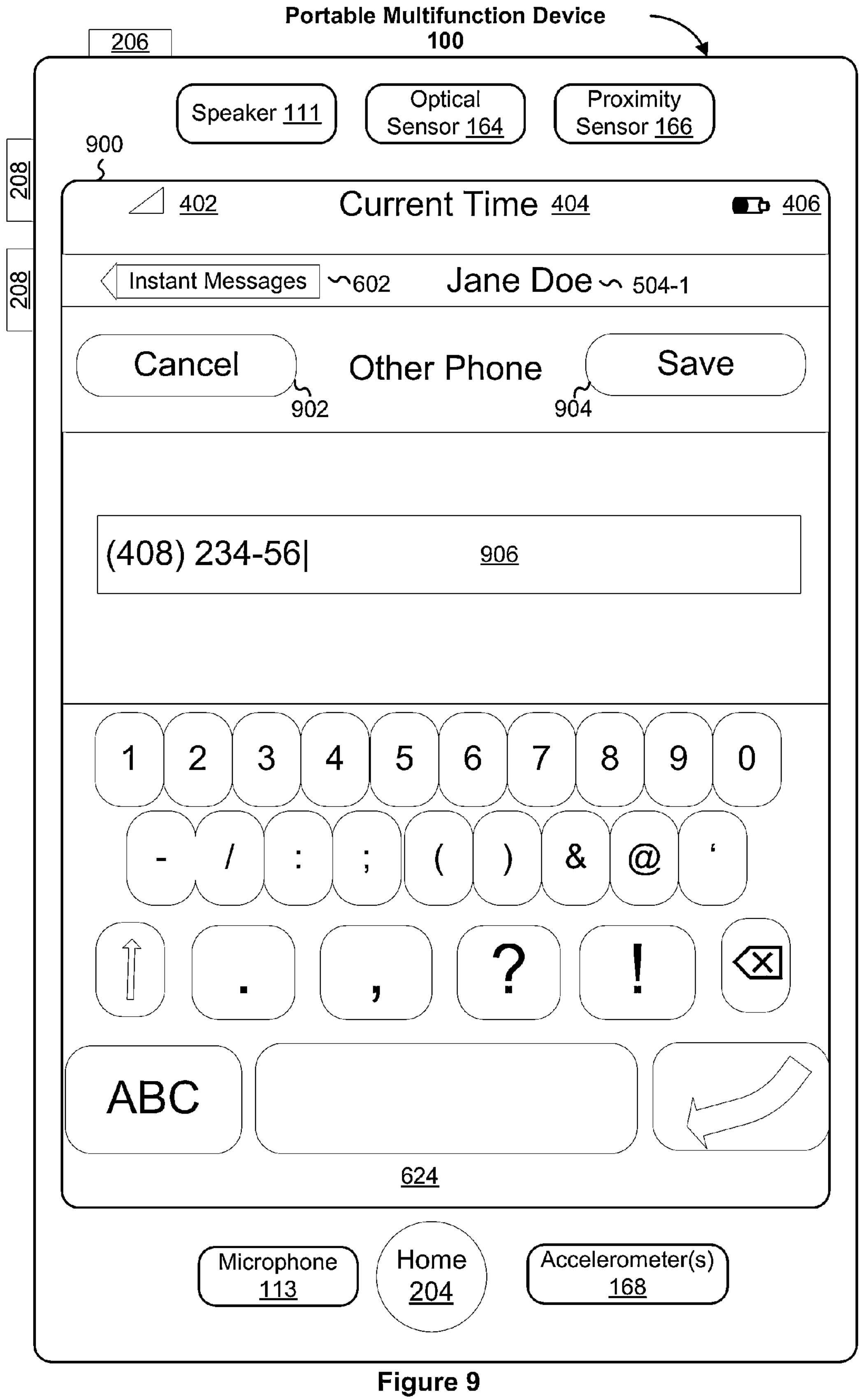
FIG. 9 illustrates an exemplary user interface for entering a phone number for instant messaging in accordance with some embodiments.

FIG. 9 illustrates an exemplary user interface for entering a phone number for instant messaging in accordance with some embodiments. In some embodiments, user interface 900 includes the following elements, or a subset or superset thereof:

- 402, 404, 406, 504, 602, and 624, as described above;
- Cancel icon 902 that when activated (e.g., by a finger tap on the icon) initiates transfer back to the previous UI (e.g., UI 800A or UI 800B);
- Save icon 904 that when activated (e.g., by a finger tap on the icon) initiates saving the entered phone number in the instant messages conversation list (e.g., UI 500) and displaying a UI to compose an instant message to be sent to the entered phone number (e.g., UI 600A); and
- Number entry box 906 for entering the phone number using keyboard 624.

Note that the keyboard displayed may depend on the application context. For example, the UI displays a soft keyboard with numbers (e.g., 624) when numeric input is needed or expected. The UI displays a soft keyboard with letters (e.g., 616) when letter input is needed or expected.

In some embodiments, instead of using UI 900, a phone number for instant messaging may be entered in UI 600F (FIG. 6F) by inputting numbers in To: field 632 using numeric keypad 624.

Camera

Figure 10:
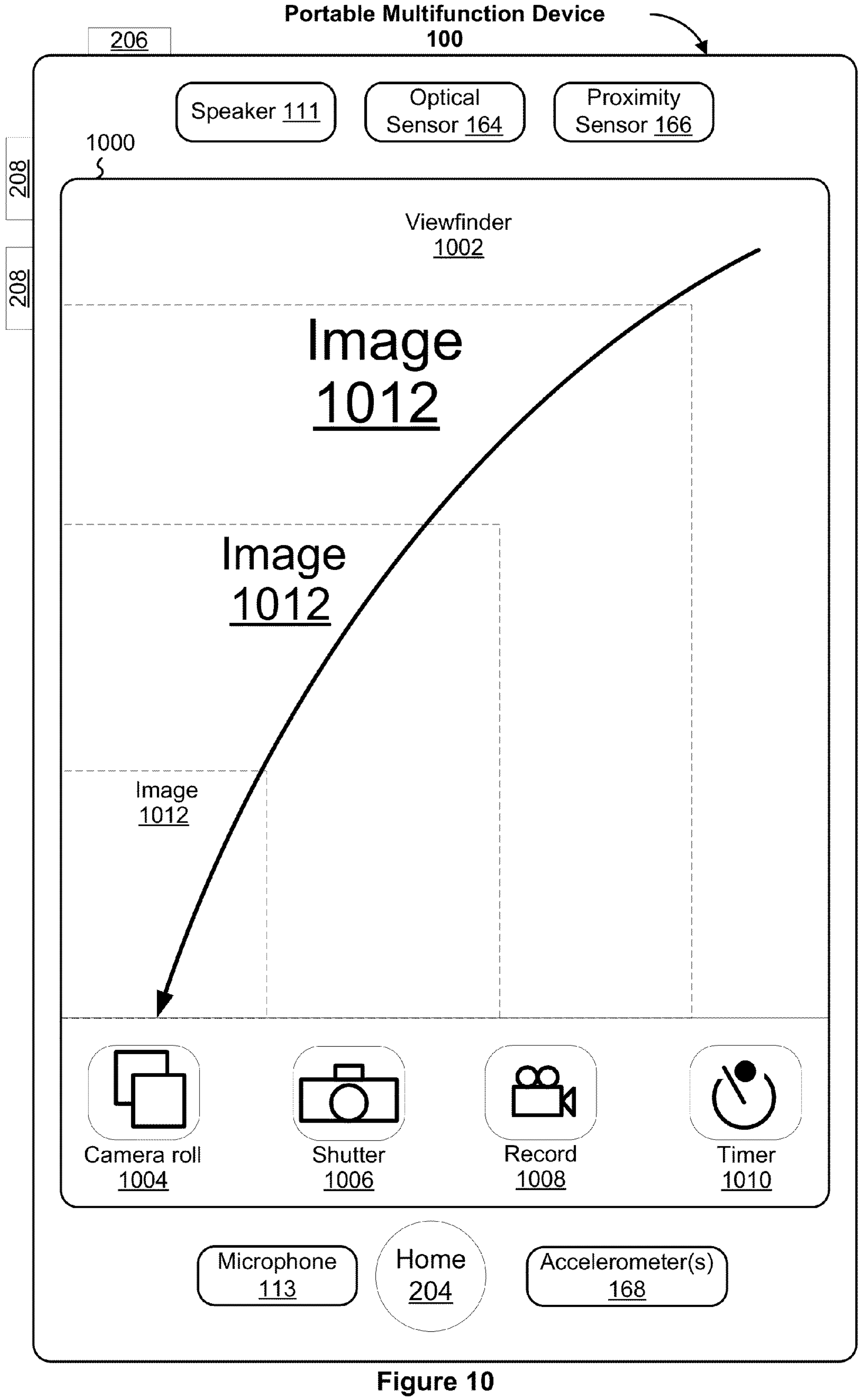
FIG. 10 illustrates an exemplary user interface for a camera in accordance with some embodiments.

FIG. 10 illustrates an exemplary user interface for a camera in accordance with some embodiments. In some embodiments, user interface 1000 includes the following elements, or a subset or superset thereof:

- Viewfinder 1002;
- Camera roll 1004 that manages images and/or videos taken with the camera;
- Shutter 1006 for taking still images;
- Record button 1008 for starting and stopping video recording;
- Timer 1010 for taking an image after a predefined time delay; and
- Image 1012 that appears (e.g., via the animation illustrated schematically in FIG. 10) to be added to camera roll 1004 when it is obtained.

In some embodiments, the orientation of the camera in the shutter icon 1006 rotates as the device 100 is rotated between portrait and landscape orientations.

Figure 11:
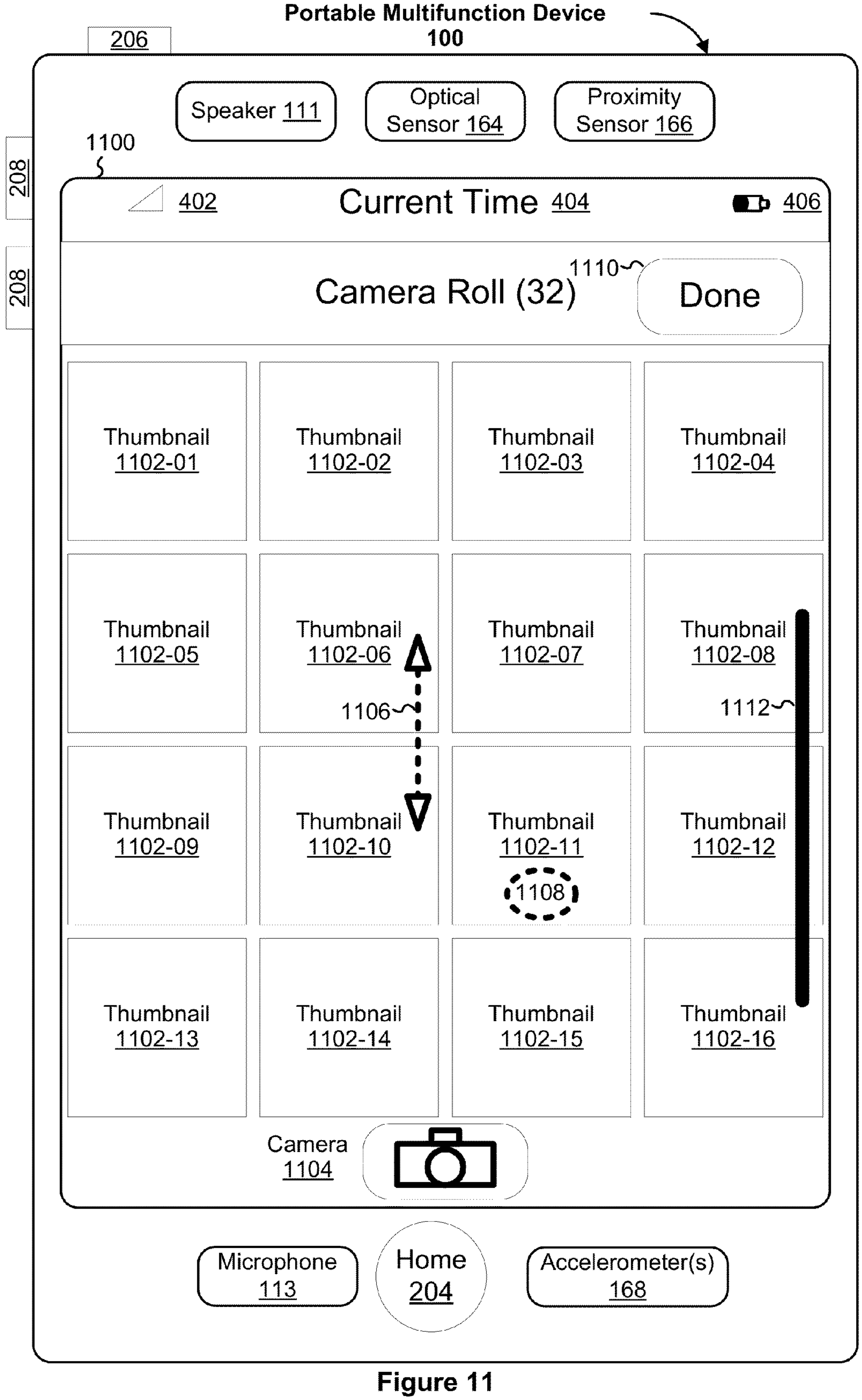
FIG. 11 illustrates an exemplary user interface for a camera roll in accordance with some embodiments.

FIG. 11 illustrates an exemplary user interface for a camera roll in accordance with some embodiments. In some embodiments, user interface 1100 includes the following elements, or a subset or superset thereof:

- 402, 404, and 406, as described above;
- Thumbnail images 1102 of images and/or videos obtained by camera 143;
- Camera icon 1104 or done icon 1110 that when activated (e.g., by a finger tap on the icon) initiates transfer to the camera UI (e.g., UI 1000); and
- Vertical bar 1112 that helps a user understand what portion of the camera roll is being displayed.

In some embodiments, the user may scroll through the thumbnails 1102 using vertically upward and/or vertically downward gestures 1106 on the touch screen. In some embodiments, a stationary gesture on a particular thumbnail (e.g., a tap gesture 1108 on thumbnail 1102-11) initiates transfer to an enlarged display of the corresponding image (e.g., UI 1200A).

In some embodiments, vertical bar 1112 is displayed temporarily after an object is detected on or near the touch screen display (e.g., a finger touch is detected anywhere on the thumbnails 1102). In some embodiments, the vertical bar 1112 has a vertical position on top of the displayed portion of the camera roll that corresponds to the vertical position in the camera roll of the displayed portion of the camera roll. In some embodiments, the vertical bar 1112 has a vertical length that corresponds to the portion of the camera roll being displayed. For example, in FIG. 11, the vertical position of the vertical bar 1112 indicates that the middle of the camera roll is being displayed and the vertical length of the vertical bar 1112 indicates that roughly half of the images in the camera roll are being displayed.

Figure 12A:
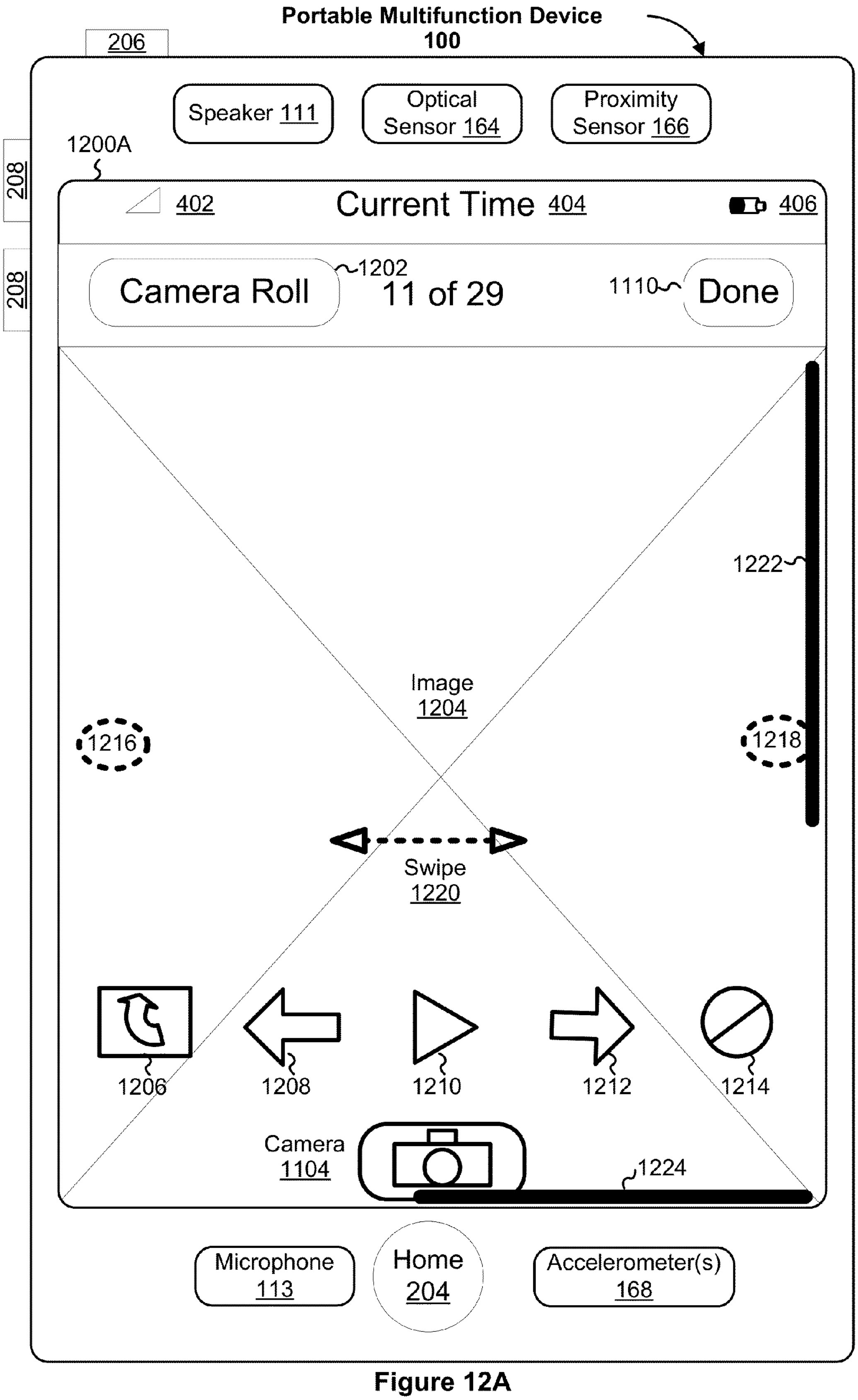
FIGS. 12A-12C illustrate an exemplary user interface for viewing and manipulating acquired images in accordance with some embodiments.
Figure 12B:
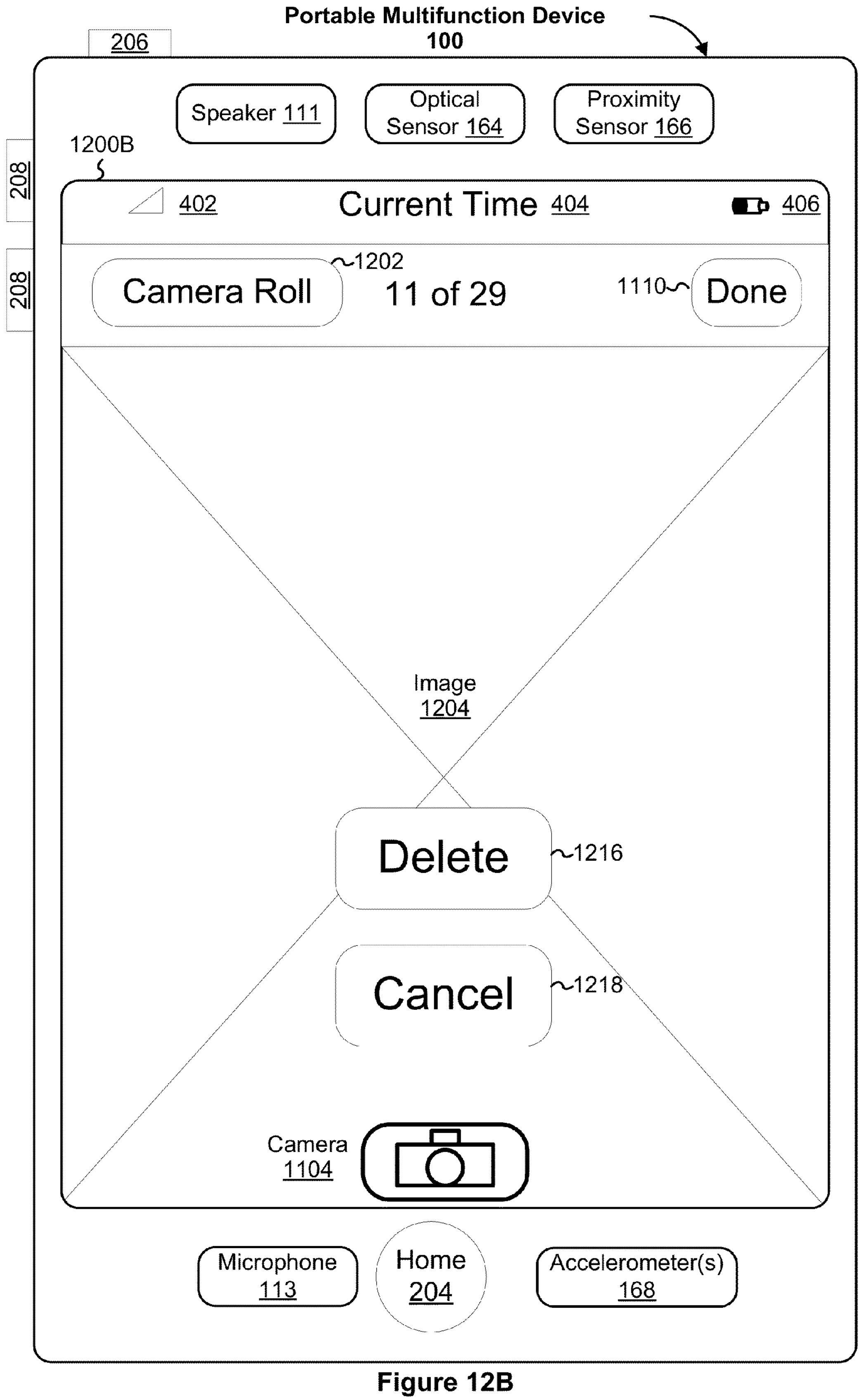
Figure 12C:
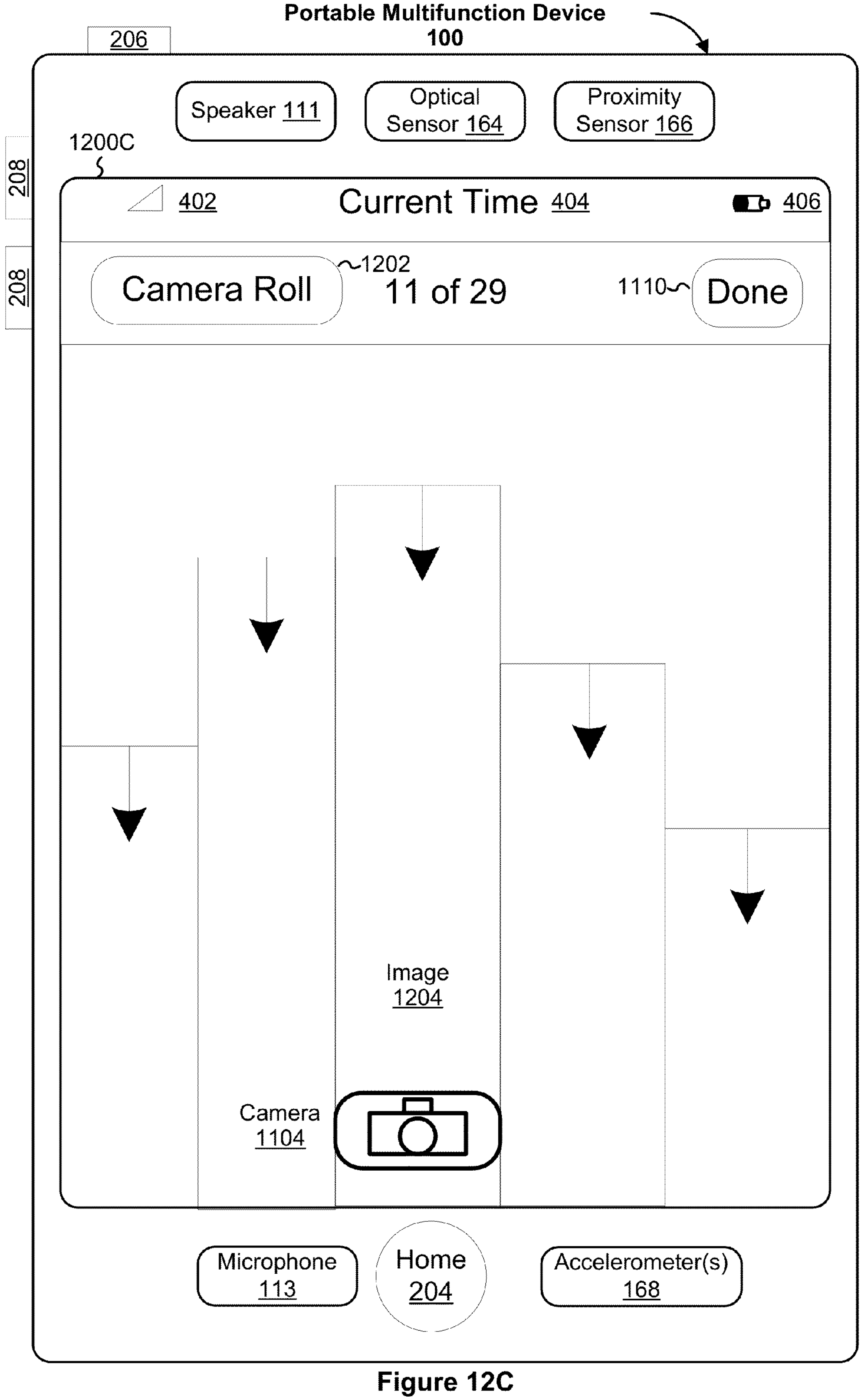

FIGS. 12A-12C illustrate an exemplary user interface for viewing and manipulating acquired images in accordance with some embodiments.

In some embodiments, user interface 1200A includes the following elements, or a subset or superset thereof:

- 402, 404, 406, 1104, and 1110, as described above;
- Camera roll icon 1202 that when activated (e.g., by a finger tap on the icon) initiates transfer to the camera roll UI (e.g., UI 1100);
- Image 1204;
- Additional options icon 1206 that when activated (e.g., by a finger tap on the icon) initiates transfer to a UI with additional options for use of image 1204 (e.g., UI 1700, FIG. 17));
- Previous image icon 1208 that when activated (e.g., by a finger tap on the icon) initiates display of the previous image in the camera roll (e.g., 1102-10);
- Play icon 1210 that when activated (e.g., by a finger tap on the icon) initiates a slide show of the images in the camera roll;
- Next image icon 1212 that when activated (e.g., by a finger tap on the icon) initiates display of the next image in the camera roll (e.g., 1102-12);
- Delete symbol icon 1214 that when activated (e.g., by a finger tap on the icon) initiates display of a UI to confirm that the user wants to delete image 1204 (e.g. UI 1200B, FIG. 12B);
- Vertical bar 1222 that helps a user understand what portion of the image 1204 is being displayed; and
- Horizontal bar 1224 that helps a user understand what portion of the image 1204 is being displayed.

In some embodiments, the user can also initiate viewing of the previous image by making a tap gesture 1216 on the left side of the image. In some embodiments, the user can also initiate viewing of the previous image by making a swipe gesture 1220 from left to right on the image.

In some embodiments, the user can also initiate viewing of the next image by making a tap gesture 1218 on the right side of the image. In some embodiments, the user can also initiate viewing of the next image by making a swipe gesture 1220 from right to left on the image.

By offering multiple ways to perform the same task (e.g., to view the next image by tapping icon 1212, tap 1218, or right to left swipe 1220), the user can choose whichever way the user prefers, thereby making the UI simpler and more intuitive for the user.

In some embodiments, image 1204 moves off screen to the left as the next image moves on screen from the right. In some embodiments, image 1204 moves off screen to the right as the previous image moves on screen from the left.

In some embodiments, a tap gesture such as 1216 or 1218 magnifies the image 1204 by a predetermined amount, rather than initiating viewing of another image, so that just a portion of image 1204 is displayed. In some embodiments, when the image is already magnified, repeating the tap gesture demagnifies the image (e.g., so that the entire image is displayed).

In some embodiments, if just a portion of image 1204 is displayed, vertical bar 1222 is displayed temporarily after an object is detected on or near the touch screen display (e.g., a finger touch is detected anywhere on the image 1204). In some embodiments, the vertical bar 1222 has a vertical position on top of the displayed portion of the image that corresponds to the vertical position in the image of the displayed portion of the image. In some embodiments, the vertical bar 1222 has a vertical length that corresponds to the portion of the image being displayed. For example, in FIG. 12A, the vertical position of the vertical bar 1222 indicates that the top of the image is being displayed and the vertical length of the vertical bar 1222 indicates that a portion from the top half of the image is being displayed.

In some embodiments, if just a portion of image 1204 is displayed, horizontal bar 1224 is displayed temporarily after an object is detected on or near the touch screen display (e.g., a finger touch is detected anywhere on the image 1204). In some embodiments, the horizontal bar 1224 has a horizontal position on top of the displayed portion of the image that corresponds to the horizontal position in the image of the displayed portion of the image. In some embodiments, the horizontal bar 1224 has a horizontal length that corresponds to the portion of the image being displayed. For example, in FIG. 12A, the horizontal position of the horizontal bar 1224 indicates that a portion of the right side of the image is being displayed and the horizontal length of the horizontal bar 1224 indicates that a portion from the right half of the image is being displayed. Together, vertical bar 1222 and horizontal bar 1224 indicate that the northeast quadrant of the image 1204 is being displayed.

In some embodiments, user interface 1200B includes the following elements, or a subset or superset thereof:

- 402, 404, 406, 1104, 1110, 1202, and 1204, as described above;
- Delete icon 1216 that when activated (e.g., by a finger tap on the icon) deletes the image 1204; and
- Cancel icon 1218 that when activated (e.g., by a finger tap on the icon) returns the device to the previous user interface (e.g. UI 1200A)

In some embodiments, as illustrated in FIG. 12C, the image may go through a deletion animation to show the user that the image is being deleted.

This deletion process, which requires gestures by the user on two different user interfaces (e.g., 1200A and 1200B) greatly reduces the chance that a user will accidentally delete an image or other similar item.

Image Management

Figure 13A:
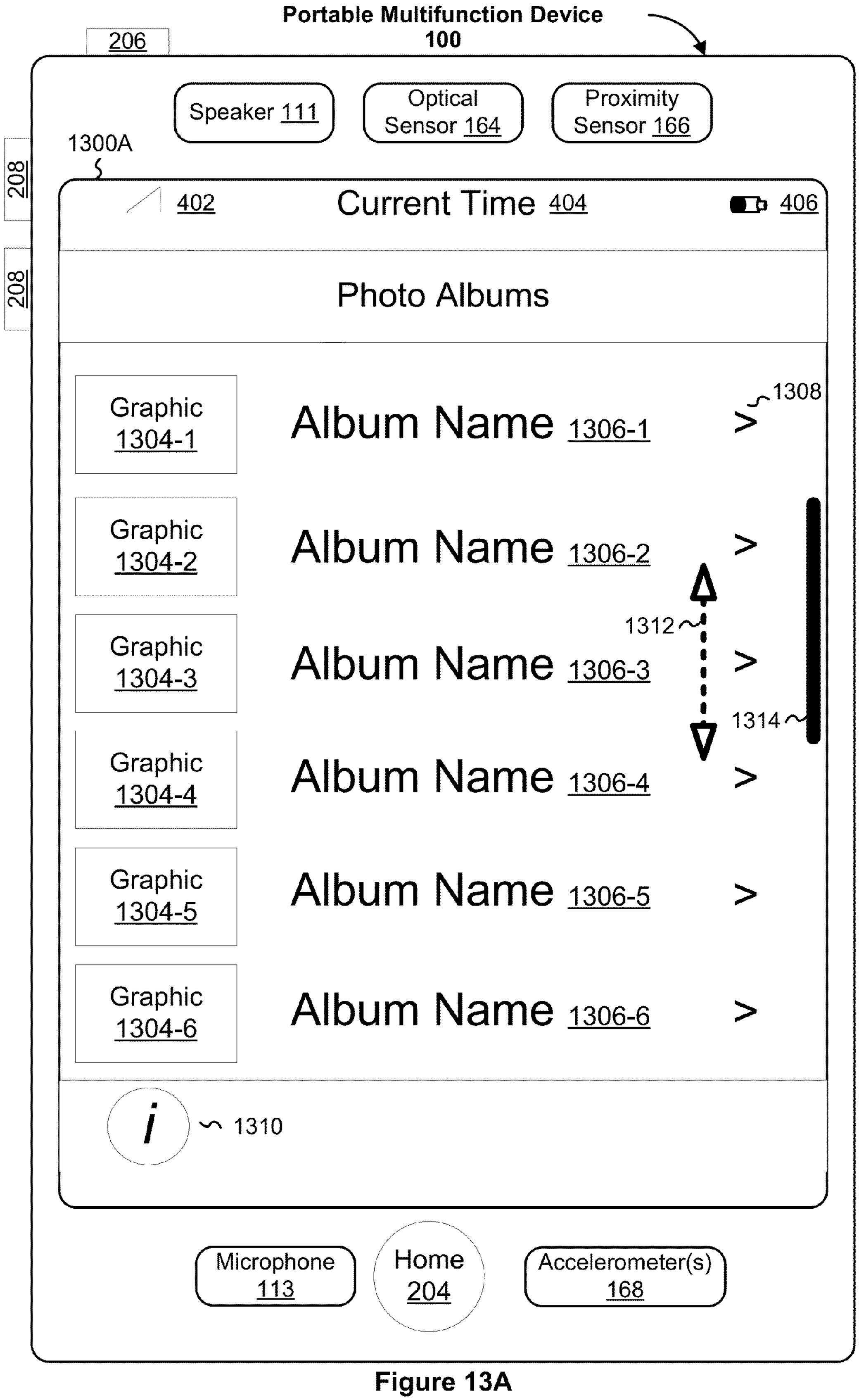
FIGS. 13A and 13B illustrate exemplary user interfaces for viewing albums in accordance with some embodiments.
Figure 13B:
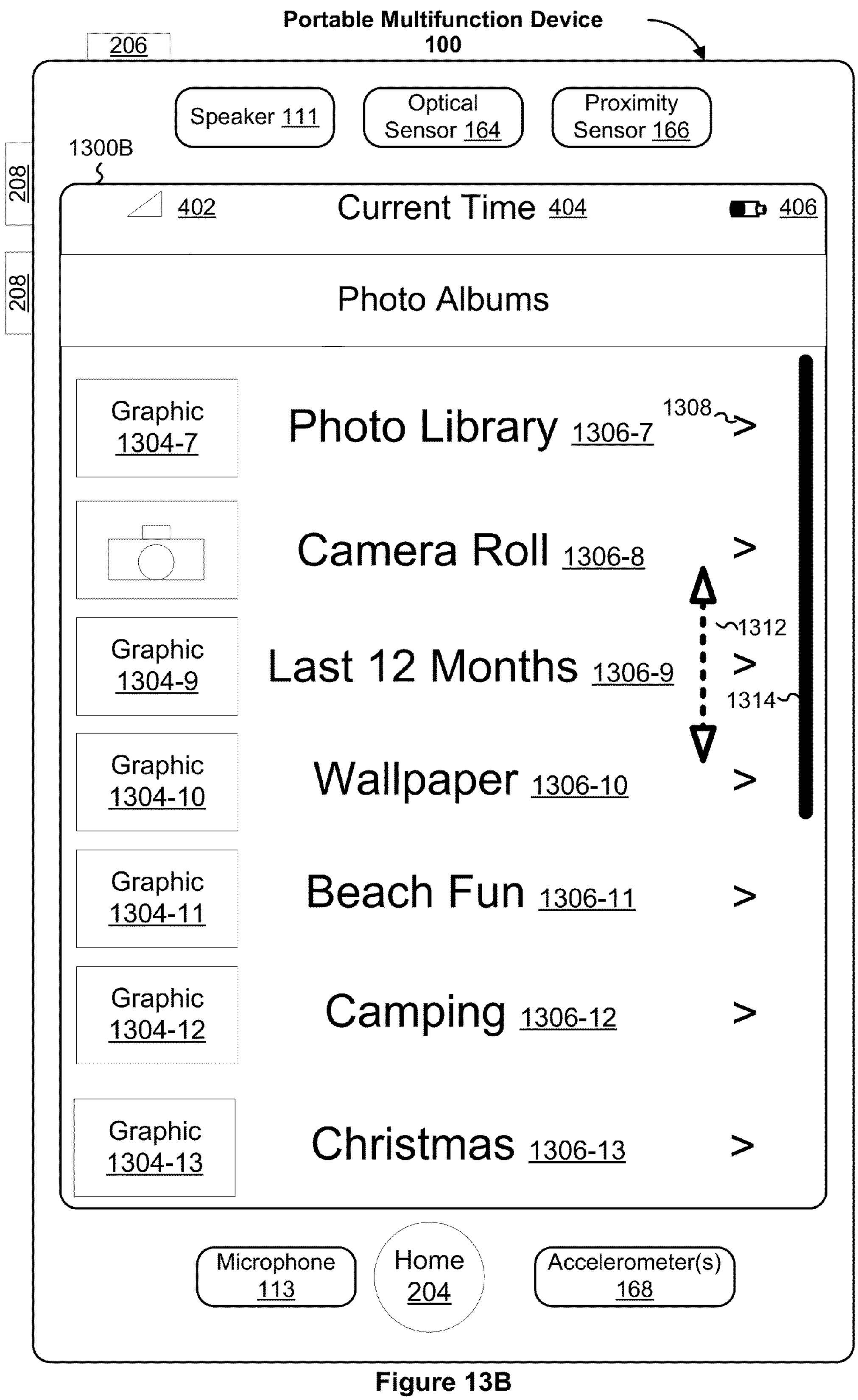

FIGS. 13A and 13B illustrate exemplary user interfaces for viewing albums in accordance with some embodiments. In some embodiments, user interface 1300A includes the following elements, or a subset or superset thereof:

- 402, 404, and 406, as described above;
- Graphics 1304, e.g., thumbnail images of the first picture or a user-selected picture in the corresponding albums;
- Album names 1306;
- Selection icons 1308 that when activated (e.g., by a finger tap on the icon) initiates display of the corresponding album (e.g., UI 1500, FIG. 15);
- Settings icon 1310, that brings up a settings menu (e.g., FIG. 14) when activated by a user gesture (e.g., a tap gesture); and
- Vertical bar 1314 that helps a user understand what portion of the list of albums is being displayed.

In some embodiments, as shown in FIG. 13B, one of the photo albums (e.g., 1306-7) may correspond to the user's photo library; another album (e.g., 1306-8) may correspond to the camera roll (FIG. 11); another album (e.g., 1306-9) may correspond to images added to the photo library in the last 12 months; and other albums (e.g., 1306-10-1306-13) may correspond to albums created and organized by the user.

The albums may be downloaded on to the device from a wide range of sources, such as the user's desktop or laptop computer, the Internet, etc.

If there is a long list of albums that fill more than the screen area, the user may scroll through the list using vertically upward and/or vertically downward gestures 1312 on the touch screen.

Figure 15:
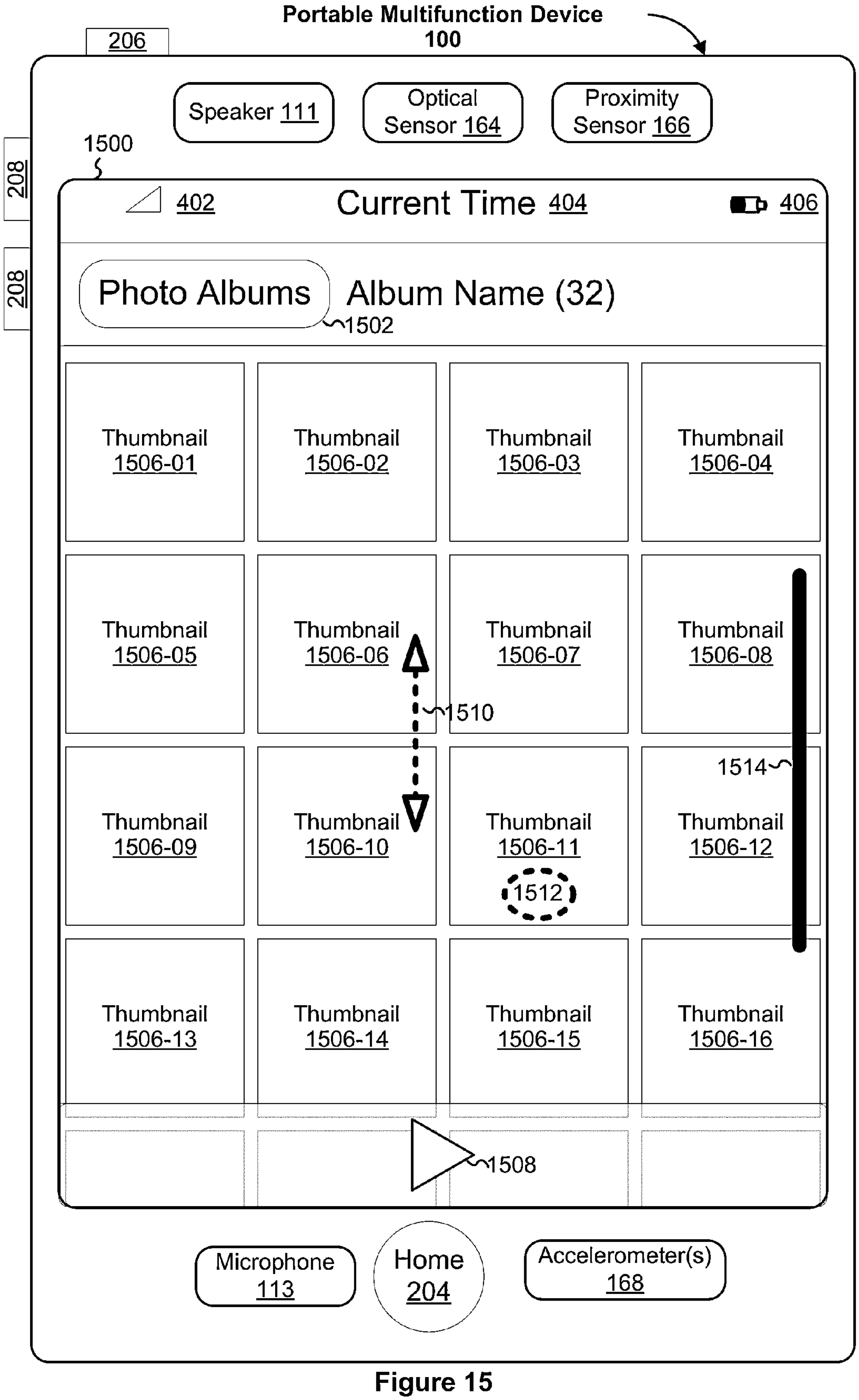
FIG. 15 illustrates an exemplary user interface for viewing an album in accordance with some embodiments.

In some embodiments, a user may tap anywhere in the row for a particular album (e.g., a tap on the graphic 1304, album name 1306, or selection icon 1308) to initiate display of the corresponding album (e.g., UI 1500, FIG. 15).

In some embodiments, vertical bar 1314 is displayed temporarily after an object is detected on or near the touch screen display (e.g., a finger touch is detected anywhere on the list of albums). In some embodiments, the vertical bar 1314 has a vertical position on top of the displayed portion of the list that corresponds to the vertical position in the list of the displayed portion of the list. In some embodiments, the vertical bar 1314 has a vertical length that corresponds to the portion of the list being displayed. For example, in FIG. 13B, the vertical position of the vertical bar 1314 indicates that the top of the list of albums is being displayed and the vertical length of the vertical bar 1314 indicates that roughly half of the albums in the list are being displayed.

Figure 14:
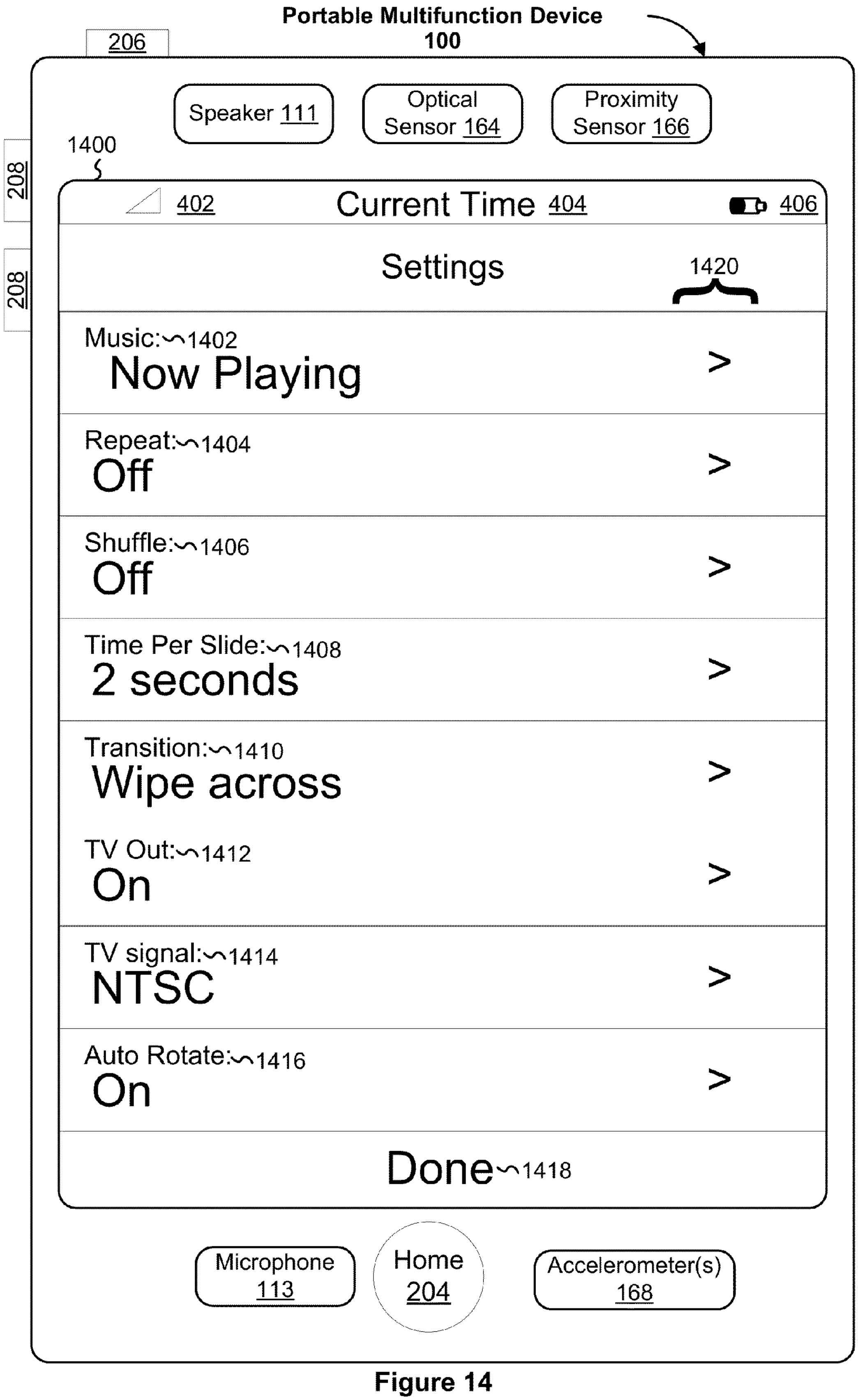
FIG. 14 illustrates an exemplary user interface for setting user preferences in accordance with some embodiments.

FIG. 14 illustrates an exemplary user interface for setting user preferences in accordance with some embodiments. In some embodiments, user interface 1400 includes the following elements, or a subset or superset thereof:

- 402, 404, and 406, as described above;
- Music setting 1402 for selecting the music during a slide show (e.g., Now Playing, 90s Music, Recently Added, or Off);
- Repeat setting 1404 for selecting whether the slide show repeats (e.g., On or Off);
- Shuffle setting 1406 for selecting whether the images in the slide show are put in a random order (e.g., On or Off);
- Time per slide setting 1408 (e.g., 2, 3, 5, 10, 20 seconds or manual);
- Transition setting 1410 (e.g., random, wipe across, wipe down, or off);
- TV out setting 1412 for external display (e.g., on, off, or ask);
- TV signal setting 1414 (e.g., NTSC or PAL);
- Auto Rotate setting 1416 (e.g. on or off);
- Done icon 1418 that when activated (e.g., by a finger tap on the icon) returns the device to the previous UI (e.g., UI 1300); and
- Selection icons 1420 that when activated (e.g., by a finger tap on the icon) show choices for the corresponding settings.

In some embodiments, a user may tap anywhere in the row for a particular setting to initiate display of the corresponding setting choices.

In some embodiments, the settings in FIG. 14 are incorporated into settings 412 (FIG. 4B) and settings icon 1310 need not be displayed in the image management application 144 (e.g., FIG. 13B).

FIG. 15 illustrates an exemplary user interface for viewing an album in accordance with some embodiments. In some embodiments, user interface 1500 includes the following elements, or a subset or superset thereof:

- 402, 404, and 406, as described above;
- Photo albums icon 1502 that when activated (e.g., by a finger tap on the icon) initiates transfer to the photo albums UI (e.g., UI 1300B);
- Thumbnail images 1506 of images in the corresponding album;

Play icon 1508 that when activated (e.g., by a finger tap on the icon) initiates a slide show of the images in the album; and Vertical bar 1514 that helps a user understand what portion of the list of thumbnail images 1506 in an album is being displayed.

In some embodiments, the user may scroll through the thumbnails 1506 using vertically upward and/or vertically downward gestures 1510 on the touch screen. In some embodiments, a stationary gesture on a particular thumbnail (e.g., a tap gesture 1512 on thumbnail 1506-11) initiates transfer to an enlarged display of the corresponding image (e.g., UI 1600).

In some embodiments, vertical bar 1514 is displayed temporarily after an object is detected on or near the touch screen display (e.g., a finger touch is detected anywhere on the list of thumbnails). In some embodiments, the vertical bar 1514 has a vertical position on top of the displayed portion of the list that corresponds to the vertical position in the list of the displayed portion of the list. In some embodiments, the vertical bar 1514 has a vertical length that corresponds to the portion of the list being displayed. For example, in FIG. 15, the vertical position of the vertical bar 1514 indicates that the middle of the list of thumbnails is being displayed and the vertical length of the vertical bar 1514 indicates that roughly half of the thumbnails in the album are being displayed.

Figure 16A:
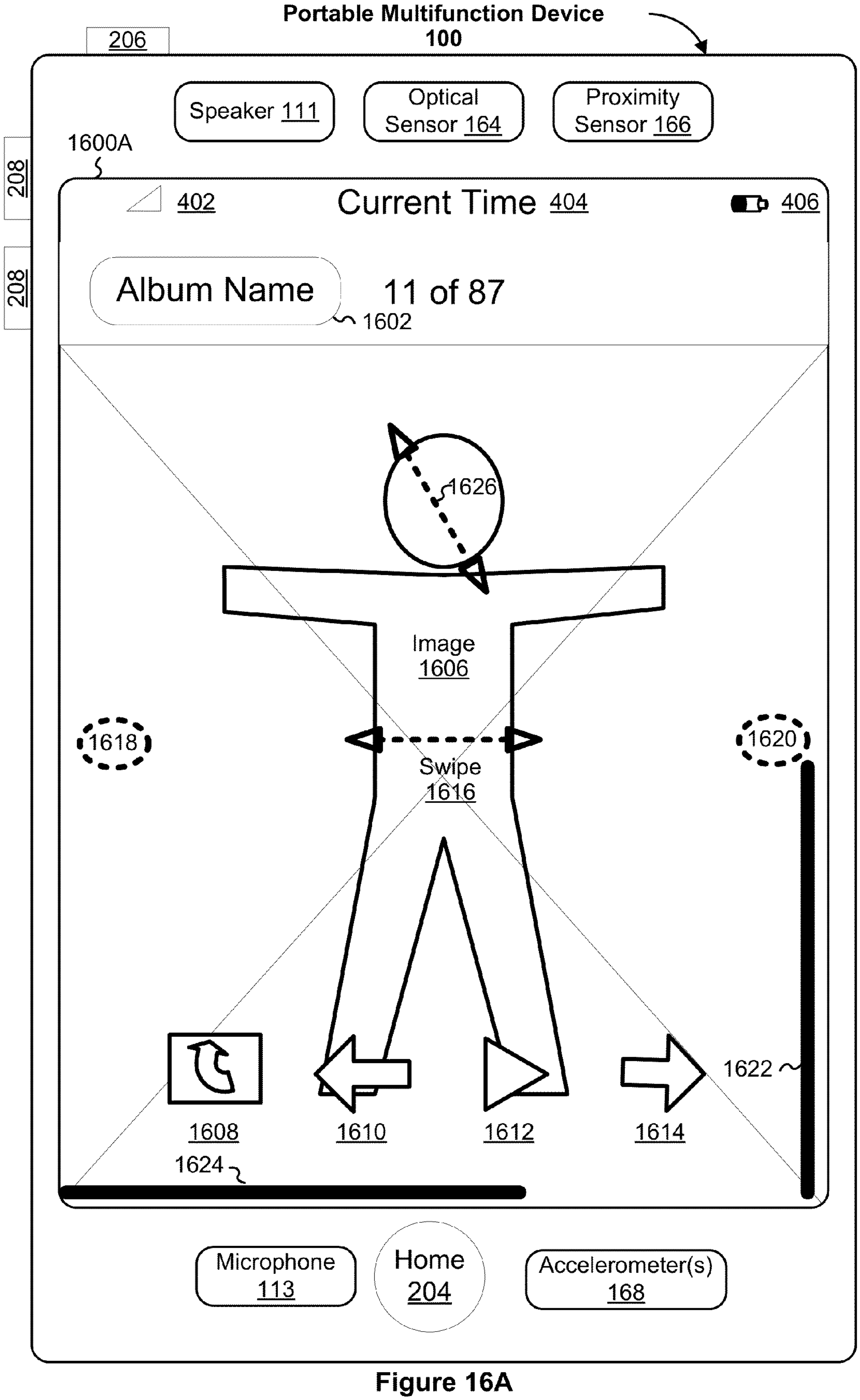
FIGS. 16A and 16B illustrate exemplary user interfaces for viewing images in an album in accordance with some embodiments.
Figure 16B:
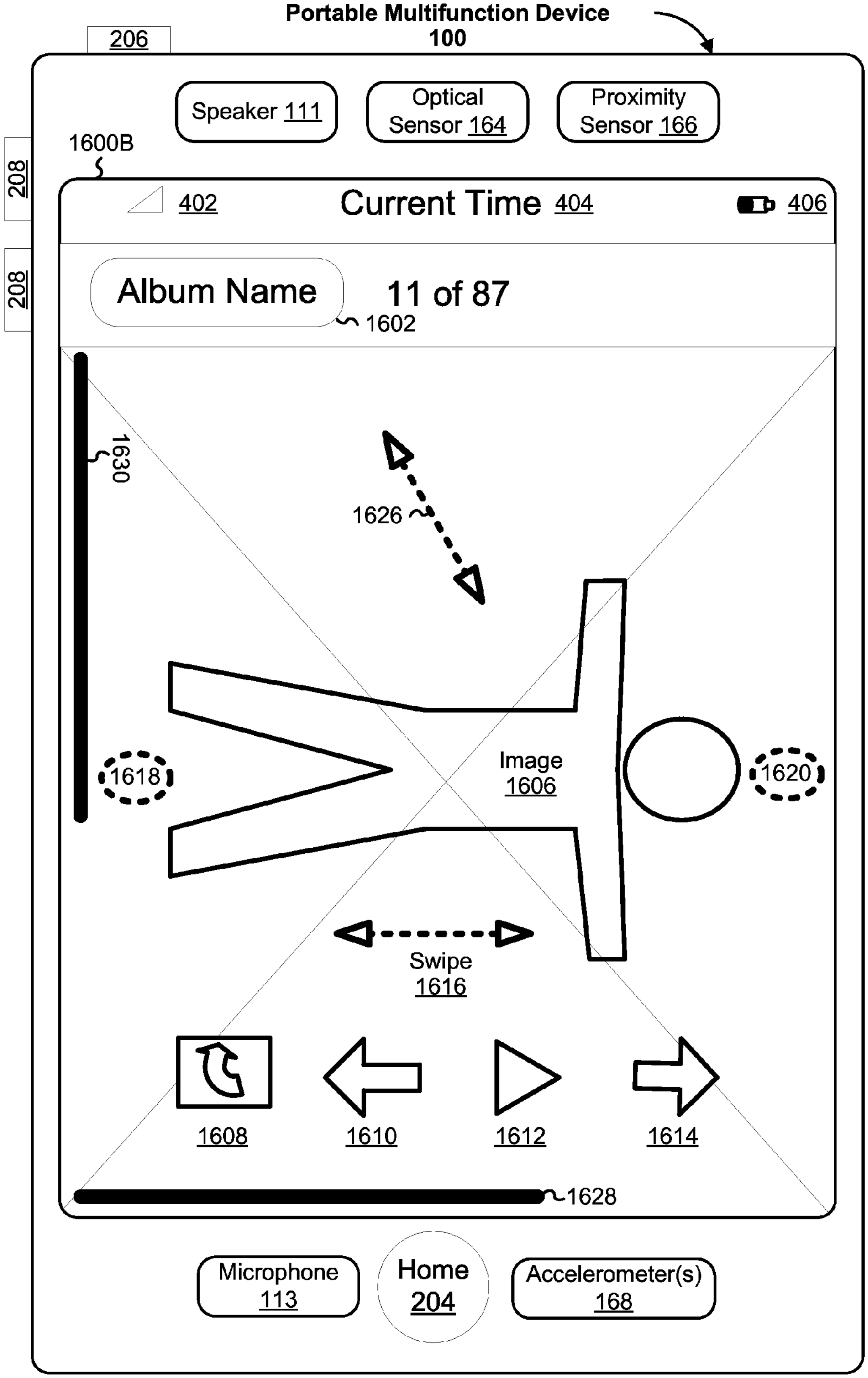

FIGS. 16A and 16B illustrate exemplary user interfaces for viewing images in an album in accordance with some embodiments. In some embodiments, user interfaces 1600A and 1600B include the following elements, or a subset or superset thereof:

402, 404, and 406, as described above;

Album name icon 1602 that when activated (e.g., by a finger tap on the icon) initiates transfer to the corresponding album UI (e.g., UI 1500);

Image 1606;

Additional options icon 1608 that when activated (e.g., by a finger tap on the icon) initiates transfer to a UI with additional options for use of image 1606 (e.g., UI 1700, FIG. 17));

Previous image icon 1610 that when activated (e.g., by a finger tap on the icon) initiates display of the previous image in the album (e.g., 1506-10);

Play icon 1612 that when activated (e.g., by a finger tap on the icon) initiates a slide show of the images in the album; and Next image icon 1614 that when activated (e.g., by a finger tap on the icon) initiates display of the next image in the album (e.g., 1506-12).

In some embodiments, icons 1608, 1610, 1612, and 1614 are displayed in response to detecting a gesture on the touch screen (e.g., a single finger tap on the image 1606) and then cease to be displayed if no interaction with the touch screen is detected after a predetermined time (e.g., 3-5 seconds), thereby providing a "heads up display" effect for these icons.

In some embodiments, the user can also initiate viewing of the previous image by making a tap gesture 1618 on the left side of the image. In some embodiments, the user can also initiate viewing of the previous image by making a swipe gesture 1616 from left to right on the image.

In some embodiments, the user can also initiate viewing of the next image by making a tap gesture 1620 on the right side of the image. In some embodiments, the user can also initiate viewing of the next image by making a swipe gesture 1616 from right to left on the image.

By offering multiple ways to perform the same task (e.g., to view the next image by tapping icon 1614, tap 1620, or right to left swipe 1616), the user can choose whichever way the user prefers, thereby making the UI simpler and more intuitive for the user.

In some embodiments, image 1606 moves off screen to the left as the next image moves on screen from the right. In some embodiments, image 1606 moves off screen to the right as the previous image moves on screen from the left.

In some embodiments, a double tap gesture such as 1618 or 1620 magnifies the image 1606 by a predetermined amount, rather than initiating viewing of another image, so that just a portion of image 1606 is displayed. In some embodiments, when the image is already magnified, repeating the double tap gesture demagnifies the image (e.g., so that the entire image is displayed, or so that the prior view of the image is restored).

In some embodiments, a multi-finger de-pinching gesture magnifies the image 1606 by a variable amount in accordance with the position of the multi-finger de-pinching gesture and the amount of finger movement in the multi-finger de-pinching gesture. In some embodiments, a multi-finger pinching gesture demagnifies the image 1606 by a variable amount in accordance with the position of the multi-finger pinching gesture and the amount of finger movement in the multi-finger pinching gesture.

In some embodiments, if just a portion of image 1606 is displayed, vertical bar 1622 is displayed temporarily after an object is detected on or near the touch screen display (e.g., a finger touch is detected anywhere on the image 1606). In some embodiments, the vertical bar 1622 has a vertical position on top of the displayed portion of the image that corresponds to the vertical position in the image of the displayed portion of the image. In some embodiments, the vertical bar 1622 has a vertical length that corresponds to the portion of the image being displayed. For example, in FIG. 16A, the vertical position of the vertical bar 1622 indicates that the bottom of the image is being displayed and the vertical length of the vertical bar 1622 indicates that a portion from the bottom half of the image is being displayed.

In some embodiments, if just a portion of image 1606 is displayed, horizontal bar 1624 is displayed temporarily after an object is detected on or near the touch screen display (e.g., a finger touch is detected anywhere on the image 1606). In some embodiments, the horizontal bar 1624 has a horizontal position on top of the displayed portion of the image that corresponds to the horizontal position in the image of the displayed portion of the image. In some embodiments, the horizontal bar 1624 has a horizontal length that corresponds to the portion of the image being displayed. For example, in FIG. 16A, the horizontal position of the horizontal bar 1224 indicates that a portion of the left side of the image is being displayed and the horizontal length of the horizontal bar 1624 indicates that a portion from the left half of the image is being displayed. Together, vertical bar 1622 and horizontal bar 1624 indicate that the southwest quadrant of the image 1606 is being displayed.

In some embodiments, in response to detecting a change in orientation of the device 100 from a portrait orientation to a landscape orientation (e.g., using accelerometer 168), UI 1600A (including image 1606) is rotated by 90° to UI 1600B (FIG. 16B). In some embodiments, if just a portion of image 1606 is displayed in landscape orientation (UI 1600B, FIG. 16B), vertical bar 1628 and horizontal bar 1630 are displayed and act in an analogous manner to vertical bar 1622 and horizontal bar 1624 (UI 1600A, FIG. 16A), described above. In some embodiments, in response to detecting a change in orientation of the device 100 from a landscape orientation to a portrait orientation (e.g., using accelerometer 168), the UI 1600B is rotated by 90° to UI 1600A (FIG. 16A).

In some embodiments, if just a portion of image 1606 is displayed, in response to detecting a finger drag or swipe gesture (e.g., 1626), the displayed portion of the image is translated in accordance with the direction of the drag or swipe gesture (e.g., vertical, horizontal, or diagonal translation).

Figure 17:
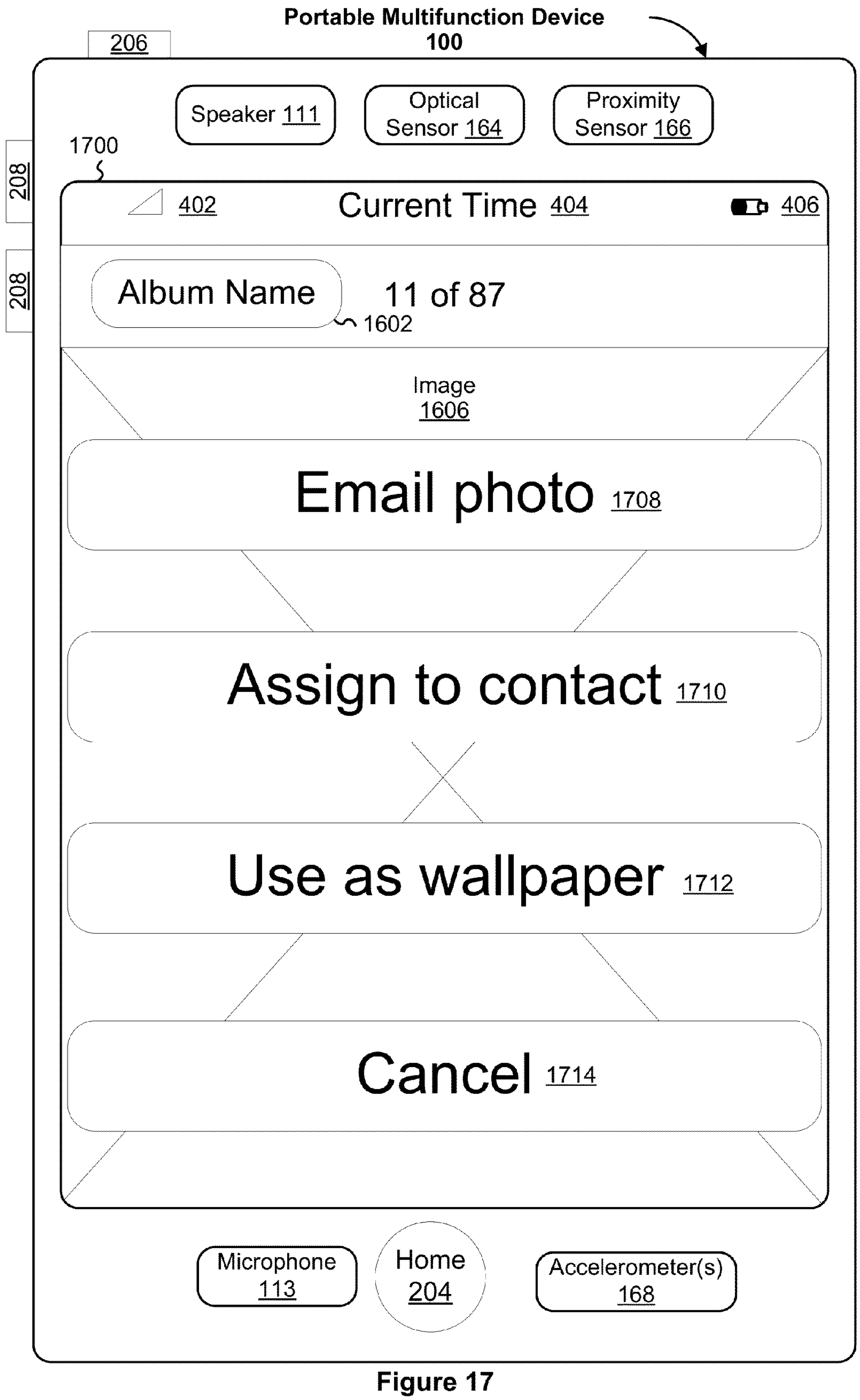
FIG. 17 illustrates an exemplary user interface for selecting a use for an image in an album in accordance with some embodiments.
Figure 19A:
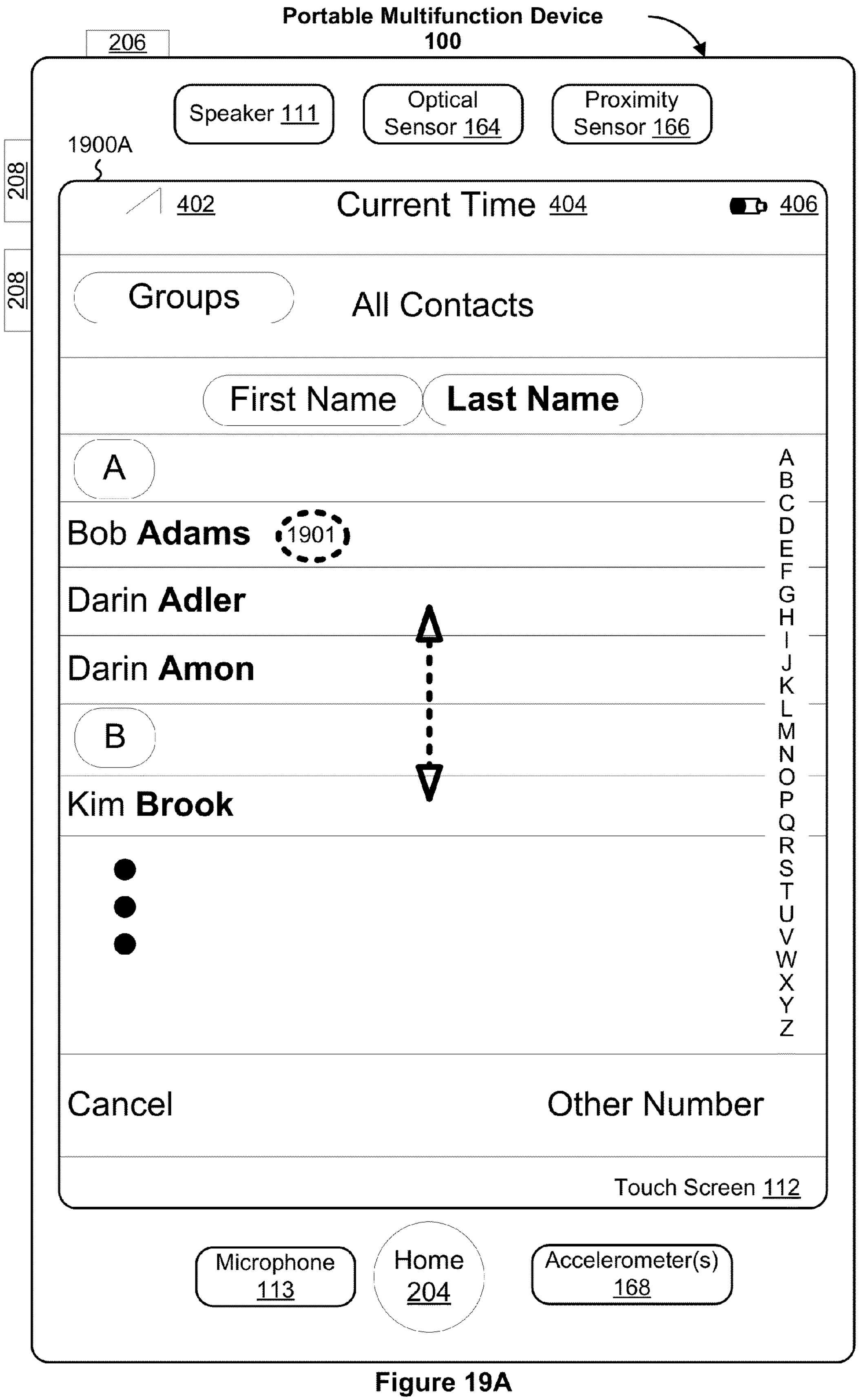
FIGS. 19A and 19B illustrate an exemplary user interface for assigning an image to a contact in the user's contact list in accordance with some embodiments.
Figure 19B:
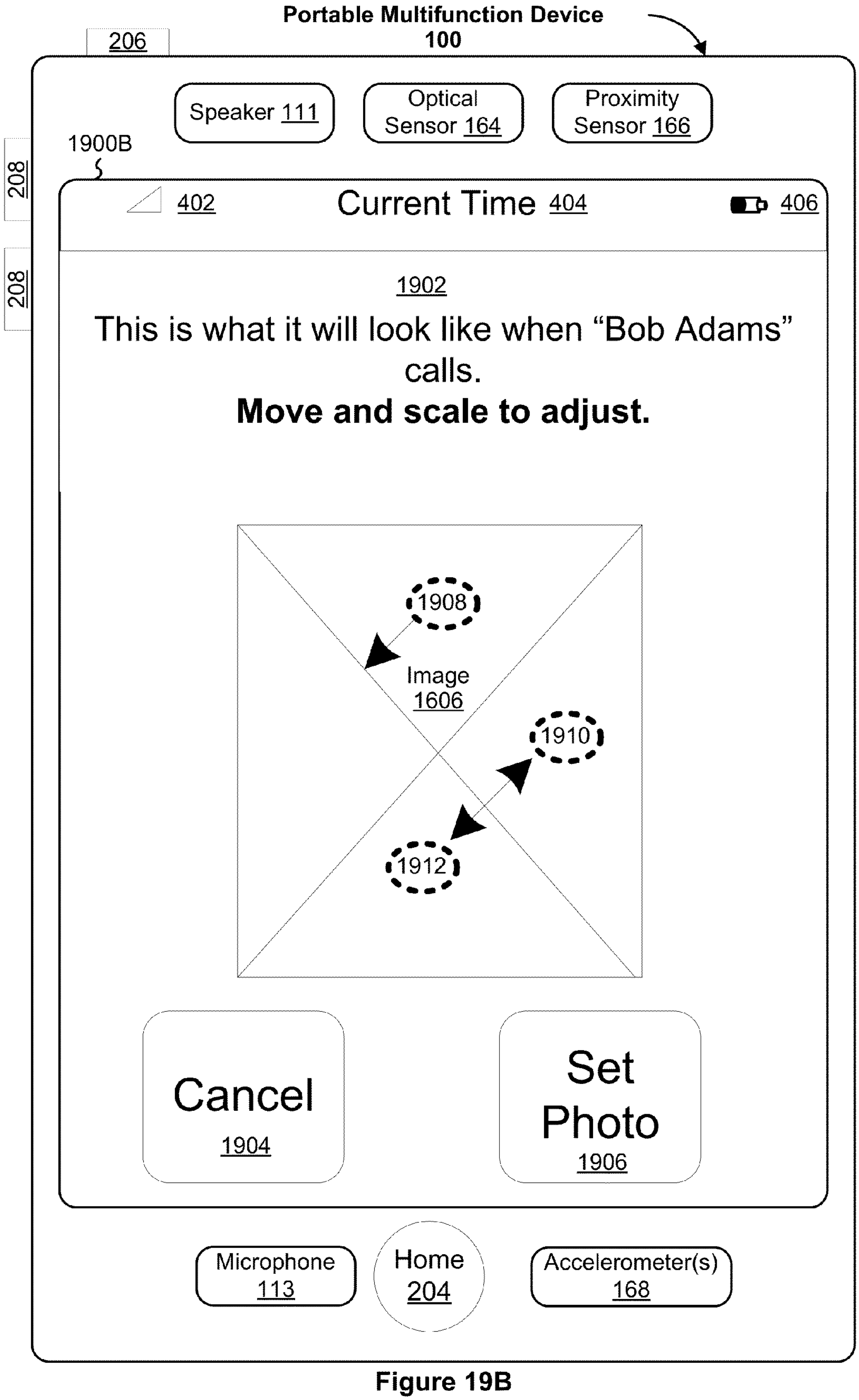
Figure 20:
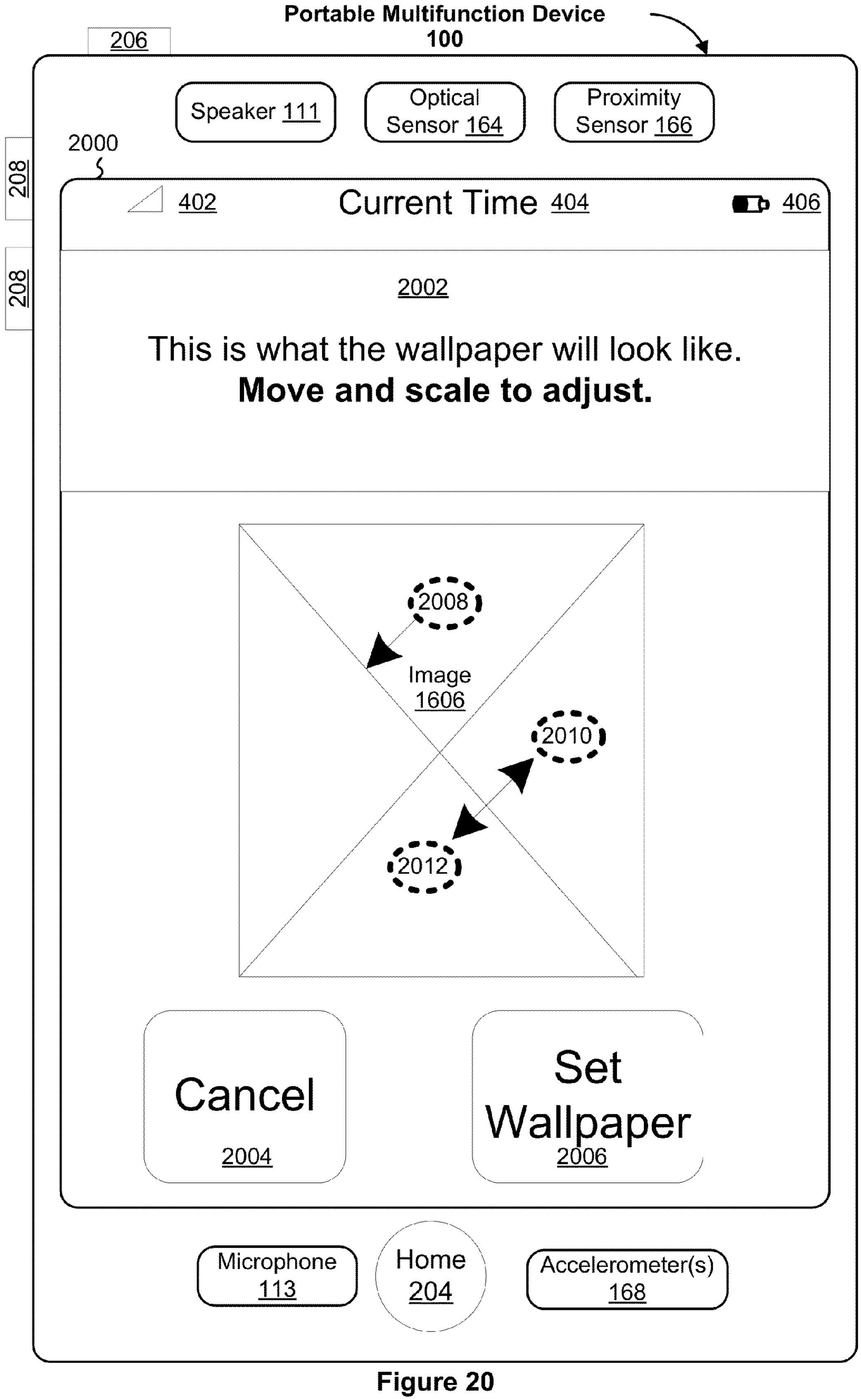
FIG. 20 illustrates an exemplary user interface for incorporating an image in the user's wallpaper in accordance with some embodiments.

FIG. 17 illustrates an exemplary user interface for selecting a use for an image in an album in accordance with some embodiments. In some embodiments, user interface 1700 includes the following elements, or a subset or superset thereof:

402, 404, 406, 1602, and 1606 as described above;

Email photo icon 1708 that when activated (e.g., by a finger tap on the icon) initiates a process for incorporating the image 1606 in an email (e.g., as illustrated in FIGS. 18A-18J);

Assign to contact icon 1710 that when activated (e.g., by a finger tap on the icon) initiates a process for associating the image 1606 with a contact in the user's contact list (e.g., as illustrated in FIGS. 19A-19B);

Use as wallpaper icon 1712 that when activated (e.g., by a finger tap on the icon) initiates a process for incorporating the image 1606 in the user's wallpaper (e.g., as illustrated in FIG. 20); and Cancel icon 1714 that when activated (e.g., by a finger tap on the icon) initiates transfer back to the previous UI (e.g., UI 1600A).

FIGS. 18A-18J illustrate an exemplary user interface for incorporating an image 1606 in an email in accordance with some embodiments.

Figure 18A:
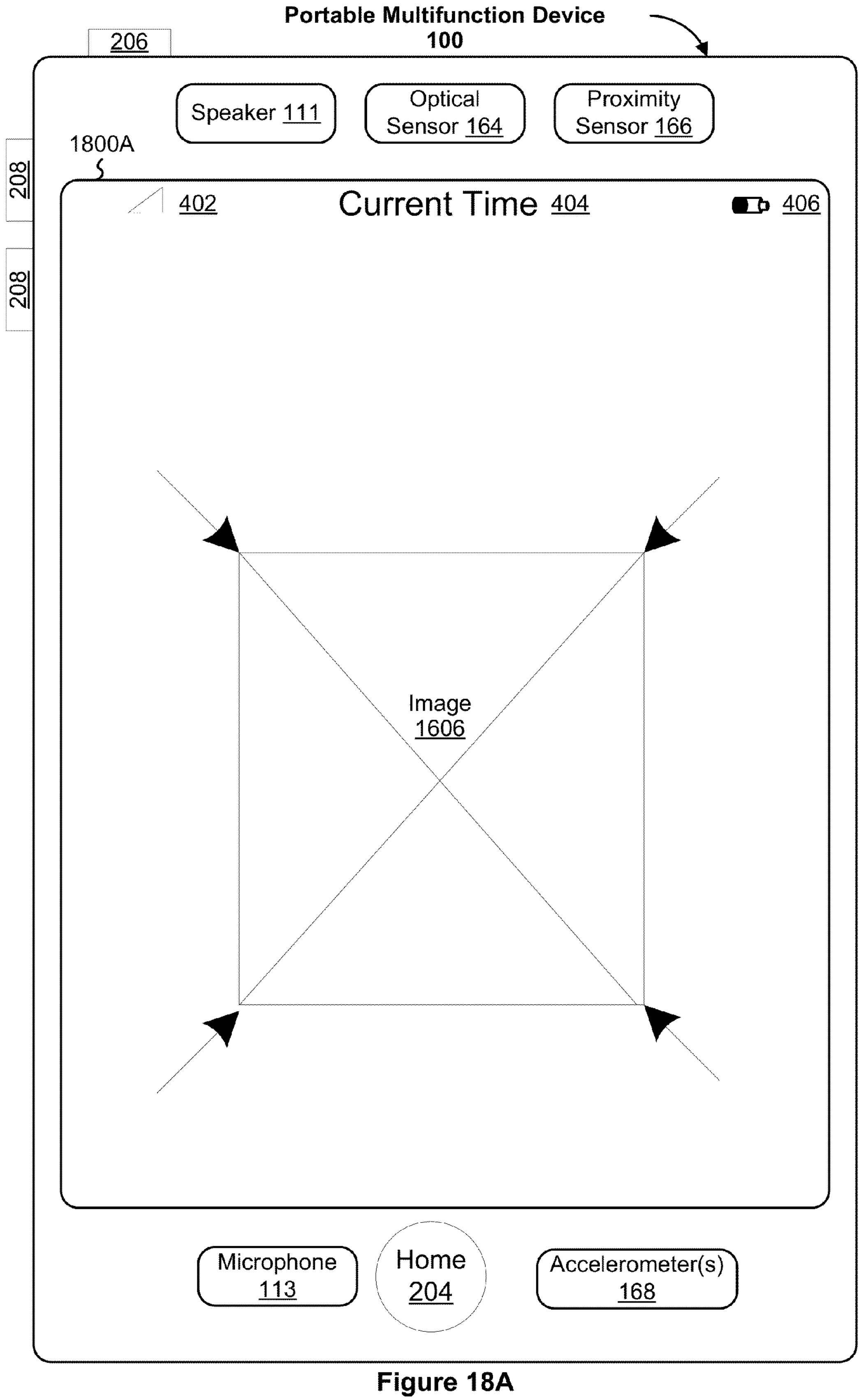
FIGS. 18A-18J illustrate an exemplary user interface for incorporating an image in an email in accordance with some embodiments.
Figure 18B:
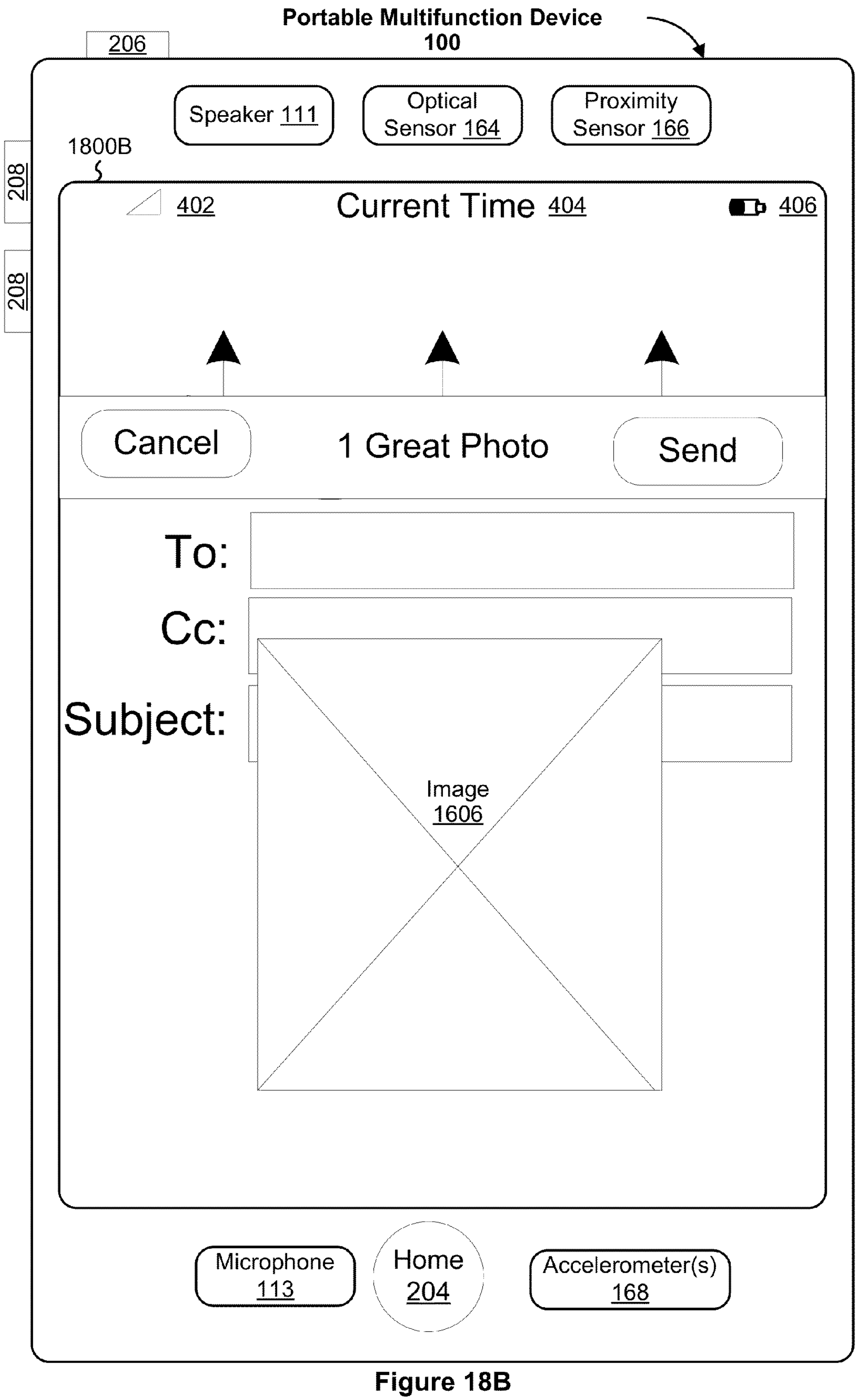
Figure 18C:
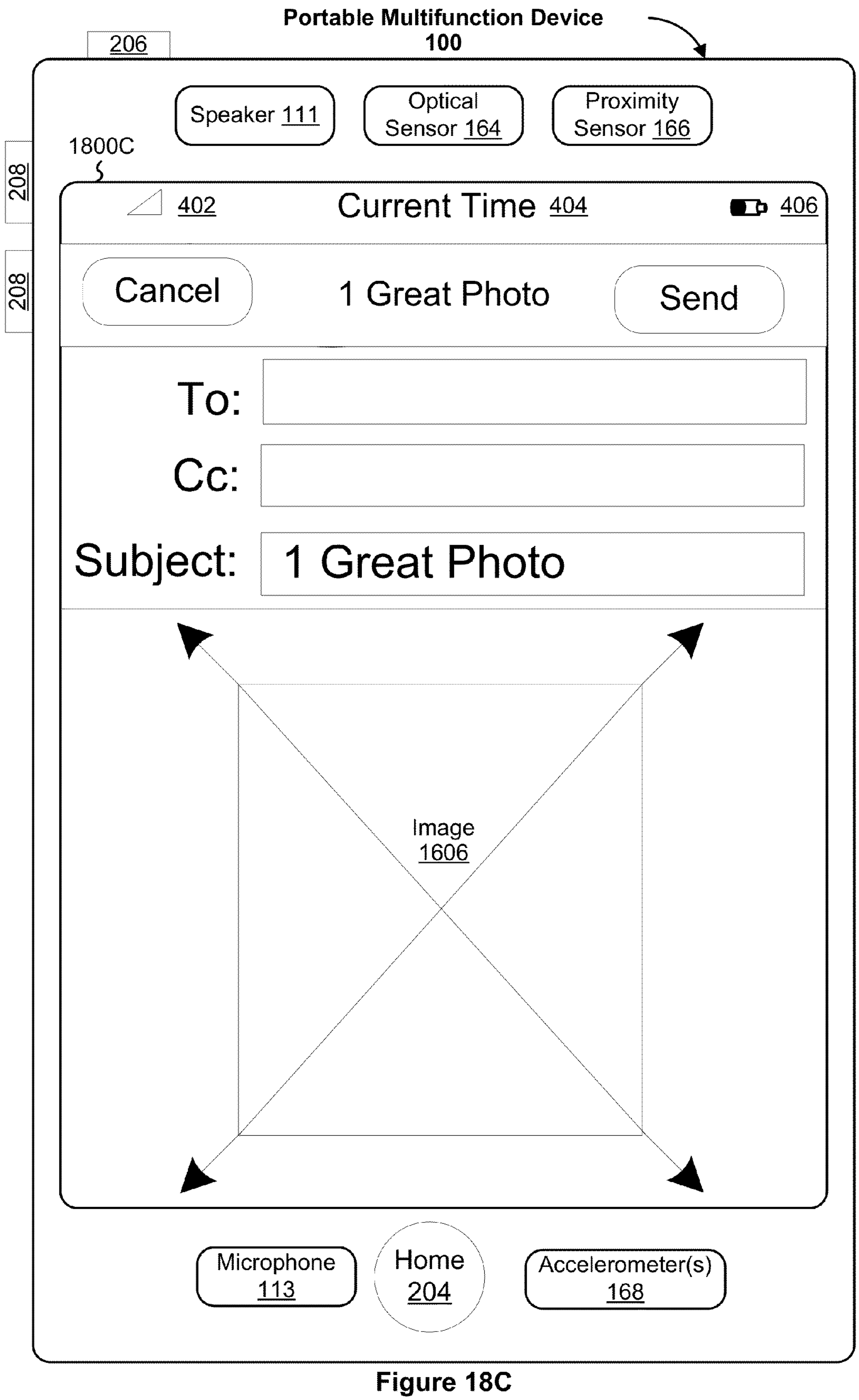

In response to the user activating Email photo icon 1708, the device displays an animation to show that the image has been placed into an email message, ready for text input, addressing, and sending. In some embodiments, the animation includes initially shrinking the image (FIG. 18A); sliding or otherwise forming an email message template behind the image 1606 (FIG. 18B); and expanding the image (FIG. 18C).

Figure 18D:
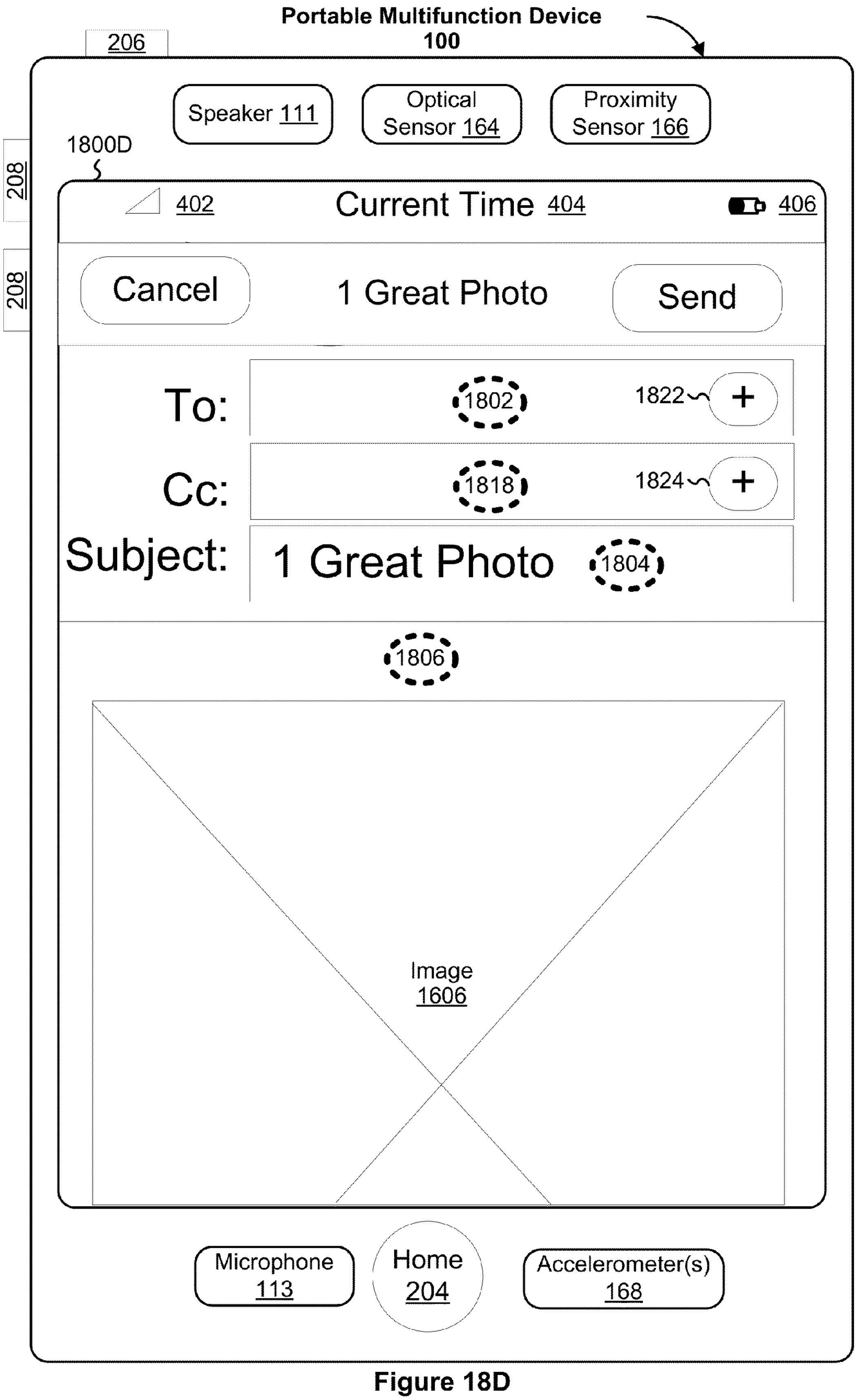
Figure 18E:
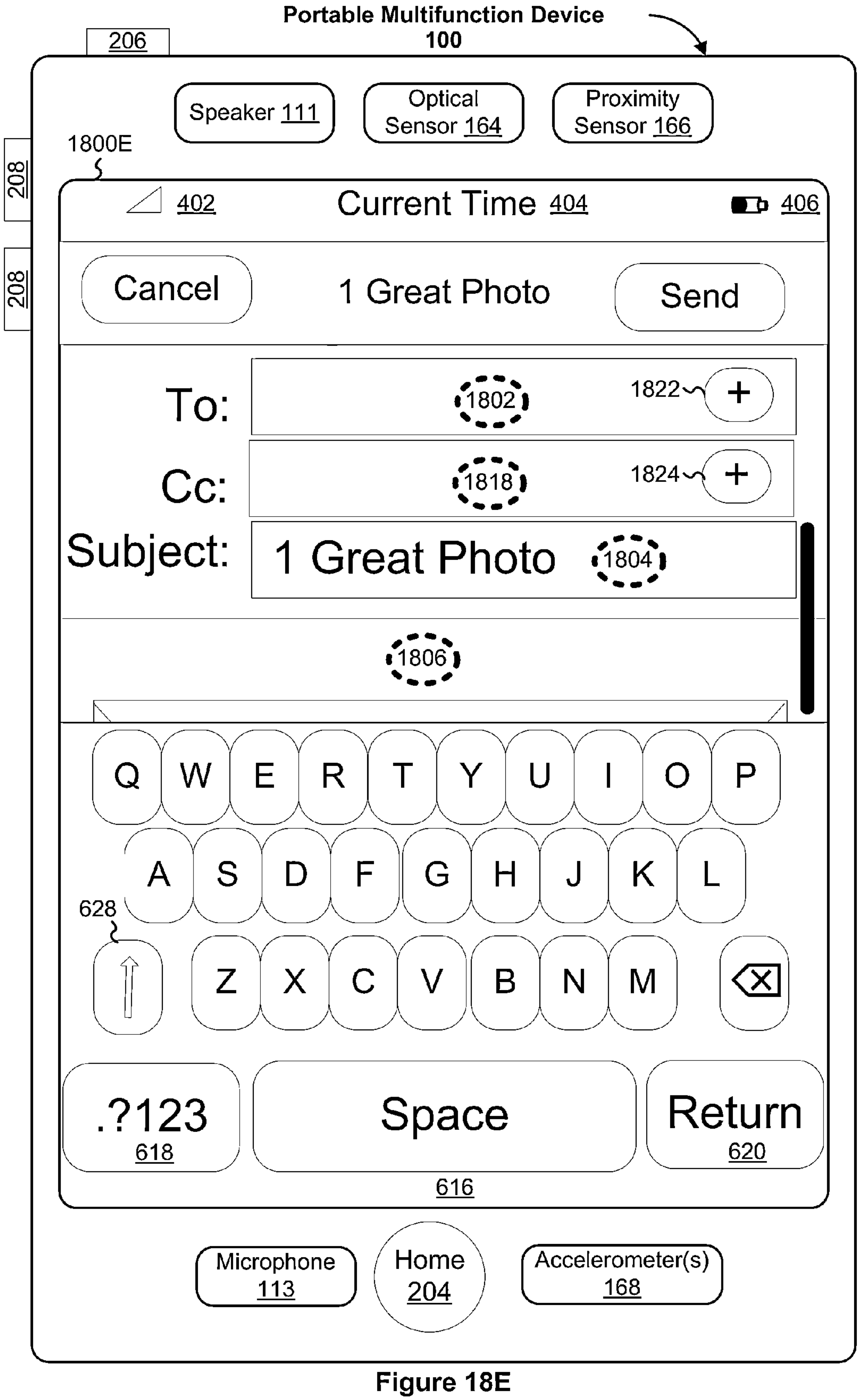

In some embodiments, if the user makes a tap or other predefined gesture on the subject line 1804 or in the body of the email 1806 (FIG. 18D), a letter keyboard 616 appears and the user may input the subject and/or body text (FIG. 18E).

Figure 18F:
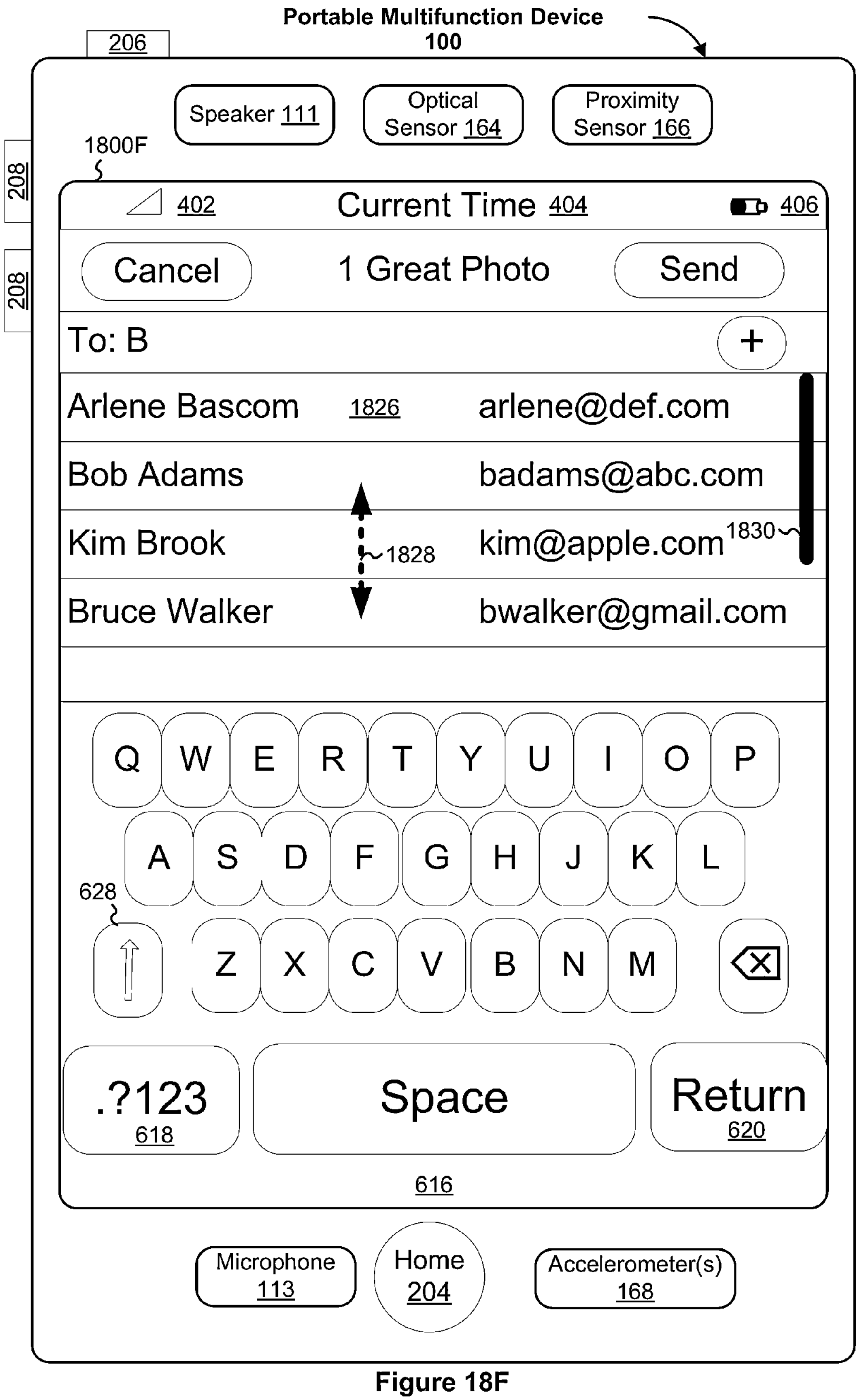
Figure 18G:
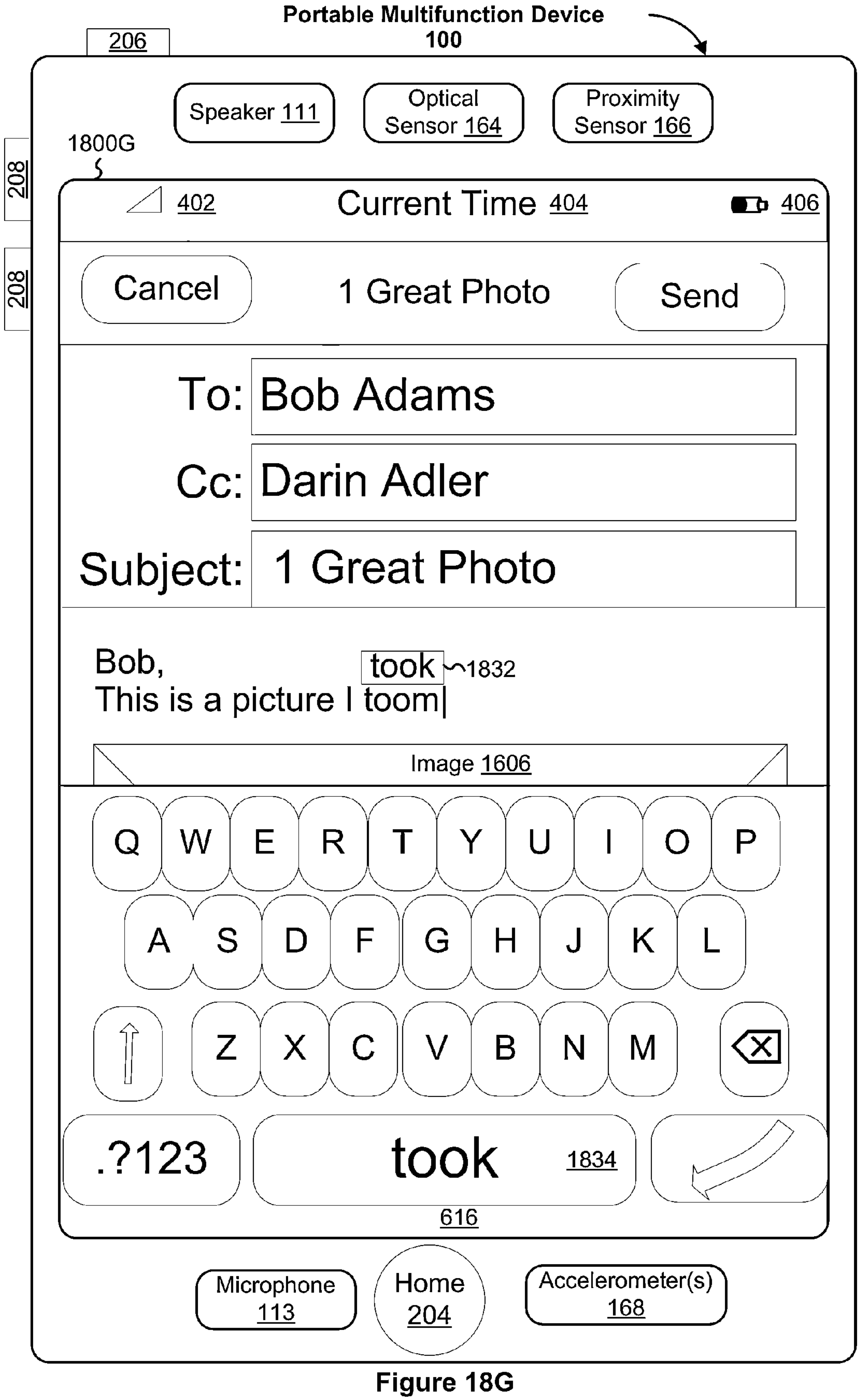

In some embodiments, to enter the email address, the user makes a tap or other predefined gesture on the To: line 1802 of the email (FIG. 18E); the user's contact list appears (FIG. 18J); the user makes a tap or other predefined gesture on the desired recipient/contact (e.g., tapping 1816 on Bob Adams in FIG. 18J); and the device places the corresponding email address in the email message (FIG. 18G). If others need to be copied on the email, the user makes a tap or other predefined gesture on the CC: line 1818 of the email; the user's contact list appears (FIG. 18J); the user makes a tap or other predefined gesture on the desired recipient/contact (e.g., tapping 1820 on Darin Adler in FIG. 18J); and the device places the corresponding email address in the email message (FIG. 18G).

In some embodiments, to enter the email address, the user makes a tap or other predefined gesture on the To: line 1802 of the email (FIG. 18E). Add recipient icon 1822 appears, which when activated (e.g., by a finger tap on the icon 1822) initiates the display of a scrollable list of contacts (e.g., 1826, FIG. 18F) that match the input, if any, in the To: field. For example, if the letter "B" is input, then contacts with either a first name or last name beginning with "B" are shown. If the letters "Bo" are input in the To: field, then the list of contacts is narrowed to contacts with either a first name or last name beginning with "Bo", and so on until one of the displayed contacts is selected (e.g., by a tap on a contact in the list 1826, FIG. 18F). If others need to be copied on the email, the user makes a tap or other predefined gesture on the CC: line 1818 of the email and follows an analogous procedure to that used for inputting addresses in the To: field.

In some embodiments, a user can scroll through the list 1826 by applying a vertical swipe gesture 1828 to the area displaying the list 1826 (FIG. 18F). In some embodiments, a vertically downward gesture scrolls the list downward and a vertically upward gesture scrolls the list upward, In some embodiments, a vertical bar 1830 (FIG. 18F) is displayed temporarily after an object is detected on or near the touch screen display (e.g., a finger touch is detected anywhere on the list 1826). In some embodiments, the vertical bar 1830 has a vertical position on top of the displayed portion of the list that corresponds to the vertical position in the list of the displayed portion of the list. In some embodiments, the vertical bar 1830 has a vertical length that corresponds to the portion of the list being displayed.

In some embodiments, the user may also enter the email address using one or more keyboards (e.g., 616 and 624, not shown).

Figure 18H:
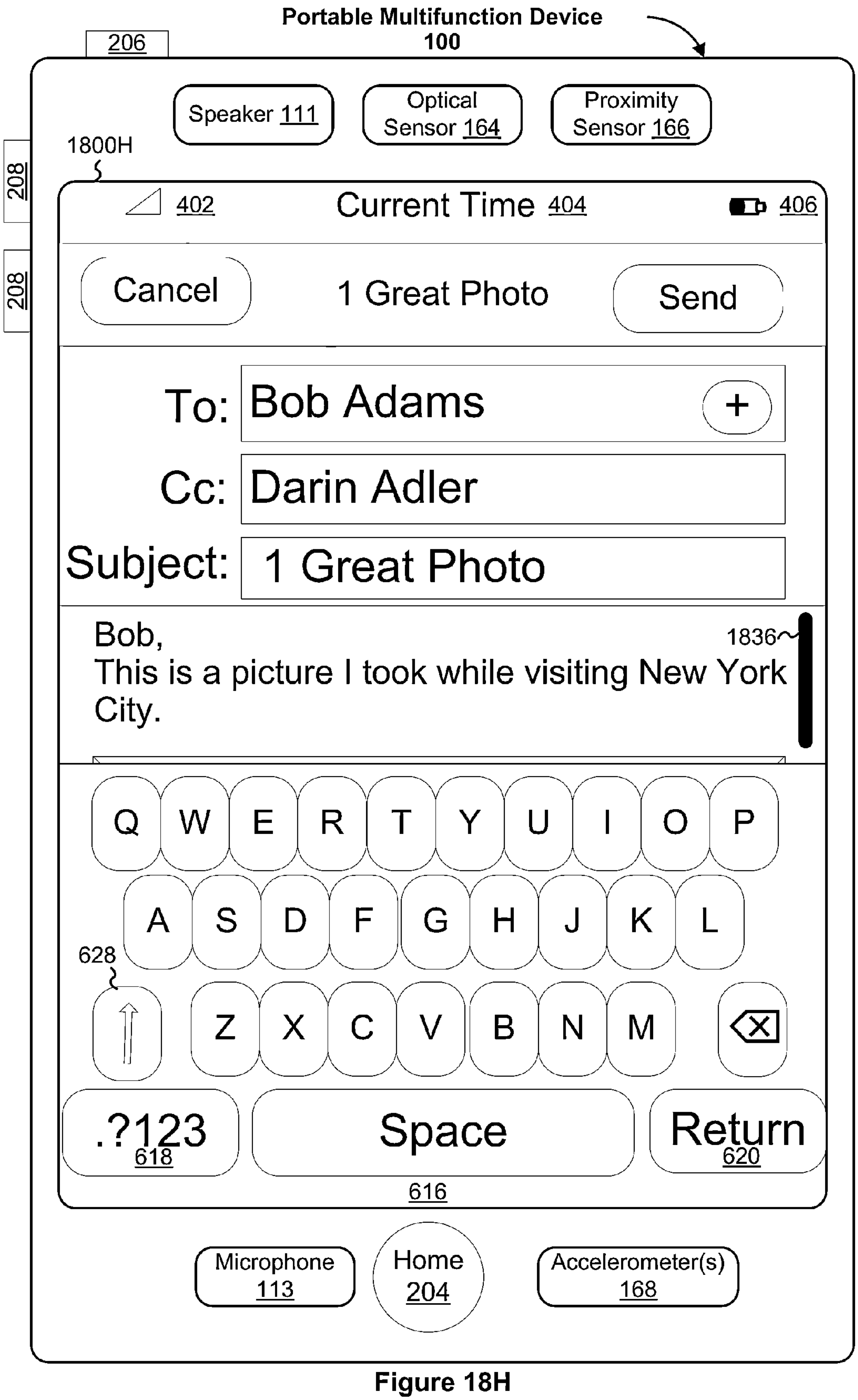
Figure 18I:
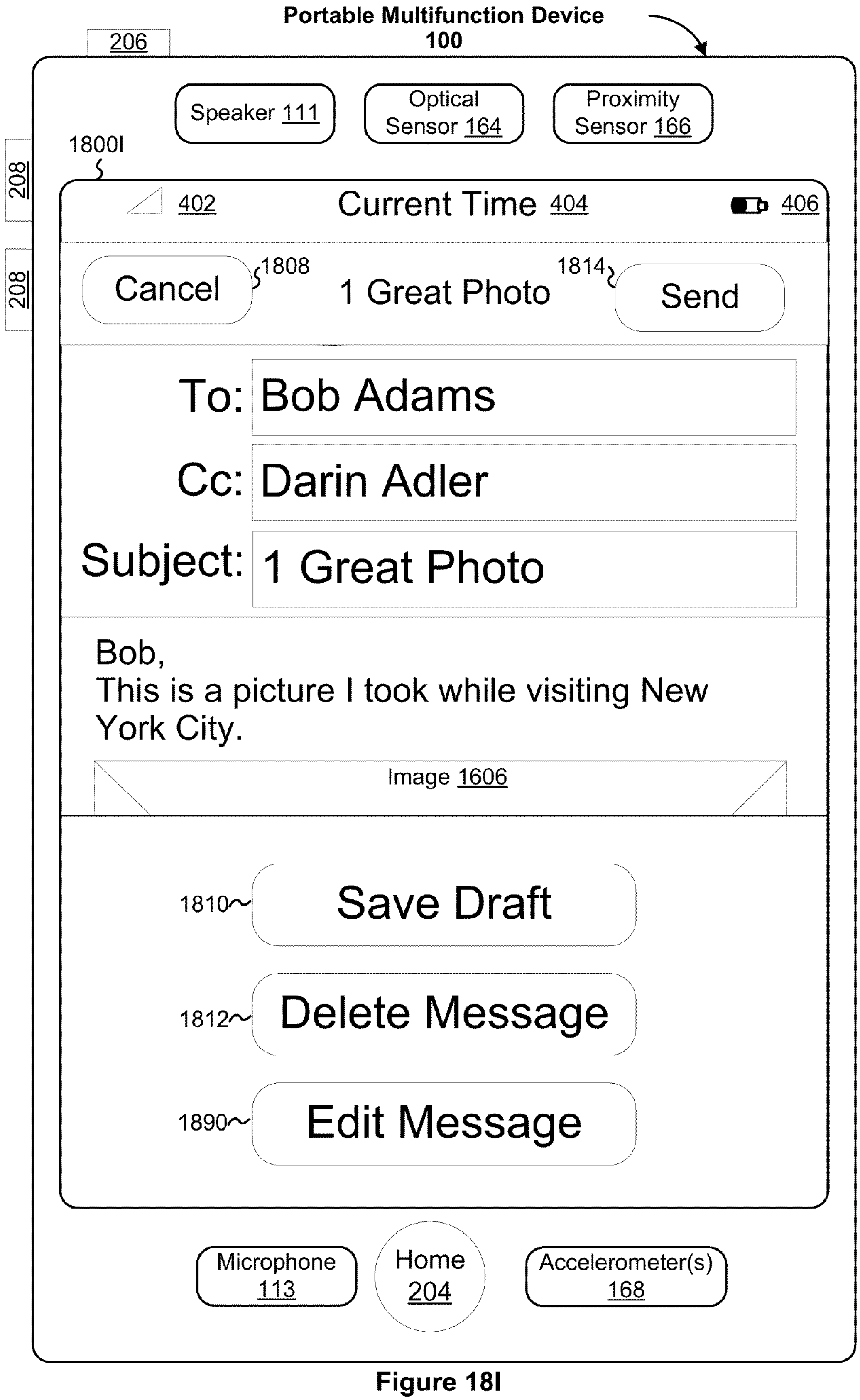
Figure 18J:
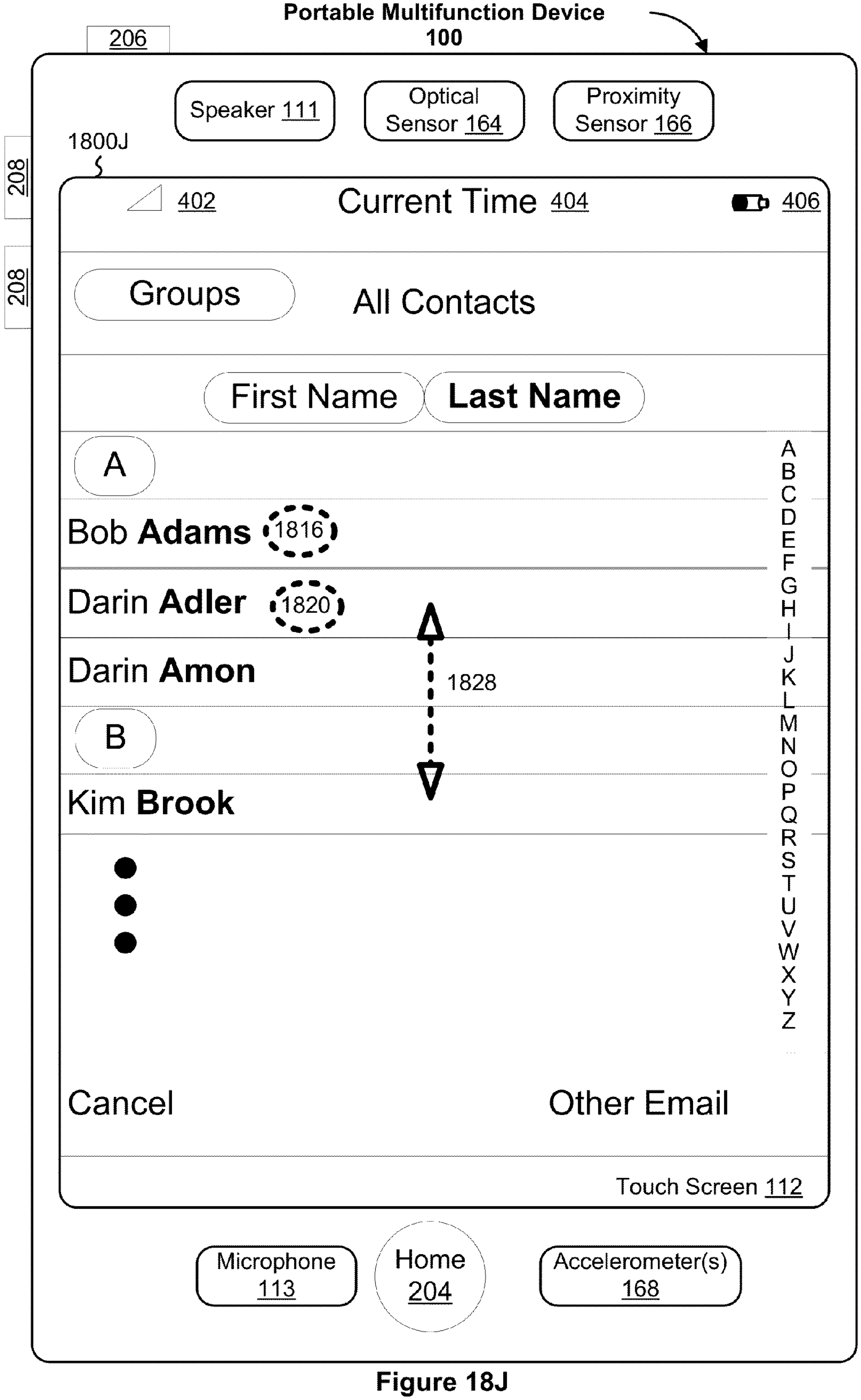

In some embodiments, as the user types the email message, a suggested word 1832 appears adjacent to the word being typed and/or in the space bar 1834 (FIG. 18G). Activating suggested word 1832 (e.g., by a finger tap on the suggested word) replaces the word being typed with the suggested word 1832 (FIG. 18H). Activating suggested word 1834 (e.g., by a finger tap on the space bar) replaces the word being typed with the suggested word 1834 (FIG. 18H). In some embodiments, a user can set whether suggested words 1832 and/or 1834 are shown (e.g., by setting a user preference). Additional descriptions of word suggestion can be found in U.S. patent application Ser. No. 11/620,641, "Method, System, And Graphical User Interface For Providing Word Recommendations for Text Input," filed Jan. 5, 2007) and U.S. patent application Ser. No. 11/620,642, "Method, System, And Graphical User Interface For Providing Word Recommendations," filed Jan. 5, 2007, the contents of which are hereby incorporated by reference.

In some embodiments, a vertical bar 1836 (FIG. 18H), analogous to the vertical bars described above, is displayed on top of the body of the email that helps a user understand what portion of the email is being displayed.

Figure 33:
FIG. 33 illustrates an exemplary user interface for organizing and managing email in accordance with some embodiments.

The device sends the email message in response to the user activating the send icon 1814 (FIG. 18I) (e.g., by a finger tap on the icon). Alternatively, if the user activates the cancel icon 1808, the device may display the save draft icon 1810, the don't save (or delete message) icon 1812, and the edit message icon 1890. The device saves the draft if the user activates the save draft icon 1810, e.g., in a drafts folder in email client 140 (FIG. 33). The device deletes the draft if the user activates the don't save icon 1812. The device returns to editing the draft if the user activates the edit message icon 1890.

FIGS. 19A and 19B illustrate an exemplary user interface for assigning an image 1606 to a contact in the user's contact list in accordance with some embodiments.

In some embodiments, in response to the user activating assign to contact icon 1710, the device displays the user's contact list (FIG. 19A). In response to the user selecting a contact in the contact list (e.g., selecting Bob Adams with a tap 1901 in UI 1900A, FIG. 19A), the device displays a user interface (e.g., UI 1900B, FIG. 19B) that lets the user crop, scale, and otherwise adjust the image for the selected contact. In some embodiments, the user may move the image with a one-finger gesture 1908; enlarge the image with a de-pinching gesture using multiple contacts 1910 and 1912; reduce the image with a pinching gesture using multiple contacts 1910 and 1912; and/or rotate the image with a twisting gesture using multiple contacts 1910 and 1912. In some embodiments, in response to the user activating a set photo icon 1906, the device assigns the adjusted image to the selected contact. Alternatively, in response to the user activating a cancel icon 1904, the device stops the assignment process. In some embodiments, the interface 1900B may include information 1902 to help guide the user.

FIG. 20 illustrates an exemplary user interface for incorporating an image 1606 in the user's wallpaper in accordance with some embodiments.

In some embodiments, in response to the user activating use as wallpaper icon 1712, the device displays a user interface (e.g., UI 2000, FIG. 20) that lets the user crop, scale, and otherwise adjust the image. In some embodiments, the user may move the image with a one-finger gesture 2008; enlarge the image with a de-pinching gesture using multiple contacts 2010 and 2012; reduce the image with a pinching gesture using multiple contacts 2010 and 2012; and/or rotate the image with a twisting gesture using multiple contacts 2010 and 2012. In some embodiments, in response to the user activating a set wallpaper icon 2006, the device assigns the adjusted image as wallpaper. Alternatively, in response to the user activating a cancel icon 2004, the device stops the assignment process. In some embodiments, the interface 2000 may include information 2002 to help guide the user.

Additional description of image management can be found in U.S. Provisional Patent Application Nos. 60/883,785, "Portable Electronic Device For Photo Management," filed Jan. 6, 2007 and 60/947,118, "Portable Electronic Device For Photo Management," filed Jun. 29, 2007, the contents of which are hereby incorporated by reference.

Video Player

Figure 21A:
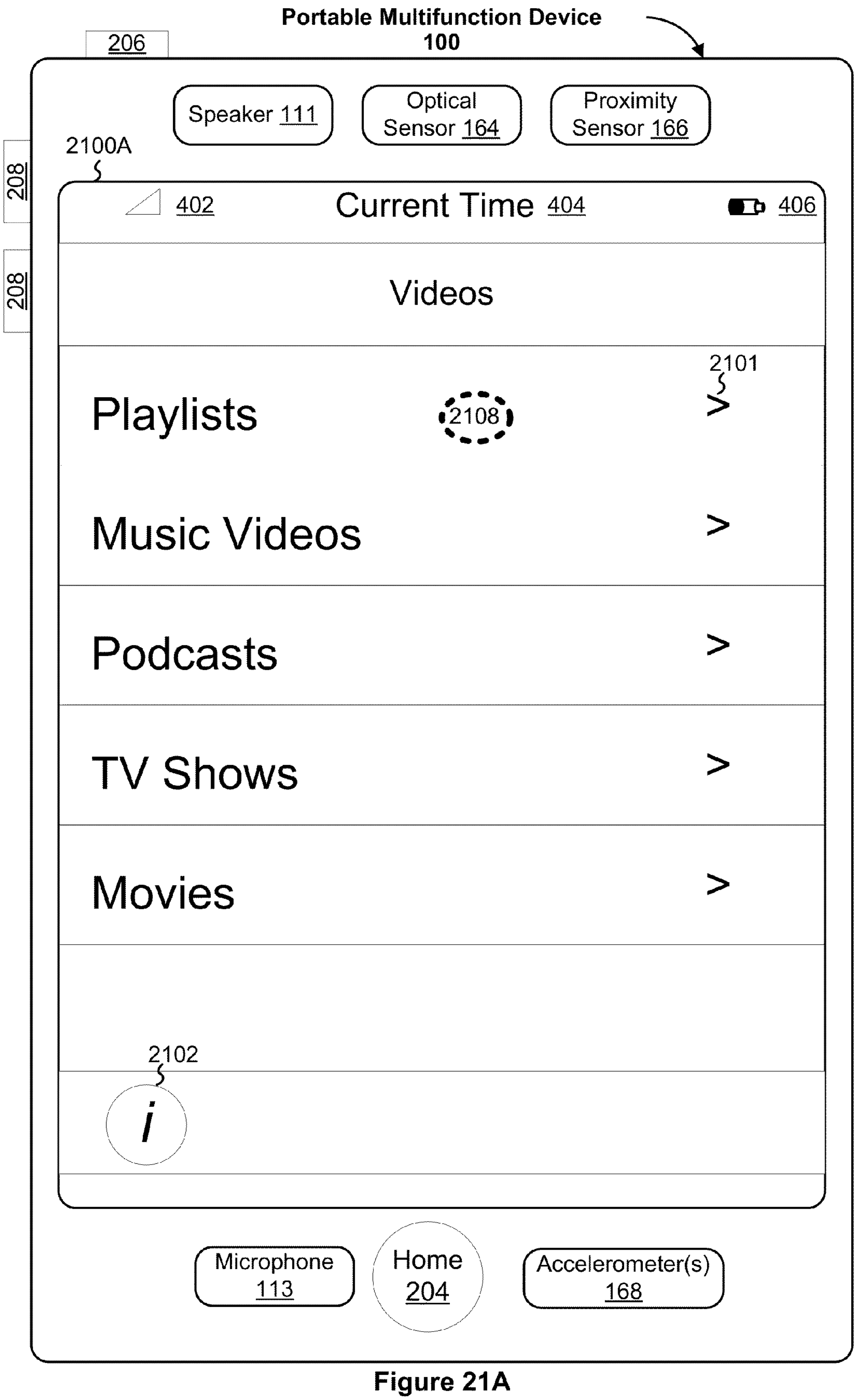
FIGS. 21A-21C illustrate an exemplary user interface for organizing and managing videos in accordance with some embodiments.
Figure 21B:
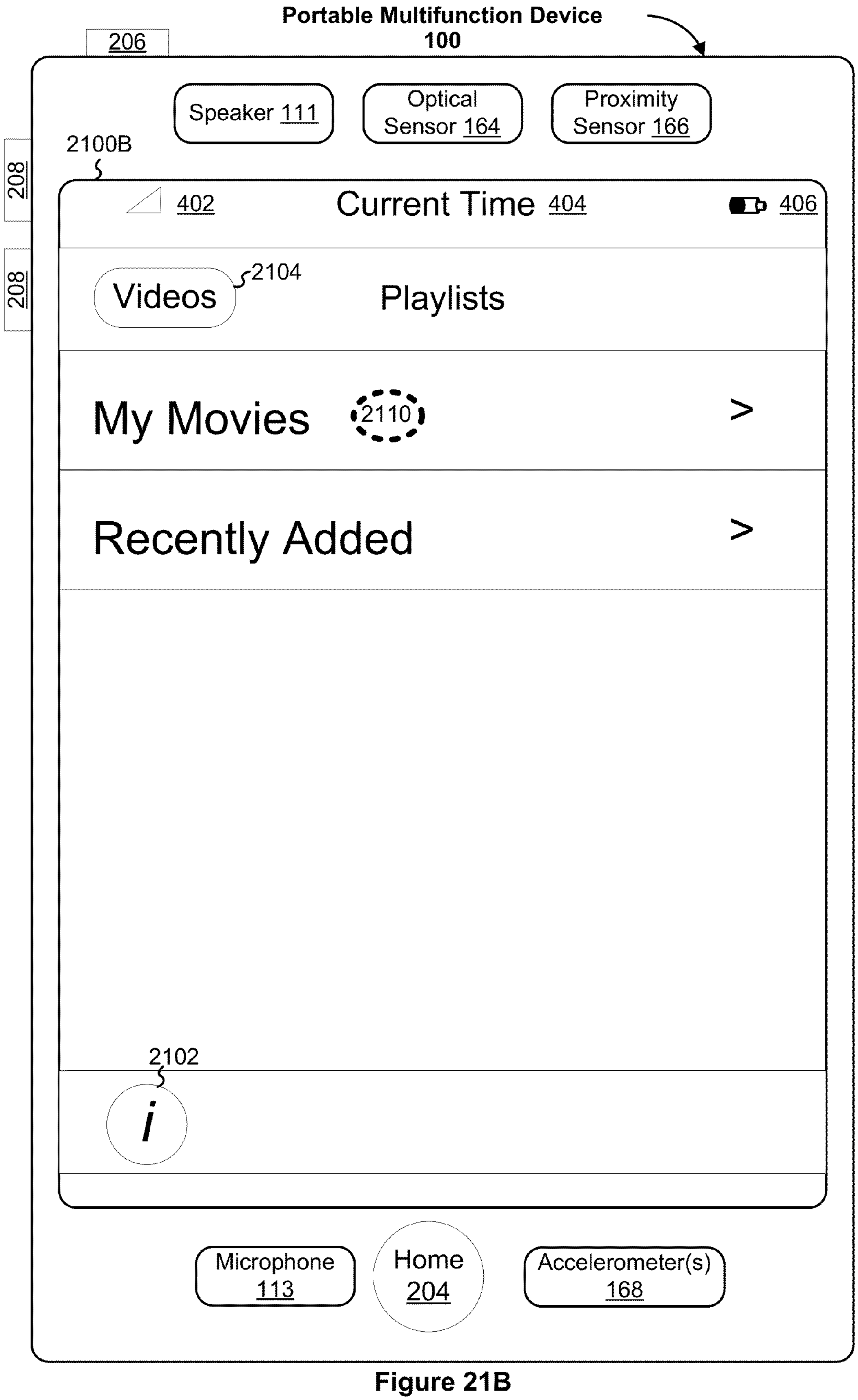
Figure 21C:
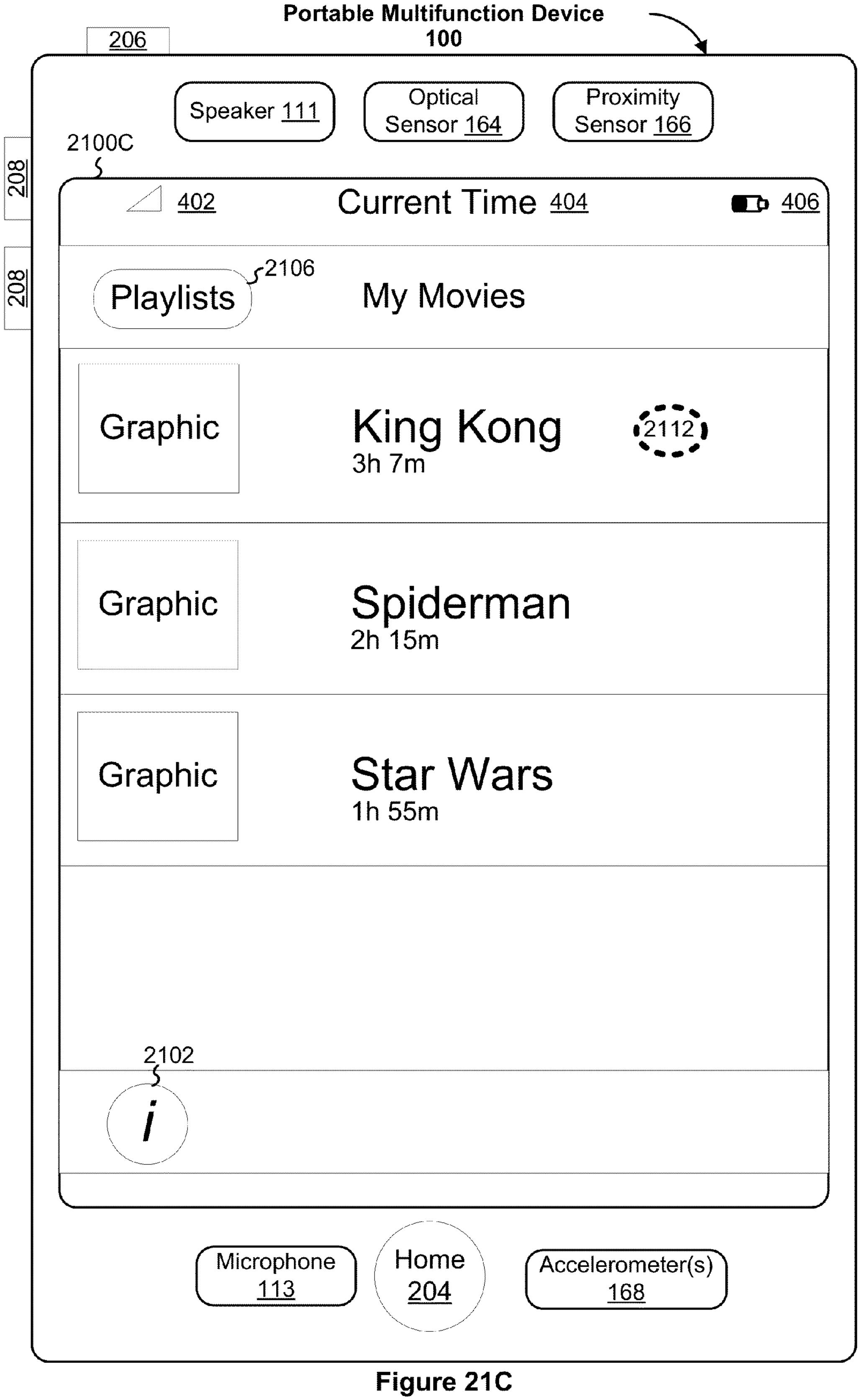

FIGS. 21A-21C illustrate an exemplary user interface for organizing and managing videos in accordance with some embodiments.

In some embodiments, in response to a series of gestures (e.g., finger taps) by the user, the device displays a series of video categories and sub-categories. For example, if the user activates selection icon 2101 (e.g., by a finger tap on the icon) or, in some embodiments, taps anywhere in the Playlists row 2108, the UI changes from a display of video categories (UI 2100A, FIG. 21A) to a display of Playlist sub-categories (UI 2100B, FIG. 21B). In turn, if the user activates the selection icon for My Movies (e.g., by a finger tap on the icon) or, in some embodiments, taps anywhere in the My Movies row 2110, the UI changes from a display of Playlist sub-categories (UI 2100B, FIG. 21B) to a display of My Movies sub-categories (UI 2100C, FIG. 21C), and so forth.

In some embodiments, in response to a series of gestures (e.g., finger taps) by the user, the device navigates back up through the hierarchy of video categories and sub-categories. For example, if the user activates Playlists icon 2106 (e.g., by a finger tap on the icon), the UI changes from a display of My Movies sub-categories (UI 2100C, FIG. 21C) to a display of Playlist sub-categories (UI 2100B, FIG. 21B). In turn, if the user activates the Videos icon 2104 (e.g., by a finger tap on the icon), the UI changes from a display of Playlist sub-categories (UI 2100B, FIG. 21B) to a display of video categories (UI 2100A, FIG. 21A). As another example, if the device detects a horizontal swipe gesture (e.g., a left to right swipe gesture), the device may navigate up one level in the hierarchy of video categories and sub-categories. More generally, in response to detecting a horizontal swipe gesture (e.g., a left to right swipe gesture), the device may navigate up one level in a hierarchy of content categories, sub-categories, and content (e.g., from UI 4300 S (FIG. 43S) for an individual song to a UI 4300R (FIG. 43R) for an album; from UI 4300R (FIG. 43R) for an album to UI 4300Q for a list of albums; and so on).

Figure 23A:
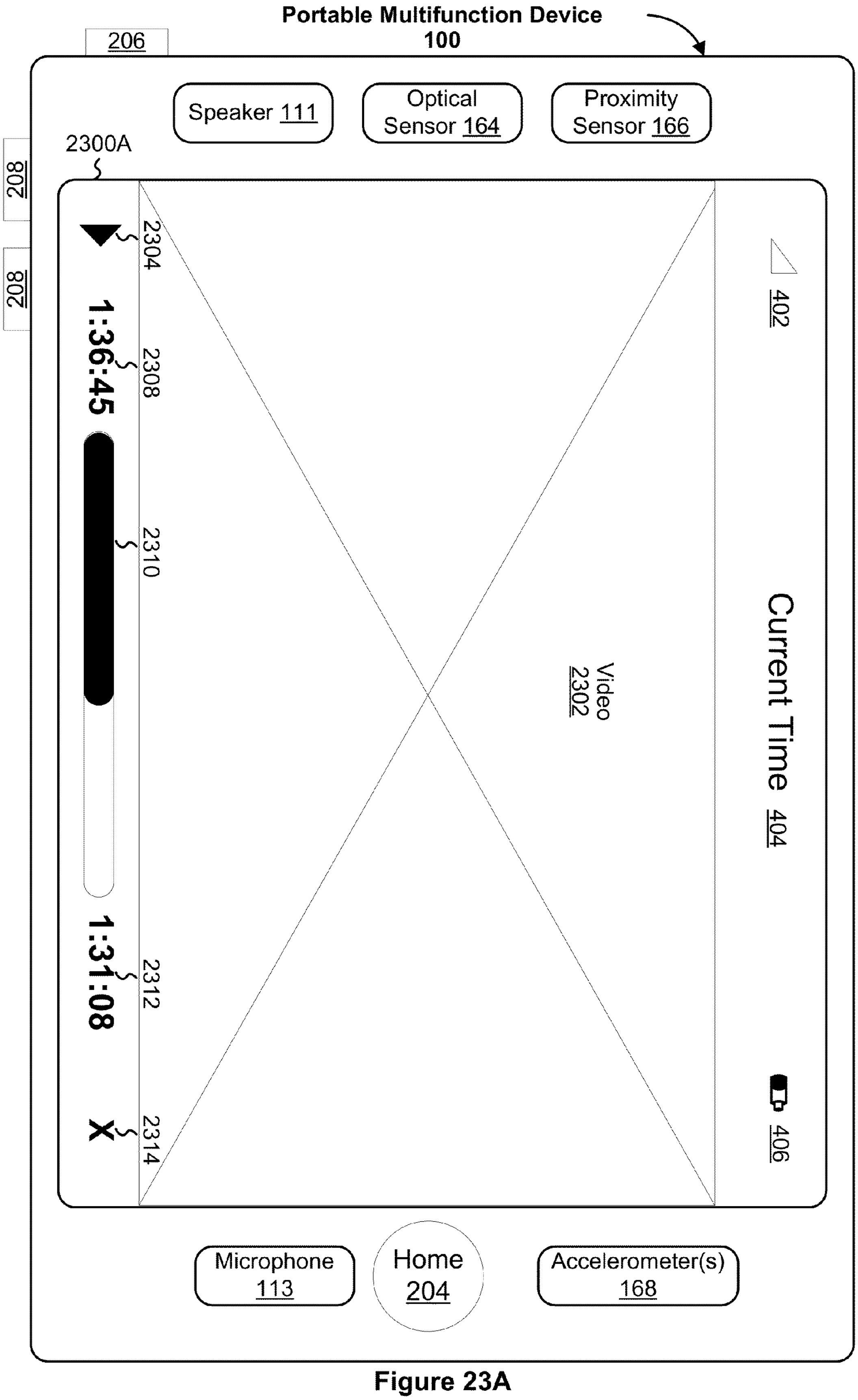
FIG. 23A-23D illustrate exemplary user interfaces for a video player in accordance with some embodiments.

In some embodiments, in response to user selection of a particular video (e.g., by a tap or other predefined gesture on the graphic, title, or anywhere 2112 (FIG. 21C) in the row for a particular video), the device displays the selected video (e.g., King Kong) in a video player UI (e.g., UI 2300A, FIG. 23A).

In some embodiments, in response to user selection of settings icon 2102 (e.g., by a finger tap on the icon), the device displays a settings UI (UI 2200A, FIG. 22A) for a video player.

Figure 22A:
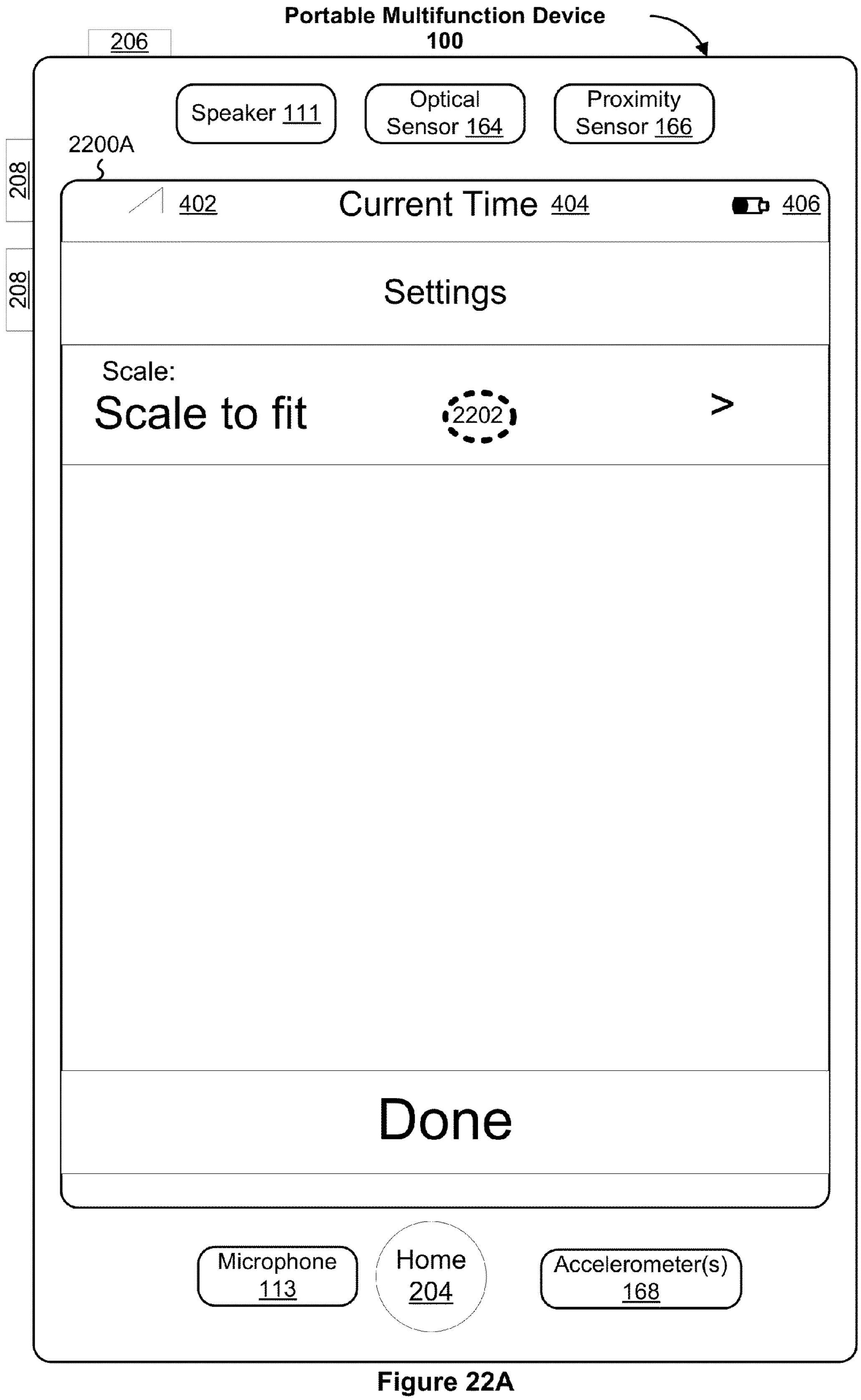
FIGS. 22A and 22B illustrate an exemplary user interface for setting user preferences for a video player in accordance with some embodiments.
Figure 22B:
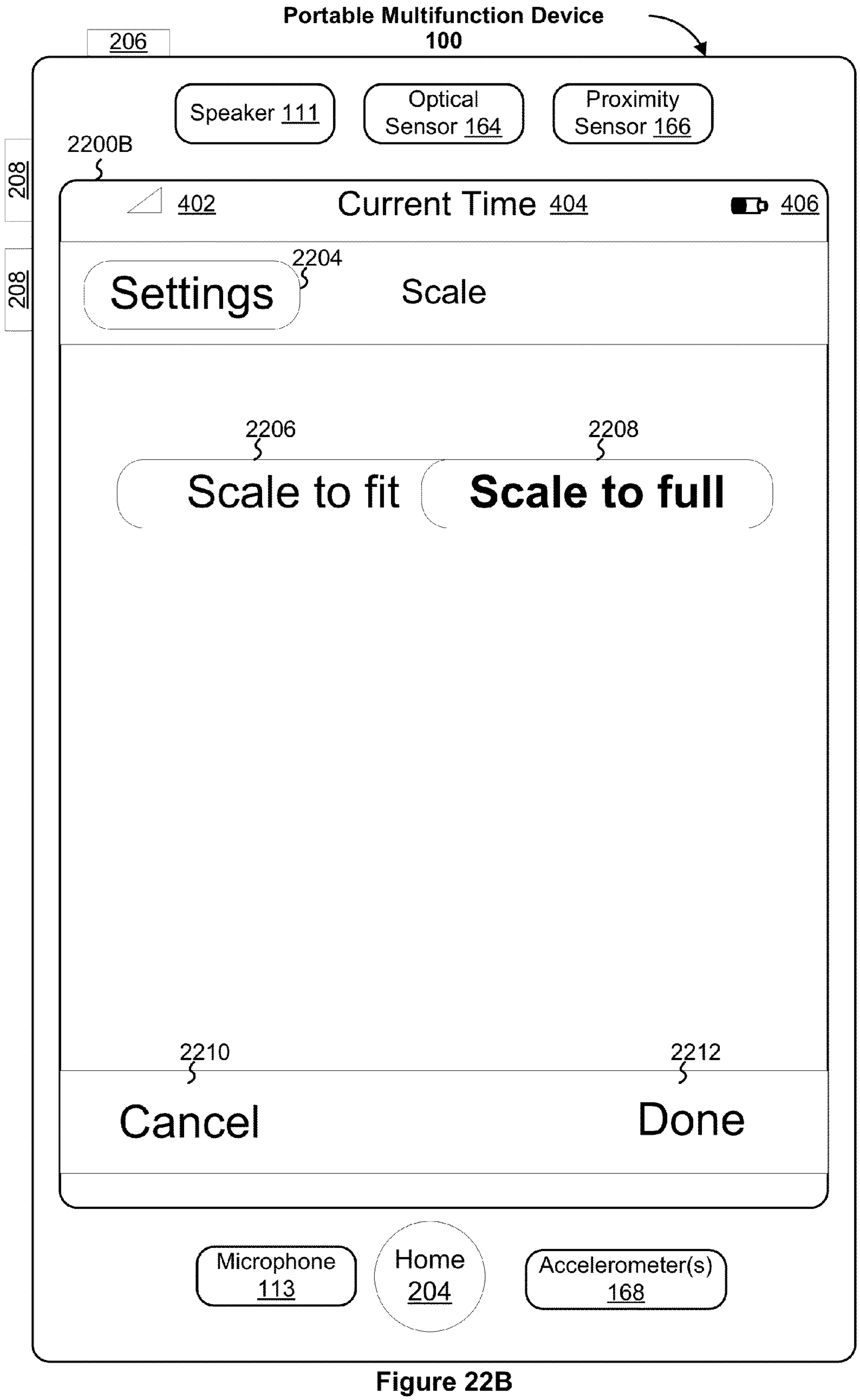

FIGS. 22A and 22B illustrate an exemplary user interface for setting user preferences for a video player in accordance with some embodiments.

In some embodiments, a user may make a tap or other predefined gesture anywhere in a row for a particular setting to initiate display of the corresponding setting choices. For example, in response to a tap 2202 on the Scale to fit setting (UI 2200A, FIG. 22A), the device displays the setting choices for scale to fit (UI 2200B, FIG. 22B).

In some embodiments, user interface 2200B includes the following elements, or a subset or superset thereof:

- 402, 404, and 406, as described above;
- Settings icon 2204 that when activated (e.g., by a finger tap on the icon) returns the device to the settings UI (e.g., UI 2200A);
- Scale to fit icon 2206 that when activated (e.g., by a finger tap on the icon) sets the video player to scale the video to fit into the touch screen 112 ("wide screen mode"), which may result in two horizontal black bands at the top and bottom of the display for wide-screen movies;
- Scale to full icon 2208 that when activated (e.g., by a finger tap on the icon) sets the video player to fill the touch screen 112 with the video ("full screen mode");
- Cancel icon 2210 that when activated (e.g., by a finger tap on the icon) returns the device to the previous UI (e.g., UI 2200A) without saving any changes selected by the user; and
- Done icon 2212 that when activated (e.g., by a finger tap on the icon) saves the setting selected by the user and returns the device to the previous UI (e.g., UI 2200A);

In some embodiments, the settings in FIG. 22A are incorporated into settings 412 (FIG. 4B) and settings icon 2102 need not be displayed in the video application 145 (e.g., FIG. 21A-21C). In some embodiments, the settings in FIG. 22A are incorporated into the video player UI (e.g., as wide screen selector icon 2326 in FIG. 23C and full screen selector icon 2328 in FIG. 23D).

In some embodiments, a vertical bar analogous to the vertical bars described above, is displayed on top of a list of video categories (e.g., FIG. 21A), a list of subcategories (e.g., FIG. 21B), and/or a list of videos (e.g., FIG. 21C) that helps a user understand what portion of the respective list is being displayed. In some embodiments, if an entire list can be displayed simultaneously on the touch screen 112, the vertical bar is not displayed.

FIGS. 23A-23D illustrate exemplary user interfaces for a video player in accordance with some embodiments. In some embodiments, user interfaces 2300A-2300D include the following elements, or a subset or superset thereof:

- 402, 404, and 406, as described above;
- Video 2302
- Play icon 2304 that when activated (e.g., by a finger tap on the icon) initiates playing the video 2302, either from the beginning or from where the video was paused;

Pause icon 2306 that when activated (e.g., by a finger tap on the icon) initiates pausing the video 2302;

Lapsed time 2308 that shows how much of the video has been played, in units of time;

Progress bar 2310 that indicates what fraction of the video has been played and that may be used to help scroll through the video in response to a user gesture;

Remaining time 2312 that shows how much of the video remains to be played, in units of time;

Exit icon 2314 that when activated (e.g., by a finger tap on the icon) initiates exiting the video player UI (e.g., UI 2300A) and returning to another UI (e.g., UI 2100C, FIG. 2100C);

Enlarged lapsed time 2318 that may appear in response to a user gesture 2316 involving progress bar 2310;

Fast Reverse/Skip Backwards icon 2320 that when activated (e.g., by a finger tap on the icon) initiates reversing or skipping backwards through the video 2302;

Fast Forward/Skip Forward icon 2322 that when activated (e.g., by a finger tap on the icon) initiates forwarding or skipping forwards through the video 2302;

Volume adjustment slider icon 2324 that that when activated (e.g., by a finger tap on the icon) initiates adjustment of the volume of the video 2302;

Wide screen selector icon 2326 that when activated (e.g., by a finger tap on the icon) initiates display of the video in wide screen mode and toggles to icon 2328; and Full screen selector icon 2328 that when activated (e.g., by a finger tap on the icon) initiates display of the video in full screen mode and toggles to icon 2326.

In some embodiments, in response to user selection of a particular video (e.g., by a tap or other predefined gesture on the graphic, title, or anywhere 2112 in the row for a particular video in UI 2100C), the device displays the selected video (e.g., King Kong) in a video player UI (e.g., UI 2300A). In some embodiments, the device automatically displays the video in landscape mode on the touch screen, rather than in portrait mode, to increase the size of the image on the touch screen.

In some embodiments, graphics other than the video 2302 (e.g., graphics 2304, 2306, 2308, 2310, 2312, 2314, 2320, 2322, 2326 and/or 2328) may fade out if there is no contact with the touch screen 112 for a predefined time. In some embodiments, these graphics may reappear if contact is made with the touch screen, thereby producing a "heads up display" effect for these graphics. In some embodiments, for wide screen movies displayed in fit-to-screen mode, graphics may be displayed in the black horizontal bands above and below the video 2302, to avoid obscuring the video.

Figure 23B:
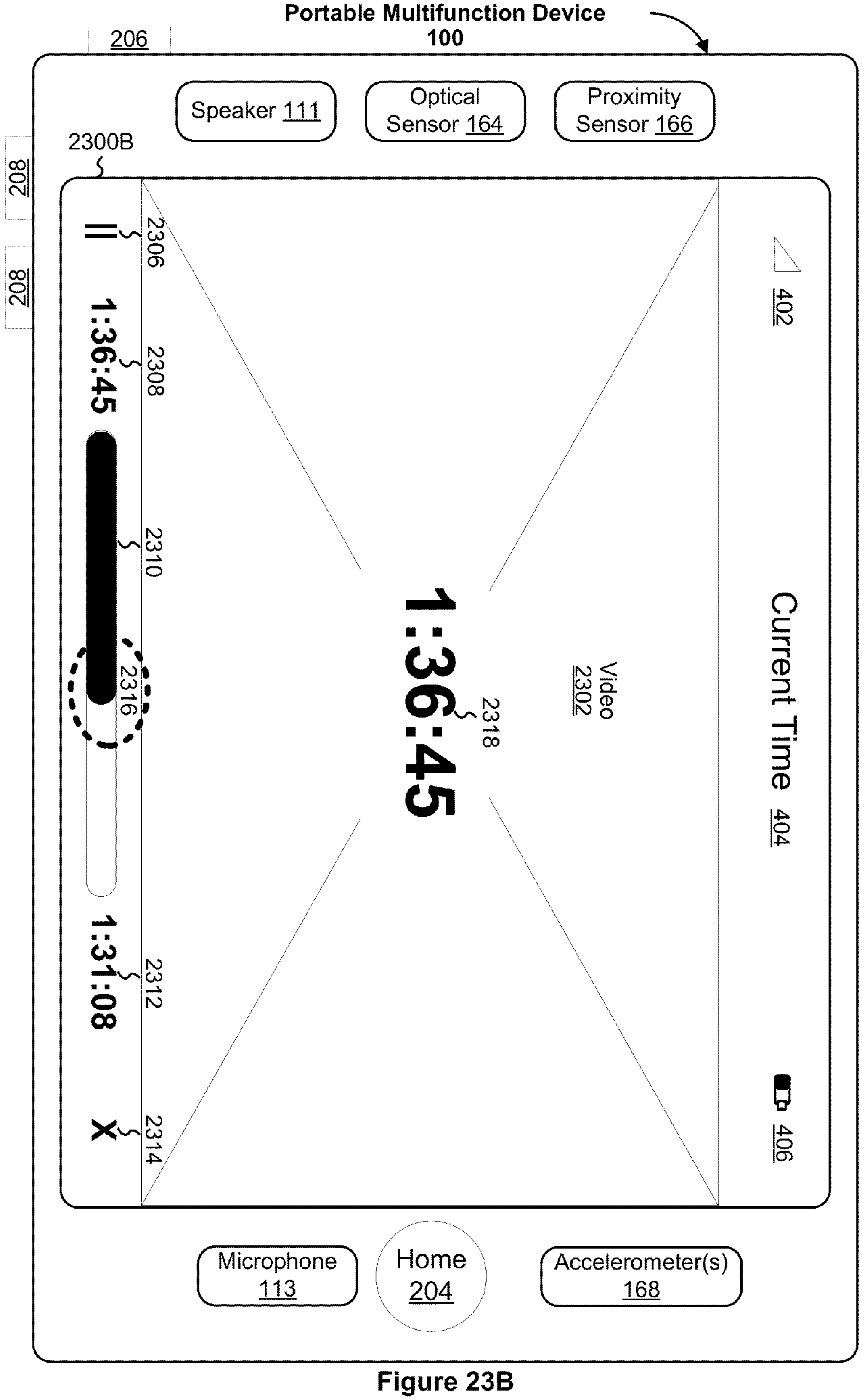

In some embodiments, in response to a user gesture, the lapsed time in the video can be modified. For example, in response to the user's finger touching 2316 at or near the end of the progress bar and then sliding along the progress bar, the lapsed time may be altered to correspond to the position of the user's finger along the progress bar. In some embodiments, enlarged lapsed time 2318 is displayed during this user gesture to indicate where the video will resume playing when the gesture is ended (FIG. 23B). In some embodiments, one or more still images from the video 2302 that correspond to where the video will resume playing are displayed as the user's finger is moved along the progress bar. This user gesture on the progress bar makes it easy for a user to select a particular scene in a video for viewing.

Additional description of a video player and manager can be found in U.S. Provisional Patent Application Nos. 60/883,784, "Video Manager For Portable Multifunction Device," filed Jan. 6, 2007 and 60/946,973, "Video Manager For Portable Multifunction Device," filed Jun. 28, 2007, the contents of which are hereby incorporated by reference.

Weather

FIGS. 24A-24E illustrate an exemplary user interface for displaying and managing weather widgets in accordance with some embodiments.

Figure 24A:
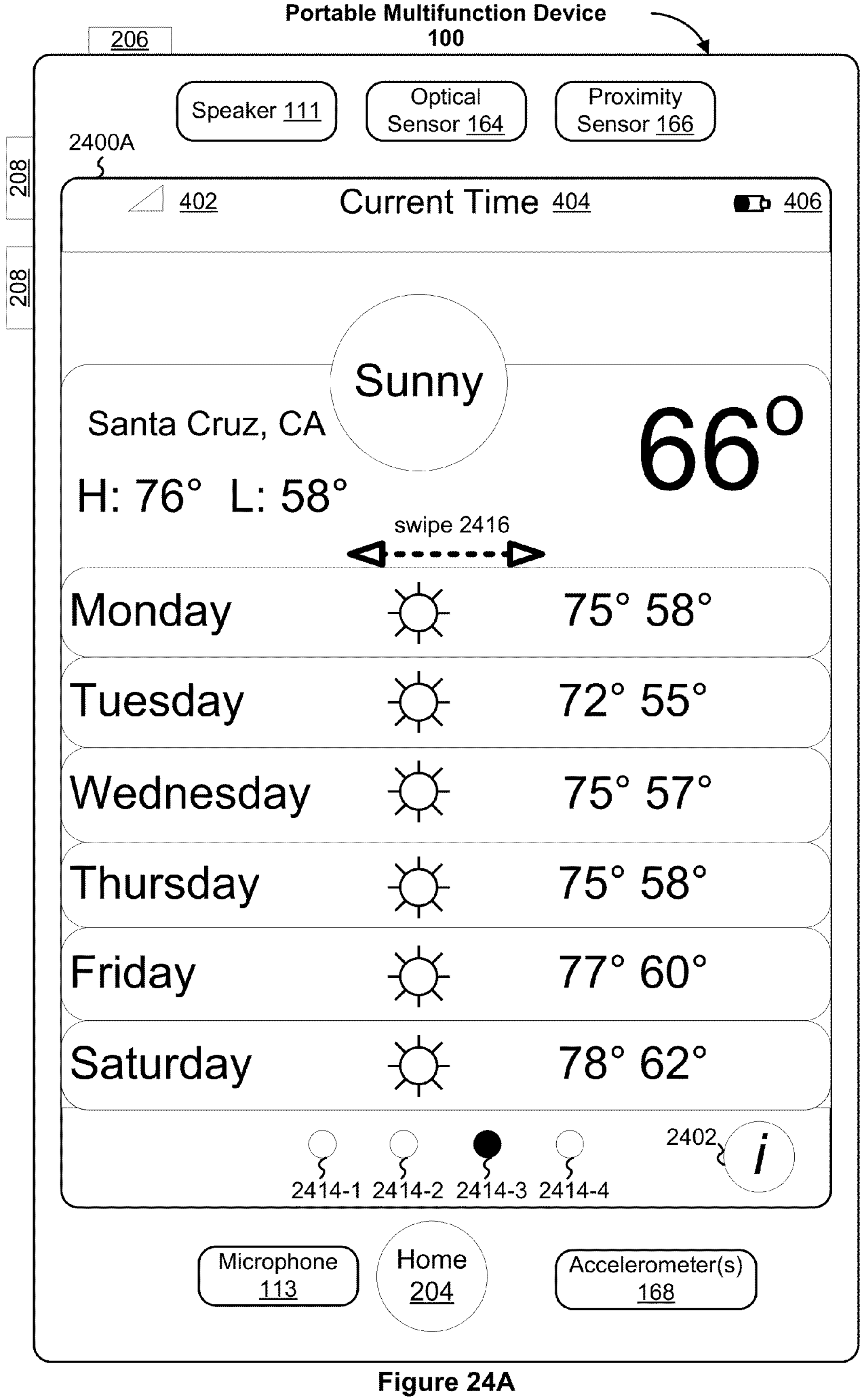
FIGS. 24A-24E illustrate an exemplary user interface for displaying and managing a weather widget in accordance with some embodiments.
Figure 24B:
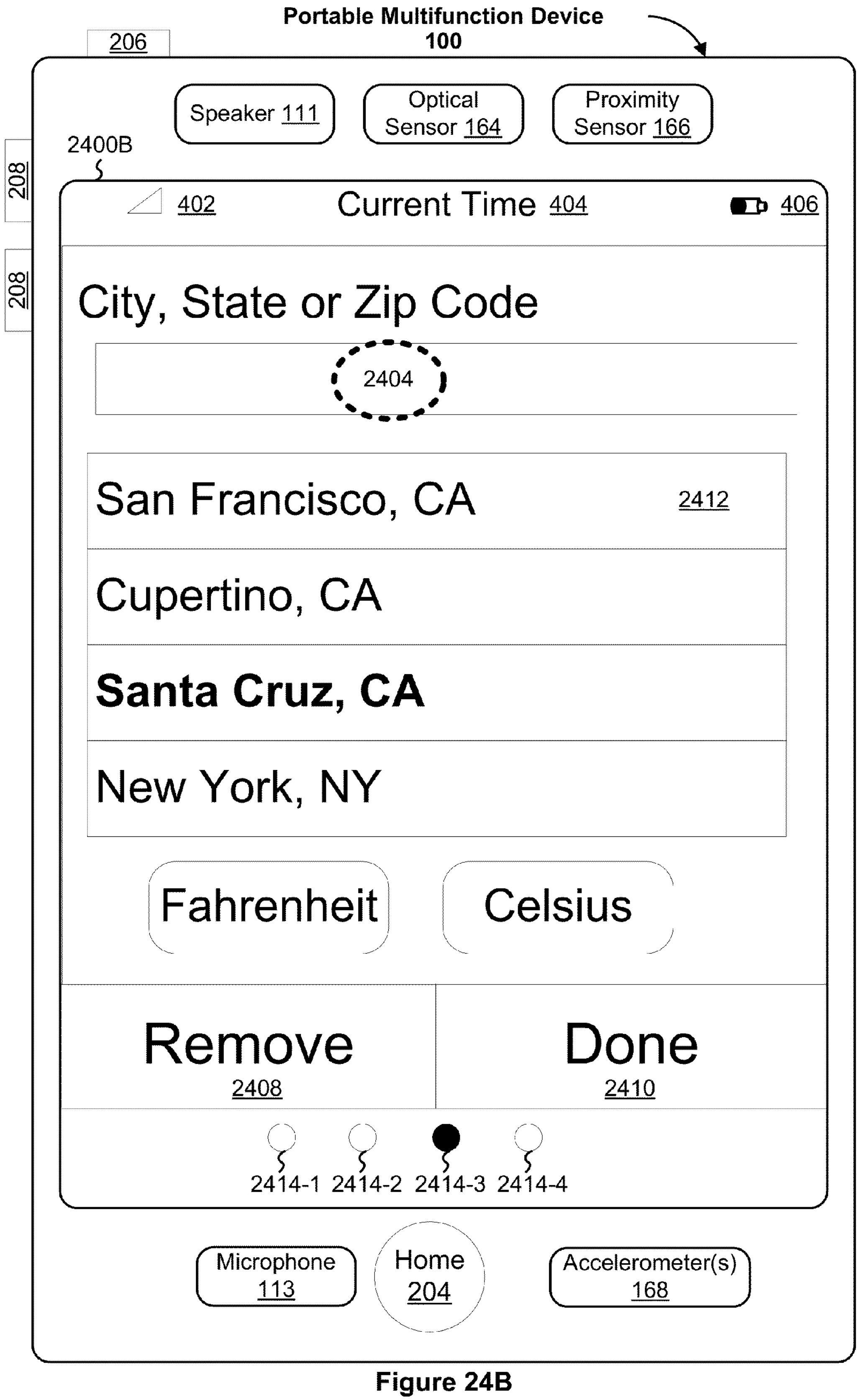
Figure 24C:
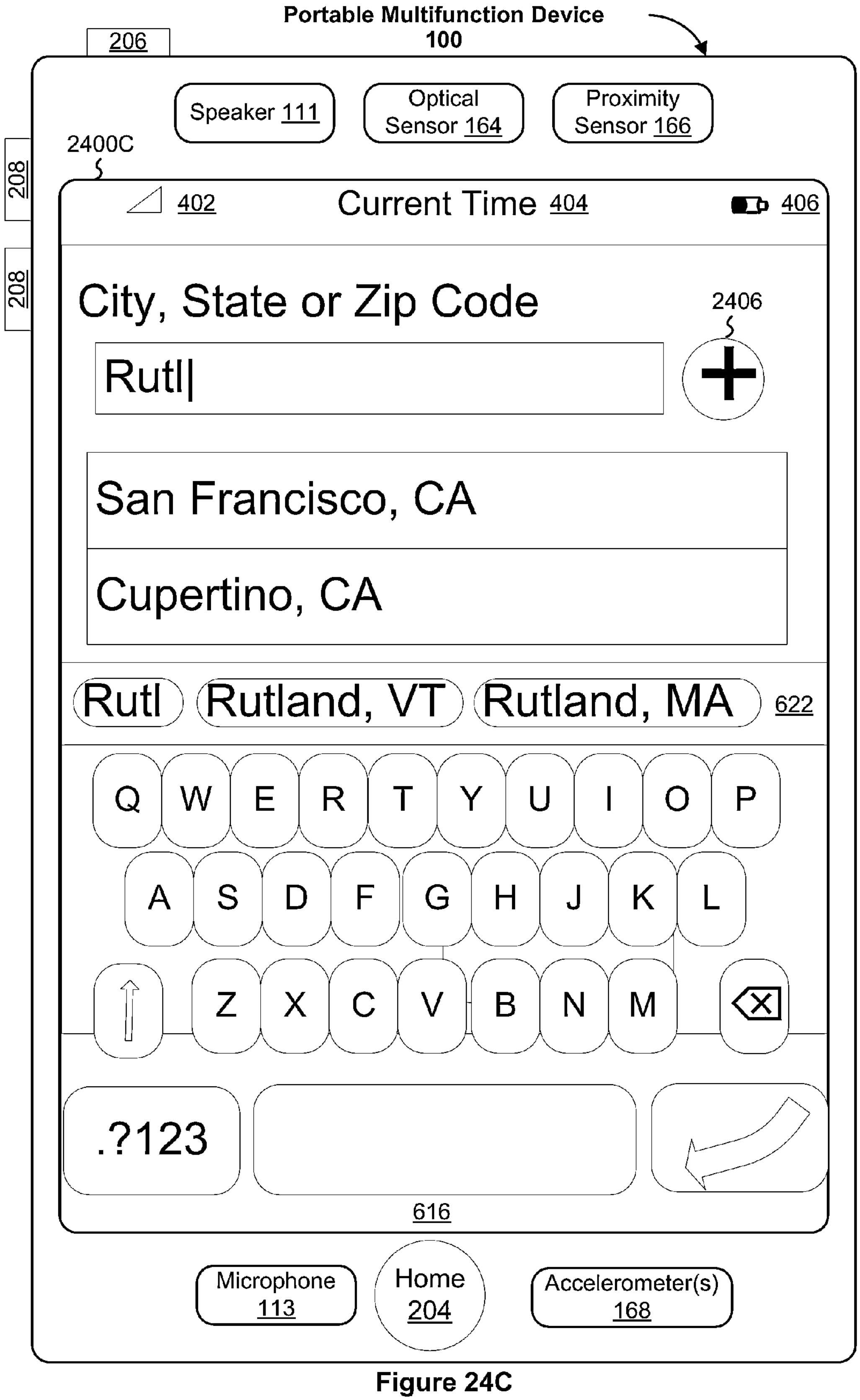
Figure 24D:
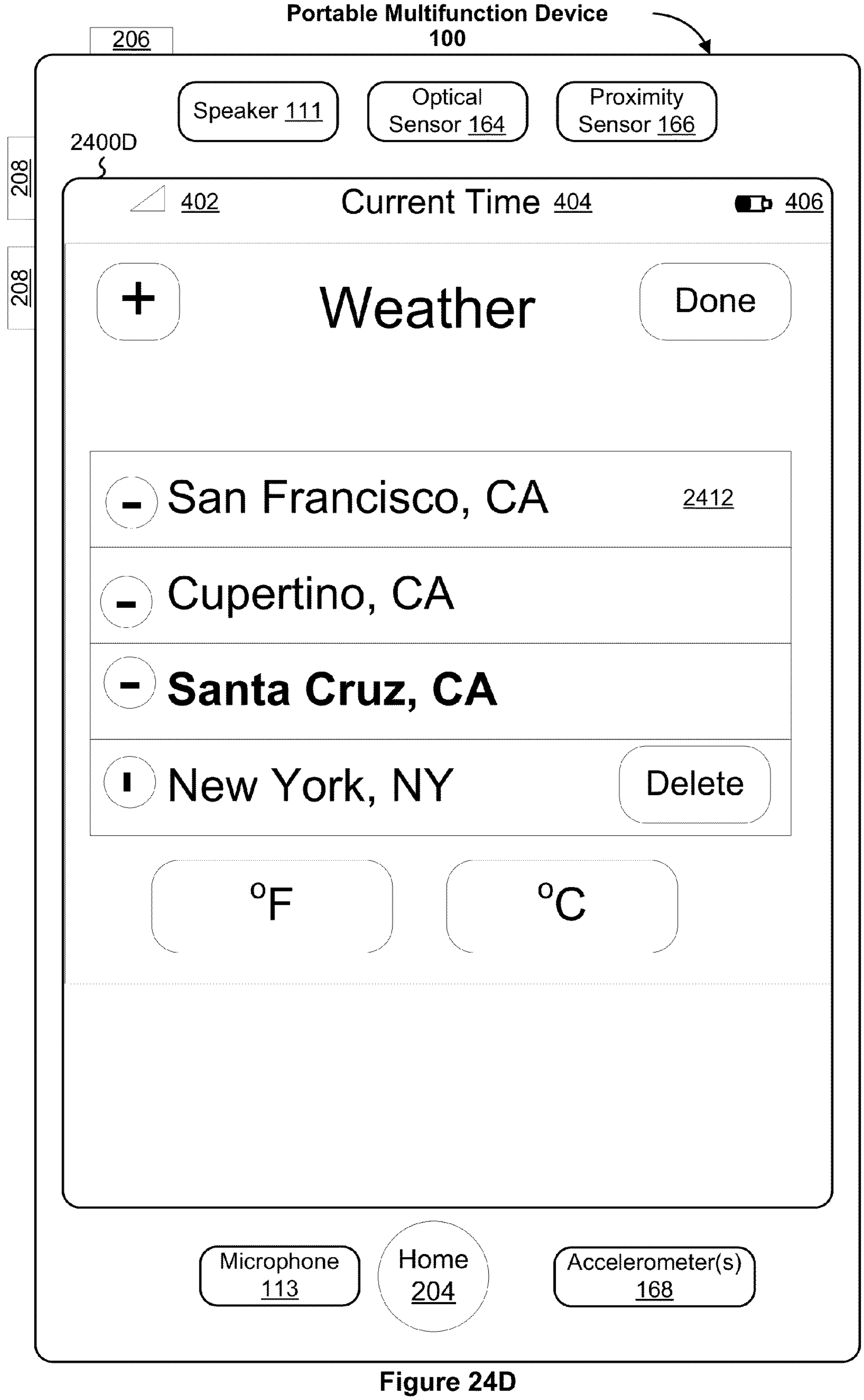
Figure 24E:
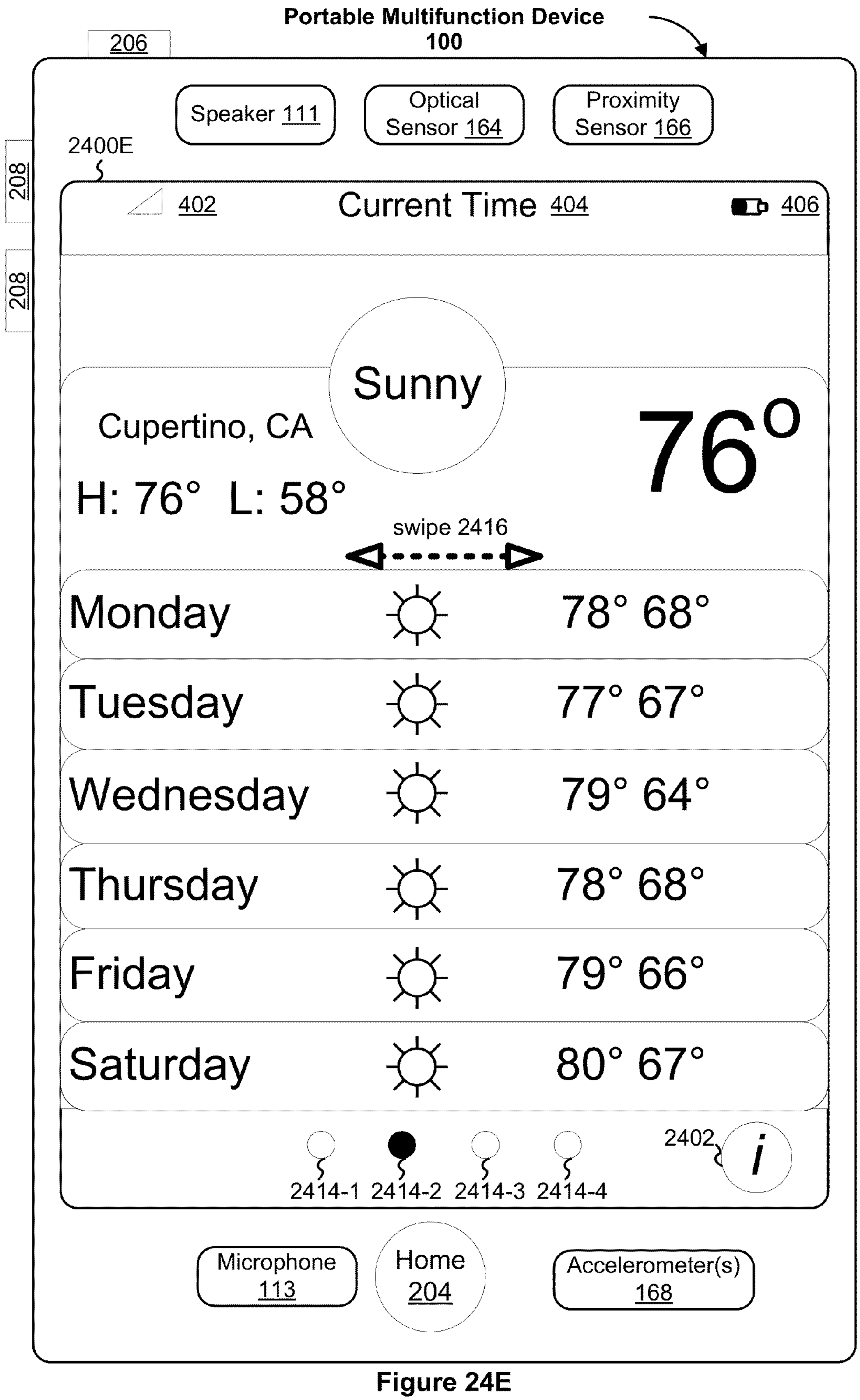

In some embodiments, weather widgets 149-1 display the weather for particular locations (e.g., Santa Cruz, Calif. in UI 2400A, FIG. 24A or Cupertino, Calif. in UI 2400E, FIG. 24E). In response to the user activating settings icon 2402 (e.g., by a finger tap on the icon), the settings UI for the weather widgets is displayed (e.g., UI 2400B, FIG. 24B). In some embodiments, the user can select the particular location for display with a gesture (e.g., by touching the particular location in a list 2412 of locations, which may highlight the selected location). In some embodiments, the settings in FIG. 24B are incorporated into settings 412 (FIG. 4B) and settings icon 2402 need not be displayed in the weather widget (e.g., FIG. 24A).

In some embodiments, in response to the user's finger contacting 2404 (FIG. 24B) a text entry box, a keyboard (e.g., 616) is displayed (UI 2400C, FIG. 24C). In some embodiments, a word suggestion area 622 is also displayed. In response to the user entering the new location and activating the add location icon 2406, the new location is added to the list of locations.

In some embodiments, the highlighted location in the list of locations is removed if the user activates the remove icon 2408 (e.g., by a finger tap on the icon). In some embodiments, in response to the user activating the done icon 2410, the device displays the weather for the selected location (e.g., UI 2400A, FIG. 24A).

In some embodiments, for each location in the list of locations, a corresponding icon 2414 is added to the UI that displays the weather for a particular location (e.g., UI 2400A). For example, because there are four locations in the settings UI 2400B, four icons 2414 are displayed in UI 2400A, FIG. 24A. In some embodiments, the icon 2414 that corresponds to the location whose weather is being displayed may be highlighted to distinguish it from the other icons. For example, Santa Cruz, the third of four locations set by the user, is highlighted in UI 2400B and the weather for Santa Cruz is displayed in UI 2400A. Thus, the third of four icons 2414 (i.e., 2414-3) is highlighted in UI 2400A. The icons 2414 let a user know at a glance how many locations are listed in the settings menu 2400B and which location in the list is displayed.

In some embodiments, the user can initiate viewing of the previous location in the list (e.g., Cupertino, Calif.) by making a swipe gesture 2416 from left to right on the touch screen. In some embodiments, the user can initiate viewing of the next location in the list (e.g., New York, N.Y.) by making a swipe gesture 2416 from right to left on the touch screen. For this example, if the weather for Cupertino, Calif. is displayed, then icon 2414-2 is highlighted (FIG. 24E). Similarly, if the weather for New York, N.Y. is displayed, then icon 2414-4 is highlighted.

The weather widgets 149-1 are an example of widgets with a single, shared settings/configuration page that provides settings for multiple widgets for display.

In some embodiments, a portable multifunction device displays a widget (e.g., Santa Cruz weather widget, FIG. 24A) on a touch screen display. The displayed widget is one of a set of widgets that share a common configuration interface (e.g., FIG. 24B). In some embodiments, widgets in the set of widgets are displayed one at a time (e.g., FIG. 24 A and FIG. 24E).

One or more widget set indicia icons (e.g., icons 2414, FIG. 24A) are displayed. The widget set indicia icons provide information about the number of widgets in the set of widgets and a position of the displayed widget in the set of widgets. In some embodiments, the one or more widget set indicia icons are displayed concurrently with the displayed widget (e.g., FIG. 24A).

A finger gesture is detected on the touch screen display. In some embodiments, the finger gesture is a swipe gesture (e.g., swipe 2416, FIG. 24A).

In response to the finger gesture, the displayed widget (e.g., Santa Cruz weather widget, FIG. 24A) is replaced with another widget (e.g., Cupertino weather widget, FIG. 24E) in the set of widgets, and information provided by the widget set indicia icons is updated to reflect the replacement of the displayed widget by another widget in the set of widgets. In some embodiments, the set of widget form a sequence and the displayed widget is replaced by an adjacent widget in the sequence of widgets.

A graphical user interface on a portable communications device with a touch screen display comprises a set of widgets that share a common configuration interface, and one or more widget set indicia icons (e.g., 2414). At most one widget in the set of widgets is shown on the touch screen at any one time (e.g., Santa Cruz weather widget, FIG. 24A). The widget set indicia icons provide information about the number of widgets in the set of widgets and a position of the displayed widget in the set of widgets. In response to detecting a finger gesture (e.g., 2416) on the touch screen display, a displayed widget is replaced with another widget in the set of widgets, and the information provided by the widget set indicia icons is updated to reflect the replacement of the displayed widget by another widget in the set of widgets.

In some embodiments, a portable multifunction device (e.g., device 100) displays a first widget on a touch screen display (e.g., Santa Cruz weather widget, FIG. 24A).

A first gesture is detected on the touch screen on a settings icon (e.g., 2402, FIG. 24A) on the first widget. In some embodiments, the first gesture is a tap gesture by a finger of the user.

In response to the first gesture, settings are displayed that are adjustable by a user for a plurality of widgets, including settings for the first widget (e.g., FIG. 24B). In some embodiments, in response to the first gesture, an animated transition from the first widget to the settings for the plurality of widgets is displayed. In some embodiments, the plurality of widgets provide weather information for a corresponding plurality of locations.

One or more additional gestures to change one or more settings for one or more widgets in the plurality of widgets are detected.

In response to the one or more additional gestures, one or more settings for one or more widgets in the plurality of widgets are changed, including changing one or more settings for a respective widget in the plurality of widgets other than the first widget.

A widget selection gesture and a finishing gesture are detected on the touch screen display. In some embodiments, the finishing gesture is a tap gesture on a finish icon (e.g., icon 2410, FIG. 24B). In some embodiments, the finish icon is a "done" icon, an "okay" icon, or a "save" icon. In some embodiments, the widget selection gesture and the finishing gesture are a single combined gesture. In some embodiments, the single combined gesture is a double tap gesture.

In response to the widget selection gesture and the finishing gesture, a second widget in the plurality of widgets other than the first widget is displayed (e.g., Cupertino weather widget, FIG. 24E).

A graphical user interface on a portable multifunction device with a touch screen display comprises a plurality of widgets, wherein at most one widget is shown on the touch screen at any one time, and settings for the plurality of widgets. In response to a first gesture on a settings icon on a first widget in the plurality of widgets, settings that are adjustable by a user for the plurality of widgets are displayed, including settings for the first widget. In response to one or more additional gestures, one or more settings for one or more widgets in the plurality of widgets, including one or more settings for a respective widget in the plurality of widgets other than the first widget, are changed. In response to a widget selection gesture and a finishing gesture, the changed settings are saved and a second widget in the plurality of widgets other than the first widget is displayed.

In some embodiments, for weather and other applications with a location-based component, the device may automatically provide current location information (e.g., determined by GPS module 135) to the application. Thus, in some embodiments, the weather widget may provide the weather information for the current location of the device, without the user having to explicitly input the name or zip code of the current location. Similarly, current location information may be automatically provided to widgets and other applications for finding and/or interacting with stores, restaurants, maps, and the like near the current location of the device.

Additional description of configuring and displaying widgets can be found in U.S. Provisional Patent Application No. 60/946,975, "Portable Multifunction Device, Method, and Graphical User Interface for Configuring and Displaying Widgets," filed Jun. 28, 2007, the content of which is hereby incorporated by reference.

Stocks

FIGS. 25A-25E illustrate an exemplary user interface for displaying and managing a stocks widget in accordance with some embodiments.

Figure 25A:
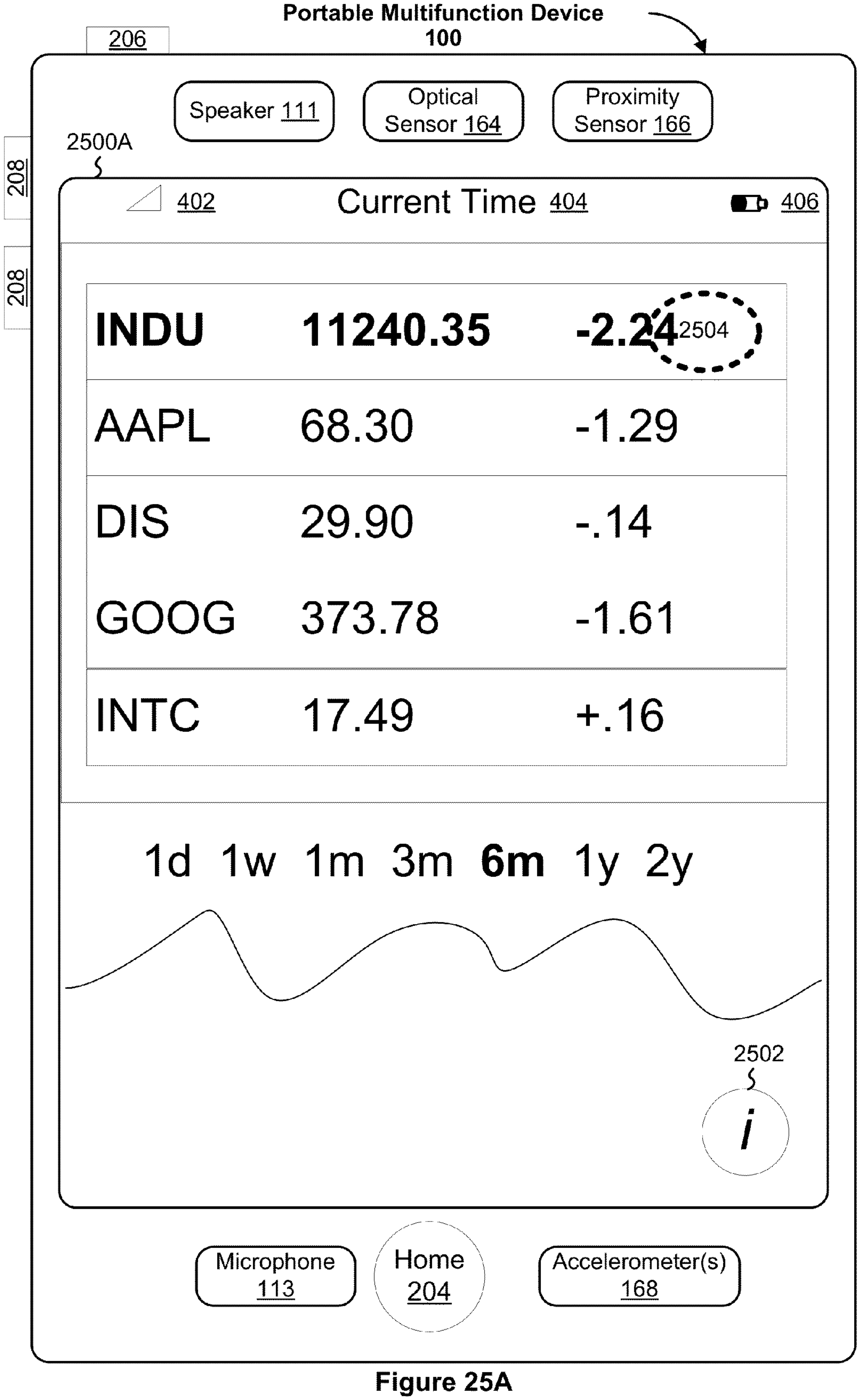
FIGS. 25A-25E illustrate an exemplary user interface for displaying and managing a stocks widget in accordance with some embodiments.
Figure 25B:
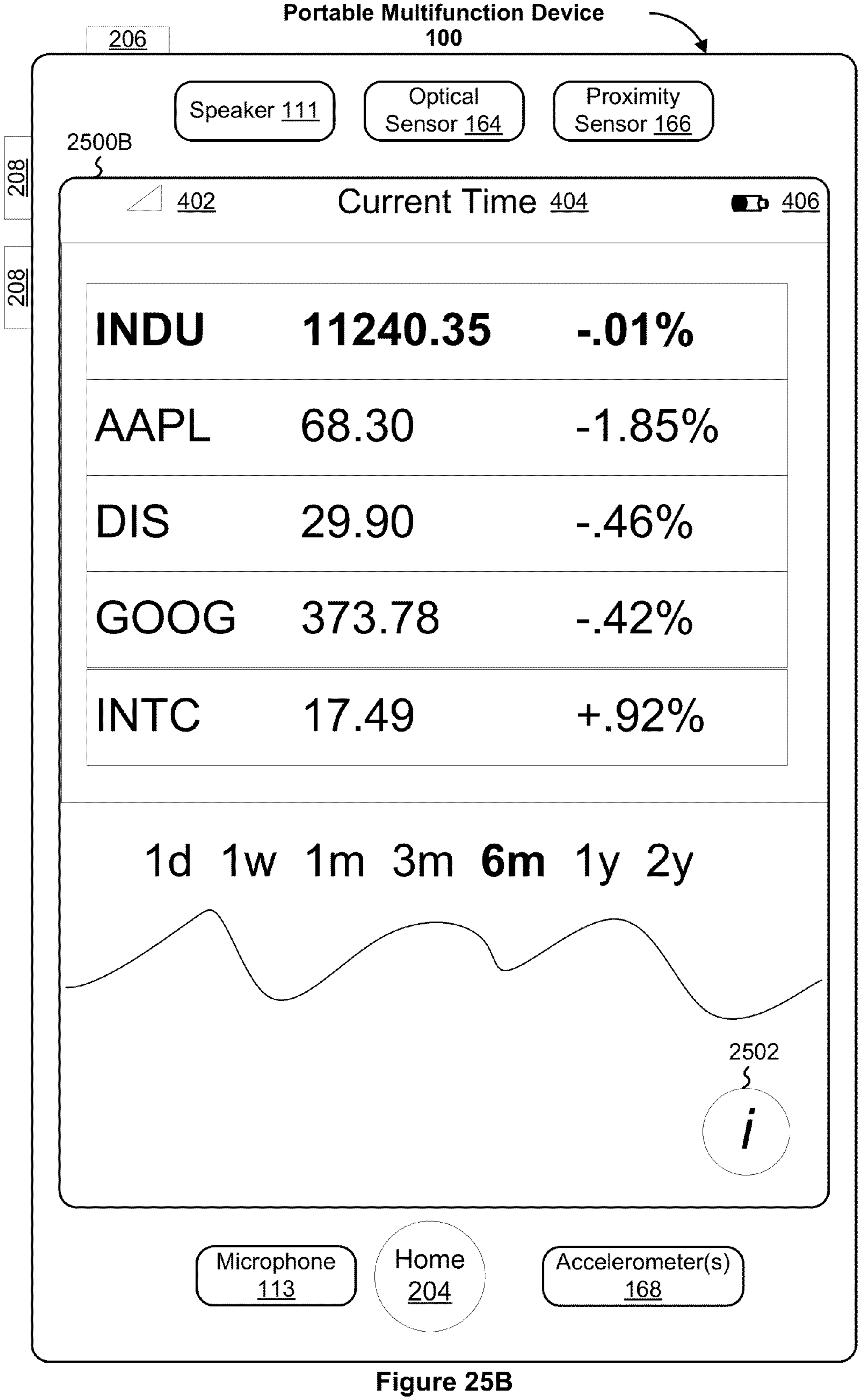

In some embodiments, stocks widget 149-2 displays information for a number of user-selected stocks (e.g., UI 2500A, FIG. 25A). In some embodiments, in response to a user gesture, the information displayed is changed. For example, in response to the user touching 2504 the column with absolute gains and losses (UI 2500A, FIG. 25A), the percentage gains and losses may be displayed instead (UI 2500B, FIG. 25B). For example, in response to the user touching "1w", the one-week chart for the highlighted stock (INDU) may be displayed (not shown) instead of the six-month chart ("6m").

Figure 25C:
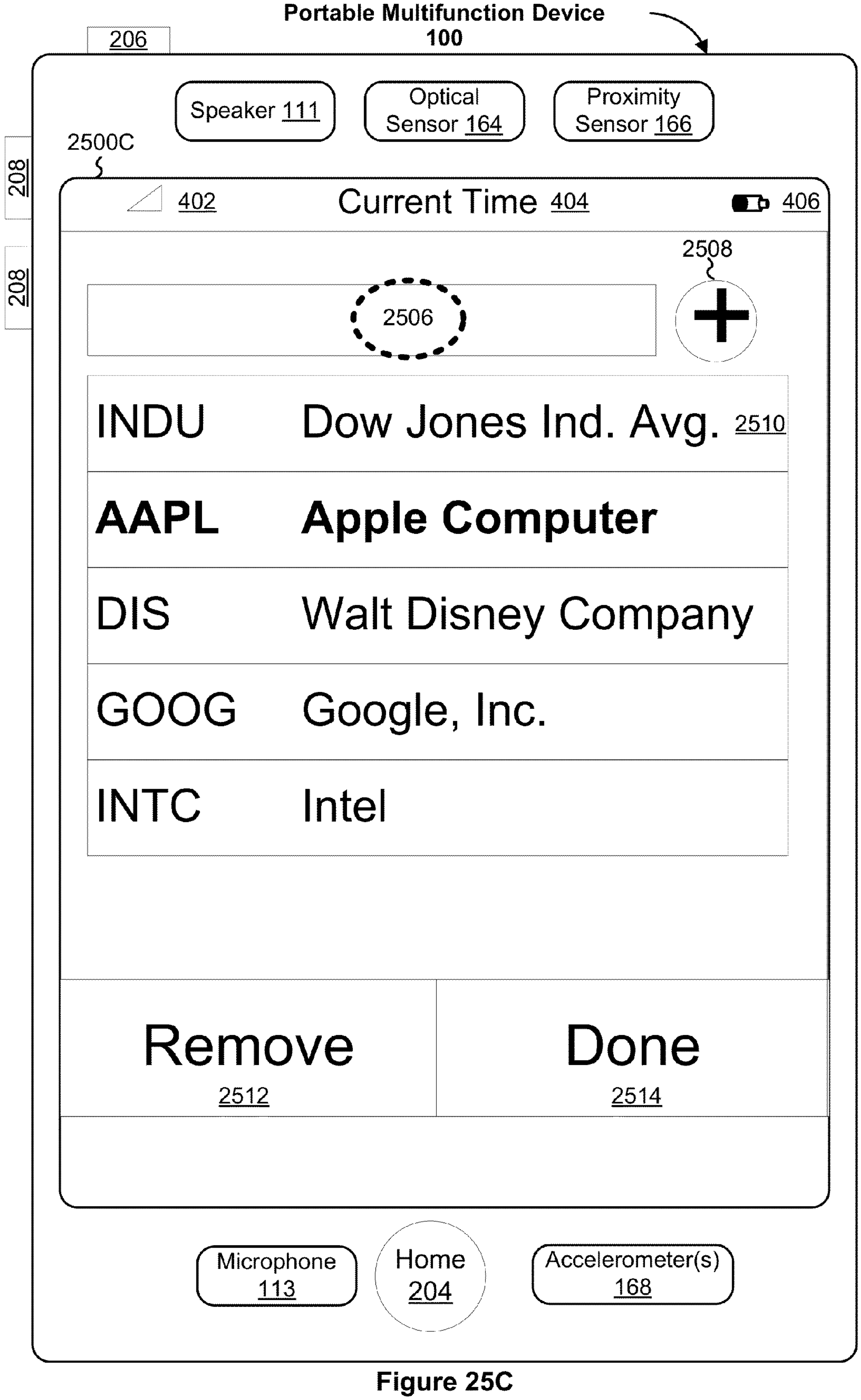

In some embodiments, in response to the user activating settings icon 2502 (e.g., by a finger tap on the icon), the settings UI for the stocks widget is displayed (e.g., UI 2500C, FIG. 25C).

Figure 25D:
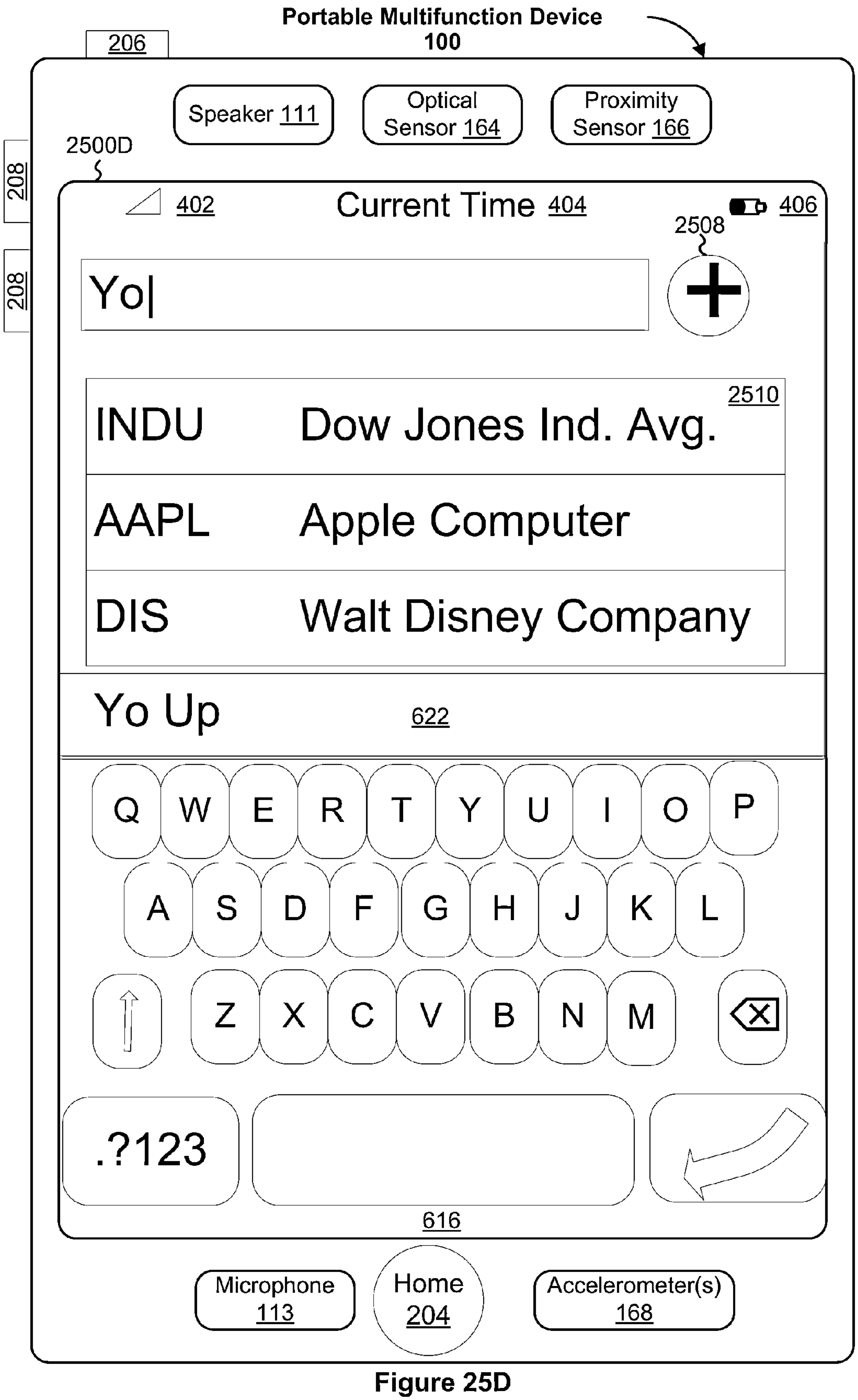
Figure 25E:
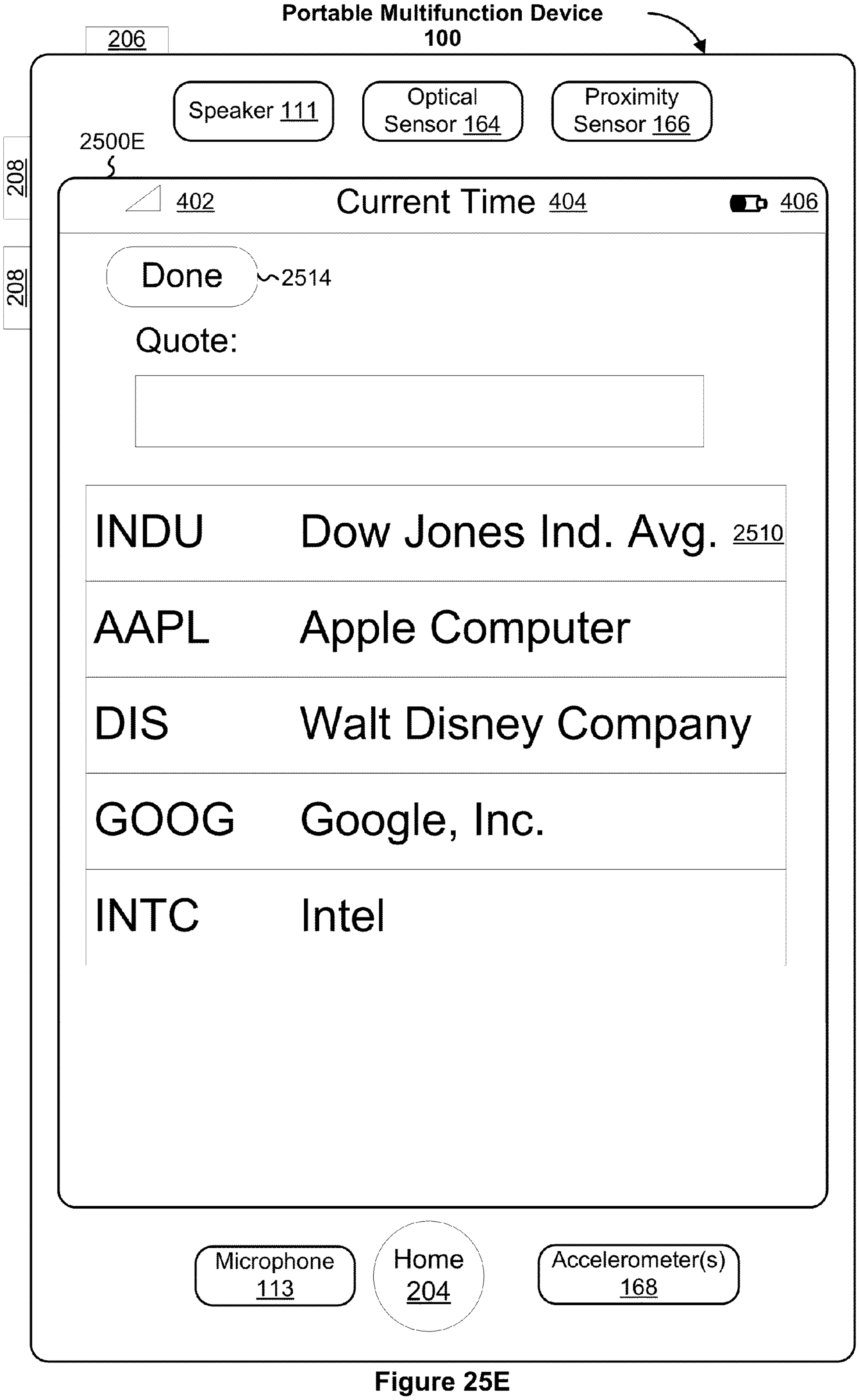

In some embodiments, in response to the user's finger contacting 2506 a text entry box, a keyboard (e.g., 616) is displayed (UI 2500D, FIG. 25D). In some embodiments, a word suggestion area 622 is also displayed. In response to the user entering the symbol or name of the new stock and activating the add stock icon 2508, the new stock is added to the list of stocks.

In some embodiments, the highlighted stock in the list of stocks 2510 is removed if the user activates the remove icon 2512 (e.g., by a finger tap on the icon). In some embodiments, in response to the user activating the done icon 2514, the device displays the stock information for the selected stocks (e.g., UI 2500A, FIG. 25A).

Telephone

Figure 26A:
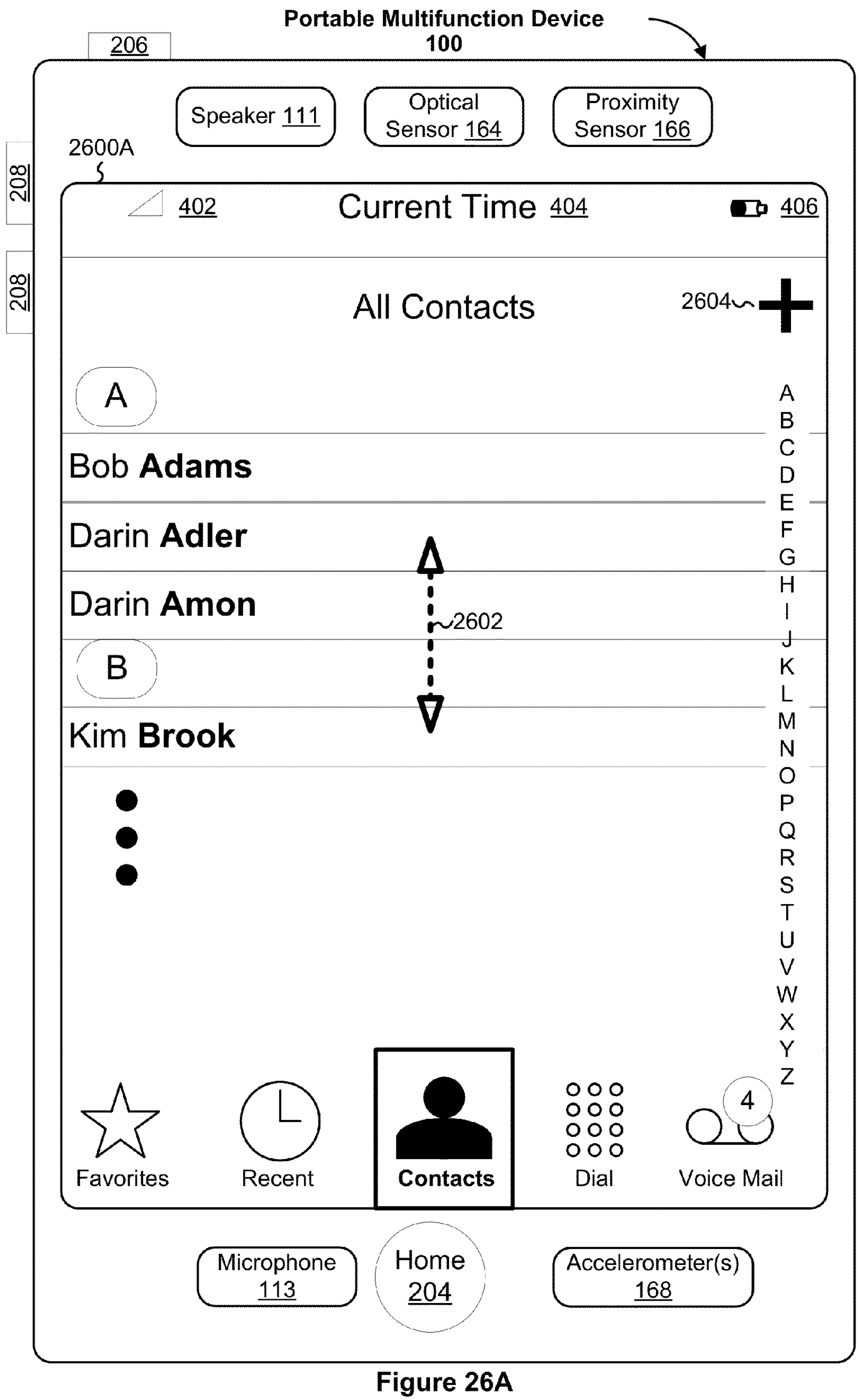
FIGS. 26A-26P illustrate an exemplary user interface for displaying and managing contacts in accordance with some embodiments.
Figure 26B:
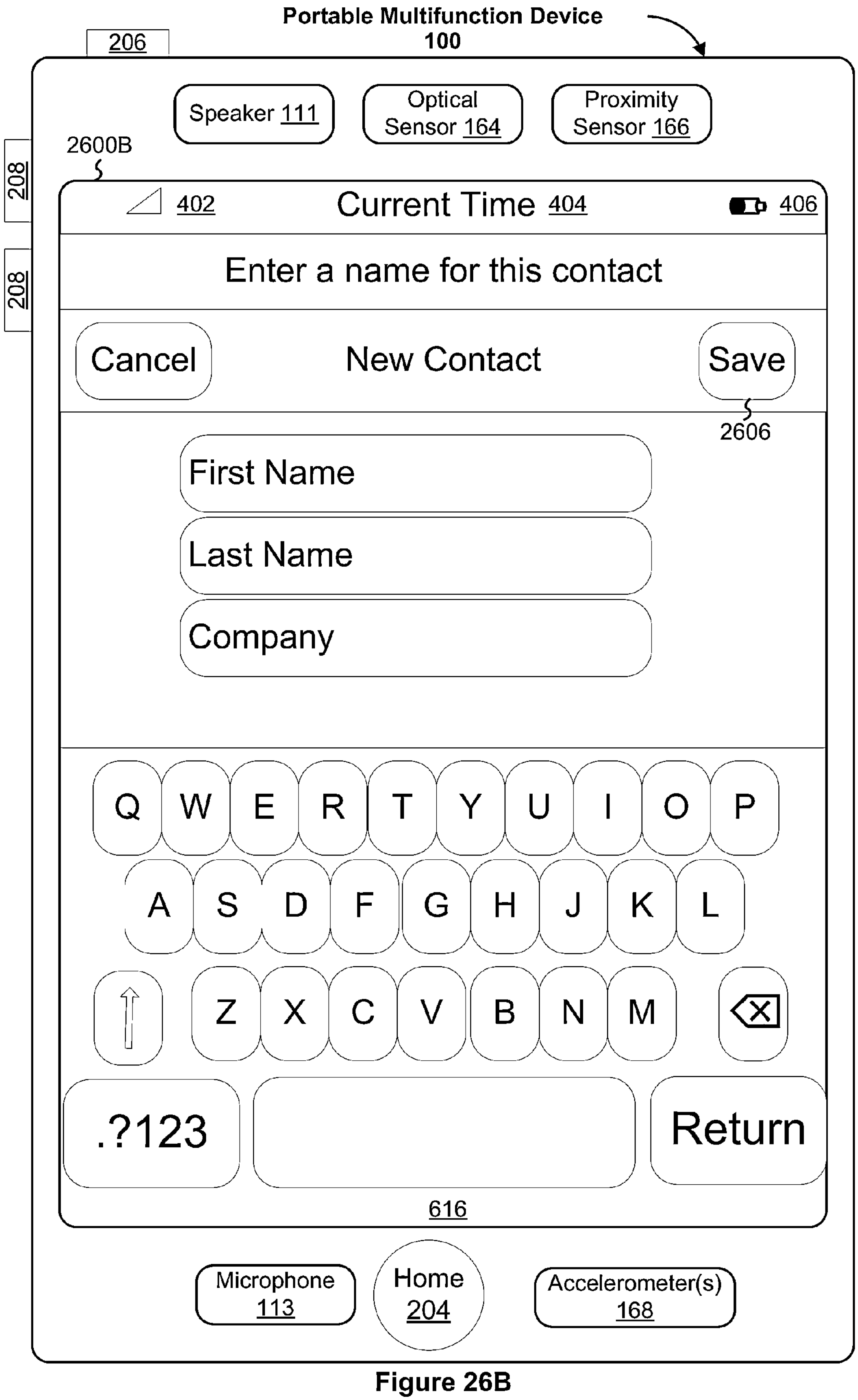
Figure 26C:
Figure 26D:
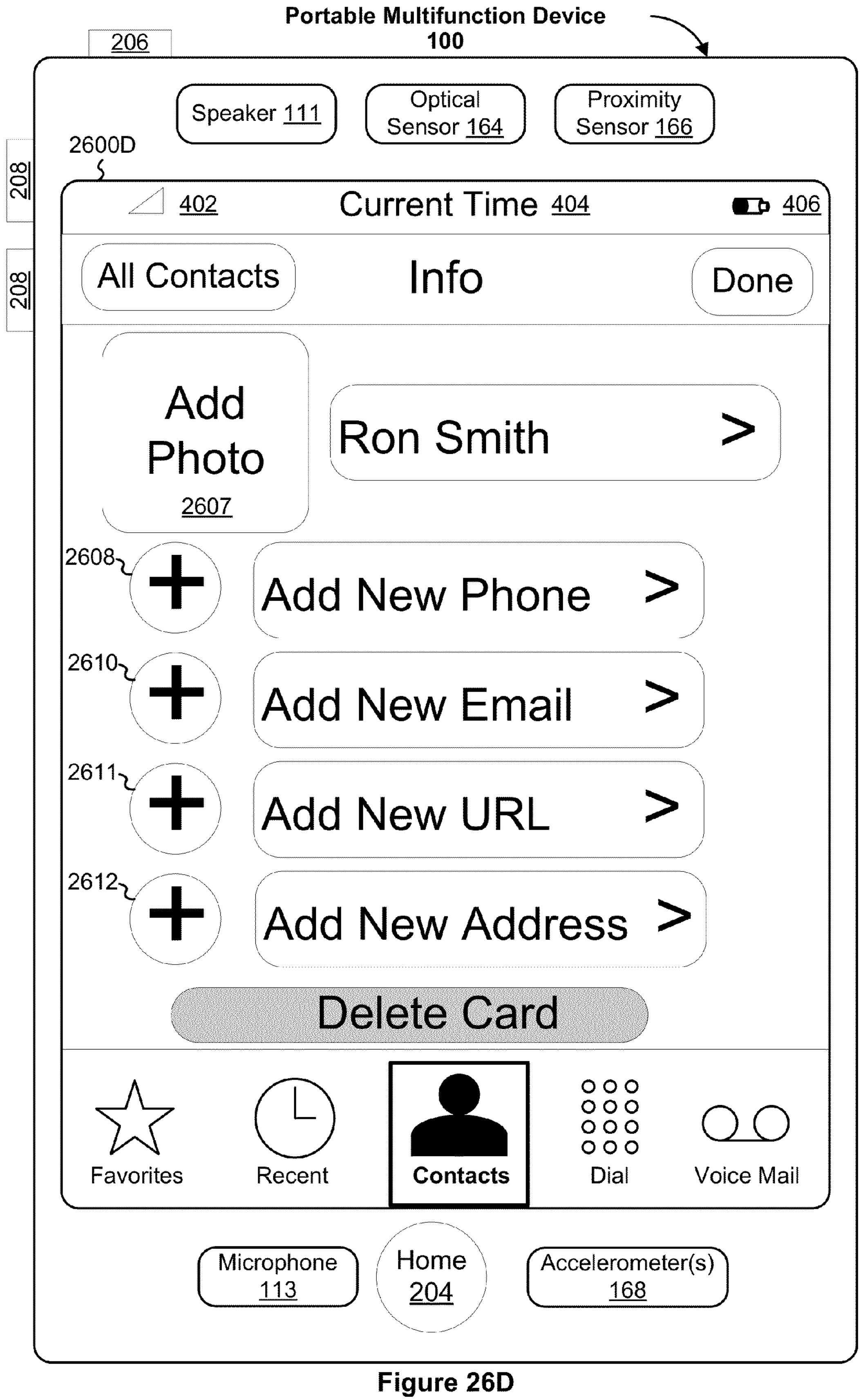
Figure 26E:
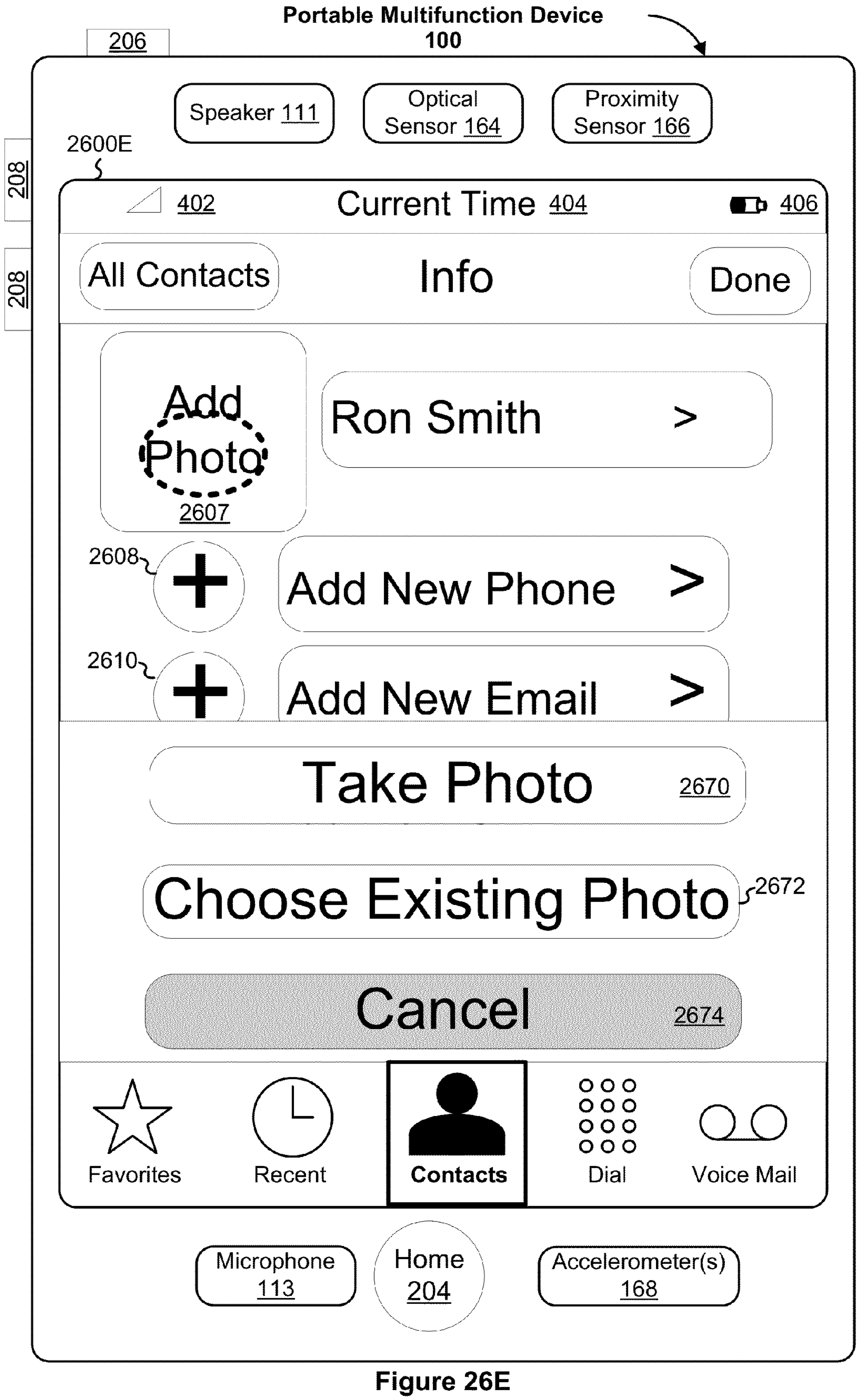
Figure 26F:
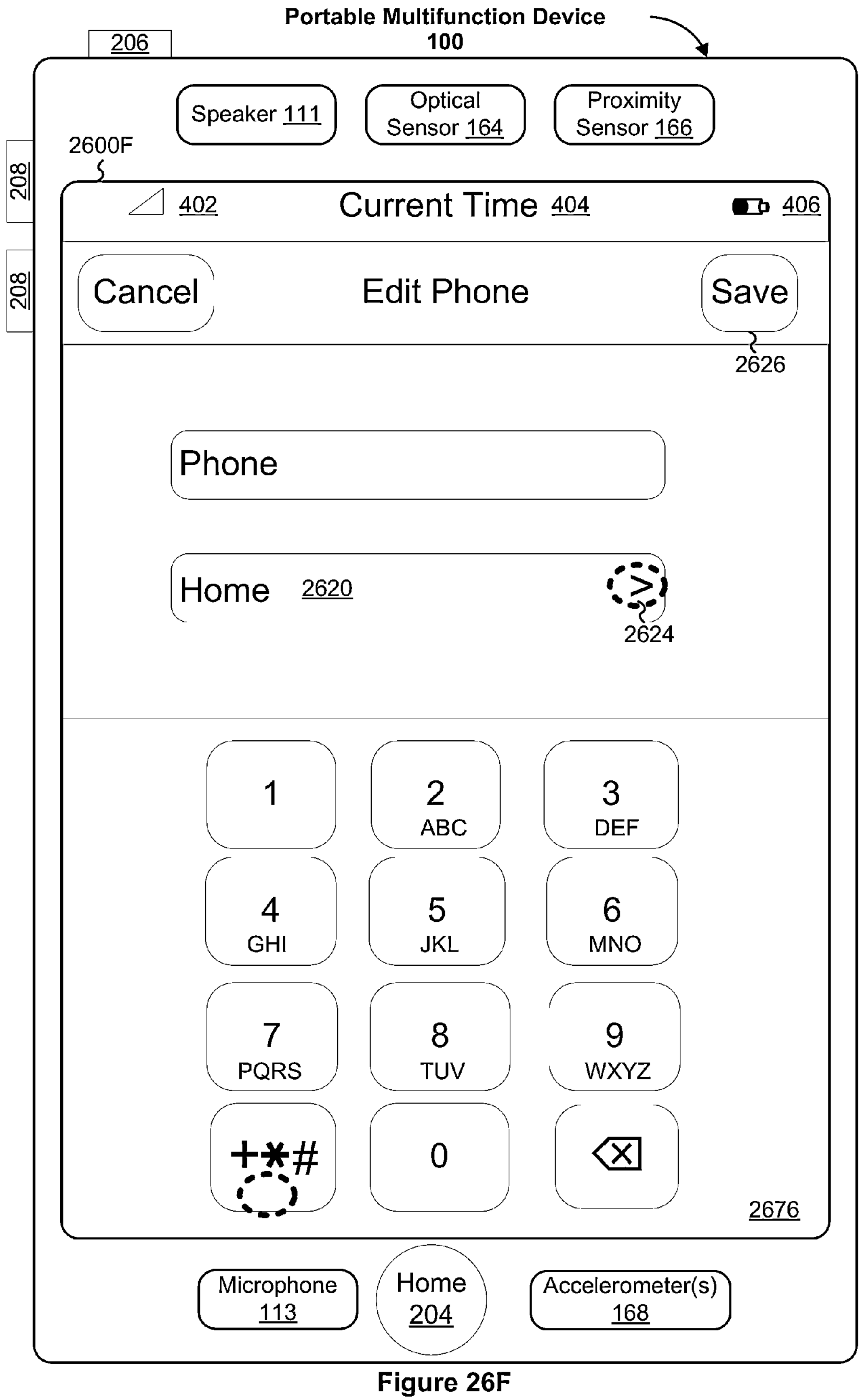
Figure 26G:
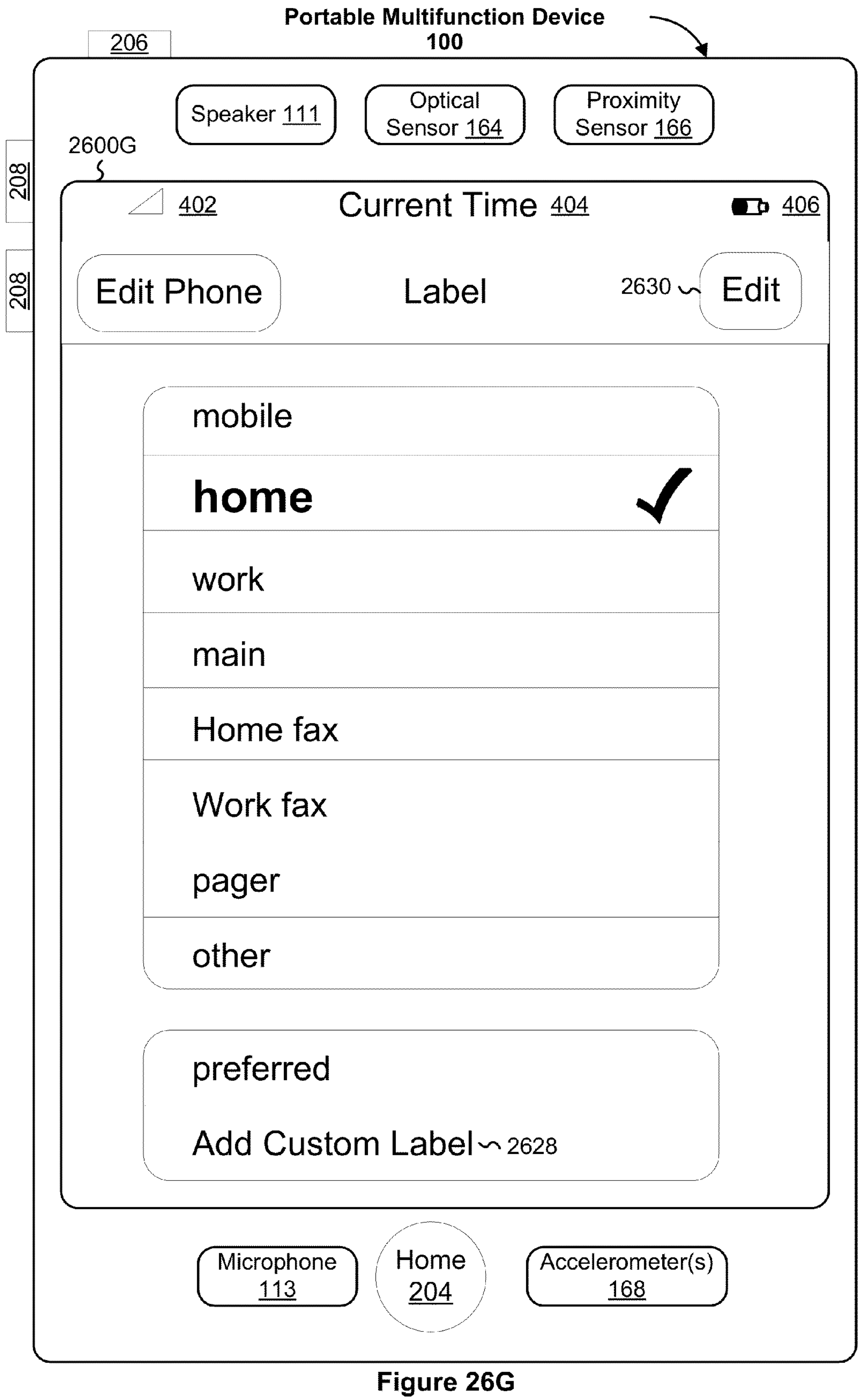
Figure 26H:
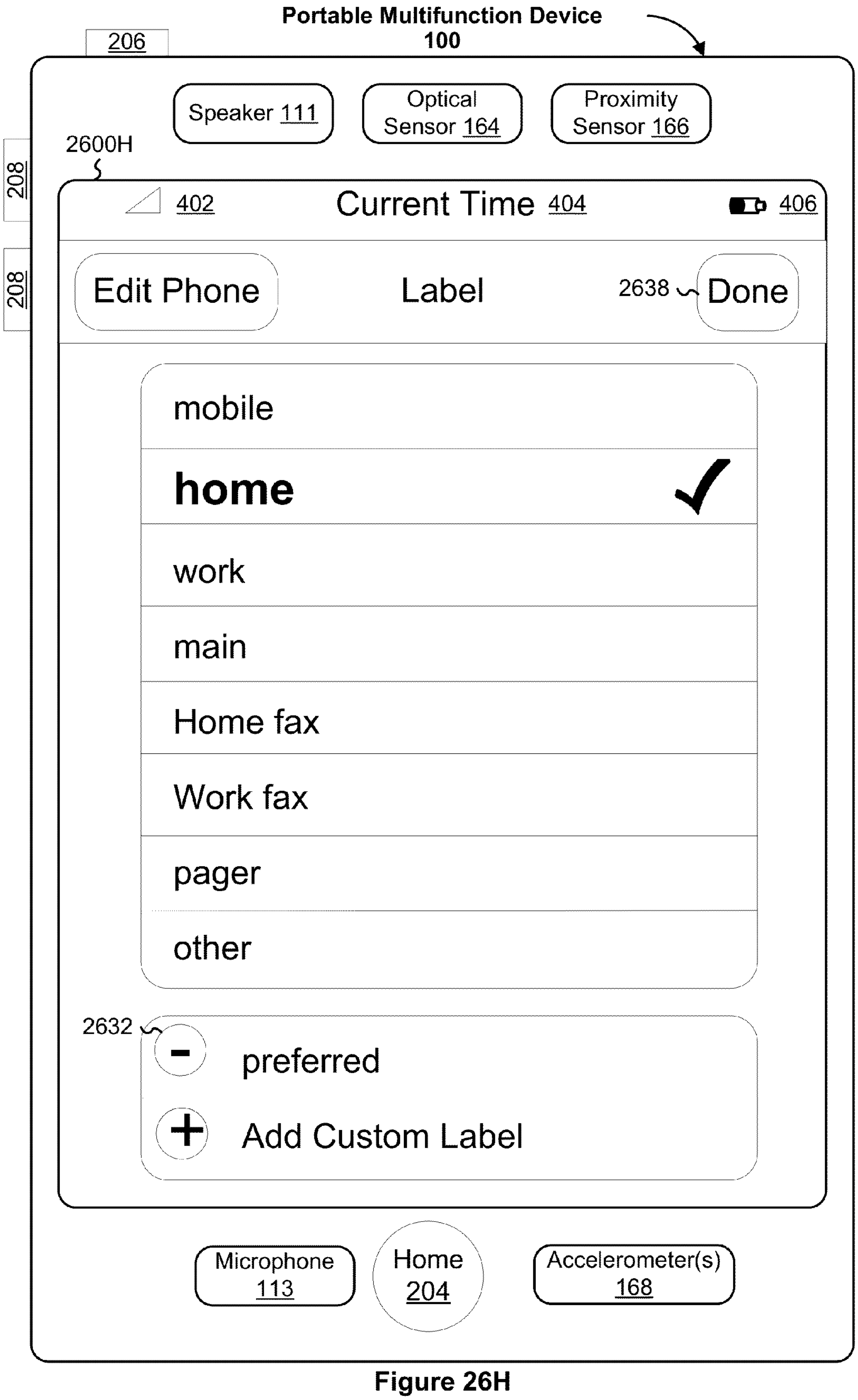
Figure 26I:
Figure 26J:
Figure 26K:
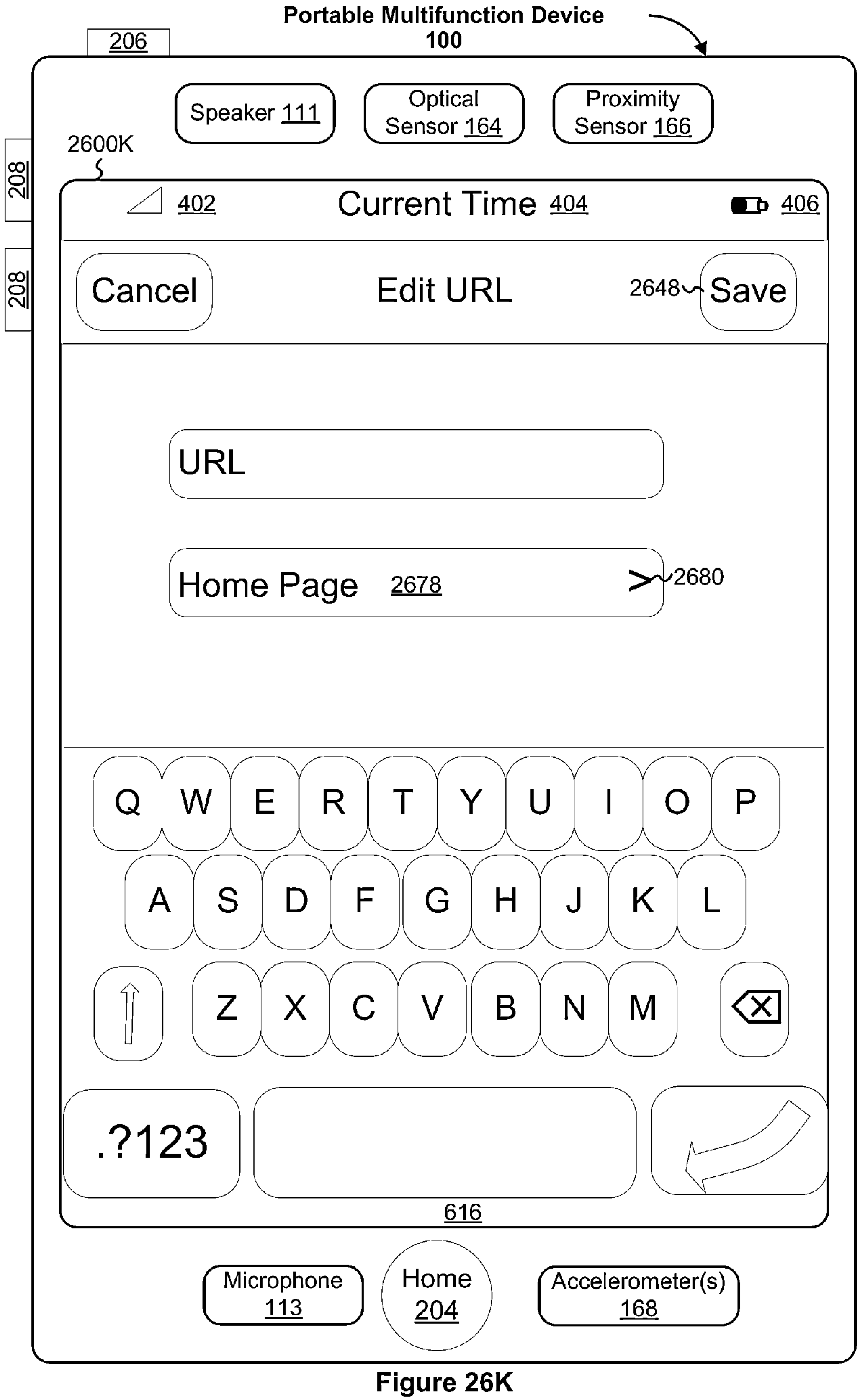
Figure 26L:
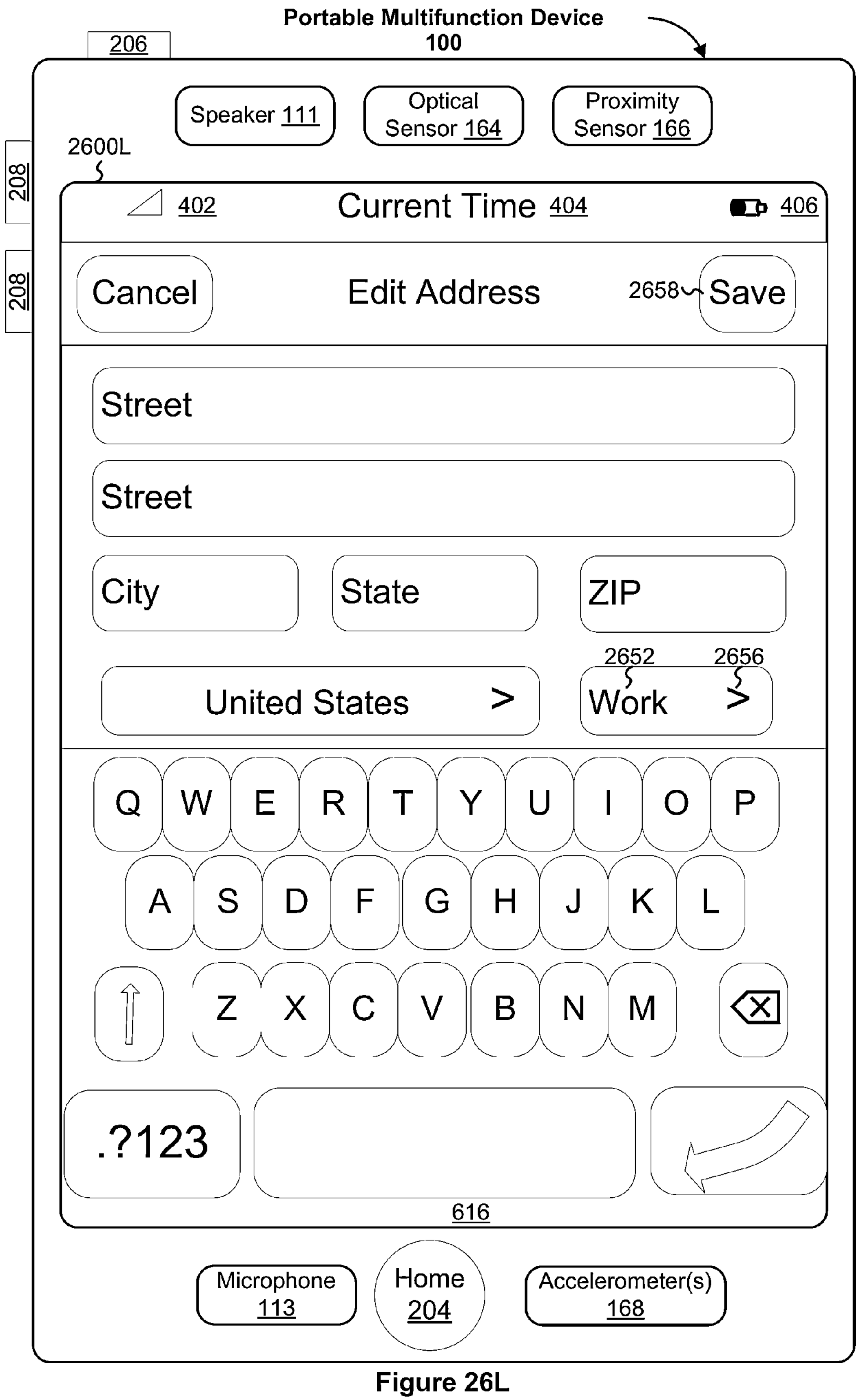
Figure 26M:
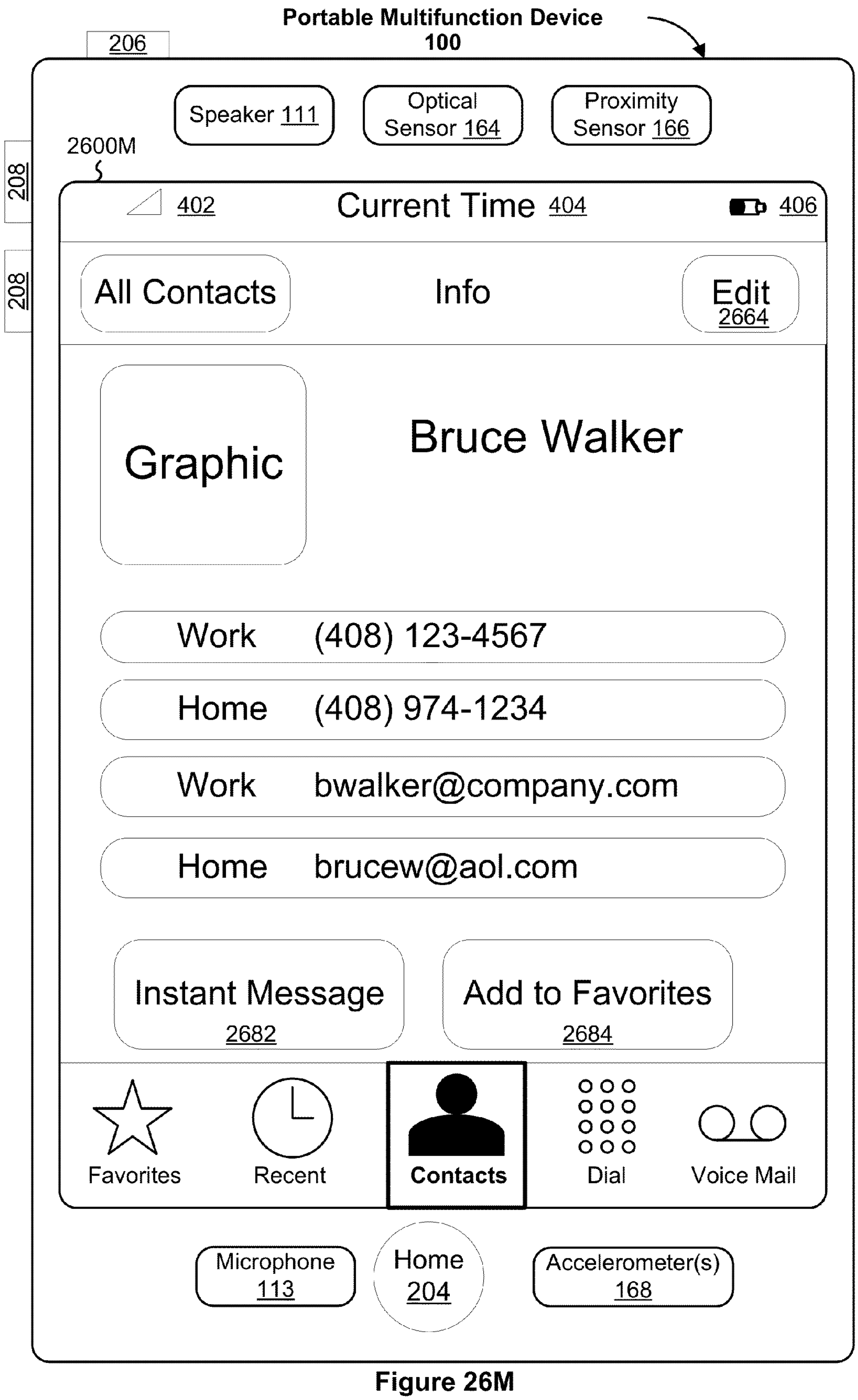
Figure 26N:
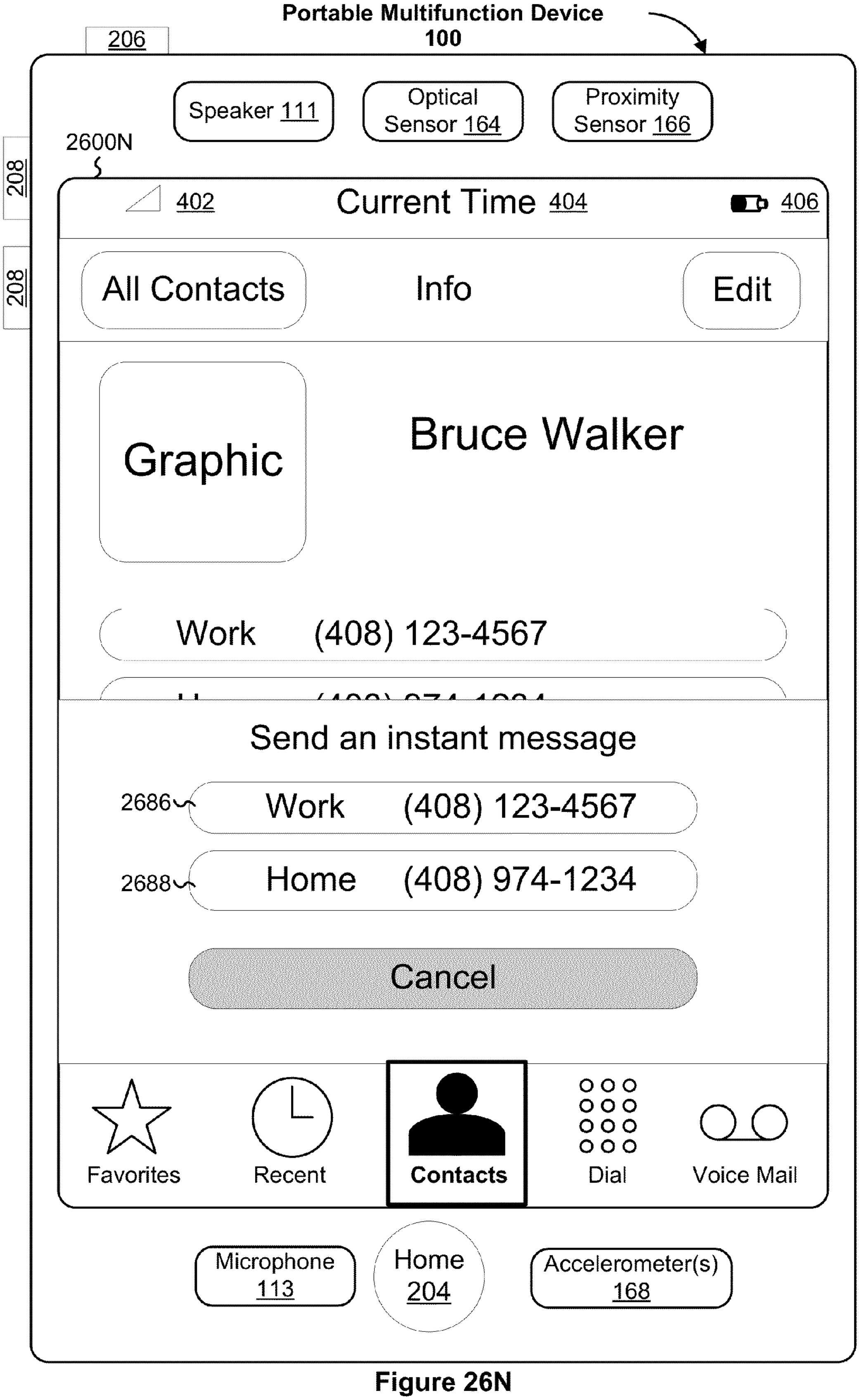
Figure 26O:
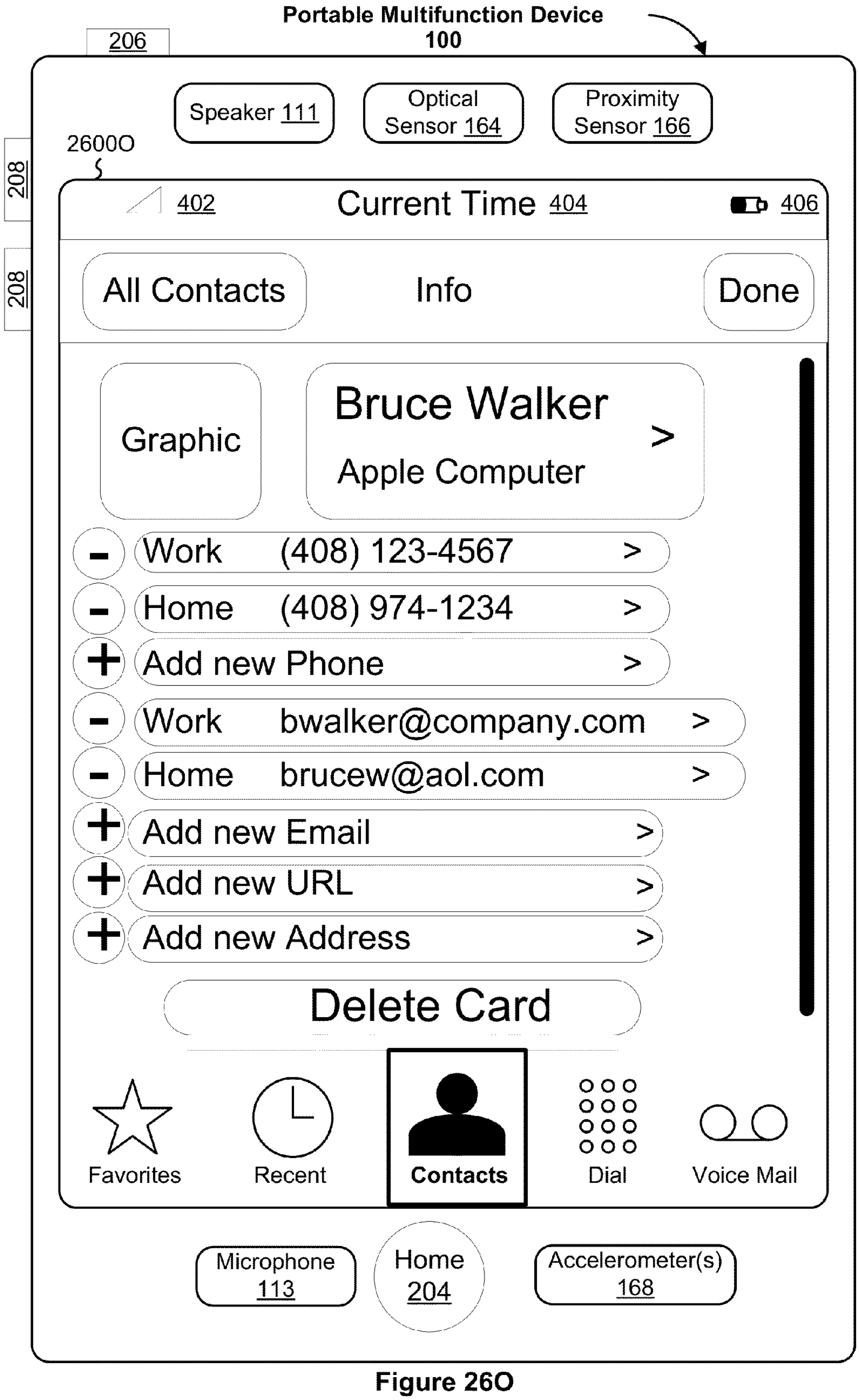
Figure 26P:
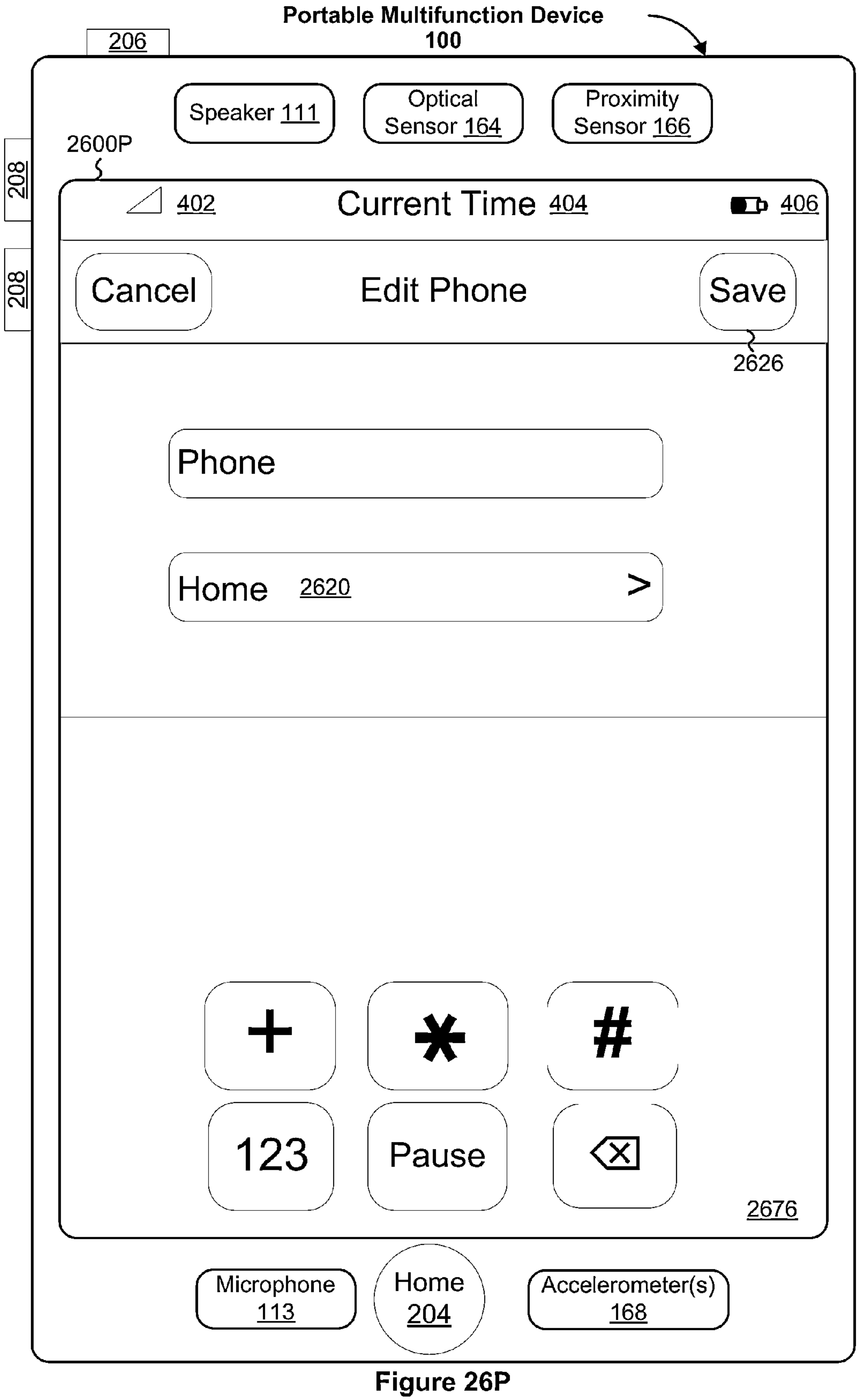

FIGS. 26A-26P illustrate an exemplary user interface for displaying and managing contacts in accordance with some embodiments.

In some embodiments, in response to the user activating phone icon 138 in UI 400 (FIG. 4) (e.g., by a finger tap on the icon), the user's contact list is displayed (e.g., UI 2600A, FIG. 26A).

As described in U.S. patent application Ser. No. 11/322,547, "Scrolling List With Floating Adjacent Index Symbols," filed Dec. 23, 2005, which is hereby incorporated by reference, the user may scroll through the contact list using vertically upward and/or vertically downward gestures 2602 on the touch screen.

In some embodiments, in response to the user activating add new contact icon 2604 (e.g., by a finger tap on the icon), the touch screen displays a user interface for editing the name of the contact (e.g., UI 2600B, FIG. 26B).

In some embodiments, in response to the user entering the contact name (e.g., entering "Ron Smith" via keyboard 616 in UI 2600C, FIG. 26C) and activating the save icon 2606 (e.g., by a finger tap on the icon), the contacts module creates and displays a new entry for the contact (e.g., UI 2600D, FIG. 26D).

In some embodiments, in response to the user activating add photo icon 2607 (e.g., by a finger tap on the icon), the touch screen displays a user interface for adding a photograph or other image to the contact (e.g., UI 2600E, FIG. 26E). In response to the user activating add photo icon 2670 (e.g., by a finger tap on the icon), the camera 143 is activated, and a photograph is taken and associated with the contact (e.g., using a process like that described with respect to FIG. 19B above). In response to the user activating the choose existing photo icon 2672 (e.g., by a finger tap on the icon), the photo management application 144 is activated, and a photograph is selected, adjusted, and associated with the contact. In response to the user activating the cancel icon 2674 (e.g., by a finger tap on the icon), the process of associating a photograph or other image with the contact is stopped.

In some embodiments, in response to the user activating add new phone icon 2608 (e.g., by a finger tap on the icon or on the row containing the icon), the touch screen displays a user interface for editing the phone number(s) of the contact (e.g., UI 2600F, FIG. 26F). In some embodiments, a keypad selection key (e.g., the "+*#" key in FIG. 26F) is used to toggle the UI to UI 2600P (FIG. 26P) so that the user may enter other symbols or a pause in the phone number. In some embodiments, a second keypad selection key (e.g., the "123" key in FIG. 26P) is used to toggle UI 2600P back to the numeric keypad in the previous UI (e.g., UI 2600F, FIG. 26F).

In some embodiments, in response to the user entering the phone number (e.g., via keyboard 2676 in UI 2600F, FIG. 26F); specifying the type of phone number (e.g., by a tap or other predefined gesture on home icon 2620 or selection icon 2624); and activating the save icon 2626 (e.g., by a finger tap on the icon), the contacts module creates a phone number for the corresponding contact.

In some embodiments, the user can select additional phone number types. For example, in response to the user activating selection icon 2624 (e.g., by a finger tap on the icon), the touch screen displays a phone label UI (e.g., UI 2600G, FIG. 26G). In some embodiments, in response to the user activating a label in UI 2600G, the chosen label is displayed in place of home icon 2620 in UI 2600F. In some embodiments, the chosen label is also highlighted in UI 2600F to indicate to the user that the phone number being entered will be given the chosen label.

In some embodiments, the user can add custom phone labels to UI 2600F by activating the add labels icon 2628 and entering the via label via a soft keyboard (e.g., 616, not shown).

In some embodiments, the user can delete one or more of the labels in UI 2600G. In some embodiments, only the user's custom labels may be deleted. For example, in response to the user activating the edit icon 2630 (e.g., by a finger tap on the icon), the touch screen displays a delete icon 2632 next to the labels that may be deleted (e.g., UI 2600H, FIG. 26H). If a user activates a delete icon (e.g., by tapping it with a finger), the icon may rotate 90 degrees (e.g., 2634, FIG. 26I) or otherwise change its appearance and/or a second icon may appear (e.g., remove/confirm delete icon 2636, FIG. 26I). If the user activates the second icon, the contact module deletes the corresponding label. This deletion process is analogous to the process described above with respect to FIG. 7. As noted above, a deletion process that requires multiple gestures by the user on different parts of the touch screen (e.g., delete icon 2634 and remove/confirm delete icon 2636 are on opposite sides of the touch screen in UI 2600I) greatly reduces the chance that a user will accidentally delete a label or other similar item. The user activates the done icon 2638 (e.g., by tapping on it with a finger) when the user has finished deleting labels and the device returns to UI 2600G.

In some embodiments, in response to the user activating add new email icon 2610 in UI 2600D, FIG. 26D (e.g., by a finger tap on the icon or on the row containing the icon), the touch screen displays a user interface for editing the email address(es) of the contact (e.g., UI 2600J, FIG. 26J). In some embodiments, the keyboard 2601 (FIG. 26J) for entering an email address has no space bar (because email addresses do not contain spaces). Instead, the area in the keyboard that would typically contain a space bar contains an "@" key 2601, a period key 2603, and a ".com" key 2605. Because all email addresses contain "@" and ".", and many email addresses include ".com", including these keys in keyboard 2601 makes entering email addresses faster and easier.

In some embodiments, in response to the user entering the email address (e.g., via keyboard 616 in UI 2600J, FIG. 26J); specifying the type of email address (e.g., by a tap or other predefined gesture on home icon 2640 or selection icon 2646); and activating the save icon 2648 (e.g., by a finger tap on the icon), the contacts module creates an email address for the corresponding contact.

In some embodiments, the user can select additional email address types by activating selection icon 2646; add custom email address types, and/or delete email address types using processes and UIs analogous to those described for phone number types (FIGS. 26G-26I).

In some embodiments, in response to the user activating add new URL icon 2611 in UI 2600D, FIG. 26D (e.g., by a finger tap on the icon or on the row containing the icon), the touch screen displays a user interface for editing the URLs of the contact (e.g., UI 2600K, FIG. 26K).

In some embodiments, in response to the user entering the URL (e.g., via keyboard 616 in UI 2600K, FIG. 26K); specifying the type of URL (e.g., by a tap or other predefined gesture on home page icon 2678 or selection icon 2680); and activating the save icon 2648 (e.g., by a finger tap on the icon), the contacts module creates a URL for the corresponding contact.

In some embodiments, the user can select additional URL types by activating selection icon 2680; add custom URL types, and/or delete URL types using processes and UIs analogous to those described for phone number types (FIGS. 26G-26I).

In some embodiments, in response to the user activating add new address icon 2612 in UI 2600D, FIG. 26D (e.g., by a finger tap on the icon or on the row containing the icon), the touch screen displays a user interface for editing the physical address(es) of the contact (e.g., UI 2600L, FIG. 26L).

In some embodiments, in response to the user entering the address (e.g., via keyboard 616 in UI 2600L, FIG. 26L); specifying the type of address (e.g., by a tap or other predefined gesture on work icon 2652 or selection icon 2656); and activating the save icon 2658 (e.g., by a finger tap on the icon), the contacts module creates an address for the corresponding contact. In some embodiments, in response to detecting a gesture on the zip code field 2654, display of keyboard 616 is ceased and a numerical keyboard 624 (FIG. 6C) is displayed, to allow the user to provide numerical input to the zip code field 2654.

In some embodiments, the user can select additional address types by activating selection icon 2656; add custom address types, and/or delete address types using processes and UIs analogous to those described for phone number types (FIGS. 26G-26I).

FIG. 26M illustrates an exemplary user interface for an existing contact list entry in accordance with some embodiments. In response to the user selecting edit icon 2664 (e.g., by a finger tap on the icon), the touch screen displays a user interface for editing the contact (e.g., UI 2600O, FIG. 26O). In response to user selections, the contact list module may delete one or more items of existing contact information, add new phone numbers, add new email addresses, add new physical addresses, and/or add new URLs using the processes and UIs described above (e.g., FIGS. 26E-26L).

In response to the user selecting text message icon 2682 in FIG. 26M (e.g., by a finger tap on the icon), the touch screen displays a user interface (e.g., UI 2600N, FIG. 26N) for choosing a phone number associated with the contact for a text message or other instant message, such as the contact's work number 2686 or home number 2688. In response to the user selecting one of the contact's phone numbers, the touch screen displays a UI for creating and sending a message to the selected phone number (e.g., UI 600A in FIG. 6A).

Figure 27A:
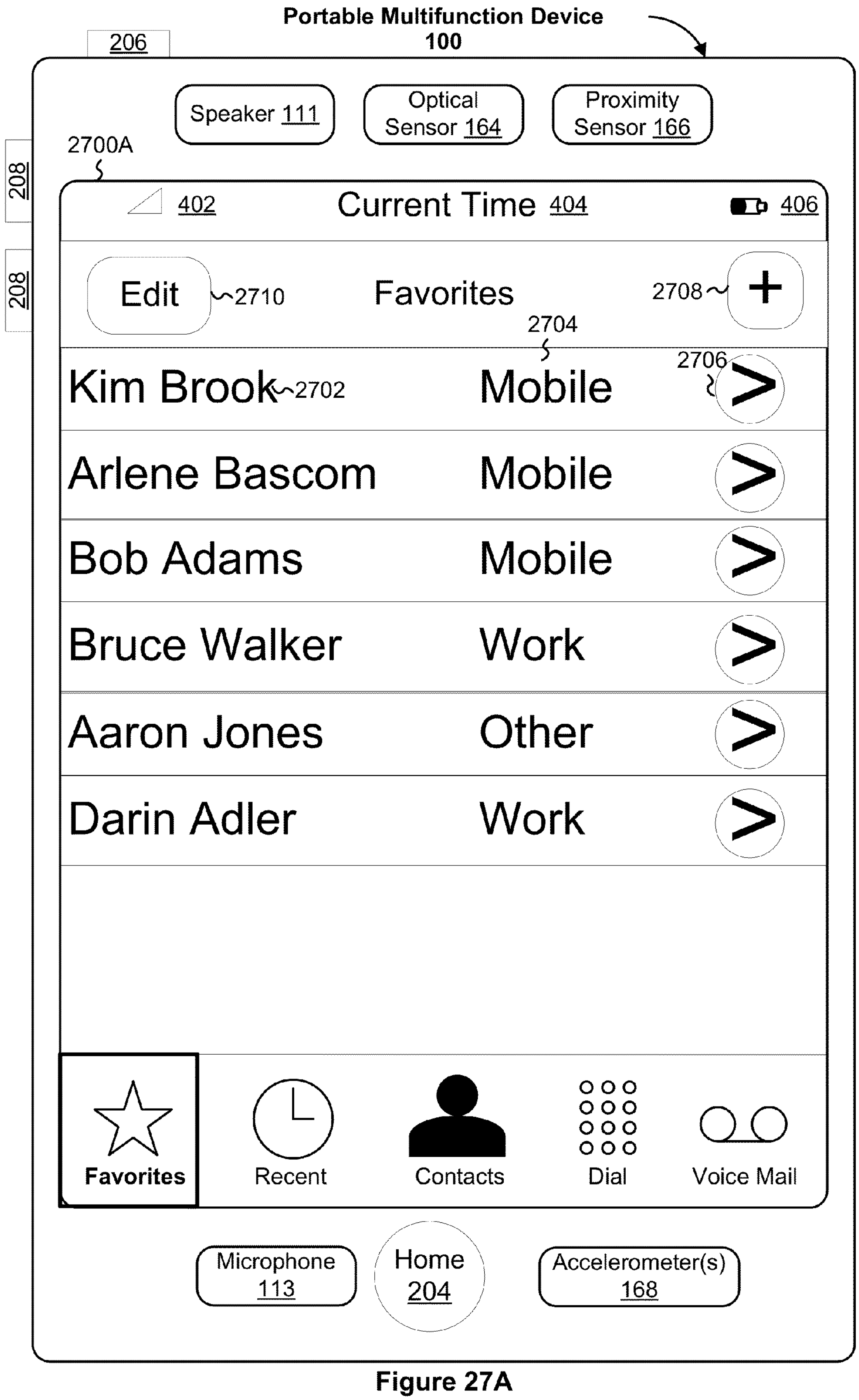
FIGS. 27A-27F illustrate an exemplary user interface for displaying and managing favorite contacts in accordance with some embodiments.

In response to the user selecting add to favorites icon 2684 in FIG. 26M (e.g., by a finger tap on the icon), the contact is added to the list of favorites (e.g., UI 2700A, FIG. 27A)

FIGS. 27A-27F illustrate an exemplary user interface for displaying and managing favorite contacts in accordance with some embodiments. UI 2700A displays an exemplary list of favorites. In some embodiments, each row in the list that corresponds to a favorite includes the name 2702 of the favorite, the type of phone number 2704 for the favorite that will be called, and an additional information icon 2706. In some embodiments, in response to the user activating icon 2706 for a particular favorite (e.g., by a finger tap on the icon), the touch screen displays the corresponding contact list entry for that favorite (e.g., UI 2600M, FIG. 26M). In some embodiments, in response to a user tap or other predefined gesture elsewhere (i.e., a tap or gesture other than on icon 2702) in the row corresponding to a particular favorite, the phone module dials the corresponding phone number 2704 for that particular favorite.

In some embodiments, in response to the user activating add favorite icon 2708 (e.g., by a finger tap on the icon), the device displays the user's contact list, from which the user selects the contact list entry for a new favorite and a phone number in the entry for the new favorite.

Figure 27B:
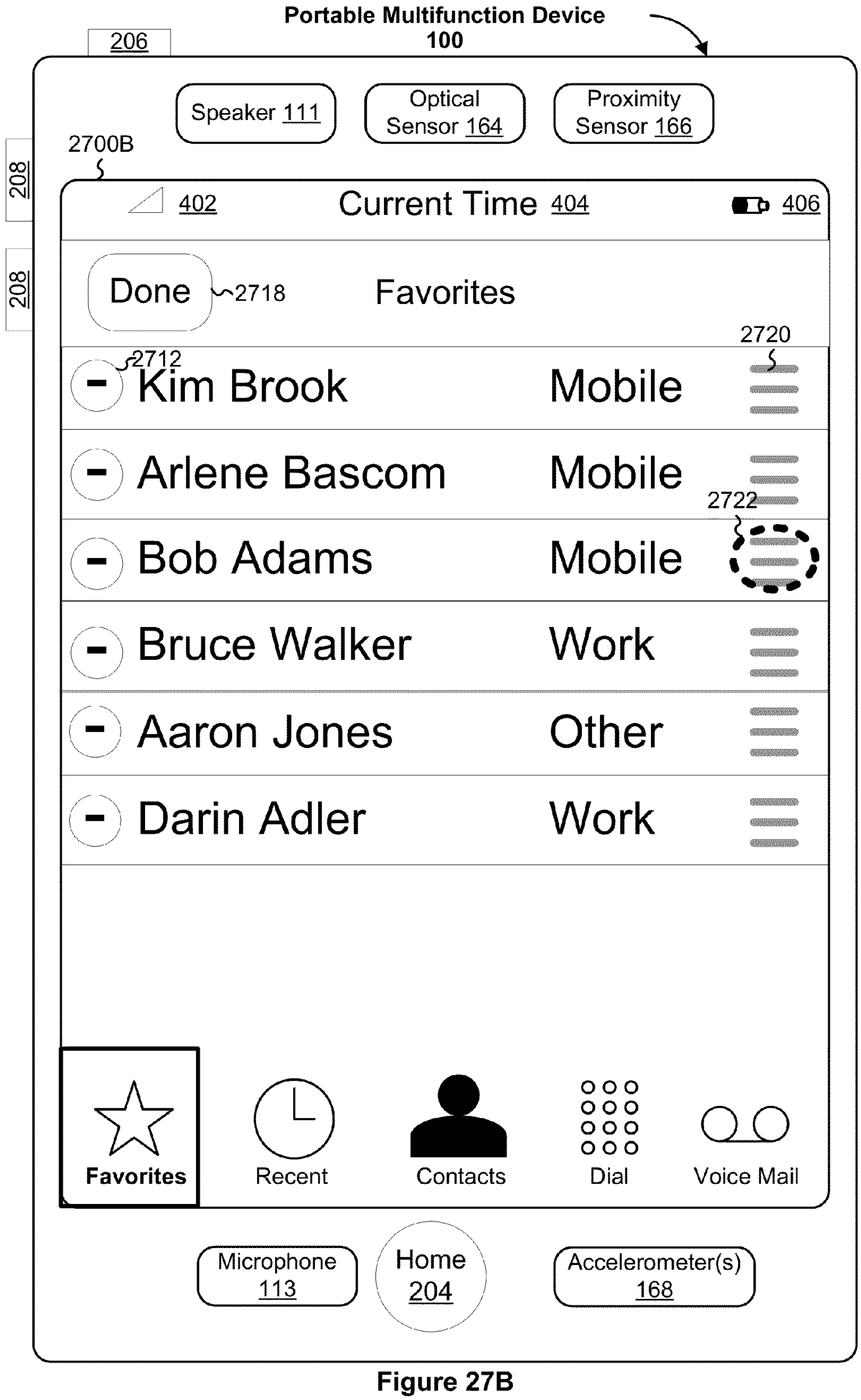

In some embodiments, in response to the user activating the edit icon 2710 (e.g., by a finger tap on the icon), the touch screen displays a delete icon 2712 and/or a moving-affordance icon 2720 next to the favorites (e.g., UI 2700B, FIG. 27B).

Figure 27C:
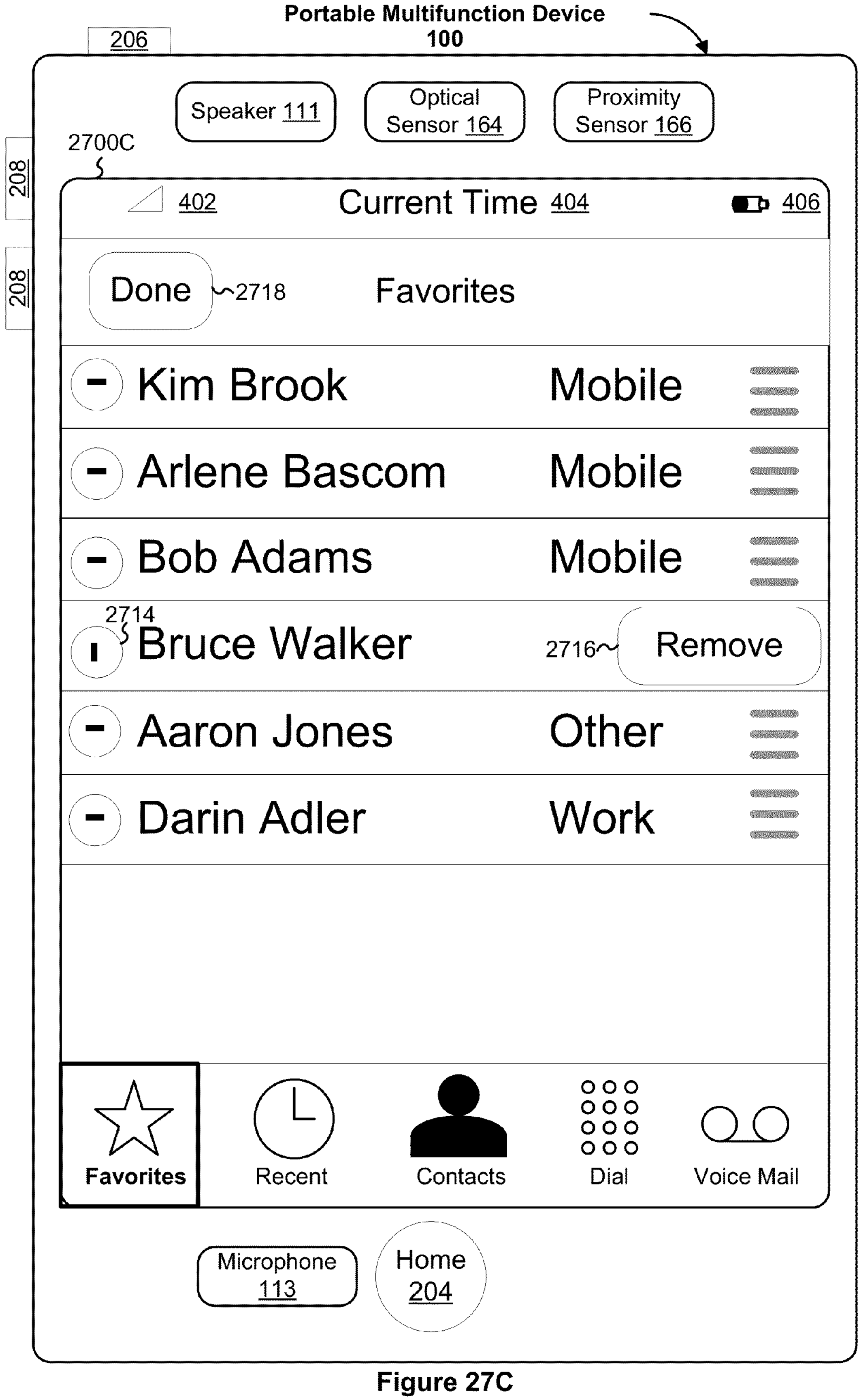

If a user activates a delete icon (e.g., by tapping it with a finger), the icon may rotate 90 degrees (e.g., 2714, FIG. 27C) or otherwise change its appearance and/or a second icon may appear (e.g., remove/confirm delete icon 2716, FIG. 27C). If the user activates the second icon, the corresponding favorite is deleted. This deletion process is analogous to the process described above with respect to FIGS. 7 and 26H and 26I. As noted above, a deletion process that requires multiple gestures by the user on different parts of the touch screen (e.g., delete icon 2714 and remove/confirm delete icon 2716 are on opposite sides of the touch screen in UI 2700C) greatly reduces the chance that a user will accidentally delete a favorite or other similar item. The user activates the done icon 2718 (e.g., by tapping on it with a finger) when the user has finished deleting favorites and the device returns to UI 2700A.

Figure 27D:
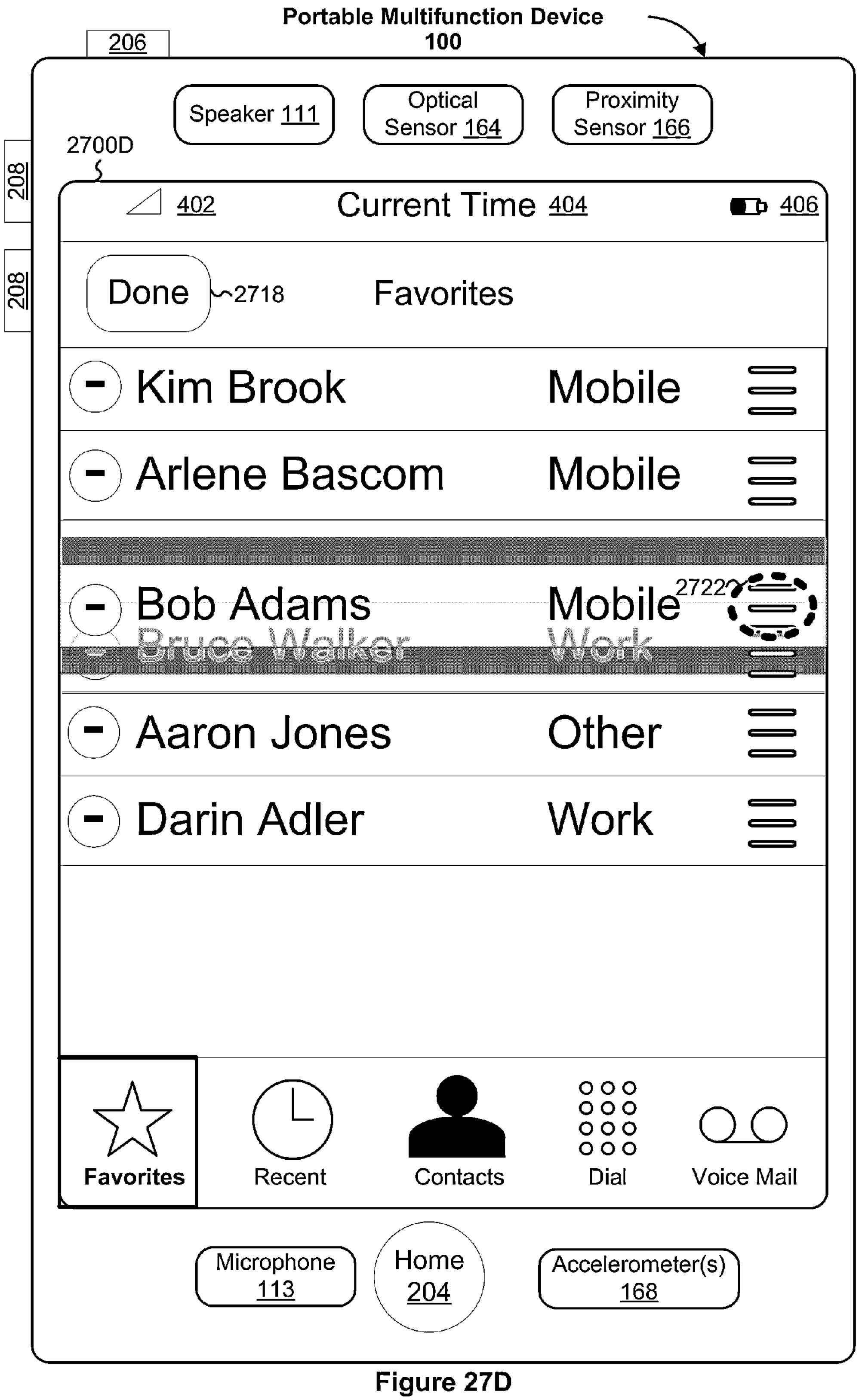
Figure 27E:
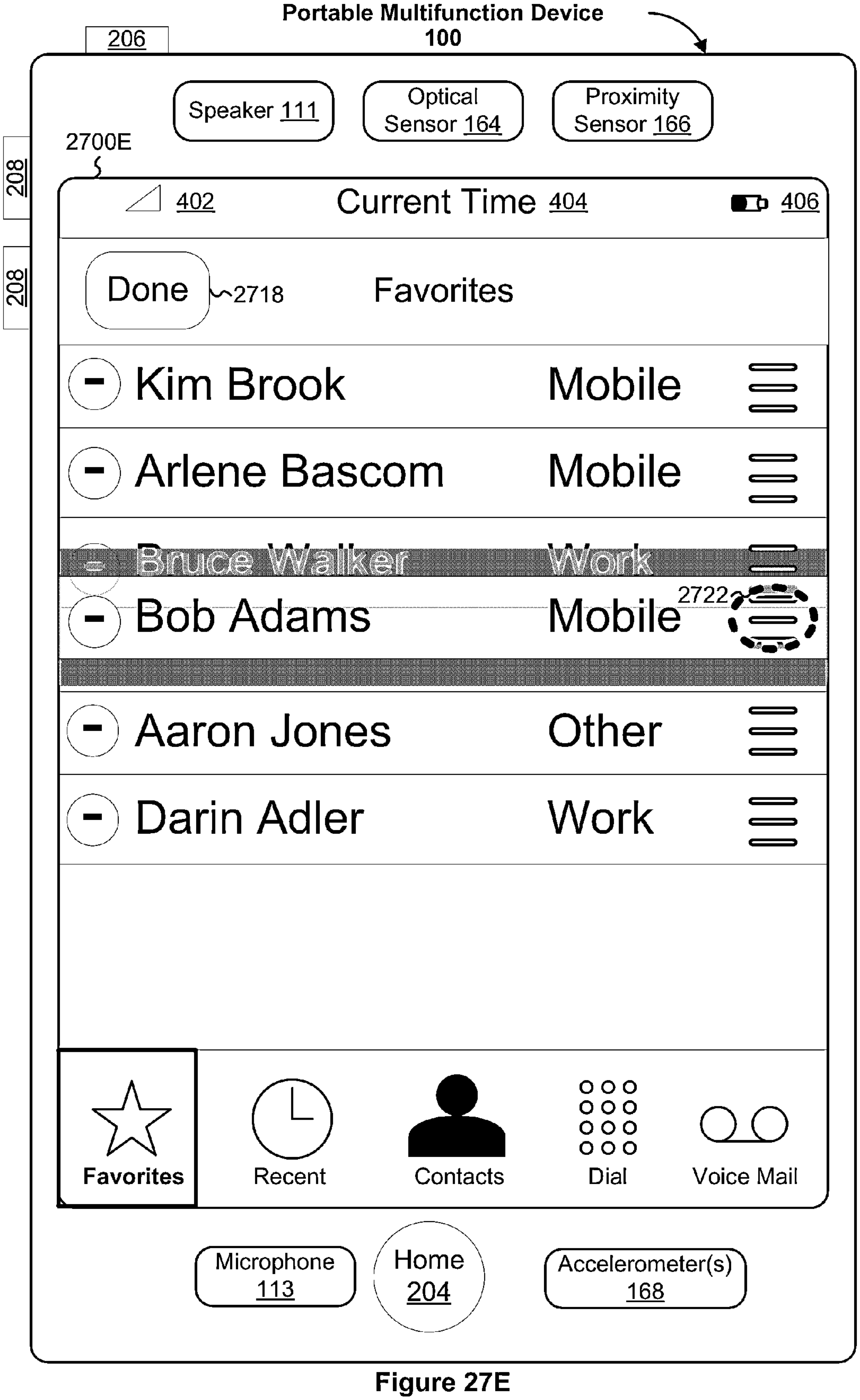
Figure 27F:
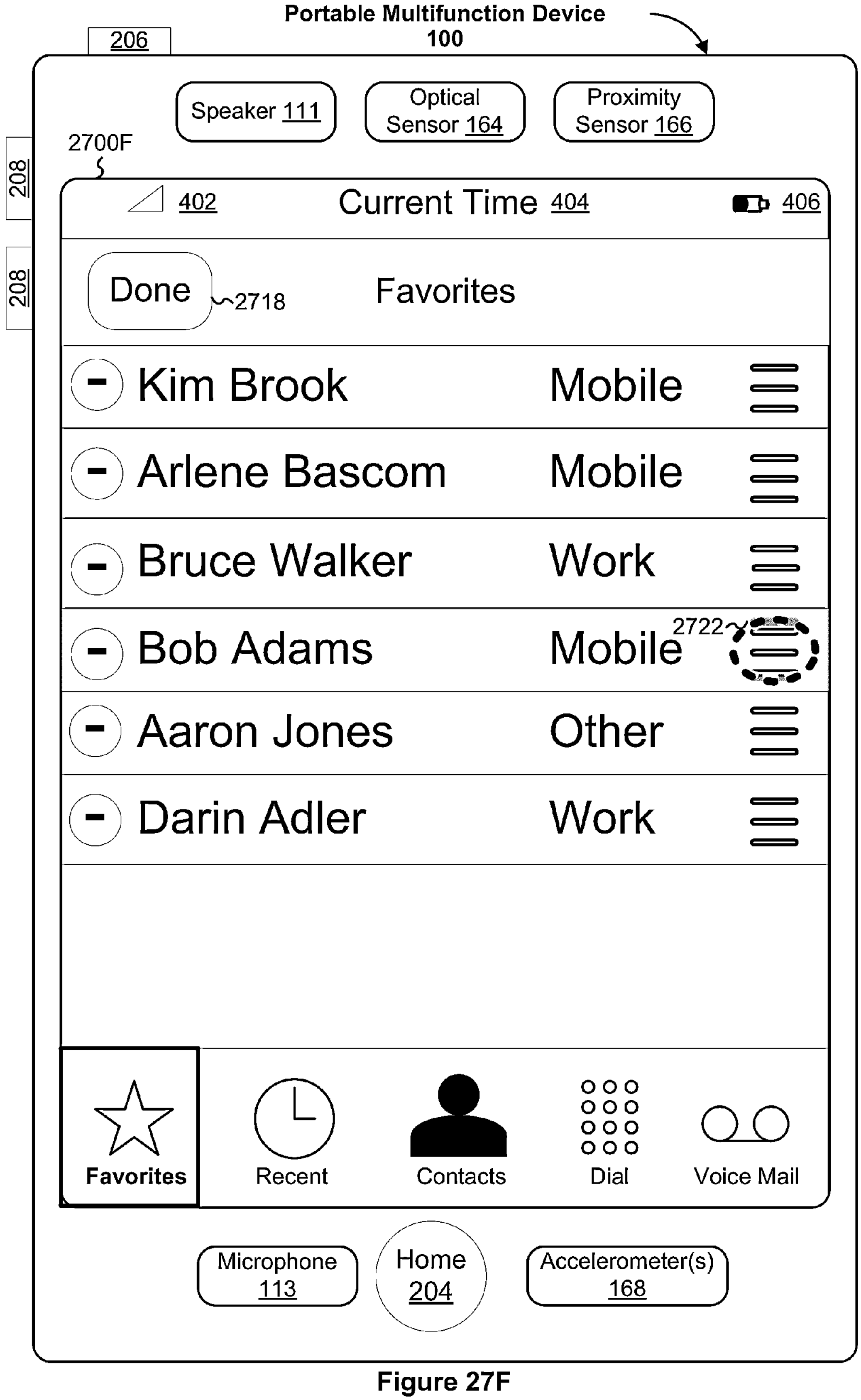

If a user activates a moving-affordance icon 2720 icon (e.g., by contacting it with a finger 2722), the corresponding favorite may be repositioned in the list of favorites, as illustrated in FIGS. 27D-27F. The user activates the done icon 2718 (e.g., by tapping on it with a finger) when the user has finished reordering the favorites and the device returns to UI 2700A.

Additional description of the reordering of user-configurable lists can be found in U.S. Provisional Patent Application No. 60/883,808, "System And Method For Managing Lists," filed Jan. 7, 2007 and U.S. patent application Ser. No. 11/770,725, "System and Method for Managing Lists," filed Jun. 28, 2007, the contents of which are hereby incorporated by reference.

FIGS. 28A-28D illustrate an exemplary user interface for displaying and managing recent calls in accordance with some embodiments.

Figure 28A:
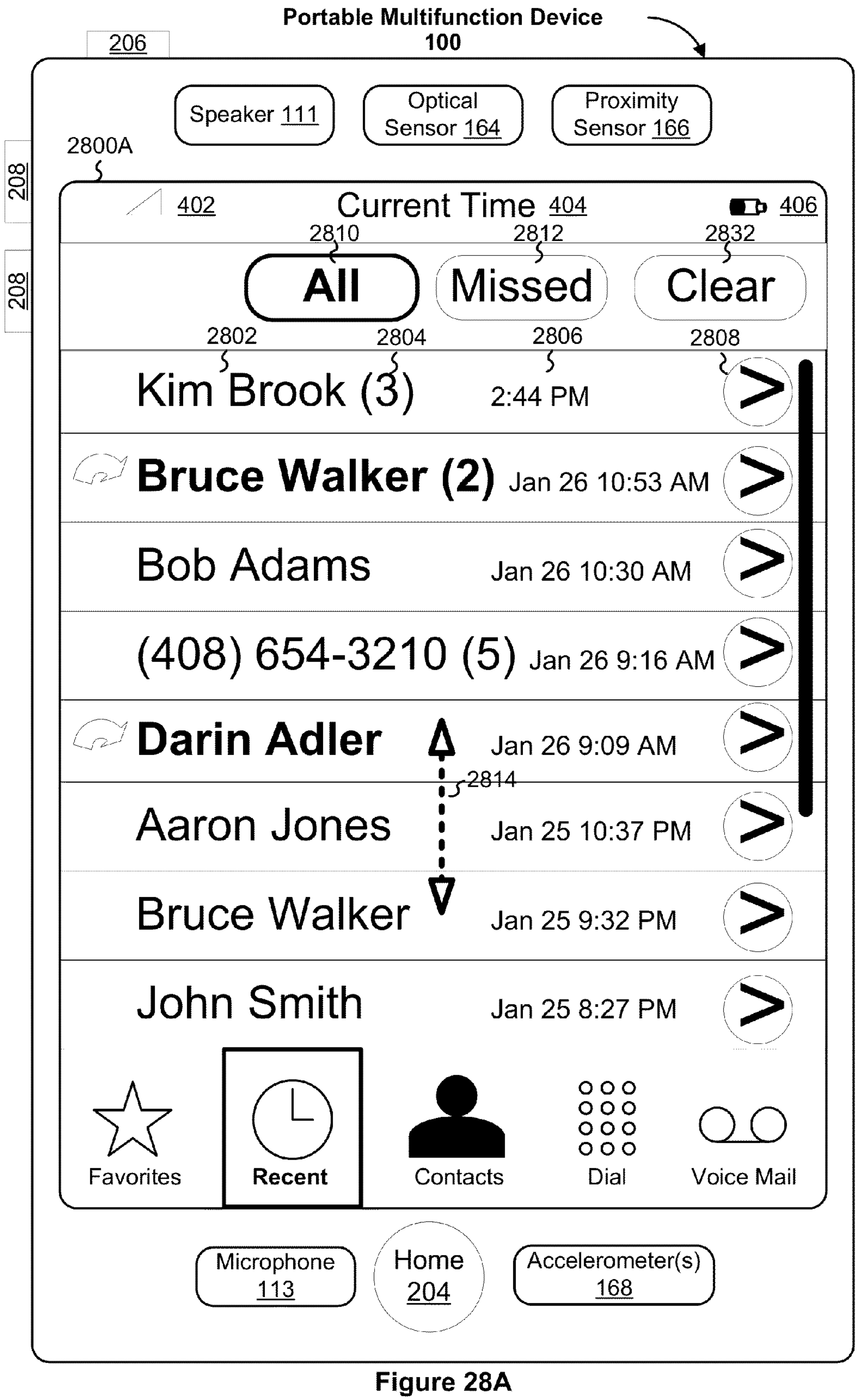
FIGS. 28A-28D illustrate an exemplary user interface for displaying and managing recent calls in accordance with some embodiments.
Figure 28B:
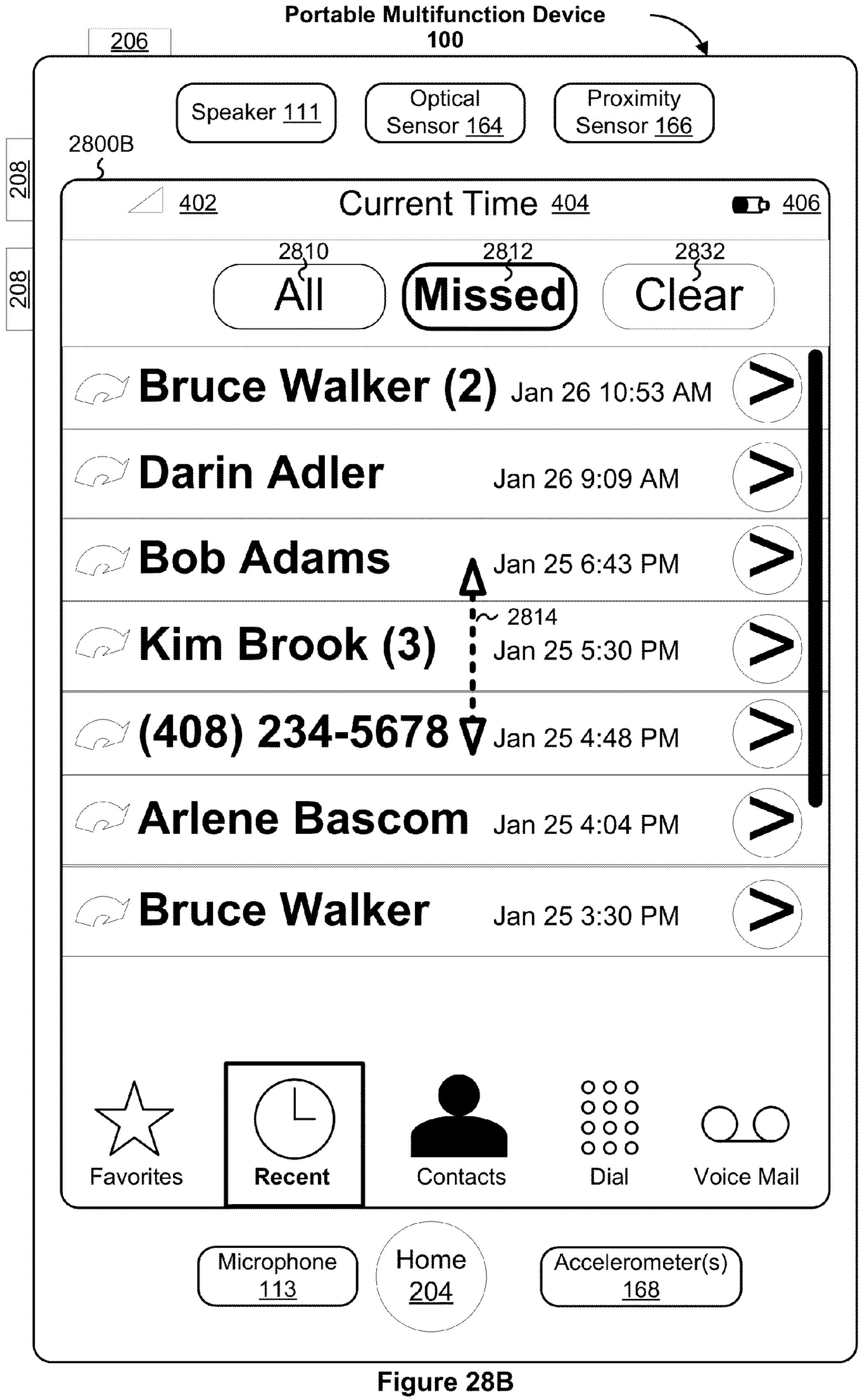
Figure 28C:
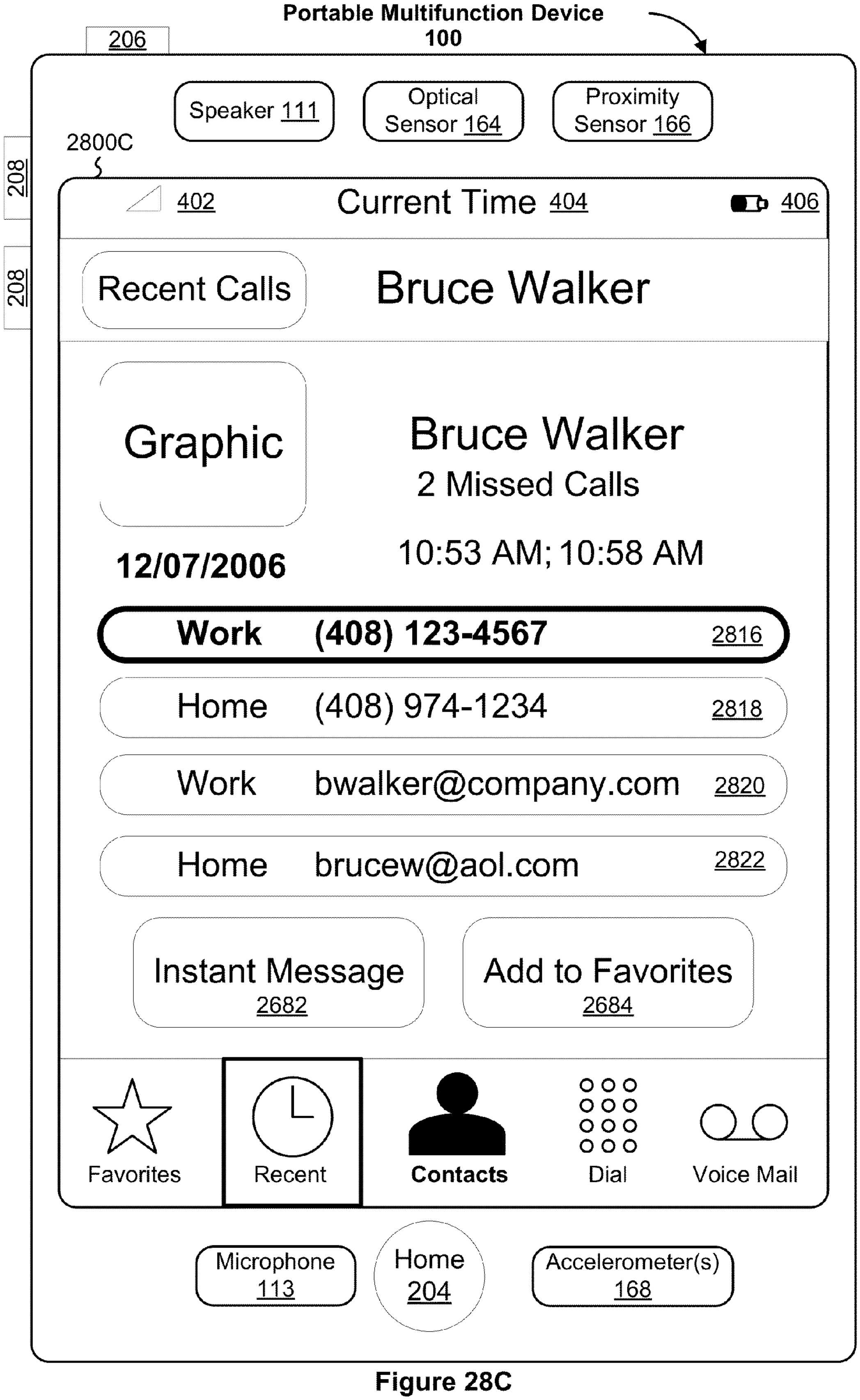

In some embodiments, in response to the user activating All icon 2810, the touch screen displays a list of all recent calls (e.g., UI 2800A, FIG. 28A). In some embodiments, in response to the user activating Missed icon 2812, the touch screen displays a list of recent missed calls (e.g., UI 2800B, FIG. 28B).

In some embodiments, each row in a list corresponds to a call or a consecutive sequence of calls involving the same person or the same number (without an intervening call involving another person or another phone number). In some embodiments, each row includes: the name 2802 of the other party (if available via the contact module) or the phone number (if the name of the other party is not available); the number 2804 of consecutive calls; the date and/or time 2806 of the last call; and an additional information icon 2808. In some embodiments, in response to the user activating icon 2808 for a particular row (e.g., by a finger tap on the icon), the touch screen displays the corresponding contact list entry for the other party (e.g., UI 2800C, FIG. 28C) or UI 2800D (FIG. 28D) if the phone number cannot be associated with an entry in the user's contact list. In some embodiments, in response to a user tap or other predefined gesture elsewhere (i.e., a tap or gesture other than on icon 2808) in a given row, the phone module dials the corresponding phone number for that row.

In some embodiments, some rows may include icons indicating whether the last call associated with the row was missed or answered.

If the list of recent calls fills more than the screen area, the user may scroll through the list using vertically upward and/or vertically downward gestures 2814 on the touch screen.

In some embodiments, UI 2800C highlights (e.g., with color, shading, and/or bolding) the phone number associated with the recent call (e.g., the two recent incoming calls from Bruce Walker in UI 2800A came from Bruce Walker's work number 2816). In some embodiments, in response to a user tap or other predefined gesture on the highlighted number 2816, the phone module dials the highlighted number (e.g., 2816). In some embodiments, in response to a user tap or other predefined gesture on another number in the contact list entry (e.g., home number 2818), the phone module dials the corresponding number. In some embodiments, in response to a user tap or other predefined gesture on an email address in the contact list entry (e.g., either work email 2820 or home email 2822), the email module prepares an email message with the selected email address, ready for text input by the user. Thus, by selecting icon 2808 (FIG. 28A), the user may then easily respond to a caller using the same number involved in the previous call (e.g., 2816), another number associated with the same caller (e.g., 2818), or another mode of communication besides the phone (e.g., an email to the caller's work 2820 or home 2822 email address).

In some embodiments, UI 2800D provides one or more options for a user to make use of a phone number in a recent call that is not associated with an entry in the user's contact list. In some embodiments, in response to a tap or other predefined user gesture, the device may: call the phone number (e.g., if the gesture is applied to icon 2824); initiate creation of a text message or other instant message to the phone number (e.g., if the gesture is applied to icon 2825); create a new contact with the phone number (e.g., if the gesture is applied to icon 2826); or add the phone number to an existing contact (e.g., if the gesture is applied to icon 2828).

In some embodiments, in response to detecting a gesture on the clear icon 2832 (e.g., a single finger tap on the icon 2832), one or more recent calls selected by the user are deleted from the list of recent calls.

Additional description of missed call management can be found in U.S. Provisional Patent Application No. 60/883,782, "Telephone Call Management For A Portable Multifunction Device," filed Jan. 6, 2007 and U.S. patent application Ser. No. 11/769,694, "Missed Telephone Call Management for a Portable Multifunction Device," filed Jun. 27, 2007, the contents of which are hereby incorporated by reference.

Figure 29:
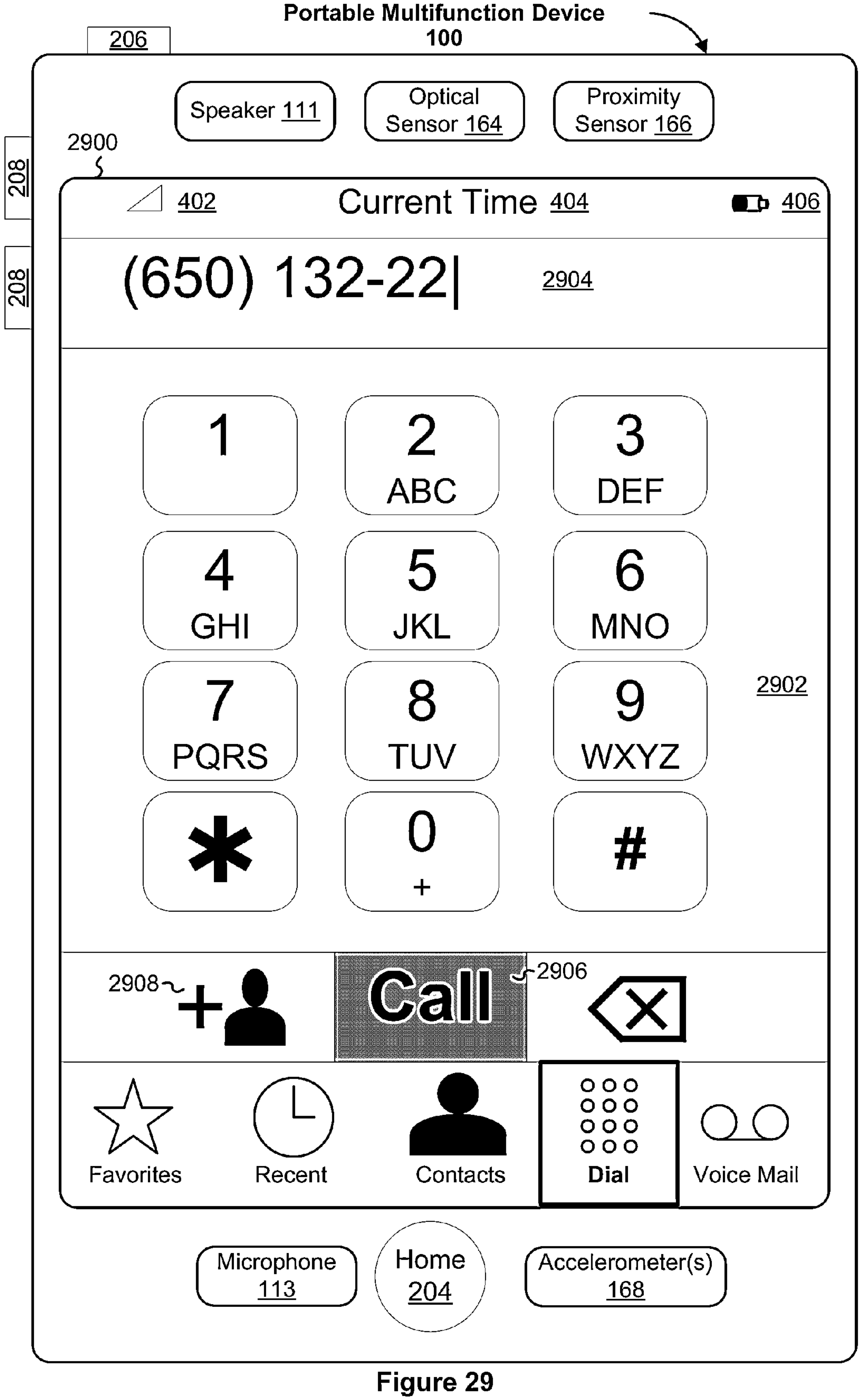
FIG. 29 illustrates an exemplary dial pad interface for calling in accordance with some embodiments.

FIG. 29 illustrates an exemplary dial pad interface for calling in accordance with some embodiments. In response to the user activating the number keys in dial pad 2902 (e.g., by finger taps on the number icons), the touch pad displays the selected digits 2904. In some embodiments, the phone module automatically adds the parentheses and dashes to the selected digits to make the number easier to read. In response to the user activating the call icon 2906, the phone module dials or transmits the selected digits. In response to the user activating the create contact icon 2908, numbers entered with the touchpad may be used in a new contact or added to an existing contact.

In some embodiments, the device performs location-based dialing, which simplifies dialing when the user is located outside his/her home country and/or is trying to dial a destination number outside his/her home country.

Additional description of location-based dialing can be found in U.S. Provisional Patent Application No. 60/883,800, "Method, Device, And Graphical User Interface For Location-Based Dialing," filed Jan. 7, 2007 and U.S. patent application Ser. No. 11/769,692, "Method, Device, and Graphical User Interface for Location-Based Dialing," filed Jun. 27, 2007, the contents of which are hereby incorporated by reference.

Figure 30A:
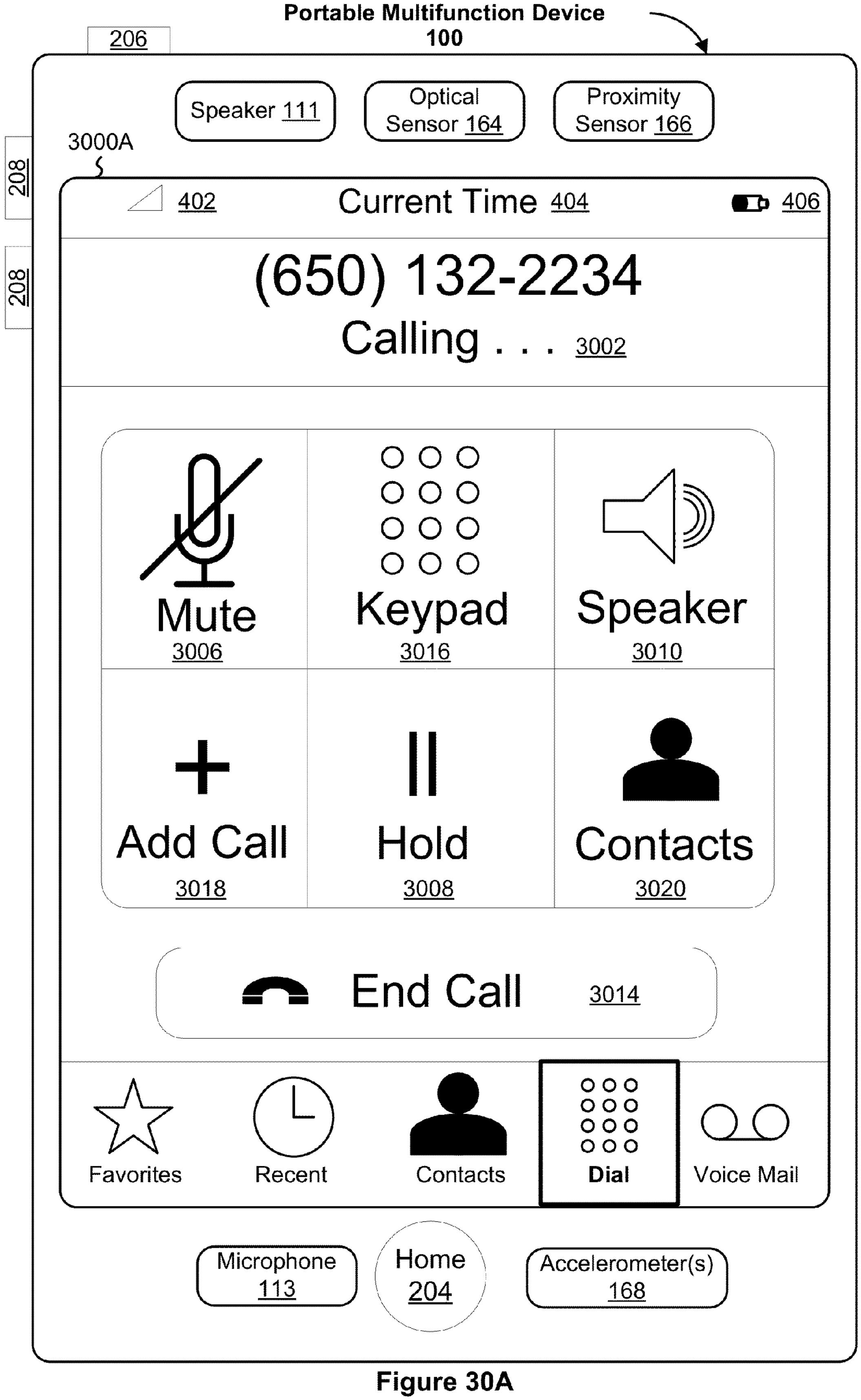
FIGS. 30A-30R illustrate exemplary user interfaces displayed during a call in accordance with some embodiments.
Figure 30B:
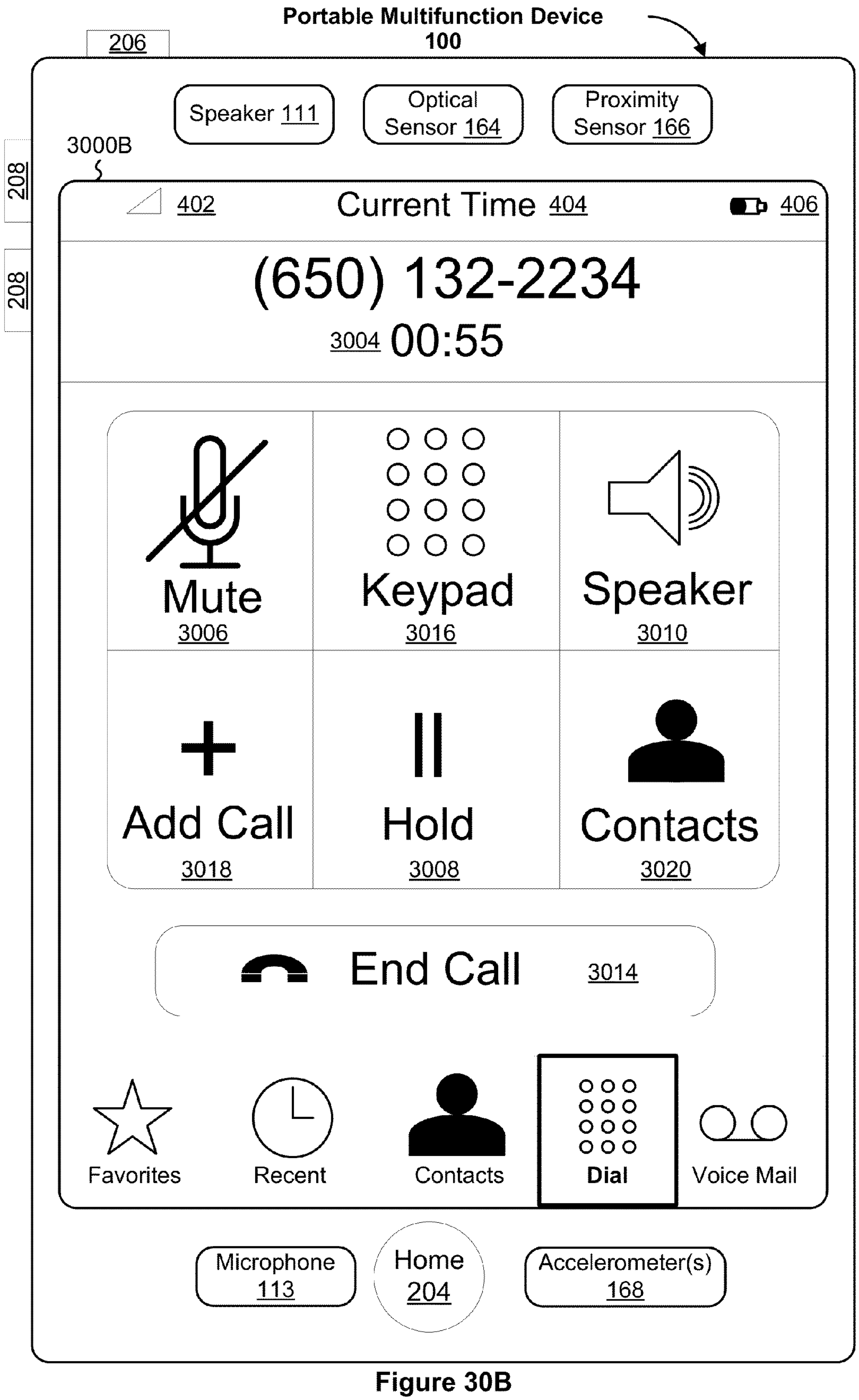
Figure 30C:
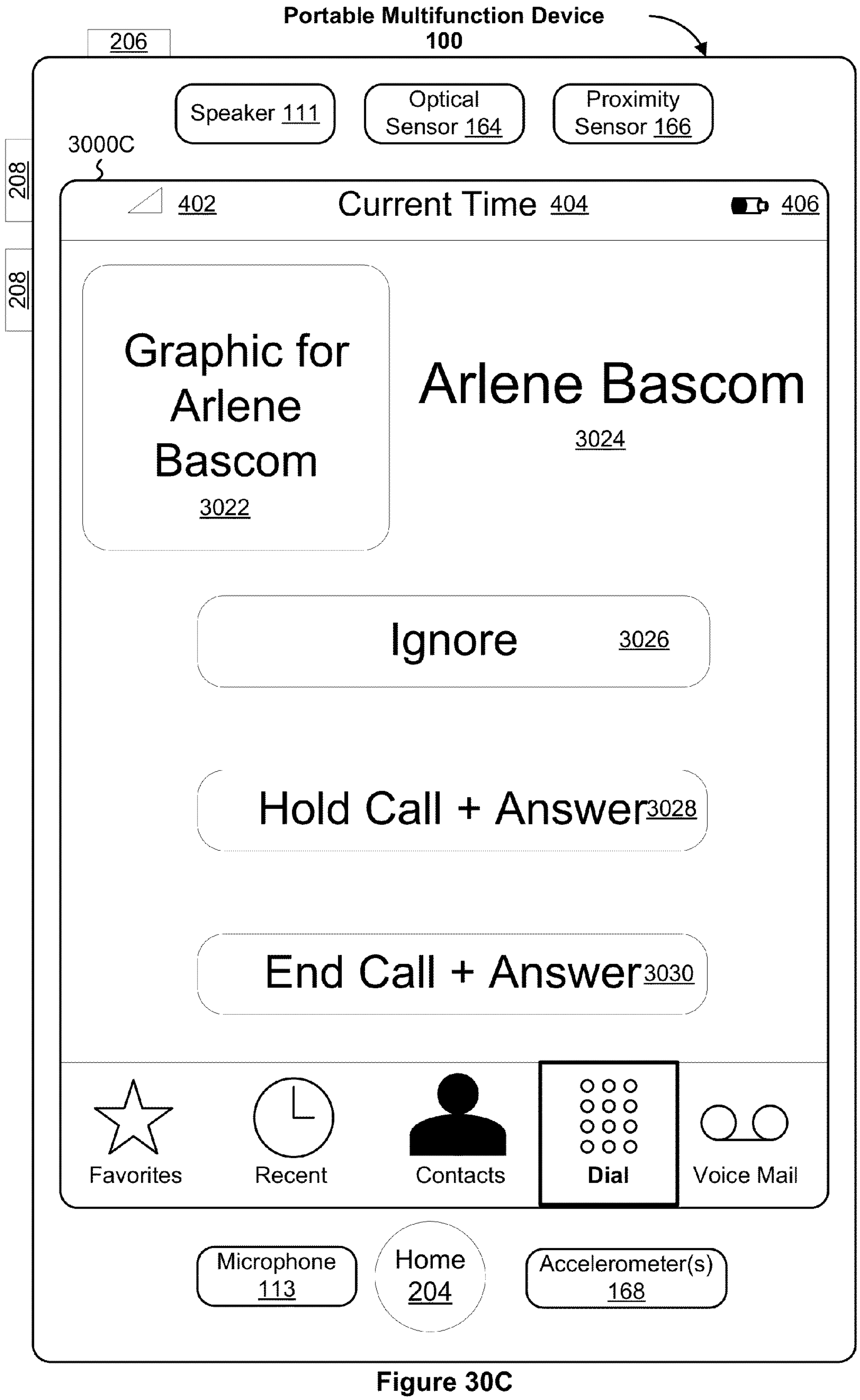
Figure 30D:
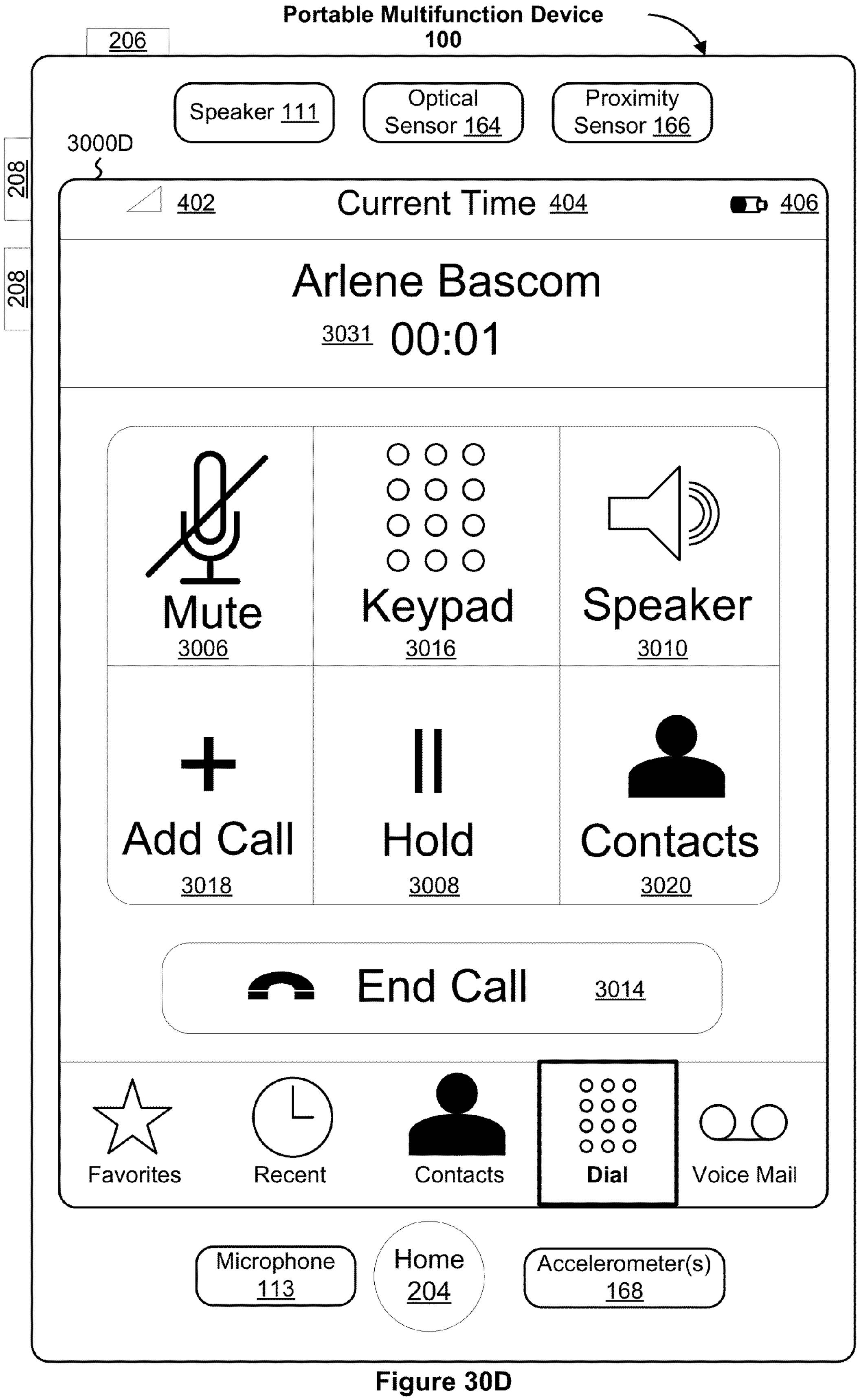
Figure 30E:
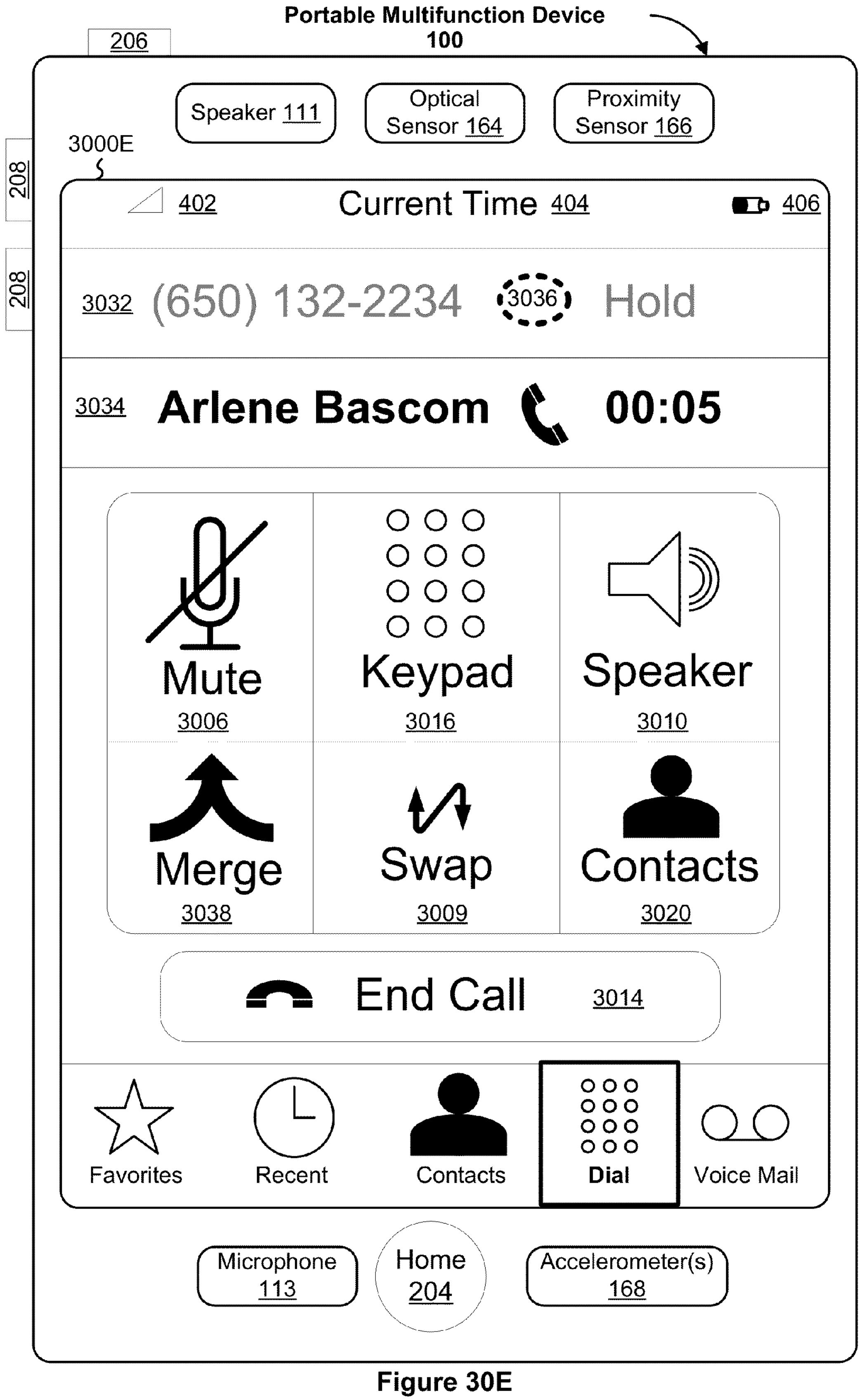
Figure 30F:
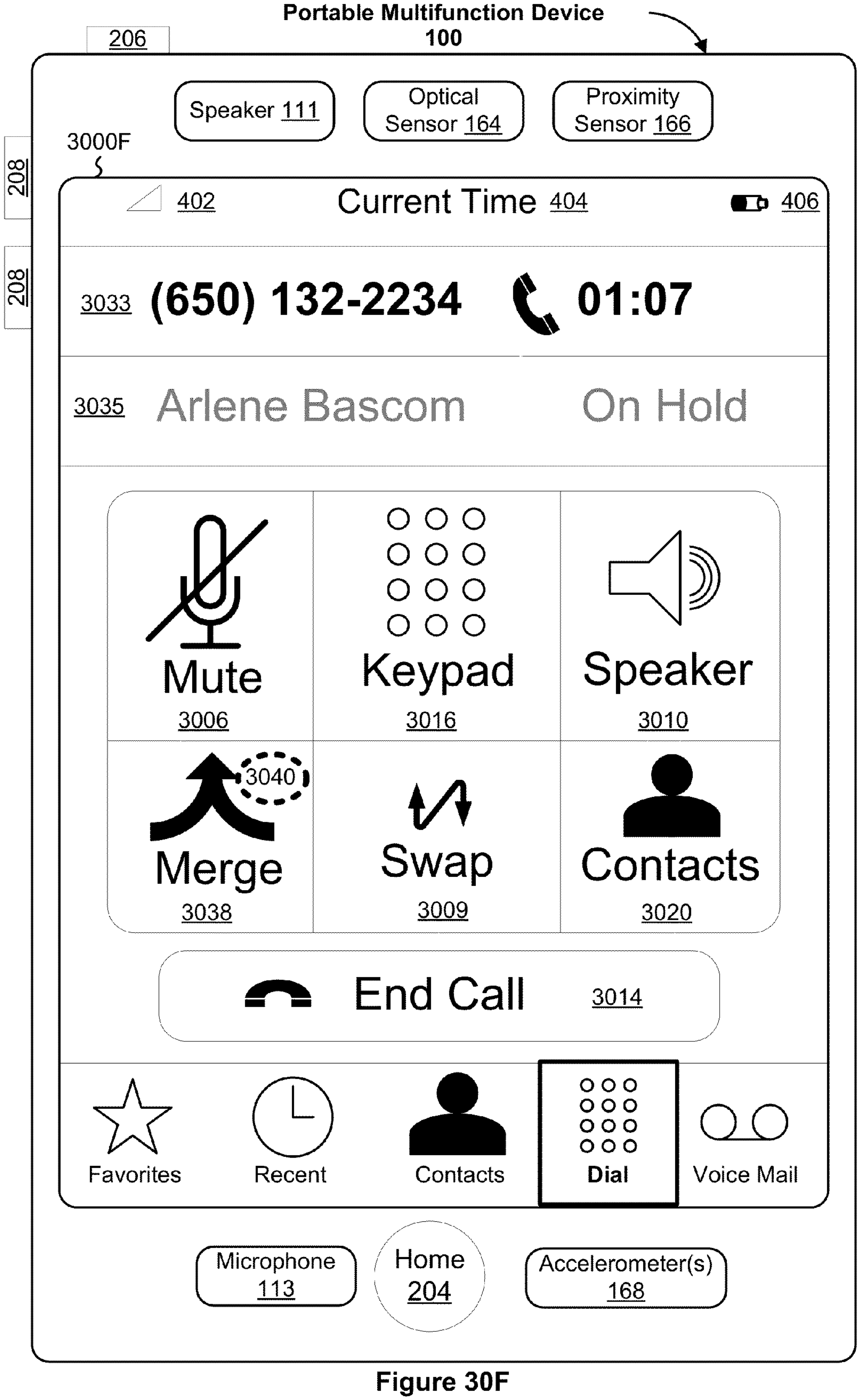
Figure 30G:
Figure 30H:
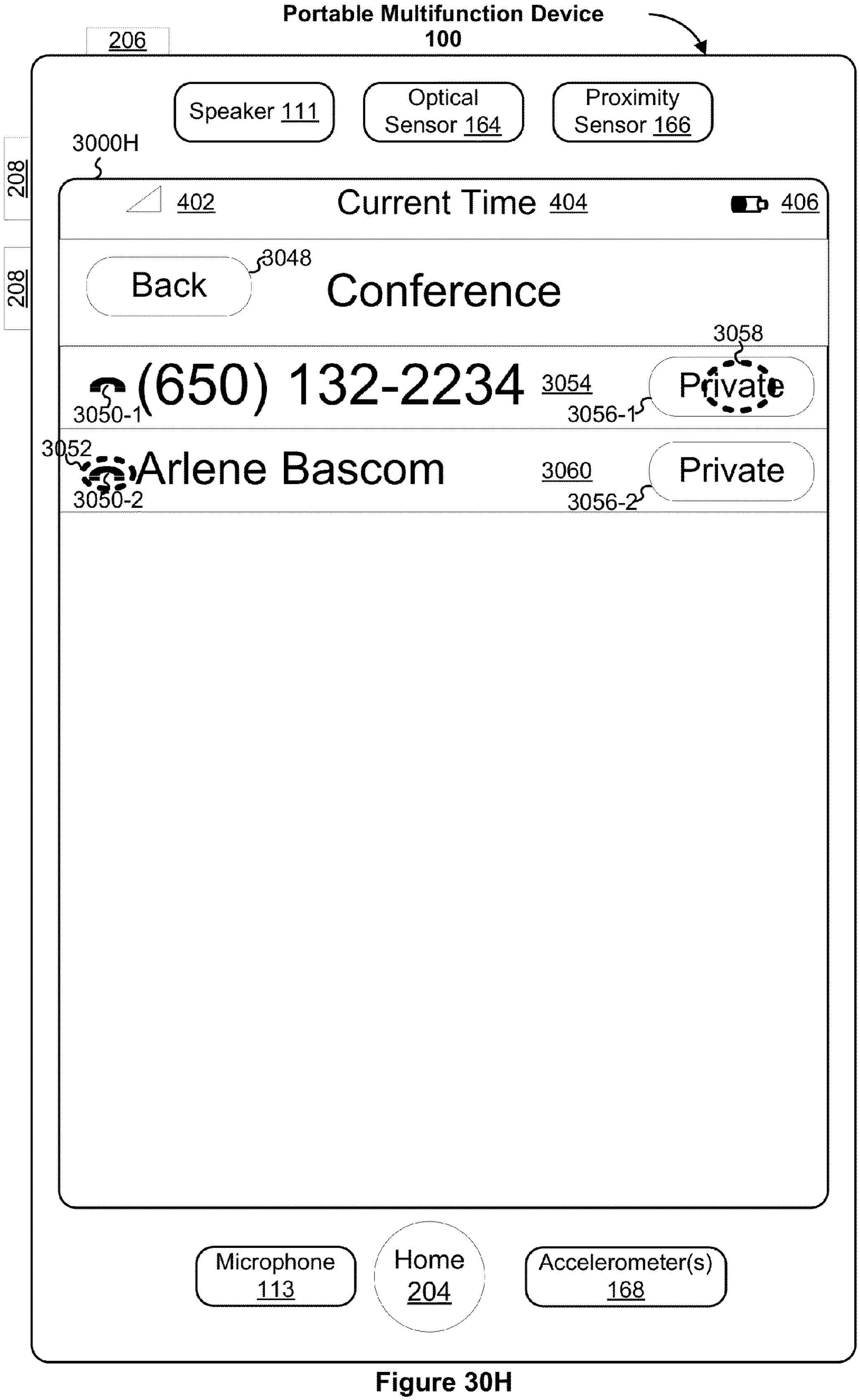
Figure 30I:
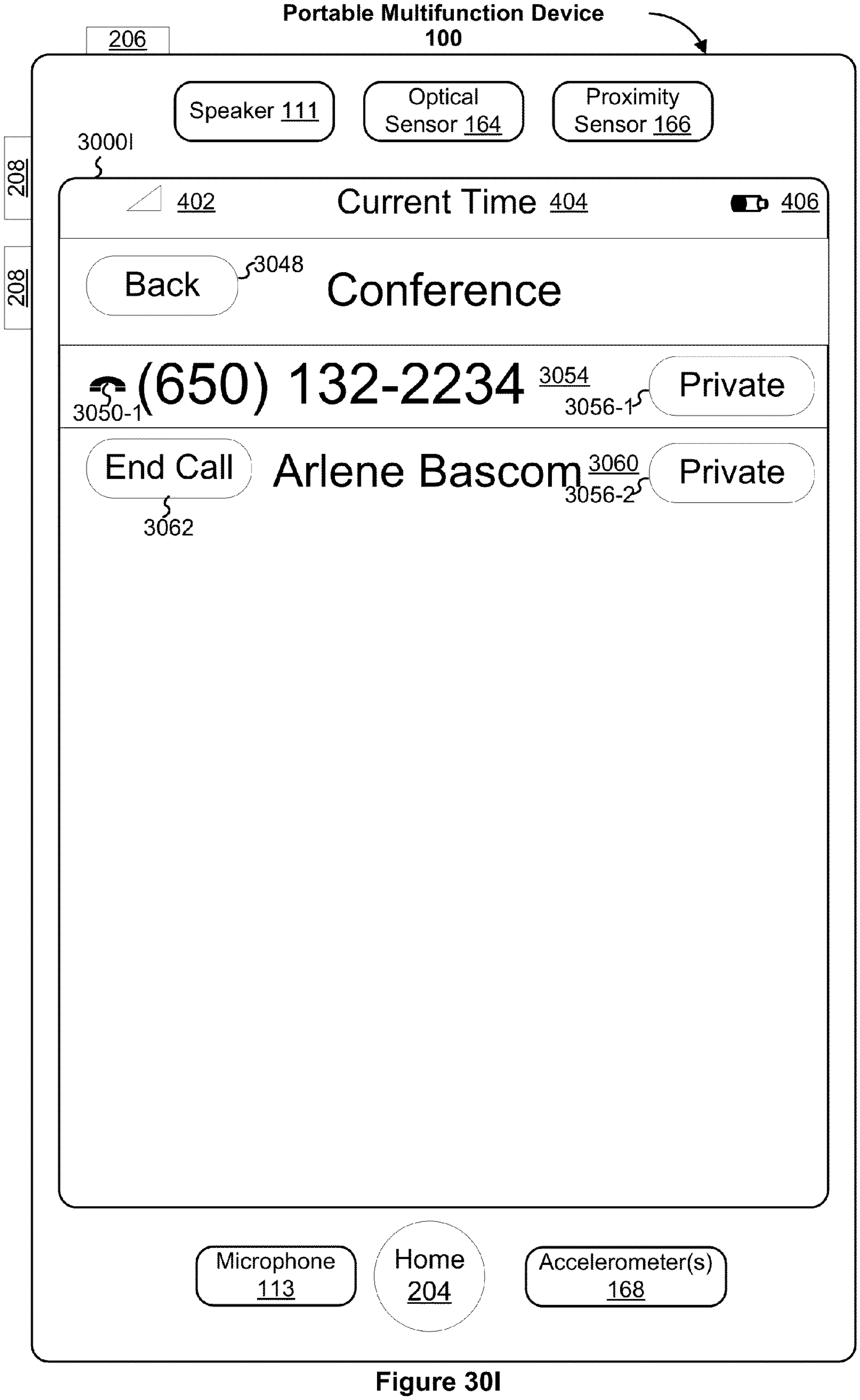
Figure 30J:
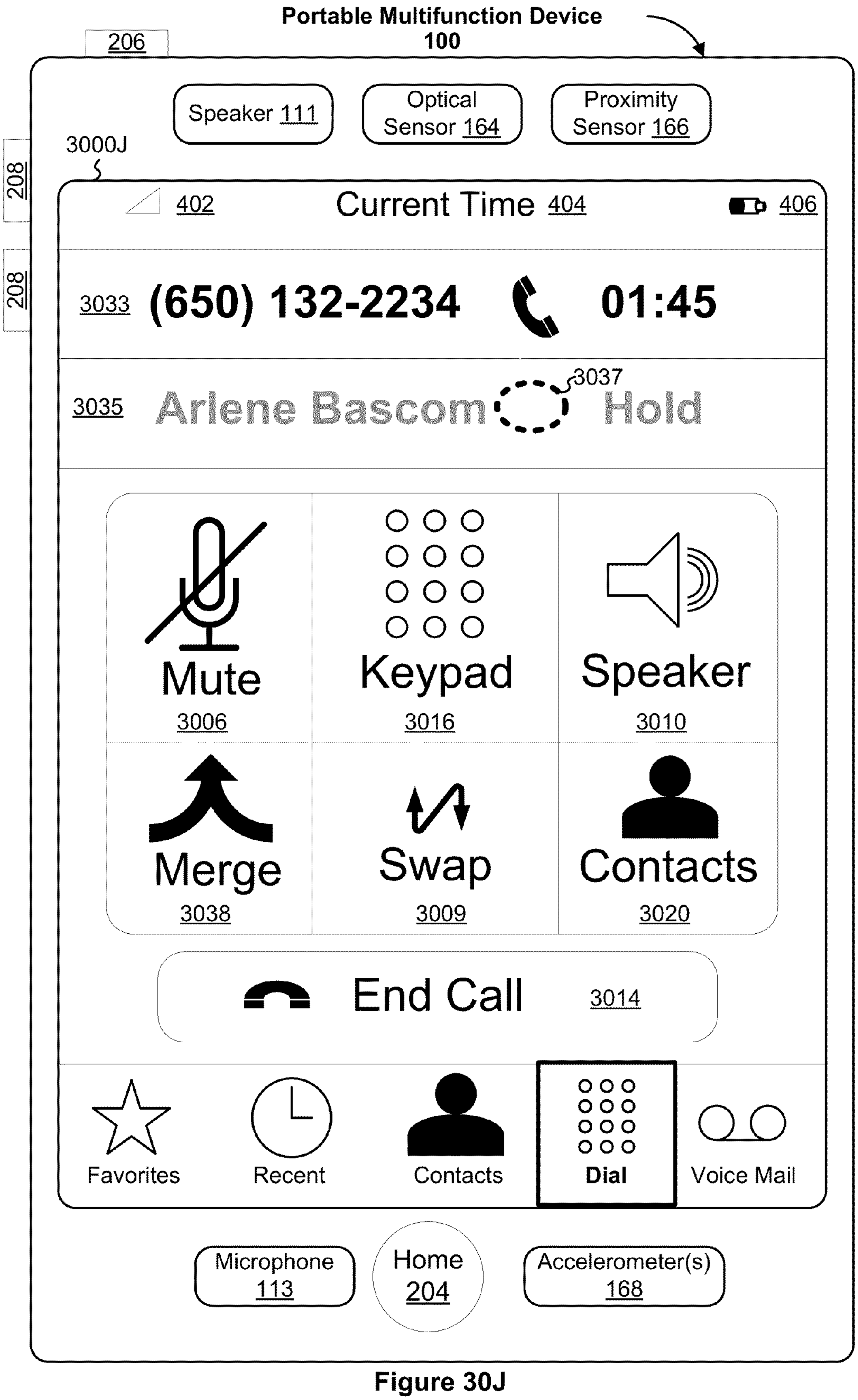
Figure 30K:
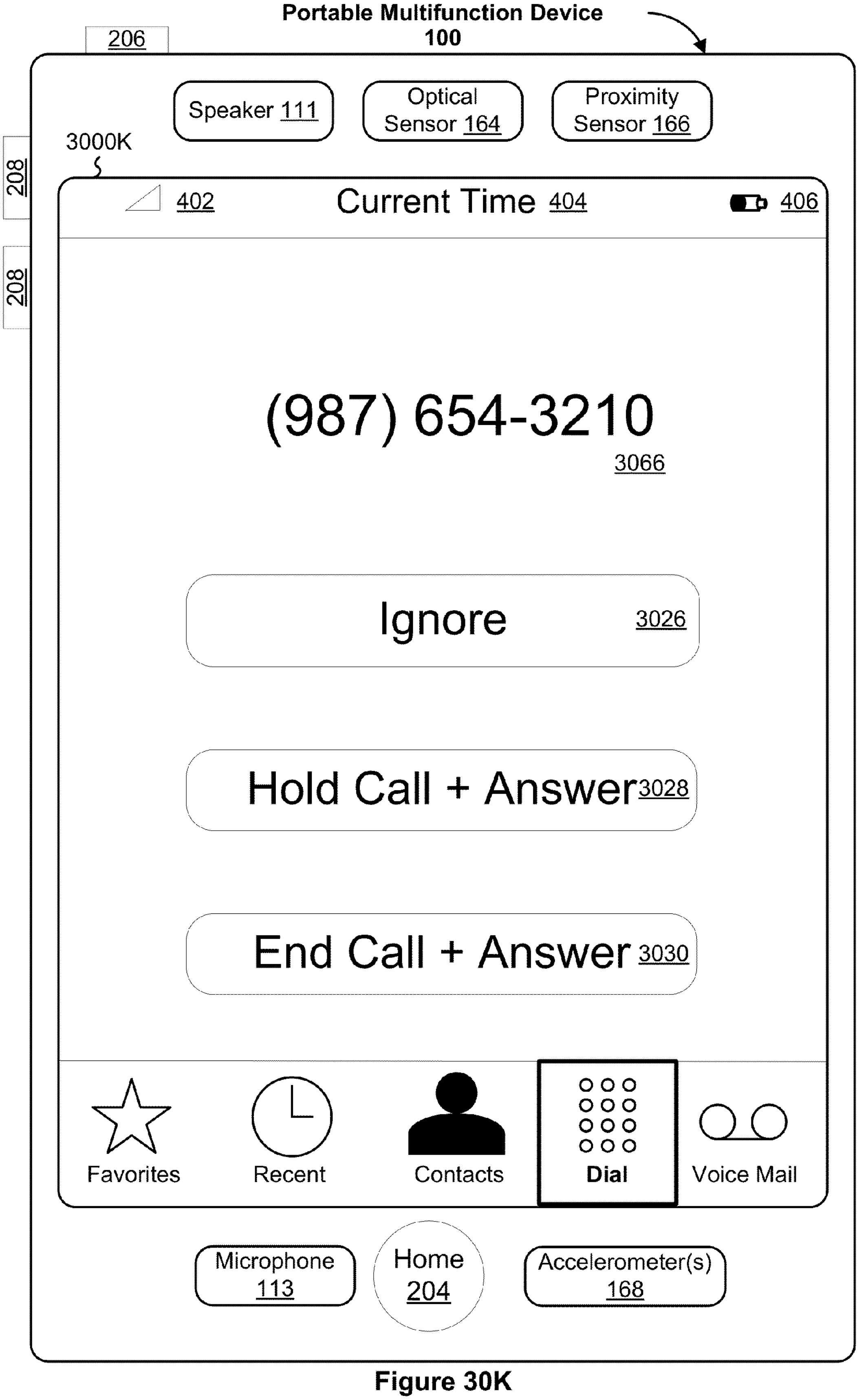
Figure 30L:
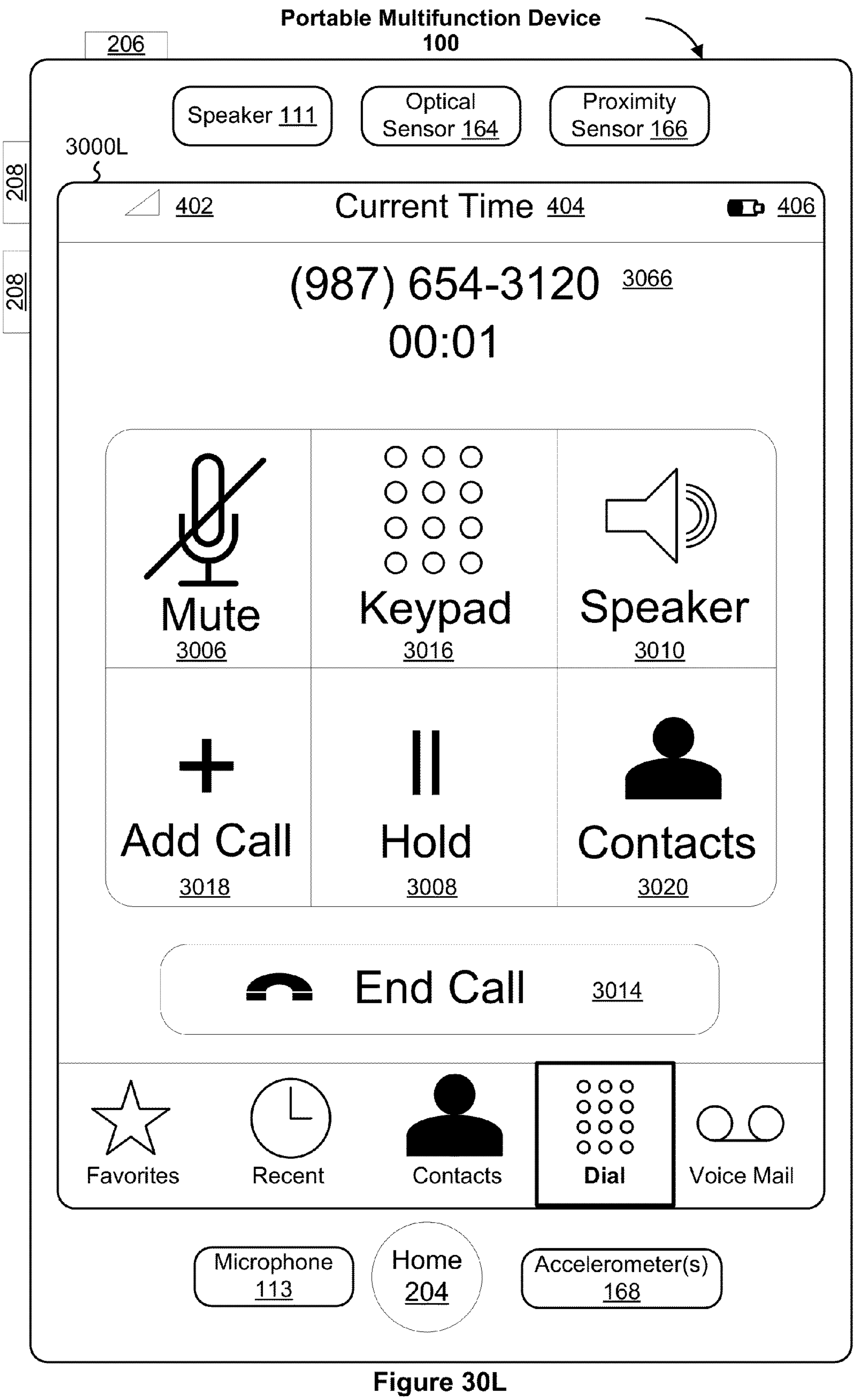
Figure 30M:
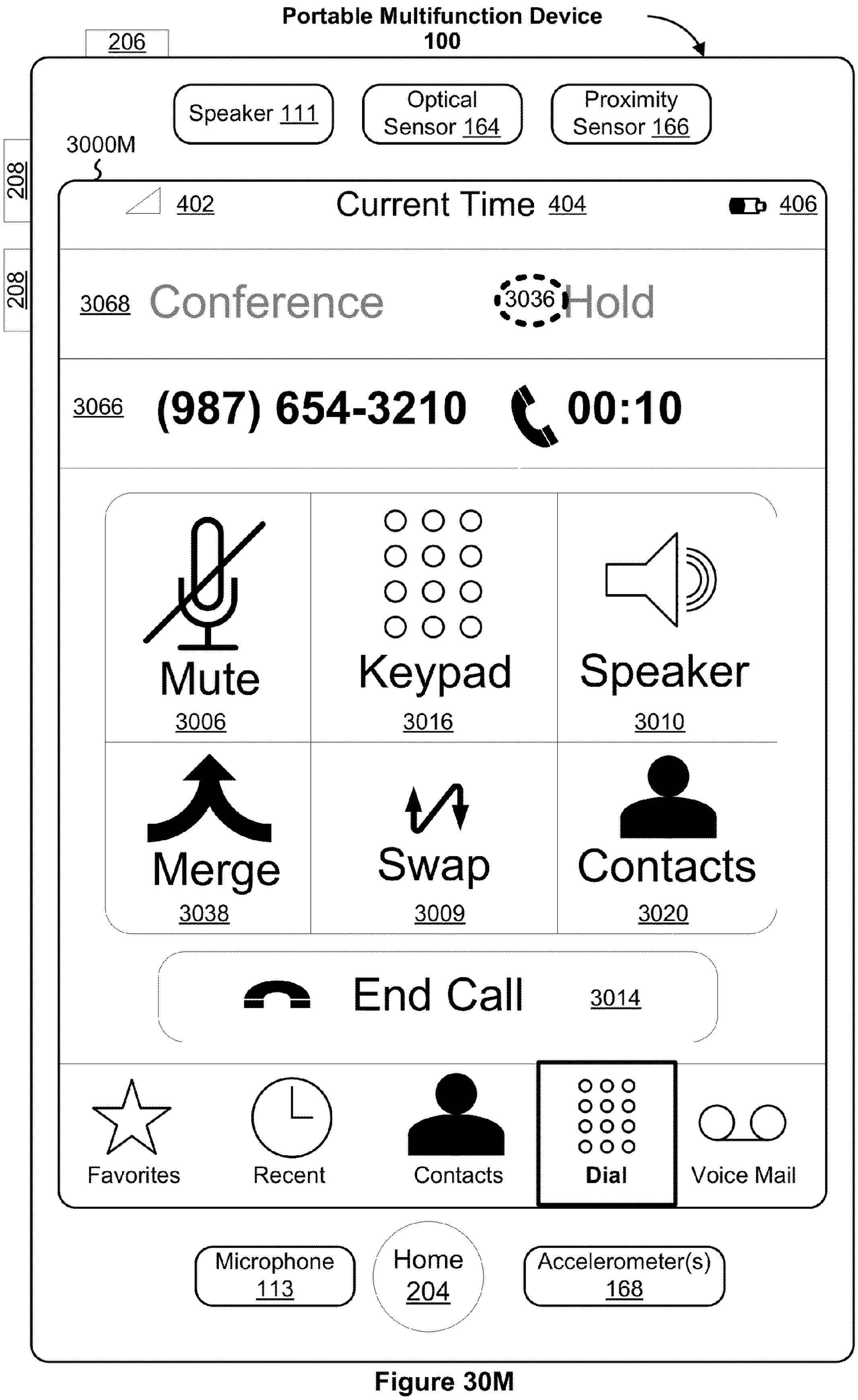
Figure 30N:
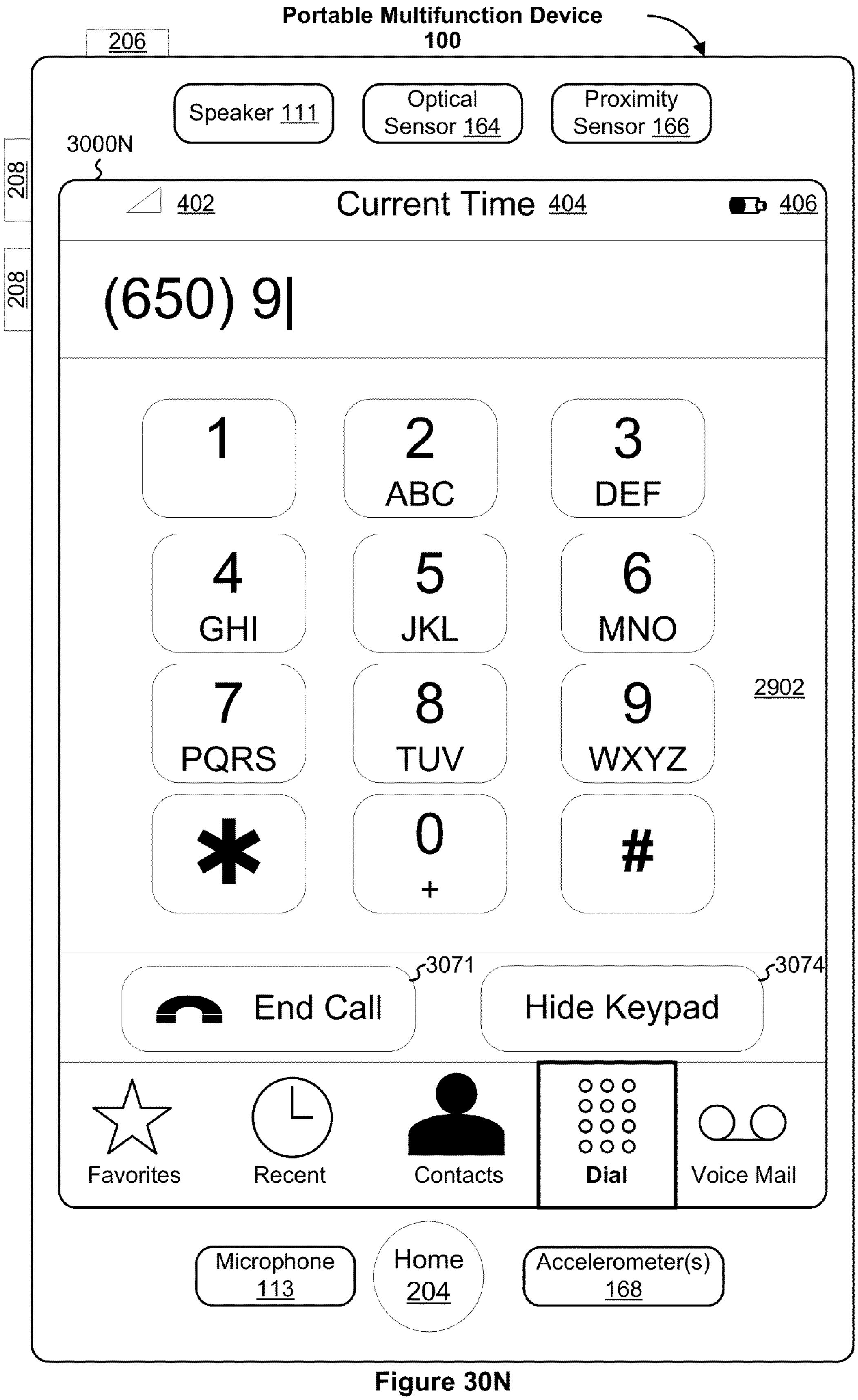
Figure 30O:
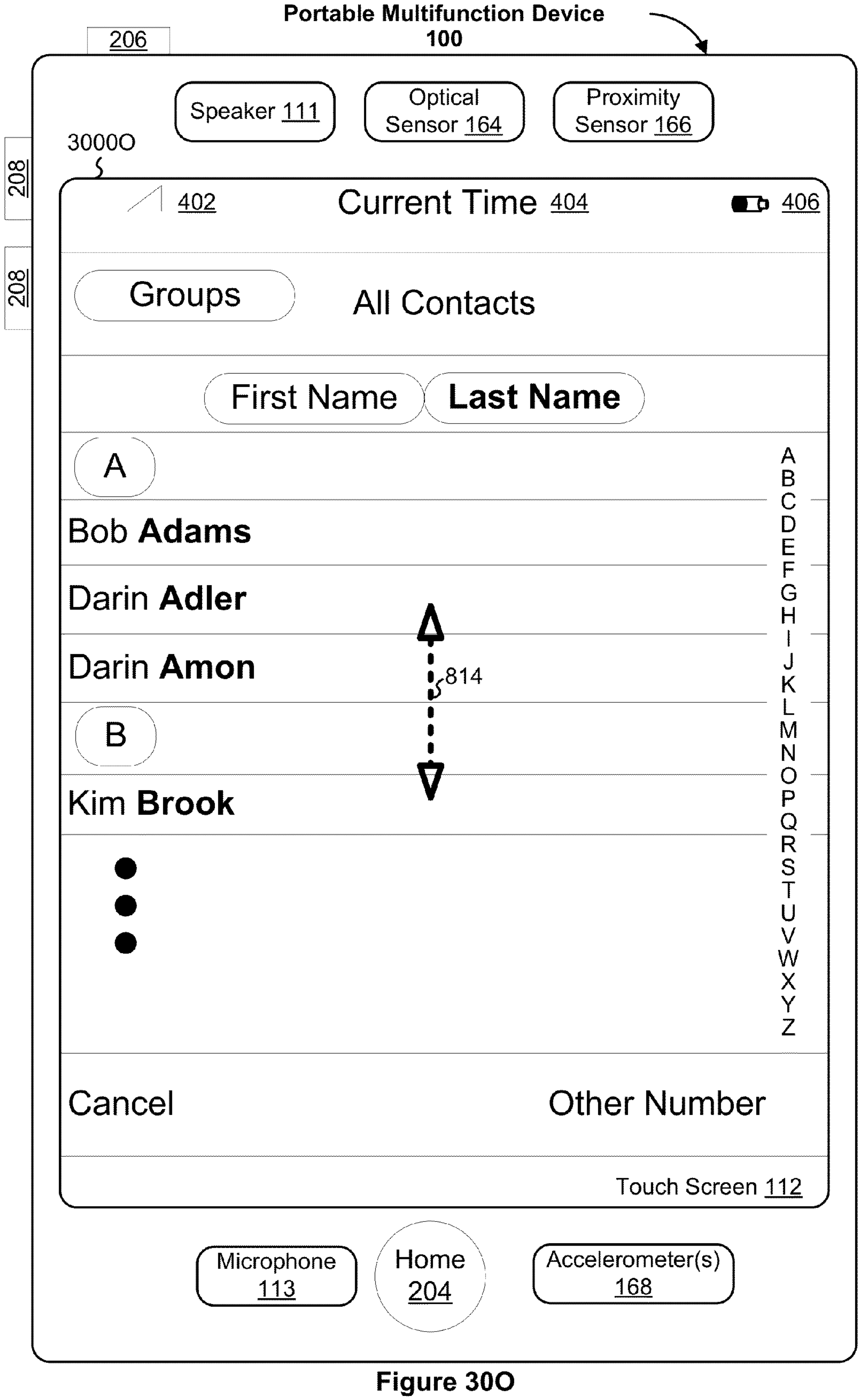
Figure 30P:
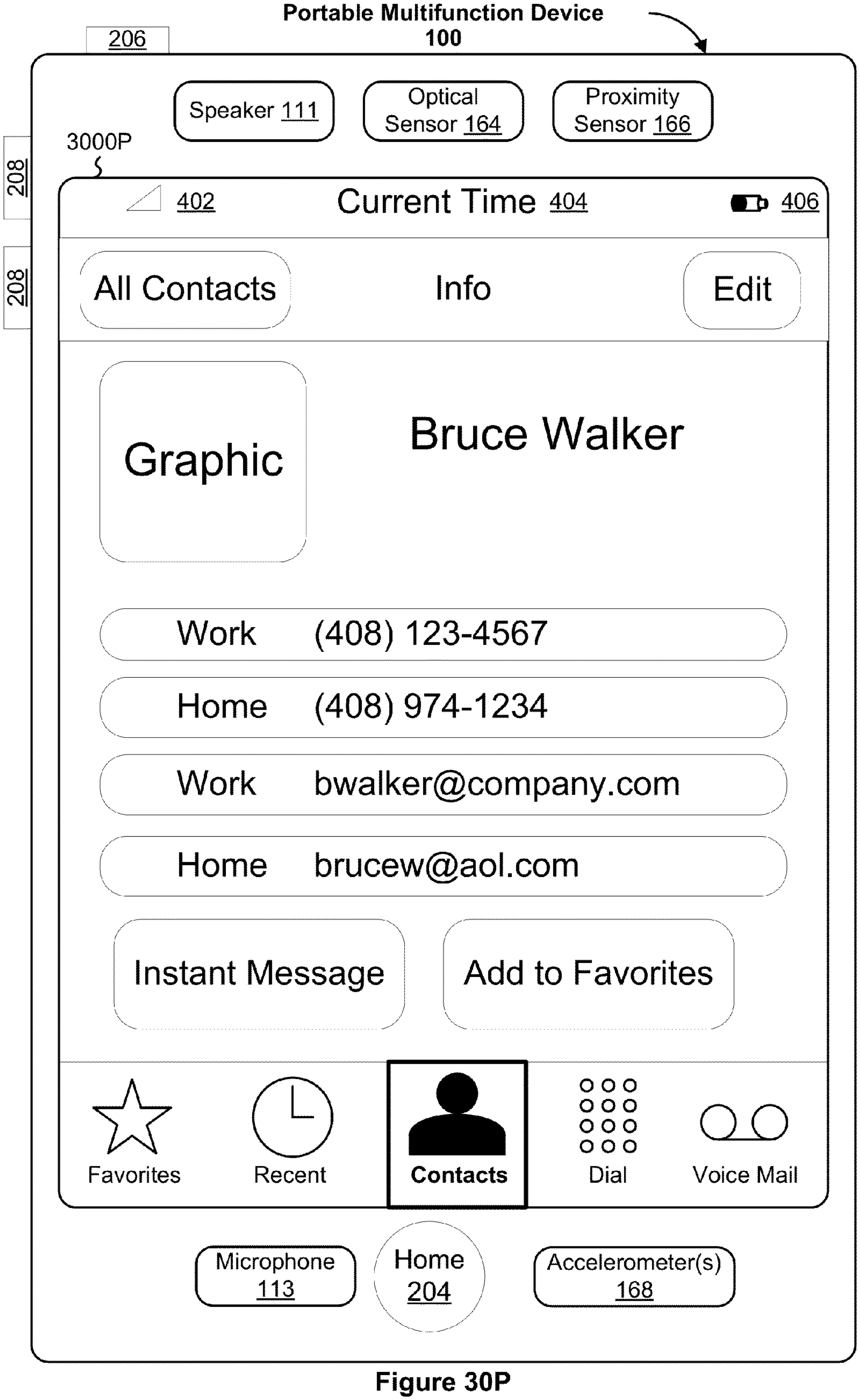
Figure 30Q:
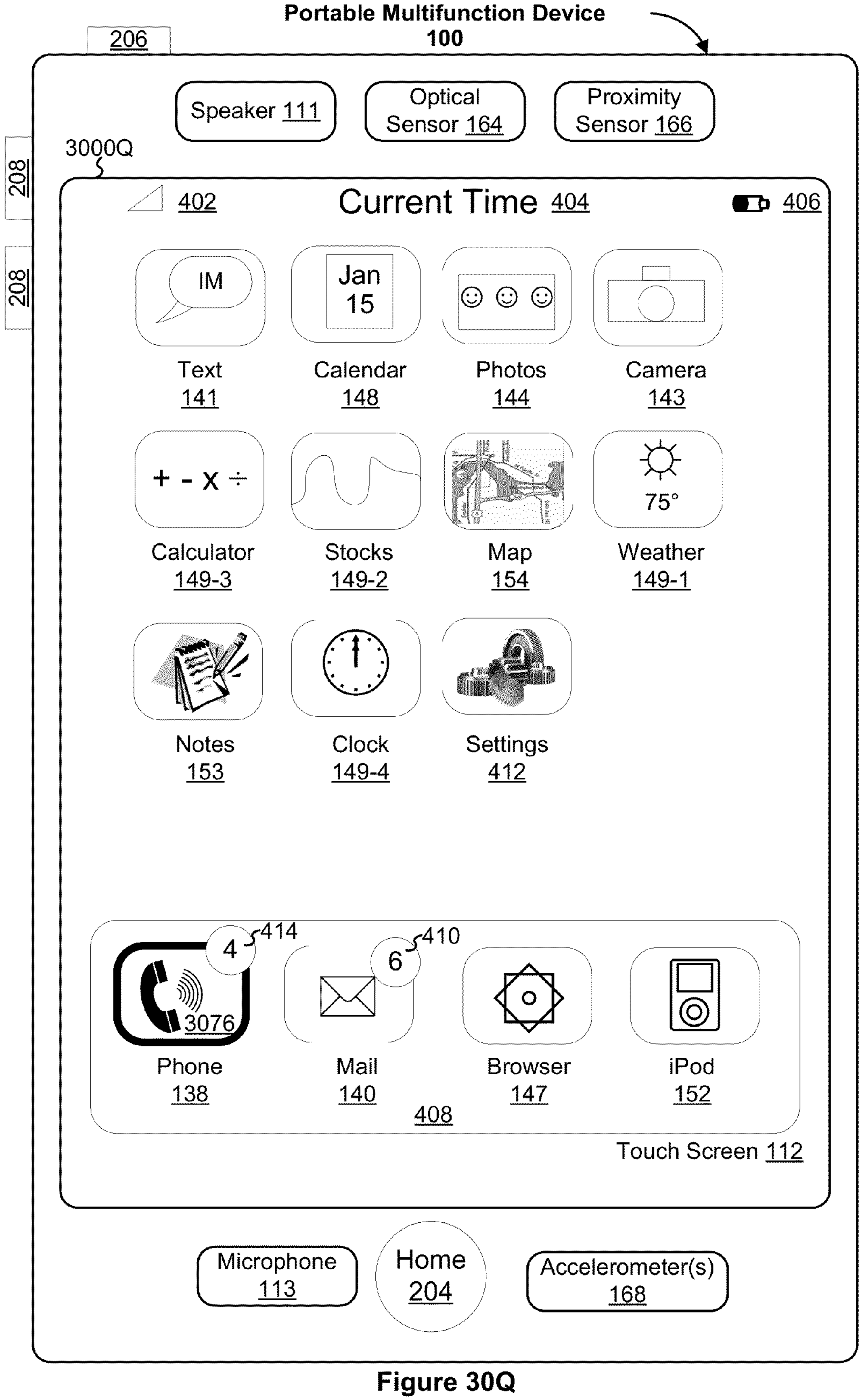
Figure 30R:
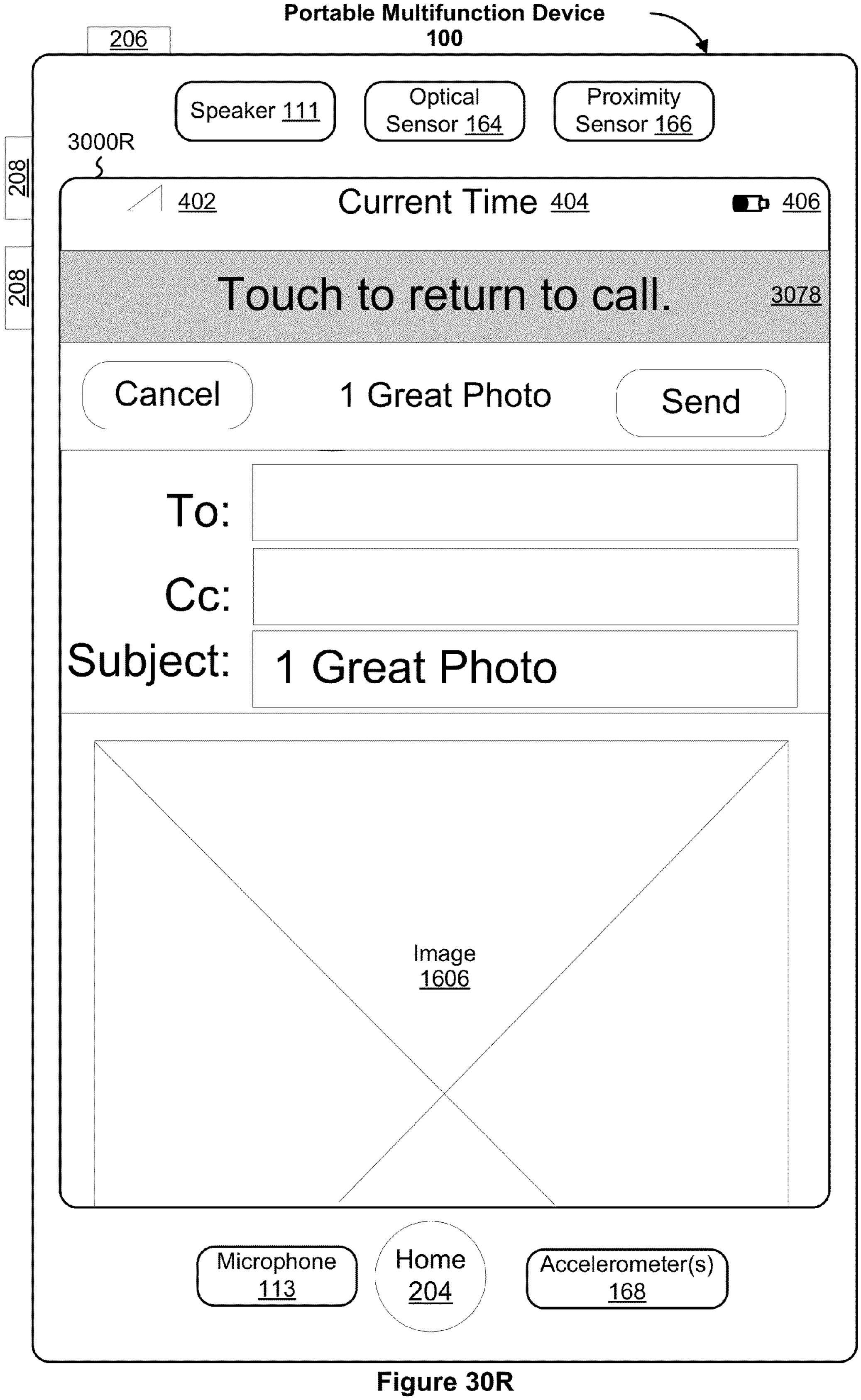

FIGS. 30A-30R illustrate exemplary user interfaces displayed during a call in accordance with some embodiments. In some embodiments, a UI indicates that a call is being attempted 3002 (UI 3000A, FIG. 30A) and then indicates the connection time 3004 after the connection is made (UI 3000B, FIG. 30B).

In some embodiments, in response to a tap or other predefined user gesture, the device may: mute the call (e.g., if the gesture is applied to icon 3006); place the call on hold (e.g., if the gesture is applied to icon 3008); swap between two calls, placing one call on hold to continue another call (e.g., if the gesture is applied to icon 3009); place the call on a speaker (e.g., if the gesture is applied to icon 3010); add a call (e.g., if the gesture is applied to icon 3018); display a numeric keypad for number entry (e.g., if the gesture is applied to icon 3016, UI 3000N in FIG. 30N is displayed); display the user's contact list (e.g., if the gesture is applied to icon 3020); or end the call (e.g., if the gesture is applied to icon 3014).

In some embodiments, if the device receives an incoming call while the user is on another call (e.g., with someone at (650) 132-2234 in FIG. 30B), then an incoming call UI is displayed, such as UI 3000C (FIG. 30C) for a known caller (e.g., Arlene Brown 3024, an entry in the user's contact list) or UI 3000K (FIG. 30K) for an unknown caller. In some embodiments, the incoming call UI includes icons which, when activated by a user tap or other gesture, cause the device to: (1) terminate the incoming call or send the caller to voice mail (e.g., ignore icon 3026); (2) place the current call on hold and answer the incoming call (e.g., hold+answer icon 3028); and/or (3) end the current call and answer the incoming call (e.g., end+answer icon 3030).

In this example, in response to activation of the end+answer icon 3030 (e.g., by a finger tap on the icon), the call with (650) 132-2234 is ended, the call from Arlene Bascom is answered, and phone call UI 3000D (FIG. 30D) is displayed, which includes information 3031 identifying the caller (Arlene Bascom).

In this example, in response to activation of the hold+answer icon 3028 (e.g., by a finger tap on the icon), the call with (650) 132-2234 is put on hold, the call from Arlene Bascom is answered, and phone call UI 3000E (FIG. 30E) is displayed, which includes information 3034 identifying the caller (Arlene Bascom) and information 3032 indicating that the other call is suspended. In some embodiments, in response to a user gesture on the information 3032 indicating that the other call is on hold (e.g., a finger tap 3036) or in response to a user gesture on the swap icon 3009, the active call is suspended, the suspended call is made active, and phone call UI 3000F is displayed, which includes information 3033 and 3035 indicating the status of the two calls.

In some embodiments, if the merge icon 3038 (FIG. 30E or 30F) is activated (e.g., by a finger tap 3040 on the icon), the active call and the call on hold are merged into a conference call and a conference call UI is displayed (e.g., UI 3000G, FIG. 30G). The conference call UI includes information 3042 about the conference call and a conference call management icon 3044.

In some embodiments, in response to activation of the conference call management icon 3044 (e.g., by a finger tap 3046 on the icon), a conference call management UI is displayed (e.g., UI 3000H, FIG. 30H), which includes an end call icon 3050 and a private call icon 3056 for each entry in the management UI. In some embodiments, in response to activation of the end call icon 3050 (e.g., by a finger tap 3052 on the icon), a confirmation icon is displayed (e.g., end call icon 3062, FIG. 30I) to prevent accidental deletion of a party to the conference call.

In some embodiments, in response to activation of the private call icon 3056 (e.g., by a finger tap 3058 on the icon), the conference call is suspended and a phone call UI is displayed (e.g., UI 3000J, FIG. 30J), which includes information 3033 about the private call and information 3035 about the suspended conference call. In this example, because only one other party in the conference call is on hold (Arlene Bascom in this example), the information 3035 about the suspended conference call is just information about the one party on hold. In some embodiments, if more than one party in the conference call is put on hold, then the information 3035 about the suspended conference call may be less specific, such as "conference on hold" or the like (e.g., information 3068 in UI 3000M, FIG. 30M).

If an incoming call is not from a caller known to the user (e.g. the phone number is not in the user's contact list), then an incoming call UI such as UI 3000K (FIG. 30K) is displayed, rather than an incoming call UI such as UI 3000C (FIG. 30C) with the caller's name 3024 and/or associated image 3022.

In some embodiments, in response to activation of the add call icon 3018 (e.g., by a finger tap on the icon in FIG. 30B, 30D, or 30G), the user's contact list is displayed (UI 3000O, FIG. 30O), which typically includes a plurality of entries that correspond to a plurality of third parties. In some embodiments, in response to activation of an entry of a third party in the contact list (e.g., by a finger tap on the entry), an outgoing phone call is initiated to the third party if there is only one phone number associated with the entry. If there is more than one phone number associated with the entry, these numbers are displayed (e.g., UI 3000P, FIG. 30P displays two phone numbers associated with one entry for Bruce Walker). In response to user selection of one of these numbers (e.g., by a finger tap on the desired number for the third party), an outgoing phone call is initiated. In some embodiments, in response to activation of an entry of a third party in the contact list (e.g., by a finger tap on the entry), the information for the corresponding entry is displayed independent of the number of phone numbers associated with the entry and, in response to user selection of a phone number in the entry, an outgoing phone call is initiated to the third party.

In some embodiments, in response to activation of the keypad icon 3016 (e.g., by a finger tap on the icon), a keypad UI for entering digits during a call is displayed (e.g., UI 3000N, FIG. 30N), which includes a dial pad 2902, a hide keypad icon 3074, and a make call icon 3071. In some embodiments, in response to activation of icon 3074 (e.g., by a finger tap or other gesture on the icon), the UI that was being displayed immediately prior to the display of the keypad UI is displayed again.

Creating a Conference Call from Two Existing Calls

In some embodiments, the device 100 displays a phone call user interface (e.g., UI 3000E, FIG. 30E) on the touch screen display. The phone call user interface includes a first informational item associated with an active phone call between a user of the device and a first party (e.g., 3034), a second informational item associated with a suspended phone call between the user and a second party (e.g., 3032), and a merge call icon (e.g., 3038).

Upon detecting a user selection of the merge call icon, (1) the active phone call and the suspended phone call are merged into a conference call between the user, the first party, and the second party; and (2) the phone call user interface is replaced with a conference call user interface (e.g., UI 3000G, FIG. 30G). The conference call user interface includes: a third informational item associated with the conference call (e.g., 3042) in replacement of the first and second informational items, and a conference call management icon (e.g., 3044).

Managing a Conference Call

In some embodiments, upon detecting a user selection (e.g., gesture 3046) of the conference call management icon 3044, the conference call user interface (e.g., UI 3000G) is replaced with a conference call management user interface (e.g., UI 3000H, FIG. 30H). The conference call management user interface includes a first management entry corresponding to the first party (e.g., 3060) and a second management entry corresponding to the second party (e.g., 3054), each management entry including an end call icon (e.g., 3050) and a private call icon (e.g., 3056), and a back (or previous screen) icon (e.g., 3048). If additional parties were also participating in the conference call (e.g., by a user adding caller(s) and then merging the added caller(s)), then management entries for these additional parties would also appear in the conference call management user interface (e.g., UI 3000H, FIG. 30H).

In some embodiments, upon detecting a user selection (e.g., gesture 3052) of the end call icon in the first management entry, a confirmation icon (e.g., 3062, FIG. 3000I) is displayed on the touch screen display. Upon detecting a user selection of the confirmation icon, the first party is excluded from the conference call; and the first management entry is removed from the touch screen display.

In some embodiments, upon detecting a user selection (e.g., gesture 3058) of the private call icon in the second management entry, the conference call is suspended and the conference call management user interface is replaced with the phone call user interface (e.g., UI 3000J, FIG. 30J). The phone call user interface includes a fourth informational item associated with a suspended phone call between the user and the first party (e.g., 3035), a fifth informational item associated with an active phone call between the user and the second party (e.g., 3033), and the merge call icon (e.g., 3038).

In some embodiments, the conference call is resumed upon detecting a second user selection of the merge call icon; and the phone call user interface (e.g., UI 3000J, FIG. 30J), including the fourth and fifth informational items, is replaced with the conference call user interface (e.g., UI 3000G, FIG. 30G).

Receive an Incoming Call During a Conference Call

In some embodiments, upon detecting an incoming phone call from a third party, the conference call user interface or the conference call management user interface (i.e., whichever interface is being displayed when the incoming call is detected) is replaced with an incoming phone call user interface (e.g., UI 3000C, FIG. 30C for a known caller or UI 3000K, FIG. 30K for an unknown caller). The incoming phone call user interface includes an ignore incoming phone call icon (e.g., 3026), a suspend current phone call and answer incoming phone call icon (e.g., 3028), and an end current phone call and answer incoming phone call icon (e.g., 3030).

In some embodiments, upon detecting a user selection of the ignore incoming phone call icon (e.g., 3026), the incoming phone call from the third party is terminated or sent to voice mail; the conference call with the first and second parties is continued; and the incoming phone call user interface is replaced with the conference call user interface or the conference call management user interface (i.e., whichever interface was being displayed when the incoming call was detected).

In some embodiments, upon detecting a user selection of the end current phone call and answer incoming phone call icon (e.g., 3030), the conference call with the first and second parties is terminated; a phone call between the user and the third party is activated; and the incoming phone call user interface is replaced with a phone call user interface (e.g., UI 3000L, FIG. 30L). The phone call user interface includes a sixth informational item associated with the phone call between the user and the third party (e.g., 3066).

In some embodiments, upon detecting a user selection of the suspend current phone call and answer incoming phone call icon (e.g., 3028), the conference call with the first and second parties is suspended; a phone call between the user and the third party is activated; and the incoming phone call user interface is replaced with a phone call user interface (e.g., UI 3000M, FIG. 30M). The phone call user interface includes a sixth informational item associated with the phone call between the user and the third party (e.g., 3066), a seventh informational item associated with the suspended conference call between the user and the first and second parties (e.g., 3068), and a merge call icon (e.g., 3038).

In some embodiments, upon detecting a user selection of the suspend current phone call and answer incoming phone call icon, a phone call between the user and the third party is activated and the incoming phone call user interface is replaced with a phone call user interface (e.g., UI 3000M, FIG. 30M). The phone call user interface includes a sixth informational item associated with the phone call between the user and the third party (e.g., 3066), a seventh informational item associated with the suspended conference call between the user and the first and second parties (e.g., 3068), and a merge call icon (e.g., 3038).

Adding a Caller During a Conference Call

In some embodiments, the conference call user interface includes an add caller icon (e.g., 3018, FIG. 30G). Upon detecting a user selection of the add caller icon, the conference call with the first and second parties is suspended and a contact list is displayed (e.g., UI 3000O, FIG. 30O).

An outgoing phone call is initiated to a third party using a phone number from an entry in the contact list or a phone number input by a user (e.g., using dial pad 2902, FIG. 29).

Upon detecting an acceptance of the outgoing phone call, a phone call user interface is displayed (e.g., UI 3000M, FIG. 30M, where (987) 654-3210 now corresponds to an outbound call rather than an inbound call) that includes an eighth informational item associated with the suspended conference call (e.g., 3068), a ninth informational item associated with the outgoing phone call between the user and the third party (e.g., 3066), and a merge call icon (e.g., 3038).

Upon detecting a user selection of the merge call icon, (1) the outgoing phone call between the user and the third party and the suspended conference call are merged into a conference call between the user, the first party, the second party, and the third party; and (2) the phone call user interface is replaced with a conference call user interface (e.g., UI 3000G, FIG. 30G).

Additional description of conference calling can be found in U.S. Provisional Patent Application No. 60/947,133, "Portable Multifunction Device, Method, and Graphical User Interface for Conference Calling," filed Jun. 29, 2007, the content of which is hereby incorporated by reference.

In some embodiments, the multifunction device 100 permits a user to conduct a phone call while simultaneously using other functions of the device in an intuitive manner. In some embodiments, in response to activation of a menu icon or button (e.g., home 204, FIG. 4A) while a user is on a phone call, a menu of application icons is displayed on the touch screen. In some embodiments, an icon for the phone application (e.g., 3076, FIG. 30Q) is highlighted (or otherwise changed in appearance as compared to when the phone application is not in use) to indicate that the phone application is in use. In response to activation of an application icon in the menu other than the phone application icon (e.g., by a finger tap or other gesture on the application icon), the corresponding application is displayed along with a switch application icon (e.g., the "press here to return to call" icon 3078, FIG. 30R). The user may operate the other non-phone application in essentially the same manner as when the phone application is not simultaneously being used. However, in response to activation of the switch application icon (e.g., by a finger tap on icon 3078 in FIG. 30R), the device displays the phone application.

Additional description of application switching can be found in U.S. Provisional Patent Application No. 60/883,809, "Portable Electronic Device Supporting Application Switching," filed Jan. 7, 2007, the content of which is hereby incorporated by reference.

Figure 31A:
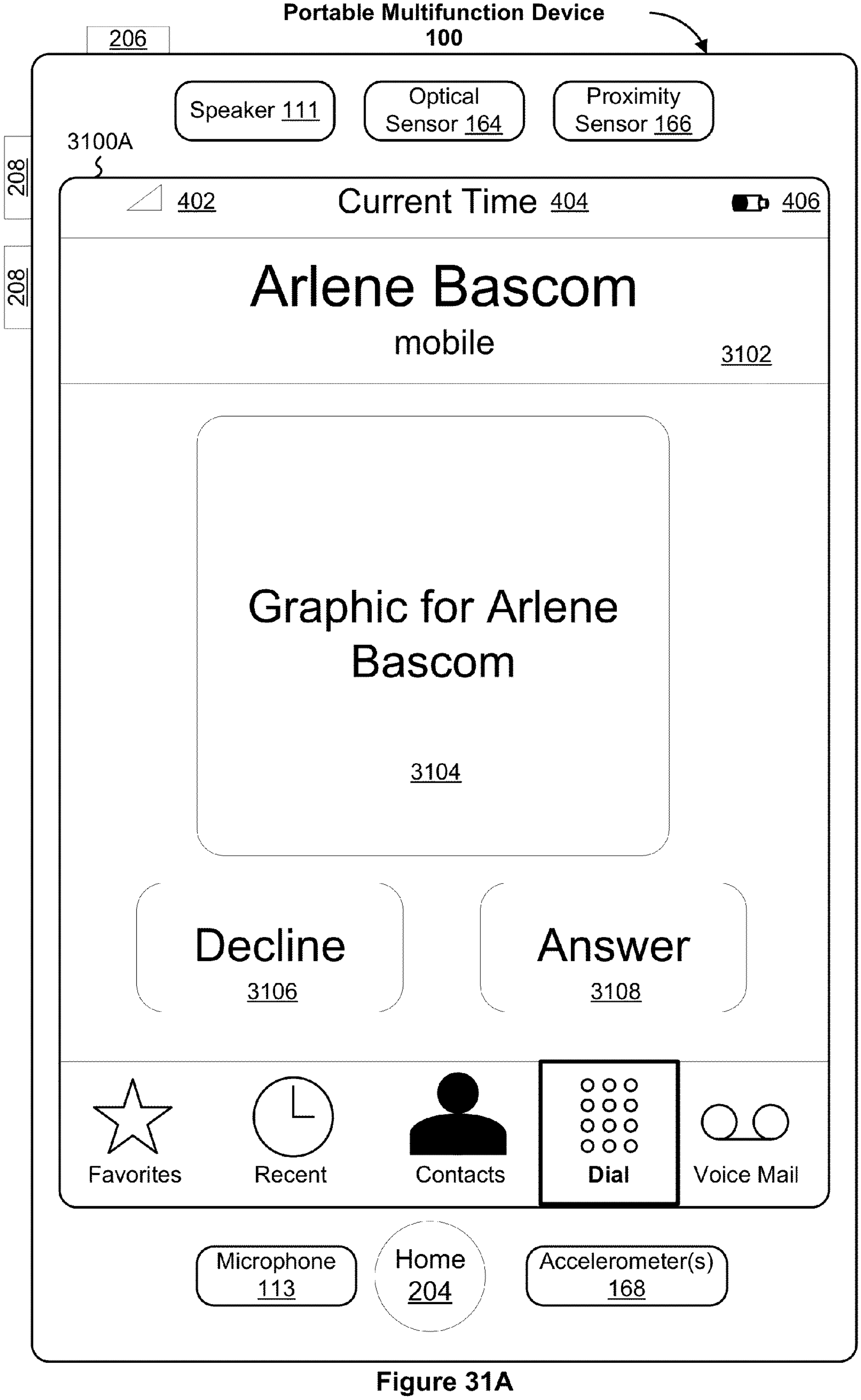
FIGS. 31A and 31B illustrate an exemplary user interface displayed during an incoming call in accordance with some embodiments.
Figure 31B:
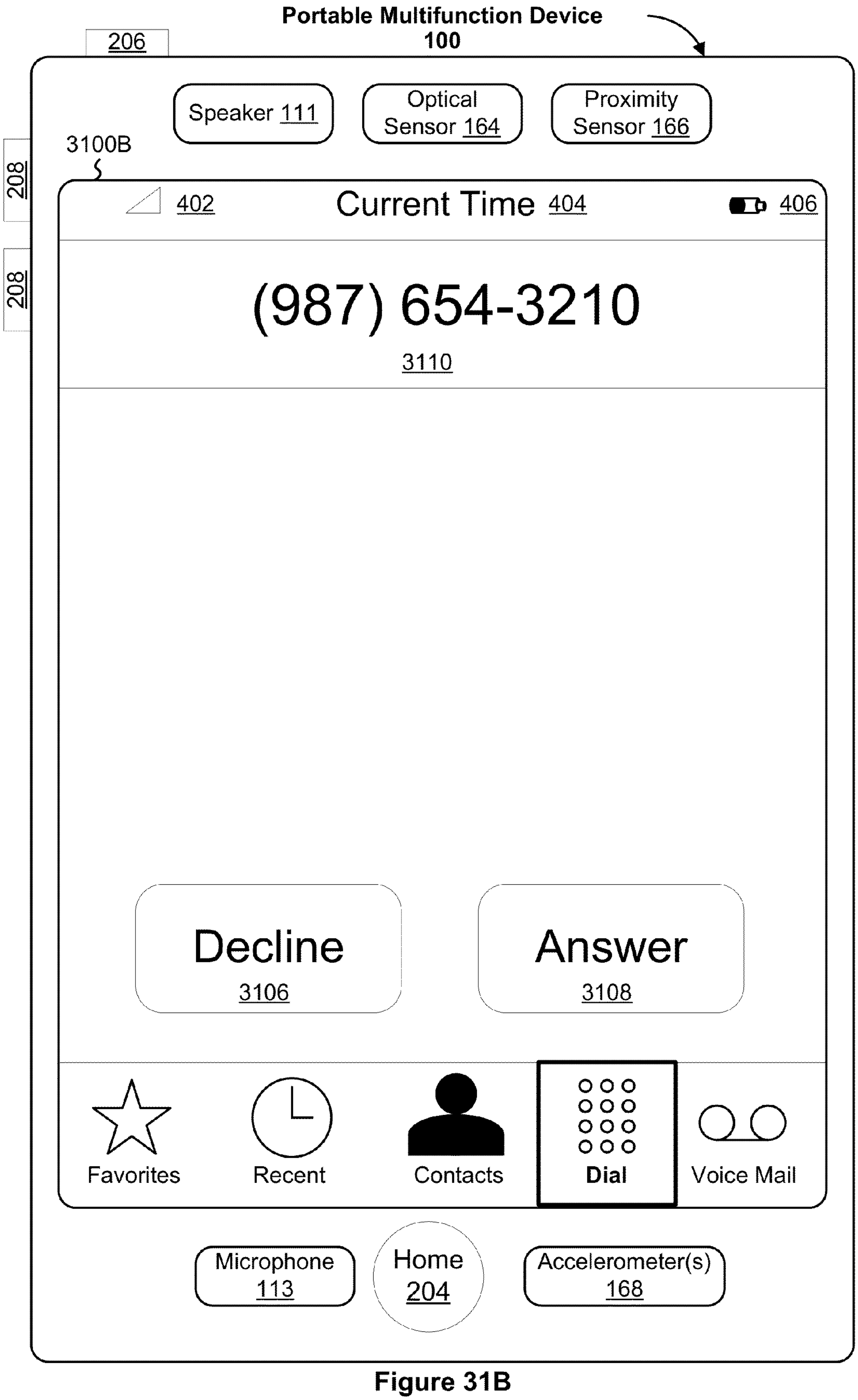

FIGS. 31A and 31B illustrate an exemplary user interface displayed during an incoming call in accordance with some embodiments.

In some embodiments, if the incoming call is from a phone number that is associated with a person or other entry in the user's contact list, then the touch screen may display: the name 3102 of the person or entry; a graphic 3104 associated with the person or entry; a Decline icon 3106 that when activated (e.g., by a finger tap on the icon) causes the phone module to decline the call and/or initiate voicemail for the call; and an answer icon 3108 that when activated (e.g., by a finger tap on the icon) causes the phone module to answer the call (e.g., UI 3100 A, FIG. 31A).

In some embodiments, if the incoming call is from a phone number that is not associated with a person or other entry in the user's contact list, then the touch screen may display: the phone number of the other party 3110; a Decline icon 3106 that when activated (e.g., by a finger tap on the icon) causes the phone module to decline the call and/or initiate voicemail for the call; and an answer icon 3108 that when activated (e.g., by a finger tap on the icon) causes the phone module to answer the call (e.g., UI 3100 B, FIG. 31B).

In some embodiments, the device pauses some other applications (e.g., the music player 146, video player, and/or slide show) when there is an incoming call; displays UI 3100A or UI 3100B prior to the call being answered; displays user interfaces like UI 3000B (FIG. 30B) during the call; and terminates the pause on the other applications if the incoming call is declined or the call ends. In some embodiments, there is a smooth transition into and out of a pause (e.g., a smooth lowering and raising of the sound volume for the music player).

Additional description of user interfaces for handling incoming calls can be found in U.S. Provisional Patent Application No. 60/883,783, "Incoming Telephone Call Management For A Portable Multifunction Device," filed Jan. 6, 2007 and U.S. patent application Ser. No. 11/769,695, "Incoming Telephone Call Management For A Portable Multifunction Device," filed Jun. 27, 2007, the contents of which are hereby incorporated by reference.

Figure 28D:
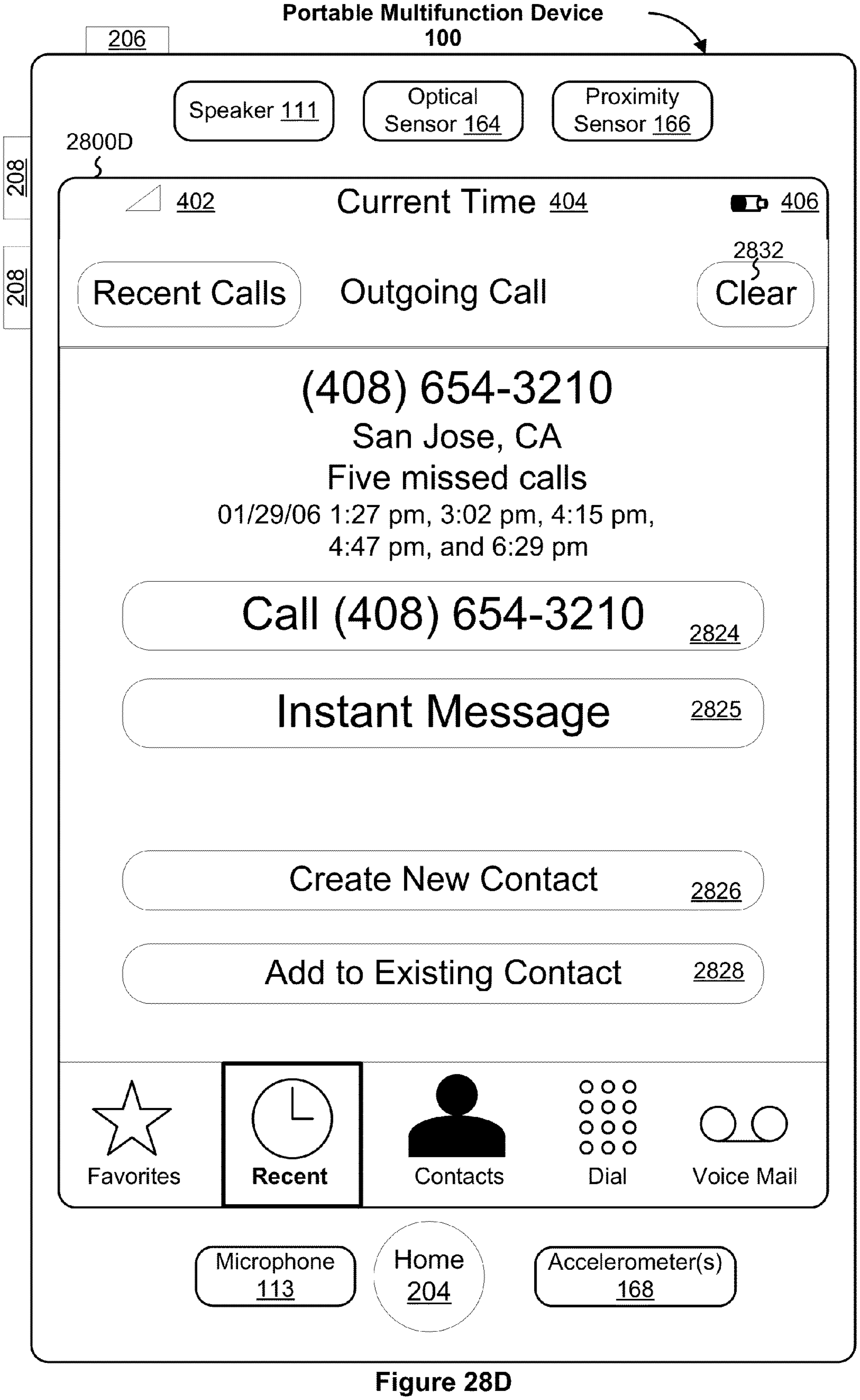
Figure 32A:
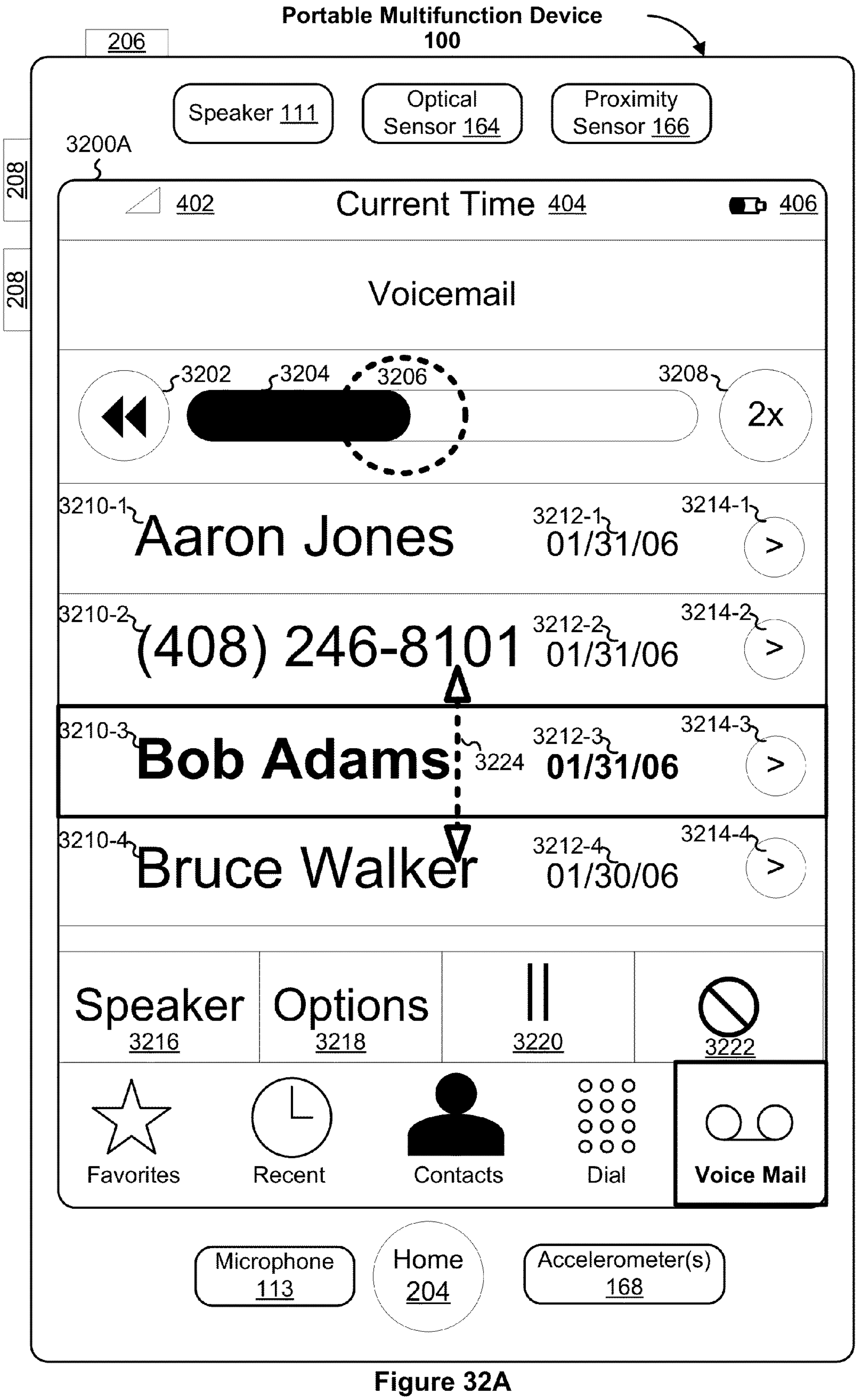
FIGS. 32A-32H illustrate exemplary user interfaces for voicemail in accordance with some embodiments.
Figure 32B:
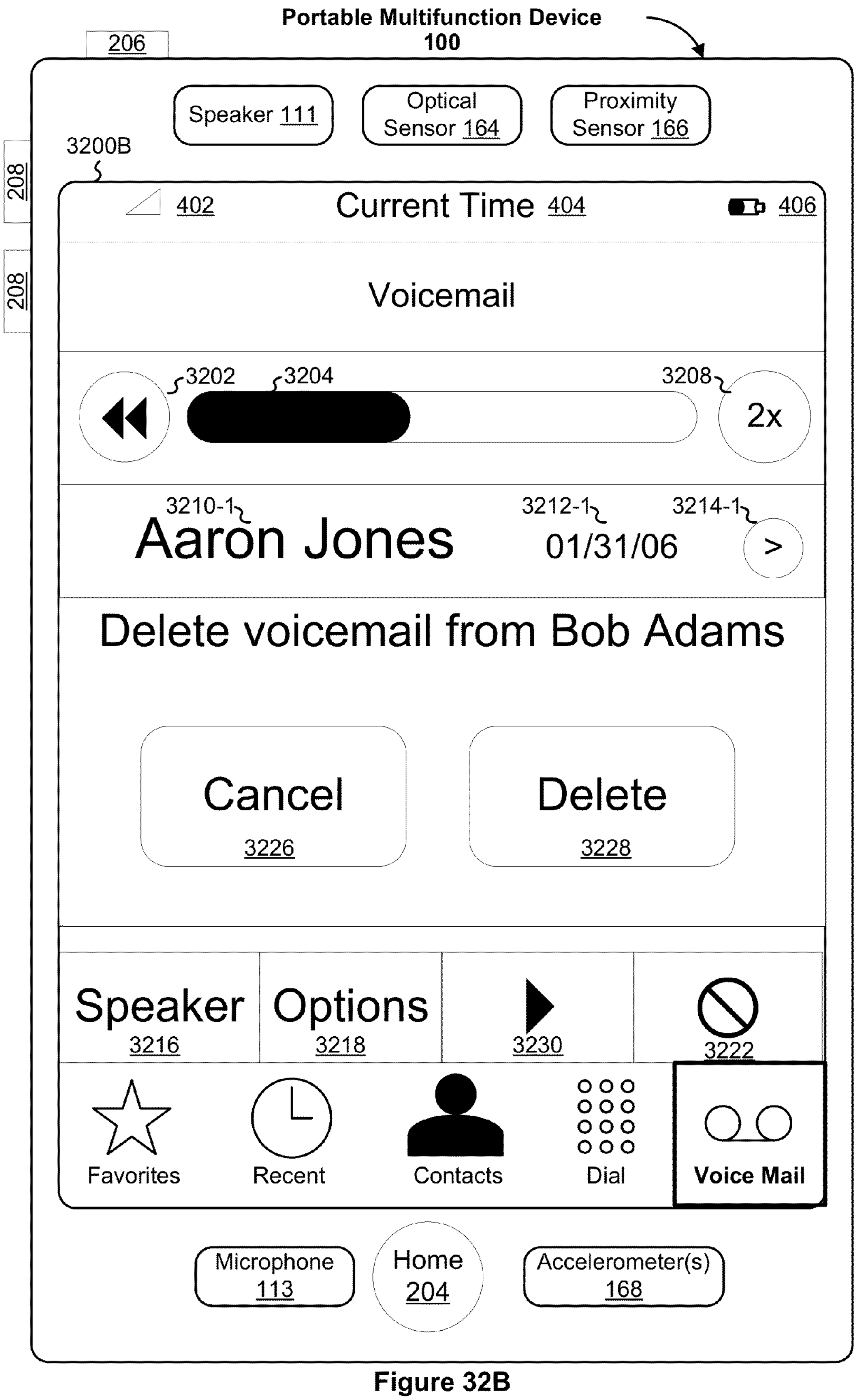
Figure 32C:
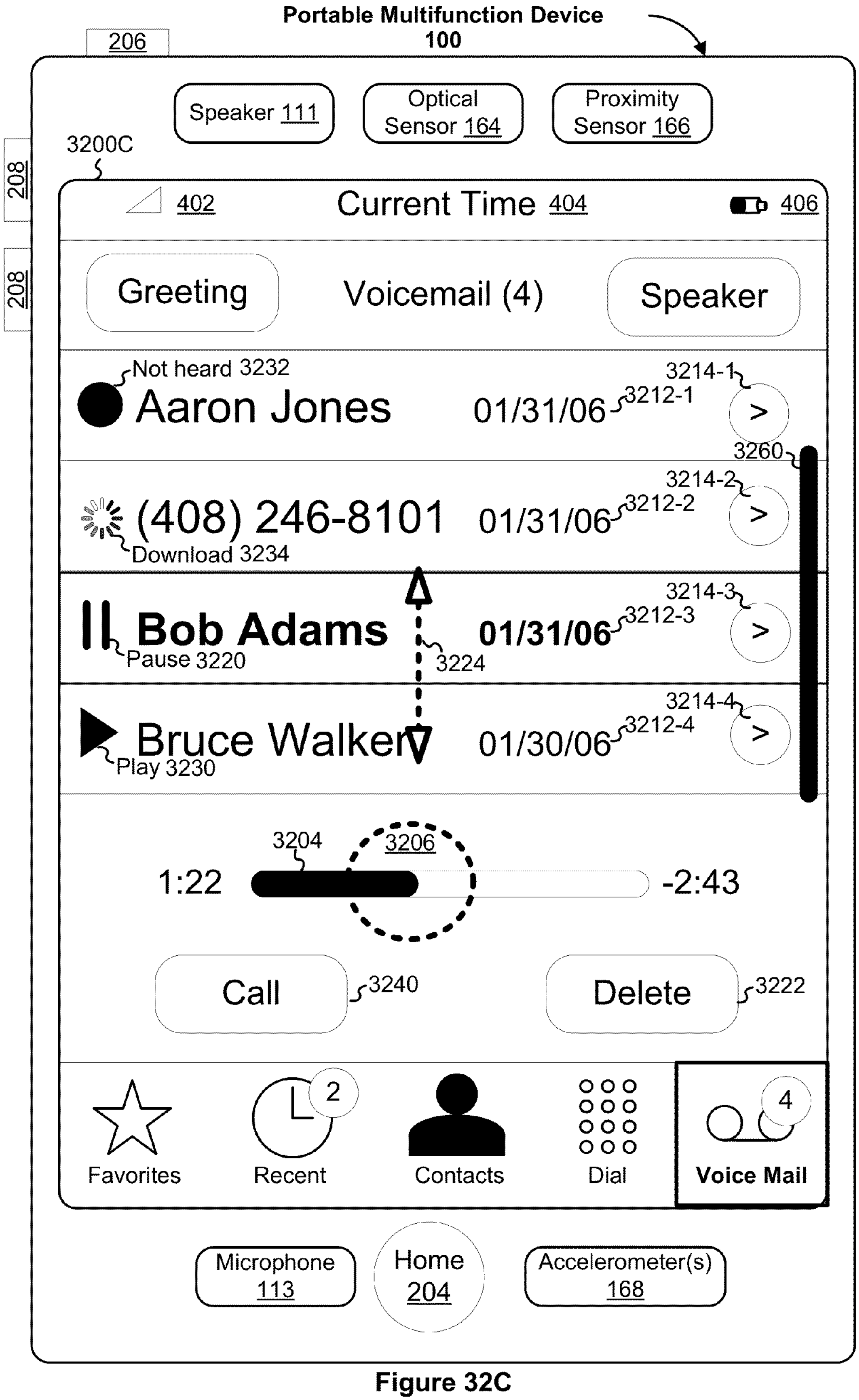
Figure 32D:
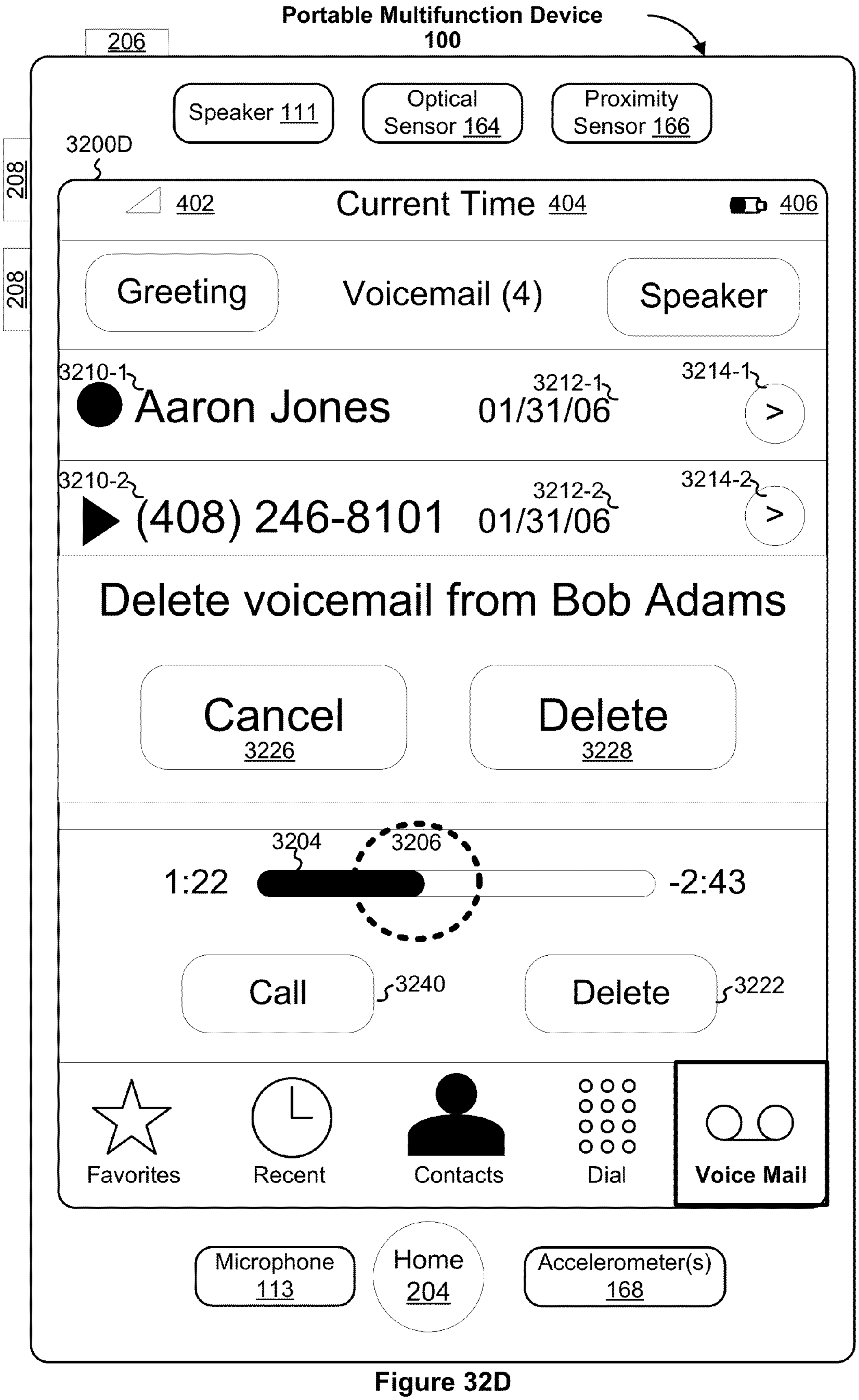
Figure 32E:
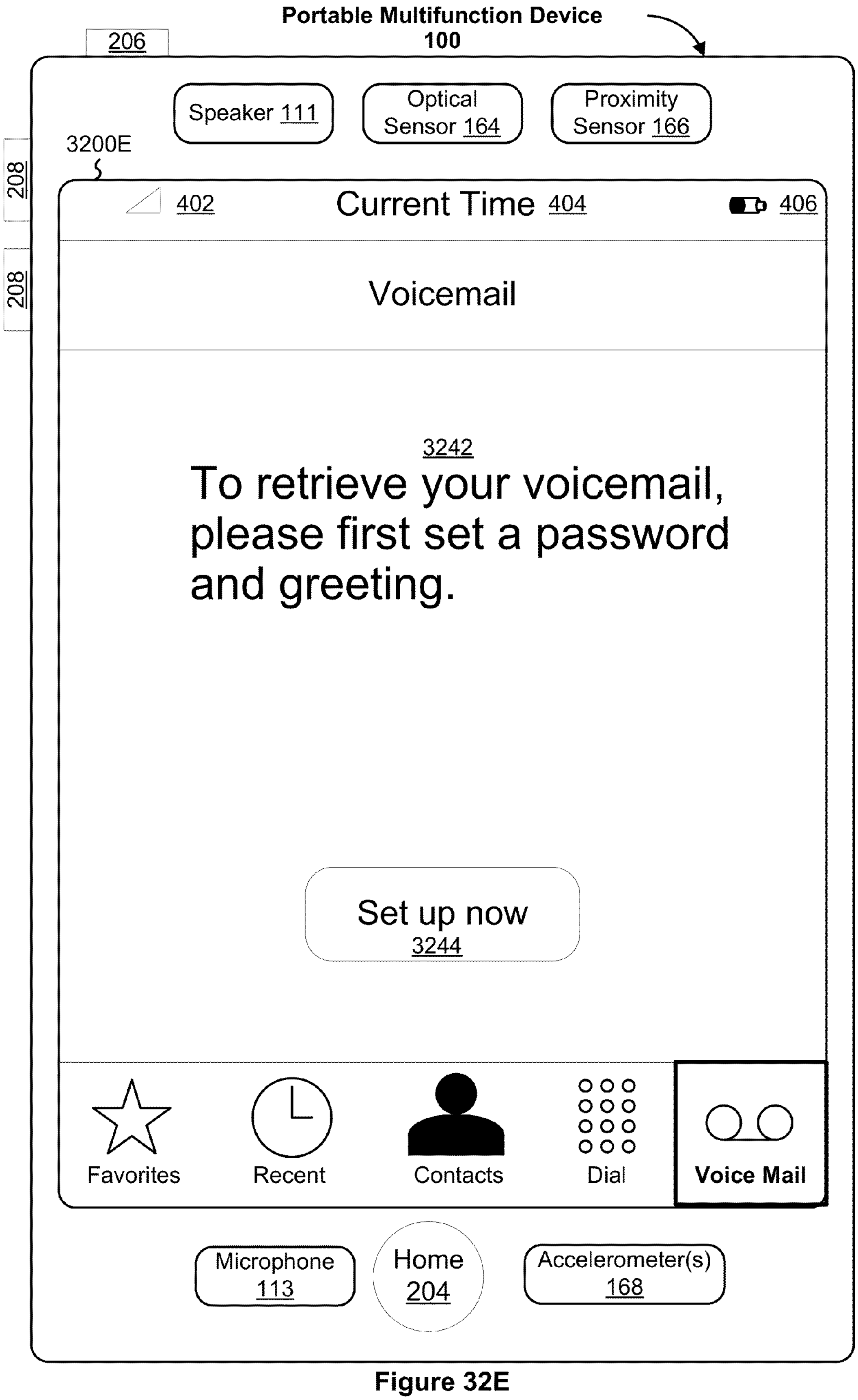
Figure 32F:
Figure 32G:
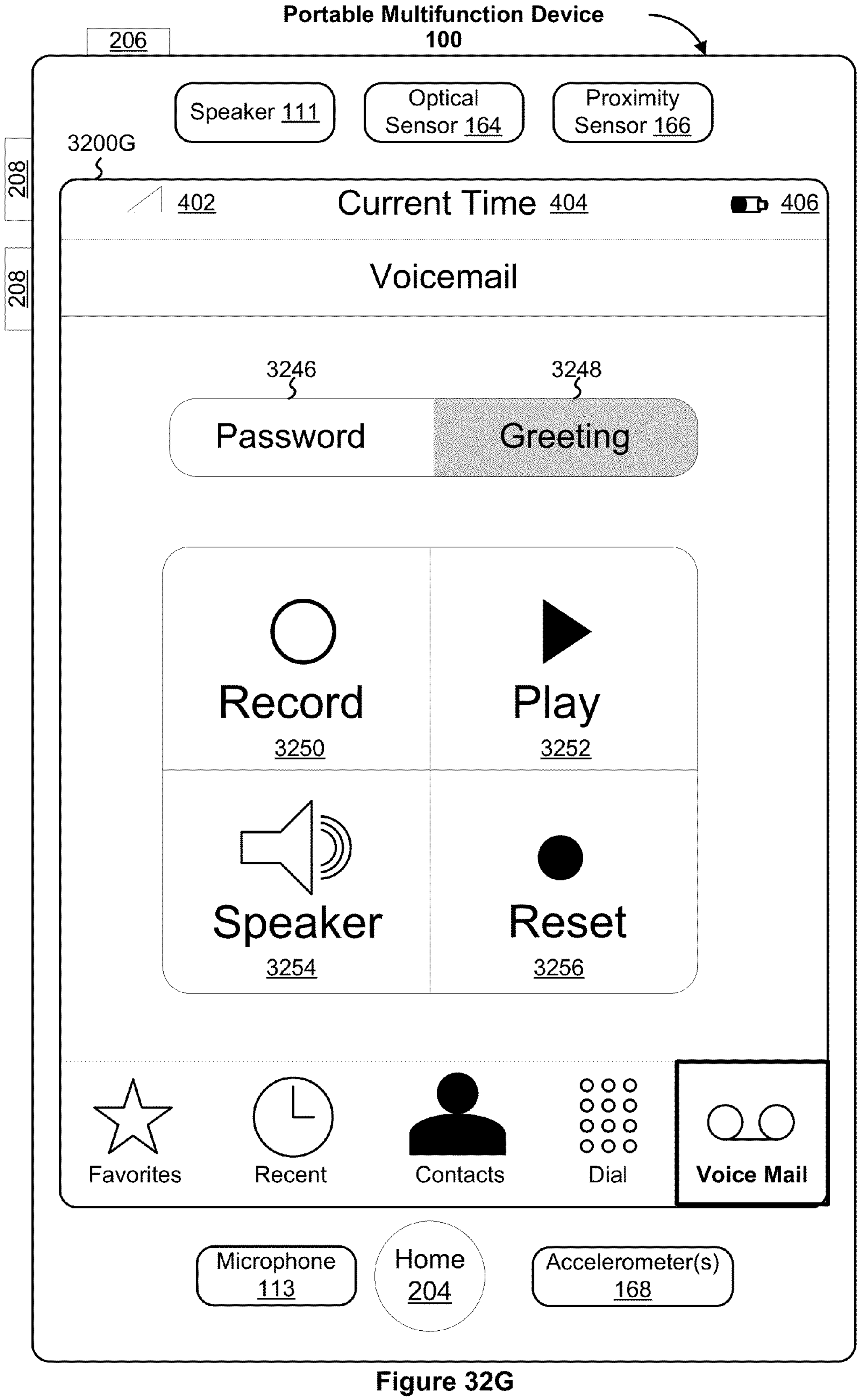

FIGS. 32A-32H illustrate exemplary user interfaces for voicemail in accordance with some embodiments. In some embodiments, user interfaces 3200A-3200D include the following elements, or a subset or superset thereof:

- 402, 404, and 406, as described above;
- backup icon 3202 that when activated (e.g., by a finger tap on the icon) initiates a process that backs up and replays the preceding few seconds of the voicemail message;
- Progress bar 3204 that indicates what fraction of a voicemail message has been played and that may be used to help scroll through the message in response to a user gesture 3206;
- Speed up icon 3208 that when activated (e.g., by a finger tap on the icon) initiates a process that speeds up playback of the voicemail message, which may also adjust the sound frequency or pitch of the fast playback so that the words, although spoken quickly, are still easy to understand;

Names 3210 of the people (associated with incoming phone numbers via the user's contact list) who have left voicemail messages (e.g., Aaron Jones 3210-1) or the phone number if the person's name is not available (e.g., 408-246-8101 3210-2);

Date 3212 and/or time of the voicemail;

Additional information icon 3214 that when activated (e.g., by a finger tap on the icon) initiates transition to the corresponding contact list entry (e.g., UI 2800C, FIG. 28C) or to a UI for unknown phone numbers (e.g., UI 2800D, FIG. 28D);

Speaker icon 3216 that when activated (e.g., by a finger tap on the icon) initiates playback of the voicemail through a speaker;

Options icon 3218 that when activated (e.g., by a finger tap on the icon) initiates display of a menu of additional voicemail options;

Pause icon 3220 that when activated (e.g., by a finger tap on the icon) initiates pausing of the voicemail, which may be displayed apart from individual messages (FIG. 32A) or adjacent to a selected message (FIG. 32C);

Delete symbol icon 3222 that when activated (e.g., by a finger tap on the icon) initiates display of a UI to confirm that the user wants to delete the corresponding voicemail (e.g. UI 3200B, FIG. 32B or UI 3200D, FIG. 32D).

Cancel icon 3226 that when activated (e.g., by a finger tap on the icon) changes the display from UI 3200B to UI 3200A (or from UI 3200D to UI 3200C) without deleting the corresponding voicemail;

Confirm delete icon 3228 that when activated (e.g., by a finger tap on the icon) deletes the corresponding voicemail and changes the display from UI 3200B to UI 3200A (or from UI 3200D to UI 3200C);

Play icon 3230 that when activated (e.g., by a finger tap on the icon) initiates or continues playback of the voicemail, which may be displayed apart from individual messages (FIG. 32B) or adjacent to a selected message (FIG. 32C);

Not heard icon 3232 that indicates that the corresponding voicemail has not been heard;

Downloading icon 3234 that indicates that the corresponding voicemail is being downloaded to the device 100; and Call icon 3240 that when activated (e.g., by a finger tap on the icon) initiates a call to the phone number associated with the selected voicemail.

If the list of voicemail messages fills more than the screen area, the user may scroll through the list using vertically upward and/or vertically downward gestures 3224 on the touch screen.

In some embodiments, a vertical bar 3260 (FIG. 32C), analogous to the vertical bars described above, is displayed on top of the list of voicemails that helps a user understand what portion of the list is being displayed.

In some embodiments, in response to a user tap or other predefined gesture in the row corresponding to a particular voicemail (but other than a tap or gesture on icon 3214), the phone module initiates playback of the corresponding voicemail. Thus, there is random access to the voicemails and the voicemails may be heard in any order.

In some embodiments, in response to a user gesture, the playback position in the voicemail can be modified. For example, in response to the user's finger touching 3206 at or near the end of the progress bar and then sliding along the progress bar, the playback position may be altered to correspond to the position of the user's finger along the progress bar. This user gesture on the progress bar (which is analogous to the gesture 2316 in UI 2300B for the video player, which also creates an interactive progress bar) makes it easy for a user to skip to and/or replay portions of interest in the voicemail message.

In some embodiments, user interfaces 3200E-3200H for setting up voicemail include the following elements, or a subset or superset thereof:

402, 404, 406, and 2902 as described above;

instructions 3242 that assist the user in the setup process;

initiation icon 3244 that when activated (e.g., by a finger tap on the icon) initiates the set up process;

password set up icon 3246 that when activated (e.g., by a finger tap on the icon) displays a key pad 2902 for entering a voicemail password in input field 3249;

greeting set up icon 3248 that when activated (e.g., by a finger tap on the icon) displays icons (e.g., 3250, 3252, 3254, and 3256) for creating a voice mail greeting;

record icon 3250 that when activated (e.g., by a finger tap on the icon) initiates recording of the voicemail greeting;

play icon 3252 that when activated (e.g., by a finger tap on the icon) initiates playback of the voicemail greeting;

speaker icon 3254 that when activated (e.g., by a finger tap on the icon) initiates playback of the voicemail greeting through a speaker;

reset icon 3256 that when activated (e.g., by a finger tap on the icon) initiates resetting of the voicemail greeting (e.g., to a default system greeting, rather than a user-created greeting); and stop icon 3258 that when activated (e.g., by a finger tap on the icon) initiates stopping the playback of the voicemail greeting.

User interfaces 3200E-3200H provide visual cues that make it easy for a user to setup voicemail.

In some embodiments, a portable multifunction device (e.g., device 100) displays a voicemail setup user interface on a touch screen display (e.g., display 112). The user interface includes a password setup icon (e.g., icon 3246, FIG. 32F) and a greeting setup icon (e.g., icon 3248, FIG. 32F).

A user selection of the password setup icon is detected. Upon detecting user selection of the password setup icon 3246, an input field (e.g., 3249) and a key pad (e.g., 2902) are displayed. In some embodiments, one or more copies of a predefined character are added in the input field in response to a finger contact with the key pad.

A user selection of the greeting setup icon is detected. Upon detecting user selection of the greeting setup icon, a record icon (e.g., icon 3250, FIG. 32G), a play icon (e.g., icon 3252), and a reset icon (e.g., icon 3256) are displayed.

Figure 32H:
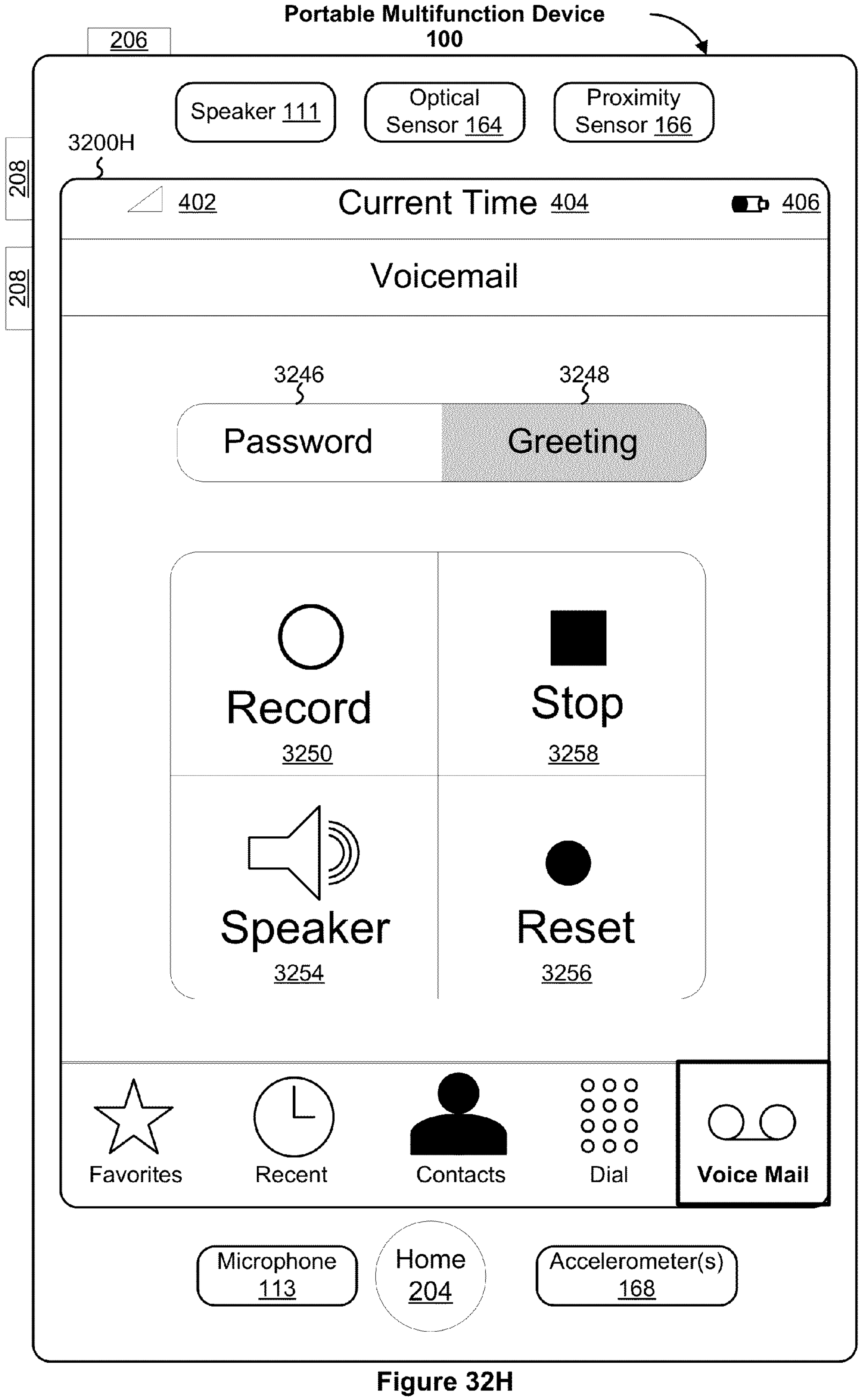

In some embodiments, in response to detection of a selection of the record icon, recording of an audio stream is started and the play icon is replaced with a stop icon (e.g., icon 3258, FIG. 32H). In response to detection of a selection of the stop icon, recording of the audio stream is stopped and the stop icon is replaced with the play icon. In some embodiments, in response to detection of a selection of the play icon, the recorded audio stream is played and the play icon is replaced with the stop icon. In response to detection of a selection of the stop icon, playing of the recorded audio stream is stopped and the stop icon is replaced with the play icon.

In some embodiments, in response to detection of a selection of the reset icon, a default message is assigned. In response to detection of a selection of the play icon, the default message is played and the play icon is replaced with the stop icon. In response to detection of a selection of the stop icon, playing of the default message is stopped and the stop icon is replaced with the play icon. In some embodiments, the default message includes a telephone number associated with the portable multifunction device. In some embodiments, the default message comprises a synthesized audio stream.

Additional description of the voicemail system can be found in U.S. Provisional Patent Application No. 60/883,799, "Voicemail Manager For Portable Multifunction Device," filed Jan. 7, 2007; U.S. patent application Ser. No. 11/770,720, "Voicemail Manager for Portable Multifunction Device," filed Jun. 28, 2007; and 60/947,348, "Voicemail Set-Up on a Portable Multifunction Device," filed Jun. 29, 2007, the contents of which are hereby incorporated by reference.

Email

FIG. 33 illustrates an exemplary user interface for organizing and managing email in accordance with some embodiments. In some embodiments, user interface 3300 includes the following elements, or a subset or superset thereof:

402, 404, and 406, as described above;
- a set of mailboxes, such as inbox 3302, which may be organized in rows with a selection icon 3306 for each row;
- an unread messages icon 3304 that indicates the number of unread messages;
- a settings icon 3308 that when activated (e.g., by a finger tap on the icon) initiates display of a UI to input mailbox settings (e.g. UI 3600, FIG. 36); and
- a create email icon 3310 that when activated (e.g., by a finger tap on the icon) initiates display of a UI for creating a new email message (e.g. UI 3400, FIG. 34).

If the set of mailboxes fills more than the screen area, the user may scroll through the mailboxes using vertically upward and/or vertically downward gestures 3312 on the touch screen.

In some embodiments, a vertical bar, analogous to the vertical bars described above, is displayed on top of the list of mailboxes that helps a user understand what portion of the list is being displayed.

Figure 34A:
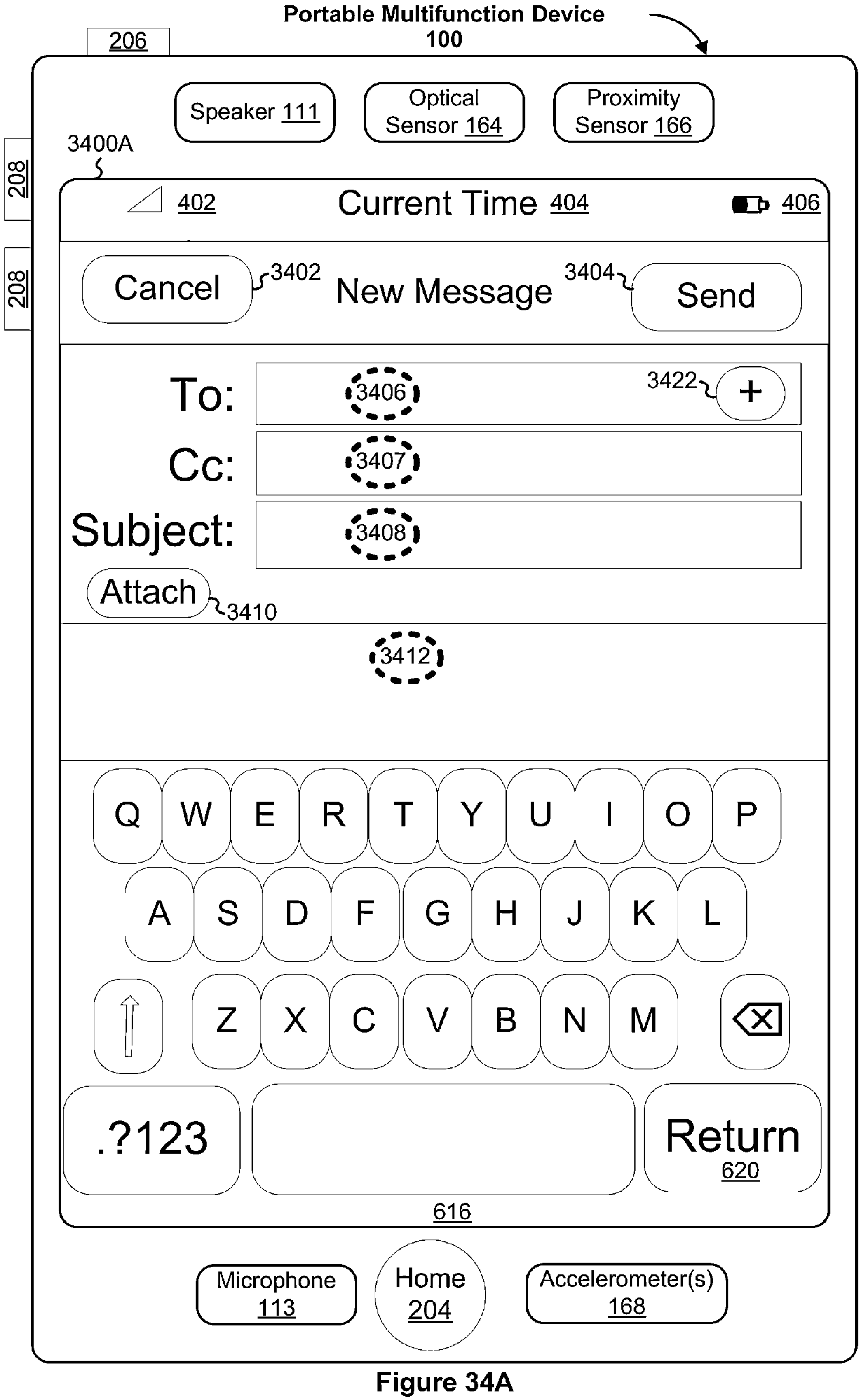
FIGS. 34A-34C illustrate an exemplary user interface for creating emails in accordance with some embodiments.
Figure 34B:
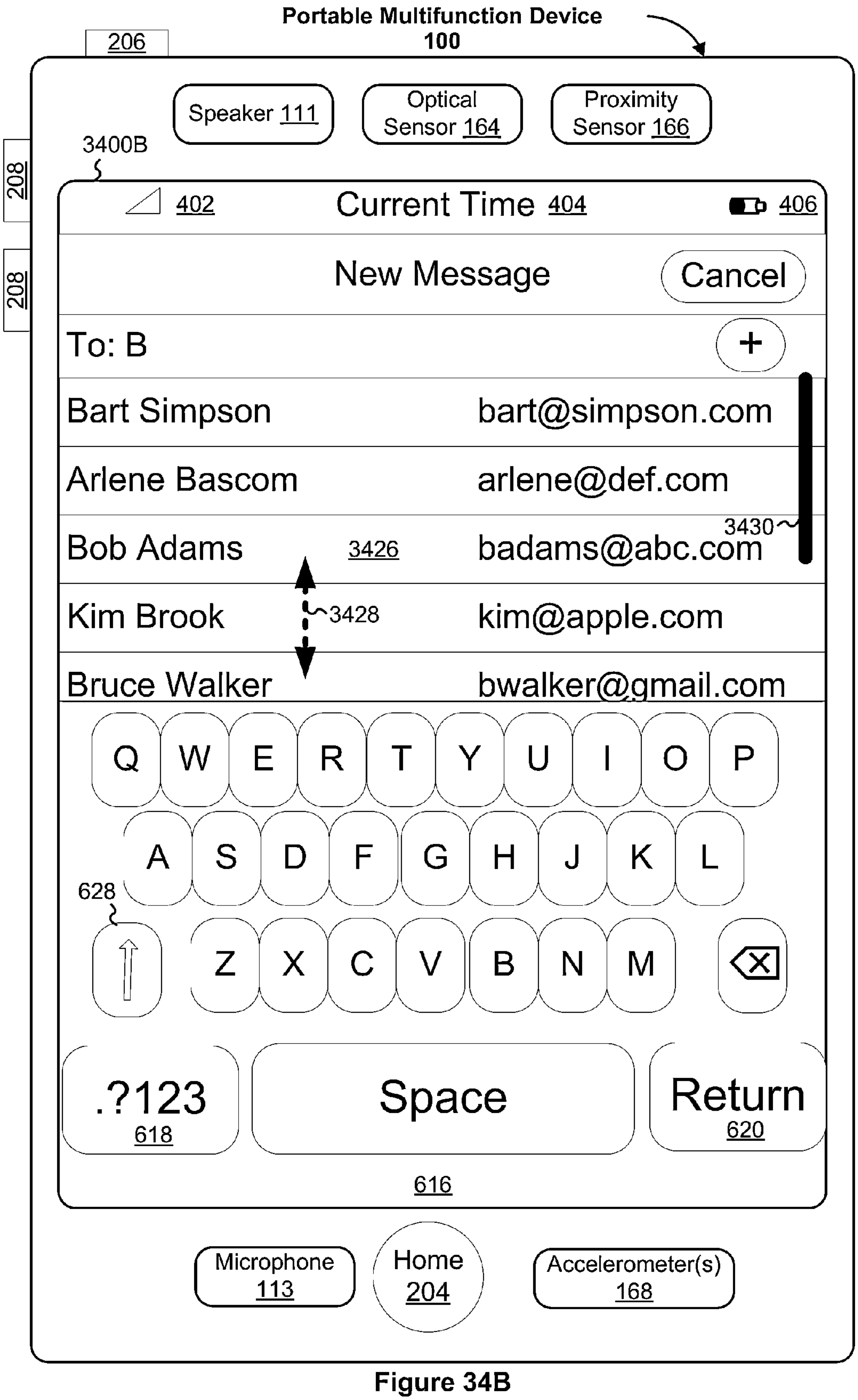
Figure 34C:
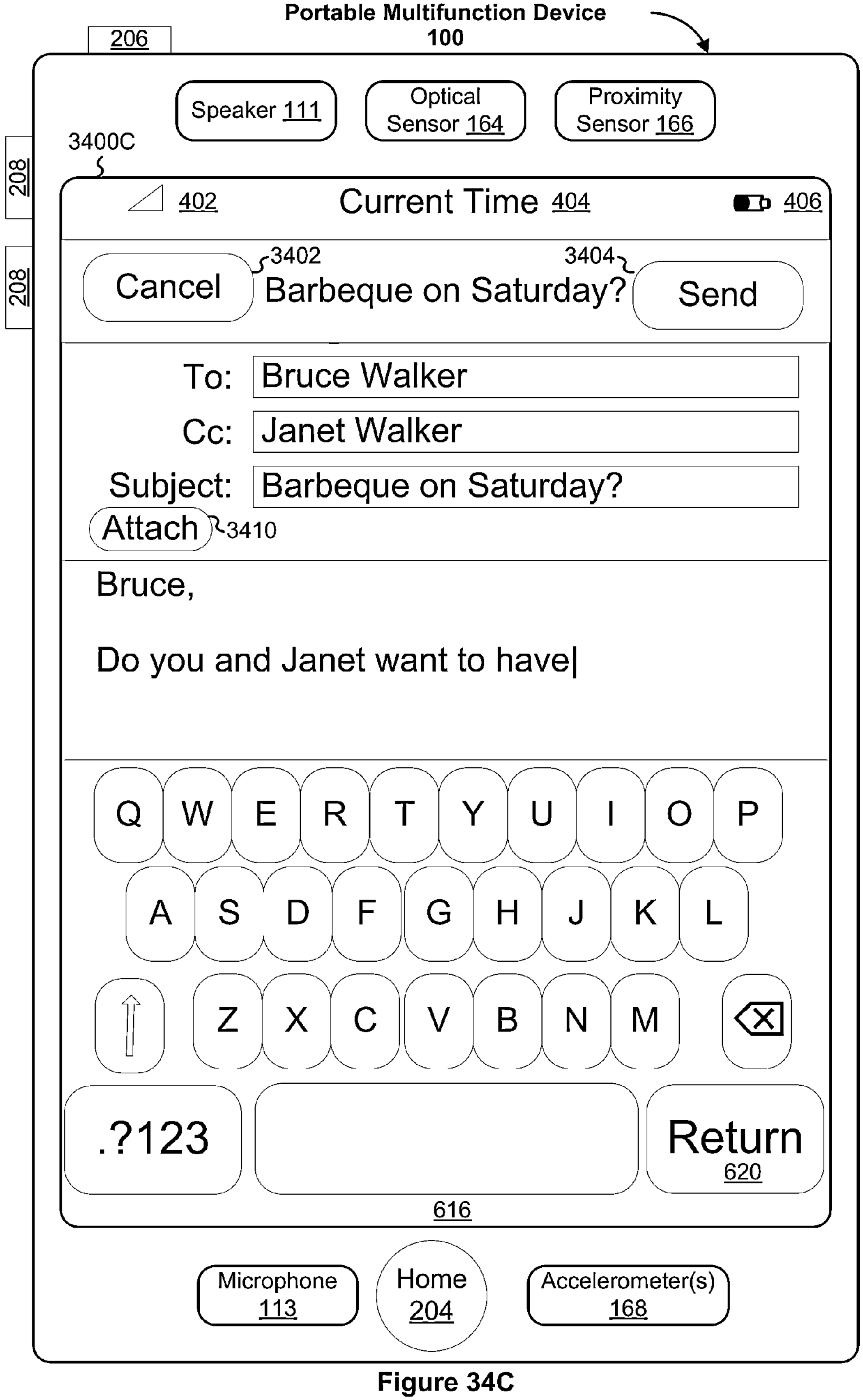

FIGS. 34A-34C illustrate an exemplary user interface for creating emails in accordance with some embodiments.

In response to the user activating create email icon 3310 (FIG. 33), the device displays UI 3400A.

In some embodiments, if the user makes a tap or other predefined gesture on the subject line 3408 or in the body of the email 3412 (FIG. 34A), a letter keyboard 616 appears and the user may input the subject and/or body text (FIG. 34C). In some embodiments, to enter the email address, the user makes a tap or other predefined gesture on the To: line 3406 of the email; the user's contact list appears (e.g., FIG. 18J); the user makes a tap or other predefined gesture on the desired recipient/contact; and the device places the corresponding email address in the email message (FIG. 34C). If others need to be copied on the email, the user makes a tap or other predefined gesture on the CC: line 3407 of the email; the user's contact list appears (FIG. 18J); the user makes a tap or other predefined gesture on the desired recipient/contact (e.g., tapping on Janet Walker in the contact list); and the device places the corresponding email address in the email message (FIG. 34C).

In some embodiments, to enter the email address, the user makes a tap or other predefined gesture on the To: line 3406 of the email (FIG. 34A). Add recipient icon 3422 appears, which when activated (e.g., by a finger tap on the icon 3422) initiates the display of a scrollable list of contacts (e.g., 3426, FIG. 34B) that match the input, if any, in the To: field. For example, if the letter "B" is input, then contacts with either a first name or last name beginning with "B" are shown. If the letters "Br" are input in the To: field, then the list of contacts is narrowed to contacts with either a first name or last name beginning with "Br", and so on until one of the displayed contacts is selected (e.g., by a tap on a contact in the list 3426). If others need to be copied on the email, the user makes a tap or other predefined gesture on the CC: line 3407 of the email and follows an analogous procedure to that used for inputting addresses in the To: field. In some embodiments, the scrollable list 3426 also includes names and/or email addresses that are in emails previously sent or received by the user, even if those names and/or email addresses are not in the user's contact list. In some embodiments, the order in which email addresses are displayed in the scrollable list 3426 is based on the amount of prior email messaging with each email address. In other words, for the names and/or email addresses that match the letters input by the user, the names and/or email addresses that have had more recent and/or more frequent email exchanges with the user are placed ahead of the names and/or email addresses that have had less recent and/or less frequent email exchanges with the user. In some embodiments, the order in which email addresses are displayed in the scrollable list 3426 is based on the amount of prior communications with a potential addressee for a plurality of communications modalities. For example, a potential addressee that is frequently in phone and/or instant message conversations with the user (in addition to email exchanges with the user) may be placed ahead of other potential addressees.

In some embodiments, a user can scroll through the list 3426 by applying a vertical swipe gesture 3428 to the area displaying the list 3426. In some embodiments, a vertically downward gesture scrolls the list downward and a vertically upward gesture scrolls the list upward, In some embodiments, a vertical bar 3430 is displayed temporarily after an object is detected on or near the touch screen display (e.g., a finger touch is detected anywhere on the list 3426). In some embodiments, the vertical bar 3430 has a vertical position on top of the displayed portion of the list that corresponds to the vertical position in the list of the displayed portion of the list. In some embodiments, the vertical bar 3430 has a vertical length that corresponds to the portion of the list being displayed.

In some embodiments, the user may also enter the email address using one or more keyboards (e.g., 616 and 624, not shown).

The device sends the email message in response to the user activating the send icon 3404 (FIG. 34C) (e.g., by a finger tap on the icon). Alternatively, if the user activates the cancel icon 3402, the device may display a save draft icon (e.g., 1810, FIG. 18I) and a don't save (or delete message) icon (e.g., 1812, FIG. 18I). The device saves the draft if the user activates the save draft icon 1810, e.g., in a drafts folder in email client 140 (FIG. 33). The device deletes the draft if the user activates the don't save icon 1812.

In some embodiments, in response to the user activating the attach icon 3410 (e.g., by a finger tap on the icon), the touch screen displays a UI for adding attachments (not shown).

Figure 35A:
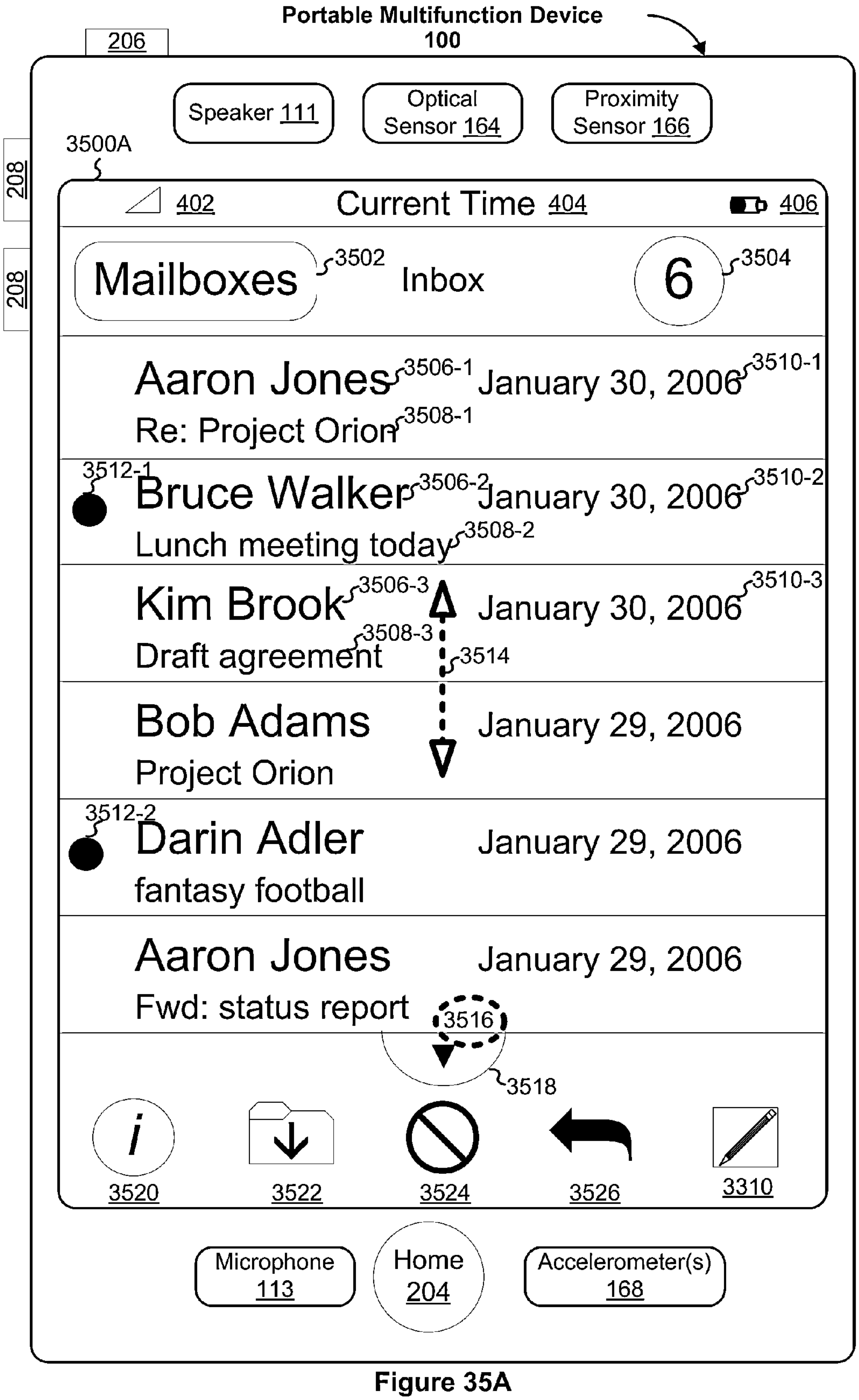
FIGS. 35A-35O illustrate exemplary user interfaces for displaying and managing an inbox in accordance with some embodiments.
Figure 35B:
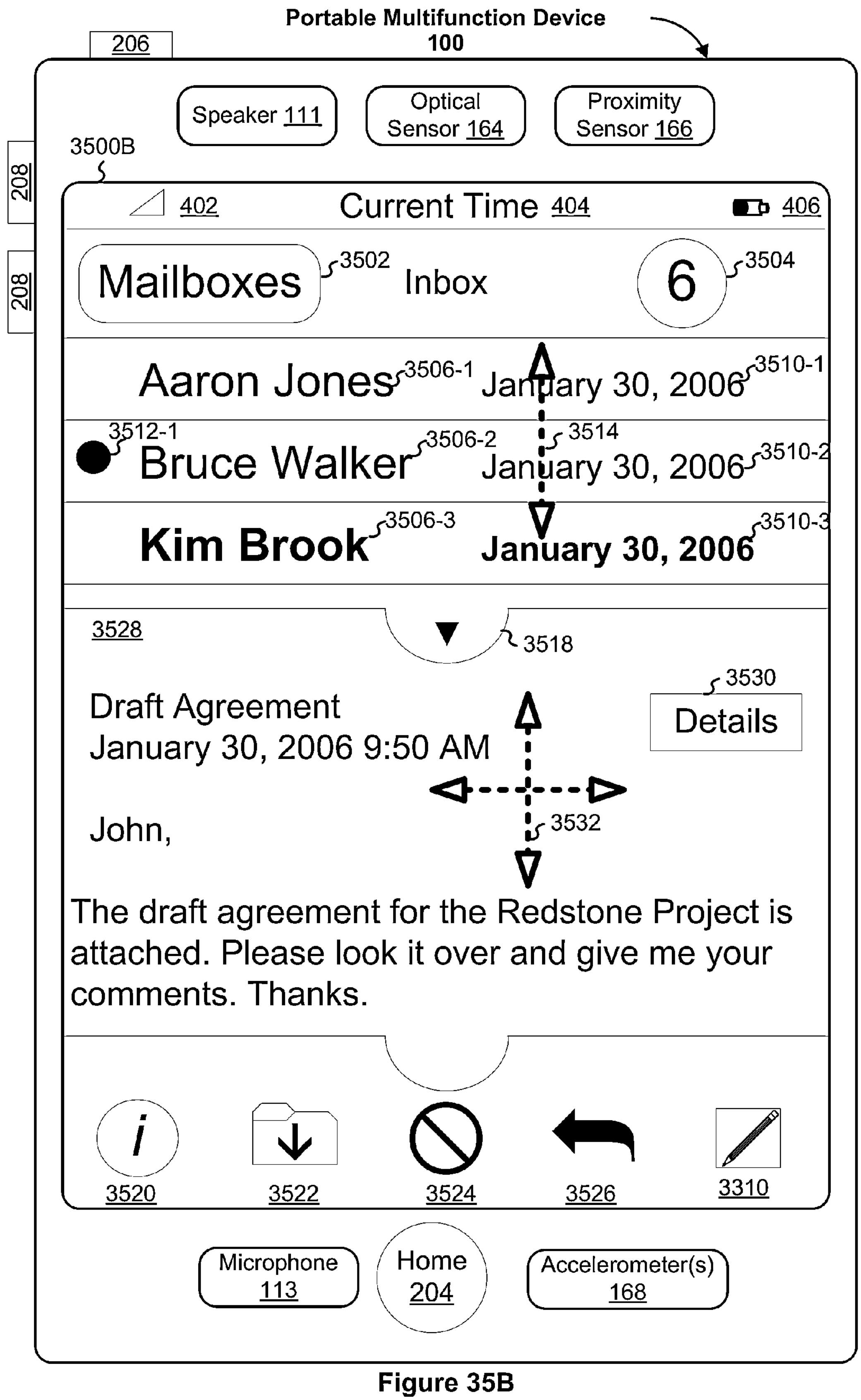
Figure 35C:
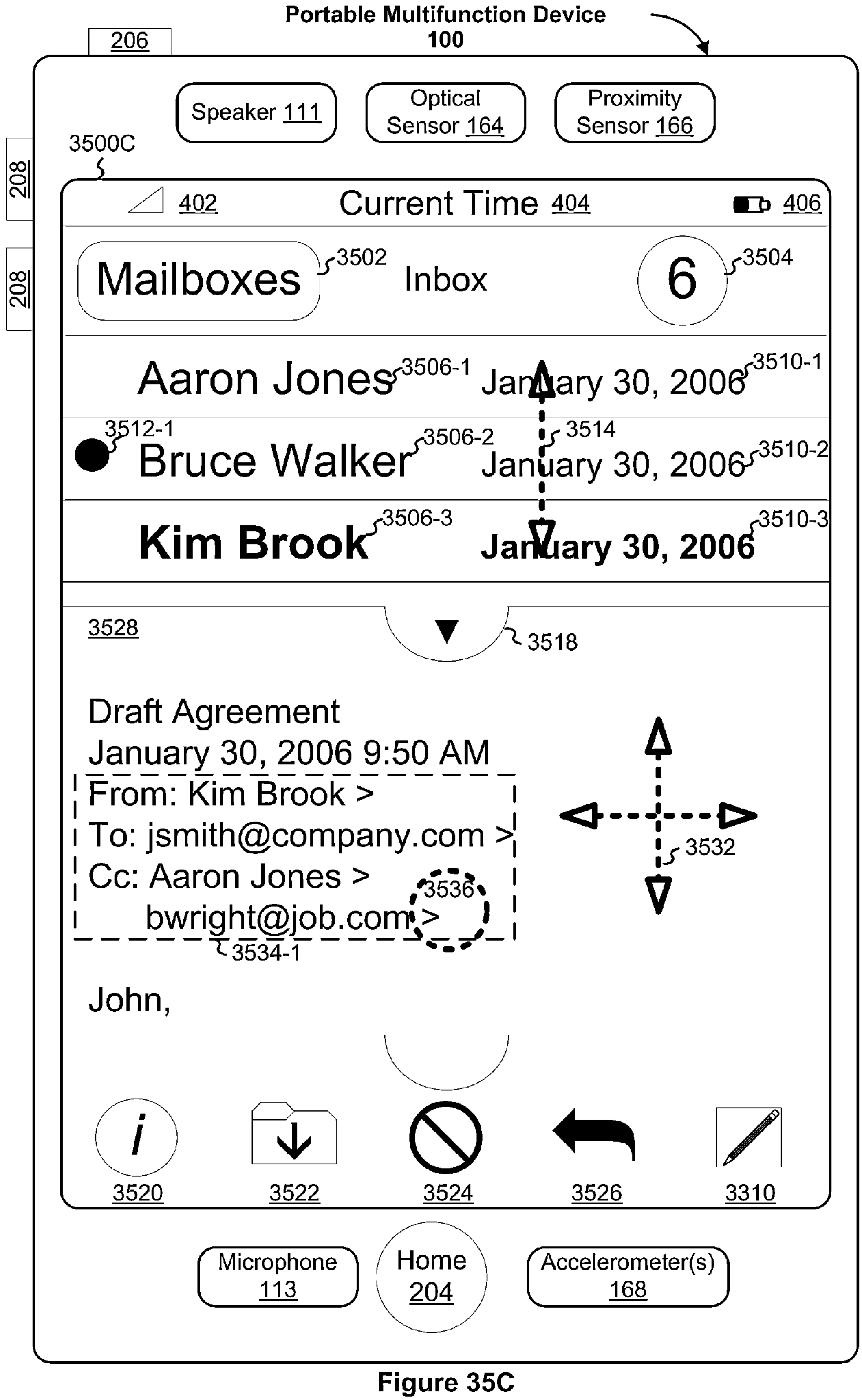
Figure 35D:
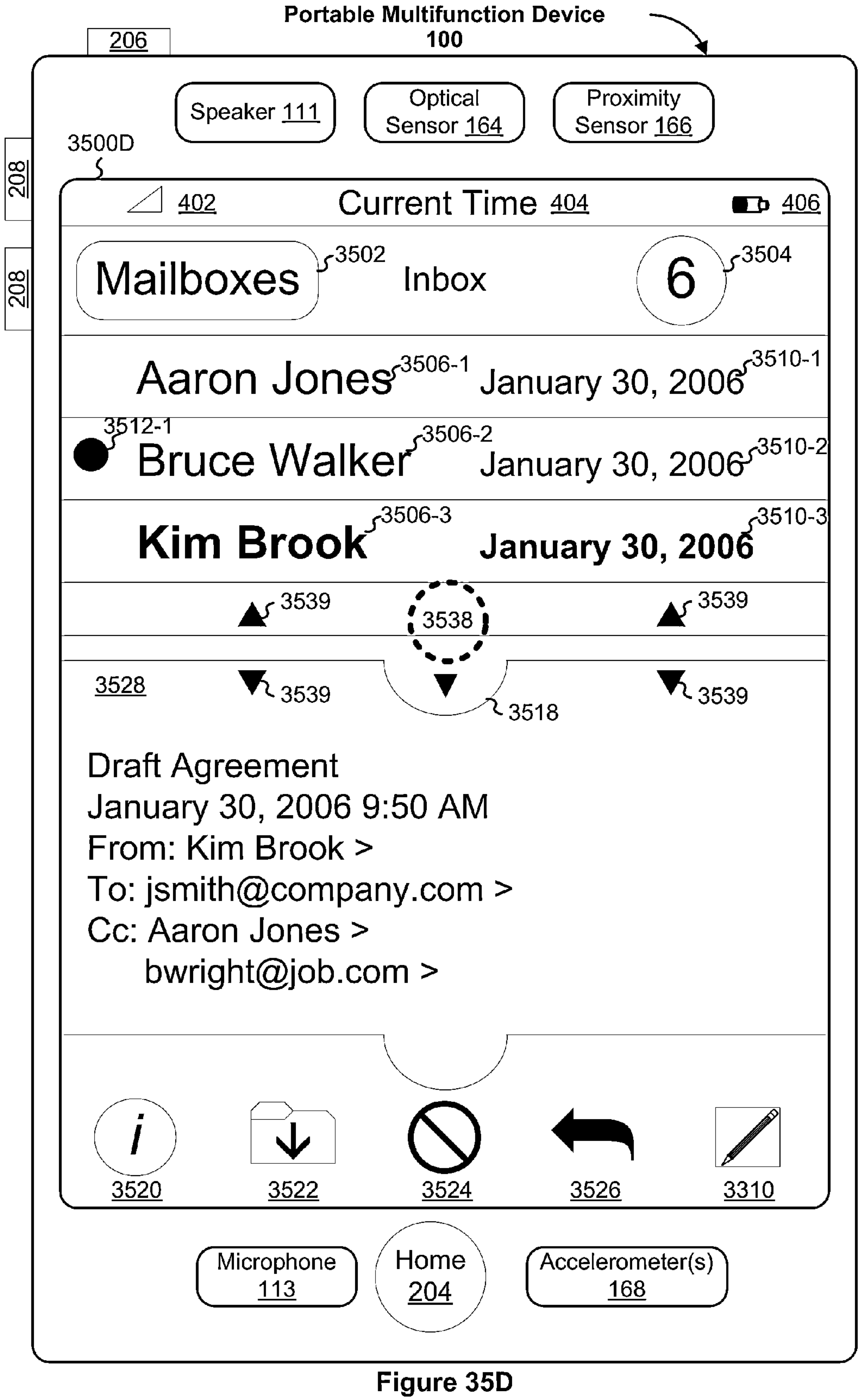
Figure 35E:
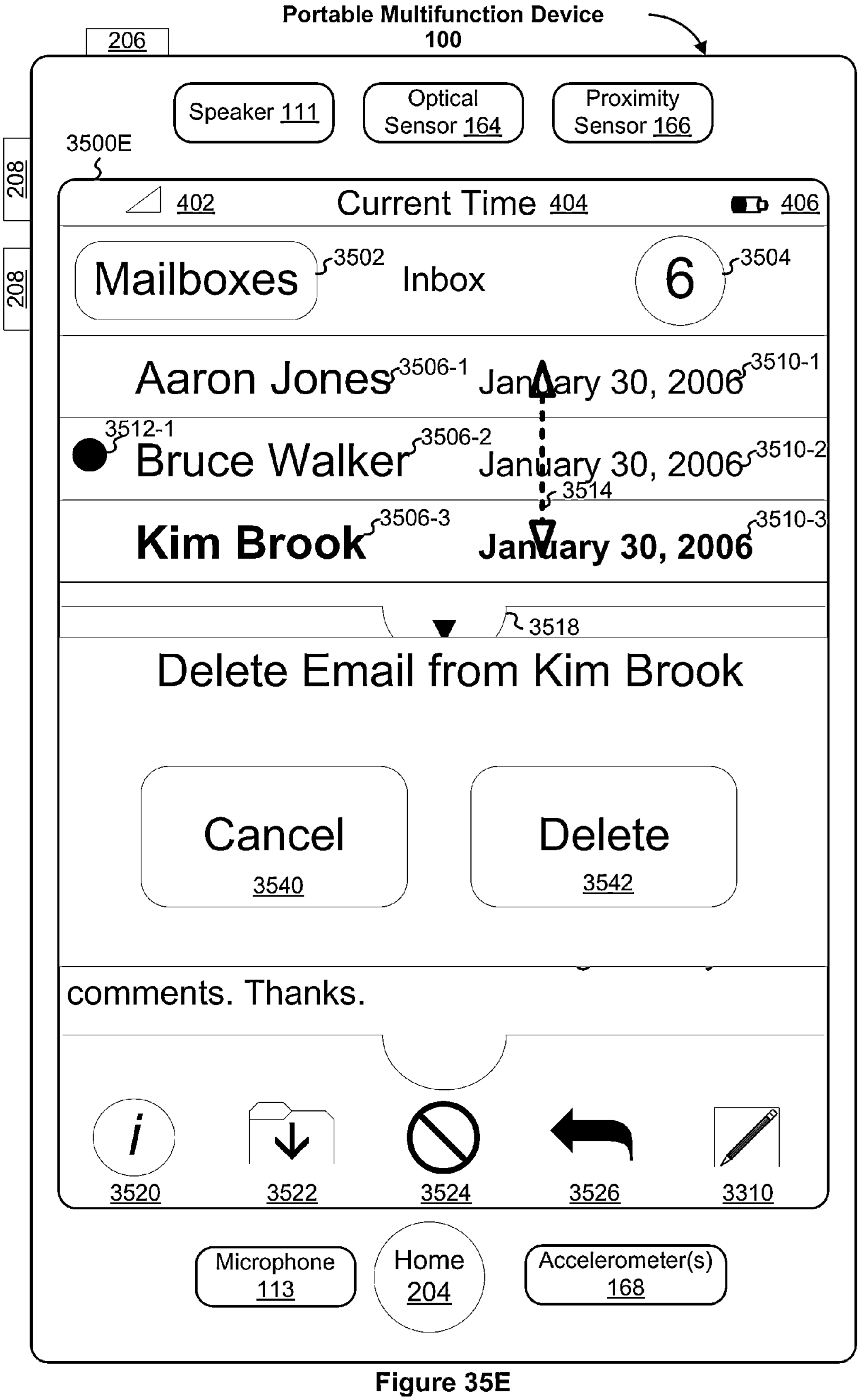
Figure 35F:
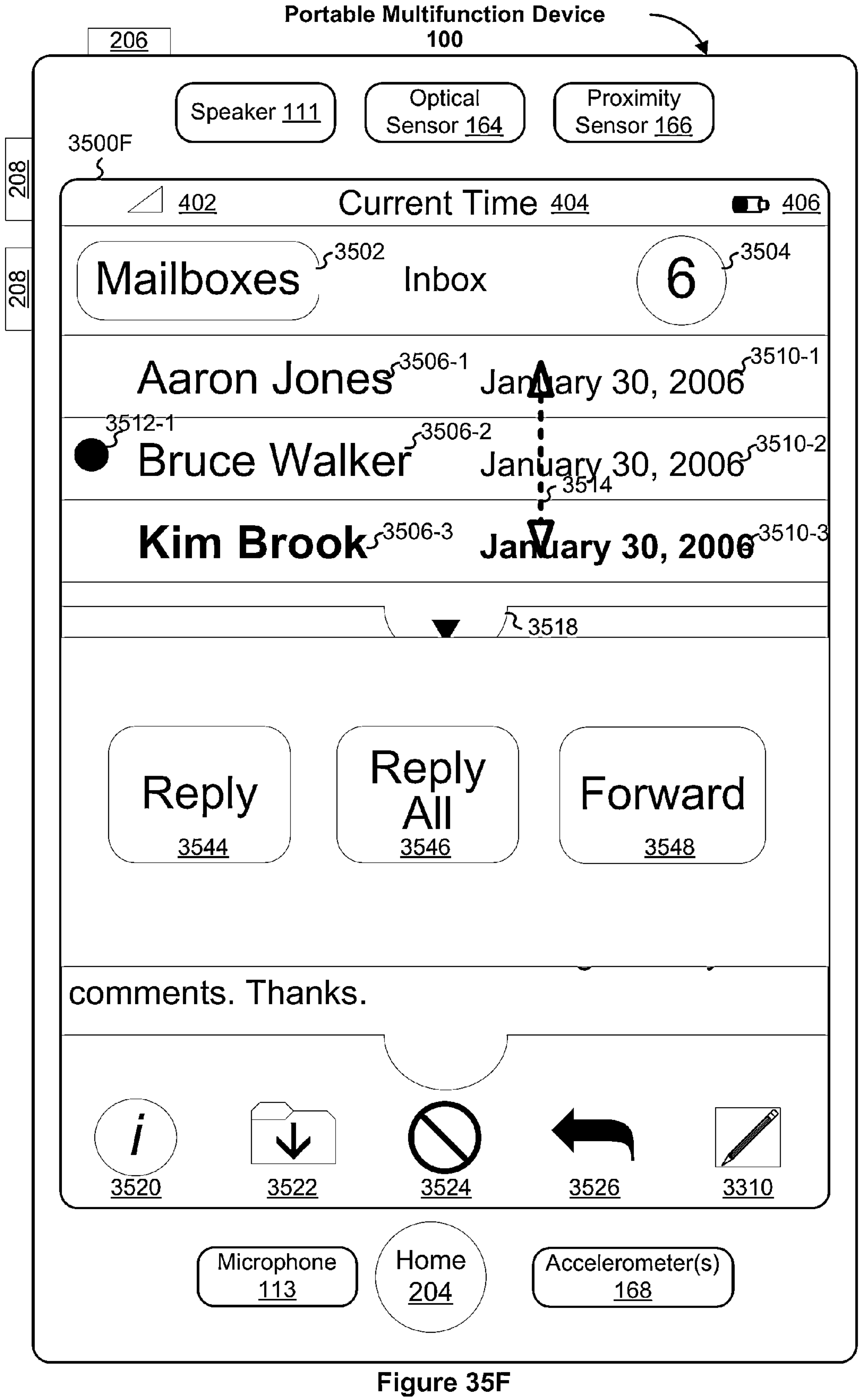
Figure 35G:
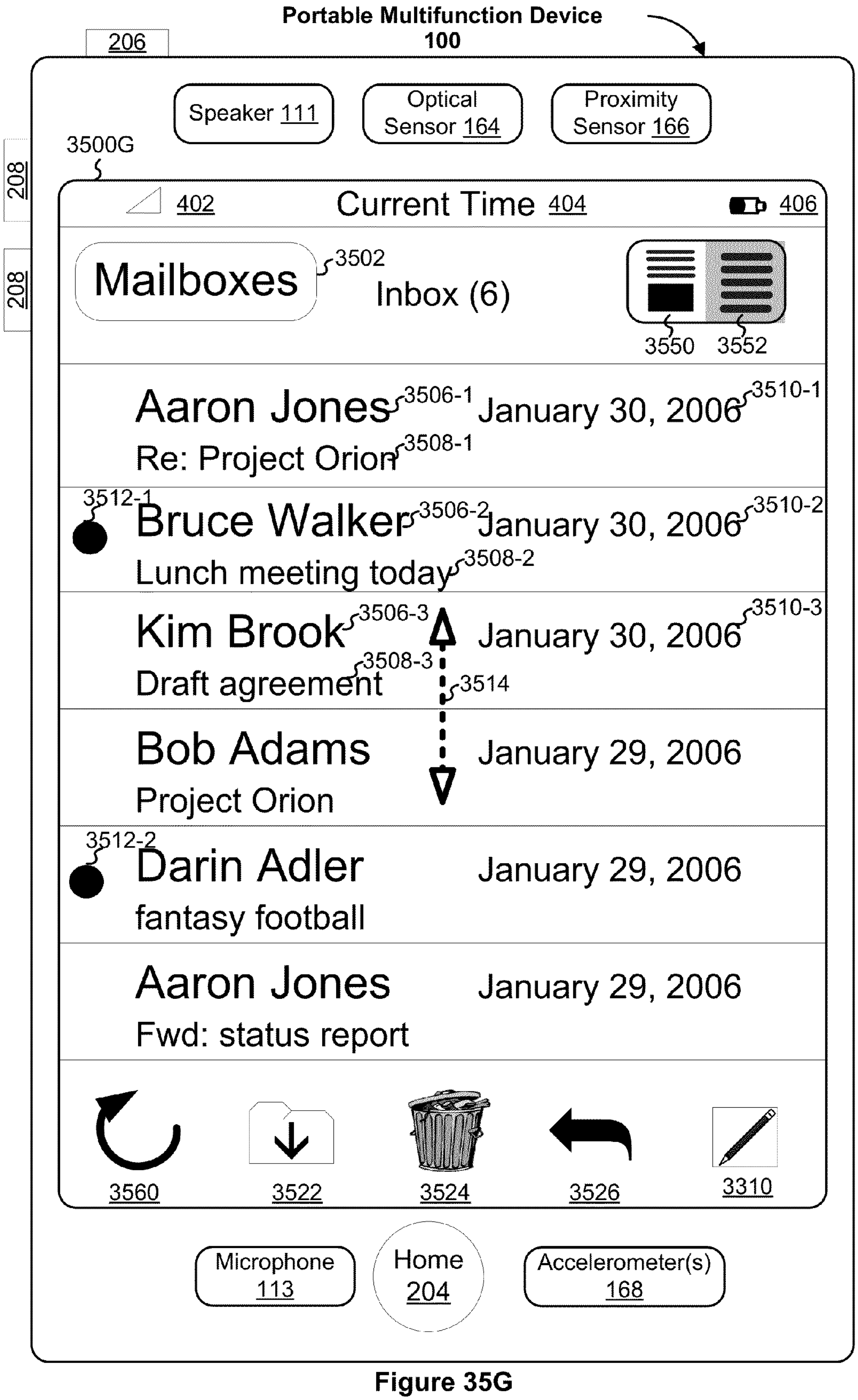
Figure 35H:
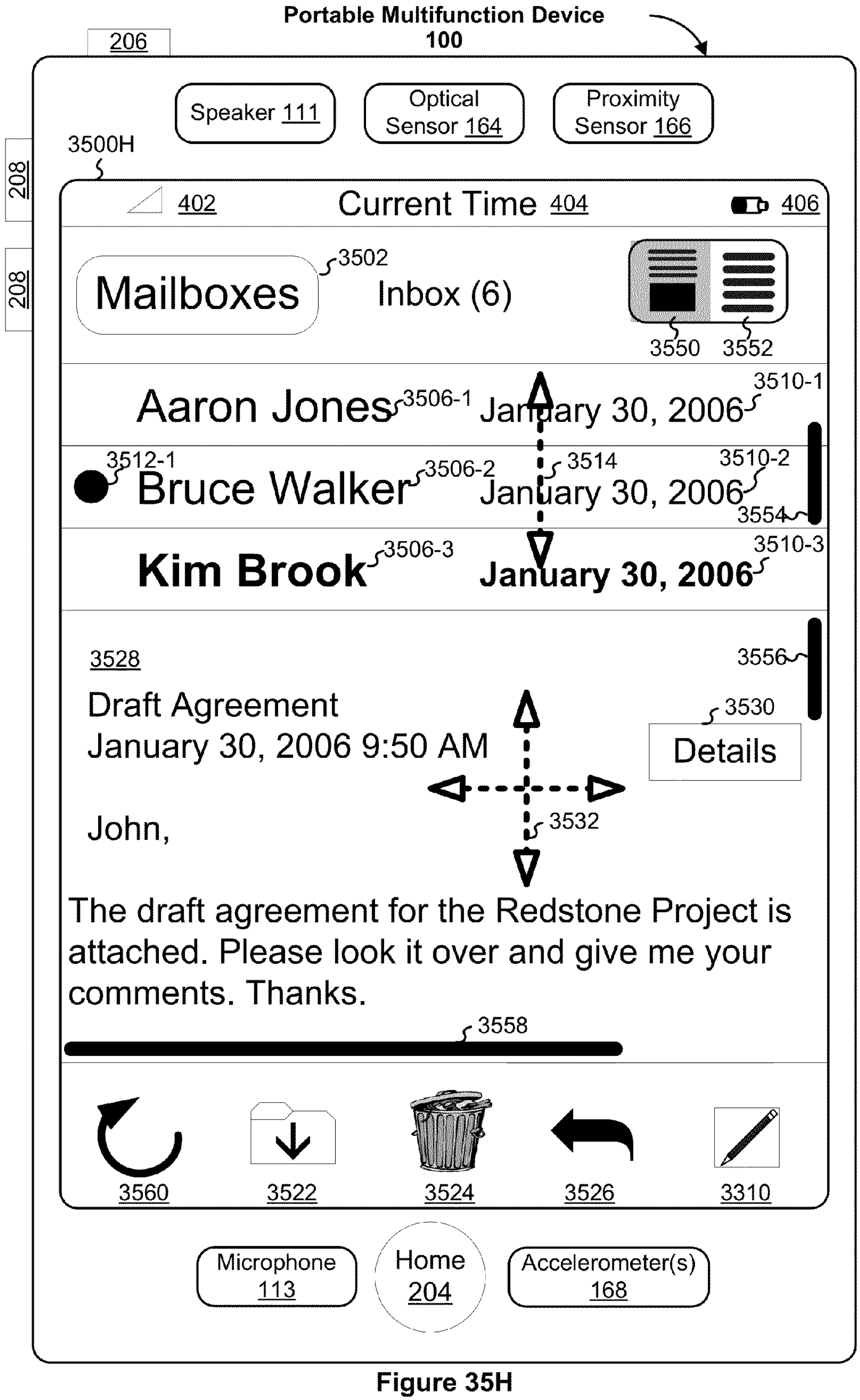
Figure 35I:
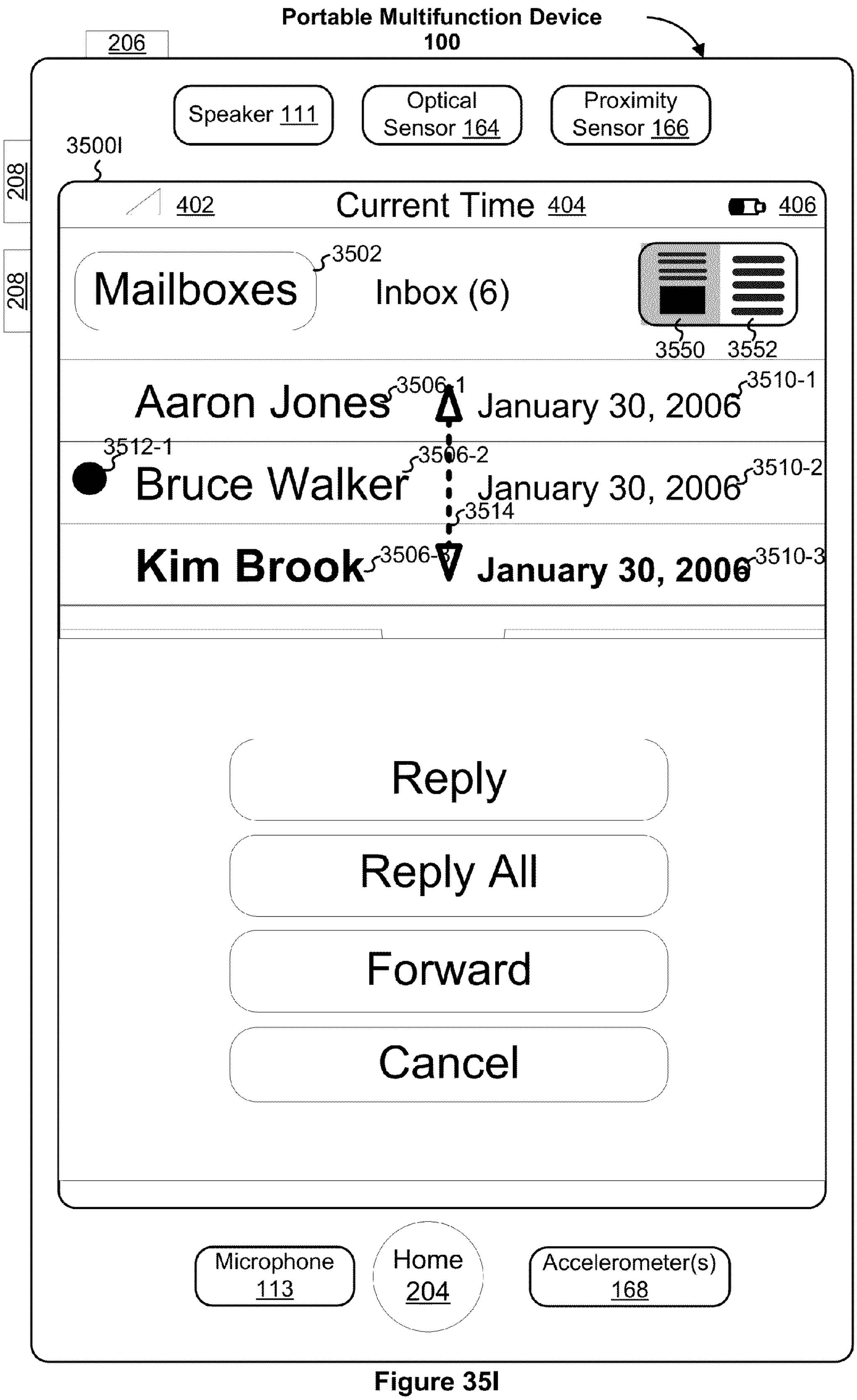
Figure 35J:
Figure 35K:
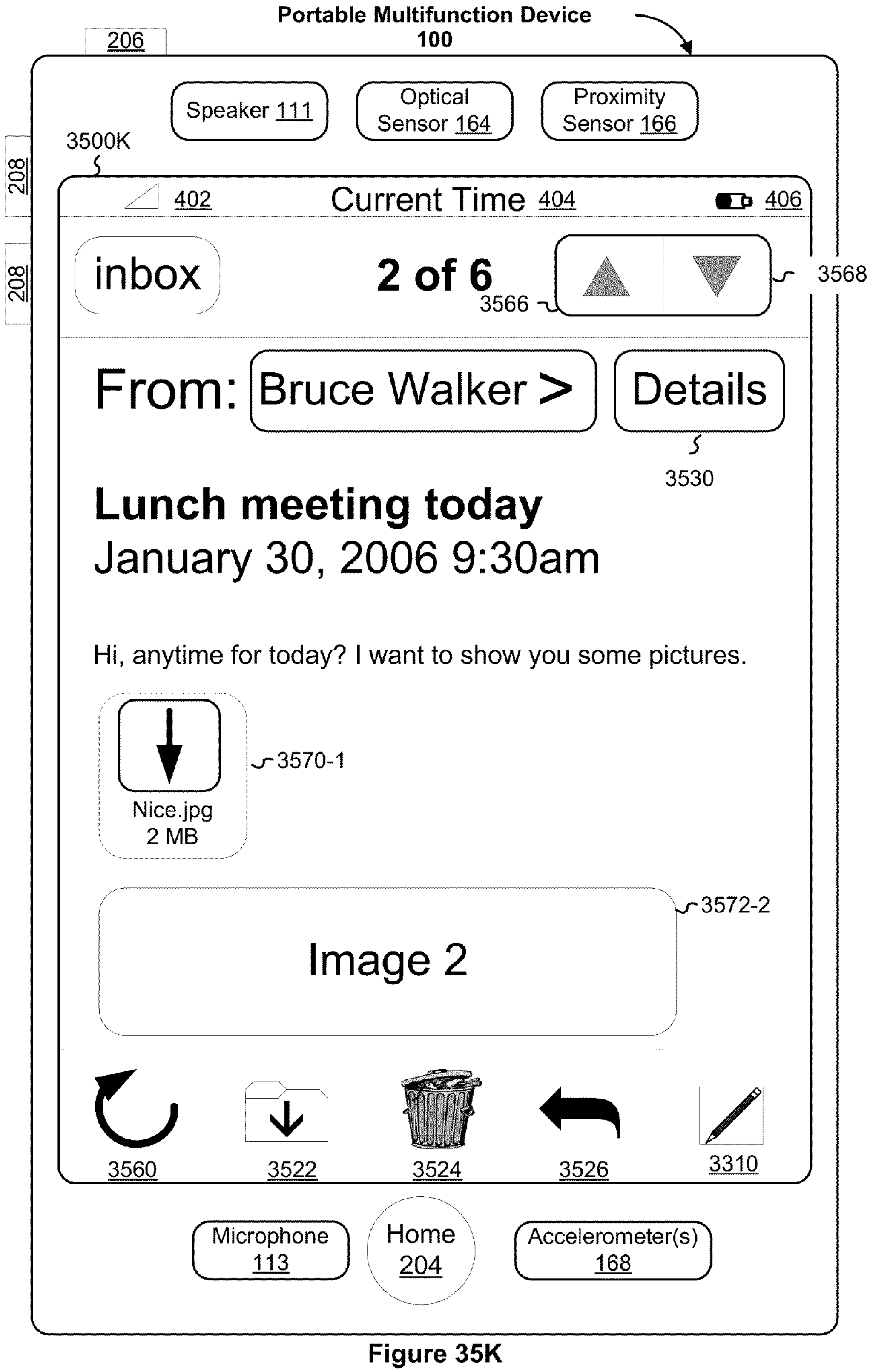
Figure 35L:
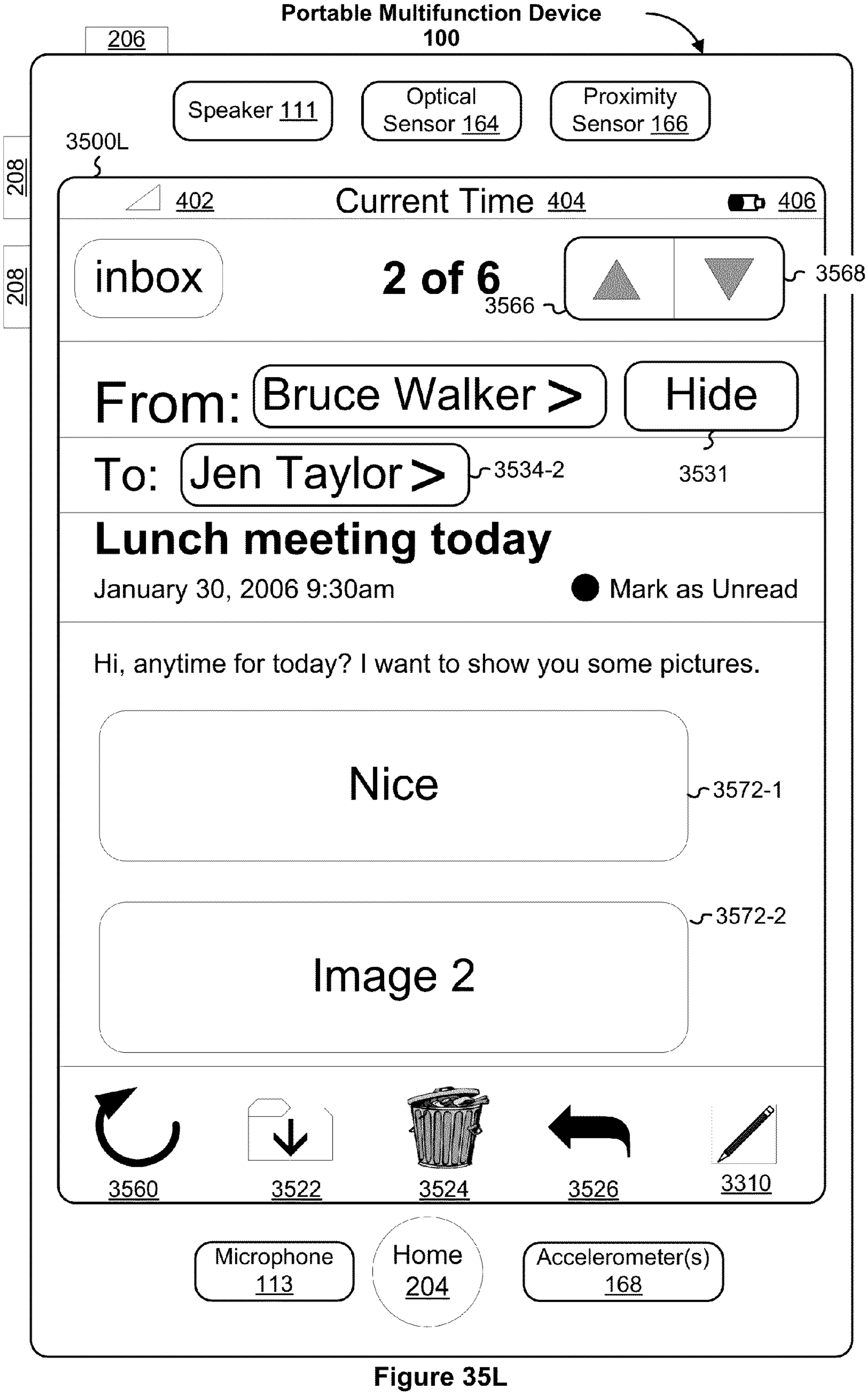
Figure 35M:
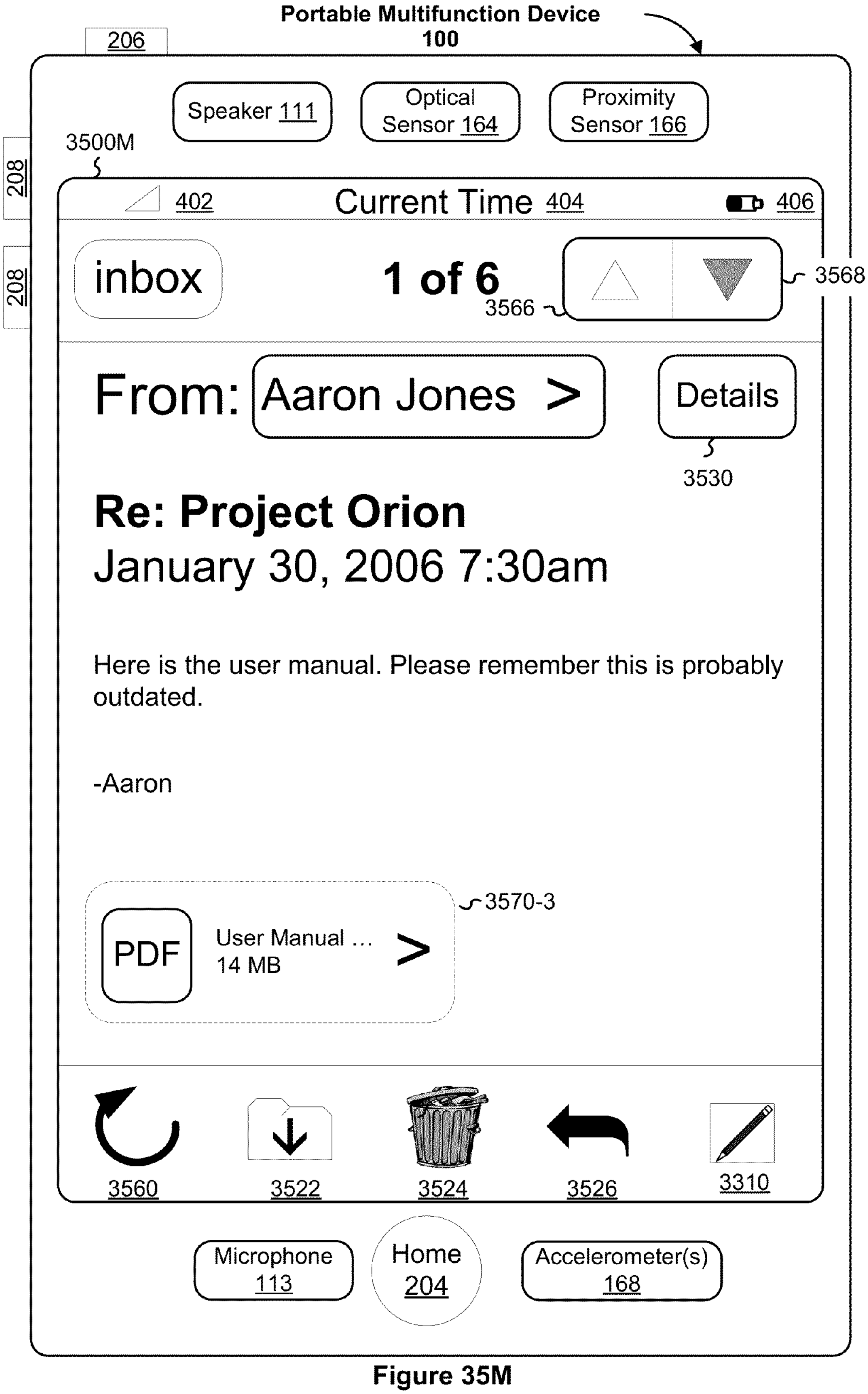
Figure 35N:
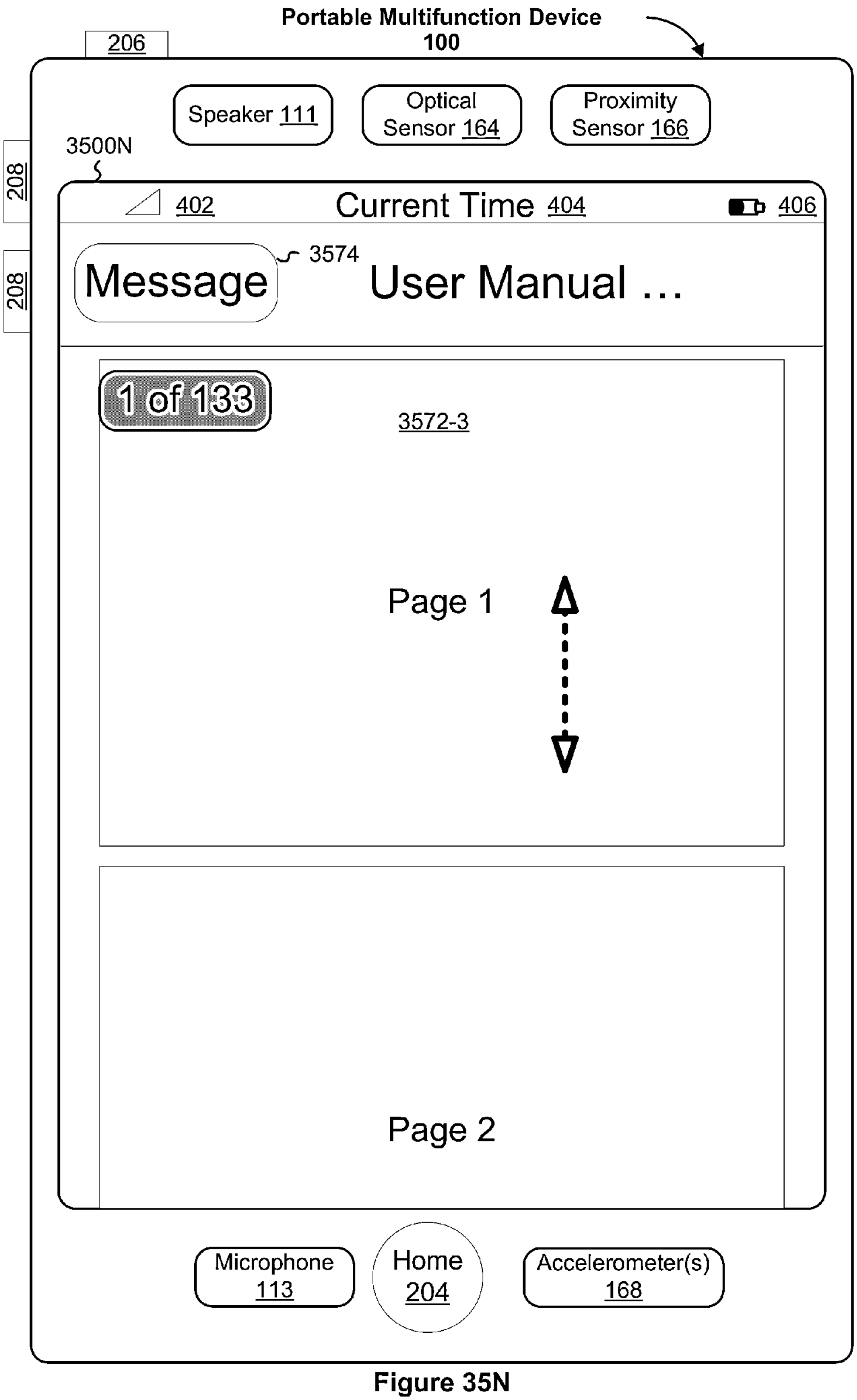
Figure 35O:
Figure 36:
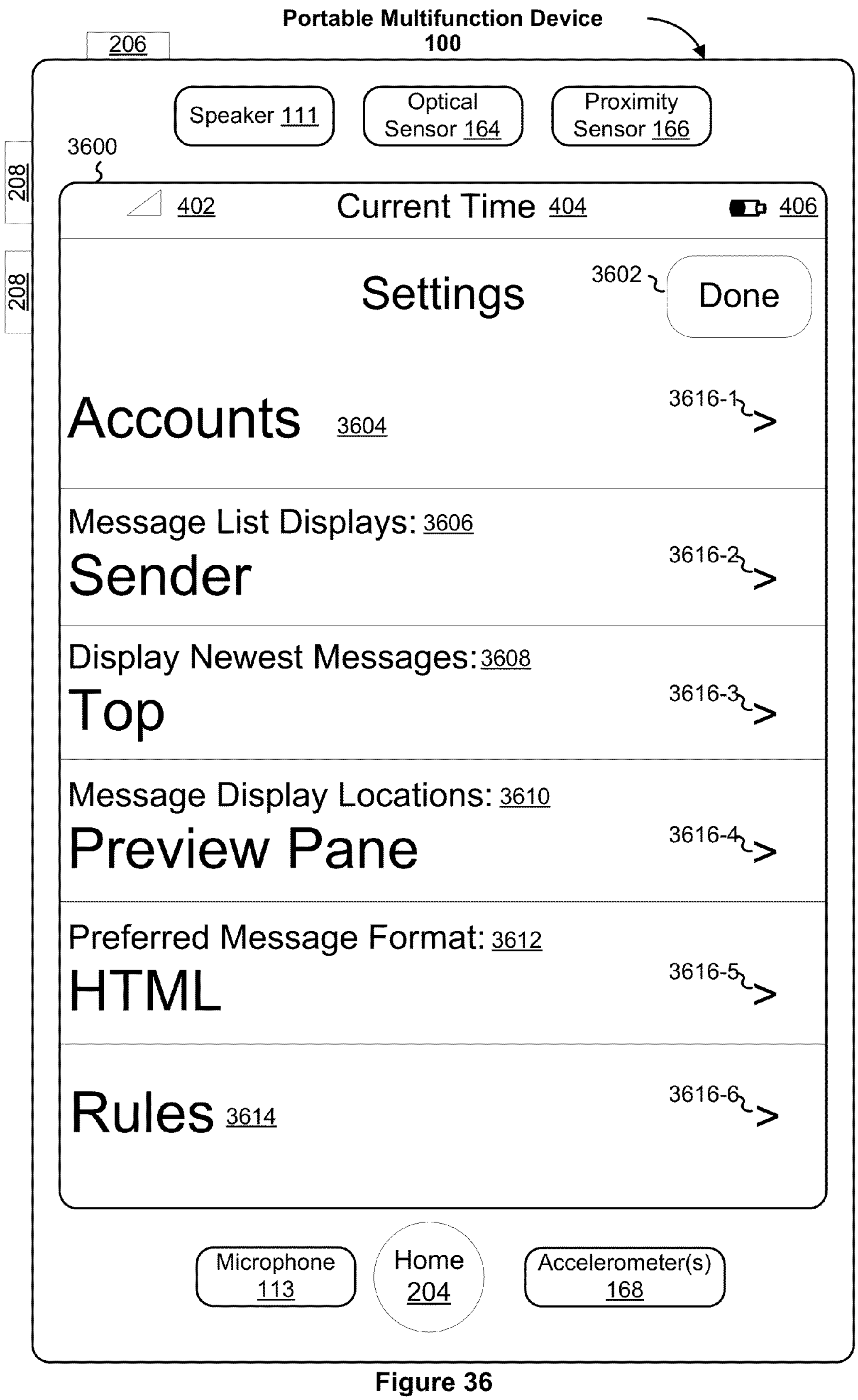
FIG. 36 illustrates an exemplary user interface for setting email user preferences in accordance with some embodiments.
Figure 38A:
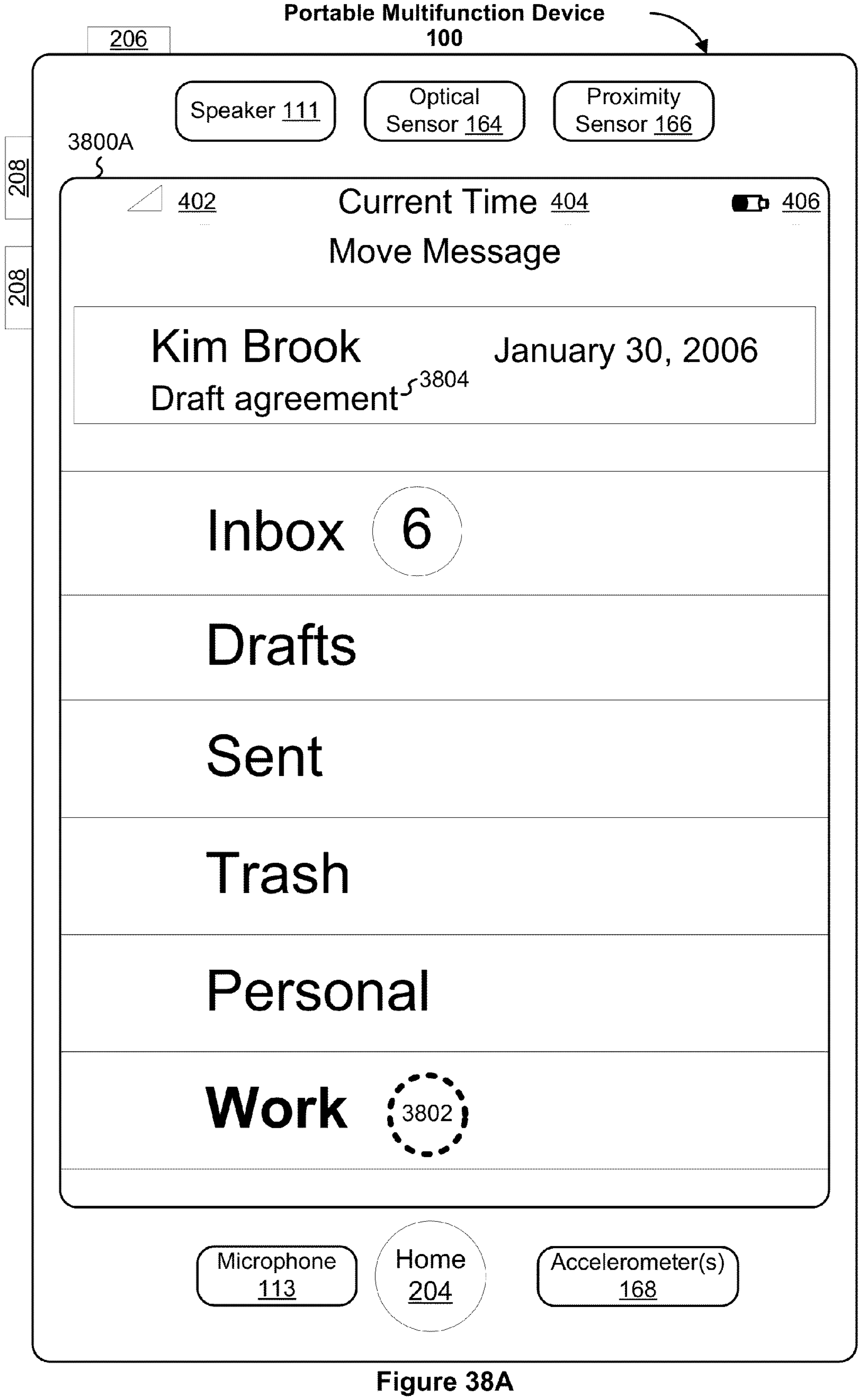
FIGS. 38A and 38B illustrate an exemplary user interface for moving email messages in accordance with some embodiments.

FIGS. 35A-35O illustrate exemplary user interfaces for displaying and managing an inbox in accordance with some embodiments. Analogous user interfaces may be used to display and manage the other mailboxes (e.g., drafts, sent, trash, personal, and/or work in UI 3300). In some embodiments, user interfaces 3500A-3500I include the following elements, or a subset or superset thereof:

402, 404, 406, and 3310, as described above;

mailboxes icon 3502 that when activated (e.g., by a finger tap on the icon) initiates the display of mailbox UI 3300 (FIG. 33);

unread messages icon 3504 that displays the number of unread messages in the inbox;

names 3506 of the senders of the email messages;

subject lines 3508 for the email messages;

dates 3510 of the email messages;

unread message icons 3512 that indicate messages that have not been opened;

preview pane separator 3518 that separates the list of messages from a preview of a selected message in the list;

settings icon 3520 that when activated (e.g., by a finger tap on the icon) initiates the display of settings UI 3600 (FIG. 36);

move message icon 3522 that when activated (e.g., by a finger tap on the icon) initiates the display of move message UI 3800A (FIG. 38A);

Delete symbol icon 3524 that when activated (e.g., by a finger tap on the icon) initiates display of a UI to confirm that the user wants to delete the selected email (e.g. UI 3500E, FIG. 35E);

Reply/Forward icon 3526 that when activated (e.g., by a finger tap on the icon) initiates display of a UI to select how to reply or forward the selected email (e.g. UI 3500F, FIG. 35F or UI 3500I, FIG. 35I);

Preview pane 3528 that displays a portion of the selected email message;

Details icon 3530 that when activated (e.g., by a finger tap on the icon) initiates display of email addressing details (e.g., 3534-1, FIG. 35C or 3534-2 FIG. 35K);

Hide details icon 3531 that when activated (e.g., by a finger tap on the icon) ceases display of email addressing details (e.g., 3534-2 FIG. 35K);

Cancel icon 3540 that when activated (e.g., by a finger tap on the icon) returns the device to the previous user interface (e.g. UI 3500D);

Confirm delete icon 3542 that when activated (e.g., by a finger tap on the icon) deletes the selected email;

Reply icon 3544 that when activated (e.g., by a finger tap on the icon) initiates creation of an email replying to the sender;

Reply All icon 3546 that when activated (e.g., by a finger tap on the icon) initiates creation of an email replying to the sender and the other parties included in the selected email (e.g., by cc:);

Forward icon 3548 that when activated (e.g., by a finger tap on the icon) initiates creation of an email to be forwarded;

Show preview pane icon 3550 that when activated (e.g., by a finger tap on the icon) initiates display of preview pane 3528;

Don't show preview pane icon 3552 that when activated (e.g., by a finger tap on the icon) stops display of preview pane 3528;

Vertical bar 3554 for the list of email messages that helps a user understand what portion of the list of email messages is being displayed;

Vertical bar 3556 for the email message in the preview pane that helps a user understand what portion of the message is being displayed;

Horizontal bar 3558 for the email message in the preview pane that helps a user understand what portion of the message is being displayed;

Refresh mailbox icon 3560 that when activated (e.g., by a finger tap on the icon) initiates downloading of new email messages, if any, from a remote server;

Edit icon 3562 that when activated (e.g., by a finger tap on the icon) initiates display of a user interface for deleting emails (e.g., as described in U.S. Provisional Patent Application Nos. 60/883,814, "Deletion Gestures On A Portable Multifunction Device," filed Jan. 7, 2007 and 60/936,755, "Deletion Gestures On A Portable Multifunction Device," filed Jun. 22, 2007, the contents of which are hereby incorporated by reference);

text body lines 3564 for the email messages;

Previous email message icon 3566 that when activated (e.g., by a finger tap on the icon) initiates display of the previous email message in the corresponding mailbox;

Next email message icon 3568 that when activated (e.g., by a finger tap on the icon) initiates display of the next email message in the corresponding mailbox;

Attachment icon 3570 that when activated (e.g., by a finger tap on the icon) initiates display of the corresponding attachment 3572, either as part of the email message (e.g., activating 3570-1, FIG. 35K initiates display of 3572-1, FIG. 35L) or apart from the email message (e.g., activating 3570-3, FIG. 35M initiates display of 3572-3, FIG. 35N);

Attachment 3572 (e.g., a digital image, a PDF file, a word processing document, a presentation document, a spreadsheet, or other electronic document); and Return to email message icon 3574 that when activated (e.g., by a finger tap on the icon) initiates display of the email message that included the attachment.

If the set of emails fill more than the screen area (or more than the screen area above the preview pane), the user may scroll through the emails using vertically upward and/or vertically downward gestures 3514 on the touch screen.

In some embodiments, vertical bar 3554 is displayed temporarily after an object is detected on or near the touch screen display (e.g., a finger touch is detected anywhere on the list of email messages). In some embodiments, the vertical bar 3554 has a vertical position on top of the displayed portion of the email list that corresponds to the vertical position in the list of the displayed portion of the list. In some embodiments, the vertical bar 3554 has a vertical length that corresponds to the portion of the email list being displayed. For example, in FIG. 35H, the vertical position of the vertical bar 3554 indicates that the middle of the email list is being displayed and the vertical length of the vertical bar 3554 indicates that roughly one third of the e-mail list is being displayed.

In some embodiments, the email subjects 3508 are not displayed if the preview pane 3528 is used. In some embodiments, the position of the preview pane separator can be adjusted by the user making contact 3516 at or near the preview pane separator and moving the separator to the desired location by dragging the finger contact 3538. In some embodiments, arrows 3539 or other graphics appear during the positioning of the preview pane separator (e.g., UI 3500D, FIG. 35D) to help guide the user.

In some embodiments, text body lines 3564 for the email messages are displayed (e.g., UI 3500J, FIG. 35J). In some embodiments, a user may choose the amount of each email message (e.g., the sender name 3506, subject 3508, and/or number of text body lines) that is displayed in the list of email messages (e.g., as part of settings 412). In some embodiments, a user can select the number of text body lines 3564 that are displayed for each email message in the list of email messages (e.g., as part of settings 412). In some embodiments, the displayed text from the body of the email message is text that has been extracted by the email client 140 from the HTML version of the selected message. Thus, if the email message body has both plain text and HTML portions, the portion used for generating the text body lines to be displayed is the HTML portion.

In some embodiments, when an attachment icon 3570 is activated (e.g., by a finger tap on the icon) display of the corresponding attachment 3572 is initiated. In some embodiments, the attachment is shown as part of the email message (e.g., activating 3570-1, FIG. 35K initiates display of 3572-1, FIG. 35L). In some embodiments, the attachment is shown apart from the email message (e.g., activating 3570-3, FIG. 35M initiates display of 3572-3, FIG. 35N). In some embodiments, when Return to email message icon 3574 (FIG. 35N) is activated (e.g., by a finger tap on the icon) display of the email message that included the attachment is initiated.

In some embodiments, in response to a tap or other predefined gesture by the user in a row containing information (e.g., 3506, 3510, and/or 3508) about a particular email message, some or all of the text in the row is highlighted (e.g., by coloring, shading, or bolding) and the corresponding message is displayed in the preview pane area. In some embodiments, in response to a tap or other predefined gesture by the user in a row containing information (e.g., 3506, 3510, and/or 3508) about a particular email message, the email message is displayed on the full screen if the preview pane is not being used.

In some embodiments, if the selected email fills more than the preview pane area, the user may scroll through the email using two-dimensional gestures 3532 in the preview pane with vertical and/or horizontal movement of the email on the touch screen.

In some embodiments, vertical bar 3556 is displayed temporarily after an object is detected on or near the touch screen display (e.g., a finger touch is detected anywhere on the email message in the preview pane 3528). In some embodiments, the vertical bar 3556 has a vertical position on top of the displayed portion of the email message that corresponds to the vertical position in the email of the displayed portion of the email. In some embodiments, the vertical bar 3556 has a vertical length that corresponds to the portion of the email being displayed. For example, in FIG. 35H, the vertical position of the vertical bar 3556 indicates that the top of the email is being displayed and the vertical length of the vertical bar 3556 indicates that a portion from the top quarter of the email is being displayed.

In some embodiments, horizontal bar 3558 is displayed temporarily after an object is detected on or near the touch screen display (e.g., a finger touch is detected anywhere on the email message in the preview pane 3528). In some embodiments, the horizontal bar 3558 has a horizontal position on top of the displayed portion of the email that corresponds to the horizontal position in the email of the displayed portion of the email. In some embodiments, the horizontal bar 3558 has a horizontal length that corresponds to the portion of the email being displayed. For example, in FIG. 35H, the horizontal position of the horizontal bar 3558 indicates that a portion of the left side of the email is being displayed and the horizontal length of the horizontal bar 3558 indicates that a portion from the left half of the email is being displayed. Together, vertical bar 3556 and horizontal bar 3558 indicate that the northwest corner of the email message in the preview pane is being displayed.

In some embodiments, an email message is displayed such that only vertical scrolling is needed, in which case horizontal bar 3558 is not used.

In some embodiments, in response to user activation of an additional information icon (e.g., ">") on the detail information 3534 in FIG. 35C (e.g., by a finger tap 3536 on the icon), the touch screen may display contact list information for the corresponding party, if available (e.g., UI 2800C, FIG. 28C) or a UI analogous to UI 2800D, FIG. 28D.

In some embodiments, in response to detecting a horizontal swipe gesture (e.g., 3576, FIG. 35O) on a particular email message in a the list of emails messages, a process for deleting the particular email message is initiated (e.g., as described in U.S. Provisional Patent Application Nos. 60/883,814, "Deletion Gestures On A Portable Multifunction Device," filed Jan. 7, 2007 and 60/936,755, "Deletion Gestures On A Portable Multifunction Device," filed Jun. 22, 2007, the contents of which are hereby incorporated by reference).

FIG. 36 illustrates an exemplary user interface for setting email user preferences in accordance with some embodiments. In some embodiments, user interface 3600 includes the following elements, or a subset or superset thereof:

- 402, 404, and 406, as described above;
- Done icon 3602 that when activated (e.g., by a finger tap on the icon) returns the device to the previous UI;
- Accounts 3604 for entering email account information;
- Message list displays 3606 for selecting whether sender 3506 and/or subject 3508 information is displayed in the emails lists;
- Display newest messages 3608 for selecting whether the newest messages are displayed at the top or bottom of the screen;
- Message display locations 3610 for selecting whether the messages are displayed in the preview pane or full screen;
- Preferred message format 3612 for selecting how the messages are formatted (e.g., HTML or plain text);
- Rules 3614 for creating rules for managing email messages (e.g., using UI 3700A, FIG. 37A, and UI 3700B, FIG. 37B);
- Selection icons 3616 that when activated (e.g., by a finger tap on the icon) show choices for the corresponding settings.

In some embodiments, a user may tap anywhere in the row for a particular setting to initiate display of the corresponding setting choices.

In some embodiments, the settings in FIG. 36 are incorporated into settings 412 (FIG. 4B) and settings icon 3520 need not be displayed in the email application 140 (e.g., FIG. 35G).

Figure 37A:
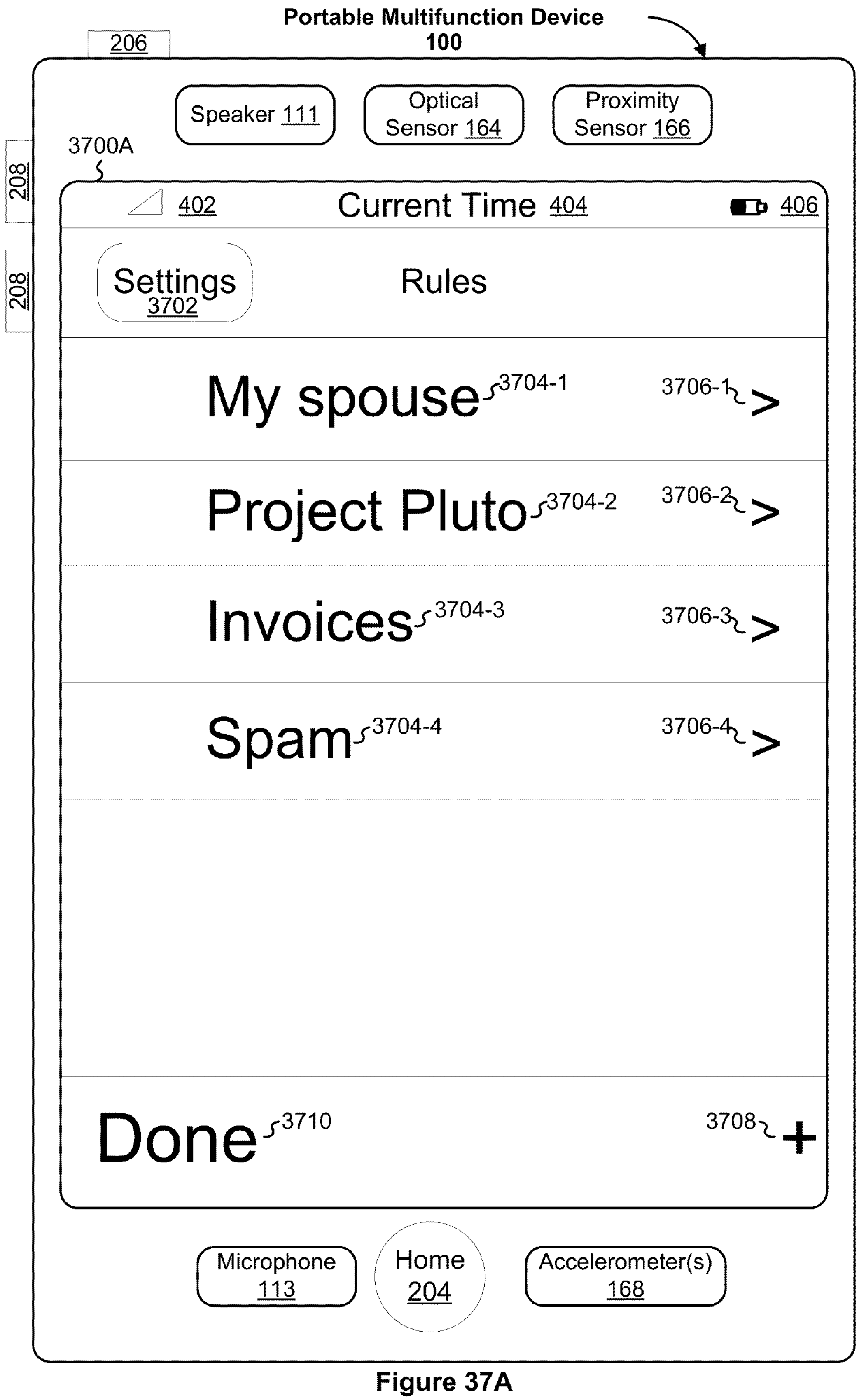
FIGS. 37A and 37B illustrate an exemplary user interface for creating and managing email rules in accordance with some embodiments.
Figure 37B:
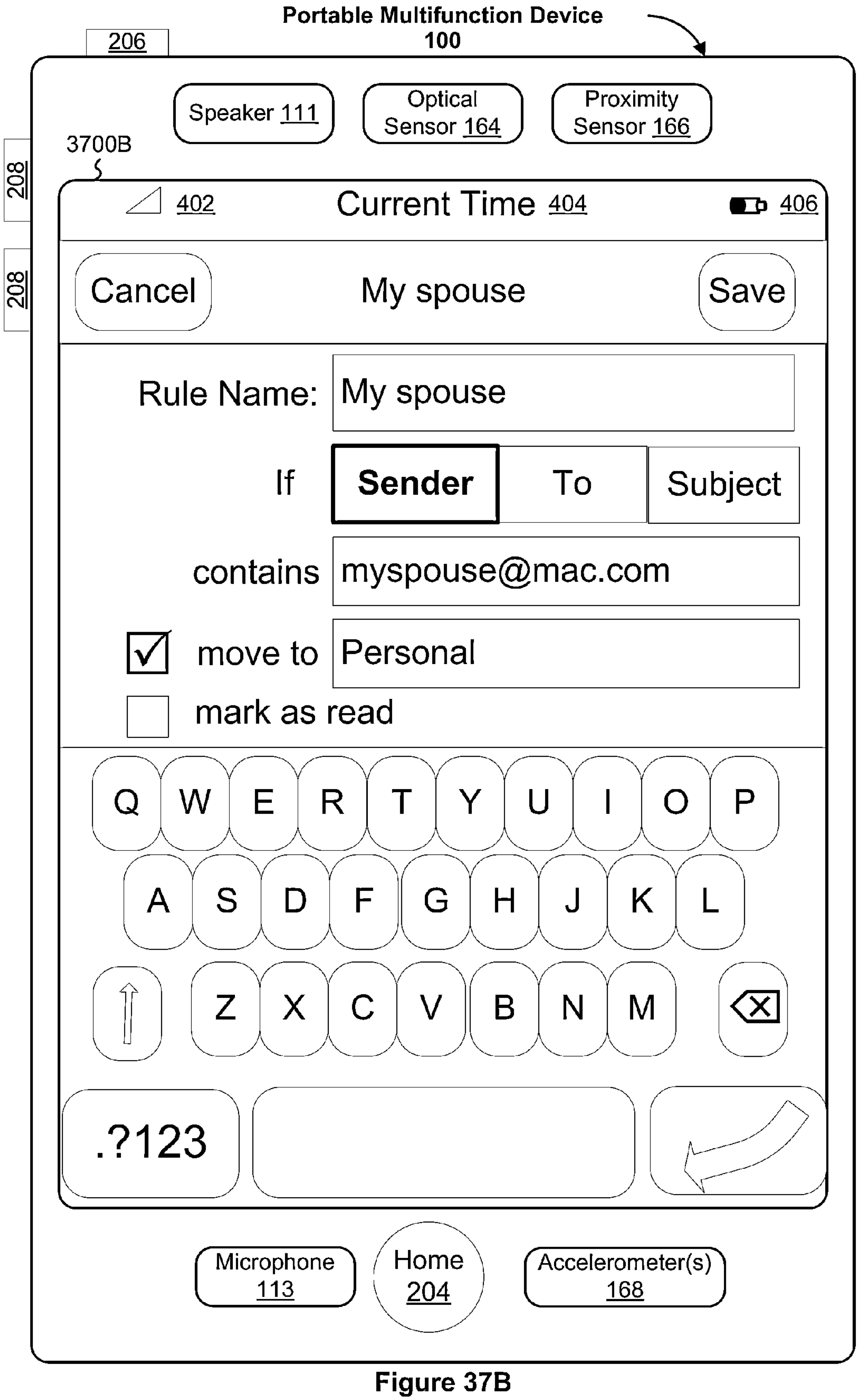

FIGS. 37A and 37B illustrate an exemplary user interface for creating and managing email rules in accordance with some embodiments. In some embodiments, user interface 3700A includes the following elements, or a subset or superset thereof:

- 402, 404, and 406, as described above;
- Settings icon 3702 that when activated (e.g., by a finger tap on the icon) returns the device to the settings UI 3600 (FIG. 3600);
- Rules 3704;
- Selection icons 3706 that when activated (e.g., by a finger tap on the icon) show choices for the corresponding rules.
- Add icon 3708 that when activated (e.g., by a finger tap on the icon) displays a UI for creating a new rule (e.g., UI 3700B, FIG. 37B);
- Done icon 3710 that when activated (e.g., by a finger tap on the icon) returns the device to the settings UI 3600 (FIG. 3600);

In some embodiments, a user may tap anywhere in the row for a particular rule to initiate display of the corresponding rule (e.g., UI 3700B, FIG. 37B).

Figure 38B:
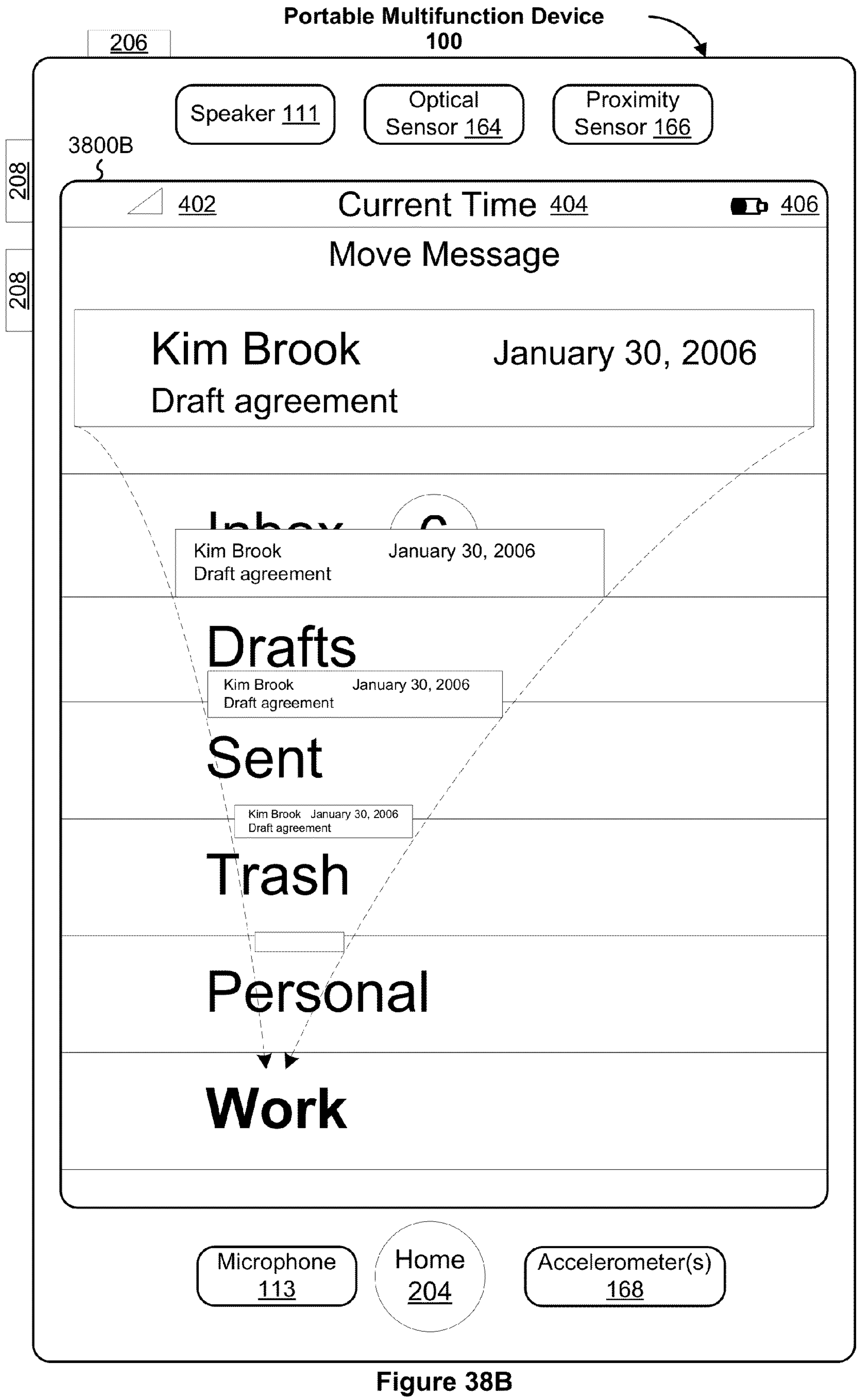

FIGS. 38A and 38B illustrate an exemplary user interface for moving email messages in accordance with some embodiments.

In response to the user activating create move message icon 3522, the device displays UI 3800A, with some information 3804 for the selected message displayed.

In some embodiments, if the user makes a tap 3802 or other predefined gesture on a row corresponding to a particular mailbox or other folder, the message is moved to the corresponding mailbox or folder (e.g., Work in FIG. 38A). In some embodiments, the selected row is highlighted and an animation appears to move the message information 3804 into the selected row (as illustrated schematically in FIG. 38B).

Additional description of an email client can be found in U.S. Provisional Patent Application No. 60/883,807, "Email Client For A Portable Multifunction Device," filed Jan. 7, 2007, the content of which is hereby incorporated by reference.

Methods for efficiently fetching email messages can be found in U.S. Provisional Patent Application No. 60/947,395, "Email Fetching System and Method in a Portable Electronic Device," filed Jun. 29, 2007, the content of which is hereby incorporated by reference.

Methods for automatically selecting email ports and email security can be found in U.S. Provisional Patent Application No. 60/947,396, "Port Discovery and Message Delivery in a Portable Electronic Device," filed Jun. 29, 2007, the content of which is hereby incorporated by reference.

Browser

FIGS. 39A-39M illustrate exemplary user interfaces for a browser in accordance with some embodiments.

In some embodiments, user interfaces 3900A-3900M include the following elements, or a subset or superset thereof:

- 402, 404, and 406, as described above;
- Previous page icon 3902 that when activated (e.g., by a finger tap on the icon) initiates display of the previous web page;
- Web page name 3904;
- Next page icon 3906 that when activated (e.g., by a finger tap on the icon) initiates display of the next web page;
- URL (Uniform Resource Locator) entry box 3908 for inputting URLs of web pages;
- Refresh icon 3910 that when activated (e.g., by a finger tap on the icon) initiates a refresh of the web page;
- Web page 3912 or other structured document, which is made of blocks 3914 of text content and other graphics (e.g., images and inline multimedia);
- Settings icon 3916 that when activated (e.g., by a finger tap on the icon) initiates display of a settings menu for the browser;
- Bookmarks icon 3918 that when activated (e.g., by a finger tap on the icon) initiates display of a bookmarks list or menu for the browser;
- Add bookmark icon 3920 that when activated (e.g., by a finger tap on the icon) initiates display of a UI for adding bookmarks (e.g., UI 3900F, FIG. 39F, which like other UIs and pages, can be displayed in either portrait or landscape view);
- New window icon 3922 that when activated (e.g., by a finger tap on the icon) initiates display of a UI for adding new windows (e.g., web pages) to the browser (e.g., UI 3900G, FIG. 39G), and which may also indicate the number of windows (e.g., "4" in icon 3922, FIG. 39A);
- Vertical bar 3962, analogous to the vertical bars described above, for the web page 3912 or other structured document that helps a user understand what portion of the web page 3912 or other structured document is being displayed;
- Horizontal bar 3964, analogous to the horizontal bars described above, for the web page 3912 or other structured document that helps a user understand what portion of the web page 3912 or other structured document is being displayed;
- Share icon 3966 that when activated (e.g., by a finger tap on the icon) initiates display of a UI for sharing information with other users (e.g., UI 3900K, FIG. 39K);
- URL clear icon 3970 that when activated (e.g., by a finger tap on the icon) clears any input in URL entry box 3908;
- Search term entry box 3972 for inputting search terms for web searches;
- URL suggestion list 3974 that displays URLs that match the input in URL entry box 3908 (FIG. 39I), wherein activation of a suggested URL (e.g., by a finger tap on the suggested URL) initiates retrieval of the corresponding web page;
- URL input keyboard 3976 (FIGS. 39I and 39M) with period key 398, backslash key 3980, and ".com" key 3982 that make it easier to enter common characters in URLs;
- Search term clear icon 3984 that when activated (e.g., by a finger tap on the icon) clears any input in search term entry box 3972;
- Email link icon 3986 that when activated (e.g., by a finger tap or other gesture on the icon) prepares an email that contains a link to be shared with one or more other users;
- Email content icon 3988 that when activated (e.g., by a finger tap or other gesture on the icon) prepares an email that contains content to be shared with one or more other users;
- IM link icon 3990 that when activated (e.g., by a finger tap or other gesture on the icon) prepares an IM that contains a link to be shared with one or more other users; and
- Cancel icon 3992 that when activated (e.g., by a finger tap or other gesture on the icon) cancels the sharing UI and displays the previous UI.

In some embodiments, in response to a predefined gesture by the user on a block 3914 (e.g., a single tap gesture or a double tap gesture), the block is enlarged and centered (or substantially centered) in the web page display. For example, in response to a single tap gesture 3923 on block 3914-5, block 3914-5 may be enlarged and centered in the display, as shown in UI 3900C, FIG. 39C. In some embodiments, the width of the block is scaled to fill the touch screen display. In some embodiments, the width of the block is scaled to fill the touch screen display with a predefined amount of padding along the sides of the display. In some embodiments, a zooming animation of the block is displayed during enlargement of the block. Similarly, in response to a single tap gesture 3925 on block 3914-2, block 3914-2 may be enlarged with a zooming animation and two-dimensionally scrolled to the center of the display (not shown).

In some embodiments, the device analyzes the render tree of the web page 3912 to determine the blocks 3914 in the web page. In some embodiments, a block 3914 corresponds to a render node that is: replaced; a block; an inline block; or an inline table.

In some embodiments, in response to the same predefined gesture by the user on a block 3914 (e.g., a single tap gesture or a double tap gesture) that is already enlarged and centered, the enlargement and/or centering is substantially or completely reversed. For example, in response to a single tap gesture 3929 (FIG. 39C) on block 3914-5, the web page image may zoom out and return to UI 3900A, FIG. 39A.

In some embodiments, in response to a predefined gesture (e.g., a single tap gesture or a double tap gesture) by the user on a block 3914 that is already enlarged but not centered, the block is centered (or substantially centered) in the web page display. For example, in response to a single tap gesture 3927 (FIG. 39C) on block 3914-4, block 3914-4 may be centered (or substantially centered) in the web page display. Similarly, in response to a single tap gesture 3935 (FIG. 39C) on block 3914-6, block 3914-6 may be centered (or substantially centered) in the web page display. Thus, for a web page display that is already enlarged, in response to a predefined gesture, the device may display in an intuitive manner a series of blocks that the user wants to view. This same gesture may initiate different actions in different contexts (e.g., (1) zooming and/or enlarging in combination with scrolling when the web page is reduced in size, UI 3900A and (2) reversing the enlargement and/or centering if the block is already centered and enlarged).

In some embodiments, in response to a multi-touch 3931 and 3933 de-pinching gesture by the user (FIG. 39C), the web page may be enlarged. Conversely, in response to a multi-touch pinching gesture by the user, the web page may be reduced.

In some embodiments, in response to a substantially vertical upward (or downward) swipe gesture by the user, the web page (or, more generally, other electronic documents) may scroll one-dimensionally upward (or downward) in the vertical direction. For example, in response to an upward swipe gesture 3937 by the user that is within a predetermined angle (e.g., 27°) of being perfectly vertical, the web page may scroll one-dimensionally upward in the vertical direction.

Conversely, in some embodiments, in response to a swipe gesture that is not within a predetermined angle (e.g., 27°) of being perfectly vertical, the web page may scroll two-dimensionally (i.e., with simultaneous movement in both the vertical and horizontal directions). For example, in response to an upward swipe gesture 3939 (FIG. 39C) by the user that is not within a predetermined angle (e.g., 27°) of being perfectly vertical, the web page may scroll two-dimensionally along the direction of the swipe 3939.

In some embodiments, in response to a multi-touch 3941 and 3943 rotation gesture by the user (FIG. 39C), the web page may be rotated exactly 90° (UI 3900D, FIG. 39D) for landscape viewing, even if the amount of rotation in the multi-touch 3941 and 3943 rotation gesture is substantially different from 90°. Similarly, in response to a multi-touch 3945 and 3947 rotation gesture by the user (UI 3900D, FIG. 39D), the web page may be rotated exactly 90° for portrait viewing, even if the amount of rotation in the multi-touch 3945 and 3947 rotation gesture is substantially different from 90°.

Thus, in response to imprecise gestures by the user, precise movements of graphics occur. The device behaves in the manner desired by the user despite inaccurate input by the user. Also, note that the gestures described for UI 3900C, which has a portrait view, are also applicable to UIs with a landscape view (e.g., UI 3900D, FIG. 3900D) so that the user can choose whichever view the user prefers for web browsing.

In some embodiments, a portable electronic device with a touch screen display (e.g., device 100) displays at least a portion of a structured electronic document on the touch screen display. The structured electronic document comprises a plurality of boxes of content (e.g., blocks 3914, FIG. 39A).

In some embodiments, the plurality of boxes are defined by a style sheet language. In some embodiments, the style sheet language is a cascading style sheet language. In some embodiments, the structured electronic document is a web page (e.g., web page 3912, FIG. 39A). In some embodiments, the structured electronic document is an HTML or XML document.

In some embodiments, displaying at least a portion of the structured electronic document comprises scaling the document width to fit within the touch screen display width independent of the document length.

Figure 39A:
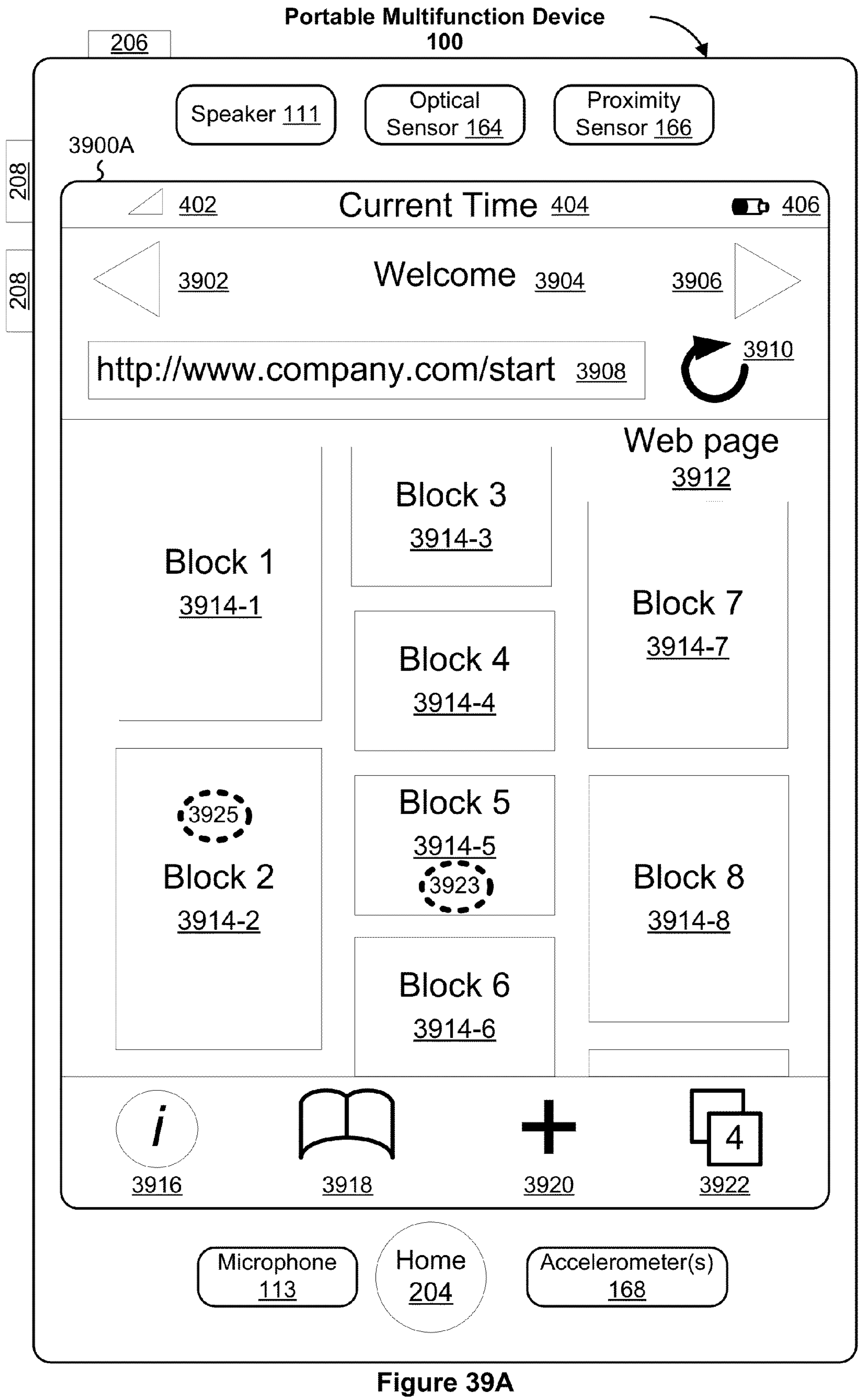
FIGS. 39A-39M illustrate exemplary user interfaces for a browser in accordance with some embodiments.
Figure 39B:
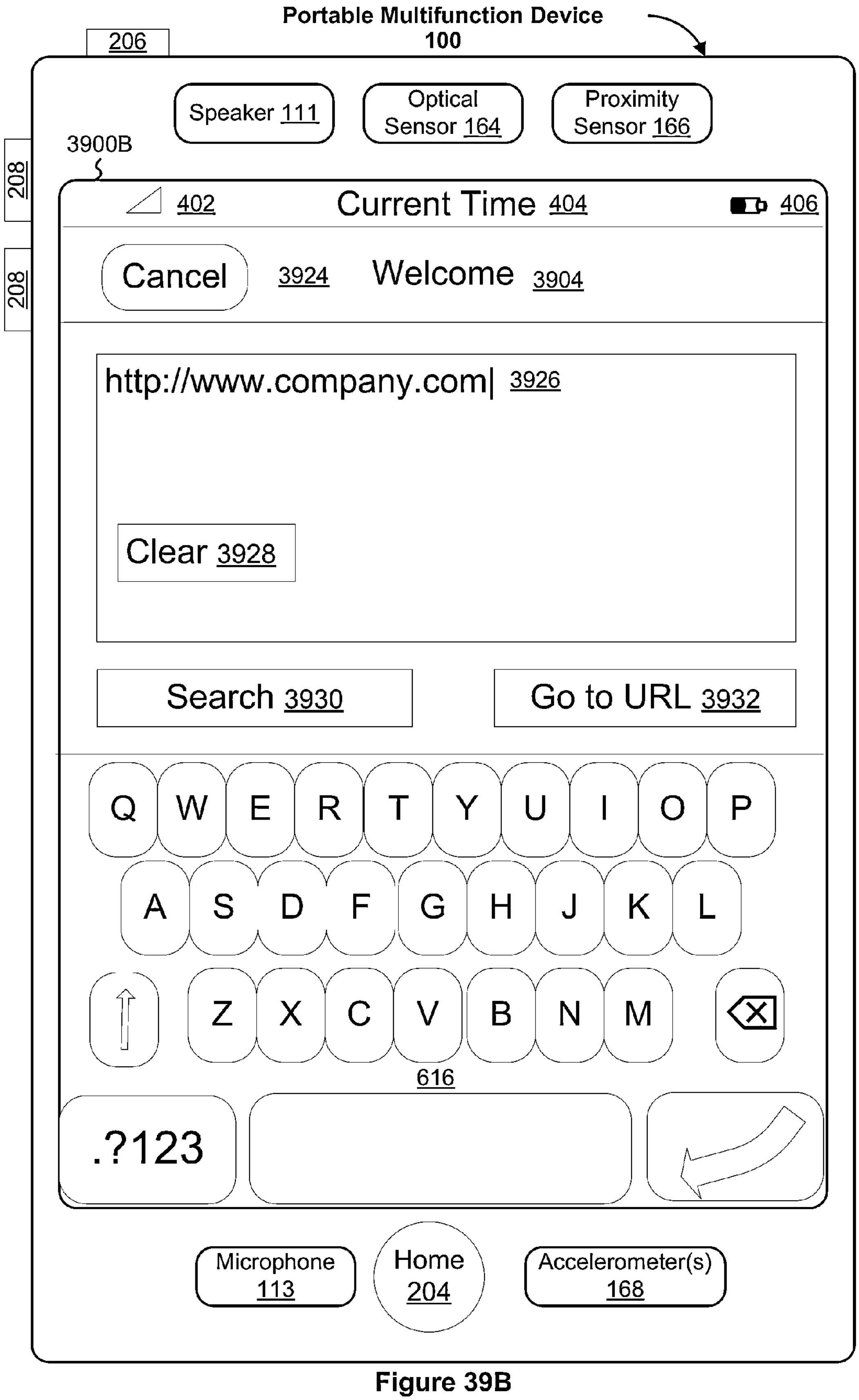
Figure 39C:
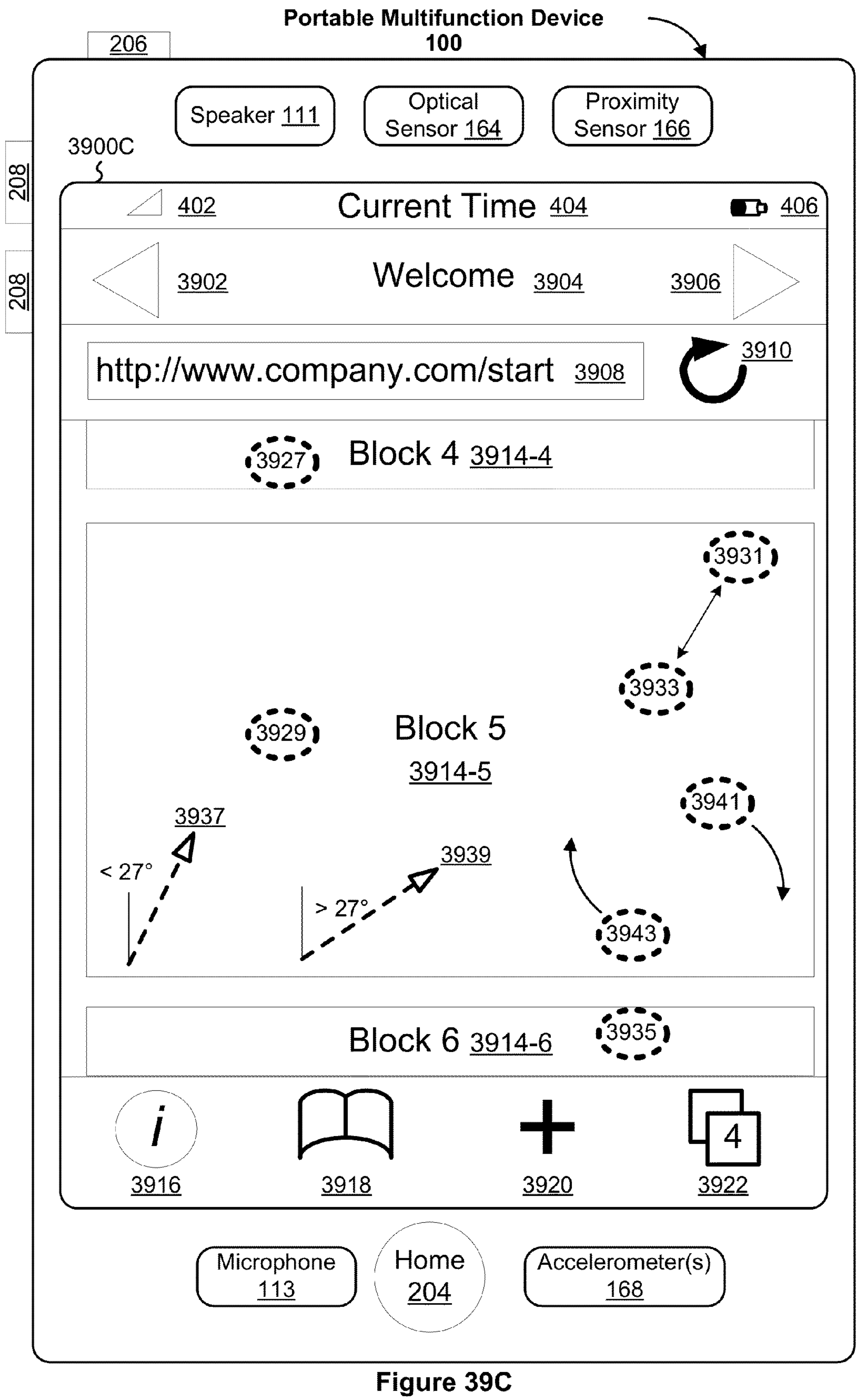
Figure 39D:
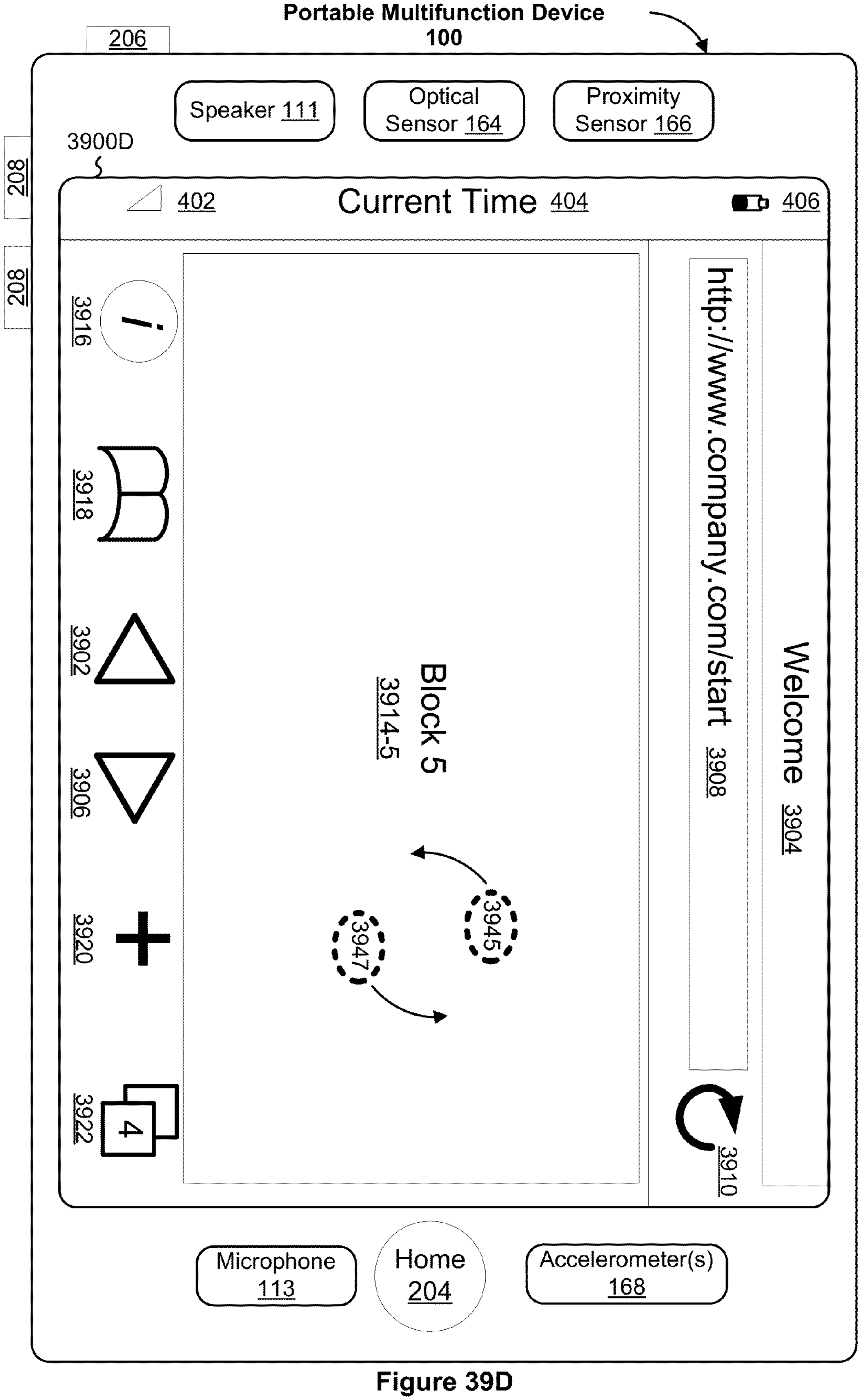

In some embodiments, the touch screen display is rectangular with a short axis and a long axis; the display width corresponds to the short axis when the structured electronic document is seen in portrait view (e.g., FIG. 39C); and the display width corresponds to the long axis when the structured electronic document is seen in landscape view (e.g., FIG. 39D).

In some embodiments, prior to displaying at least a portion of a structured electronic document, borders, margins, and/or paddings are determined for the plurality of boxes and adjusted for display on the touch screen display. In some embodiments, all boxes in the plurality of boxes are adjusted. In some embodiments, just the first box is adjusted. In some embodiments, just the first box and boxes adjacent to the first box are adjusted.

A first gesture is detected at a location on the displayed portion of the structured electronic document (e.g., gesture 3923, FIG. 39A). In some embodiments, the first gesture is a finger gesture. In some embodiments, the first gesture is a stylus gesture.

In some embodiments, the first gesture is a tap gesture. In some embodiments, the first gesture is a double tap with a single finger, a double tap with two fingers, a single tap with a single finger, or a single tap with two fingers.

A first box (e.g., Block 5 3914-5, FIG. 39A) in the plurality of boxes is determined at the location of the first gesture. In some embodiments, the structured electronic document has an associated render tree with a plurality of nodes and determining the first box at the location of the first gesture comprises: traversing down the render tree to determine a first node in the plurality of nodes that corresponds to the detected location of the first gesture; traversing up the render tree from the first node to a closest parent node that contains a logical grouping of content; and identifying content corresponding to the closest parent node as the first box. In some embodiments, the logical grouping of content comprises a paragraph, an image, a plugin object, or a table. In some embodiments, the closest parent node is a replaced inline, a block, an inline block, or an inline table.

The first box is enlarged and substantially centered on the touch screen display (e.g., Block 5 3914-5, FIG. 39C). In some embodiments, enlarging and substantially centering comprises simultaneously zooming and translating the first box on the touch screen display. In some embodiments, enlarging comprises expanding the first box so that the width of the first box is substantially the same as the width of the touch screen display.

In some embodiments, text in the enlarged first box is resized to meet or exceed a predetermined minimum text size on the touch screen display. In some embodiments, the text resizing comprises: determining a scale factor by which the first box will be enlarged; dividing the predetermined minimum text size on the touch screen display by the scaling factor to determine a minimum text size for text in the first box; and if a text size for text in the first box is less than the determined minimum text size, increasing the text size for text in the first box to at least the determined minimum text size. In some embodiments, the first box has a width; the display has a display width; and the scale factor is the display width divided by the width of the first box prior to enlarging. In some embodiments, the resizing occurs during the enlarging. In some embodiments, the resizing occurs after the enlarging.

In some embodiments, text in the structured electronic document is resized to meet or exceed a predetermined minimum text size on the touch screen display. In some embodiments, the text resizing comprises: determining a scale factor by which the first box will be enlarged; dividing the predetermined minimum text size on the touch screen display by the scaling factor to determine a minimum text size for text in the structured electronic document; and if a text size for text in the structured electronic document is less than the determined minimum text size, increasing the text size for text in the structured electronic document to at least the determined minimum text size. In some embodiments, the text resizing comprises: identifying boxes containing text in the plurality of boxes; determining a scale factor by which the first box will be enlarged; dividing the predetermined minimum text size on the touch screen display by the scaling factor to determine a minimum text size for text in the structured electronic document; and for each identified box containing text, if a text size for text in the identified box is less than the determined minimum text size, increasing the text size for text in the identified box to at least the determined minimum text size and adjusting the size of the identified box.

In some embodiments, a second gesture (e.g., gesture 3929, FIG. 39C) is detected on the enlarged first box. In response to detecting the second gesture, the displayed portion of the structured electronic document is reduced in size. In some embodiments, the first box returns to its size prior to being enlarged.

In some embodiments, the second gesture and the first gesture are the same type of gesture. In some embodiments, the second gesture is a finger gesture. In some embodiments, the second gesture is a stylus gesture.

In some embodiments, the second gesture is a tap gesture. In some embodiments, the second gesture is a double tap with a single finger, a double tap with two fingers, a single tap with a single finger, or a single tap with two fingers.

In some embodiments, while the first box is enlarged, a third gesture (e.g., gesture 3927 or gesture 3935, FIG. 39C) is detected on a second box other than the first box. In response to detecting the third gesture, the second box is substantially centered on the touch screen display. In some embodiments, the third gesture and the first gesture are the same type of gesture. In some embodiments, the third gesture is a finger gesture. In some embodiments, the third gesture is a stylus gesture.

In some embodiments, the third gesture is a tap gesture. In some embodiments, the third gesture is a double tap with a single finger, a double tap with two fingers, a single tap with a single finger, or a single tap with two fingers.

In some embodiments, a swipe gesture (e.g., gesture 3937 or gesture 3939, FIG. 39C) is detected on the touch screen display. In response to detecting the swipe gesture, the displayed portion of the structured electronic document is translated on the touch screen display. In some embodiments, the translating comprises vertical, horizontal, or diagonal movement of the structured electronic document on the touch screen display. In some embodiments, the swipe gesture is a finger gesture. In some embodiments, the swipe gesture is a stylus gesture.

In some embodiments, a fifth gesture (e.g., multi-touch gesture 3941/3943, FIG. 39C) is detected on the touch screen display. In response to detecting the fifth gesture, the displayed portion of the structured electronic document is rotated on the touch screen display by 90°. In some embodiments, the fifth gesture is a finger gesture. In some embodiments, the fifth gesture is a multifinger gesture. In some embodiments, the fifth gesture is a twisting multifinger gesture.

In some embodiments, a change in orientation of the device is detected. In response to detecting the change in orientation of the device, the displayed portion of the structured electronic document is rotated on the touch screen display by 90°.

In some embodiments, a multi-finger de-pinch gesture (e.g., multi-touch gesture 3931/3933, FIG. 39C) is detected on the touch screen display. In response to detecting the multi-finger de-pinch gesture, a portion of the displayed portion of the structured electronic document is enlarged on the touch screen display in accordance with a position of the multi-finger de-pinch gesture and an amount of finger movement in the multi-finger de-pinch gesture.

A graphical user interface (e.g., UI 3900A, FIG. 39A) on a portable electronic device with a touch screen display comprises at least a portion of a structured electronic document (e.g., web page 3912, FIG. 39A). The structured electronic document comprises a plurality of boxes of content (e.g., blocks 3914, FIG. 39A). In response to detecting a first gesture (e.g., gesture 3923, FIG. 39A) at a location on the portion of the structured electronic document, a first box (e.g., Block 5 3914-5, FIG. 39A) in the plurality of boxes at the location of the first gesture is determined and the first box is enlarged and substantially centered on the touch screen display (e.g., Block 5 3914-5, FIG. 39C).

Additional description of displaying structured electronic documents (e.g., web pages) can be found in U.S. Provisional Patent Application No. 60/946,715, "Portable Electronic Device, Method, and Graphical User Interface for Displaying Structured Electronic Documents," filed Jun. 27, 2007, the content of which is hereby incorporated by reference.

In some embodiments, if a link in a web page in the browser 147 is activated that corresponds to an online video (e.g., a YouTube video), the corresponding online video is shown in the online video application 155, rather than in the browser 147. Similarly, in some embodiment, if a URL is input in the browser 147 that corresponds to an online video (e.g., a YouTube video), the corresponding online video is shown in the online video application 155, rather than in the browser 147. Redirecting the online video URL to the online video application 155 provides an improved viewing experience because the user does not need to navigate on a web page that includes the requested online video.

In some embodiments, if a link in a web page in the browser 147 is activated that corresponds to an online map request (e.g., a Google map request), the corresponding map is shown in the map application 154, rather than in the browser 147. Similarly, in some embodiment, if a URL is input in the browser 147 that corresponds to an online map request (e.g., a Google map request), the corresponding map is shown in the map application 154, rather than in the browser 147. Redirecting the map request URL to the map application 154 provides an improved viewing experience because the user does not need to navigate on a web page that includes the requested map.

Figure 39E:
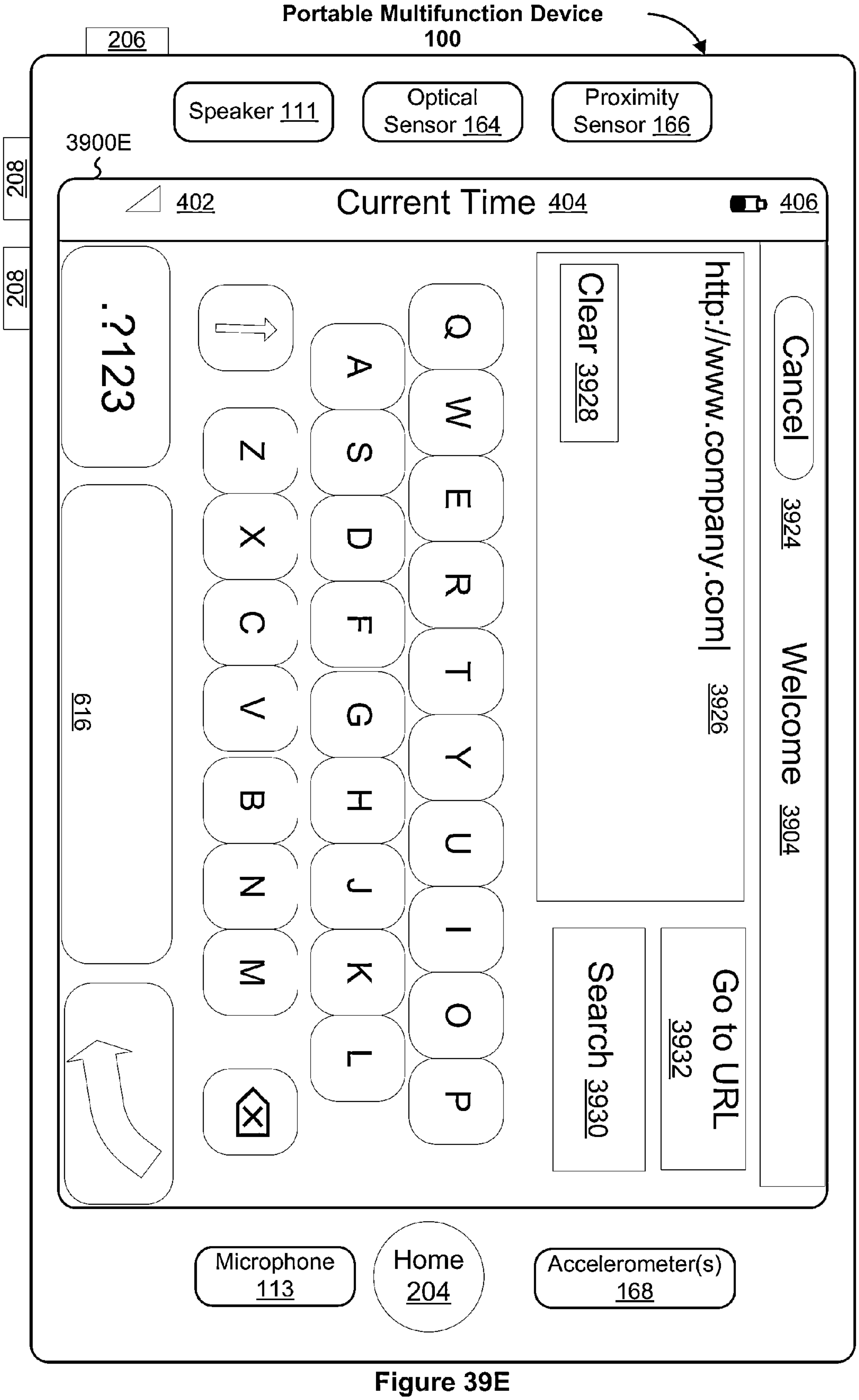
Figure 39F:
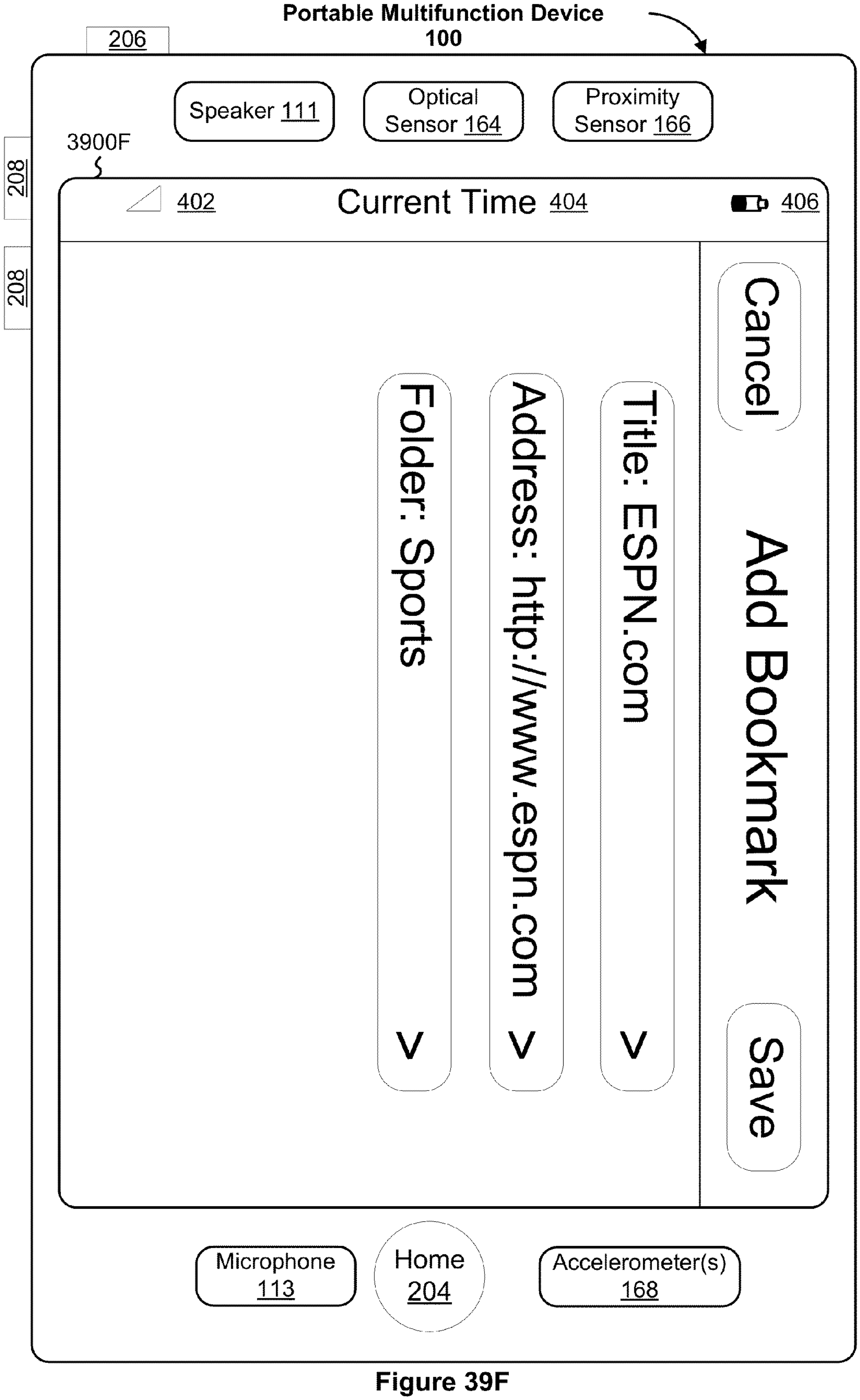
Figure 39G:
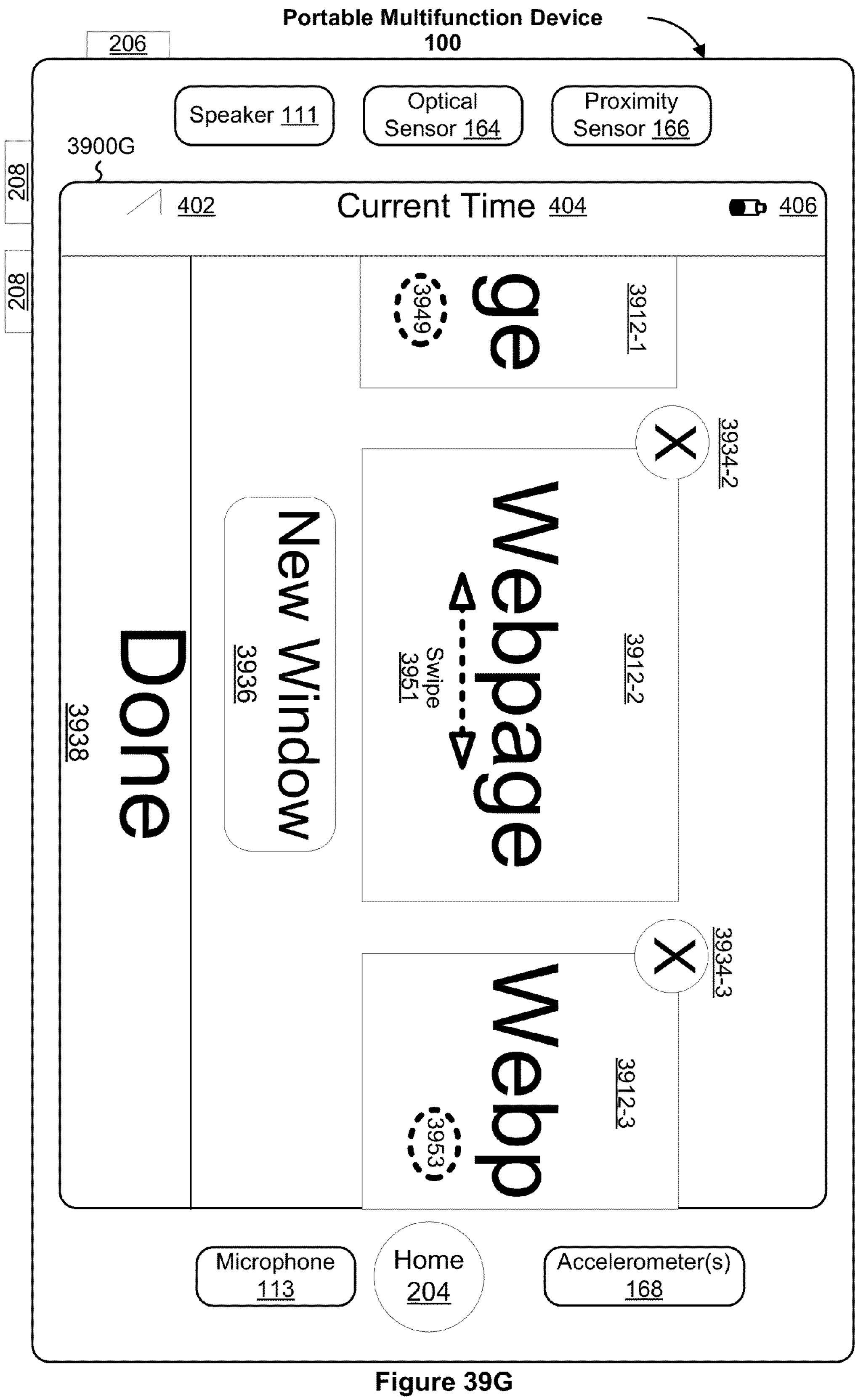
Figure 39H:
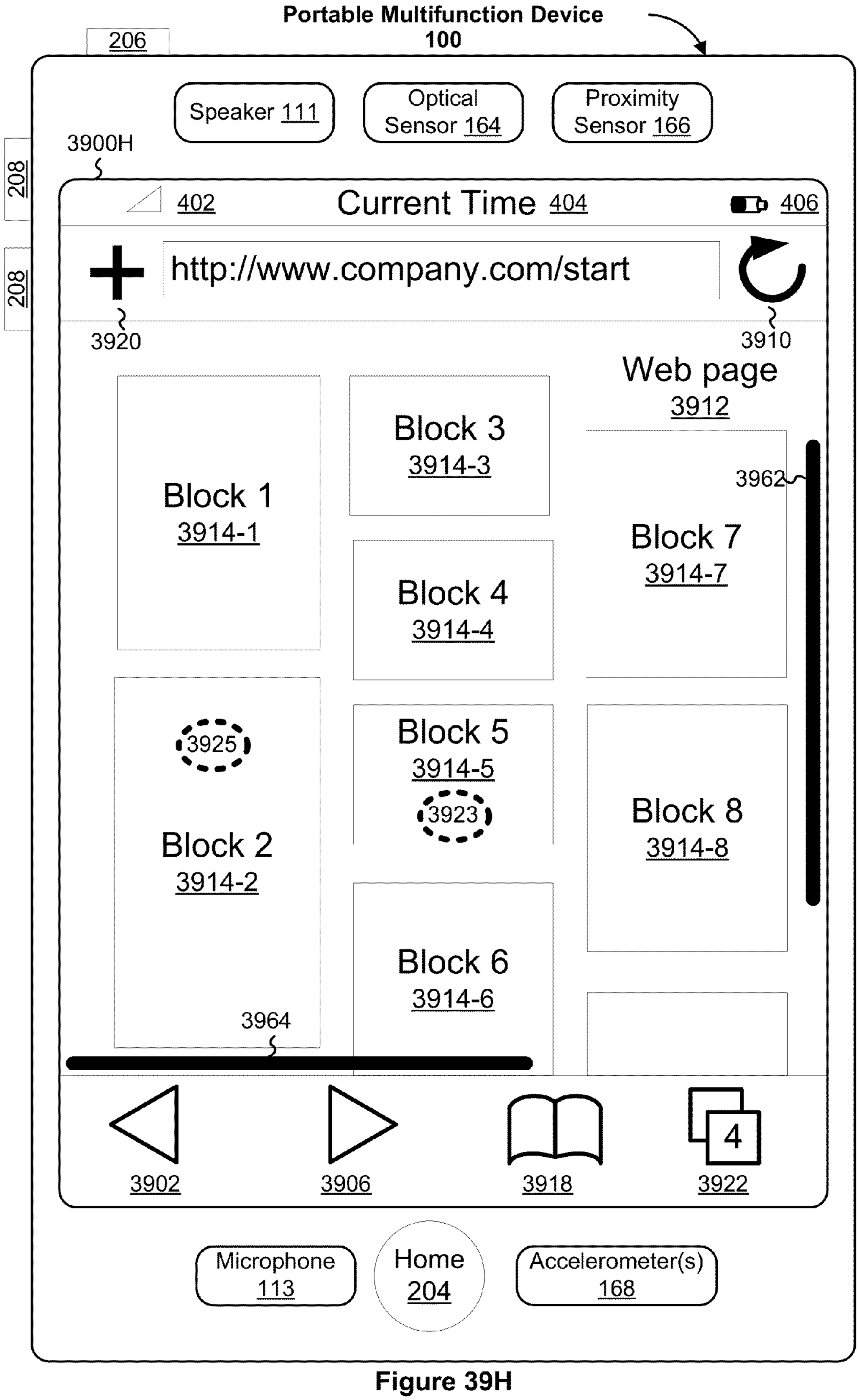
Figure 39I:
Figure 39J:
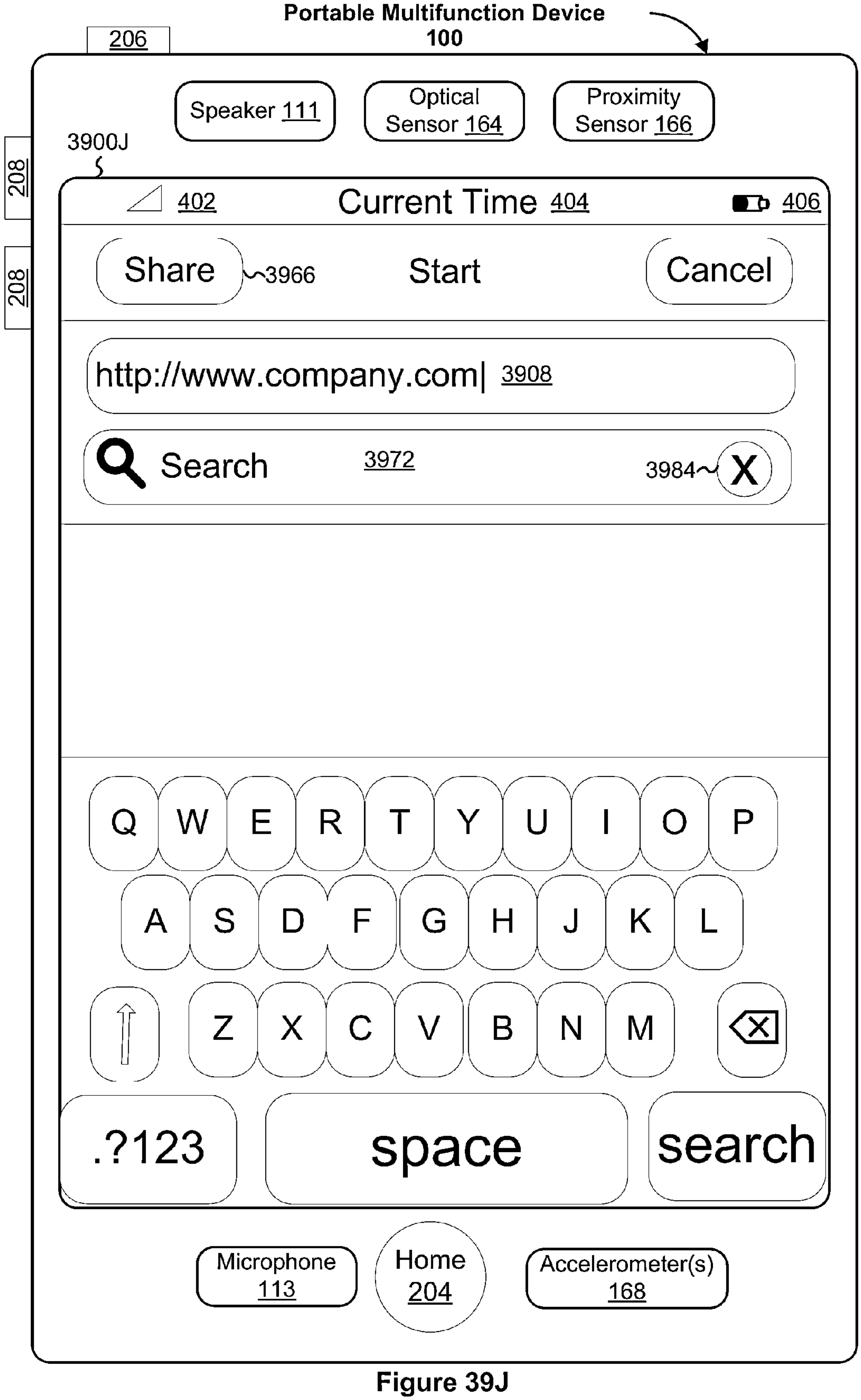
Figure 39K:
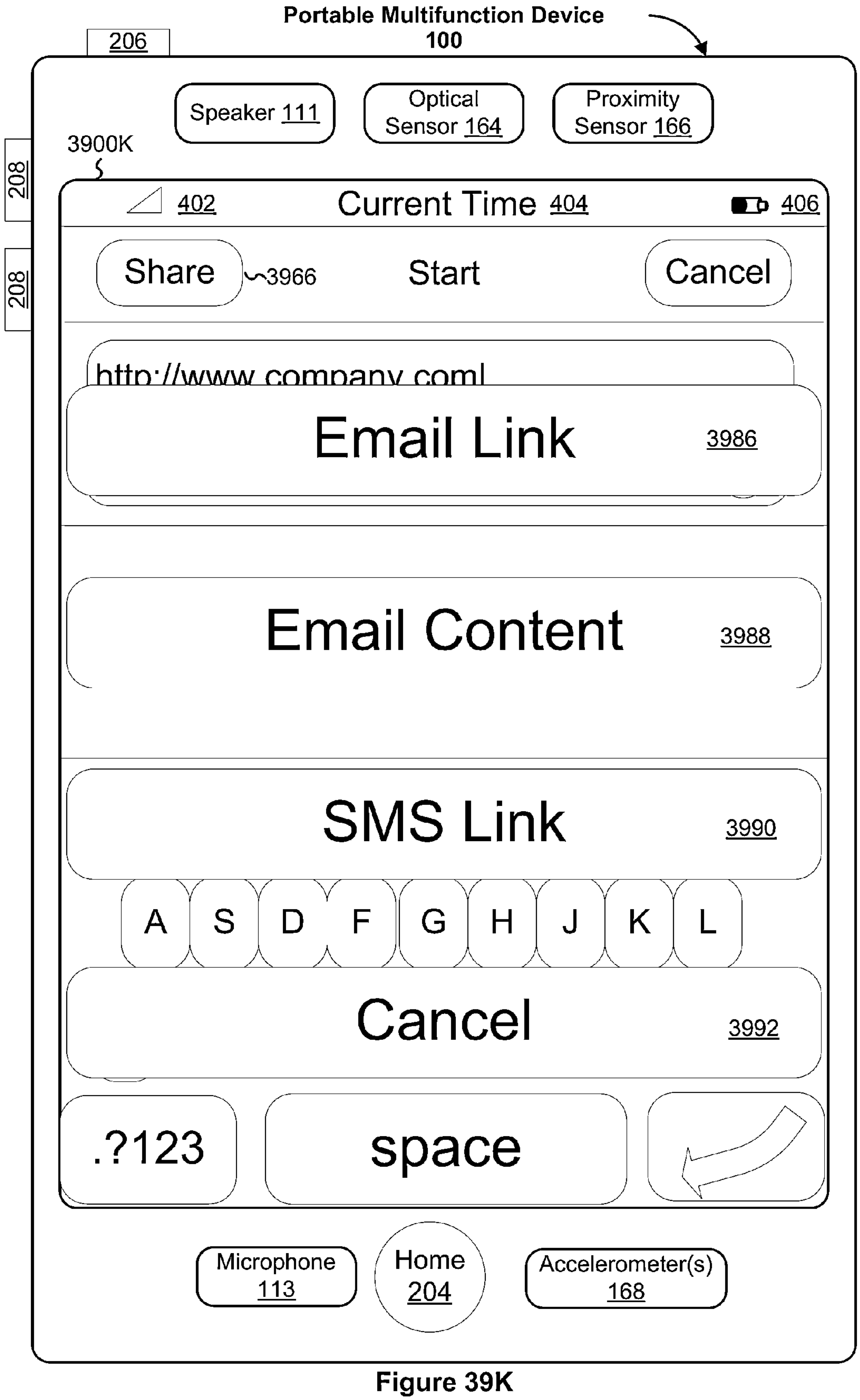
Figure 39L:
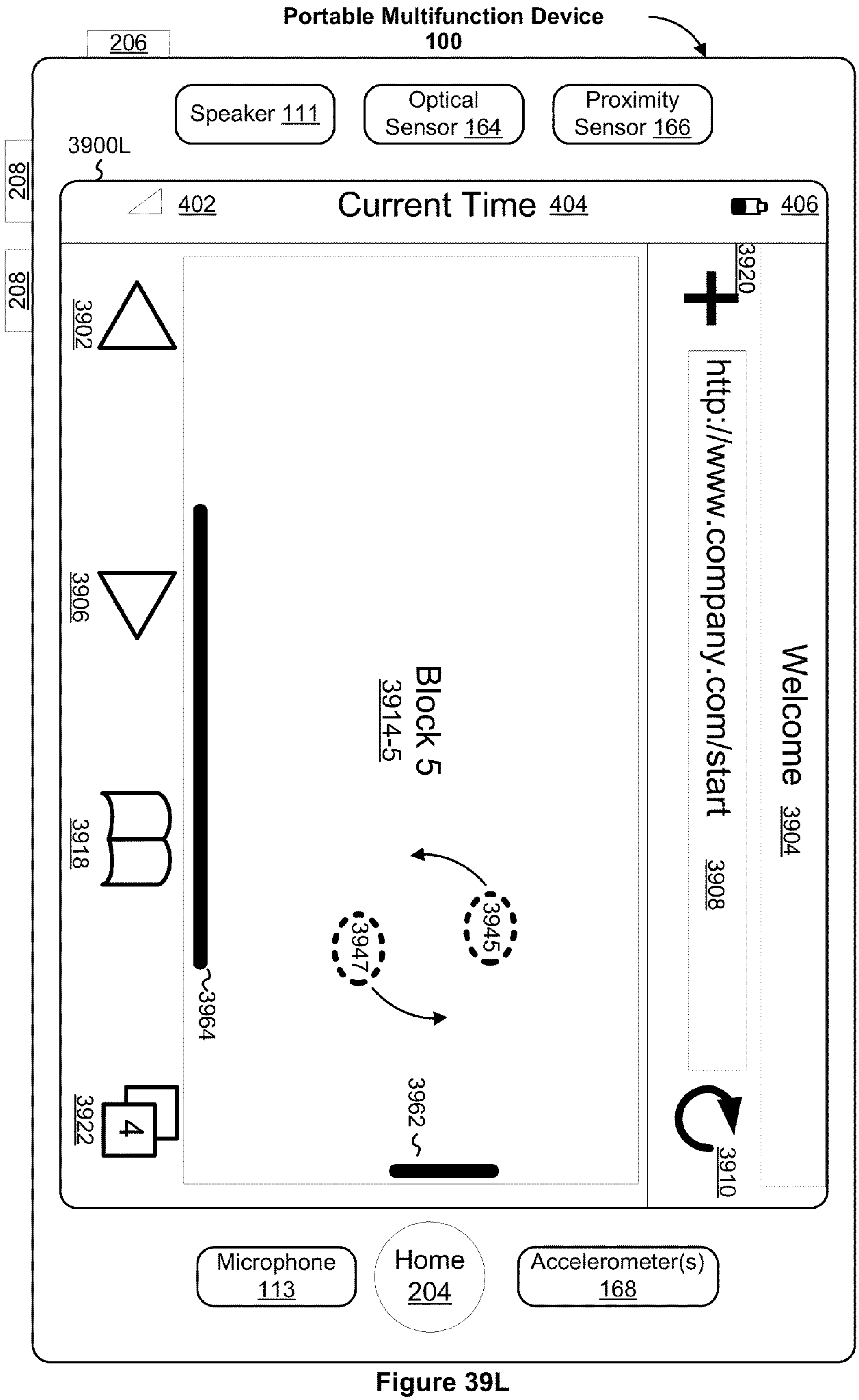
Figure 39M:
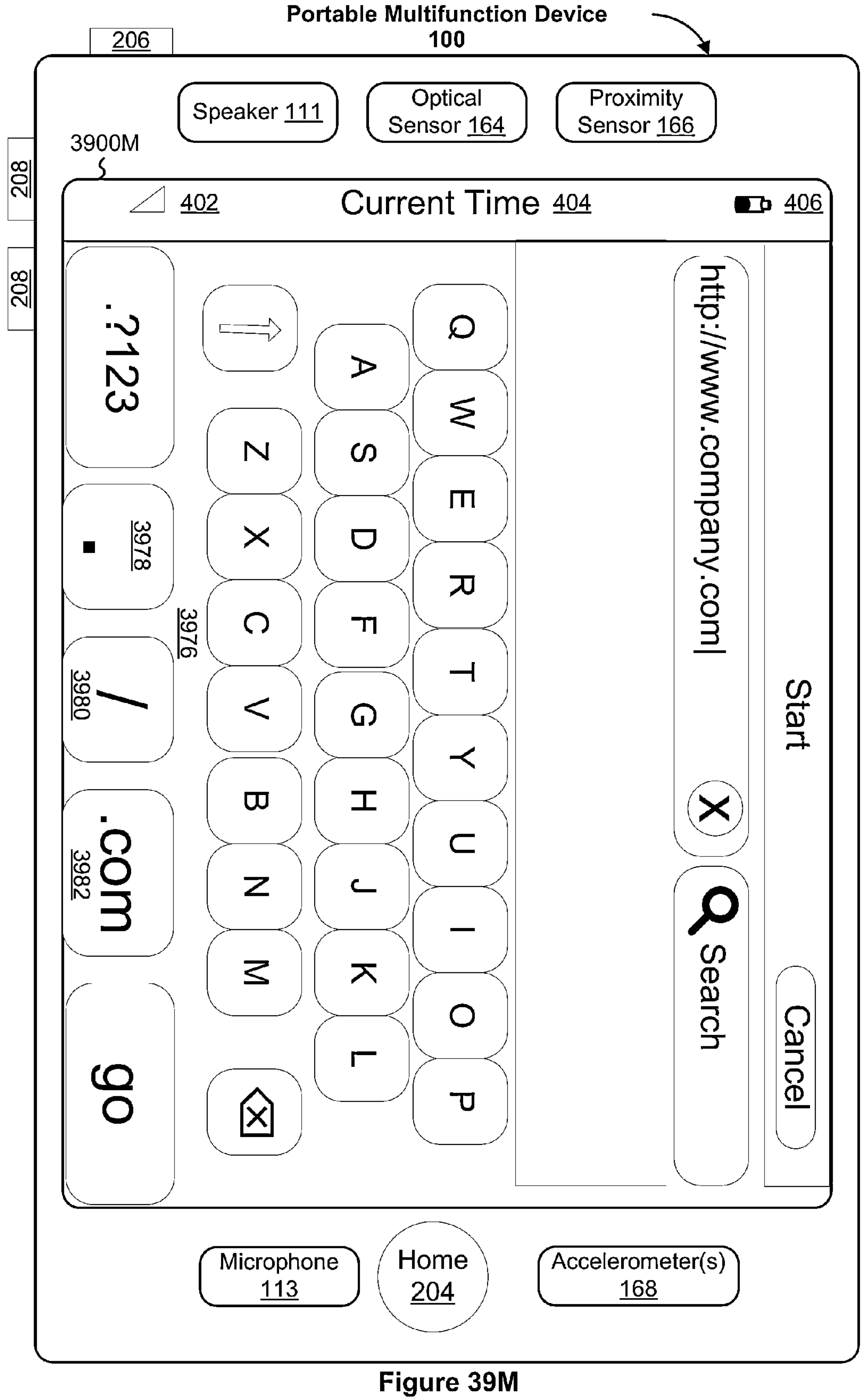

In some embodiments, in response to a tap or other predefined user gesture on URL entry box 3908, the touch screen displays an enlarged entry box 3926 and a keyboard 616 (e.g., UI 3900B, FIG. 3900B in portrait viewing and UI 3900E, FIG. 39E in landscape viewing). In some embodiments, the touch screen also displays:

Contextual clear icon 3928 that when activated (e.g., by a finger tap on the icon) initiates deletion of all text in entry box 3926;

a search icon 3930 that when activated (e.g., by a finger tap on the icon) initiates an Internet search using the search terms input in box 3926; and Go to URL icon 3932 that when activated (e.g., by a finger tap on the icon) initiates acquisition of the web page with the URL input in box 3926;

Thus, the same entry box 3926 may be used for inputting both search terms and URLs. In some embodiments, whether or not clear icon 3928 is displayed depends on the context.

UI 3900G (FIG. 39G) is a UI for adding new windows to an application, such as the browser 147. UI 3900G displays an application (e.g., the browser 147), which includes a displayed window (e.g., web page 3912-2) and at least one hidden window (e.g., web pages 3912-1 and 3934-3 and possibly other web pages that are completely hidden off-screen). UI 3900G also displays an icon for adding windows to the application (e.g., new window or new page icon 3936). In response to detecting activation of the icon 3936 for adding windows, the browser adds a window to the application (e.g., a new window for a new web page 3912).

In response to detecting a gesture on the touch screen display, a displayed window in the application is moved off the display and a hidden window is moved onto the display. For example, in response to detecting a tap gesture 3949 on the left side of the screen, the window with web page 3912-2 is moved partially or fully off-screen to the right, the window with web page 3912-3 is moved completely off-screen, partially hidden window with web page 3912-1 is moved to the center of the display, and another completely hidden window with a web page (e.g., 3912-0) may be moved partially onto the display. Alternatively, detection of a left-to-right swipe gesture 3951 may achieve the same effect.

Conversely, in response to detecting a tap gesture 3953 on the right side of the screen, the window with web page 3912-2 is moved partially or fully off-screen to the left, the window with web page 3912-1 is moved completely off-screen, partially hidden window with web page 3912-3 is moved to the center of the display, and another completely hidden window with a web page (e.g., 3912-4) may be moved partially onto the display. Alternatively, detection of a right-to-left swipe gesture 3951 may achieve the same effect.

In some embodiments, in response to a tap or other predefined gesture on a delete icon 3934, the corresponding window 3912 is deleted. In some embodiments, in response to a tap or other predefined gesture on Done icon 3938, the window in the center of the display (e.g., 3912-2) is enlarged to fill the screen.

Additional description of adding windows to an application can be found in U.S. patent application Ser. No. 11/620,647, "Method, System, And Graphical User Interface For Viewing Multiple Application Windows," filed Jan. 5, 2007, the content of which is hereby incorporated by reference.

FIGS. 40A-40F illustrate exemplary user interfaces for playing an item of inline multimedia content in accordance with some embodiments.

Figure 40A:
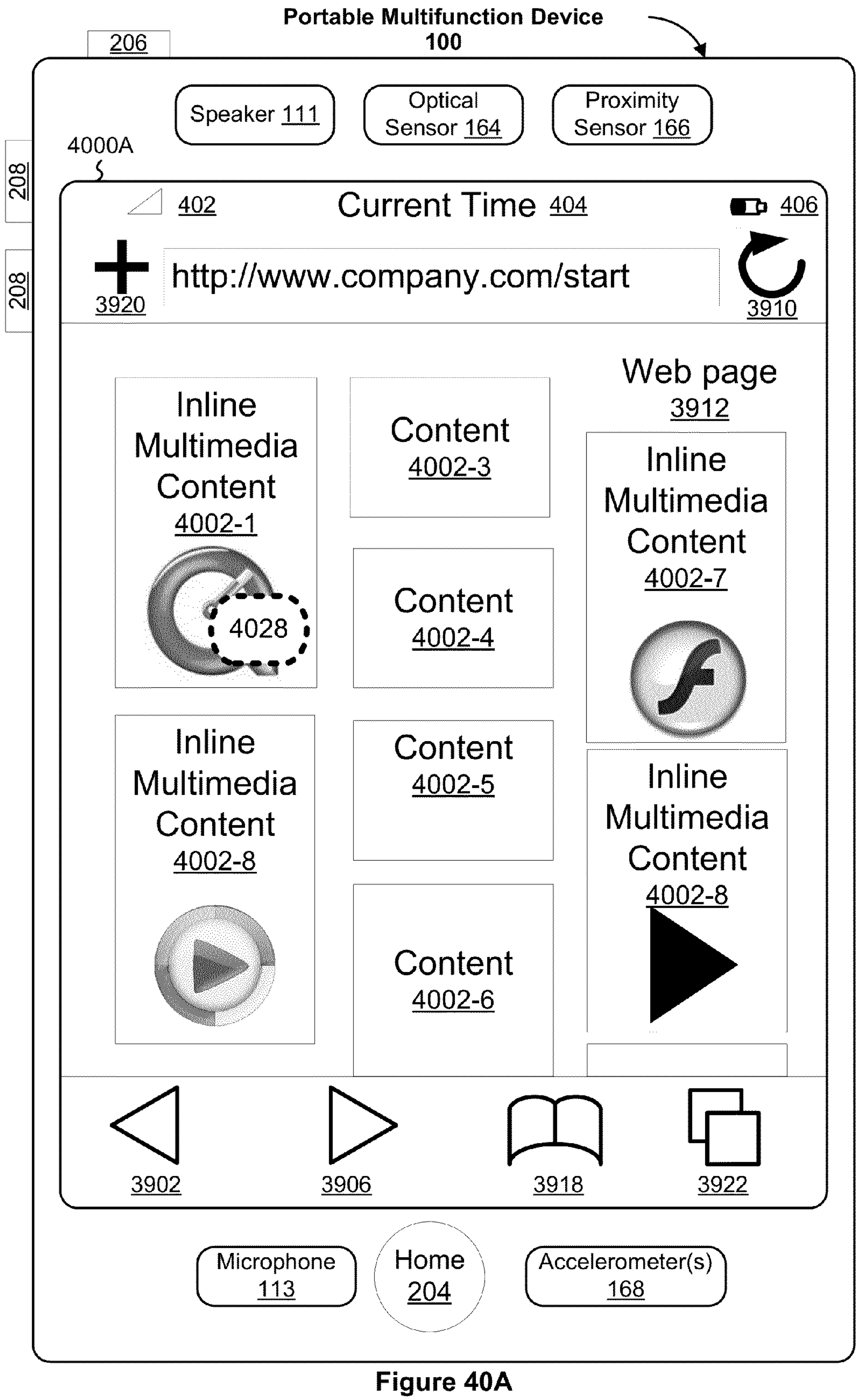
FIGS. 40A-40F illustrate exemplary user interfaces for playing an item of inline multimedia content in accordance with some embodiments.

In some embodiments, user interfaces 4000A-4000F include the following elements, or a subset or superset thereof:

402, 404, 406, 3902, 3906, 3910, 3912, 3918, 3920, 3922, as described above;

inline multimedia content 4002, such as QuickTime content (4002-1), Windows Media content (4002-2), or Flash content (4002-3);

other types of content 4004 in the structured document, such as text;

Exit icon 4006 that when activated (e.g., by a finger tap on the icon) initiates exiting the inline multimedia content player UI (e.g., UI 4000B or 4000F) and returning to another UI (e.g., UI 4000A, FIG. 40A);

Lapsed time 4008 that shows how much of the inline multimedia content 4002 has been played, in units of time;

Progress bar 4010 that indicates what fraction of the inline multimedia content 4002 has been played and that may be used to help scroll through the inline multimedia content in response to a user gesture;

Remaining time 4012 that shows how much of the inline multimedia content 4002 remains to be played, in units of time;

Downloading icon 4014 that indicates when inline multimedia content 4002 is being downloaded or streamed to the device;

Fast Reverse/Skip Backwards icon 4016 that when activated (e.g., by a finger tap on the icon) initiates reversing or skipping backwards through the inline multimedia content 4002;

Play icon 4018 that when activated (e.g., by a finger tap 4026 (FIG. 40C) on the icon) initiates playing the inline multimedia content 4002, either from the beginning or from where the inline multimedia content was paused;

Fast Forward/Skip Forward icon 4020 that initiates forwarding or skipping forwards through the inline multimedia content 4002;

Volume adjustment slider icon 4022 that that when activated (e.g., by a finger tap on the icon) initiates adjustment of the volume of the inline multimedia content 4002; and Pause icon 4024 that when activated (e.g., by a finger tap on the icon) initiates pausing the inline multimedia content 4002.

In some embodiments, a portable electronic device (e.g., 100) displays at least a portion of a structured electronic document on a touch screen display. The structured electronic document comprises content (e.g., 4002 and 4004). In some embodiments, the structured electronic document is a web page (e.g. 3912). In some embodiments, the structured electronic document is an HTML or XML document.

A first gesture (e.g., 4028, FIG. 40A) is detected on an item of inline multimedia content (e.g., 4002-1, FIG. 40A) in the displayed portion of the structured electronic document. In some embodiments, the inline multimedia content comprises video and/or audio content. In some embodiments, the content can be played with a QuickTime, Windows Media, or Flash plugin.

Figure 40B:
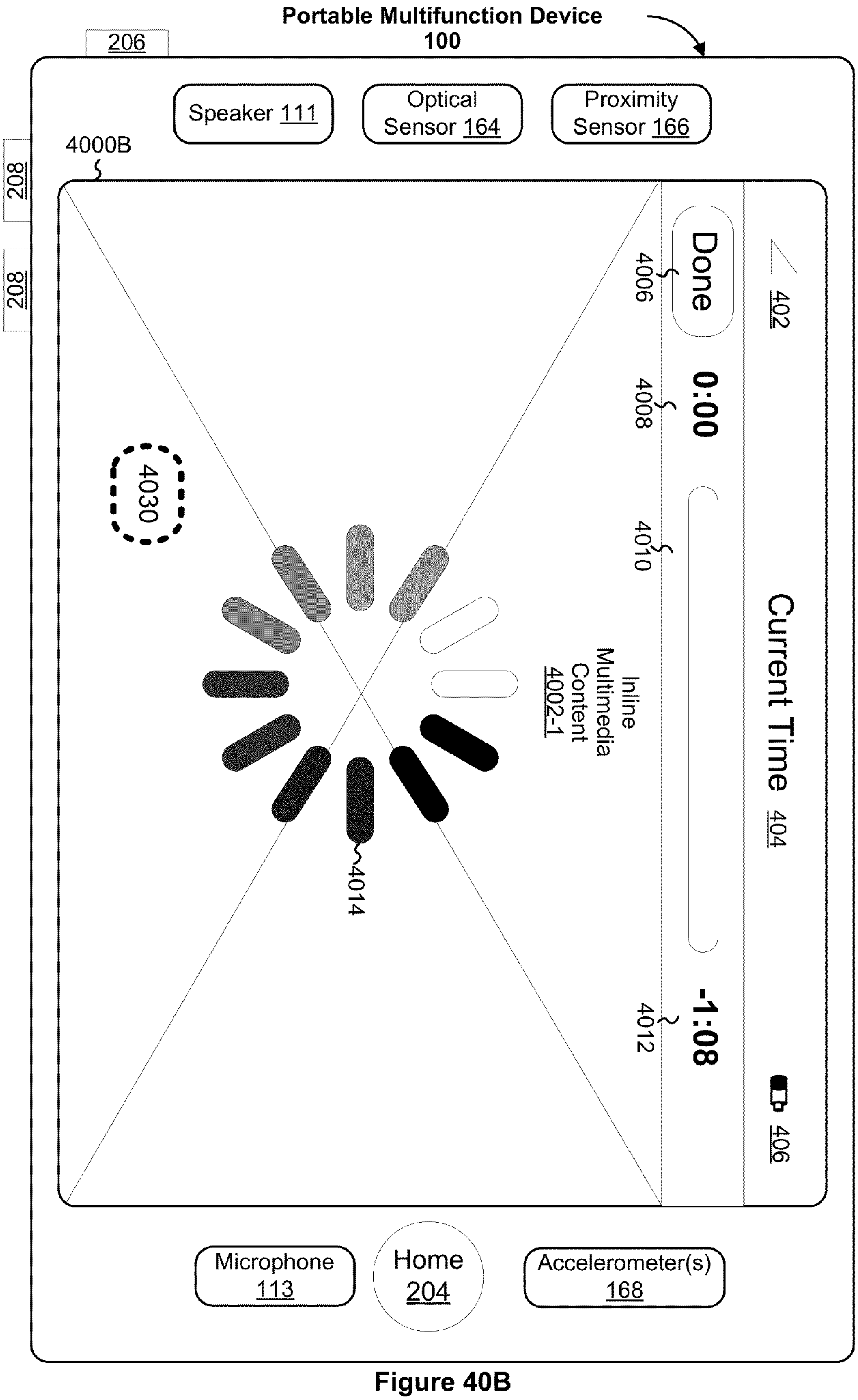
Figure 40C:
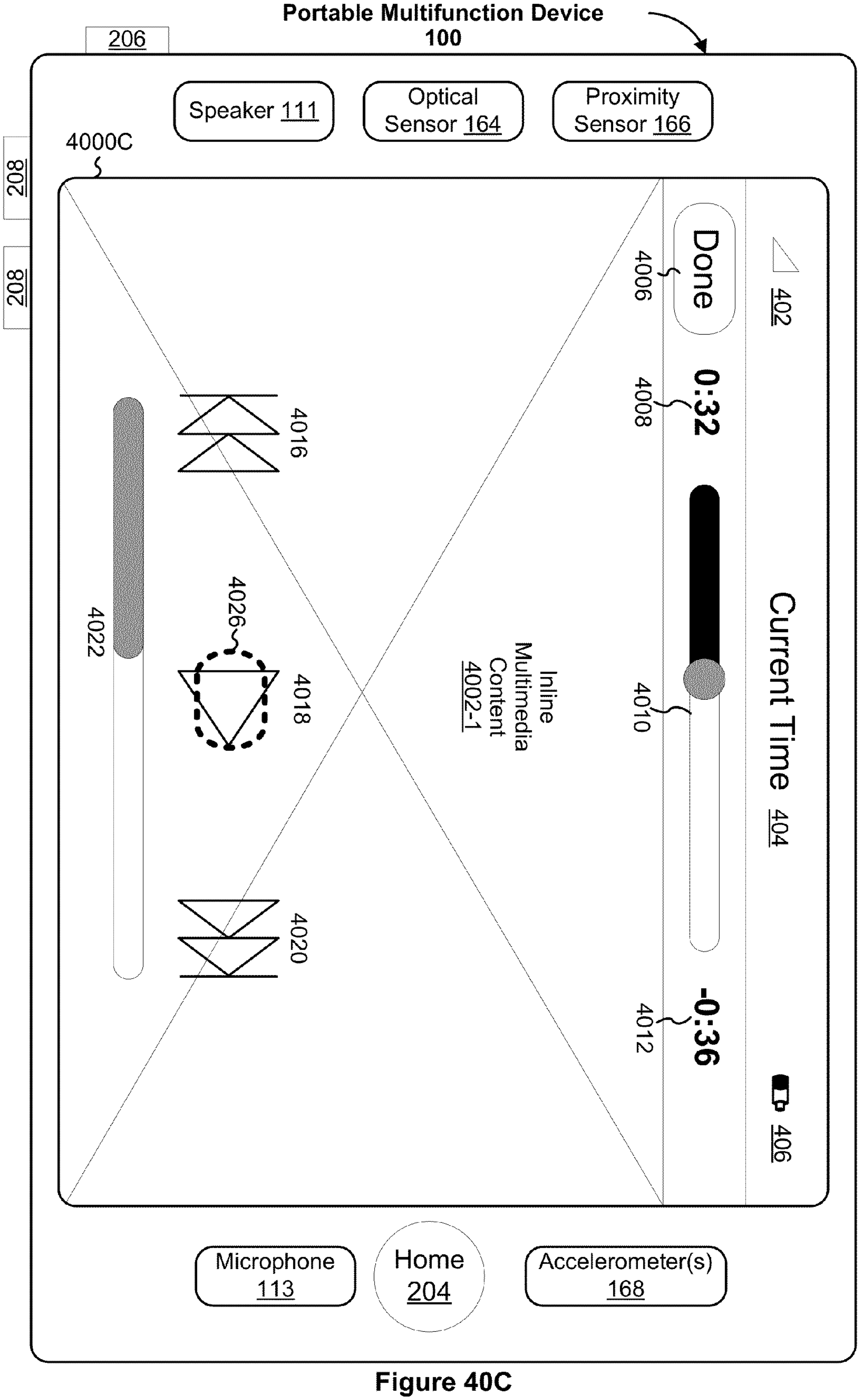
Figure 40D:
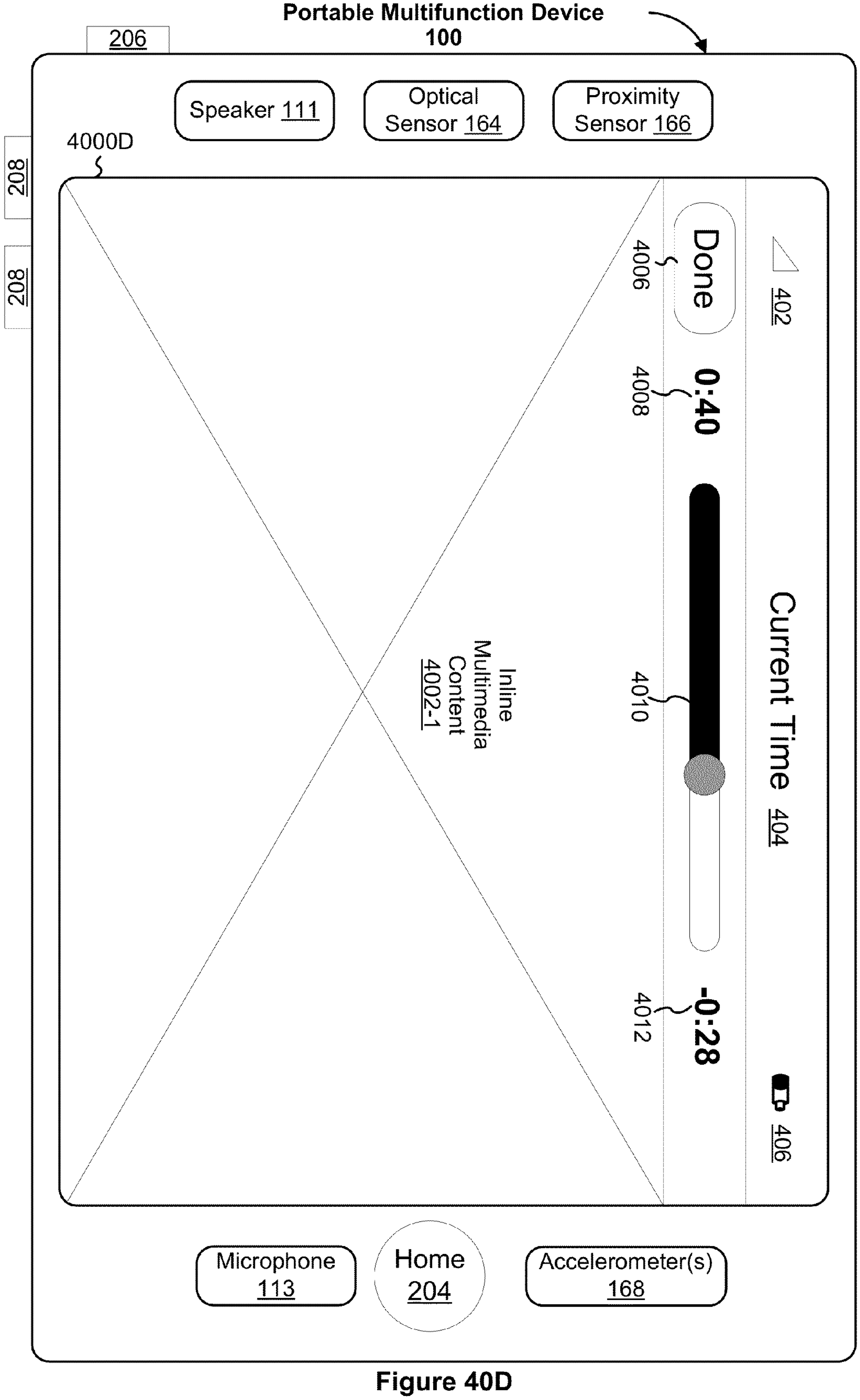
Figure 40E:
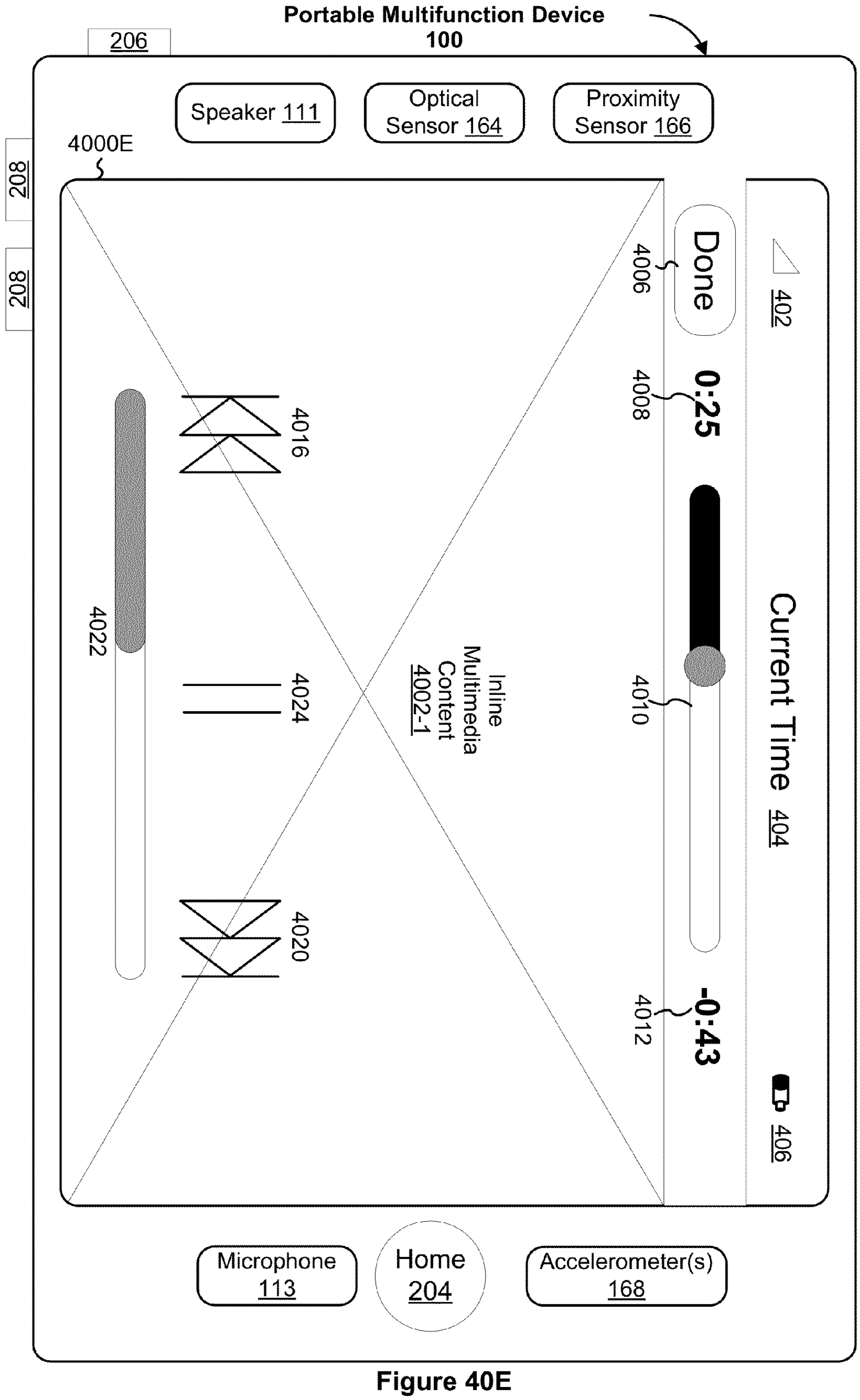
Figure 40F:
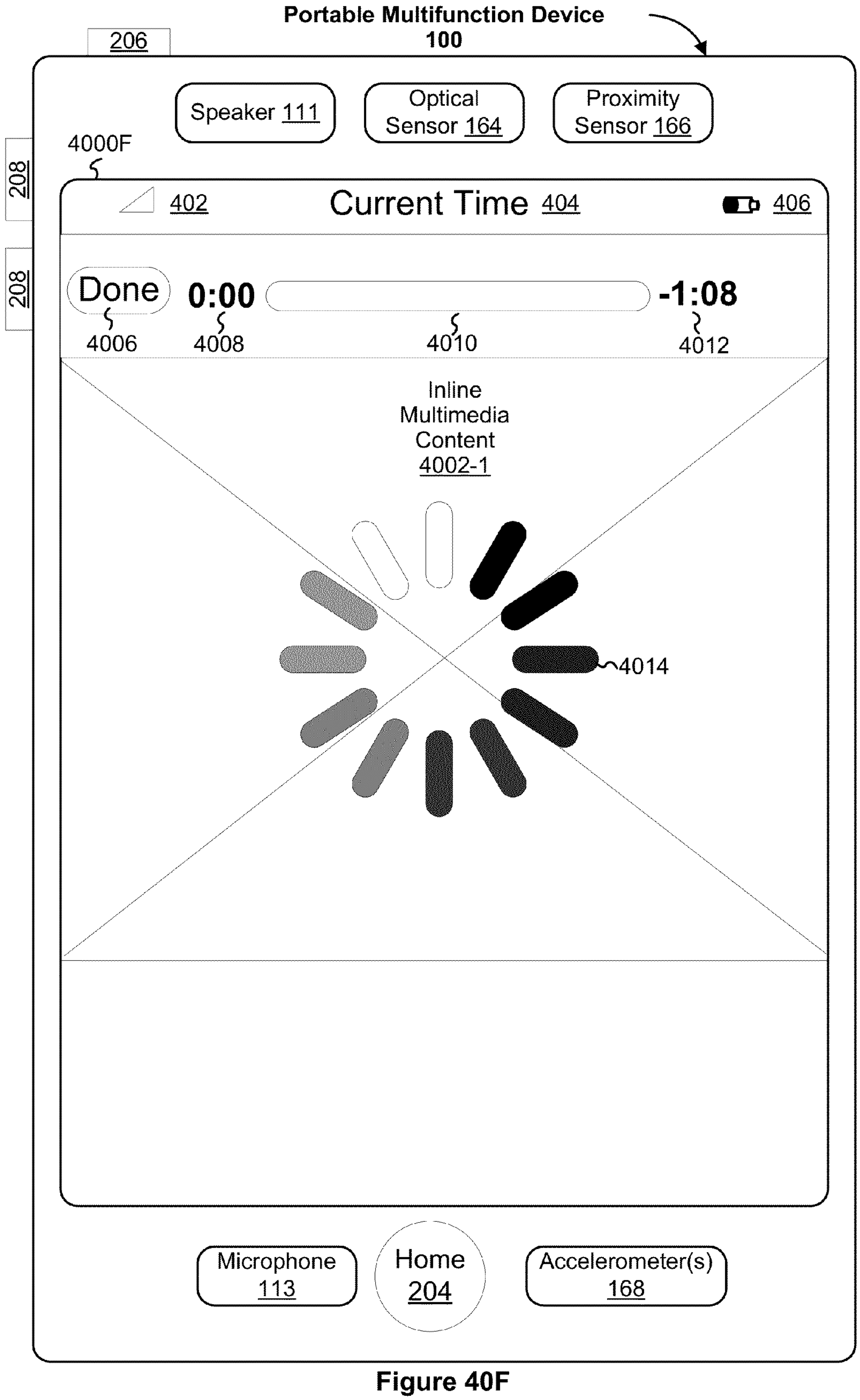

In response to detecting the first gesture, the item of inline multimedia content is enlarged on the touch screen display and other content (e.g., 4004 and other 4002 besides 4002-1, FIG. 4000A) in the structured electronic document besides the enlarged item of inline multimedia content ceases to be displayed (e.g., UI 4000B, FIG. 40B or UI 4000F, FIG. 40F).

In some embodiments, enlarging the item of inline multimedia content comprises animated zooming in on the item. In some embodiments, enlarging the item of inline multimedia content comprises simultaneously zooming and translating the item of inline multimedia content on the touch screen display. In some embodiments, enlarging the item of inline multimedia content comprises rotating the item of inline multimedia content by 90° (e.g., from UI 4000A, FIG. 40A to UI 4000B, FIG. 40B).

In some embodiments, the item of inline multimedia content has a full size; the touch screen display has a size; and enlarging the item of inline multimedia content comprises enlarging the item of inline multimedia content to the smaller of the full size of the item and the size of the touch screen display.

In some embodiments, enlarging the item of inline multimedia content comprises expanding the item of inline multimedia content so that the width of the item of inline multimedia content is substantially the same as the width of the touch screen display (e.g., UI 4000B, FIG. 40B or UI 4000F, FIG. 40F).

In some embodiments, ceasing to display other content in the structured electronic document besides the item of inline multimedia content comprises fading out the other content in the structured electronic document besides the item of inline multimedia content.

While the enlarged item of inline multimedia content is displayed, a second gesture is detected on the touch screen display (e.g., 4030, FIG. 40B).

In response to detecting the second gesture, one or more playback controls for playing the enlarged item of inline multimedia content are displayed. In some embodiments, the one or more playback controls comprise a play icon (e.g., 4018), a pause icon (e.g., 4024), a sound volume icon (e.g., 4022), and/or a playback progress bar icon (e.g., 4010).

In some embodiments, displaying one or more playback controls comprises displaying one or more playback controls on top of the enlarged item of inline multimedia content (e.g., playback controls 4016, 4018, 4020, and 4022 are on top of enlarged inline multimedia content 4002-1 in FIG. 40C). In some embodiments, the one or more playback controls are superimposed on top of the enlarged item of inline multimedia content. In some embodiments, the one or more playback controls are semitransparent.

In some embodiments, an instruction in the structured electronic document to automatically start playing the item of inline multimedia content is overridden, which gives the device time to download more of the selected inline multimedia content prior to starting playback.

A third gesture is detected on one of the playback controls (e.g., gesture 4026 on play icon 4018, FIG. 40C).

In response to detecting the third gesture, the enlarged item of inline multimedia content is played. In some embodiments, playing the enlarged item of inline multimedia content comprises playing the enlarged item of inline multimedia content with a plugin for a content type associated with the item of inline multimedia content.

In some embodiments, while the enlarged item of inline multimedia content is played, the one or more playback controls cease to be displayed (e.g., FIG. 40D, which no longer displays playback controls 4016, 4018, 4020, and 4022, but still shows 4006, 4008, 4010, and 4012). In some embodiments, all of the playback controls cease to be displayed. In some embodiments, ceasing to display the one or more playback controls comprises fading out the one or more playback controls. In some embodiments, the display of the one or more playback controls is ceased after a predetermined time. In some embodiments, the display of the one or more playback controls is ceased after no contact is detected with the touch screen display for a predetermined time.

In some embodiments, a fourth gesture is detected on the touch screen display. In response to detecting the fourth gesture, at least the portion of the structured electronic document is displayed again (e.g., FIG. 40A). In some embodiments, the fourth gesture comprises a tap gesture on a playback completion icon, such as a done icon (e.g., gesture 4032 on done icon 4006, FIG. 40D). In some embodiments, the item of inline multimedia content returns to its size prior to being enlarged.

In some embodiments, the first, second, and third gestures are finger gestures. In some embodiments, the first, second, and third gestures are stylus gestures.

In some embodiments, the first, second, and third gestures are tap gestures. In some embodiments, the tap gesture is a double tap with a single finger, a double tap with two fingers, a single tap with a single finger, or a single tap with two fingers.

A graphical user interface on a portable electronic device with a touch screen display, comprises: at least a portion of a structured electronic document, wherein the structured electronic document comprises content; an item of inline multimedia content in the portion of the structured electronic document; and one or more playback controls. In response to detecting a first gesture on the item of inline multimedia content, the item of inline multimedia content on the touch screen display is enlarged, and display of other content in the structured electronic document besides the enlarged item of inline multimedia content is ceased. In response to detecting a second gesture on the touch screen display while the enlarged item of inline multimedia content is displayed, the one or more playback controls for playing the enlarged item of inline multimedia content are displayed. In response to detecting a third gesture on one of the playback controls, the enlarged item of inline multimedia content is played.

Additional description of displaying inline multimedia content can be found in U.S. Provisional Patent Application No. 60/947,155, "Portable Electronic Device, Method, and Graphical User Interface for Displaying Inline Multimedia Content," filed Jun. 29, 2007, the content of which is hereby incorporated by reference.

FIGS. 41A-41E illustrate exemplary user interfaces for interacting with user input elements in displayed content in accordance with some embodiments.

In some embodiments, user interfaces 4100A-4100E include the following elements, or a subset or superset thereof:

- 402, 404, 406, 618, 620, 626, 3902, 3906, 3910, 3912, 3918, 3920, and 3922, as described above;
- content 4112, such as a web page; word processing, spreadsheet, email or presentation document; electronic form; or online form;
- user input elements 4102 in the content 4112, such as radio buttons, text input fields, check boxes, pull down lists, and/or form fields;
- information 4108 about a chosen user input element 4102;
- area 4114 that includes a chosen user input element 4102;
- cancel icon 4116 that when activated (e.g., by a finger tap on the icon) cancels user input into the chosen element 4102;
- input choices 4118 that when activated (e.g., by a finger tap on the icon) are used as input for the chosen element 4102;
- done icon 4124 (FIG. 41E) that when activated (e.g., by a finger tap on the icon) returns the device to the previous UI (e.g., UI 4100D, FIG. 41D); and
- submit icon 4126 (FIG. 41E) that when activated (e.g., by a finger tap on the icon) sends the input to a remote server.

In some embodiments, a portable multifunction device (e.g., device 100) displays content 4112 on a touch screen display. The content includes a plurality of user input elements 4102.

Figure 41A:
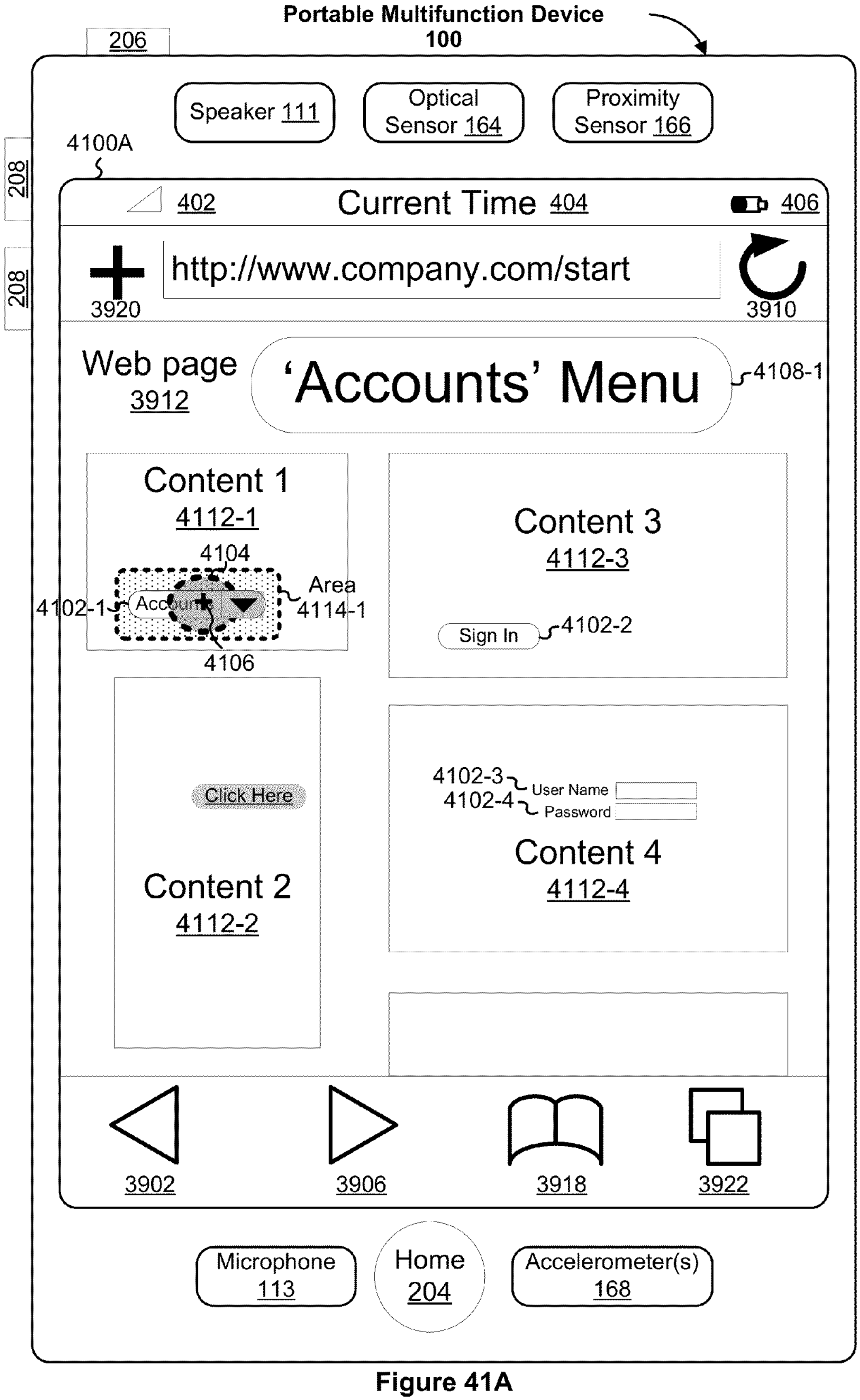
FIGS. 41A-41E illustrate exemplary user interfaces for interacting with user input elements in displayed content in accordance with some embodiments.

In some embodiments, the content is a web page (e.g., page 3912, FIG. 41A). In some embodiments, the content is a word processing, spreadsheet, email or presentation document. In some embodiments, the content is an electronic form. In some embodiments, the content is an online form.

In some embodiments, the user input elements 4102 include one or more radio buttons, text input fields, check boxes, pull down lists (e.g., 4102-1, FIG. 41A), and/or form fields (e.g., user name 4102-3, FIG. 41A).

A contact by a finger (e.g., 4104, FIG. 41A) is detected with the touch screen display. The contact includes an area of contact.

A point (e.g., 4106, FIG. 41A) is determined within the area of contact. In some embodiments, the point within the area of contact is the centroid of the area of contact. In some embodiments, the point within the area of contact is offset from the centroid of the area of contact.

A user input element in the plurality of user input elements is chosen based on proximity of the user input element to the determined point (e.g., 4102-1, FIG. 41A). In some embodiments, the content on the touch screen display has an associated scale factor, and the choosing is limited to user input elements located within a distance from the determined point that is determined in accordance with the scale factor. In some embodiments, choosing is limited to user input elements located within the area of contact. In some embodiments, choosing is limited to user input elements that at least partially overlap with the area of contact. In some embodiments, choosing is limited to user input elements located within a predetermined distance from the determined point.

Information associated with the chosen user input element is displayed over the displayed content (e.g., Accounts Menu 4108-1, FIG. 41A). In some embodiments, the displayed information associated with the chosen user input element comprises a description of the chosen user input element.

In some embodiments, the information associated with the chosen user input element is displayed outside the area of contact. In some embodiments, the location of the information associated with the chosen user input element over the displayed content depends on the location of the contact. In some embodiments, the location of the information associated with the chosen user input element is displayed over the top half of the displayed content if the location of the contact is in the bottom half of the displayed content and the location of the information associated with the chosen user input element is displayed over the bottom half of the displayed content if the location of the contact is in the top half of the displayed content.

In some embodiments, the information associated with the chosen user input element is displayed after the contact is maintained for at least a predetermined time. In some embodiments, the displayed information associated with the chosen user input element is removed if the contact with the touch screen is maintained for greater than a predetermined time.

A break is detected in the contact by the finger with the touch screen display. In some embodiments, detecting the break in the contact comprises detecting the break in the contact while the information associated with the chosen user input element is displayed.

Figure 41B:
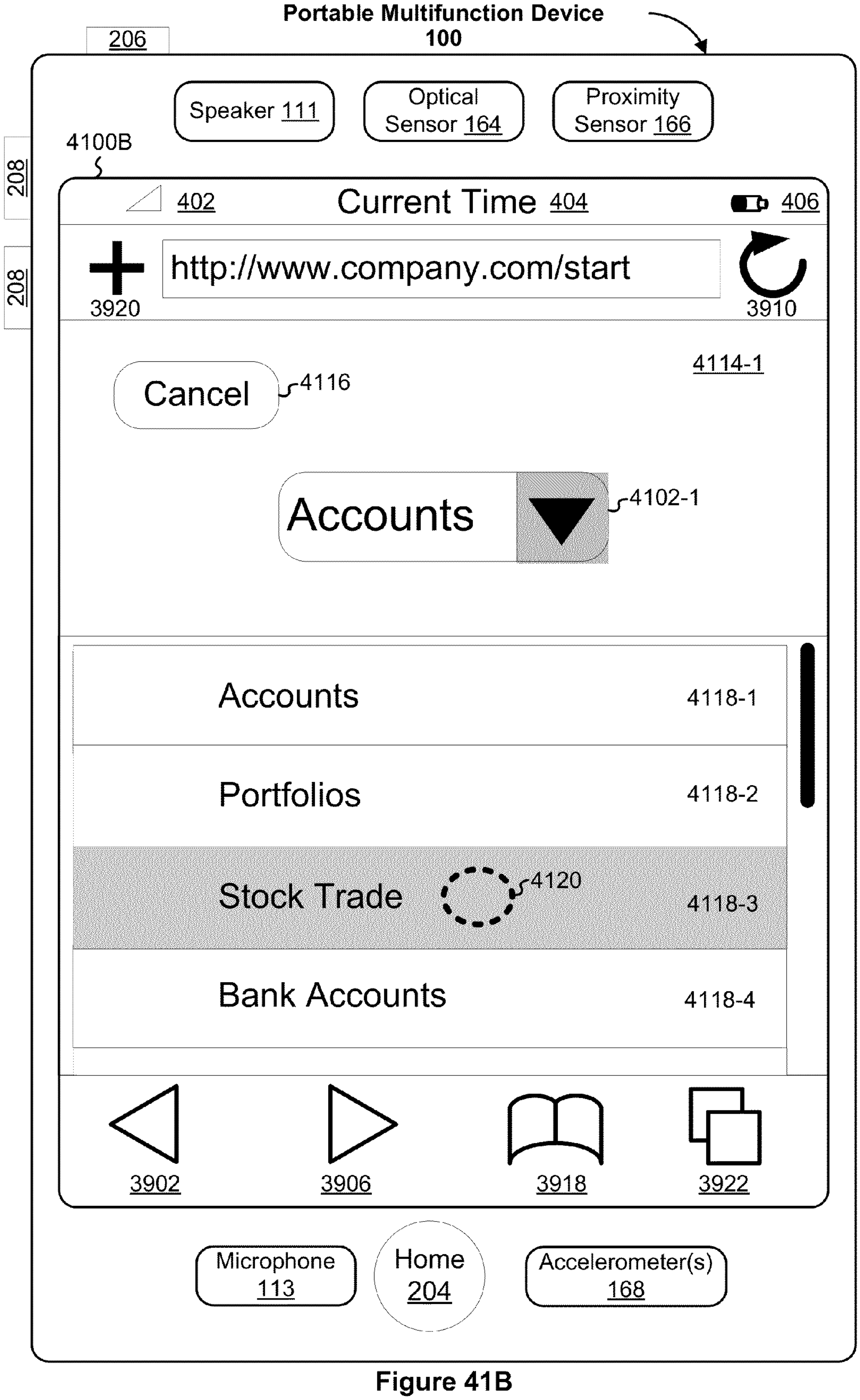
Figure 41C:
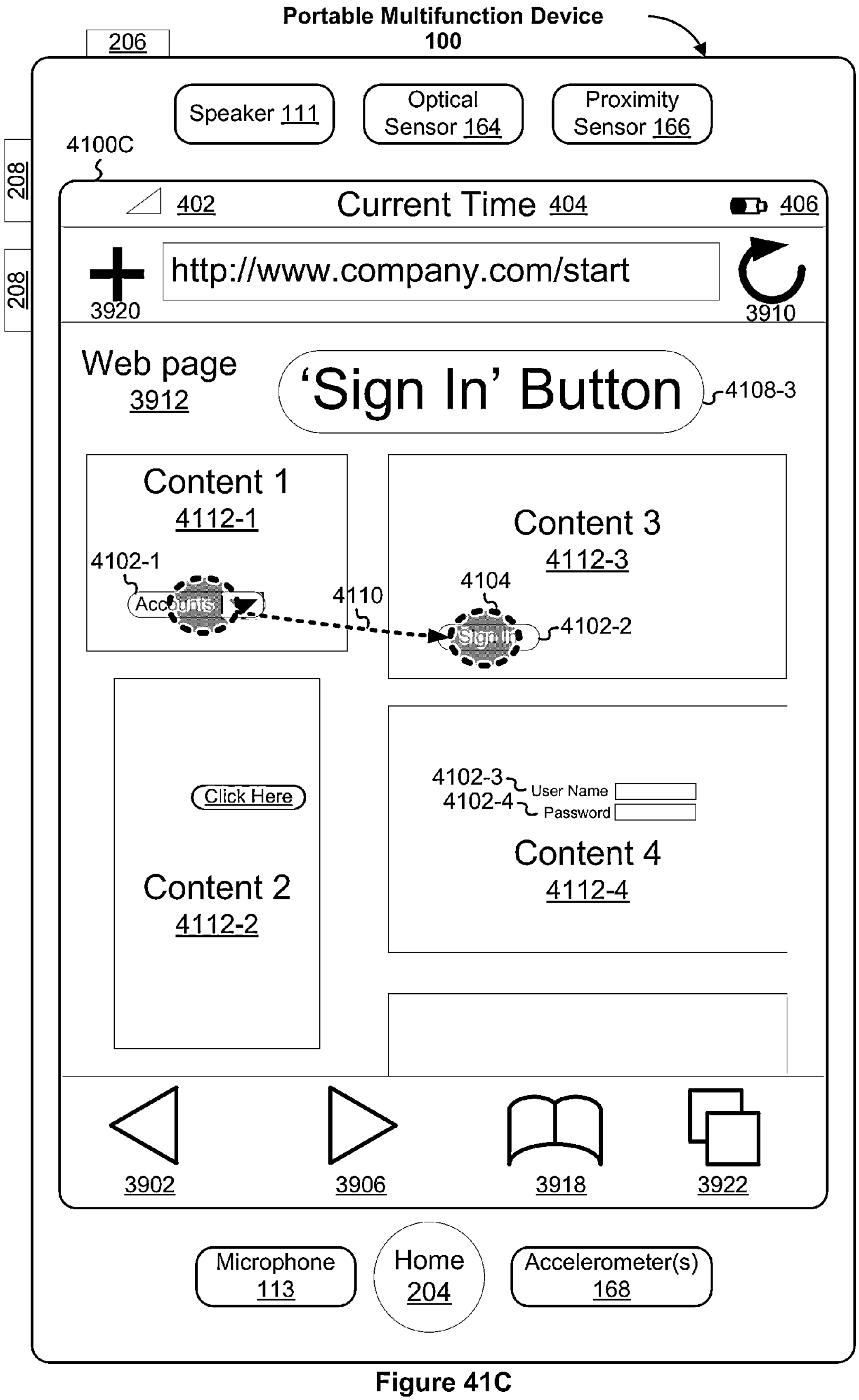
Figure 41D:
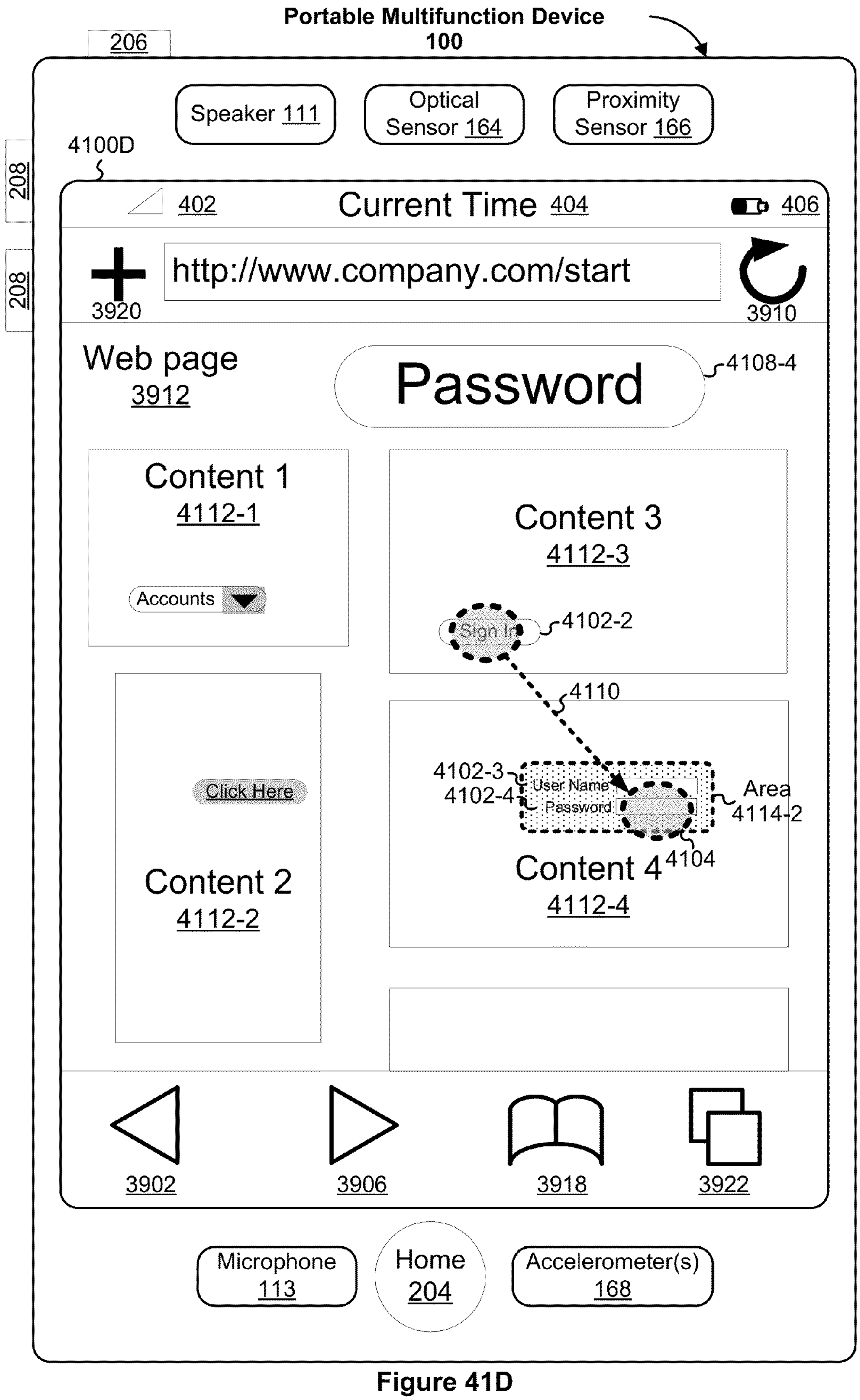
Figure 41E:
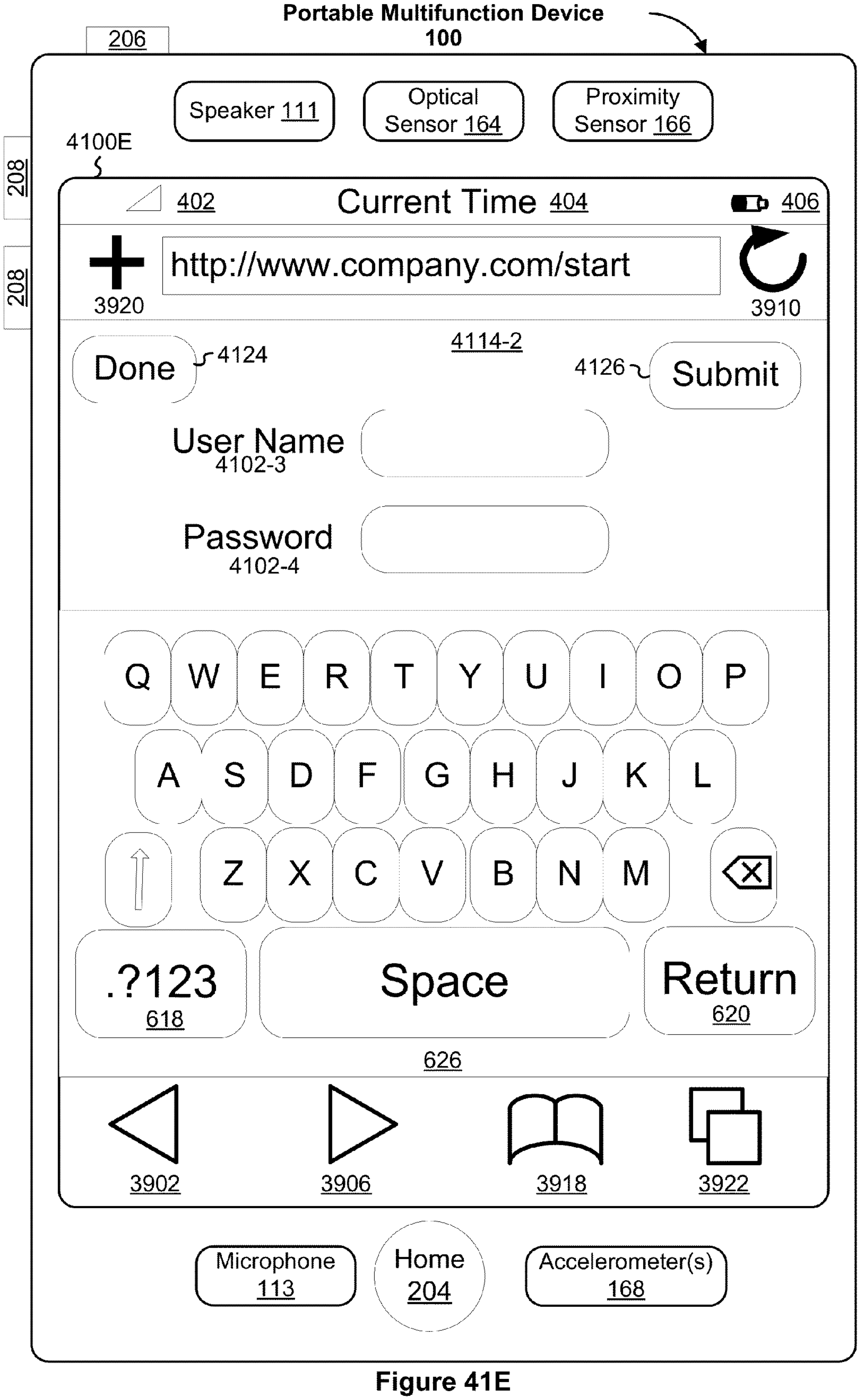

In some embodiments, in response to detecting the break in the contact by the finger with the touch screen display, an area is enlarged that includes the chosen user input element on the touch screen display (e.g., for element 4102-1, area 4114-1 in FIG. 41A is enlarged in FIG. 41B; similarly, for elements 4102-3 and 4102-4, area 4114-2 in FIG. 41D is enlarged in FIG. 41E).

In some embodiments, in response to detecting the break in the contact by the finger with the touch screen display prior to expiration of a predetermined time, the chosen user input element is enlarged on the touch screen display (e.g., element 4102-1 in FIG. 41A is enlarged in FIG. 41B; similarly, elements 4102-3 and 4102-4 in FIG. 41D are enlarged in FIG. 41E).

Input is received for the chosen user input element. In some embodiments, receiving input comprises: receiving text input via a soft keyboard on the touch screen display (e.g., keyboard 626, FIG. 41E), detecting a finger contact with a radio button on the touch screen display, detecting a finger contact with a check box on the touch screen display, or detecting a finger contact with an item in a pull down list on the touch screen display (e.g., contact 4120 on input choice 4118-3, FIG. 41B).

In some embodiments, the received input is sent to a remote computer, such as a web server.

In some embodiments, movement of the contact is detected on the touch screen display (e.g., movement 4110-1, FIG. 41C); a second user input element (e.g., element 4102-2, FIG. 41C) in the plurality of user input elements is chosen based on proximity of the second user input element to the contact (e.g., contact 4104, FIG. 41C); the display of information associated with the first chosen user input element over the displayed content is ended; and information associated with the second chosen user input element is displayed over the displayed content (e.g., sign in button 4108-2, FIG. 41C).

In some embodiments, movement of the contact on the touch screen display is detected (e.g., movement 4110-1 in FIG. 41C, and movement 4110-2 in FIG. 41D); a series of user input elements in the plurality of user input elements are chosen based on the proximity of the user input elements to the contact (e.g., element 4102-2 in FIG. 41C, and elements 4102-3 and 4102-4 in FIG. 41D); and information associated with each user input element in the series of user input elements are successively displayed over the displayed content (e.g., information 4108-3 in FIG. 41C, and information 4108-4 in FIG. 41D).

A graphical user interface (e.g., UI 4100A, FIG. 41A) on a portable multifunction device with a touch screen display comprises (1) content 4112 that includes a plurality of user input elements 4102 and (2) information 4108-1 associated with a first user input element 4102-1 in the plurality of user input elements. In response to the detection of an area of contact 4104 of a finger with the touch screen display: a point 4106 is determined within the area of contact, the first user input element 4102-1 is chosen based on proximity of the first user input element to the determined point, and the information 4108-1 associated with the first user input element is displayed over the content.

Using interfaces such as 4011A-4100E, a user may more easily view information associated with input elements and provide input on a portable device using finger contacts on a touch screen. The user is relieved of having to worry about the precision of his finger contact with respect to selection of input elements. Furthermore, the user can view information and provide input even if the input elements are initially displayed at such a small size that the elements are illegible or barely legible.

Additional description of interacting with user input elements can be found in U.S. Provisional Patent Application No. 60/947,127, "Portable Multifunction Device, Method, and Graphical User Interface for Interacting with User Input Elements in Displayed Content," filed Jun. 29, 2007, the content of which is hereby incorporated by reference.

Figure 41F:
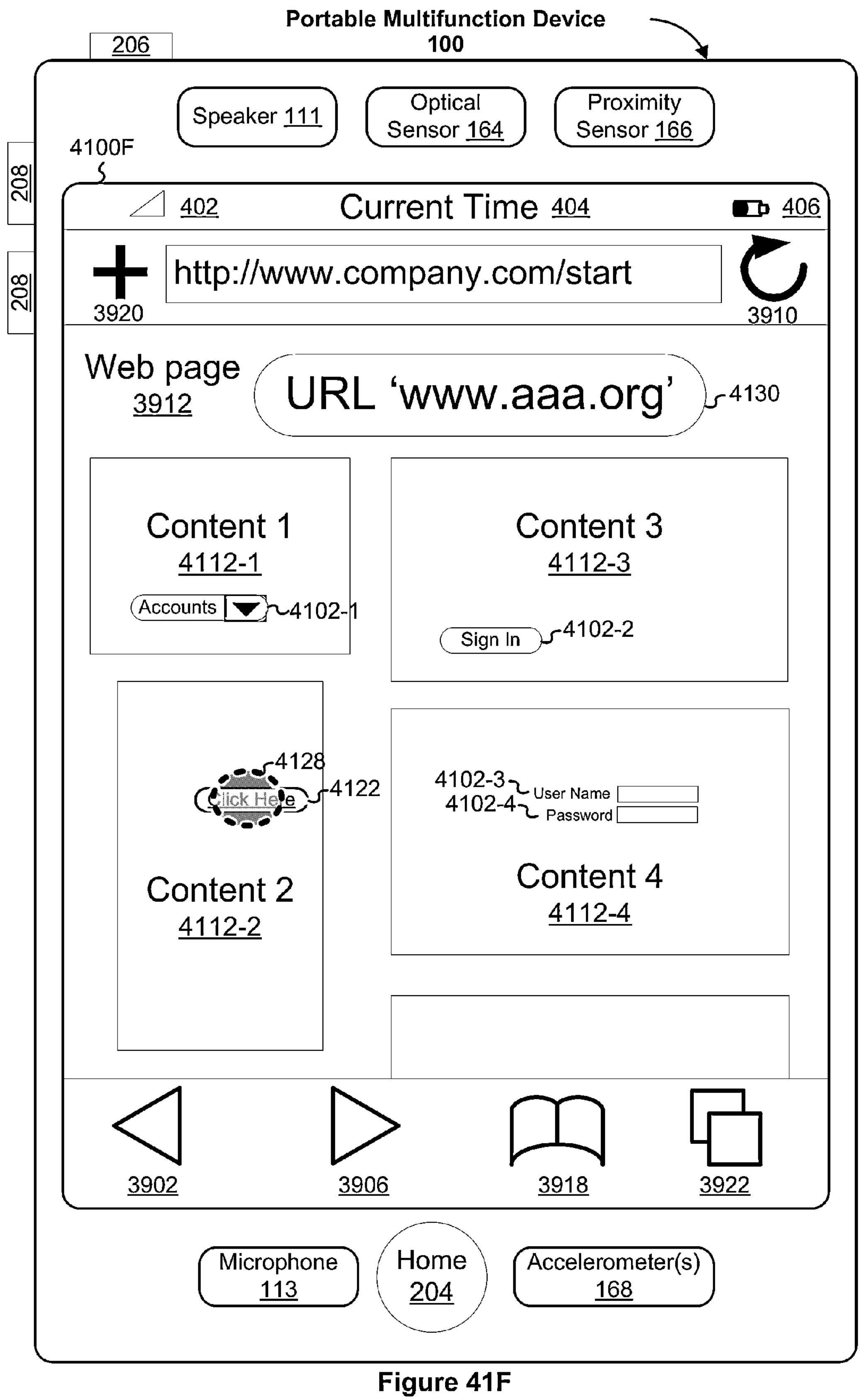
FIG. 41F illustrates an exemplary user interface for interacting with hyperlinks in displayed content in accordance with some embodiments.

FIG. 41F illustrates an exemplary user interface for interacting with hyperlinks in displayed content in accordance with some embodiments.

In some embodiments, user interface UI 4100F include the following elements, or a subset or superset thereof:

- 402, 404, 406, 3902, 3906, 3910, 3912, 3918, 3920, 3922, 4112, and 4102, as described above;
- link 4122 that provides a link to other content; and
- information 4130 associated with link 4122.

Additional description of displaying and activating hyperlinks using interfaces such as UI 4100F can be found in U.S. patent application Ser. No. 11/620,644, "Method, System, And Graphical User Interface For Displaying Hyperlink Information," filed Jan. 5, 2007 and in U.S. patent application Ser. No. 11/620,646, "Method, System, And Graphical User Interface For Activating Hyperlinks," filed Jan. 5, 2007, the contents of which are hereby incorporated by reference.

Figure 42A:
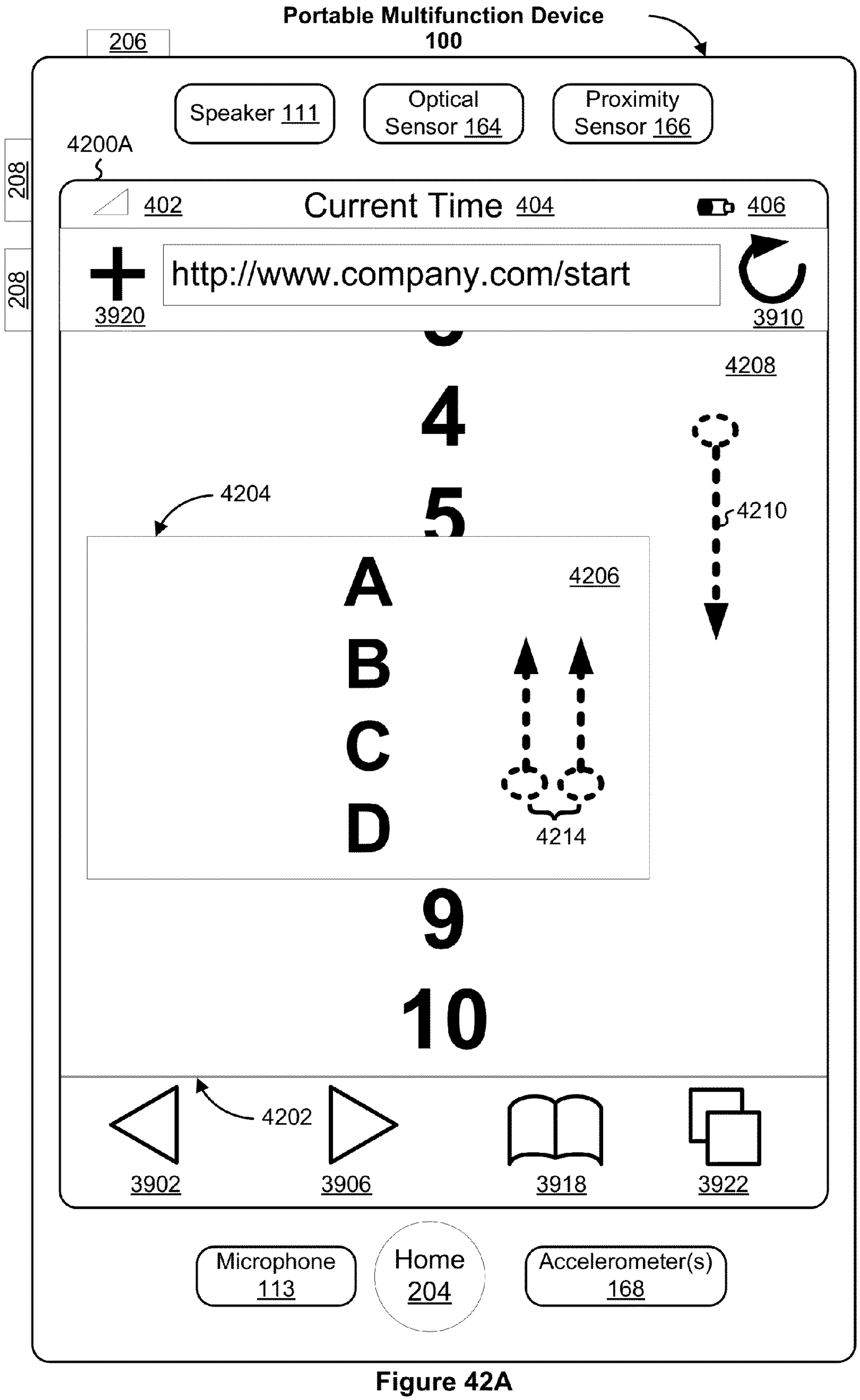
FIGS. 42A-42C illustrate exemplary user interfaces for translating page content or translating just frame content within the page content in accordance with some embodiments.
Figure 42B:
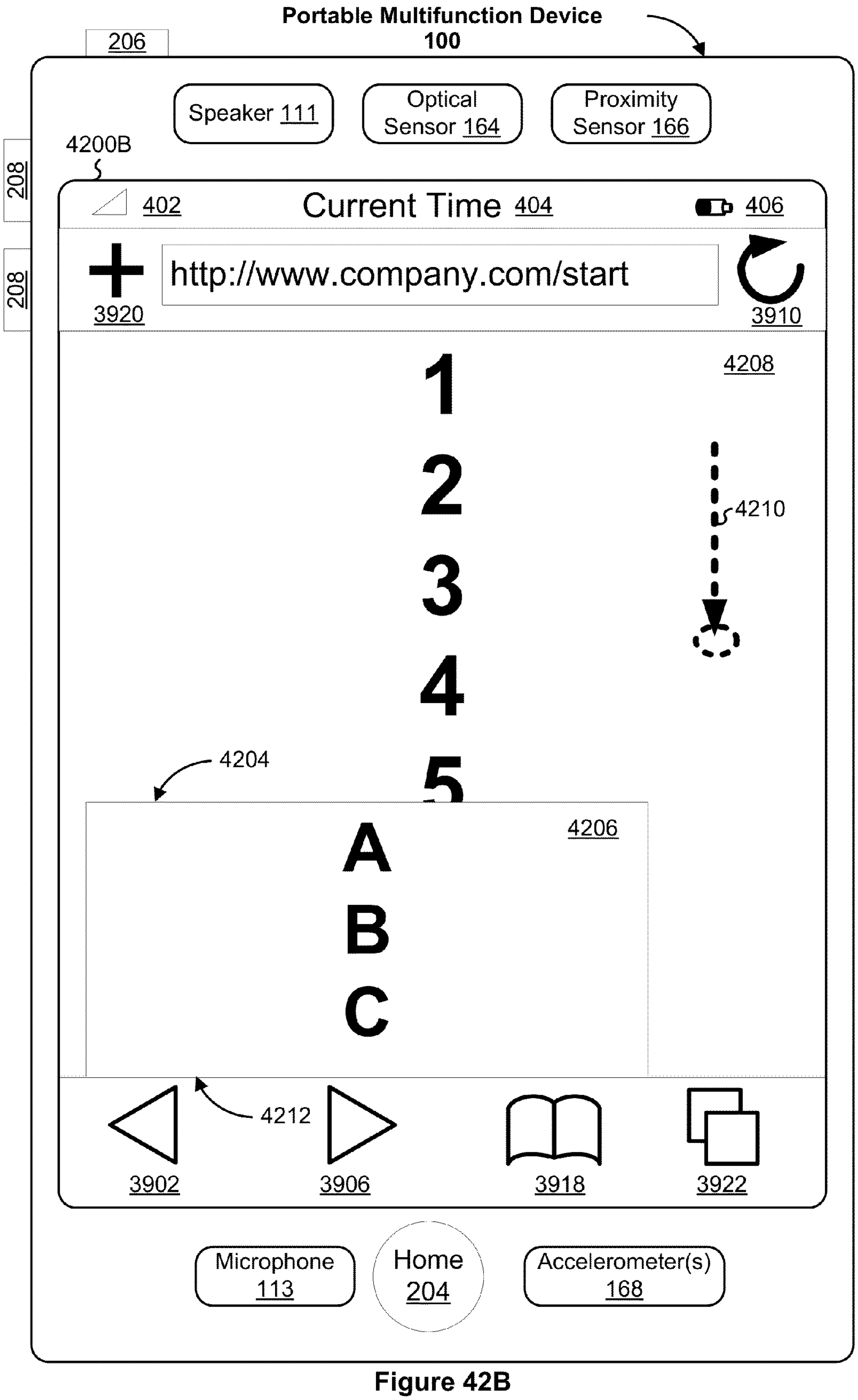
Figure 42C:
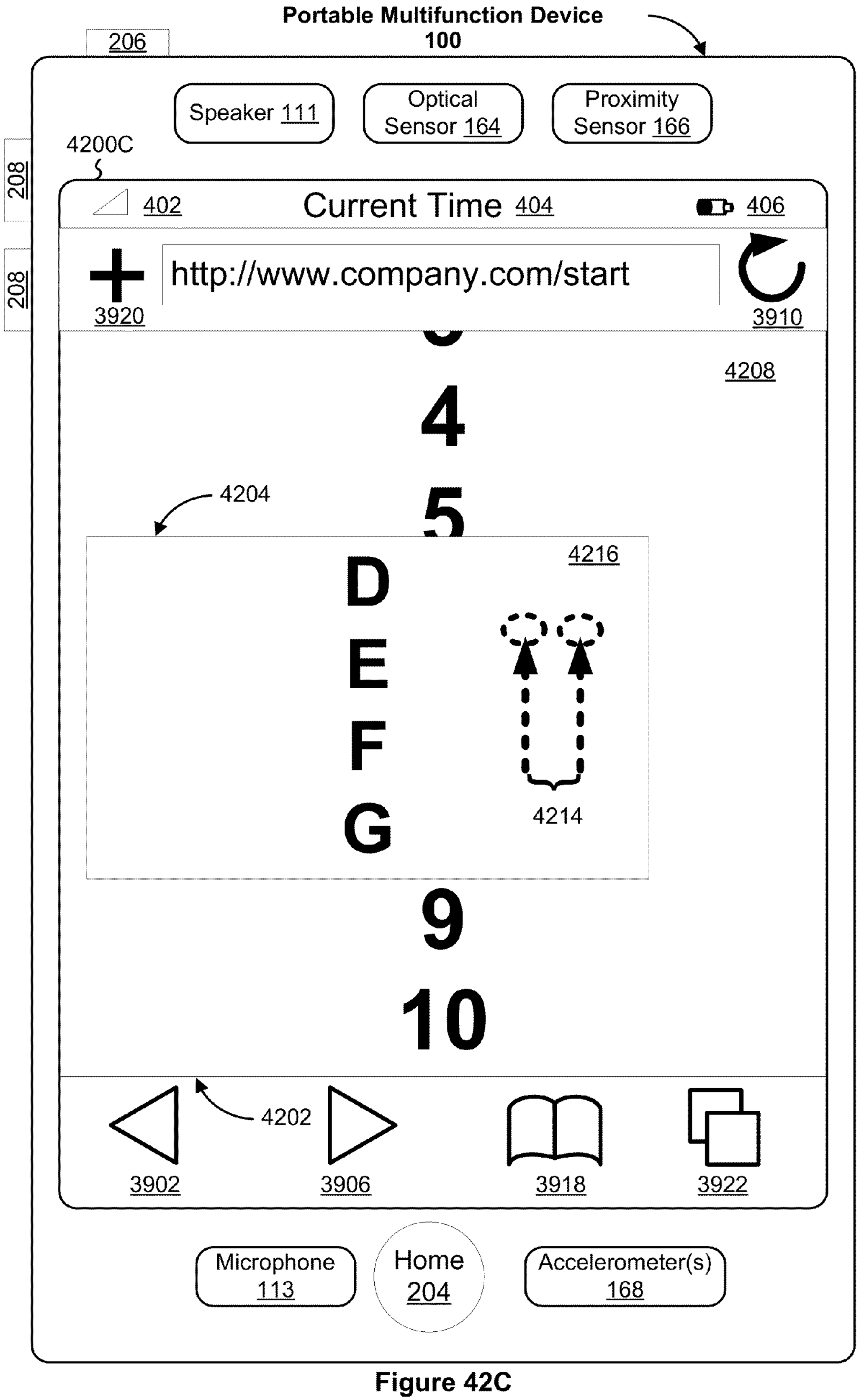

FIGS. 42A-42C illustrate exemplary user interfaces for translating page content or translating just frame content within the page content in accordance with some embodiments.

In some embodiments, user interfaces 4200A-4200C include the following elements, or a subset or superset thereof:

- 402, 404, 406, 3902, 3906, 3910, 3918, 3920, and 3922, as described above;
- Portion 4202 of page content, such as web page content;
- Frame 4204 that displays a portion 4206 of frame content;
- Portion 4206 of frame content, such as a portion of a map or a scrollable list of items, that is displayed within frame 4204;
- Other content 4208, besides the portion 4206 of frame content, in portion 4202;
- New portion 4212 of page content that is displayed in response to an N-finger translation gesture 4210; and
- New portion 4216 of frame content that is displayed in response to an M-finger translation gesture 4214, where M is a different number from N (e.g., N=1 and M=2).

In some embodiments, a portable multifunction device (e.g., device 100) displays a portion (e.g., 4202, FIG. 42A) of page content on a touch screen display. The portion 4202 of page content includes a frame 4204 displaying a portion 4206 of frame content and other content 4208 of the page.

In some embodiments, the page content is web page content. In some embodiments, the page content is a word processing, spreadsheet, email or presentation document.

An N-finger translation gesture (e.g., 4210) is detected on or near the touch screen display.

In response to detecting the N-finger translation gesture 4210, the page content is translated to display a new portion (e.g., 4212, FIG. 42B) of page content on the touch screen display. Translating the page content includes translating the displayed portion 4206 of the frame content and the other content 4208 of the page.

In some embodiments, translating the page content comprises translating the page content in a vertical, horizontal, or diagonal direction. In some embodiments, translating the page content has an associated direction of translation that corresponds to a direction of movement of the N-finger translation gesture 4210. In some embodiments, the direction of translation corresponds directly to the direction of finger movement; in some embodiments, however, the direction of translation is mapped from the direction of finger movement in accordance with a rule. For example, the rule may state that if the direction of finger movement is within X degrees of a standard axis, the direction of translation is along the standard axis, and otherwise the direction of translation is substantially the same as the direction of finger movement.

In some embodiments, translating the page content has an associated speed of translation that corresponds to a speed of movement of the N-finger translation gesture. In some embodiments, translating the page content is in accordance with a simulation of an equation of motion having friction.

An M-finger translation gesture (e.g., 4214, FIG. 42A) is detected on or near the touch screen display, where M is a different number than N. In some embodiments, N is equal to 1 and M is equal to 2.

In response to detecting the M-finger translation gesture 4214, the frame content is translated to display a new portion (e.g., 4216, FIG. 42C) of frame content on the touch screen display, without translating the other content 4208 of the page.

In some embodiments, translating the frame content comprises translating the frame content in a vertical, horizontal, or diagonal direction. In some embodiments, translating the frame content comprises translating the frame content in a diagonal direction.

In some embodiments, translating the frame content has an associated direction of translation that corresponds to a direction of movement of the M-finger translation gesture 4214. In some embodiments, the direction of translation corresponds directly to the direction of finger movement; in some embodiments, however, the direction of translation is mapped from the direction of finger movement in accordance with a rule. For example, the rule may state that if the direction of finger movement is within Y degrees of a standard axis, the direction of translation is along the standard axis, and otherwise the direction of translation is substantially the same as the direction of finger movement.

In some embodiments, translating the frame content has an associated speed of translation that corresponds to a speed of movement of the M-finger translation gesture. In some embodiments, translating the frame content is in accordance with a simulation of an equation of motion having friction.

In some embodiments, the frame content comprises a map. In some embodiments, the frame content comprises a scrollable list of items.

In some embodiments, the other content 4208 of the page includes text.

A graphical user interface (e.g., UI 4200A, FIG. 42A) on a portable multifunction device with a touch screen display comprises a portion 4202 of page content on the touch screen display, which includes: (1) a frame 4204 displaying a portion 4206 of frame content and (2) other content 4208 of the page. In response to detecting an N-finger translation gesture 4210 on or near the touch screen display, the page content is translated to display a new portion 4212 (FIG. 42B) of page content on the touch screen display, wherein translating the page content includes translating the other content 4208 of the page. In response to detecting an M-finger translation gesture 4214 on or near the touch screen display, where M is a different number than N, the frame content is translated to display a new portion 4216 (FIG. 42C) of frame content on the touch screen display, without translating the other content 4208 of the page.

Thus, depending on the number of fingers used in the gesture, a user may easily translate page content or just translate frame content within the page content.

Additional description of translating displayed content can be found in U.S. Provisional Patent Application No. 60/946,976, "Portable Multifunction Device, Method, and Graphical User Interface for Translating Displayed Content," filed Jun. 28, 2007, the content of which is hereby incorporated by reference.

Music and Video Player

FIGS. 43A-43DD illustrate exemplary user interfaces for a music and video player 152 in accordance with some embodiments.

Figure 43A:
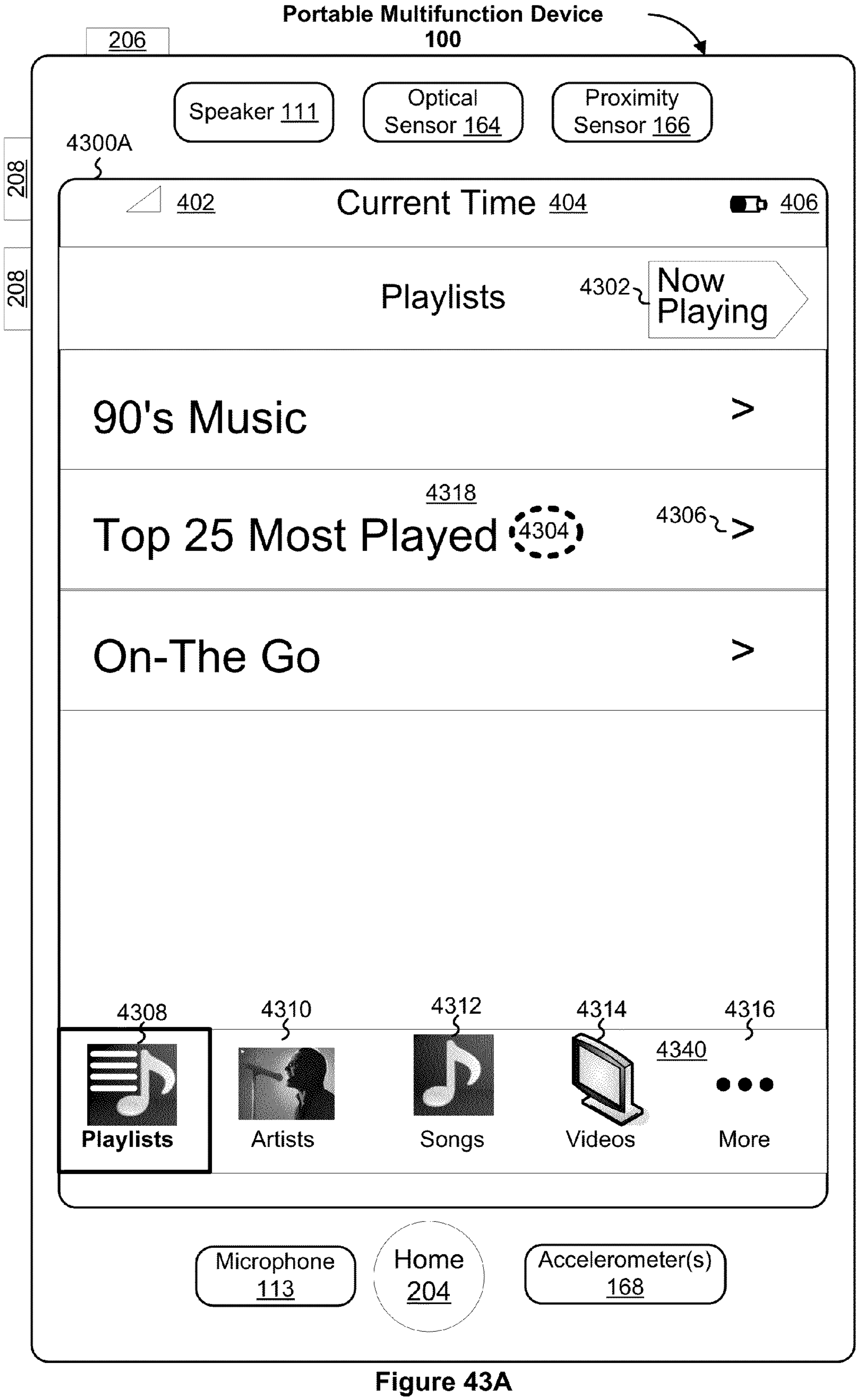
FIGS. 43A-43DD illustrate exemplary user interfaces for a music and video player in accordance with some embodiments.

In some embodiments, icons for major content categories (e.g., playlists 4308, artists 4310, songs 4312, and video 4314) are displayed in a first area of the display (e.g., 4340, FIG. 43A). In some embodiments, the first area also includes an icon (e.g., more icon 4316) that when activated (e.g., by a finger tap on the icon) leads to additional content categories (e.g., albums, audiobooks, compilations, composers, genres, and podcasts in FIG. 43J).

Figure 43B:
Figure 43C:
Figure 43D:
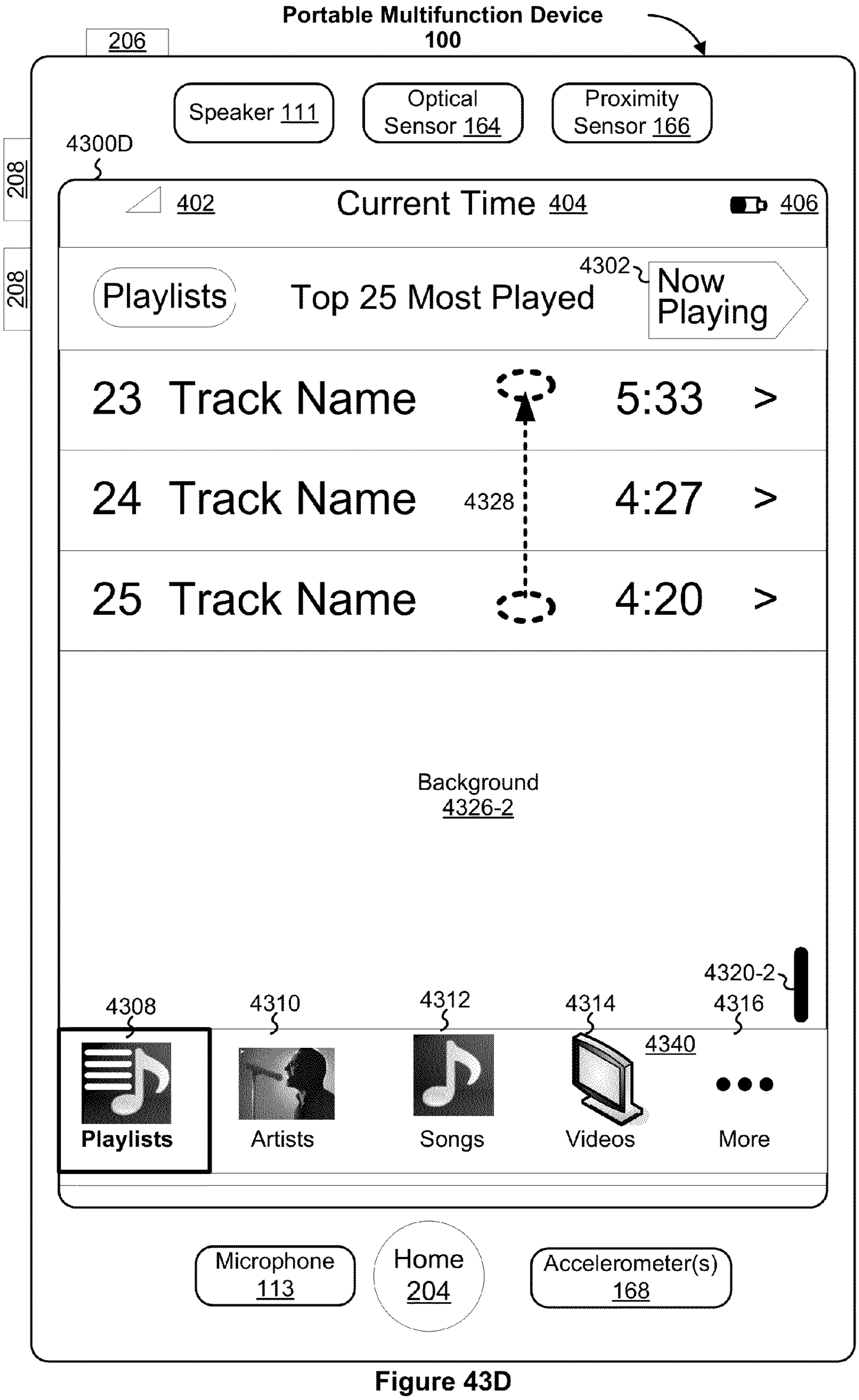
Figure 43E:
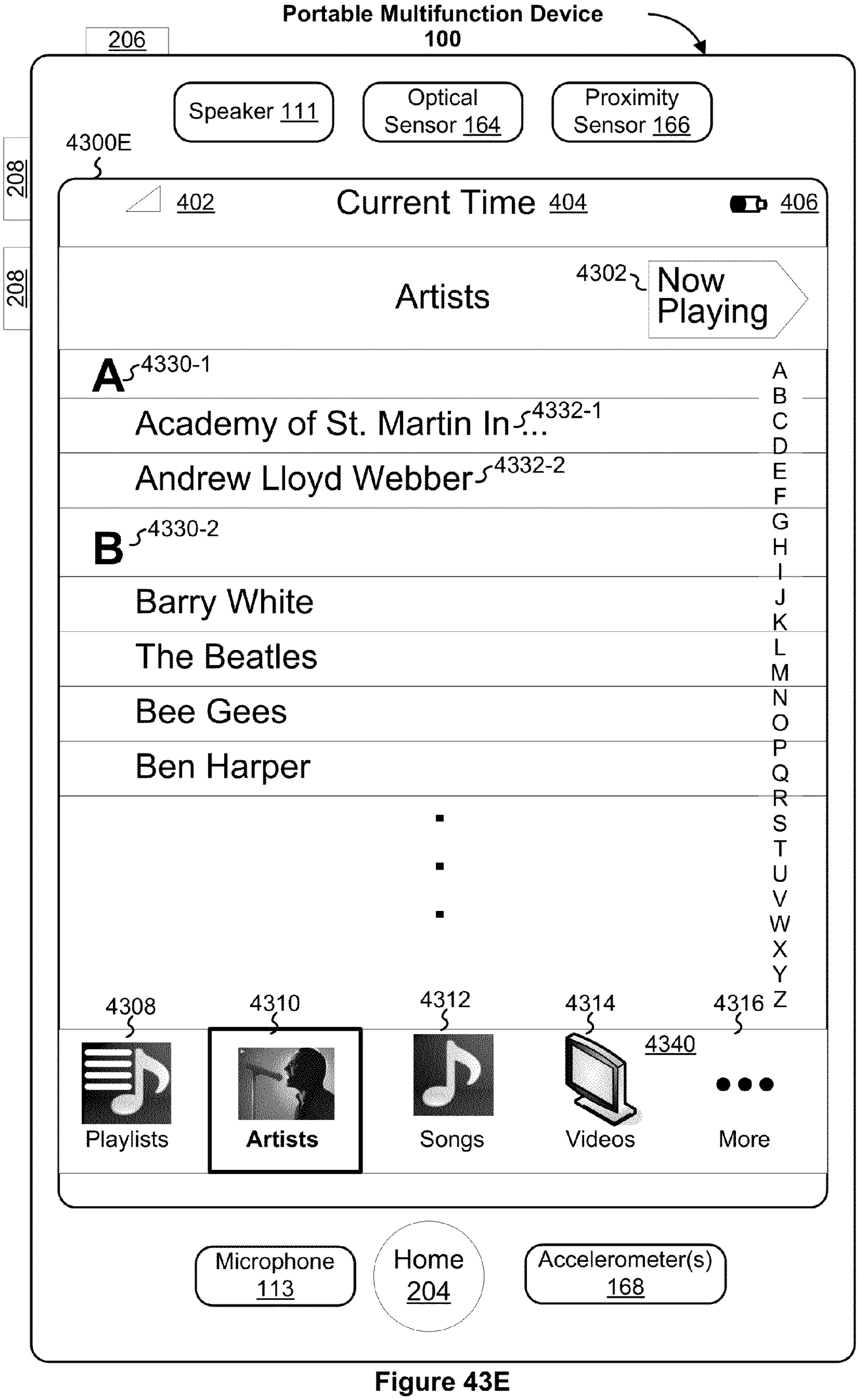
Figure 43F:
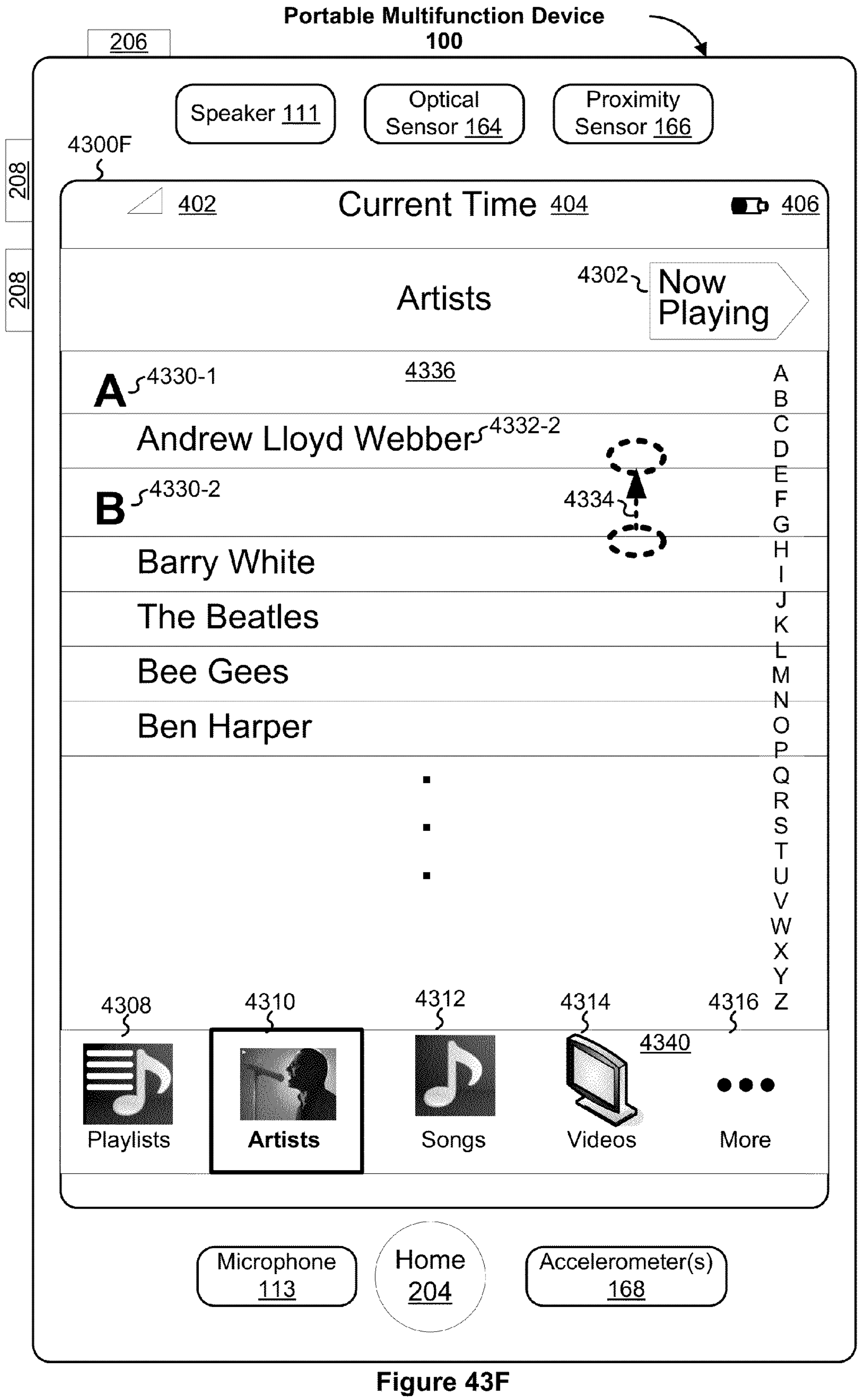
Figure 43G:
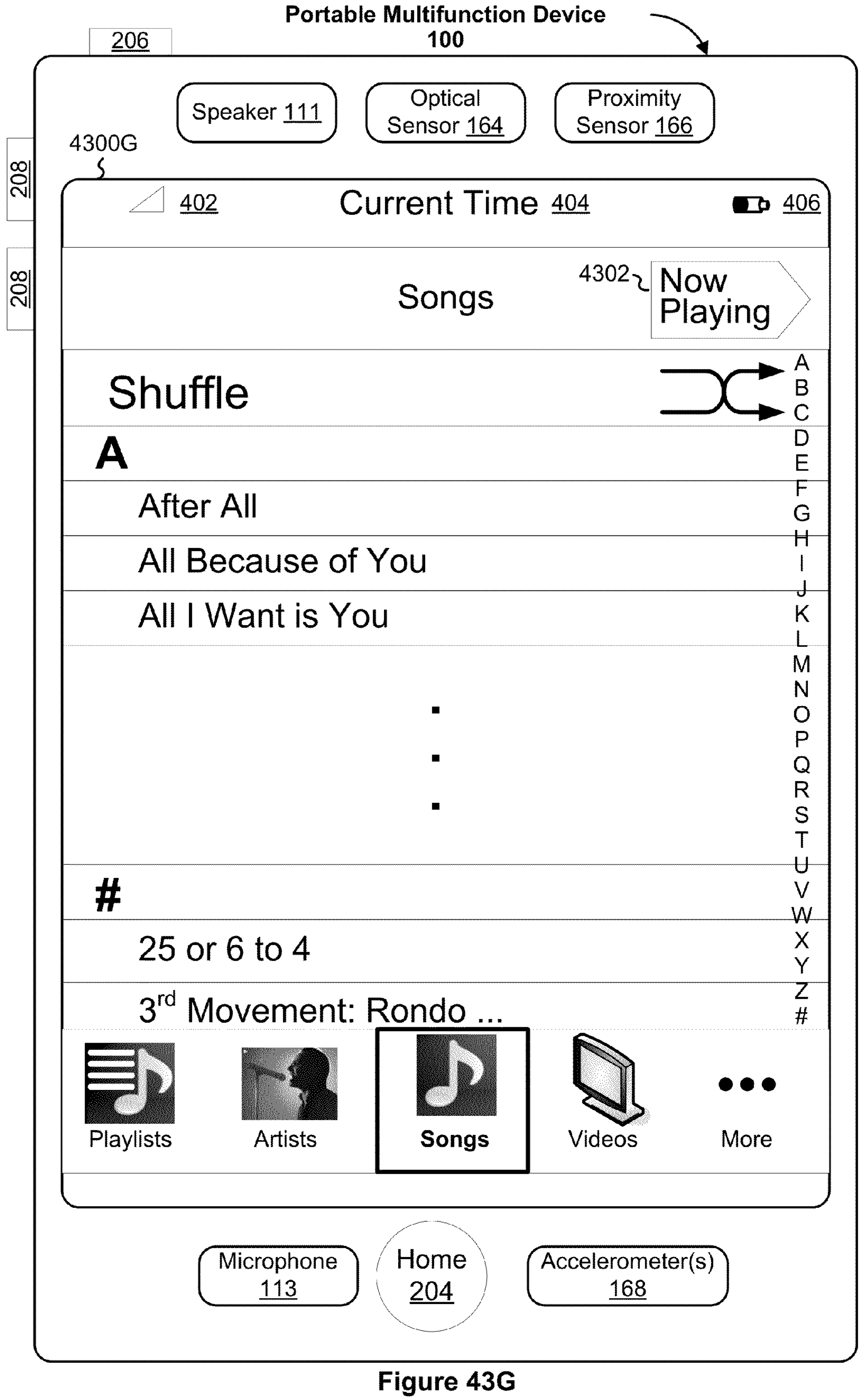
Figure 43H:
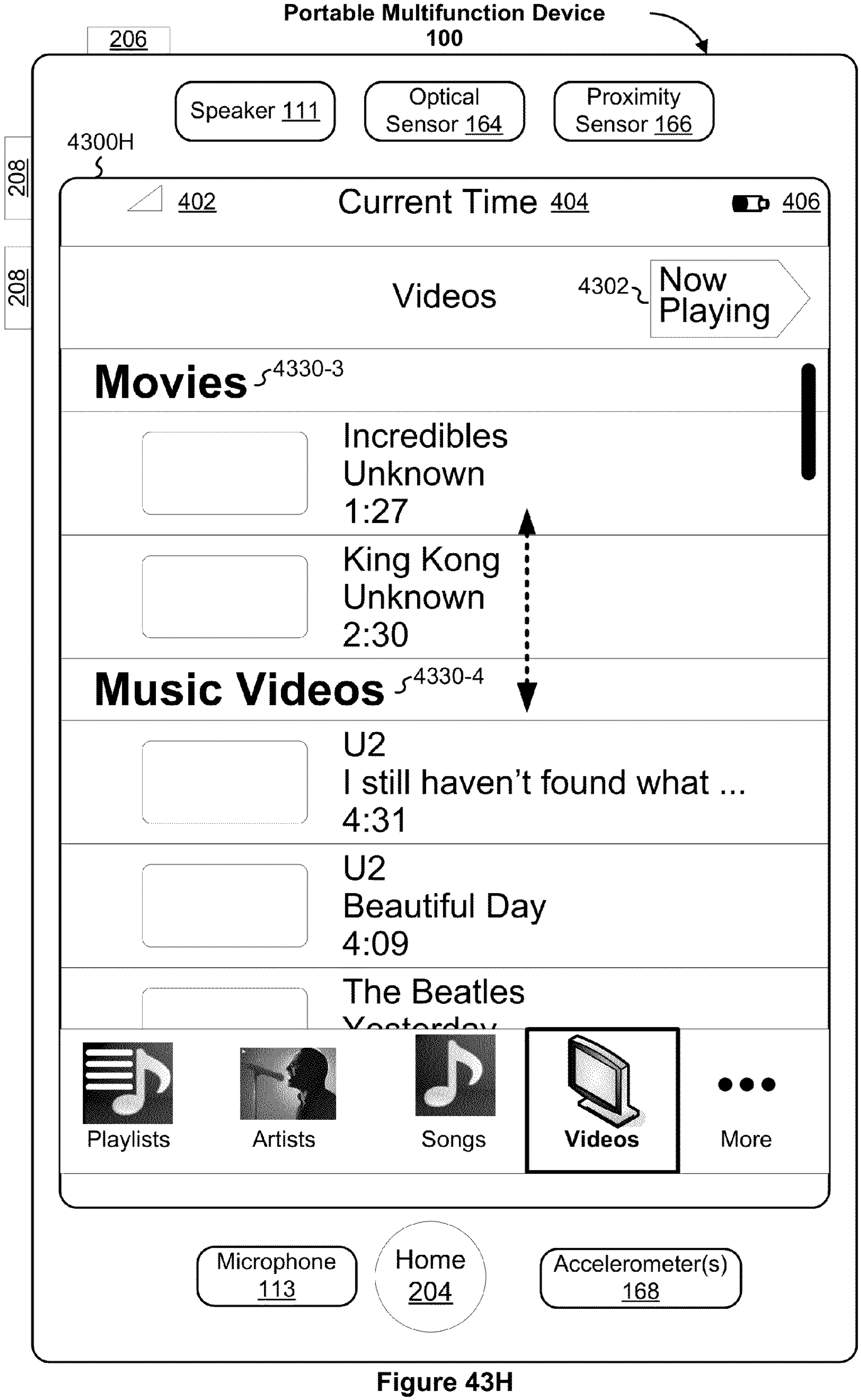
Figure 43I:
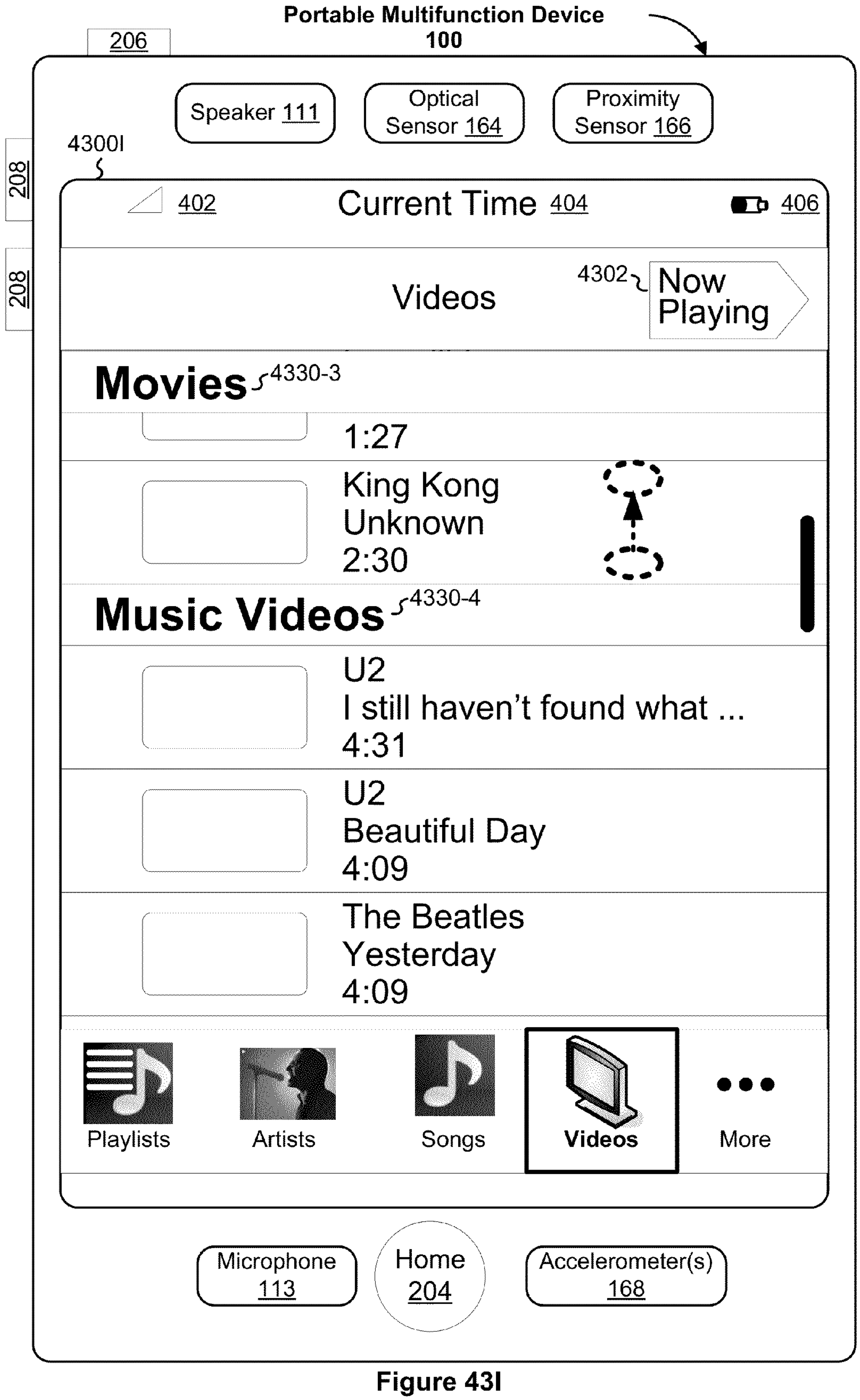
Figure 43J:
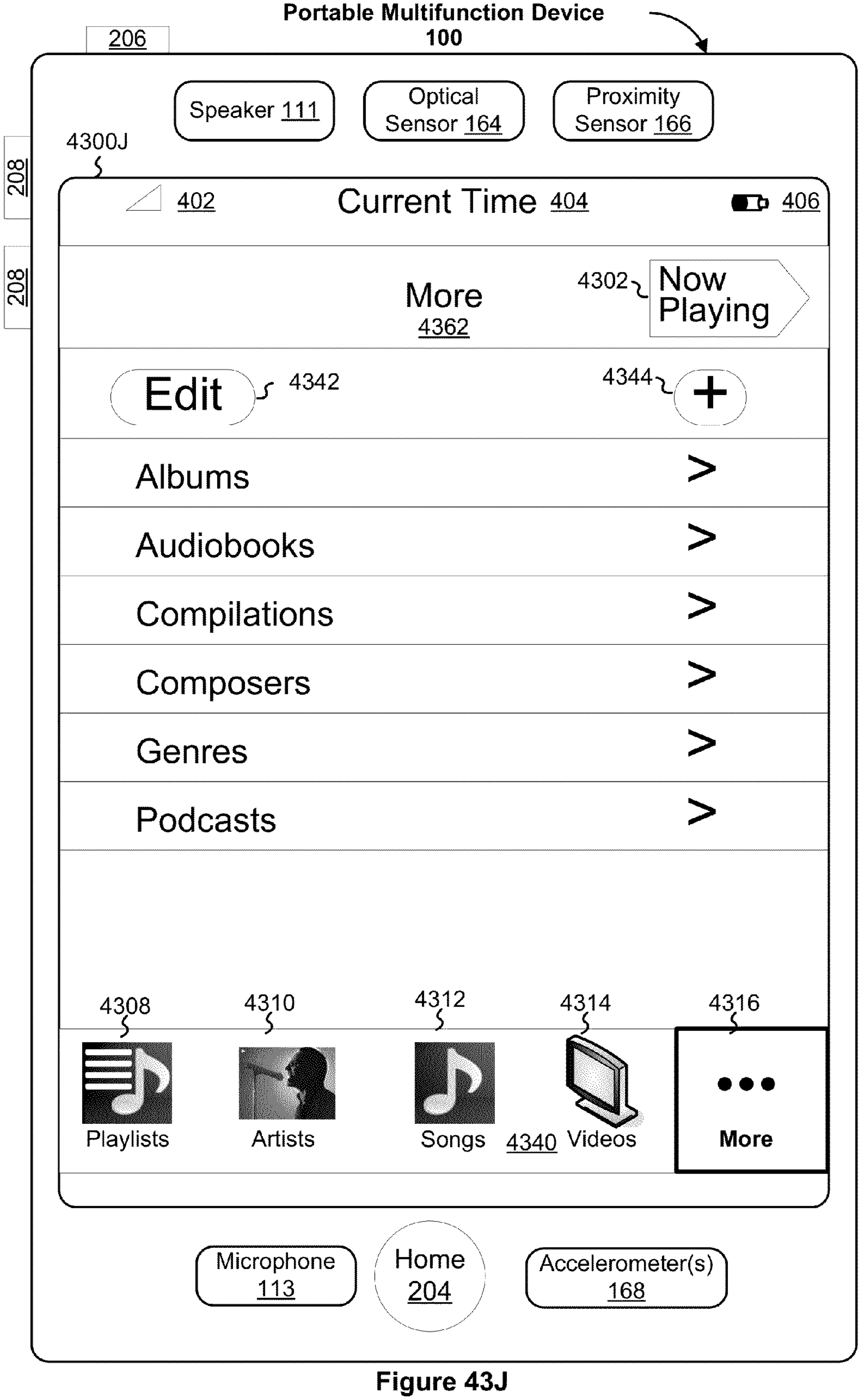
Figure 43K:
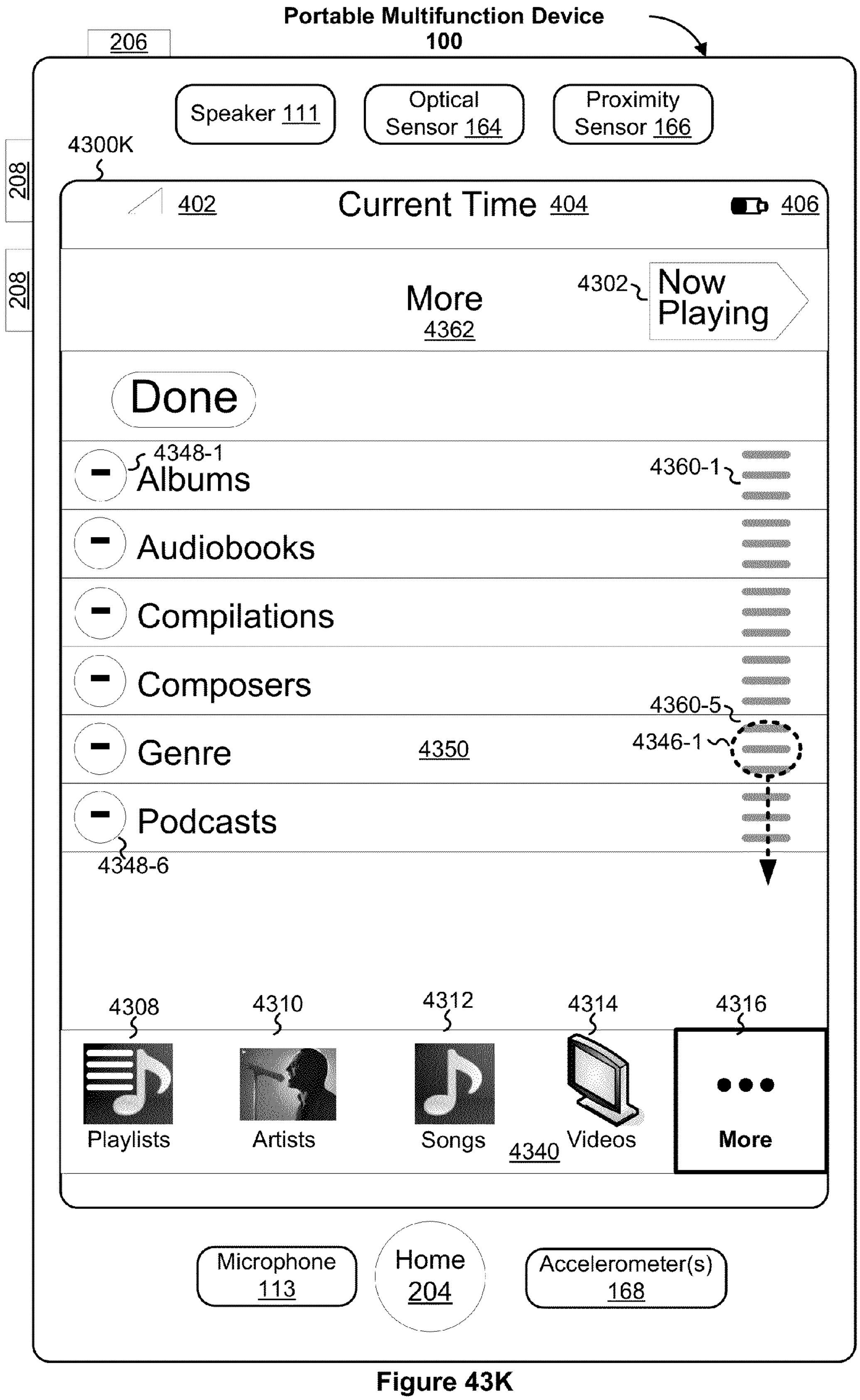
Figure 43L:
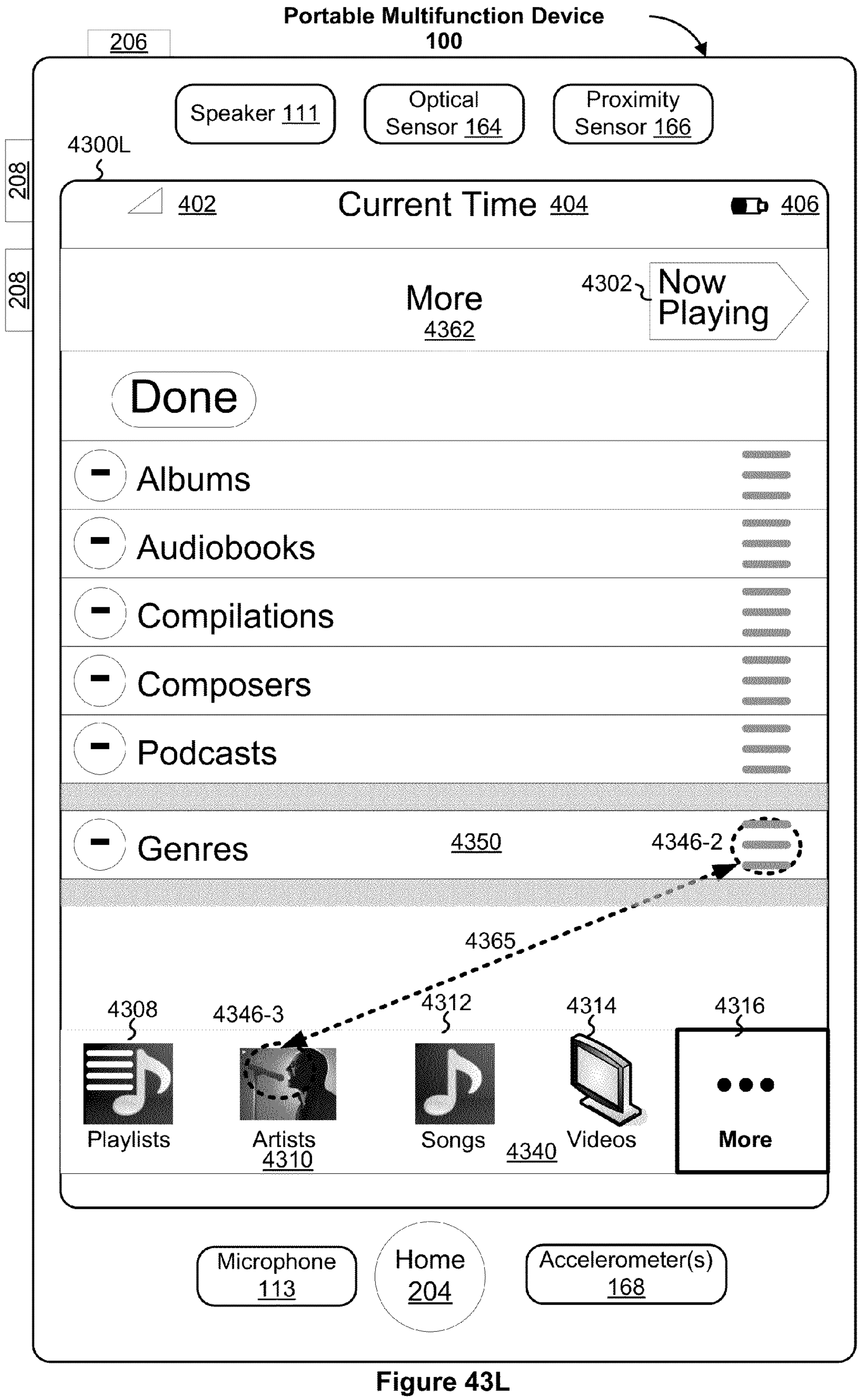
Figure 43M:
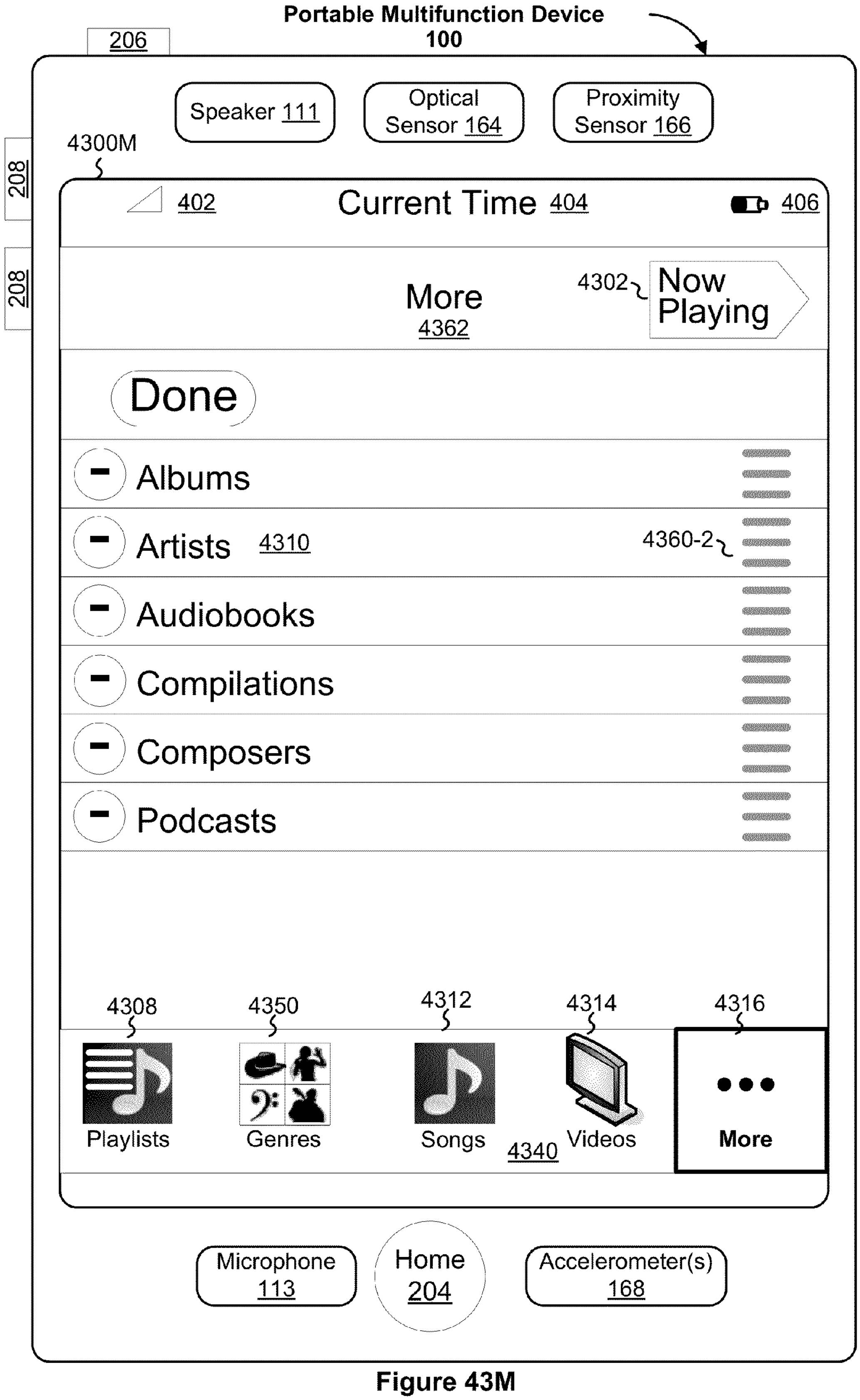
Figure 43N:
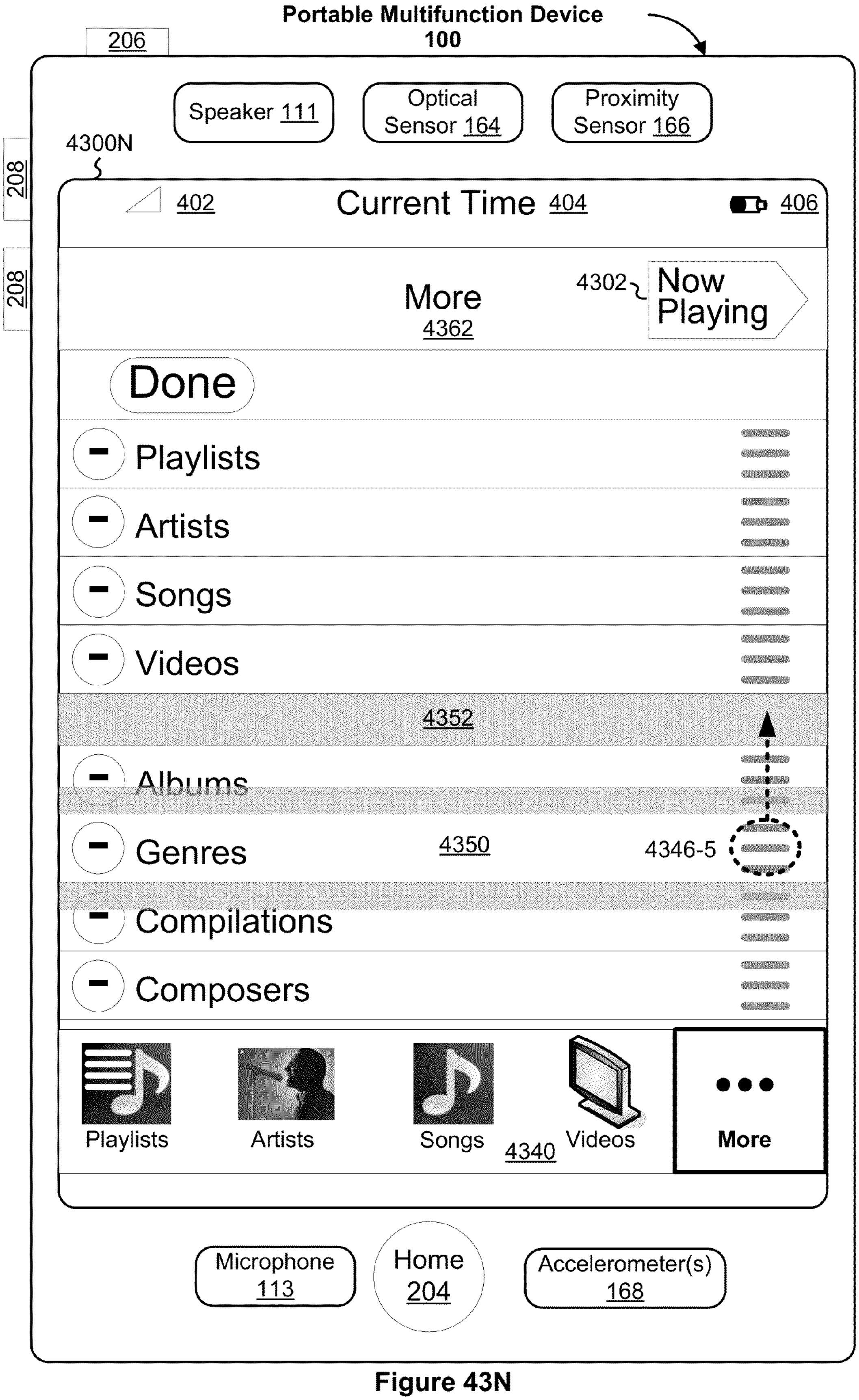
Figure 43O:
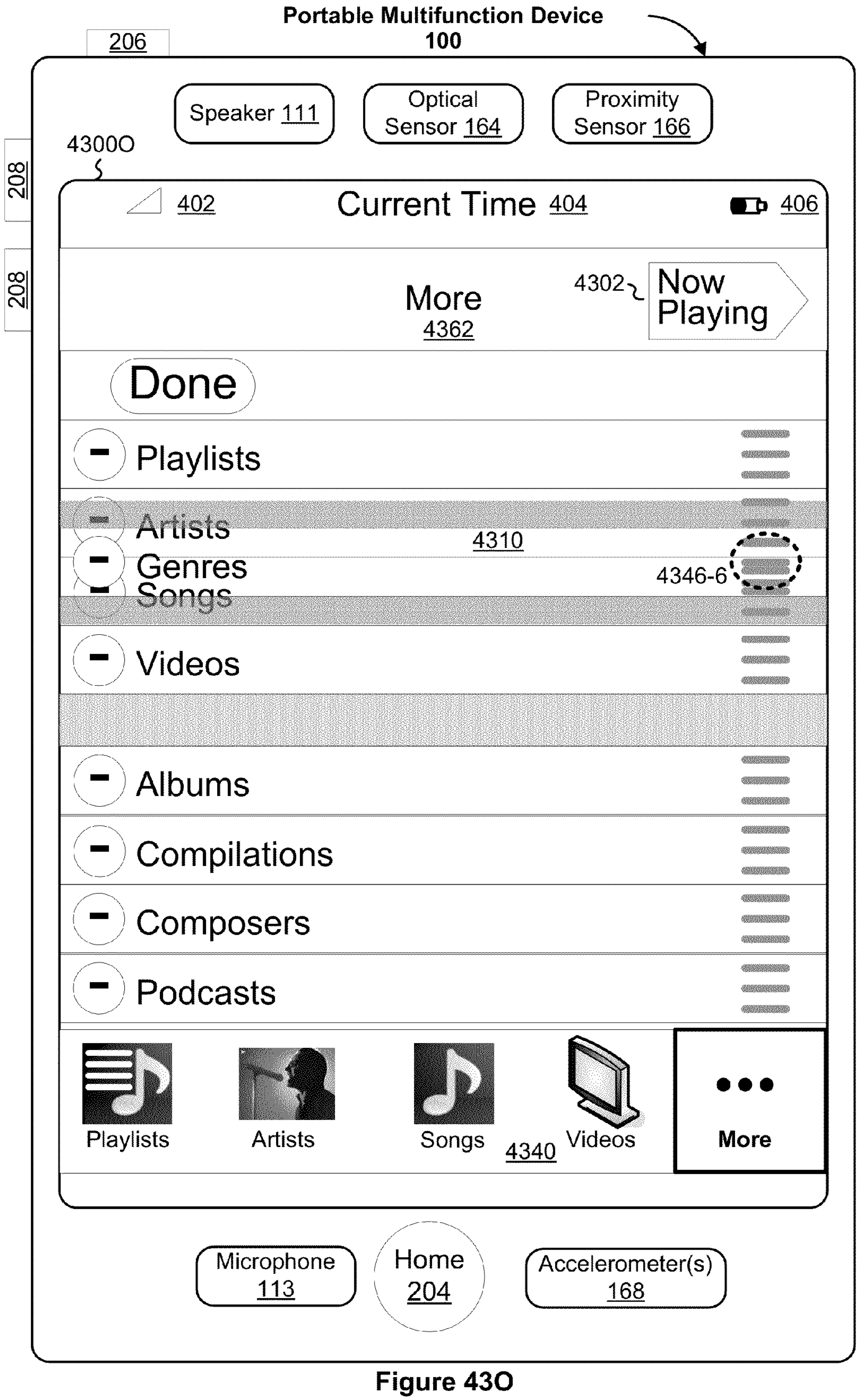
Figure 43P:
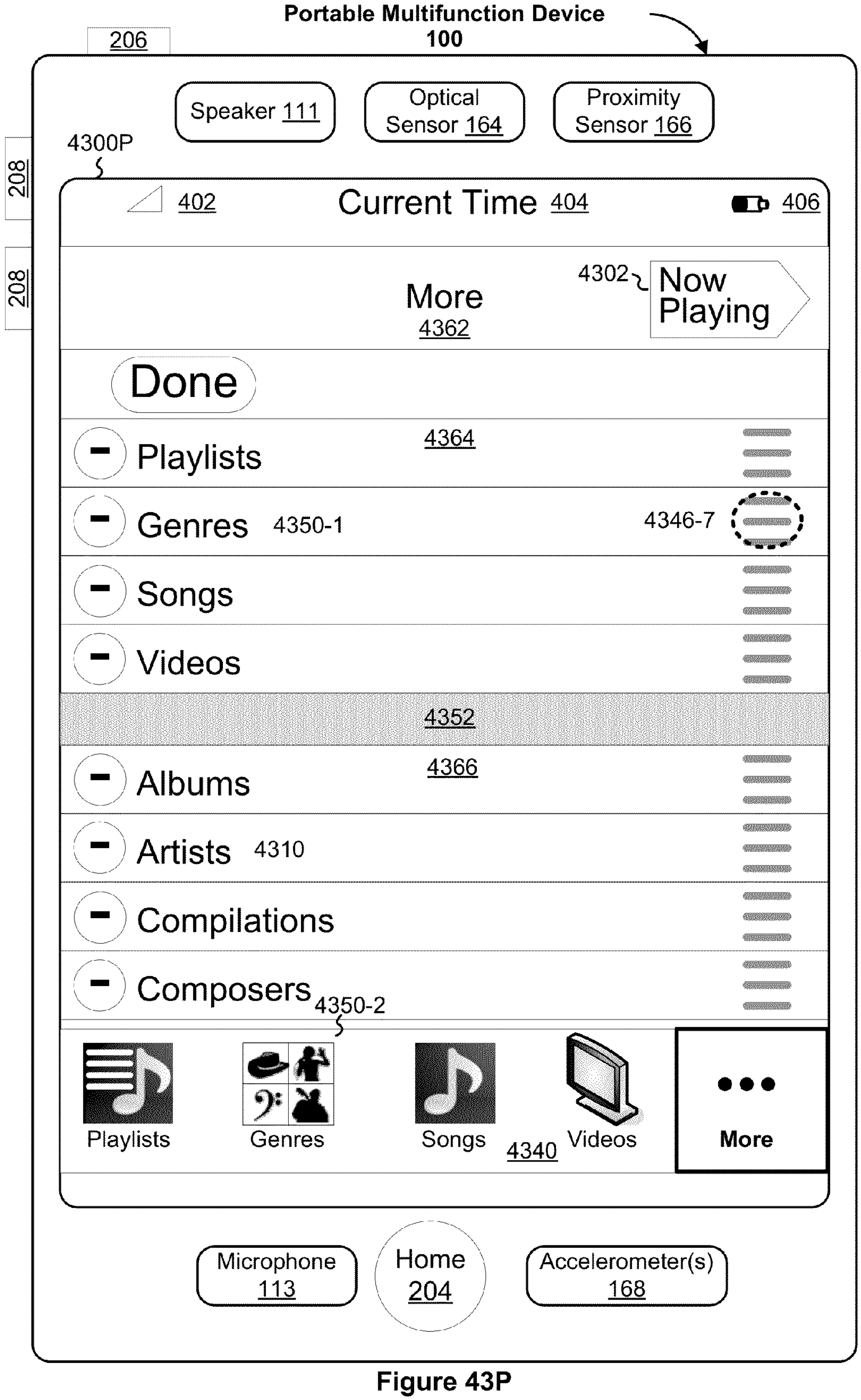
Figure 43Q:
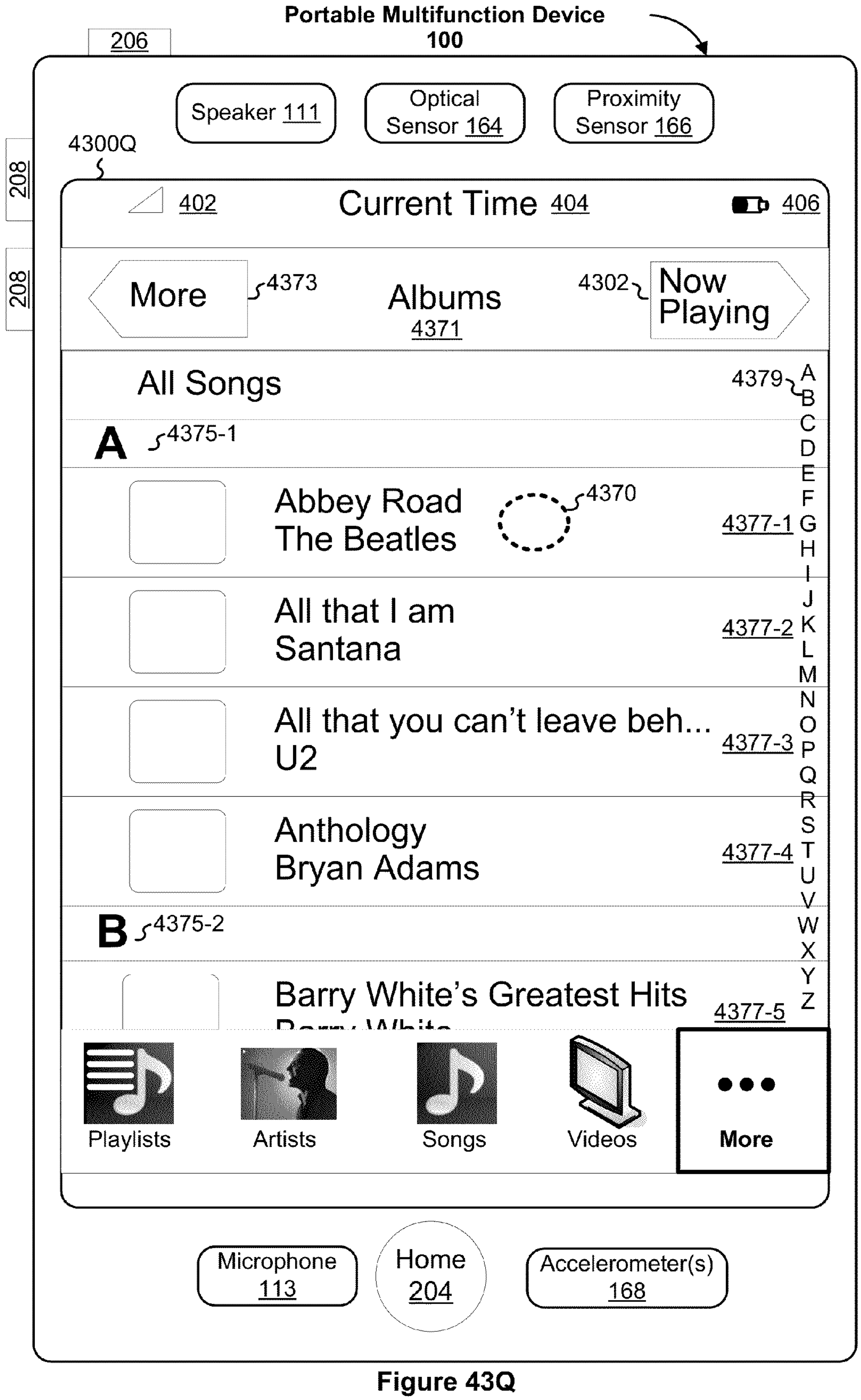
Figure 43R:
Figure 43S:

In some embodiments, the player 152 includes a now playing icon 4302 that when activated (e.g., by a finger tap on the icon) takes the user directly to a UI displaying information about the currently playing music (e.g., FIG. 43S).

In some embodiments, in response to a series of gestures (e.g., finger taps) by the user, the device displays a series of content categories and sub-categories. For example, if the user activates selection icon 4306 (e.g., by a finger tap on the icon) or, in some embodiments, taps anywhere in the Top 25 row 4318, the UI changes from a display of playlist categories (UI 4300A, FIG. 43A) to a display of the Top 25 sub-category (UI 4300B, FIG. 43B).

If just a portion of a category or sub-category is displayed, a vertical bar, analogous to the vertical bars described above, is displayed on top of the category/sub-category that helps a user understand what portion of the category/sub-category is being displayed (e.g., vertical bar 4320, FIG. 43B). In some embodiments, a user can scroll through the list of items in the category/sub-category by applying a vertical or substantially vertical swipe gesture 4322 to the area displaying the list. In some embodiments, a vertically downward gesture scrolls the list downward and a vertically upward gesture scrolls the list upward, In some embodiments, if the user scrolls to the top of the list and then continues to apply a scrolling gesture (e.g., 4324, FIG. 43C), background 4326-1 appears and the vertical bar 4320-1 may start to reduce in length to indicate to the user that the top of the list has been reached. When the user's finger breaks contact with the touch screen display, the list may move back to the top of the display and the background 4326-1 shrinks to nothing. Similarly, if the user scrolls to the bottom of the list and then continues to apply a scrolling gesture (e.g., 4328, FIG. 43D), background 4326-2 appears and the vertical bar 4320-2 may start to reduce in length to indicate to the user that the bottom of the list has been reached. When the user's finger breaks contact with the touch screen display, the list may move back to the bottom of the display and the background 4326-2 shrinks to nothing. This "rubber band-like" behavior at the terminus of lists may be applied to many other types of lists and documents that have vertical scrolling. Similar behavior may be applied to all of the edges of documents that can be translated in two dimensions (e.g., web pages, word processing documents, and photographs and other images). Additional description of this "rubber band-like" scrolling and translation behavior can be found in U.S. Provisional Patent Application Nos. 60/883,801, "List Scrolling And Document Translation On A Touch-Screen Display," filed Jan. 7, 2007; 60/945,858, "List Scrolling and Document Translation on a Touch-Screen Display," filed Jun. 22, 2007; and 60/946,971, "List Scrolling and Document Translation on a Touch-Screen Display," filed Jun. 28, 2007, the contents of which are hereby incorporated by reference.

In some embodiments, if the user activates artists icon 4310 (e.g., by a finger tap on the icon), the artists category will be displayed (FIG. 43E). In some embodiments, such as when the artists list is arranged alphabetically, an index item/symbol (e.g., the letter A 4330-1) may remain adjacent to a respective information item subset (e.g., artists 4332 whose name begins with the letter A). When scrolling up through the list of information items (e.g., in response to an upward swipe on the touch sensitive display by the user), the index item/symbol may move to the upper edge of a window (e.g., window 4336, FIG. 43F). As the scrolling continues (e.g., in response to gesture 4334, FIG. 43F), the index item/symbol may remain there until the end of the respective information item subset is reached, at which time the index item/symbol may be replaced with a subsequent index item/symbol (e.g., the letter B 4330-2). An analogous scrolling effect is shown for the Movies 4330-3 and Music Videos 4330-4 index items in UI 4300H and UI 4300I (FIGS. 43H and 43I). Additional description of such scrolling is described in U.S. patent application Ser. No. 11/322,547, "Scrolling List With Floating Adjacent Index Symbols," filed Dec. 23, 2005; Ser. No. 11/322,551, "Continuous Scrolling List With Acceleration," filed Dec. 23, 2005; and Ser. No. 11/322,553, "List Scrolling In Response To Moving Contact Over List Of Index Symbols," filed Dec. 23, 2005, which are hereby incorporated by reference.

In some embodiments, if the user activates songs icon 4312 (e.g., by a finger tap on the icon), the songs category will be displayed (FIG. 43G).

In some embodiments, if the user activates videos icon 4314 (e.g., by a finger tap on the icon), the video category will be displayed (FIG. 43H).

In some embodiments, the major content categories that are displayed in the first area 4340 of the display can be rearranged by a user to correspond to the user's preferred (favorite) categories (e.g., as illustrated in FIGS. 43J-43M and FIGS. 43N-43P). In some embodiments, activation of add category icon 4344 (e.g., by a finger tap on the icon) initiates display of a UI with a soft keyboard for adding user specified categories (not shown). In some embodiments, activation of edit icon 4342 in FIG. 43J (e.g., by a finger tap on the icon) initiates display of UI 4300K (FIG. 43K) with delete icons 4348 (which operate like delete icons 702, FIG. 7, as described above) and moving affordance icons 4360. As described below, moving affordance icons 4360 may be used as control icons that assist in rearranging categories or other UI objects.

In some embodiments, a portable multifunction device with a touch screen display with a plurality of user interface objects displays a first user interface object (e.g., genres icon 4350, FIG. 43K) and a second user interface object (e.g., artists icon 4310, FIG. 43K) on the touch screen display. In some embodiments, the first user interface object is one of a group of candidate icons (e.g., icons in the more list 4362, FIG. 43K, which are candidates for rearrangement) and the second user interface object is one of a group of user favorite icons (e.g., icons in area 4340).

A finger-down event is detected at the first user interface object (e.g., contact 4346-1, FIG. 43K). In some embodiments, the first user interface object includes a control icon (e.g., the horizontal bars comprising a moving affordance icon 4360 in genres icon 4350) and the finger-down event occurs at or near the control icon.

One or more finger-dragging events are detected on the touch screen display (e.g., the finger drag from 4346-1 (FIG. 43K) to 4346-2 (FIG. 43L) to 4346-3 via 4365 (FIG. 43L)).

The first user interface object is moved on the touch screen display along a path determined by the finger-dragging events until the first user interface object at least in part overlaps the second user interface object.

In some embodiments, while moving the first user interface object on the touch screen display, the first user interface object is displayed in a manner visually distinguishable from other user interface objects on the touch screen display (e.g., the shading around genres icon 4350 in FIG. 43L).

A finger-up event is detected at the second user interface object (e.g., ending contact at 4346-3, FIG. 43L).

The second user interface object (e.g., artists icon 4310, FIG. 43L) is visually replaced with the first user interface object (e.g., genres icon 4350, FIG. 43M).

In some embodiments, upon detecting the finger-up event, the first user interface object is displayed at a location formerly occupied by the second user interface object, and a movement of the second user interface object to a location formerly occupied by the first user interface object is animated (e.g., in FIG. 43M, artists 4310 is now part of the list that used to include genres 4350).

In some embodiments, the first user interface object is displayed in a first form before the finger-up event and in a second form after the finger-up event, and the second form is visually different from the first form. In some embodiments, the first form is a row including characters and at least one control icon (e.g., 4350, FIG. 43K) and the second form is an image or other graphic (e.g., 4350, FIG. 43M).

In some embodiments, the second user interface object is displayed in a first form before the finger-up event and in a second form after the finger-up event, and the second form is visually different from the first form. In some embodiments, the first form is an image or other graphic (e.g., 4310, FIG. 43K) and the second form is a row (e.g., 4310, FIG. 43M) including characters associated with at least one control icon (e.g., 4360-2, FIG. 43M). In some embodiments, the second form is a row including characters near, or within a predefined distance, corresponding to a hit region for the control icon.

In some embodiments, the first user interface object is one of a group of candidate icons and the second user interface object is one of a group of user favorite icons. In some embodiments, the remaining group of candidate icons is rearranged after moving the first user interface object away from its original location. The remaining group of candidate icons is the group of candidate icons excluding the first user interface object. Upon detecting the finger-up event, the first user interface object is displayed at a location formerly occupied by the second user interface object and a movement of the second user interface object to a location formerly occupied by one of the remaining group of candidate icons is animated.

FIGS. 43N-43P illustrate another way the major content categories that are displayed in the first area 4340 of the display can be rearranged by a user to correspond to the user's preferred (favorite) categories. The categories that are included in area 4340 may also be listed in a first list area 4364 in the more list 4362 (e.g., above separator 4352 in the more list 4362), with the candidate categories listed in a second list area 4366 in the more list 4362 (e.g., below separator 4352 in the more list 4362). In response to detection of a finger down event (e.g., 4346-5, FIG. 43N); one or more finger dragging events (e.g., from 4346-5 to 4346-6 (FIG. 43O) to 4346-7 (FIG. 43P)); and a finger up event (e.g., at 4346-7), a first user interface object (e.g., genres icon 4350) may replace a second user interface object (e.g., artists icon 4310) in both the first list area 4364 and in area 4340 (e.g., 4350-1 and 4350-2, FIG. 43P), with the second user interface object moving to the second list area 4366 (e.g., 4310, FIG. 43P).

In some embodiments, a portable multifunction device displays a first group of user interface objects on the touch screen display (e.g., icons in the more list 4362, FIG. 43K, which are candidates for rearrangement). A second group of user interface objects is displayed on the touch screen display (e.g., icons in area 4340). A finger-down event is detected on the touch screen display (e.g., contact 4346-1, FIG. 43K). A first user interface object (e.g., genres icon 4350, FIG. 43K) in the first group at which the finger-down event occurs is identified. One or more finger-dragging events are detected on the touch screen display (e.g., the finger drag from 4346-1 (FIG. 43K) to 4346-2 (FIG. 43L) to 4346-3 via 4365 (FIG. 43L)). The first user interface object on the touch screen display is moved in accordance with the finger-dragging events. A finger-up event is detected on the touch screen display (e.g., ending contact at 4346-3, FIG. 43L). A second user interface object (e.g., artists icon 4310, FIG. 43K) in the second group at which the finger-up event occurs is identified. The second user interface object is visually replaced with the first user interface object (e.g., artists icon 4310 in FIG. 43L is visually replaced with genres icon 4350 in FIG. 43M).

Additional description of user interface object reconfiguration can be found in U.S. Provisional Patent Application No. 60/937,990, "Portable Multifunction Device, Method, and Graphical User Interface Supporting User Navigations of Graphical Objects on a Touch Screen Display," filed Jun. 29, 2007, the content of which is hereby incorporated by reference.

U.S. Provisional Patent Application No. 60/936,562, "Portable Multifunction Device, Method, and Graphical User Interface for Playing Online Videos," filed Jun. 20, 2007, the content of which is hereby incorporated by reference, describes a way that major online video content categories can be rearranged by a user to correspond to the user's preferred (favorite) categories. The teachings in that application are also applicable here to rearranging major music and/or video categories.

Referring again to the user interface 4300J in FIG. 43J, a list of content categories (e.g., Albums) is displayed on the touch screen display. FIGS. 43Q-43T and 43W-43AA are exemplary user interfaces illustrating these content categories in detail in accordance with some embodiments.

FIG. 43Q is an exemplary user interface for Albums category 4371, which is displayed in response to a user selection of the corresponding album category icon in FIG. 43J. In some embodiments, user interface 4300Q includes the following elements, or a subset or superset thereof:

- More icon 4373, which, if selected (e.g., by a finger tap on the icon), brings back display of user interface 4300J;
- Now Playing icon 4302 that when activated (e.g., by a finger tap on the icon) takes the user directly to a UI displaying information about the currently playing content (e.g., FIG. 43S);
- One or more alphabetic icons 4375-1, 4375-2;
- One or more individual album icons 4377-1 to 4377-5, which are grouped under different alphabetic icons; and
- Alphabetic list 4379 that helps a user to navigate quickly through the list of albums to albums beginning with a particular letter.

FIG. 43R is an exemplary user interface for presenting tracks (e.g., songs) within an album, which is displayed in response to a user selection 4370 of an individual album (e.g., "Abbey Road" 4377-1 in FIG. 43Q). In some embodiments, user interface 4300R includes the following elements, or a subset or superset thereof:

- Albums icon 4374, which, if selected (e.g., by a finger tap on the icon), brings back display of user interface 4300Q;
- Now Playing icon 4302, described above;
- Shuffle song playing order icon 4376;
- One or more individual song icons 4372-1 to 4375-7; and
- Vertical bar 4398, analogous to the vertical bars described above, which is displayed on top of the list of tracks in the album and which helps a user understand what portion of the list of tracks is being displayed.

FIG. 43S is an exemplary user interface for playing a track, which is displayed in response to a user selection (e.g., by gesture 4378 in FIG. 43R) of an individual track (e.g., "Come together" 4372-1 in FIG. 43R) or now playing icon 4302. In some embodiments, user interface 4300S includes the following elements, or a subset or superset thereof:

- Back icon 4380-1, which, if selected (e.g., by a finger tap on the icon), brings back display of the previous user interface (e.g., 4300R);
- Cover flip icon 4380-2, which, if selected (e.g., by a finger tap on the icon), flips the album cover 4380-4 over and displays a list of tracks in the album;
- Repeat track play icon 4380-7, which, if selected (e.g., by a finger tap on the icon), repeats the currently playing track;
- Shuffle track play icon 4380-8 which, if selected (e.g., by a finger tap on the icon), plays the tracks on the album in a random order;
- Progress bar 4380-3 that indicates what fraction of the track has been played and that may be used to help scroll through the track in response to a user gesture;
- Album Cover 4380-4 that corresponds to the track, which may be automatically generated by the device or imported into the device from a different source; and
- Music play control icons 4380-5, which may include a Fast Reverse/Skip Backwards icon, a Fast Forward/Skip Forward icon, a Volume adjustment slider icon, a Pause icon, and/or a Play icon (not shown, which toggles with the Pause icon) that behave in an analogous manner to icons 2320, 2322, 2324, 2306, and 2304 described above with respect to the video player (FIGS. 23A-23D).

In some embodiments, the repeat track play icon 4380-7, the progress bar 4380-3, and the shuffle track play icon 4380-8 appear on the touch screen display in response to a finger gesture on the display.

In some embodiments, the music play control icons 4380-5 appear on the touch screen display whenever a finger contact with the display is detected. The icons 4380-5 may stay on the display for a predefined time period (e.g., a few seconds) and then disappear until the next finger contact with the touch screen display is detected.

Figure 43T:
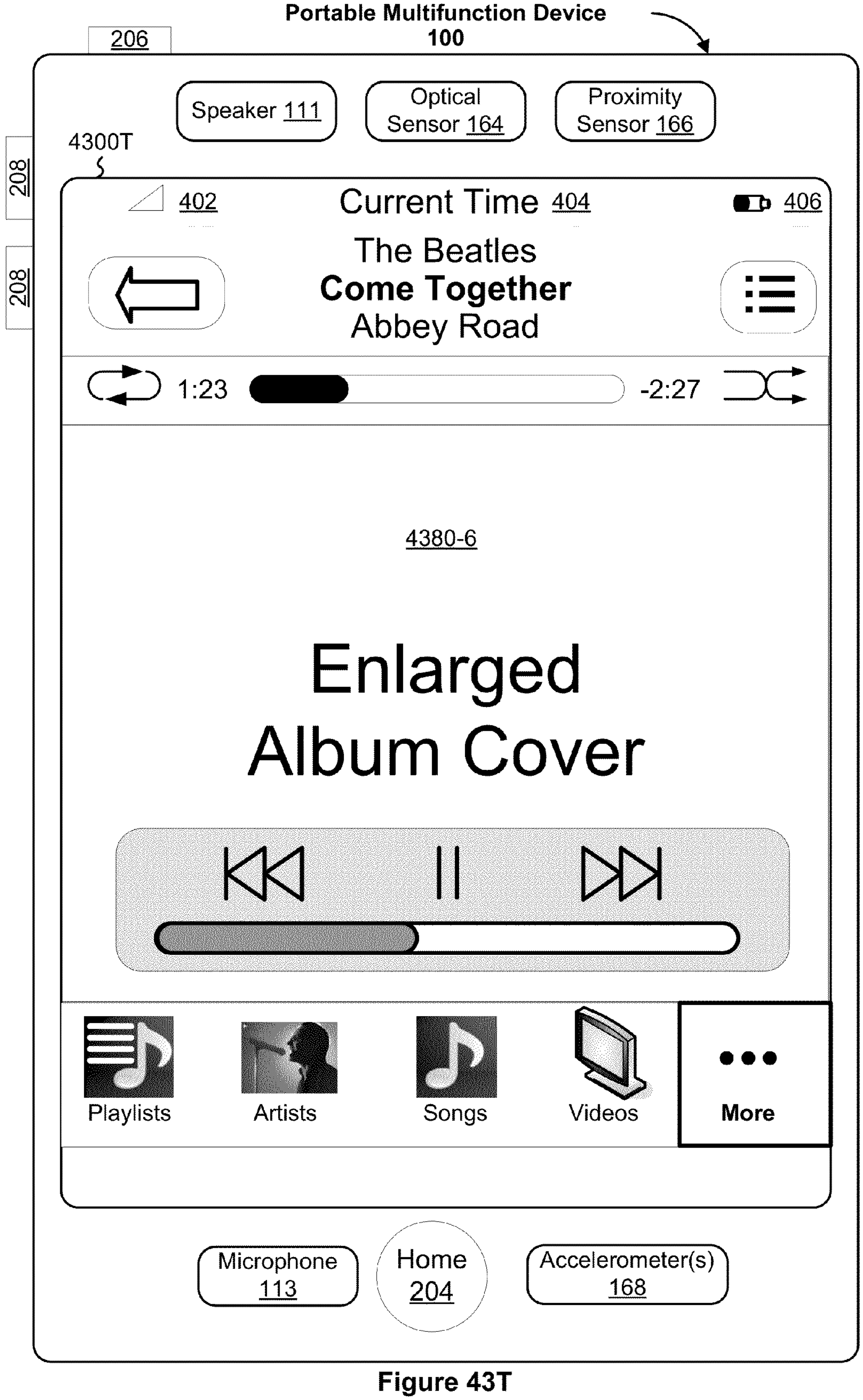

FIG. 43T is an exemplary user interface of an enlarged album cover, which may be displayed in response to a user selection 4381 of the album cover 4380-4 in FIG. 43S. In some embodiments, user interface 4300T includes the same elements shown in FIG. 43S, except, user interface 4300T includes an enlarged version 4380-6 of the album cover 4380-4.

In light of the description above of the Album category, the operation of other content categories in the More list (FIG. 43J) will be apparent to one skilled in the art.

Figure 43U:
Figure 43V:
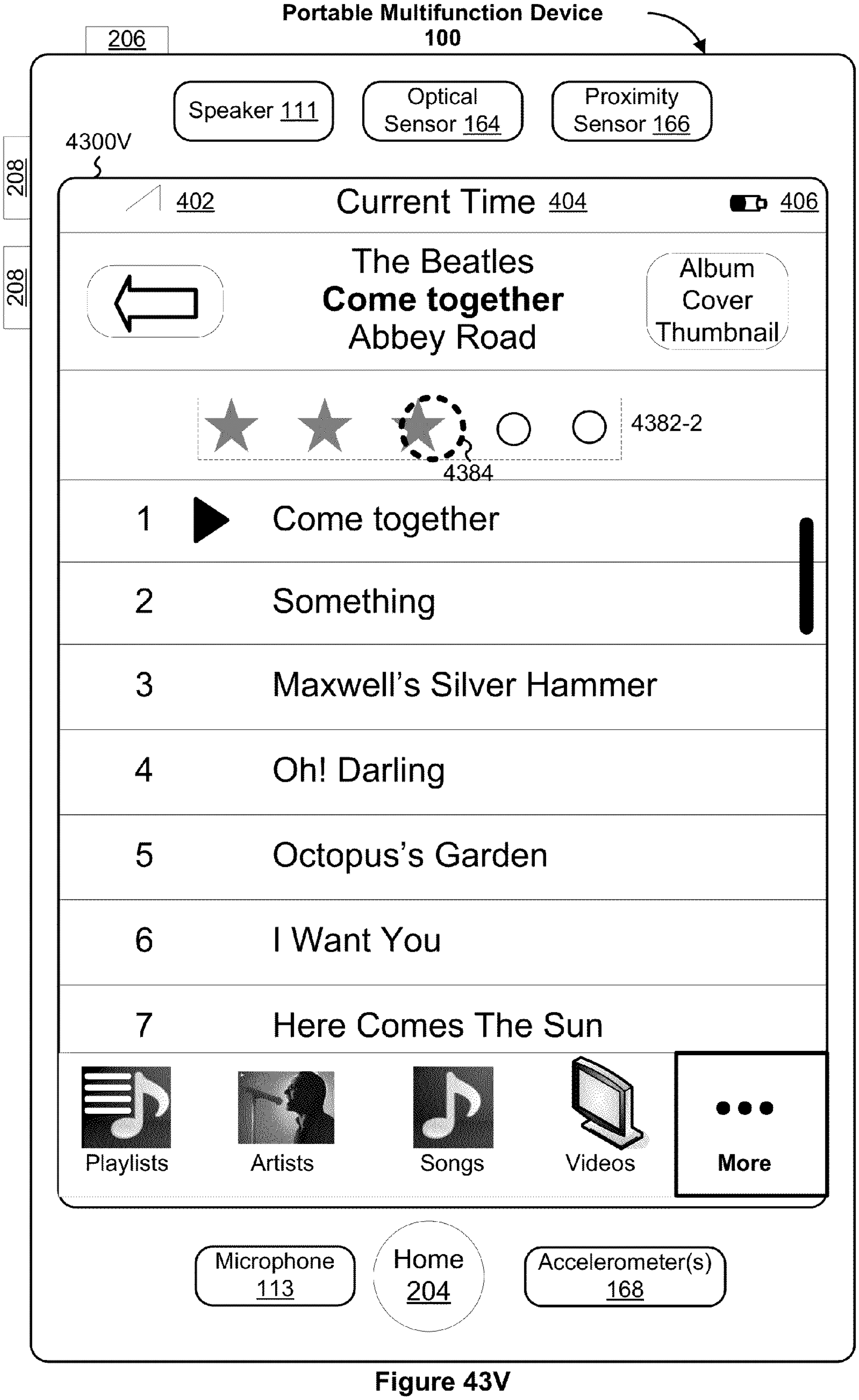
Figure 43W:
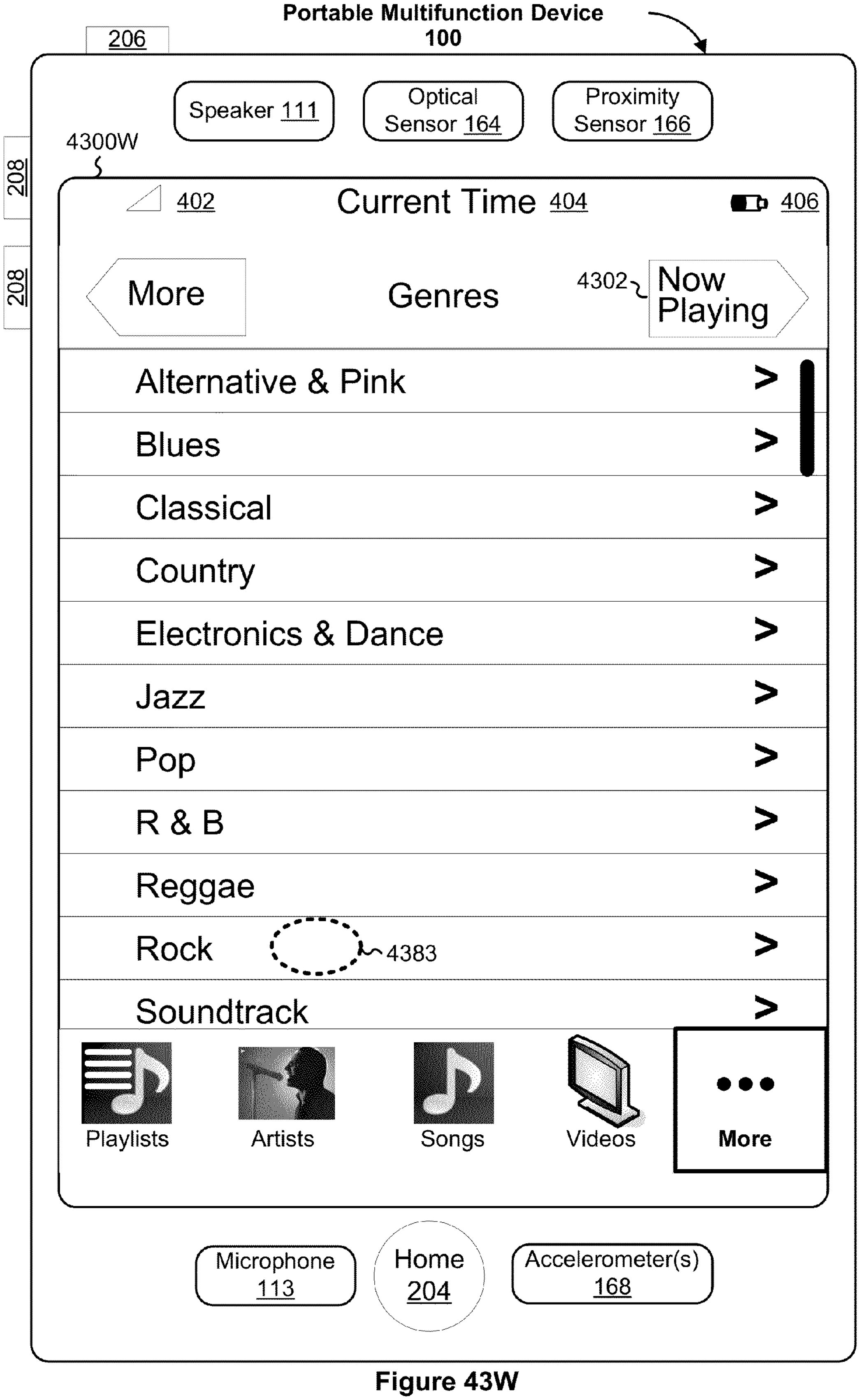

For example, FIG. 43W is an exemplary user interface for a Genres category, which is displayed in response to a user selection of the corresponding category icon in FIG. 43J. Each music genre occupies one row on the touch screen. A user can scroll through the list by vertical finger swipes.

Figure 43X:
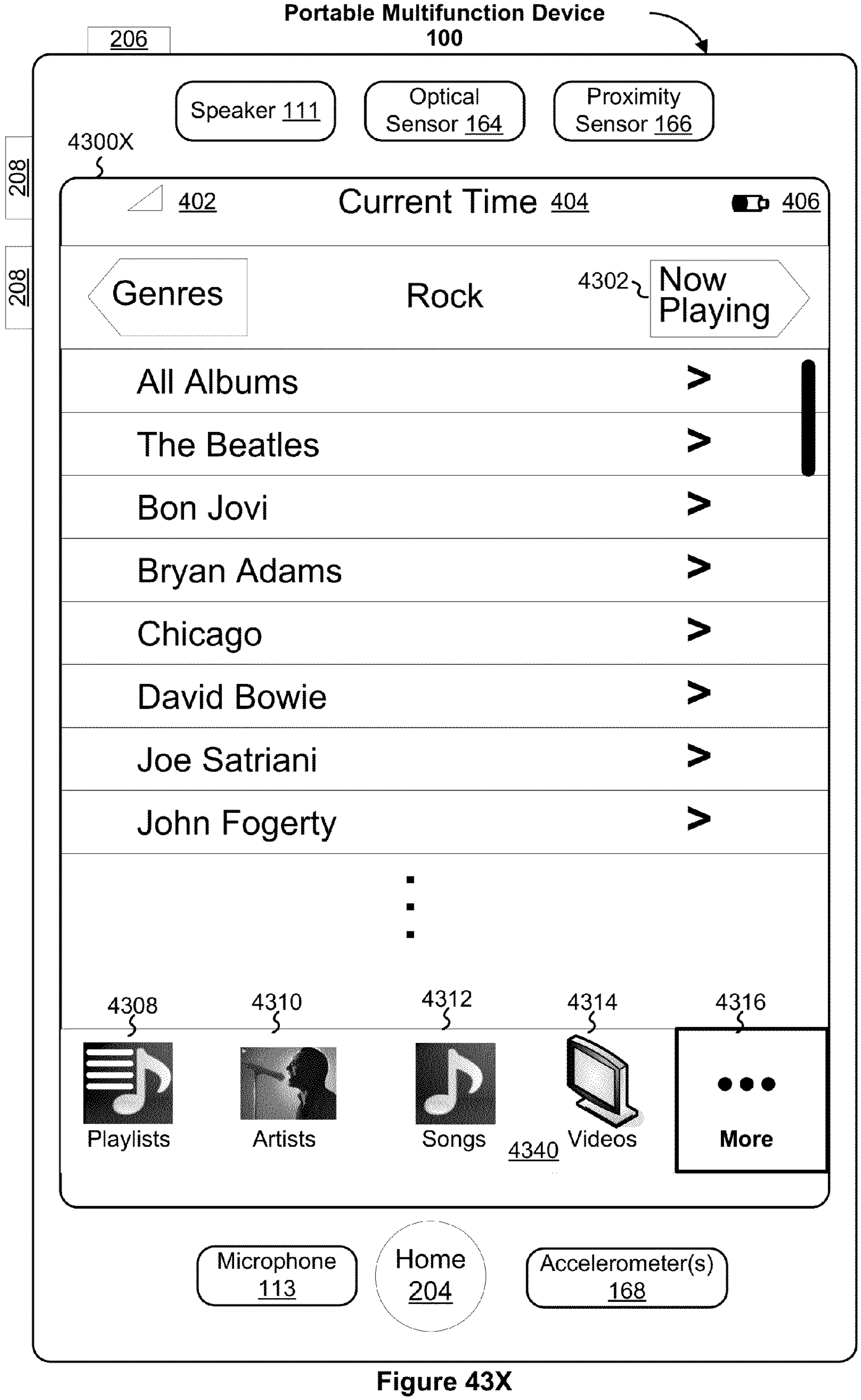

FIG. 43X is an exemplary user interface for a particular genre, which is displayed in response to a user selection (e.g., by gesture 4383 in FIG. 43W) of one individual album (e.g., "Rock" in FIG. 43W). Exemplary information presented in UI 4300X may include songs and albums, music bands and artists associated with the particular genre.

Figure 43Y:
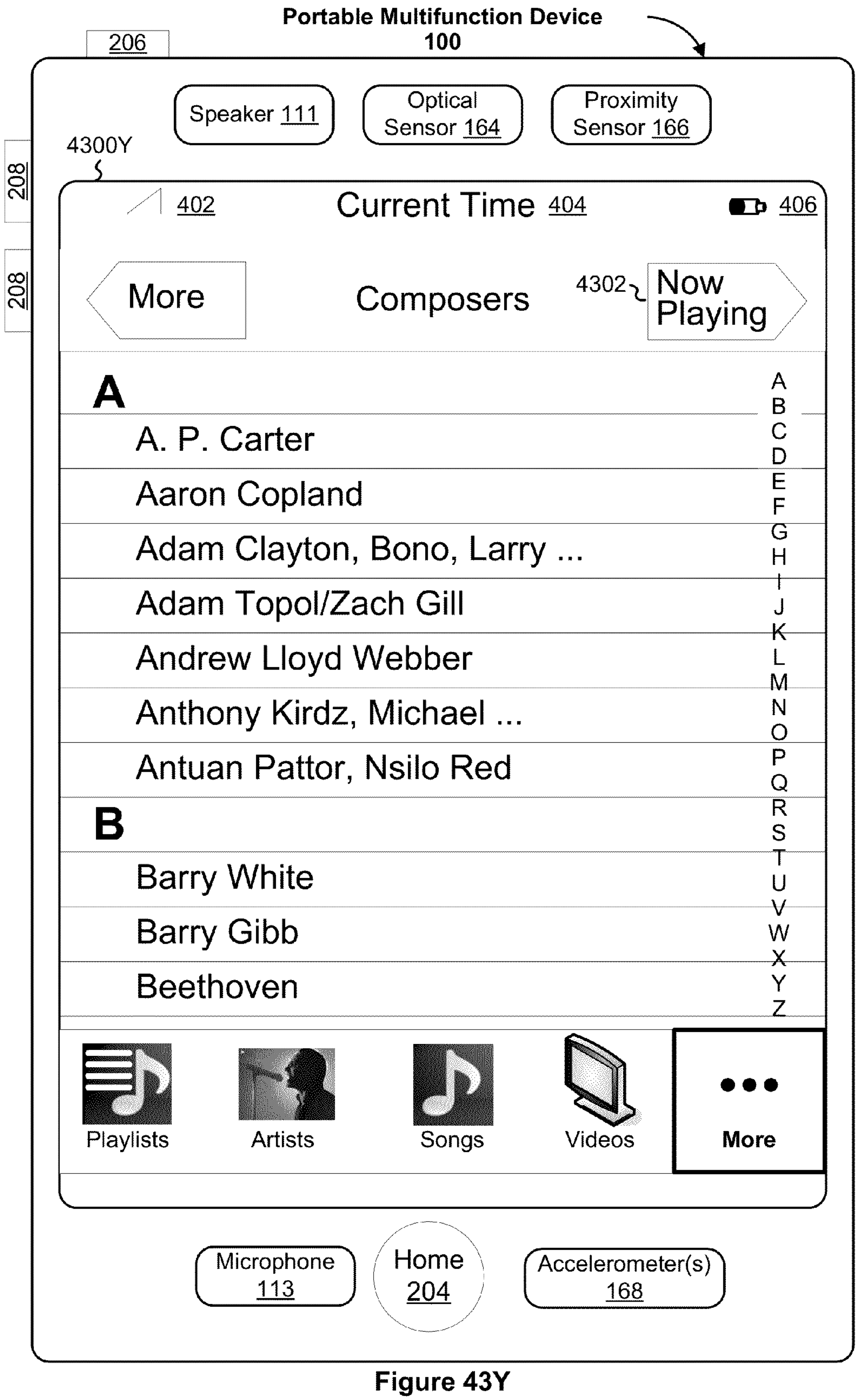

FIG. 43Y is an exemplary user interface for a Composers category, which is displayed in response to a user selection of the corresponding category icon in FIG. 43J.

Figure 43Z:
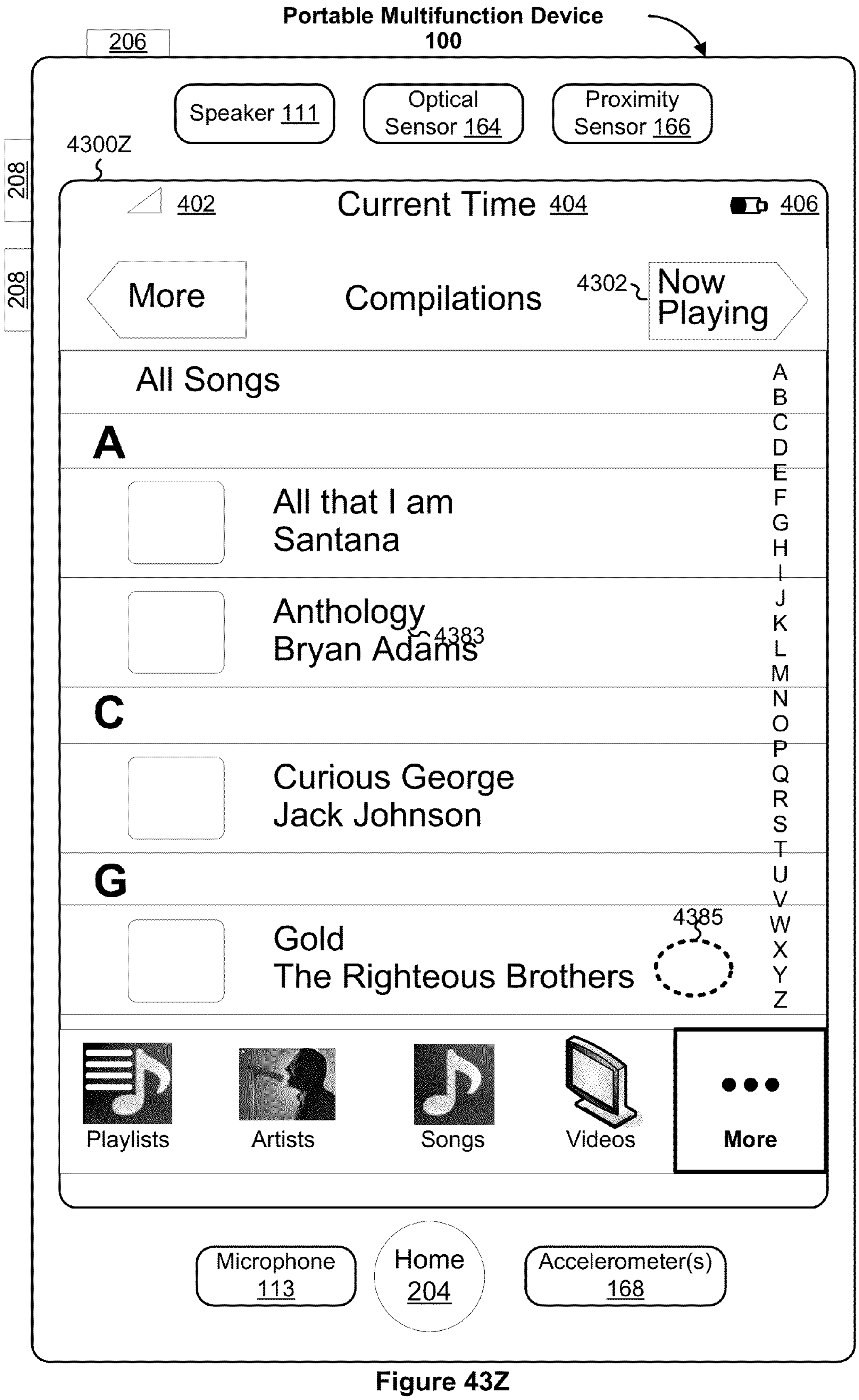
Figure 43A:
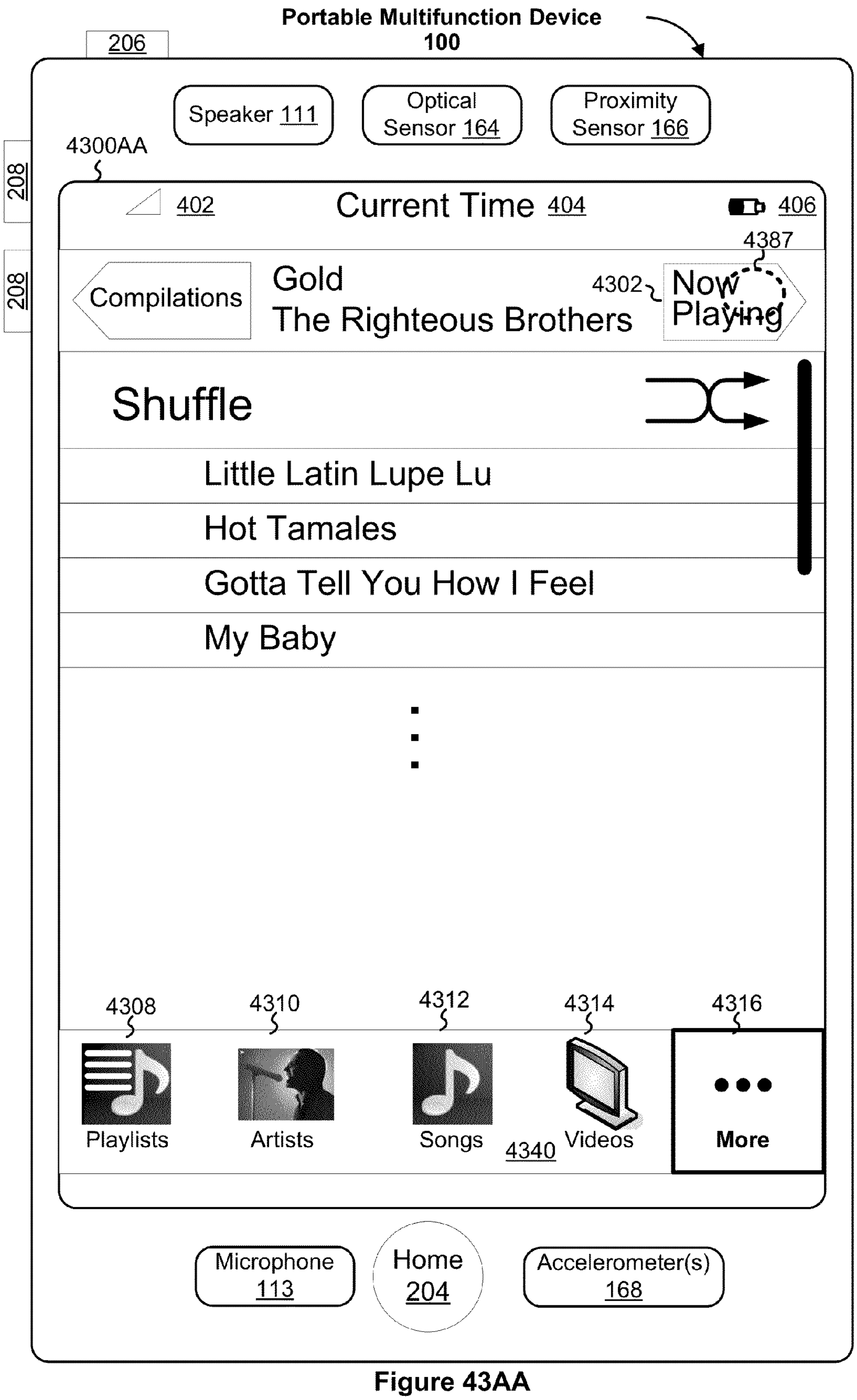
Figure 43B:
Figure 43C:
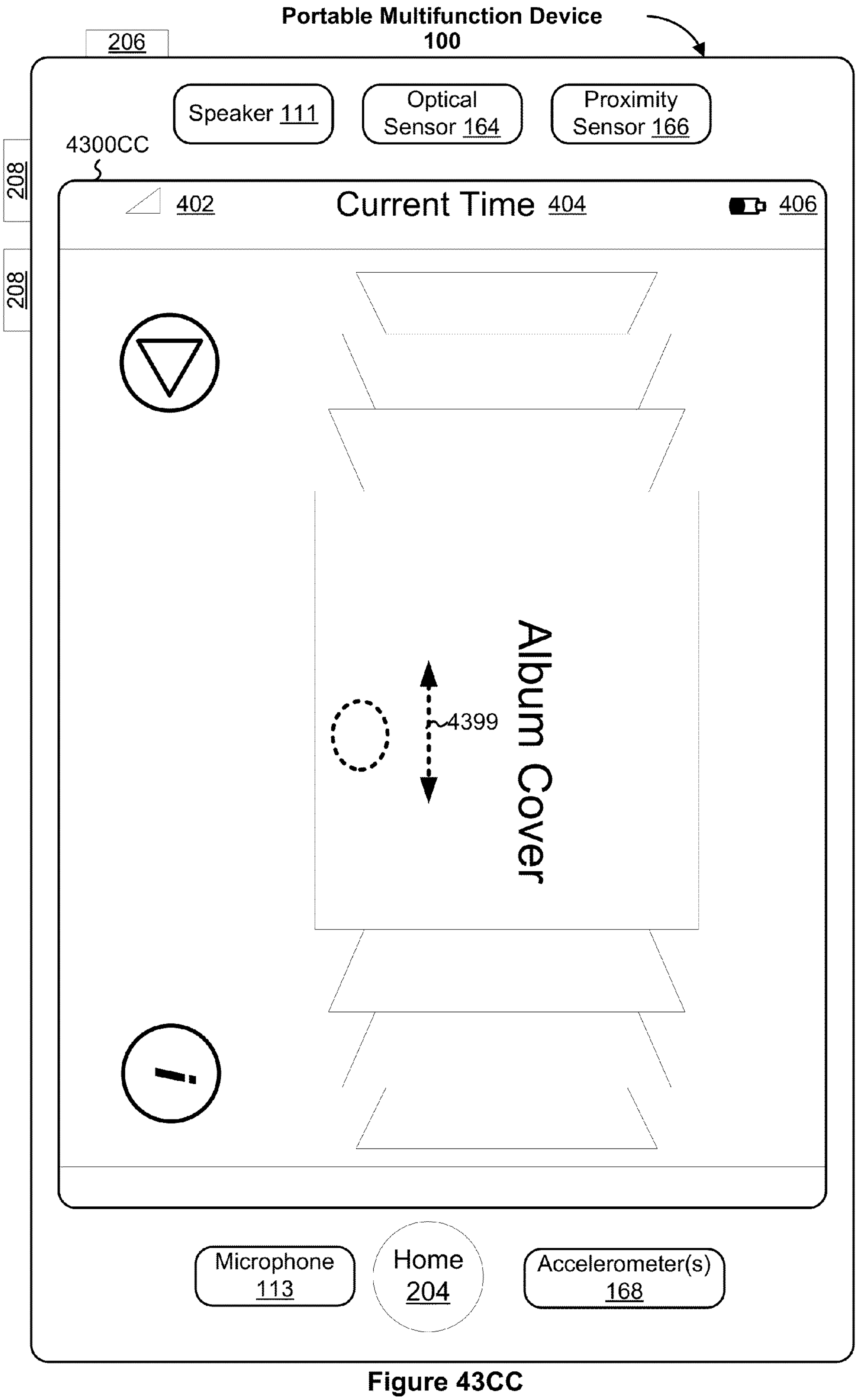
Figure 43D:
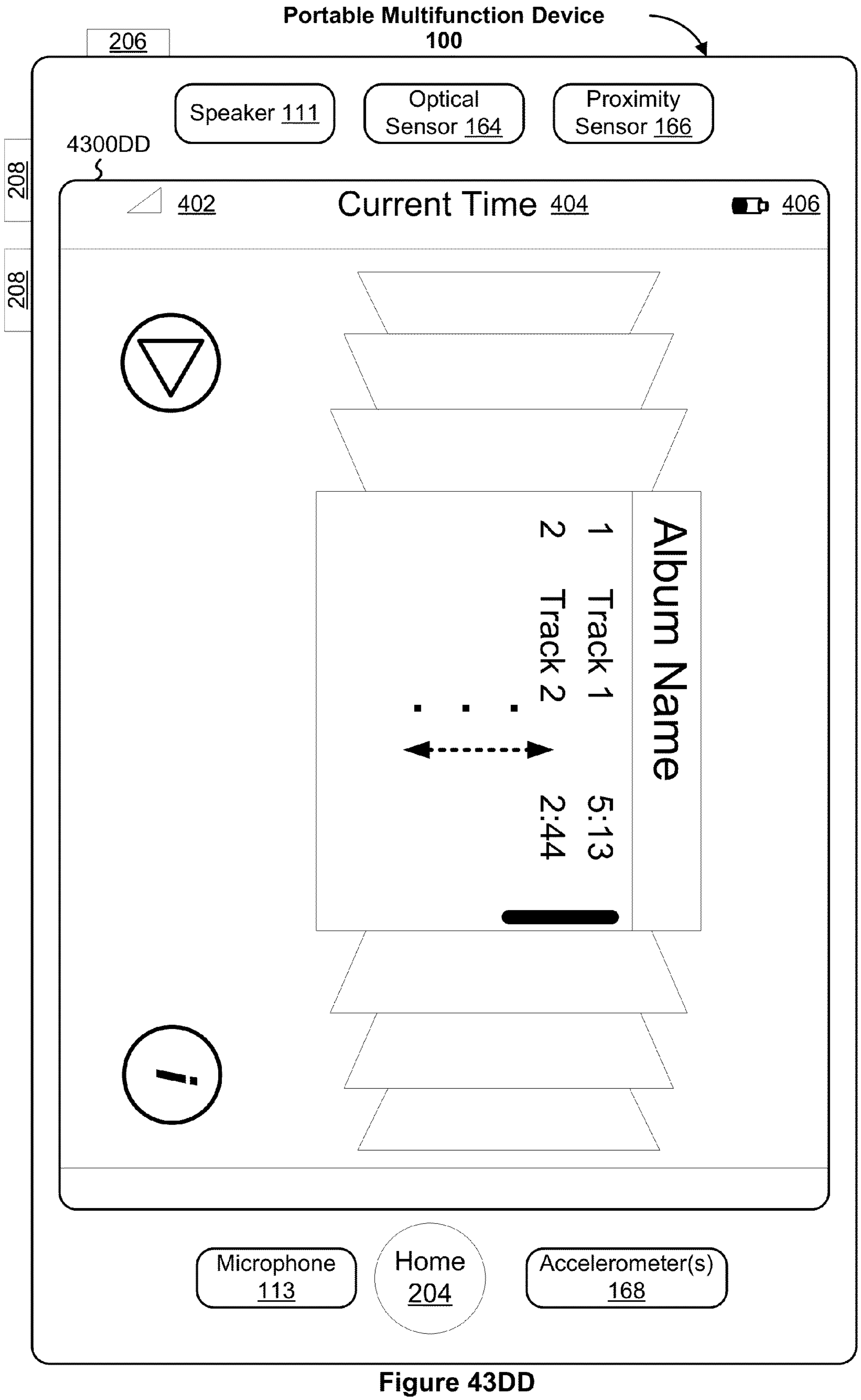

FIG. 43Z is an exemplary user interface for a Compilations category, which is displayed in response to a user selection of the corresponding category icon in FIG. 43J.

FIG. 43AA is an exemplary user interface for a particular compilation, which is displayed in response to a user selection (e.g., by gesture 4385 in FIG. 43Z) of an individual compilation (e.g., "Gold" in FIG. 43Z). Exemplary information presented in UI 4300AA may include the songs associated with the particular compilation.

FIG. 43BB is an exemplary user interface for a song currently being played in response to a user selection (e.g., by gesture 4387 in FIG. 43AA) of the Now Playing icon 4302 in FIG. 43AA. In this particular example, the song currently being played is still "Come Together" from the album "Abbey Road". Therefore, user interface 4300BB is virtually the same as user interface 4300S except that the played timestamp and remaining timestamp have been altered.

As illustrated in FIG. 43U and FIG. 43V, a user rating may be applied to an item of content with a finger gesture.

In some embodiments, a portable multifunction device displays a series of ratings indicia (e.g., 4382, FIGS. 43U and 43V) on a touch screen display. The ratings indicia comprise a lowest rating indicia and one or more progressively higher rating indicia. In some embodiments, the ratings indicia comprise stars (e.g., 4382-2, FIG. 43V). In some embodiments, the series of ratings indicia consists of five stars.

A finger gesture (e.g., 4384, FIG. 43V) by a user is detected on one or more of the ratings indicia, wherein the finger gesture contacts a last rating indicia immediately prior to breaking contact with the touch screen display (e.g., the third rating indicia in FIG. 43V). In some embodiments, the finger gesture contacts the lowest rating indicia prior to contacting one or more of the progressively higher rating indicia. In some embodiments, the finger gesture is a swipe gesture.

A rating corresponding to the last rating indicia contacted by the finger gesture is used as input to a function or application in the device. For example, the three-star rating for the song "Come Together" in FIG. 43V may be used to sort this content versus other content in the device and/or to determine how often this content is heard when content is played in a random order (e.g., shuffle mode 4368, FIG. 43R).

In some embodiments, the rating corresponding to the last rating indicia contacted by the finger gesture is used to give a rating for an item of content that is playable with a content player application on the device. In some embodiments, the item of content is an item of music and the content player application is a music player application. In some embodiments, the item of content is a video and the content player application is a video player application.

In some embodiments, the rating corresponding to the last rating indicia contacted by the finger gesture is used to give a rating for content on a web page that is viewable with a browser application on the device.

A graphical user interface on a portable multifunction device with a touch screen display comprises a series of ratings indicia 4382 on the touch screen display. The ratings indicia comprise a lowest rating indicia and one or more progressively higher rating indicia. In response to detecting a finger gesture by a user on one or more of the ratings indicia, wherein the finger gesture contacts a last rating indicia immediately prior to breaking contact with the touch screen display, a rating corresponding to the last rating indicia contacted by the finger gesture is used as input to a function or an application in the device.

As illustrated in FIGS. 43BB-43DD, an application may change modes in response to a change in orientation of the device, with the two modes differing by more than a mere change in display orientation.

In some embodiments, a portable multifunction device with a rectangular touch screen display, which includes a portrait view and a landscape view, detects the device in a first orientation.

While the device is in the first orientation, an application is displayed in a first mode on the touch screen display in a first view (e.g., a hierarchical list mode for selecting music as illustrated in FIG. 43A, FIG. 43J, FIG. 43Q, FIG. 43R, and FIG. 43BB).

The device is detected in a second orientation. In some embodiments, the first orientation and the second orientation are detected based on an analysis of data from one or more accelerometers (e.g., 168). In some embodiments, the first orientation is rotated substantially 90° from the second orientation (e.g., by rotation 4392, FIG. 43BB to FIG. 43CC).

In response to detecting the device in the second orientation, the application is displayed in a second mode on the touch screen display in a second view (e.g., FIG. 43CC).

The first mode of the application differs from the second mode of the application by more than a change in display orientation. The application displays distinct or additional information in one of the first and second modes relative to the other of the first and second modes.

In some embodiments, the first view is the portrait view (e.g., FIG. 43A, FIG. 43J, FIG. 43Q, FIG. 43R, or FIG. 43BB) and the second view is the landscape view (e.g., FIG. 43CC). In some embodiments, substantially vertical finger gestures on or near the touch screen display are used to navigate in the first mode and substantially horizontal finger gestures (e.g., swipe gesture 4399, FIG. 43CC) on or near the touch screen display are used to navigate in the second mode.

In some embodiments, the first view is the landscape view and the second view is the portrait view.

In some embodiments, the rectangular touch screen display has a long axis and a short axis; the first orientation comprises a substantially vertical orientation of the long axis; the second orientation comprises a substantially vertical orientation of the short axis; the first view is the portrait view (e.g., UI 4300BB, FIG. 43BB); and the second view is the landscape view (e.g. UI 43CC, FIG. 43CC).

In some embodiments, the application is a music player, the first mode is a hierarchical list mode for selecting music (e.g., FIG. 43A to more list, FIG. 43J, to albums list, FIG. 43Q, to album content list FIG. 43R, to content, FIG. 43S/43BB), the first view is the portrait view, the second mode is a cover flow mode for selecting albums (e.g., FIG. 43CC), and the second view is the landscape view. The cover flow mode and other image modes are described in U.S. Provisional Patent Application No. 60/843,832, "Techniques And Systems For Browsing Media Content," filed Sep. 11, 2006; U.S. patent application Ser. No. 11/519,460, "Media Manager With Integrated Browsers," filed Sep. 11, 2006; and U.S. Provisional Patent Application No. 60/879,746, "Electronic Device With Image Based Browsing," filed Jan. 5, 2007, which are hereby incorporated by reference. In some embodiments, in response to detecting a finger gesture on an album cover (e.g., gesture 4388, FIG. 43CC) or on an information icon (e.g., 4389, FIG. 43CC), the album cover is flipped over and information about tracks on the album is displayed (FIG. 43DD).

In some embodiments, the application is an address book, the first mode is a list mode for displaying entries in the address book, the first view is the portrait view, the second mode is an image mode for displaying images associated with corresponding entries in the address book, and the second view is the landscape view.

In some embodiments, the application is a world clock, the first mode is a list mode for displaying a list of time zones, the first view is the portrait view, the second mode is a map mode for displaying one or more time zones in the list of time zones on a map, and the second view is the landscape view.

In some embodiments, the application is a calendar. In some embodiments, the application is a photo management application. In some embodiments, the application is a data entry application.

A graphical user interface on a portable multifunction device with a rectangular touch screen display with a portrait view and a landscape view comprises a first mode of an application that is displayed in the portrait view and a second mode of the application that is displayed in the landscape view. In response to detecting the device in a first orientation, the first mode of the application is displayed in the portrait view. In response to detecting the device in a second orientation, the second mode of the application is displayed in the landscape view. The first mode of the application differs from the second mode of the application by more than a change in display orientation.

Such mode changes based on device orientation make the device easier to use because the user does not have to navigate through one or more display screens to get to a desired second mode or remember how to perform such navigation. Rather, the user merely needs to change the orientation of the device.

Additional description of mode changes based on device orientation can be found in U.S. Provisional Patent Application No. 60/947,300, "Modal Change Based on Orientation of a Portable Multifunction Device," filed Jun. 29, 2007, the content of which is hereby incorporated by reference.

FIGS. 44A-44J illustrate portrait-landscape rotation heuristics in accordance with some embodiments.

In some embodiments, information in some applications is automatically displayed in portrait view or landscape view in device 100 based on an analysis of data from the one or more accelerometers 168. A user gesture (e.g. 4402, FIG. 44B), however, can override the view that is automatically chosen based on the accelerometer data. In some embodiments, the override ends when a second gesture (e.g., 4404, FIG. 44H) is detected (as described in Example 1 and Example 2 below, as illustrated by FIGS. 44A-44E and 44G-44J). In some embodiments, the override ends when the device is placed in an orientation where the displayed view matches the view recommended automatically based on the accelerometer data (as described in Example 3 and Example 4 below, as illustrated by FIGS. 44A-44F). In some embodiments, the override ends after a predetermined time. In some embodiments, the override ends when the user changes applications or goes back to the menu screen (FIG. 4A or 4B). These override termination heuristics make the device easier to use because either a simple gesture is used to end the override or the override ends automatically based on predefined criteria.

Example 1

In some embodiments, a portable multifunction device with a rectangular touch screen display and one or more accelerometers displays information on the rectangular touch screen display in a portrait view (e.g., FIG. 44A) or a landscape view (e.g., FIG. 44B) based on an analysis of data received from the one or more accelerometers.

A first predetermined finger gesture (e.g., gesture 4402, FIG. 44B) is detected on or near the touch screen display while the information is displayed in a first view.

In response to detecting the first predetermined finger gesture, the information is displayed in a second view (e.g., FIG. 44C) and the display of information is locked in the second view, independent of the orientation of the device (e.g., the display is locked in portrait view in FIGS. 44C, 44D, 44E, and 44G). In some embodiments, the first view is the landscape view (e.g., FIG. 44B) and the second view is the portrait view (e.g., FIG. 44A). In some embodiments, the first view is the portrait view and the second view is the landscape view.

Figure 44A:
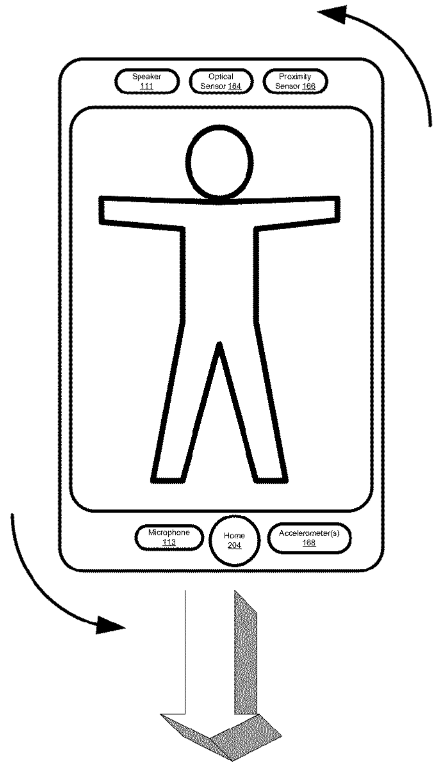
FIGS. 44A-44J illustrate portrait-landscape rotation heuristics in accordance with some embodiments.
Figure 44B:
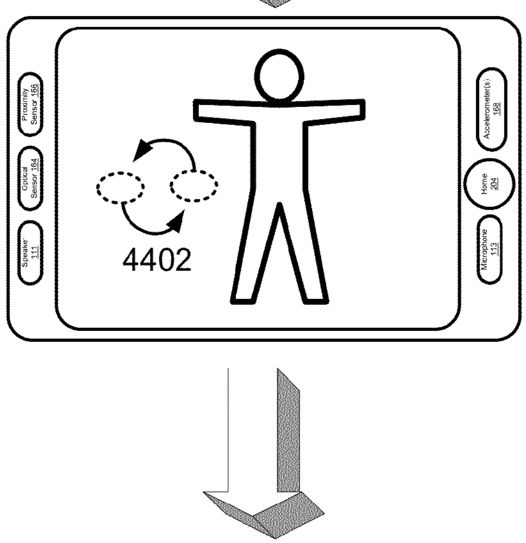
Figure 44C:
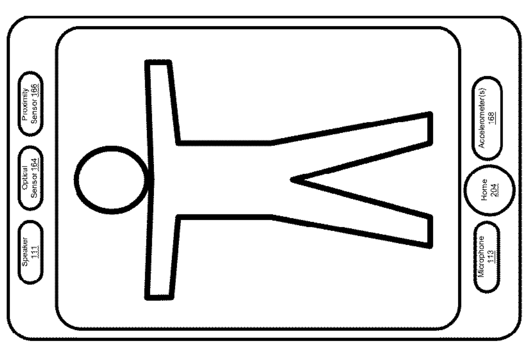
Figure 44D:
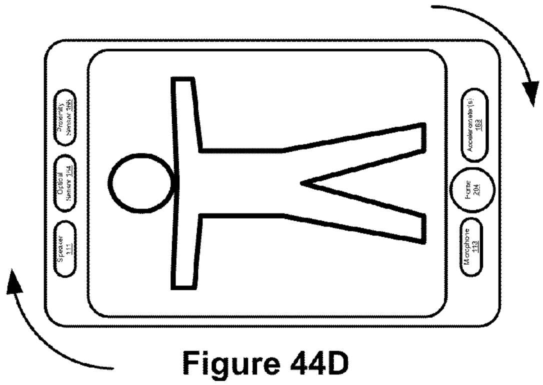
Figure 44E:
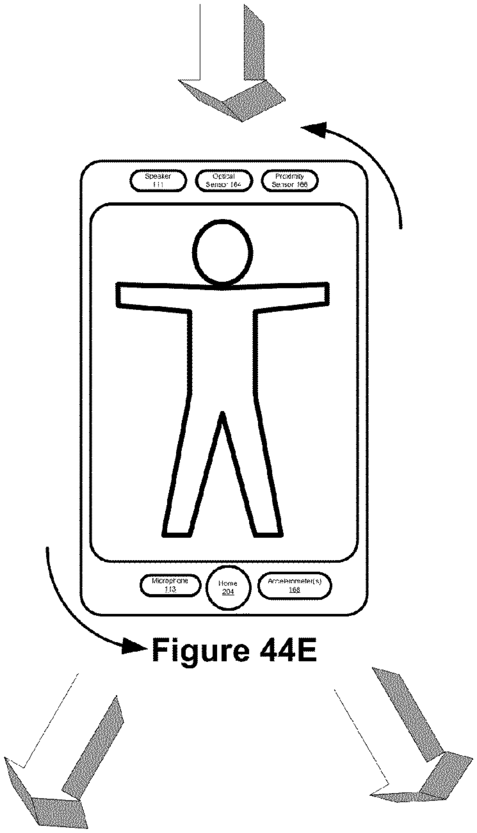
Figure 44F:
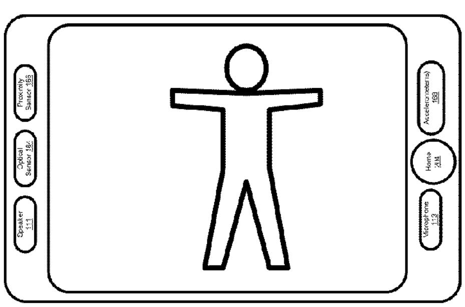
Figure 44G:
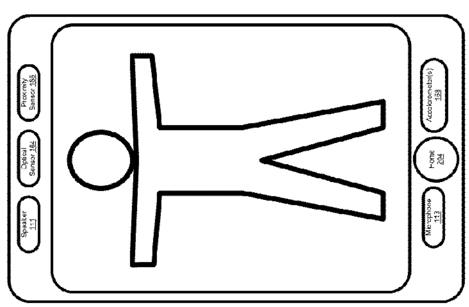
Figure 44H:
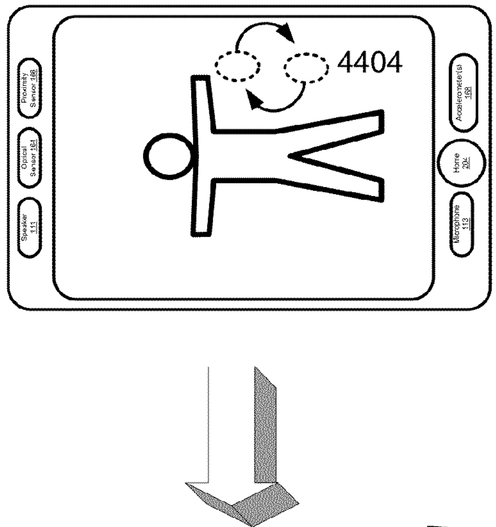

A second predetermined finger gesture is detected on or near the touch screen display while the display of information is locked in the second view (e.g., gesture 4404, FIG. 44H).

Figure 44I:
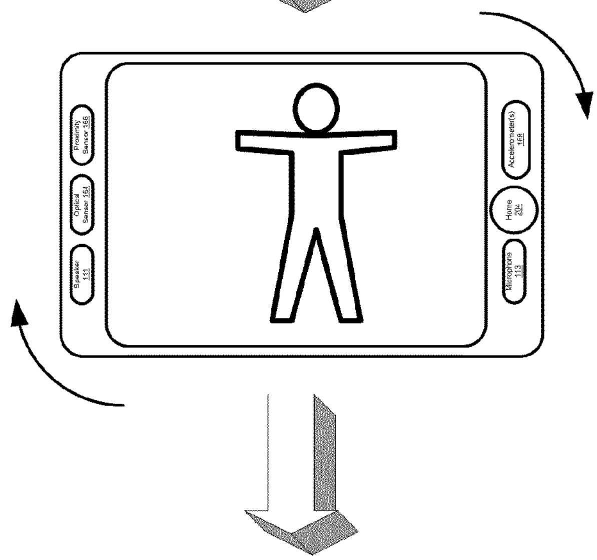
Figure 44J:
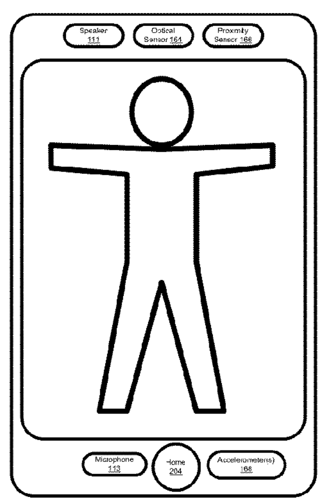

In response to detecting the second predetermined finger gesture, the display of information in the second view is unlocked. For example, the display is unlocked in FIGS. 44I and 44J, so a portrait view is displayed when the long axis of the device is substantially vertical (FIG. 44J) and a landscape view is displayed when the short axis of the device is substantially vertical (FIG. 44I).

In some embodiments, the first and second predetermined finger gestures are multifinger gestures. In some embodiments, the first and second predetermined finger gestures are multifinger twisting gestures (e.g., gesture 4402, FIG. 44B and gesture 4404, FIG. 44H). In some embodiments, the first and second predetermined finger gestures occur on the touch screen display.

Example 2

In some embodiments, a portable multifunction device with a rectangular touch screen display, wherein the rectangular touch screen display includes a portrait view and a landscape view, detects the device in a first orientation (e.g., FIG. 44A).

Information is displayed on the touch screen display in a first view while the device is in the first orientation.

The device is detected in a second orientation (e.g., FIG. 44B).

In response to detecting the device in the second orientation, the information is displayed in a second view.

A first predetermined finger gesture (e.g., gesture 4402, FIG. 44B) is detected on or near the touch screen display while the information is displayed in the second view.

In response to detecting the first predetermined finger gesture, the information is displayed in the first view (e.g., FIG. 44C) and the display of information is locked in the first view (e.g., the display is locked in portrait view in FIGS. 44C, 44D, 44E, and 44G).

A second predetermined finger gesture is detected on or near the touch screen display while the display of information is locked in the first view (e.g., gesture 4404, FIG. 44H).

In response to detecting the second predetermined finger gesture, the display of information in the first view is unlocked. For example, the display is unlocked in FIGS. 44I and 44J, so a portrait view is displayed when the long axis of the device is substantially vertical (FIG. 44J) and a landscape view is displayed when the short axis of the device is substantially vertical (FIG. 44I).

In some embodiments, the first view is the landscape view and the second view is the portrait view. In some embodiments, the first view is the portrait view (e.g., FIG. 44A) and the second view is the landscape view (e.g., FIG. 44B).

In some embodiments, the first and second predetermined finger gestures are multifinger gestures. In some embodiments, the first and second predetermined finger gestures are multifinger twisting gestures (e.g., gesture 4402, FIG. 44B and gesture 4404, FIG. 44H). In some embodiments, the first and second predetermined finger gestures occur on the touch screen display.

Example 3

In some embodiments, a portable multifunction device with a rectangular touch screen display and one or more accelerometers displays information on the rectangular touch screen display in a portrait view (e.g., FIG. 44A) or a landscape view (e.g., FIG. 44B) based on an analysis of data received from the one or more accelerometers.

A predetermined finger gesture (e.g., gesture 4402, FIG. 44B) is detected on or near the touch screen display while the information is displayed in a first view. In some embodiments, the predetermined finger gesture is a multifinger twisting gesture. In some embodiments, the predetermined finger gesture occurs on the touch screen display.

In response to detecting the predetermined finger gesture, the information is displayed in a second view (e.g., FIG. 44C) and the display of information is locked in the second view.

The display of information in the second view is unlocked when the device is placed in an orientation where the second view is displayed based on an analysis of data received from the one or more accelerometers (e.g., FIG. 44E). For example, the display is unlocked in FIGS. 44E and 44F, so a portrait view is displayed when the long axis of the device is substantially vertical (FIG. 44E) and a landscape view is displayed when the short axis of the device is substantially vertical (FIG. 44F).

In some embodiments, the first view is the landscape view (e.g., FIG. 44B) and the second view is the portrait view (e.g., FIG. 44A). In some embodiments, the first view is the portrait view and the second view is the landscape view.

Example 4

In some embodiments, a portable multifunction device with a rectangular touch screen display, wherein the rectangular touch screen display includes a portrait view and a landscape view, detects the device in a first orientation.

Information is displayed on the touch screen display in a first view while the device is in the first orientation (e.g., FIG. 44A).

The device is detected in a second orientation.

In response to detecting the device in the second orientation, the information is displayed in a second view (e.g., FIG. 44B).

A predetermined finger gesture (e.g., gesture 4402, FIG. 44B) is detected on or near the touch screen display while the information is displayed in the second view. In some embodiments, the predetermined finger gesture is a multifinger gesture. In some embodiments, the predetermined finger gesture occurs on the touch screen display.

In response to detecting the predetermined finger gesture, the information is displayed in the first view (e.g., FIG. 44C) and the display of information is locked in the first view.

The display of information in the first view is unlocked when the device is returned to substantially the first orientation (e.g., FIG. 44E). For example, the display is unlocked in FIGS. 44E and 44F, so a portrait view is displayed when the long axis of the device is substantially vertical (FIG. 44E) and a landscape view is displayed when the short axis of the device is substantially vertical (FIG. 44F).

In some embodiments, the first view is the landscape view and the second view is the portrait view. In some embodiments, the first view is the portrait view (e.g., FIG. 44A) and the second view is the landscape view (e.g., FIG. 44B).

In some embodiments, the first orientation and the second orientation are detected based on an analysis of data from one or more accelerometers. In some embodiments, the first orientation is rotated 90° from the second orientation.

Additional description of portrait-landscape rotation heuristics can be found in U.S. Provisional Patent Application No. 60/947,132, "Portrait-Landscape Rotation Heuristics for a Portable Multifunction Device," filed Jun. 29, 2007, the content of which is hereby incorporated by reference.

Given the limited area on a touch screen display, one challenge is how to present various amount of information in a highly intuitive manner. FIGS. 45A-45G are graphical user interfaces illustrating an adaptive approach for presenting information on the touch screen display in accordance with some embodiments. For illustrative purpose, the video folder in the music and video player module is shown. But it will be apparent to one skilled in the art that this approach is readily applicable to many other occasions with little or no modification (e.g., for displaying notification information for missed communications as described with respect to FIGS. 53A-53D below).

For a given total number of user interface objects, the device may display information about at least two individual user interface objects if the total number meets a first predefined condition. In some embodiments, the device may display information about all the user interface objects on the touch screen display.

In some embodiments, the first predefined condition is that the total number of user interface objects is equal to or less than a predetermined threshold. In some other embodiments, the first predefined condition is that the total number of user interface objects is equal to or less than a maximum number of user interface objects that can be simultaneously displayed.

Figure 45A:
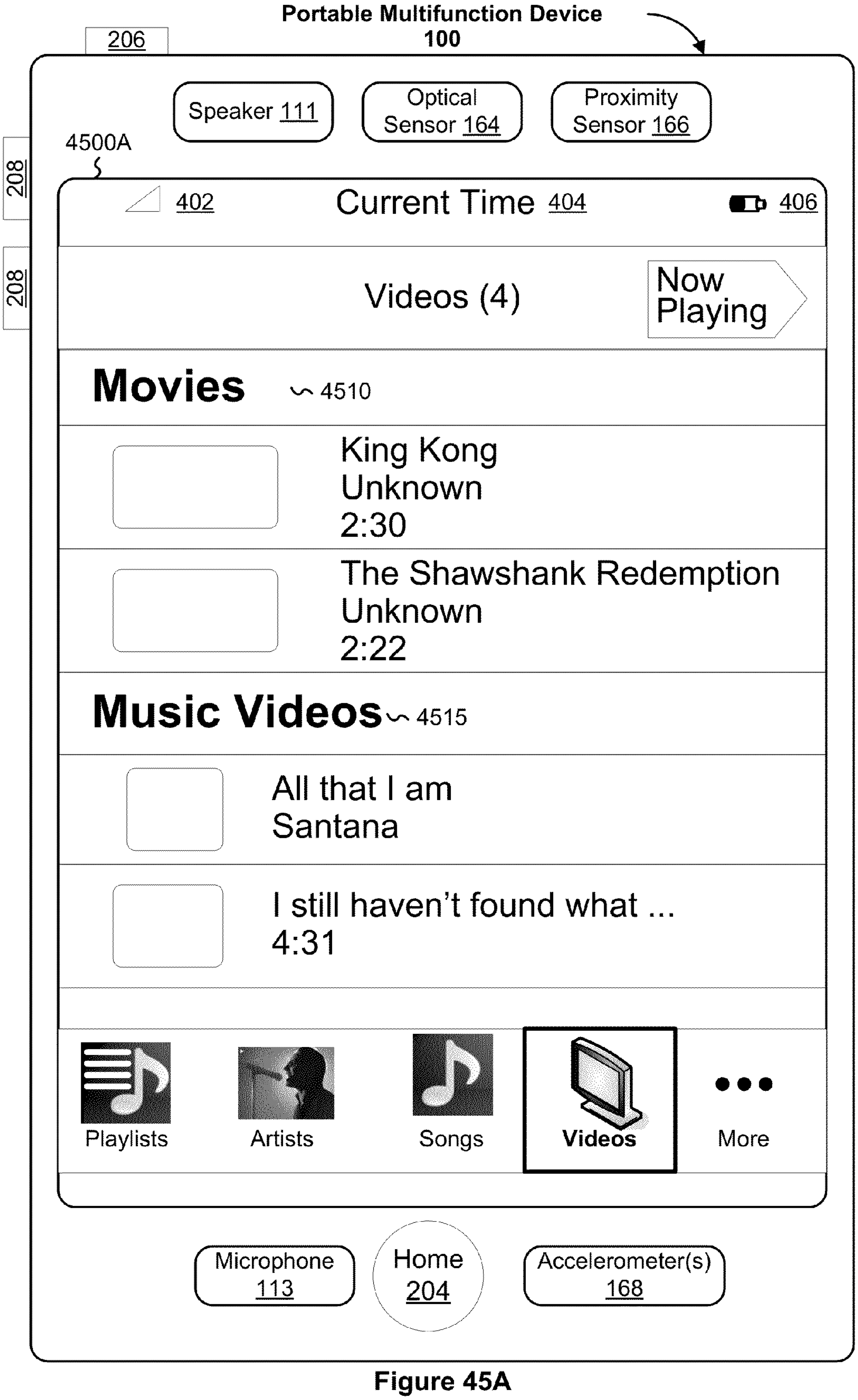
FIGS. 45A-45G are graphical user interfaces illustrating an adaptive approach for presenting information on the touch screen display in accordance with some embodiments.

As shown in FIG. 45A, the video folder has only four objects including two movies and two music videos. Since information about the four objects can fit into the touch screen display, a hierarchical approach of grouping the movies into one sub-folder and the music videos into another sub-folder is probably less preferred. Rather, the four objects are shown in a flat view with two labels 4510 and 4515 indicating the two media types.

In some embodiments, the device may present the information in a flat view if the total number of user interface objects is slightly more than what can fit into the display. A user can easily scroll the flat view up or down to see the hidden portion using a substantially vertical finger swipe gesture.

If the total number of user interface objects meets a second predefined condition, the device then divides the user interface objects into at least a first group of user interface objects and a second group of user interface objects. A first group icon is displayed for the first group of user interface objects. For the second group of user interface objects, at least one group member is shown on the touch screen display.

In some embodiments, the second predefined condition is that the total number of the first group of user interface objects is equal to or less than a predetermined threshold and the total number of the second group of user interface objects is greater than the predetermined threshold.

Figure 45B:
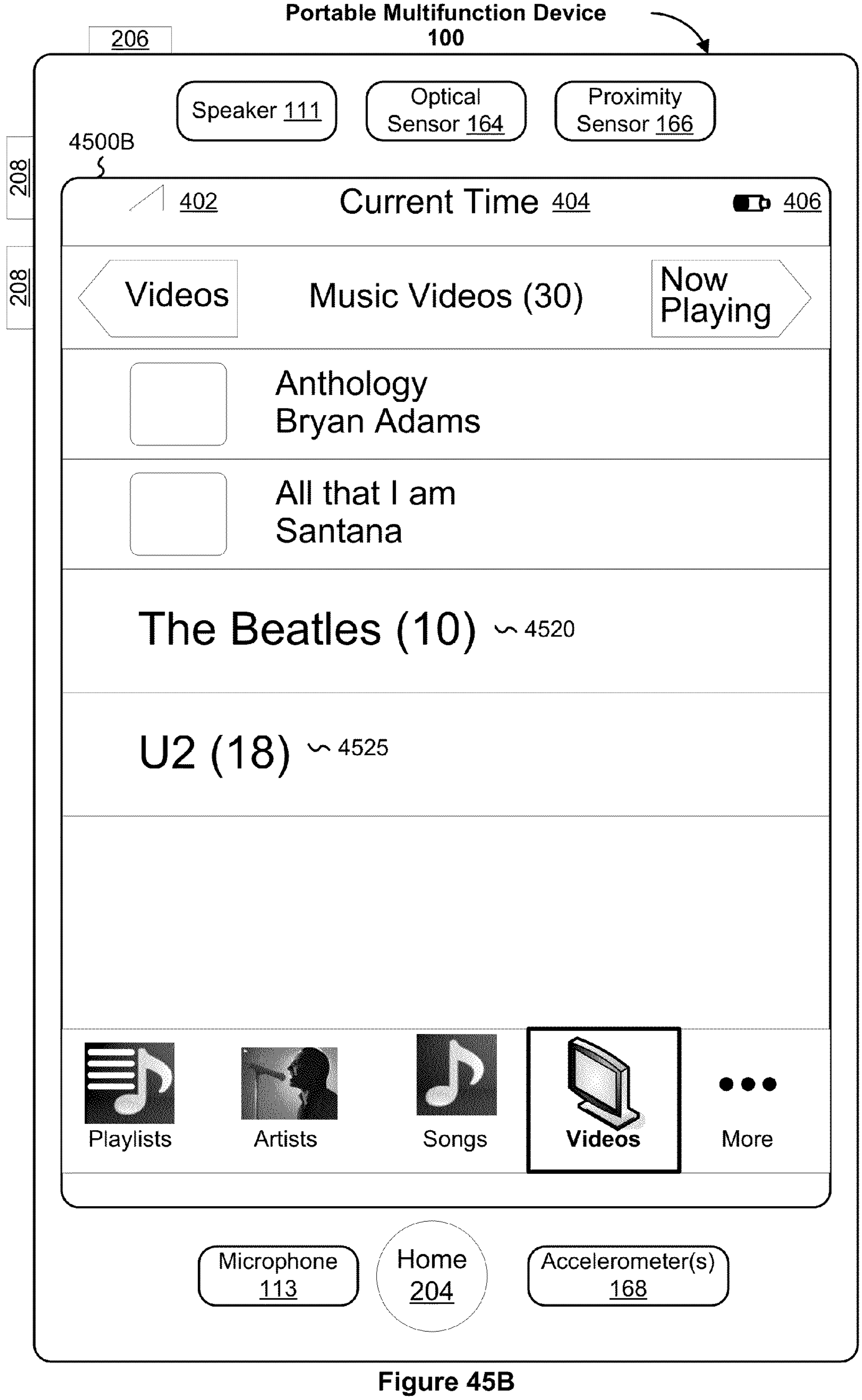

FIG. 45B depicts that there are 30 music videos in the music video folder in total by four different artists or groups, 10 by the Beatles, 18 by U2, one by Bryan Adams, and one by Santana. Given the size of the touch screen display, a flat view of all the 30 music videos is probably less convenient because this may require multiple finger swipe gestures to scan through all the objects. Moreover, it is less intuitive to tell the artist for each individual music video. On the other hand, it is also inconvenient if the music videos by Santana and Bryan Adams each have their own sub-folder because a user has to open the sub-folder to see the music video's title while there is still blank space on the touch screen display.

Figure 45C:

Rather, FIG. 45B is a hybrid view of information about the 30 music videos. A group icon 4520 is used for representing the Beatles' works and a group icon 4525 for U2's works. The group icon indicates the number of music videos in that sub-folder. A user can simply finger tap a group icon, e.g., 4525, to learn more information about the 18 U2 music videos (FIG. 45C). The other two music videos are displayed as two separate items, each including information about the artist and the music video's title.

If the total number of user interface objects meets a third predefined condition, the device divides the user interface objects into at least a third group of user interface objects and a fourth group of user interface objects. A third group icon is displayed for the third group of user interface objects. A fourth group icon is displayed for the fourth group of user interface objects.

Figure 45D:
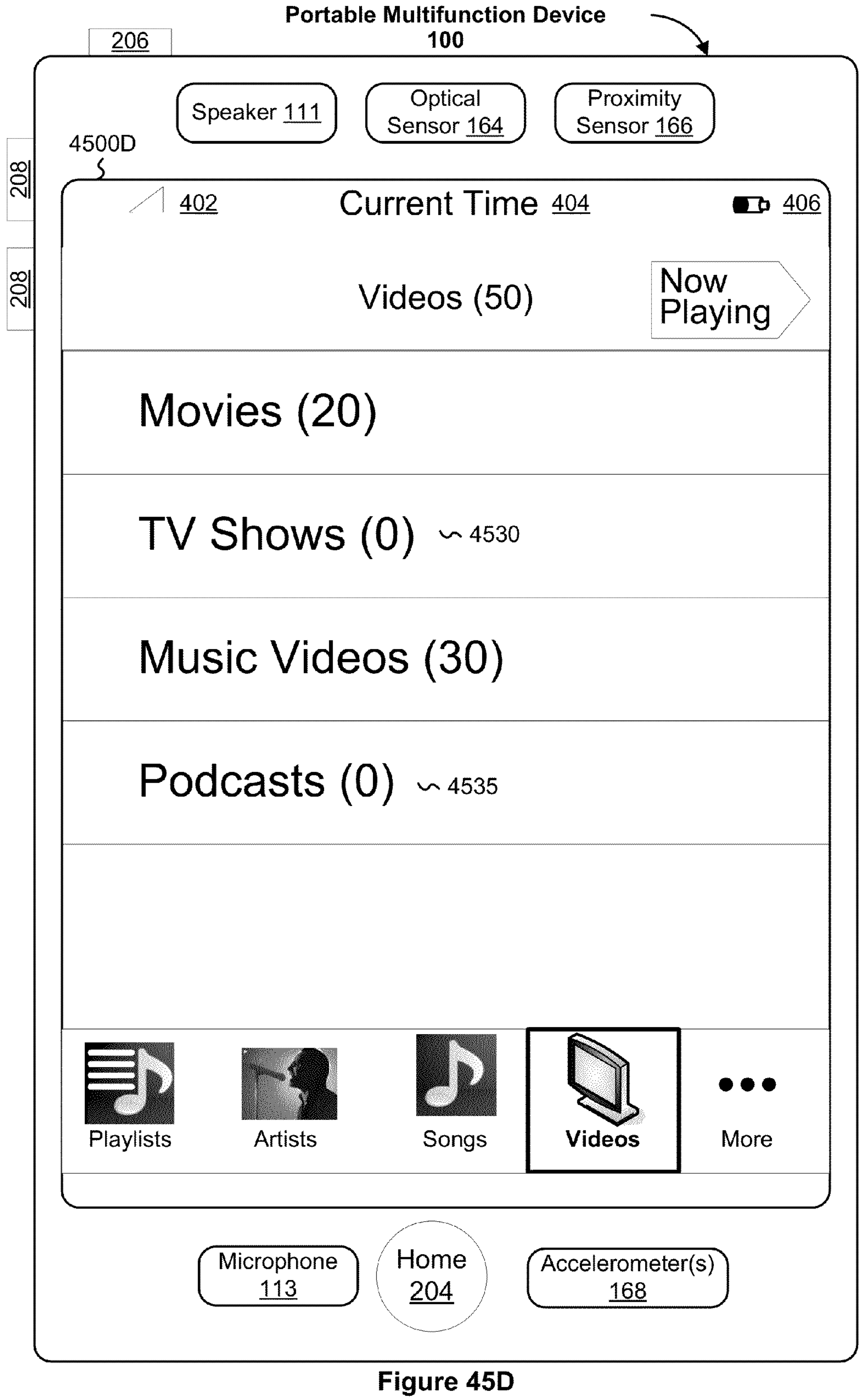

In some embodiments, the third predefined condition is that the total number of the third group of user interface objects is greater than a predetermined threshold and the total number of the fourth group of user interface objects is greater than the predetermined threshold. In some embodiments, as shown in FIG. 45D, a group icon (e.g., 4530 and 4535) is displayed on the touch screen display even if the corresponding group is empty.

Figure 45E:
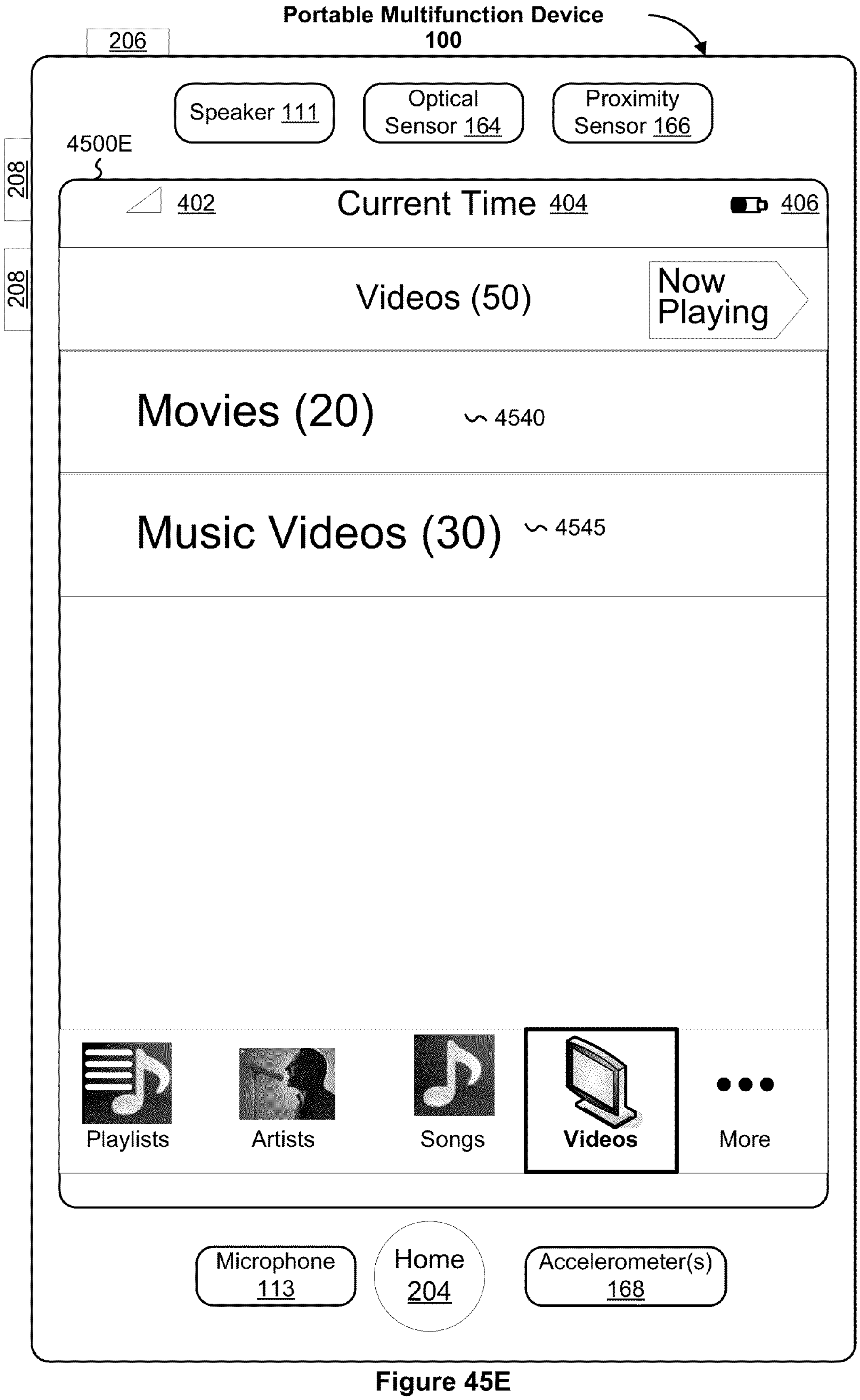

In some other embodiments, as shown in FIG. 45E, only a group icon (e.g., 4540 and 4545) whose associated group is not empty is displayed on the touch screen display. Each of the two groups has a sufficient number of objects that cannot fit into the touch screen display.

In some embodiments, the aforementioned information classification and presentation approach is an automatic and recursive process. Upon detecting a user selection of a respective group icon corresponding to the first, third or fourth groups of user interface objects, the device checks whether the user-selected group of user interface objects meet one of the first, second or third predefined conditions and then operates accordingly.

Figure 45F:
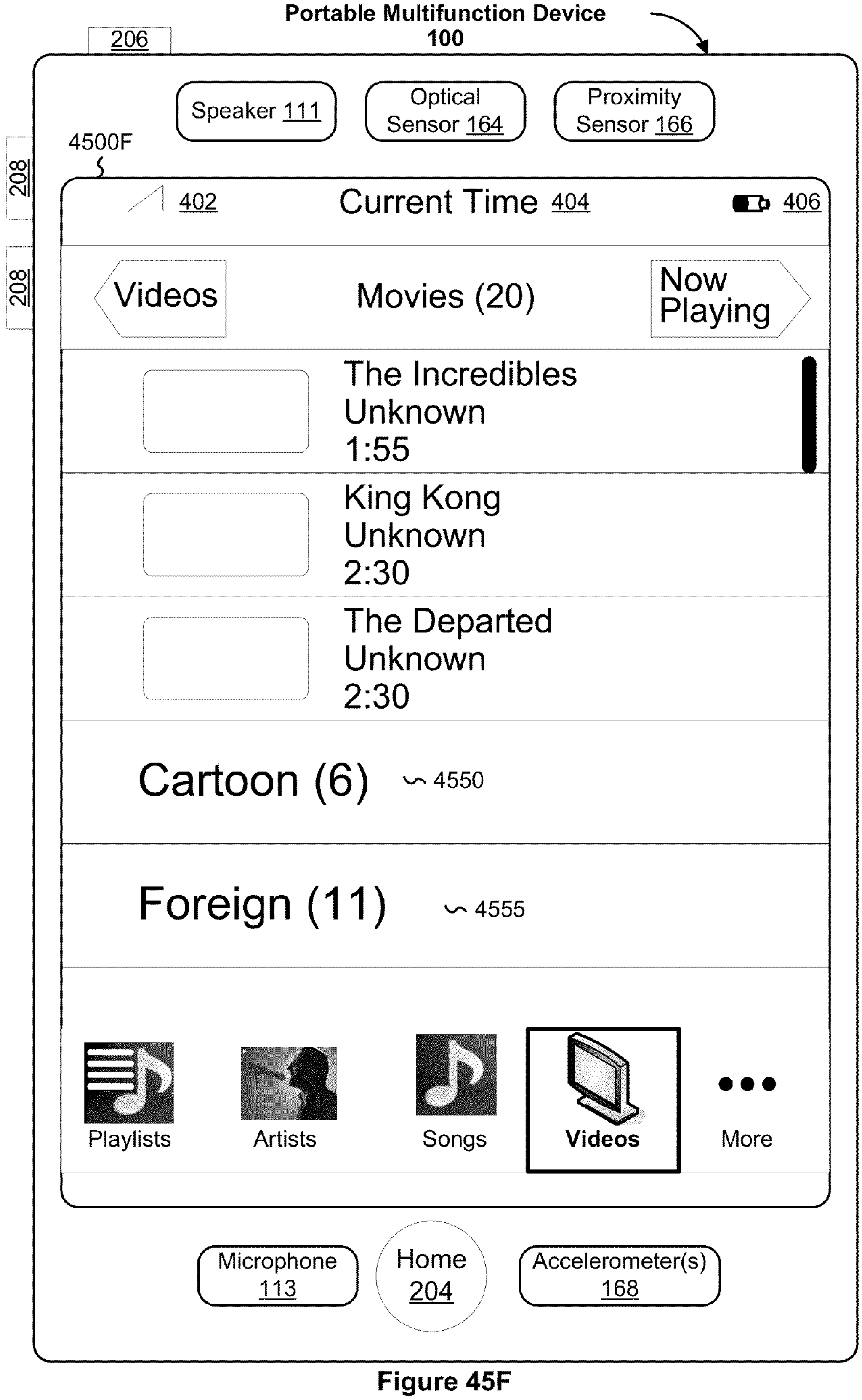
Figure 45G:
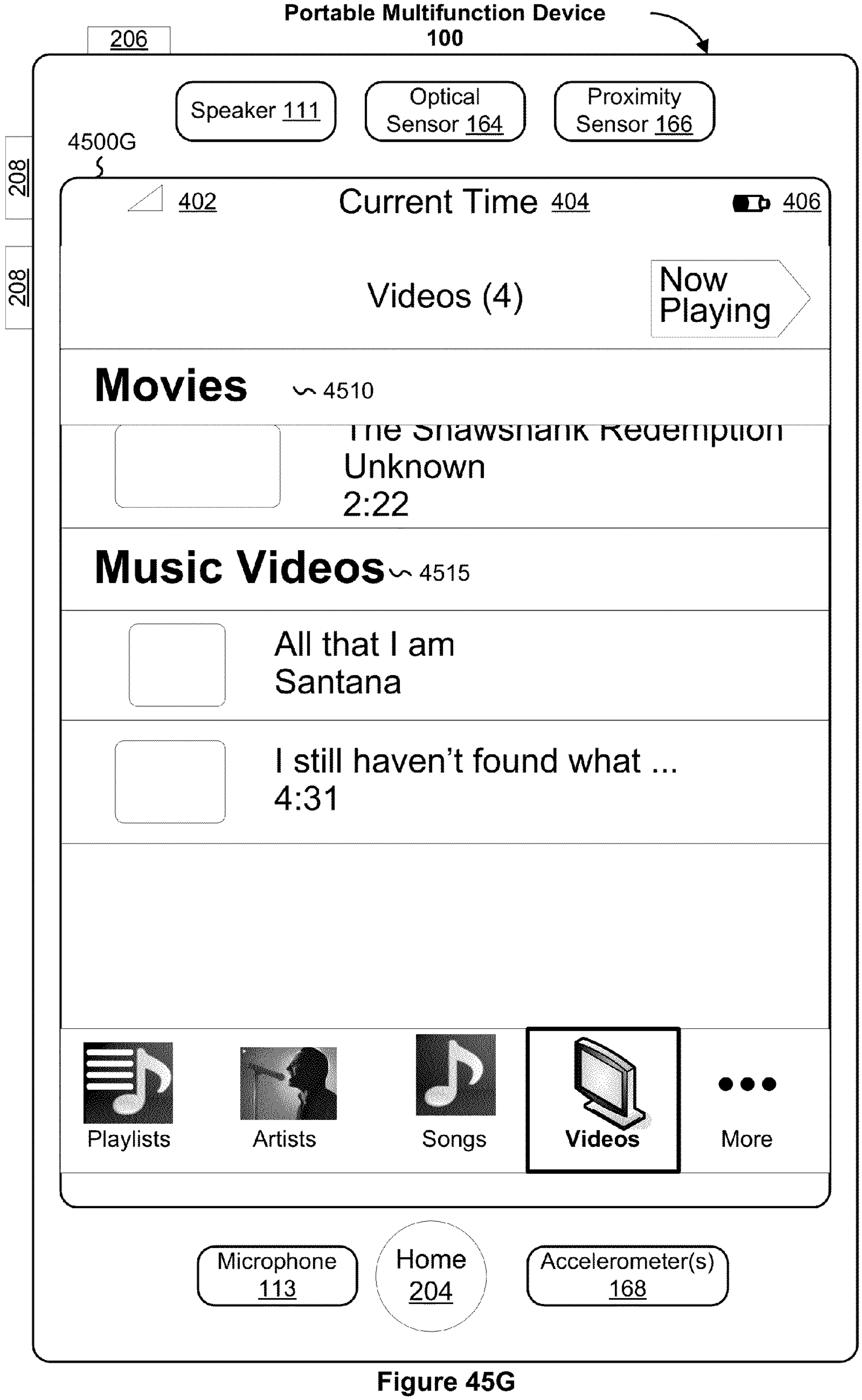

For example, in response to a user selection of the movies icon 4540, a hybrid view of the movie information is displayed in FIG. 45F. Like the hybrid view shown in FIG. 45B, three movies are shown as individual items with detailed information and the other 17 movies are broken into two sub-groups, each having its own group icon Cartoon (6) 4550 and Foreign (11) 4555.

In some embodiments, the user interface objects may be grouped by information type. For example, the objects in FIG. 45A are broken into movie and music video. In some other embodiments, the user interface objects may be grouped by information source. For example, the objects in FIG. 45D are broken into TV show and Podcast.

In some embodiments, a unique group identifier is assigned to each group of user interface objects in a flat view. For example, the group labels 4510 and 4515 are exemplary group identifiers. When the user scrolls upward the list of user interface objects, the group identifier at the top of the list (e.g., movies 4510) does not move until the last item in the movie group, i.e., The Shawshank Redemption, moves out of the screen (analogous to the scrolling described above with respect to FIGS. 43E, 43F, 43H, and 43I). At this time, the movies label 4510 is then replaced by the music videos label 4515.

Additional description of adaptive user interface displays can be found in U.S. Provisional Patent Application No. 60/937,992, "Portable Multifunction Device, Method, and Graphical User Interface for Displaying User Interface Objects Adaptively," filed Jun. 29, 2007, the content of which is hereby incorporated by reference.

Figure 46A:
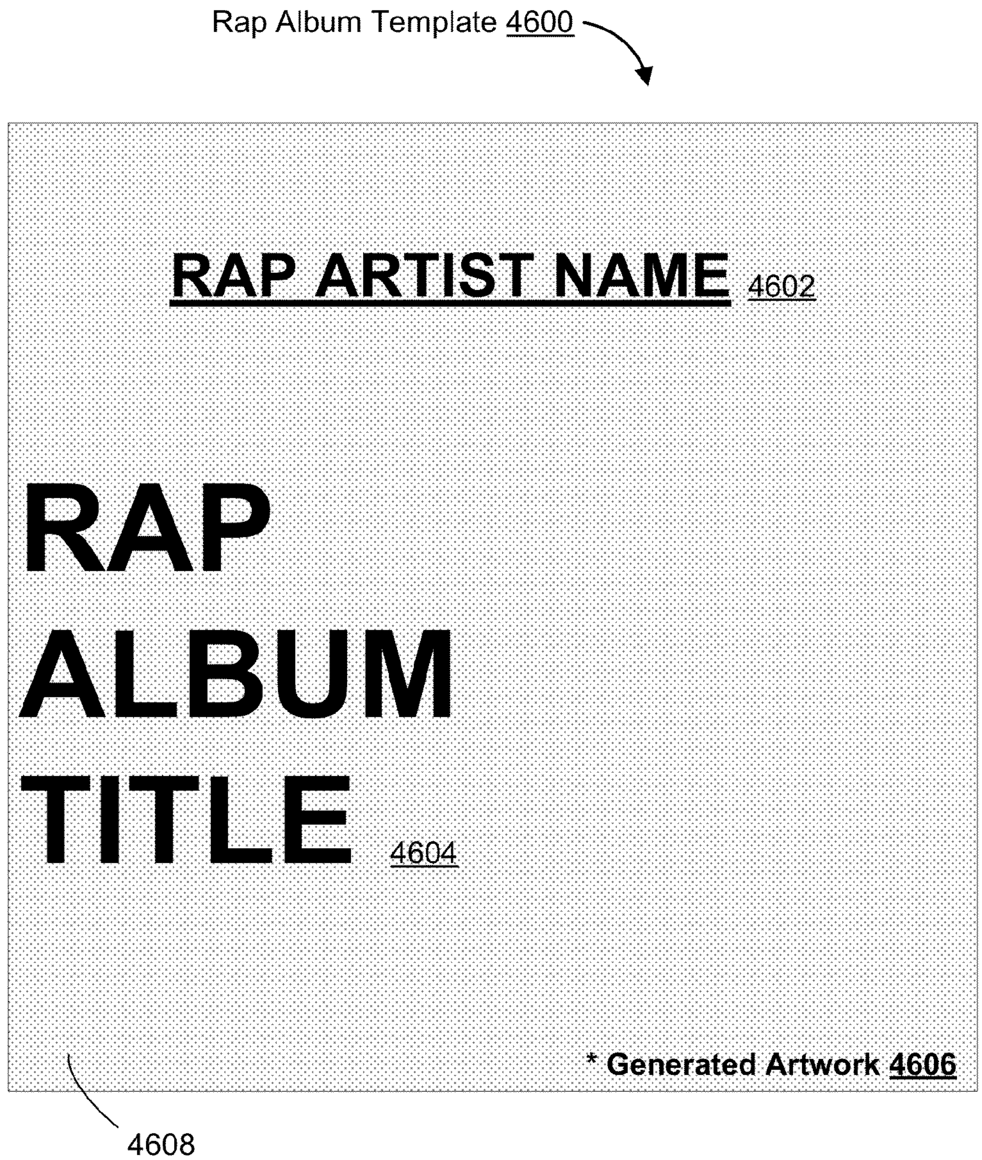
FIGS. 46A-46C illustrate digital artwork created for a content file based on metadata associated with the content file in accordance with some embodiments.
Figure 46B:
Figure 46C:
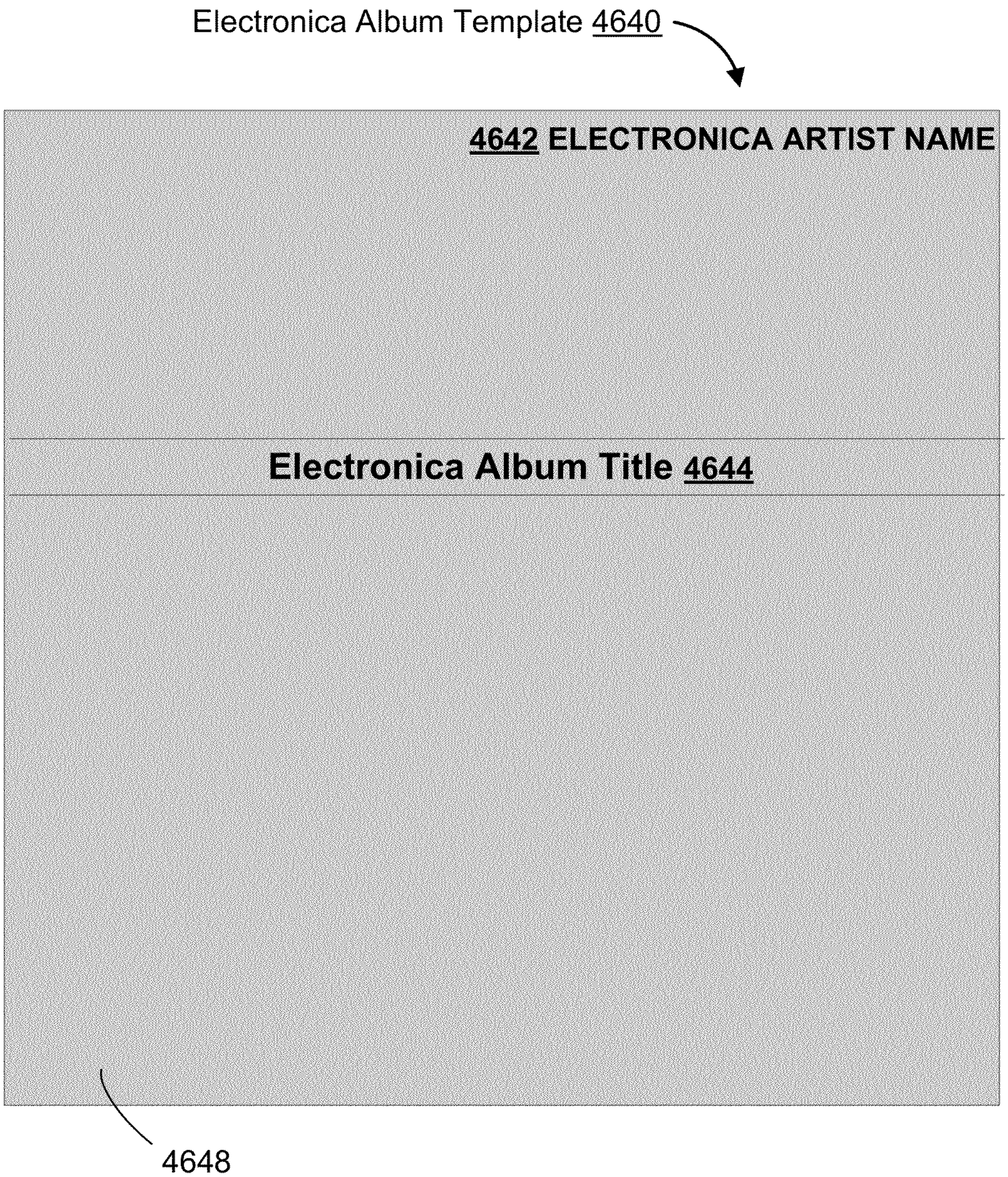

FIGS. 46A-46C illustrate digital artwork created for a content file based on metadata associated with the content file in accordance with some embodiments.

Additional description of such artwork can be found in U.S. Provisional Patent Application No. 60/883,818, "Creating Digital Artwork Based On Content File Metadata," filed Jan. 7, 2007, the content of which is hereby incorporated by reference.

FIGS. 47A-47E illustrate exemplary methods for moving a slider icon in accordance with some embodiments. Such slider icons have many uses, such as content progress bars (e.g., FIGS. 47A and 47B, and 2310 FIG. 23B), volume and other level controls (e.g. 2324 FIG. 23D), and switches (e.g., FIGS. 47C-47E).

In some embodiments, a portable multifunction device (e.g., device 100) with a touch screen display (e.g., display 112) detects a finger contact (e.g., finger contact 4706, FIG. 47A, or 4734, FIG. 47C) with a predefined area (e.g., area 4702, FIG. 47A, or 4730, FIG. 47C) on the touch screen display. The predefined area includes an icon (e.g., icon 4732, FIG. 47C) that is configured to slide in a first direction in the predefined area on the touch screen display. In some embodiments, the predefined area comprises a slider bar (e.g., slider bar 4704, FIG. 47A). In some embodiments, the first direction is a horizontal direction on the touch screen display. In some embodiments, the first direction is a vertical direction on the touch screen display.

Figure 47A:
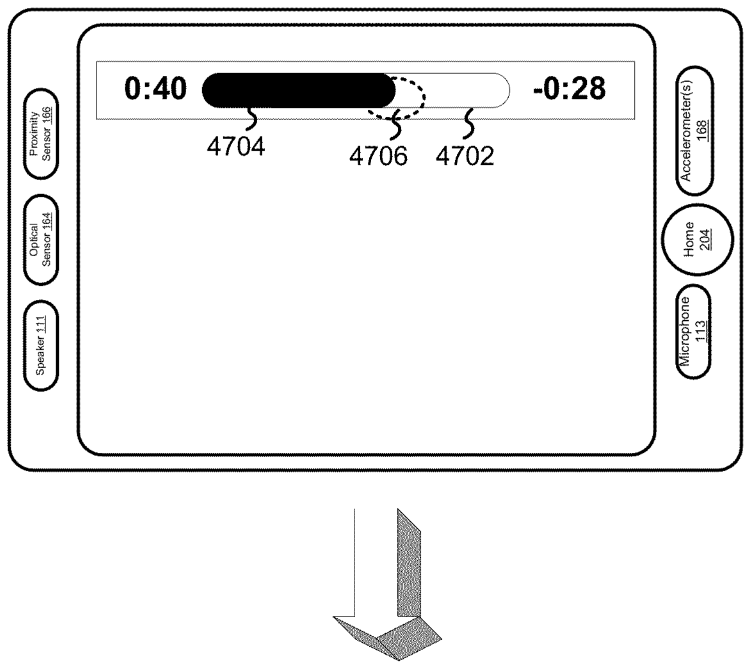
FIGS. 47A-47E illustrate exemplary methods for moving a slider icon in accordance with some embodiments.

In some embodiments, the icon is moved to the finger contact upon detecting the finger contact with the predefined area. For example, slider bar 4704 moves to the finger contact 4706 upon detecting the finger contact 4706, as shown in FIG. 47A.

Movement of the finger contact is detected on the touch screen display from the predefined area to a location outside the predefined area. The movement of the finger contact on the touch screen display has a component parallel to the first direction and a component perpendicular to the first direction.

Figure 47B:
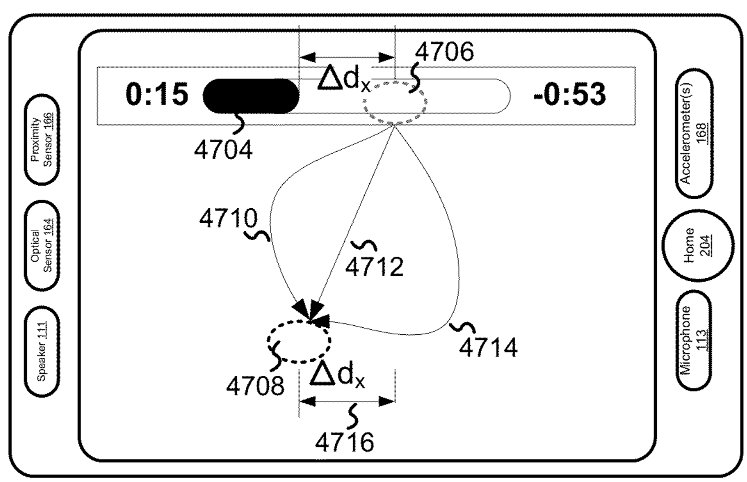

For example, in FIG. 47B, movements 4710, 4712, and 4714 of the finger contact from finger contact location 4706 to finger contact location 4708 all have a component $\Delta d_x$ 4716 parallel to the direction of motion of the slider bar 4704. Similarly, movements 4710, 4712, and 4714 all have a component perpendicular to the direction of motion of the slider bar 4704 (not shown).

Figures 47C, 47D, 47E:
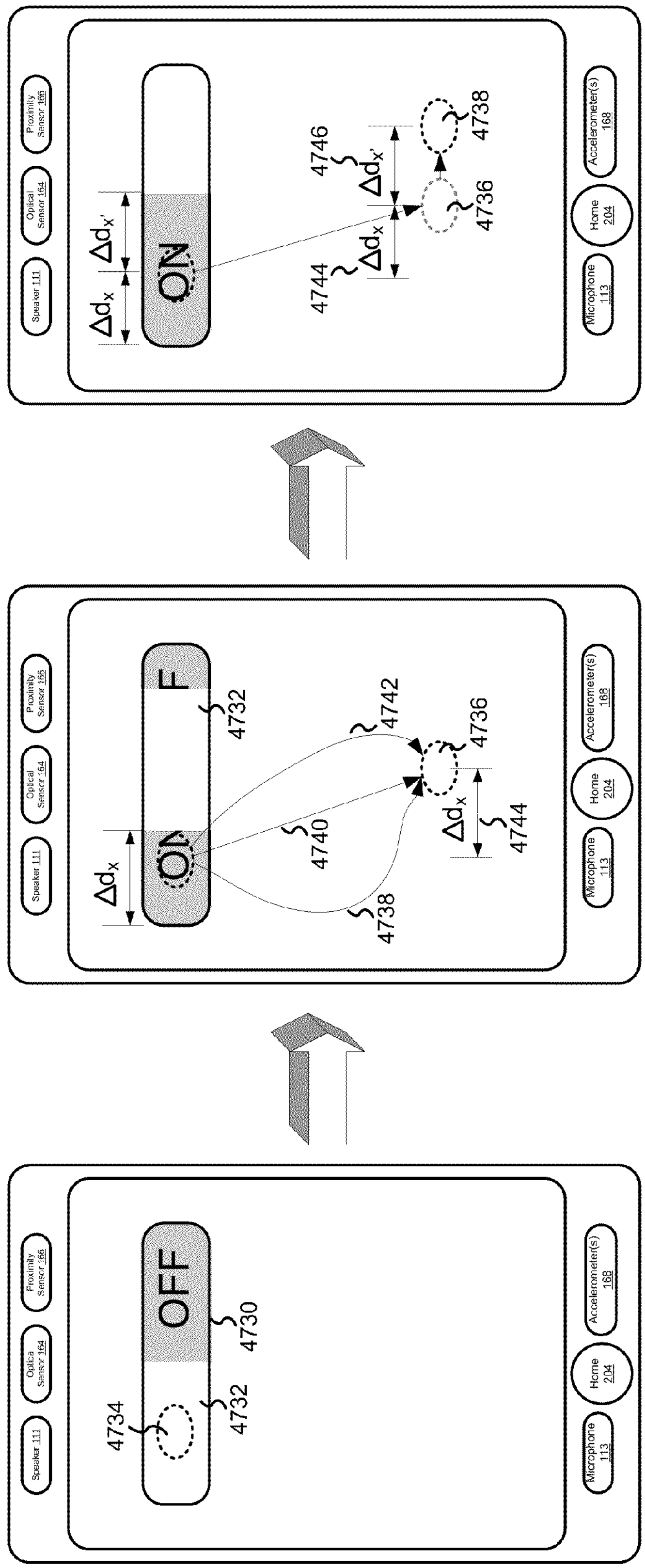

In another example, in FIG. 47D, movements 4738, 4740, and 4742 of the finger contact from finger contact location 4734 to finger contact location 4736 all have a component $\Delta d_x$ 4744 parallel to the direction of motion of the slider icon 4732. Similarly, movements 4738, 4740, and 4742 all have a component perpendicular to the direction of motion of the slider icon 4732 (not shown). Additional movement of the finger contact from location 4736 to location 4738 has an additional component $\Delta d_{x'}$ 4746 (FIG. 47E) parallel to the direction of motion of the slider icon 4732.

The icon is slid in the predefined area in accordance with the component of the movement of the finger contact that is parallel to the first direction. In some embodiments, sliding of the icon is ceased if a break in the finger contact with the touch screen display is detected.

For example, in FIG. 47B, the slider bar 4704 moves by a distance $\Delta d_x$ equal to the parallel component $\Delta d_x$ 4716 of movements 4710, 4712, and 4714. In another example, in FIG. 47D the slider icon 4732 moves by a distance $\Delta d_x$ equal to the parallel component $\Delta d_x$ 4744 of movements 4738, 4740, and 4742. In FIG. 47E, the slider icon 4732 moves by an additional distance $\Delta d_{x'}$ 4746 corresponding to additional movement of the finger contact from location 4736 to 4738.

These methods for moving a slider icon permit a user to precisely position the slider icon without having the user's view of the slider icon obstructed by the user's finger.

Additional description of positioning a slider icon can be found in U.S. Provisional Patent Application No. 60/947,304, "Positioning a Slider Icon on a Portable Multifunction Device," filed Jun. 29, 2007, the content of which is hereby incorporated by reference.

Notes Application

Figure 48A:
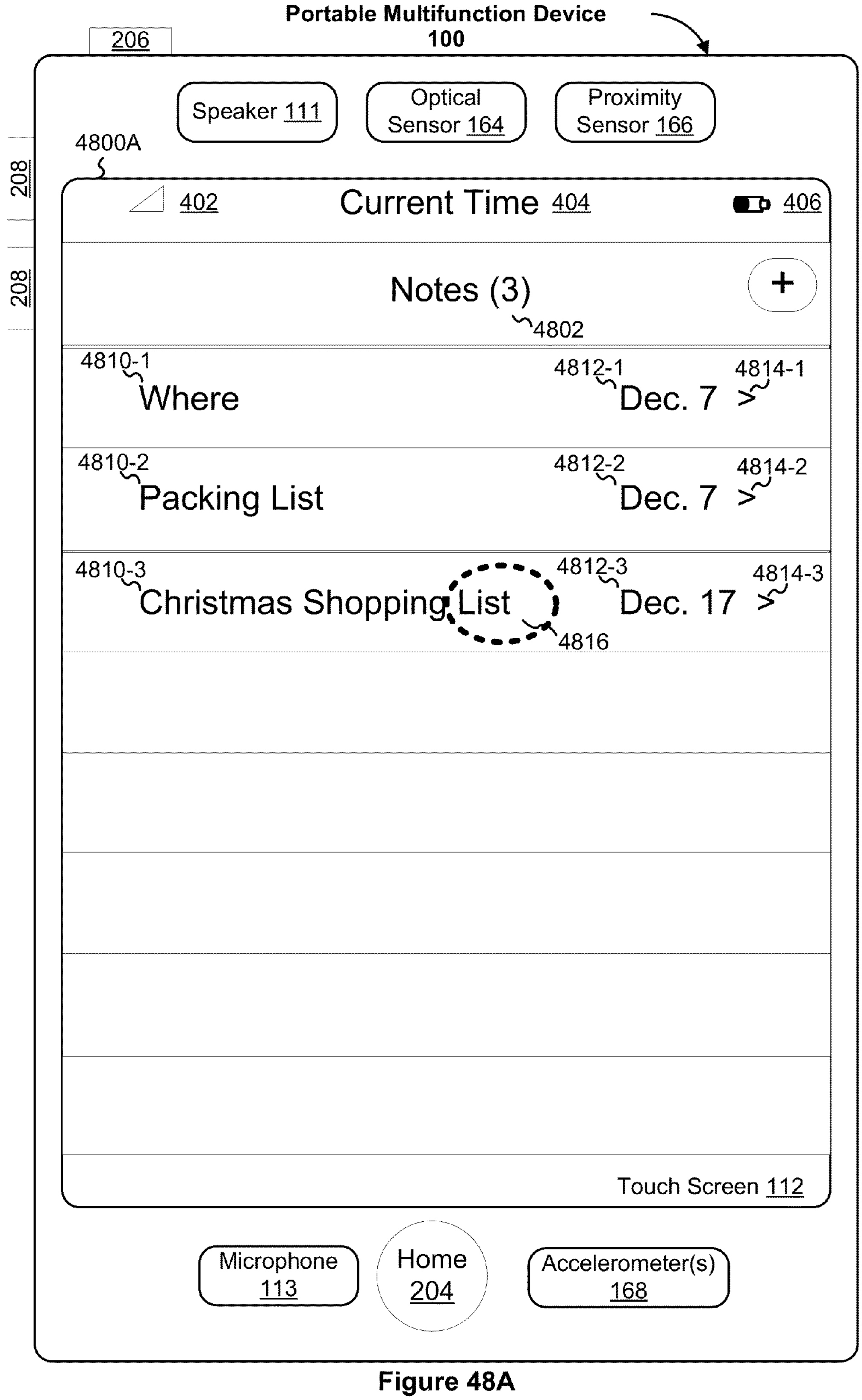
FIGS. 48A-48C illustrate an exemplary user interface for managing, displaying, and creating notes in accordance with some embodiments.
Figure 48B:
Figure 48C:

FIGS. 48A-48C illustrate an exemplary user interface for managing, displaying, and creating notes in accordance with some embodiments. In some embodiments, user interface 4800A (FIG. 48A) includes the following elements, or a subset or superset thereof:

- 402, 404, and 406, as described above;
- The number 4802 of existing notes;
- Titles 4810 of existing notes;
- Date 4812 and/or time of the note; and
- Additional information icon 4814 that when activated (e.g., by a finger tap on the icon) initiates transition to the corresponding note (e.g., UI 4800B, FIG. 48B).

In some embodiments, detection of a user gesture 4816 anywhere in a row corresponding to a note initiates transition to the corresponding note (e.g., UI 4800B, FIG. 48B).

In some embodiments, user interface 4800B (FIG. 48B) includes the following elements, or a subset or superset thereof:

- 402, 404, and 406, as described above;
- Notes icon 4820 that when activated (e.g., by a finger tap on the icon) initiates display of UI 4800A;
- title 4810-3 of the note;
- a notepad 4824 for displaying text;
- Previous note icon 4832 that when activated (e.g., by a finger tap on the icon) initiates display of the previous note;
- Create email icon 4834 that when activated (e.g., by a finger tap on the icon) initiates transfer to the email application 140 and display of a UI for creating an email message (e.g., UI 3400A, FIG. 34A);
- Trash icon 4836 that when activated (e.g., by a finger tap on the icon) initiates display of a UI for deleting the note; and
- Next note icon 4838 that when activated (e.g., by a finger tap on the icon) initiates display of the next note.

In some embodiments, detection of a user gesture 4826 anywhere on the notepad 4824 initiates display of a contextual keyboard (e.g., UI 4800C, FIG. 48C) for entering text in the notepad 4824.

In some embodiments, when a contextual keyboard is displayed, detection of a user gesture on text in the notepad 4824 initiates display of an insertion point magnifier 4830, as described above with respect to FIGS. 6I-6K.

In some embodiments, word suggestion techniques and user interfaces are used to make text entry easier. In some embodiments, a recommended word is put in the space bar (e.g., the recommended word "dinner" is in the space bar in FIG. 6J) and detecting user contact with the space bar initiates acceptance of the recommended word. Additional description of word suggestion can be found in U.S. patent application Ser. No. 11/620,641, "Method And System For Providing Word Recommendations For Text Input," filed Jan. 5, 2007, and U.S. patent application Ser. No. 11/620,642, "Method, System, And Graphical User Interface For Providing Word Recommendations," filed Jan. 5, 2007, the contents of which are hereby incorporated by reference.

Calendar

Figure 49A:
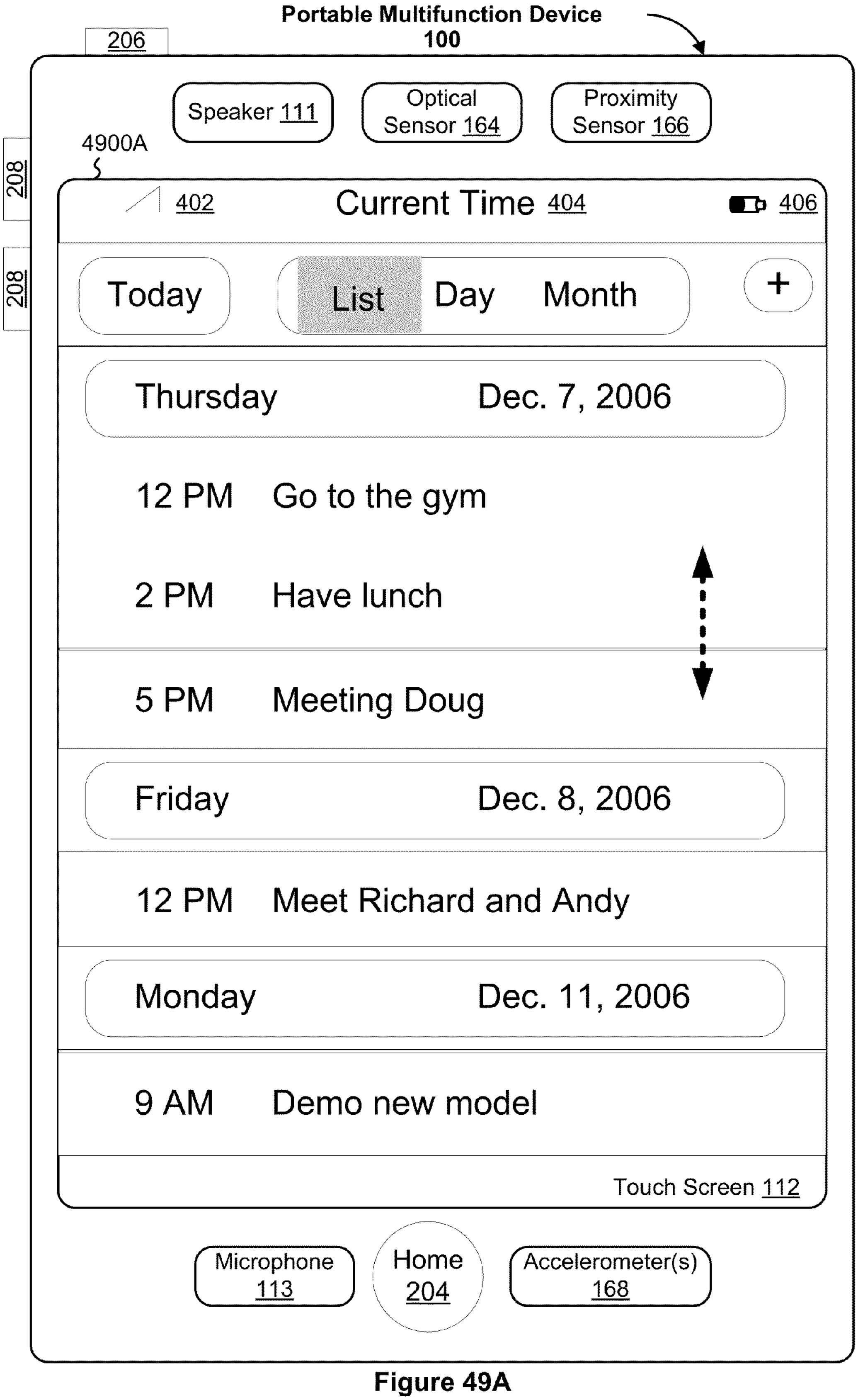
FIGS. 49A-49N illustrate exemplary user interfaces for a calendar in accordance with some embodiments.
Figure 49B:
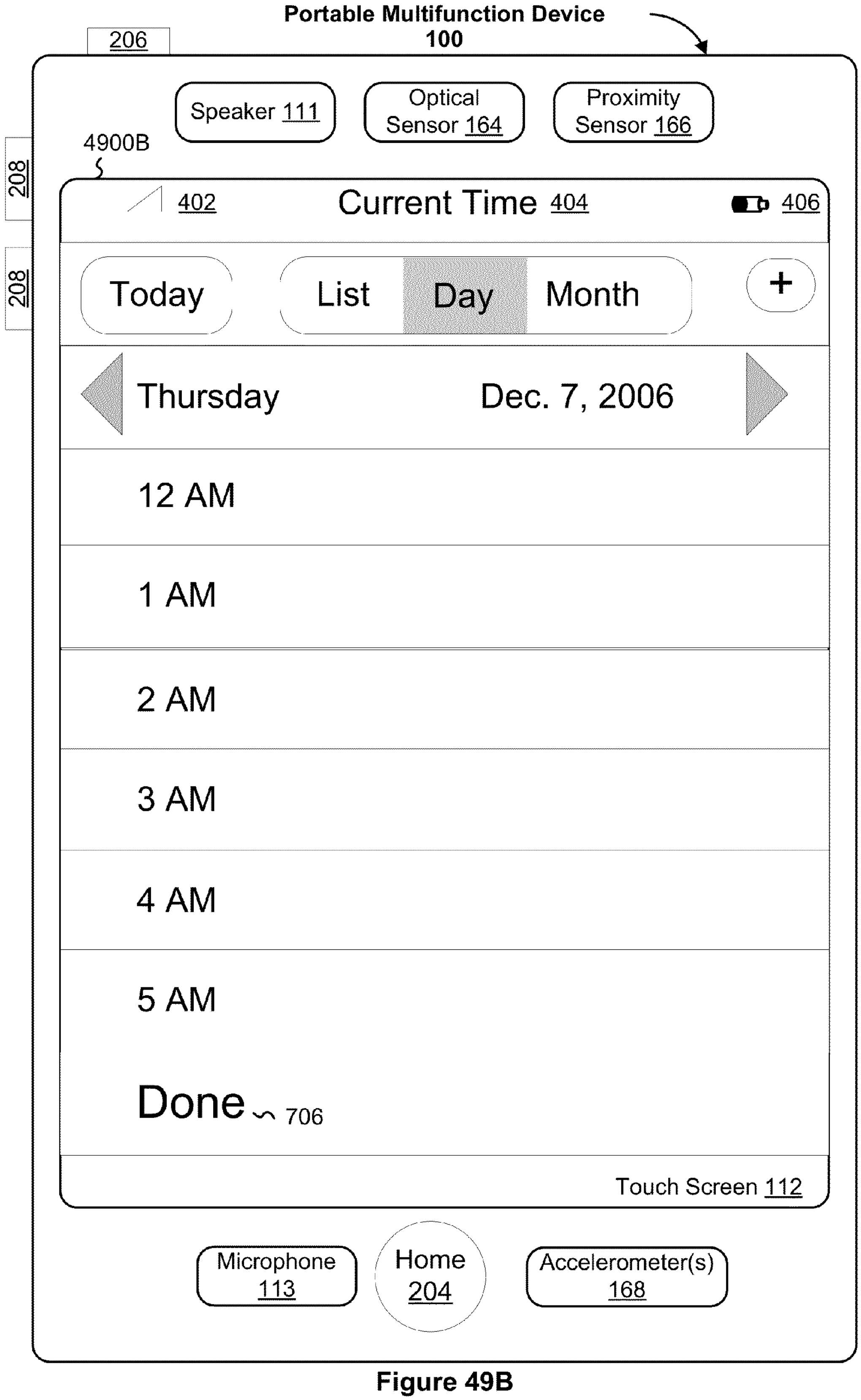
Figure 49C:
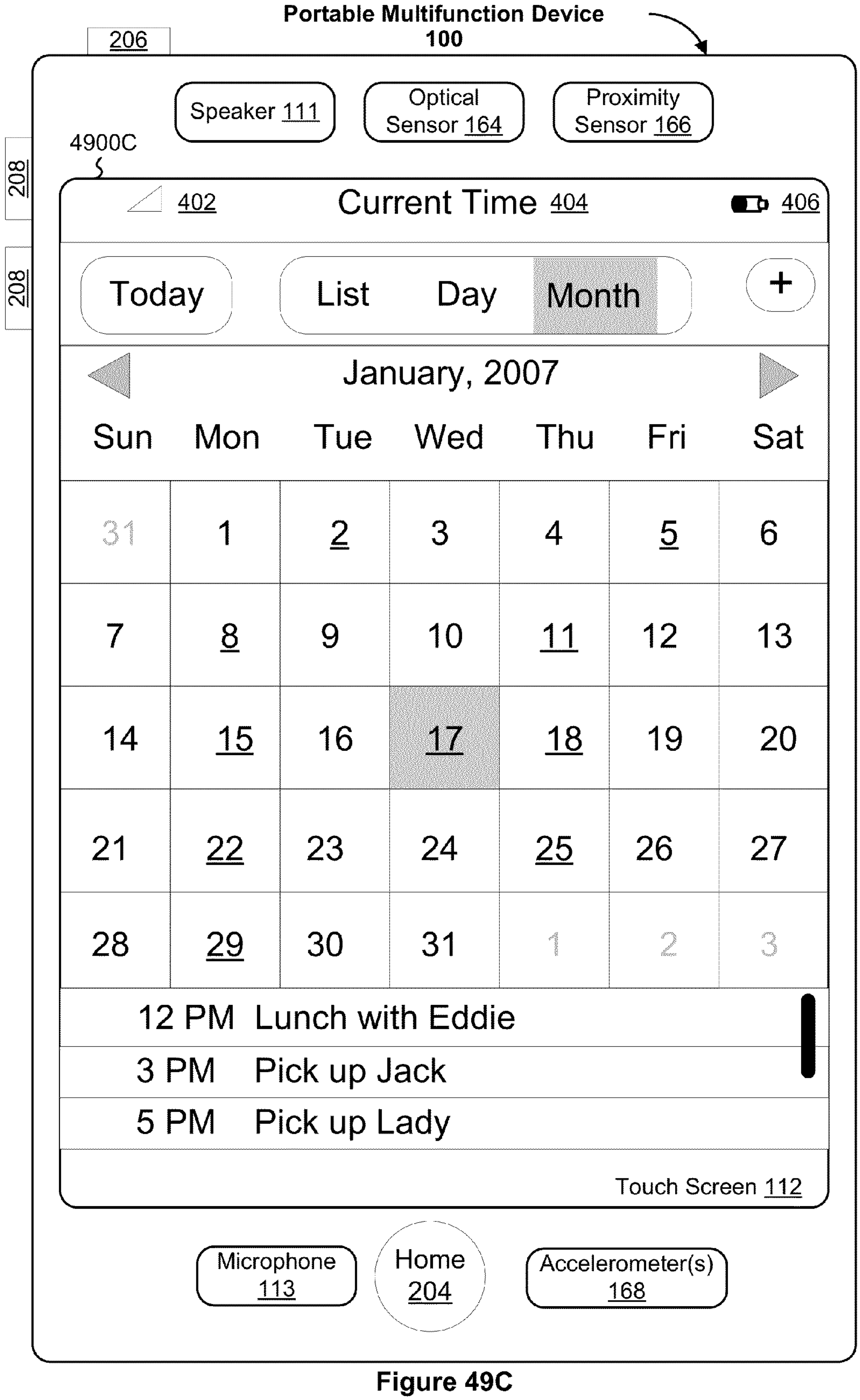
Figure 49D:
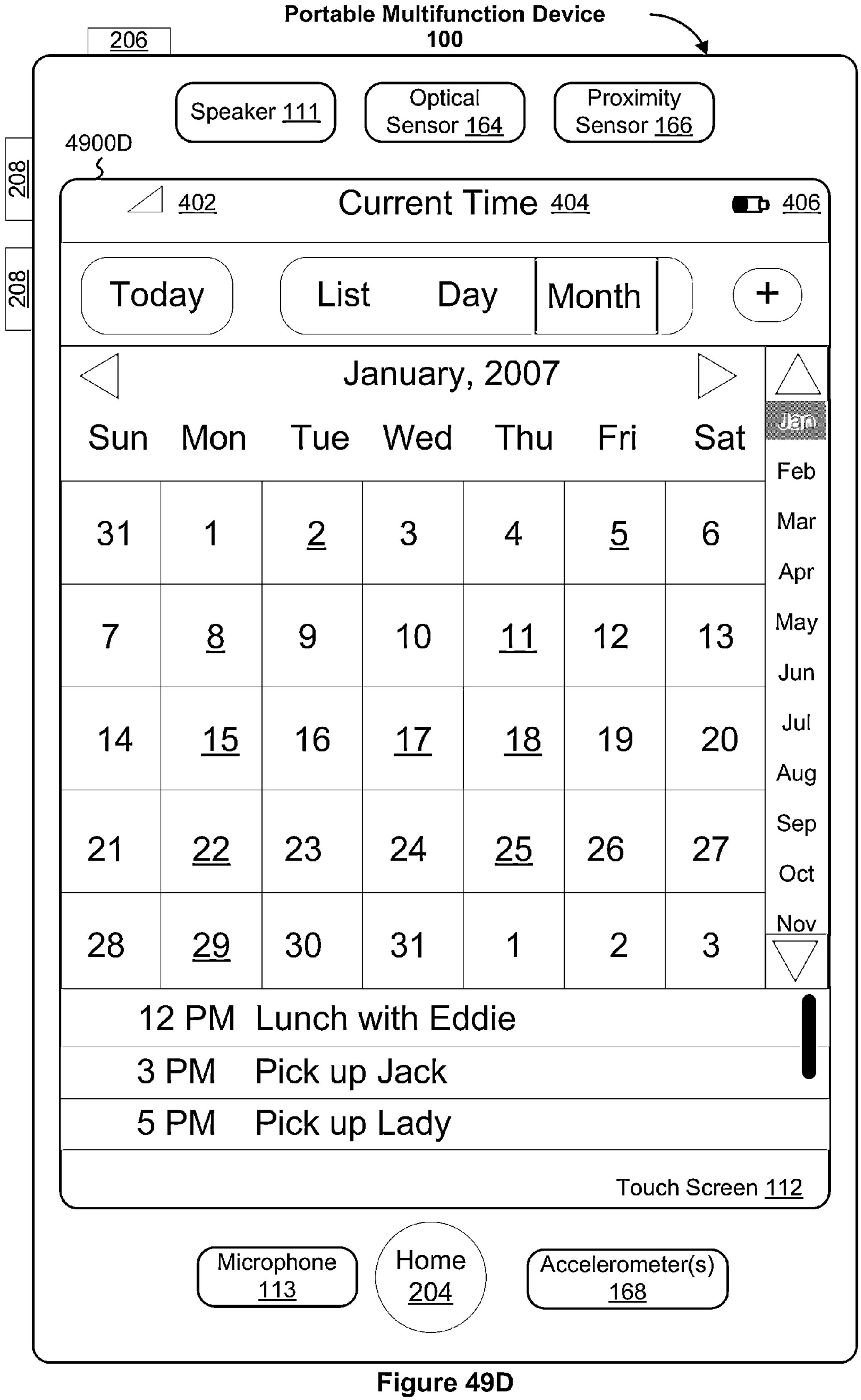
Figure 49E:
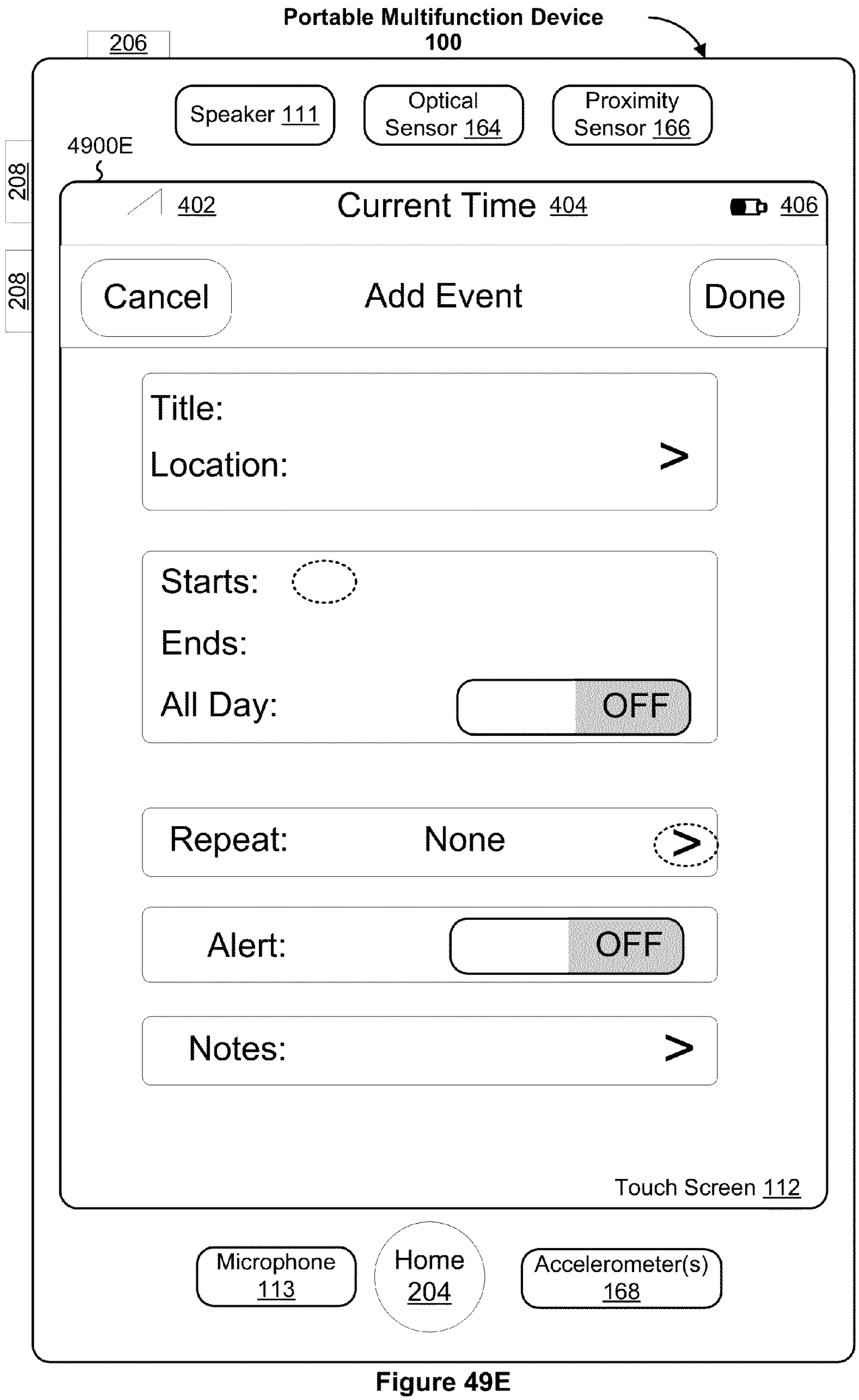
Figure 49F:
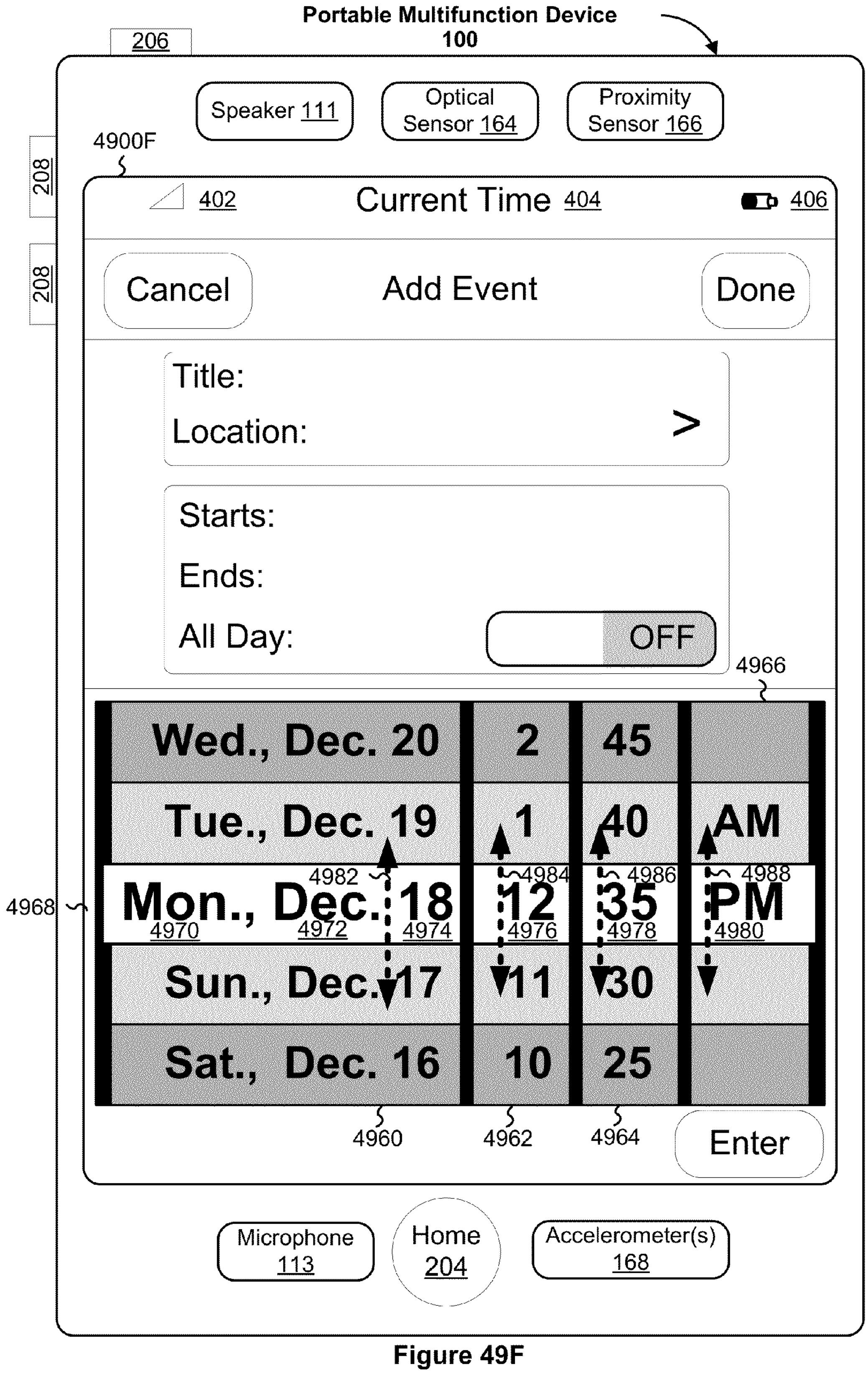
Figure 49G:
Figure 49H:
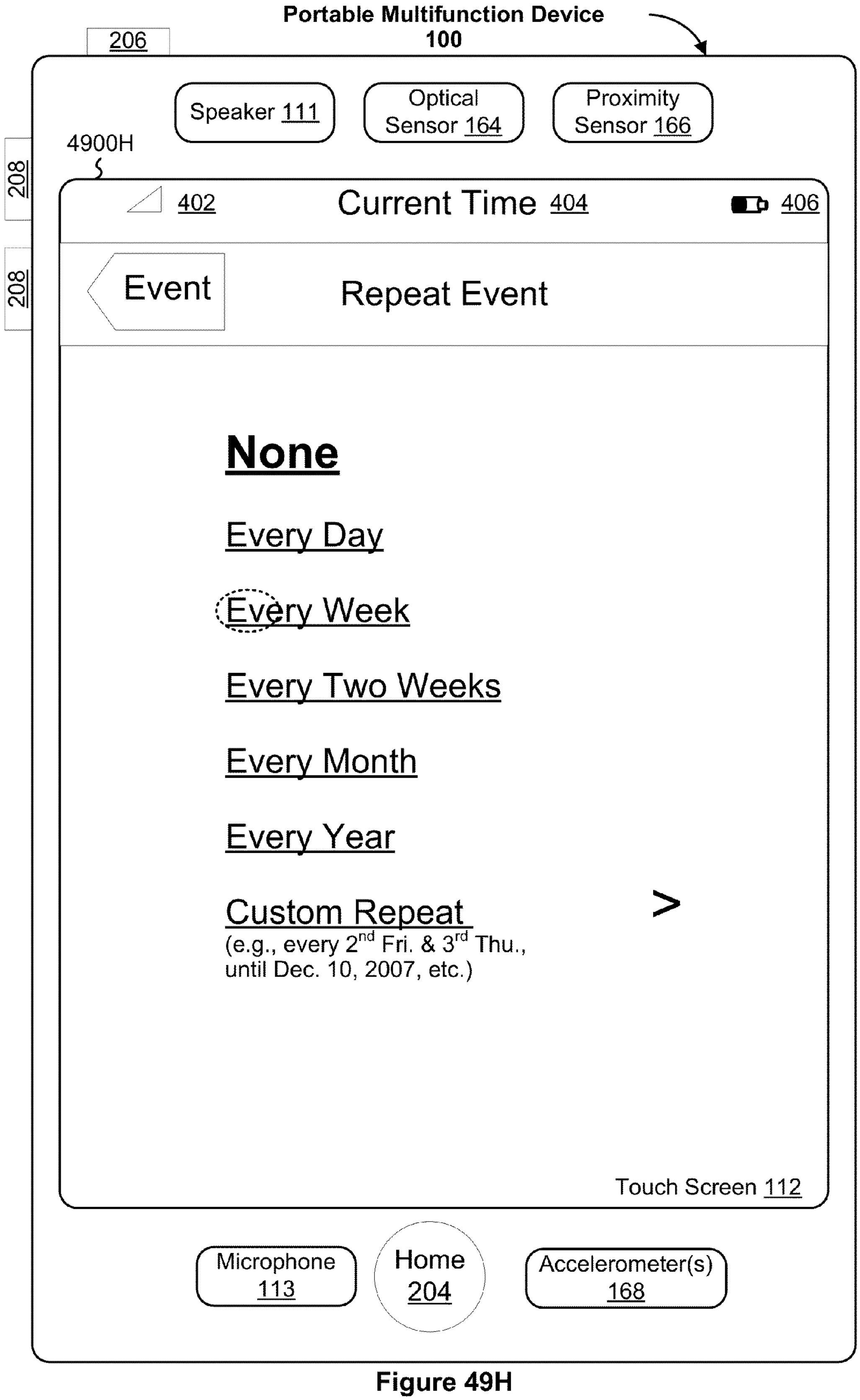
Figure 49I:
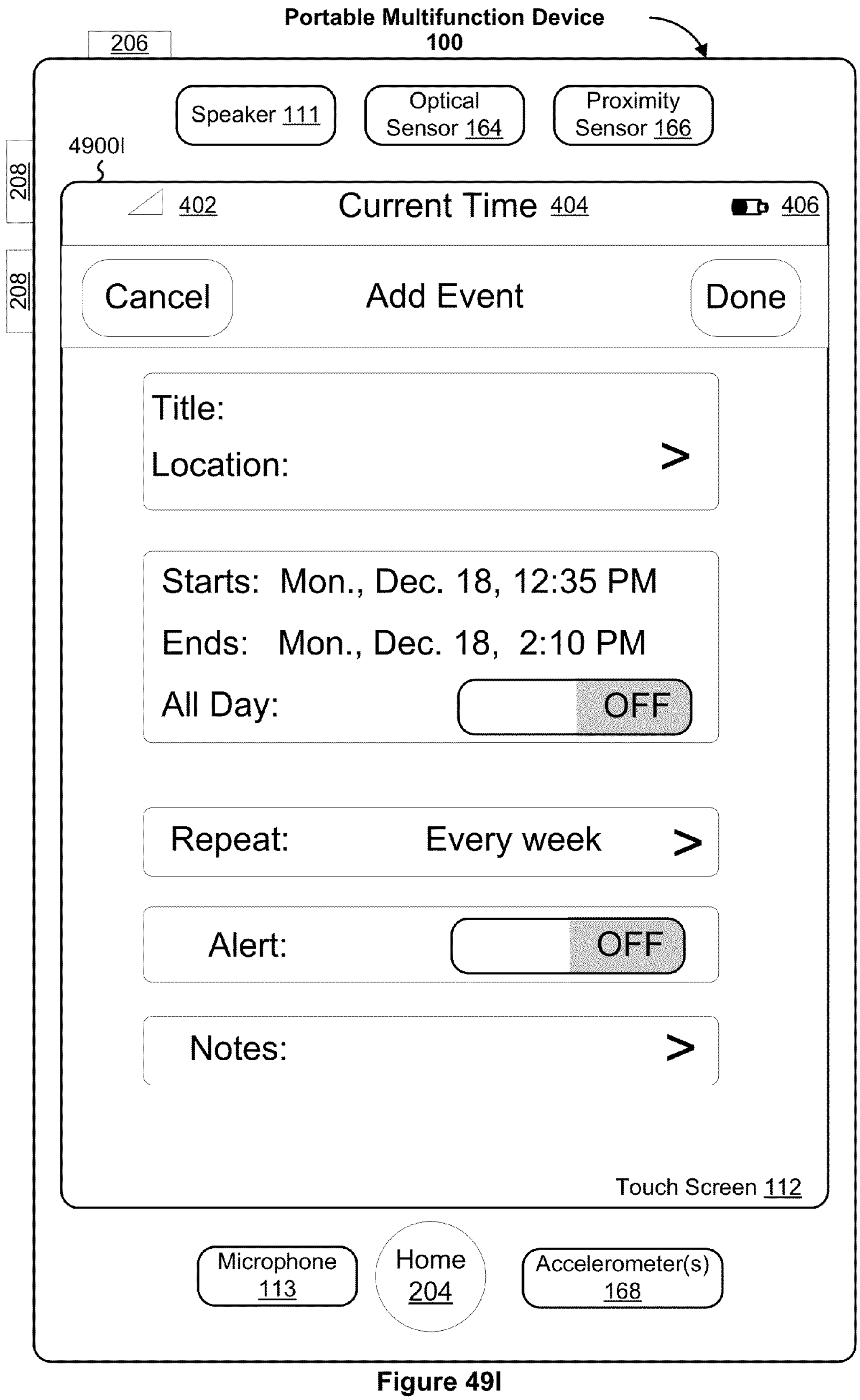
Figure 49J:
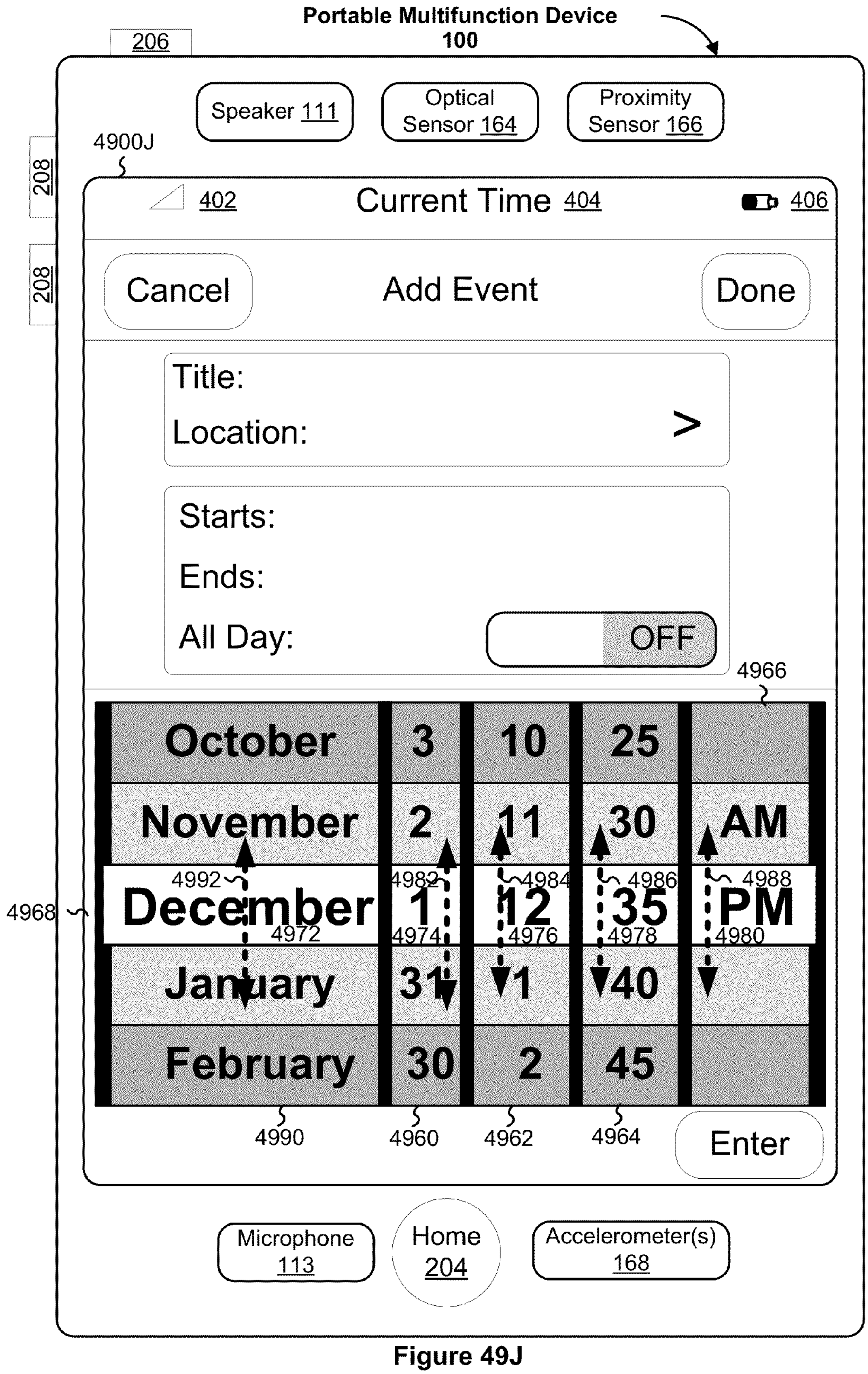
Figure 49K:
Figure 49L:
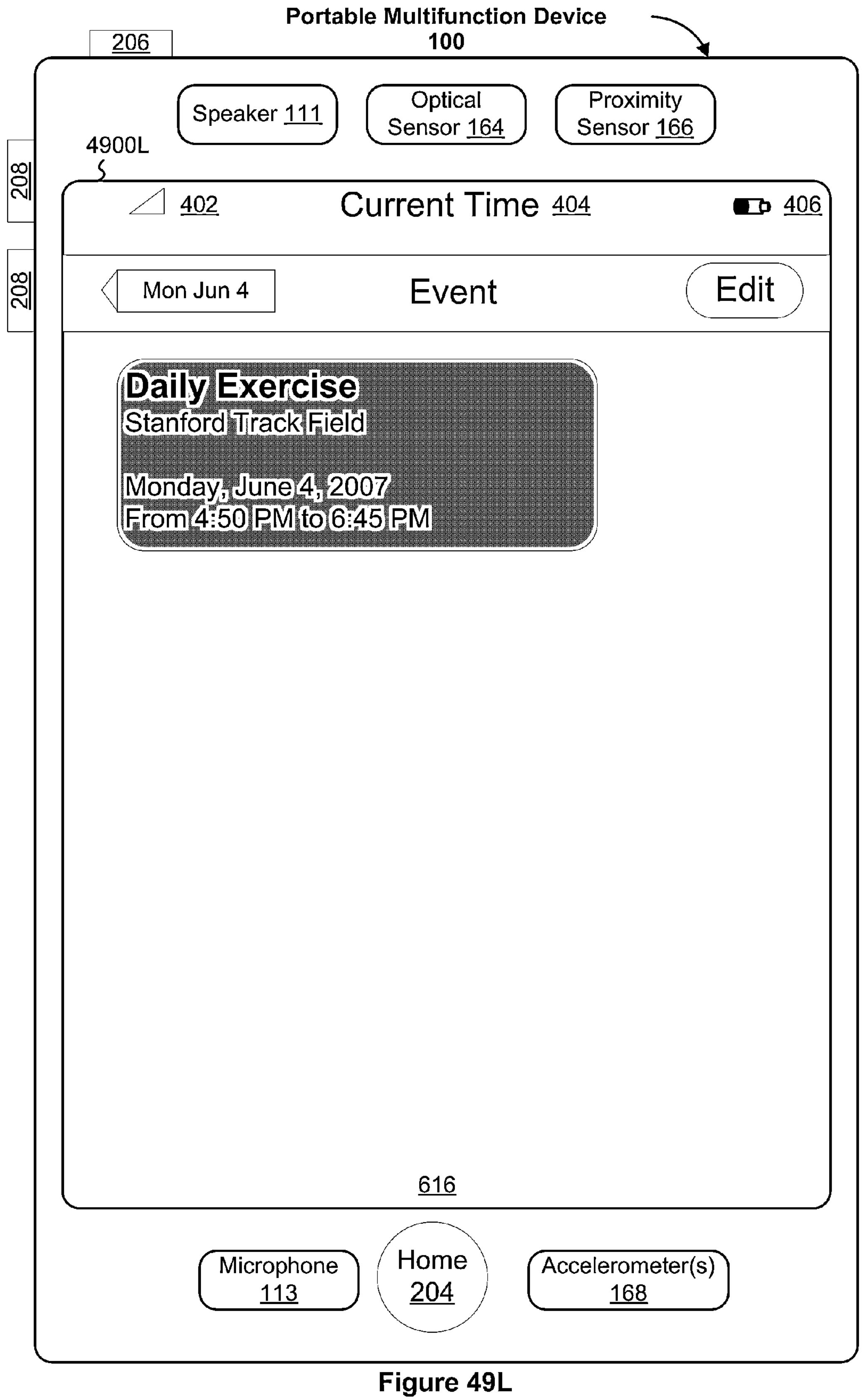
Figure 49M:
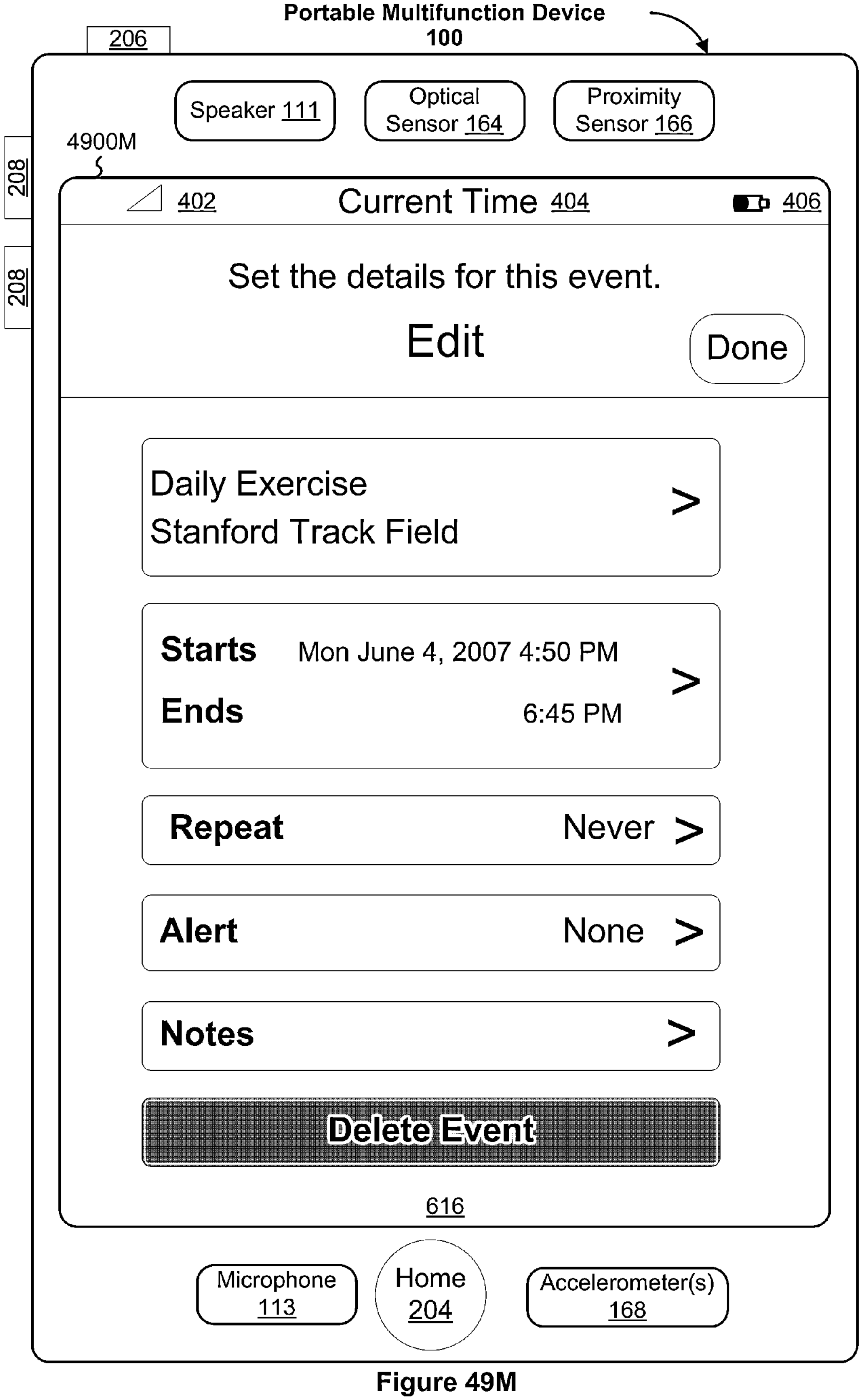
Figure 49N:
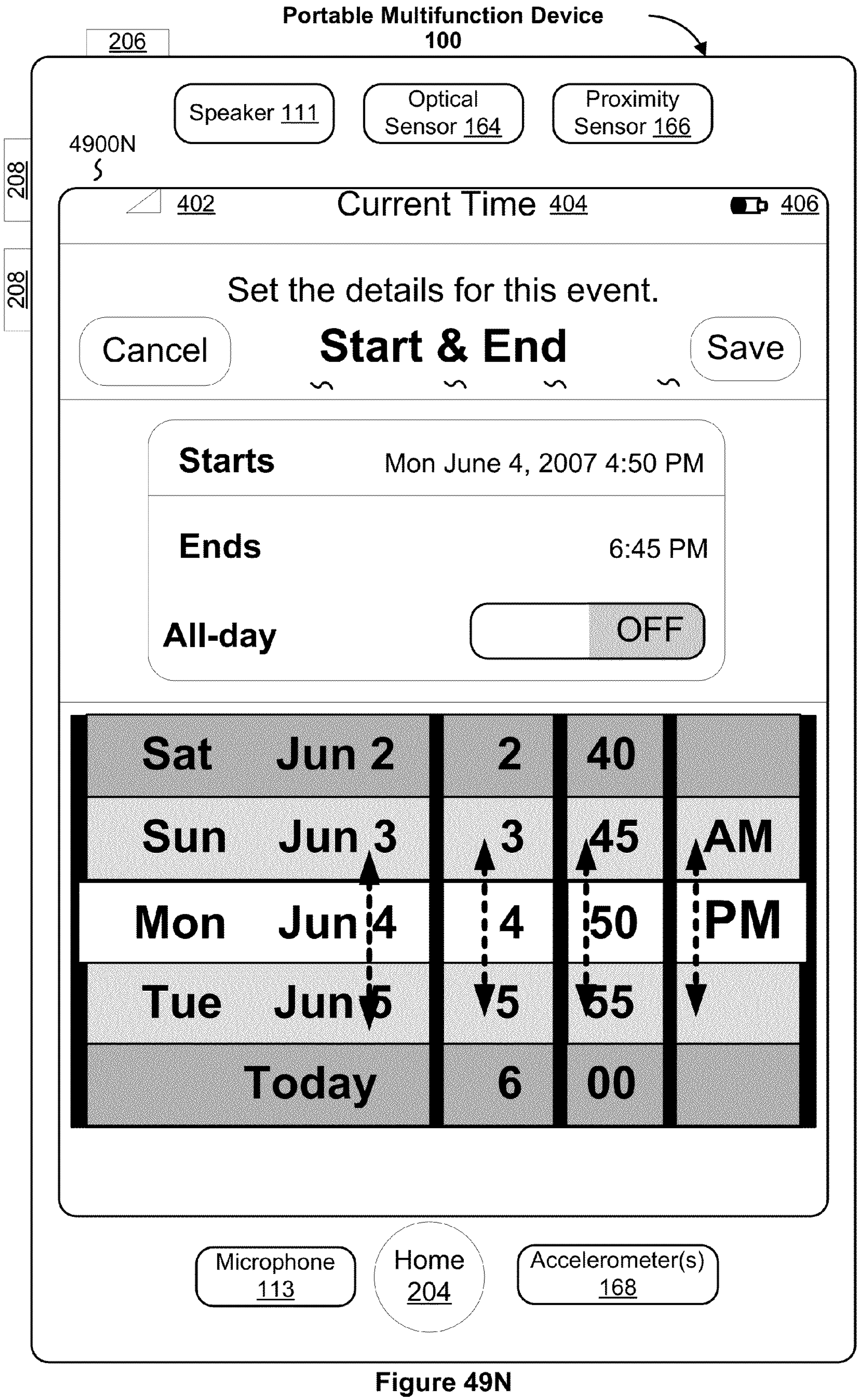

FIGS. 49A-49N illustrate exemplary user interfaces for a calendar in accordance with some embodiments. Additional description of calendars can be found in U.S. Provisional Patent Application No. 60/883,820, "System And Method For Viewing And Managing Calendar Entries," filed Jan. 7, 2007, the content of which is hereby incorporated by reference.

In some embodiments, the use of date and time wheels simplifies the input of date and time information using finger gestures on a touch screen display (e.g. FIGS. 49F, 49G, 49J, and 50B).

In some embodiments, a portable multifunction device (e.g., device 100) with a touch screen display (e.g., display 112) displays: a month column (e.g., column 4990, FIG. 49J) comprising a sequence of month identifiers; a date column (e.g., column 4960) comprising a sequence of date numbers; and a selection row (e.g., row 4968) that intersects the month column and the date column and contains a single month identifier (e.g., "December" 4972) and a single date number (e.g., "1" 4874). In some embodiments, the month column, date column and selection row are simultaneously displayed.

A gesture (e.g., gesture 4992) is detected on the month column. In some embodiments, the gesture on the month column is a finger gesture. In some embodiments, the gesture on the month column is a substantially vertical swipe. In some embodiments, the gesture on the month column is a substantially vertical gesture on or near the month column.

In response to detecting the gesture on the month column, the month identifiers in the month column are scrolled without scrolling the date numbers in the date column. In some embodiments, the month identifiers form a continuous loop in the month column.

A gesture (e.g., gesture 4982) is detected on the date column. In some embodiments, the gesture on the date column is a finger gesture. In some embodiments, the gesture on the date column is a substantially vertical swipe. In some embodiments, the gesture on the date column is a substantially vertical gesture on or near the date column.

In response to detecting the gesture on the date column, the date numbers in the date column are scrolled without scrolling the month identifiers in the month column. In some embodiments, the date numbers form a continuous loop in the date column.

The single month identifier and the single date number in the selection row after scrolling the month identifiers and the date numbers, respectively, are used as date input for a function or application (e.g., calendar 148) on the multifunction device.

A graphical user interface on a portable multifunction device with a touch screen display comprises: a month column comprising a sequence of month identifiers; a date column comprising a sequence of date numbers; and a selection row that intersects the month column and the date column and contains a single month identifier and a single date number. In response to detecting a gesture on the month column, the month identifiers in the month column are scrolled without scrolling the date numbers in the date column. In response to detecting a gesture on the date column, the date numbers in the date column are scrolled without scrolling the month identifiers in the month column. The single month identifier and the single date number in the selection row after scrolling the month identifiers and the date numbers, respectively, are used as date input for a function or application on the multifunction device.

Additional description of inputting date and time information can be found in U.S. Provisional Patent Application No. 60/947,146, "System, Method, and Graphical User Interface for Inputting Date and Time Information on a Portable Multifunction Device," filed Jun. 29, 2007, the content of which is hereby incorporated by reference.

Clock

Figure 50A:
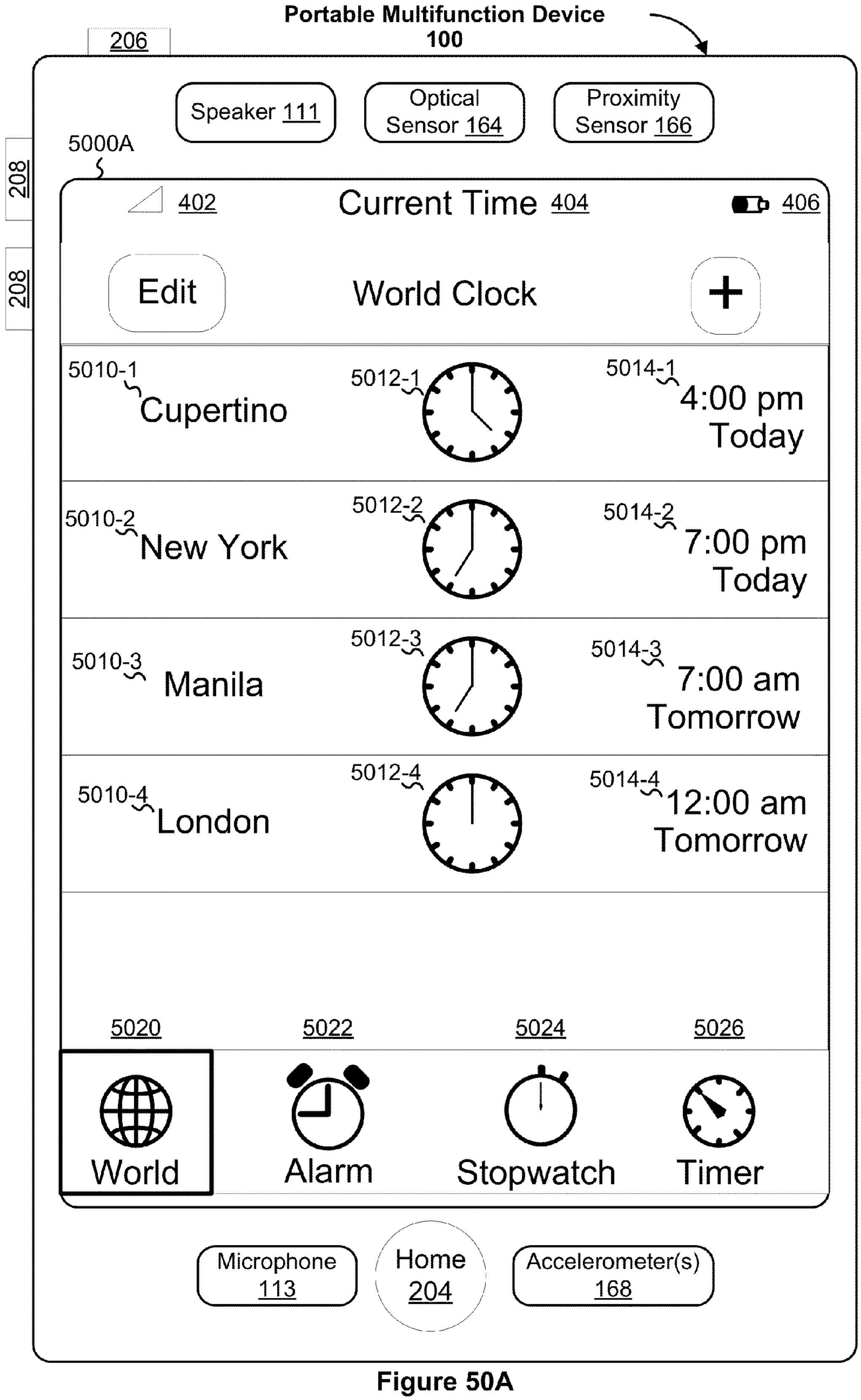
FIGS. 50A-50I illustrate exemplary user interfaces for a clock in accordance with some embodiments.
Figure 50B:
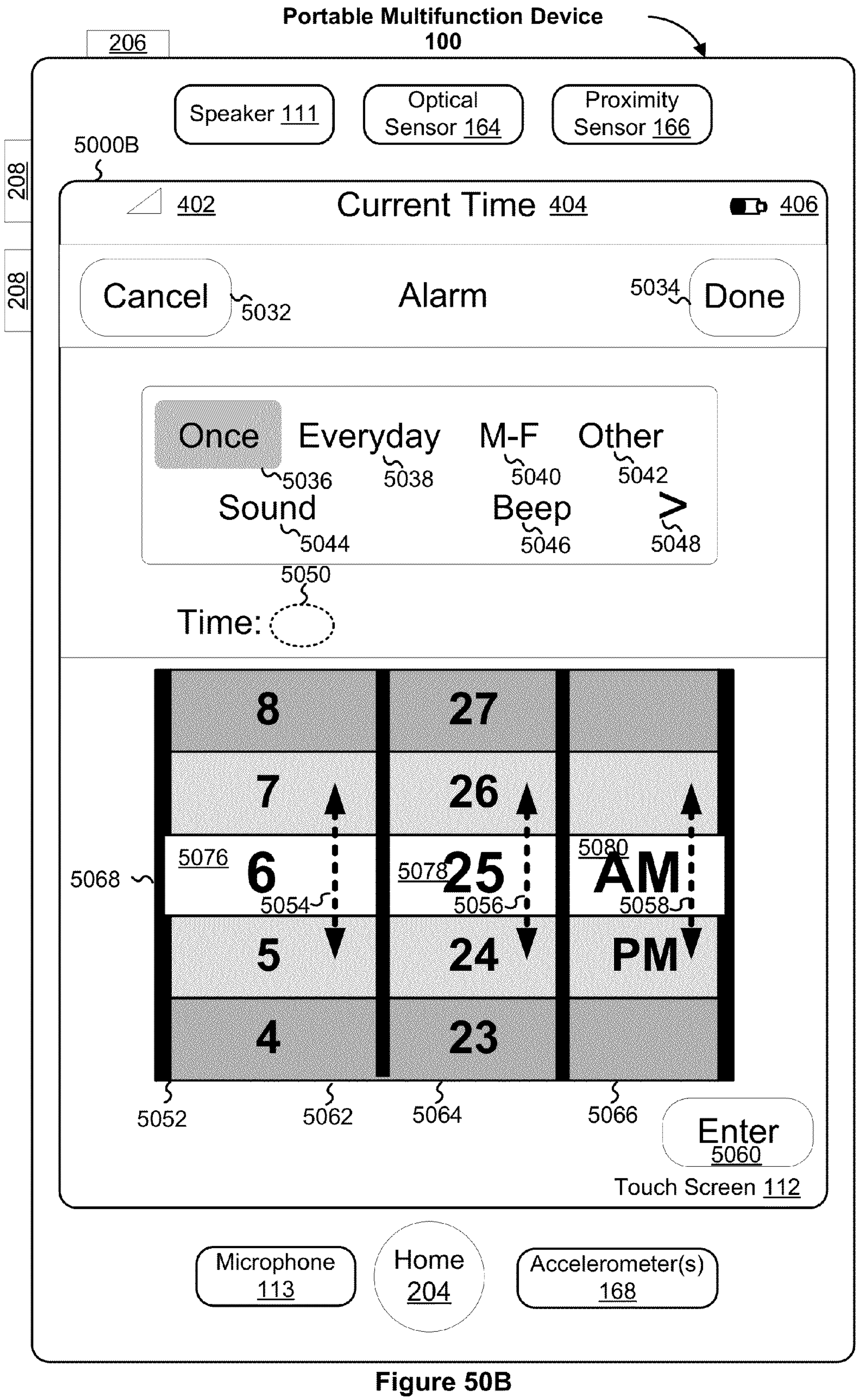
Figure 50C:
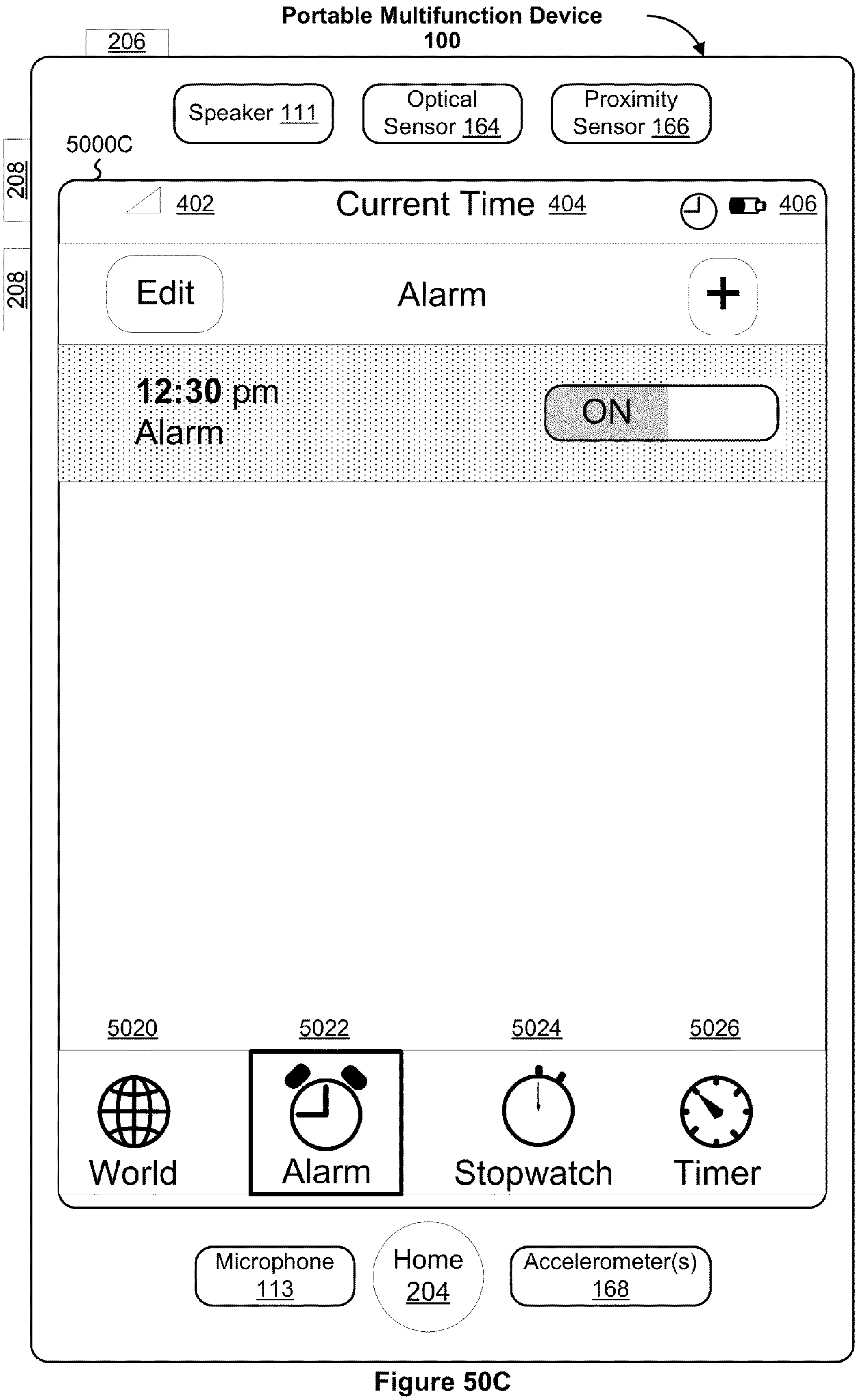
Figure 50D:
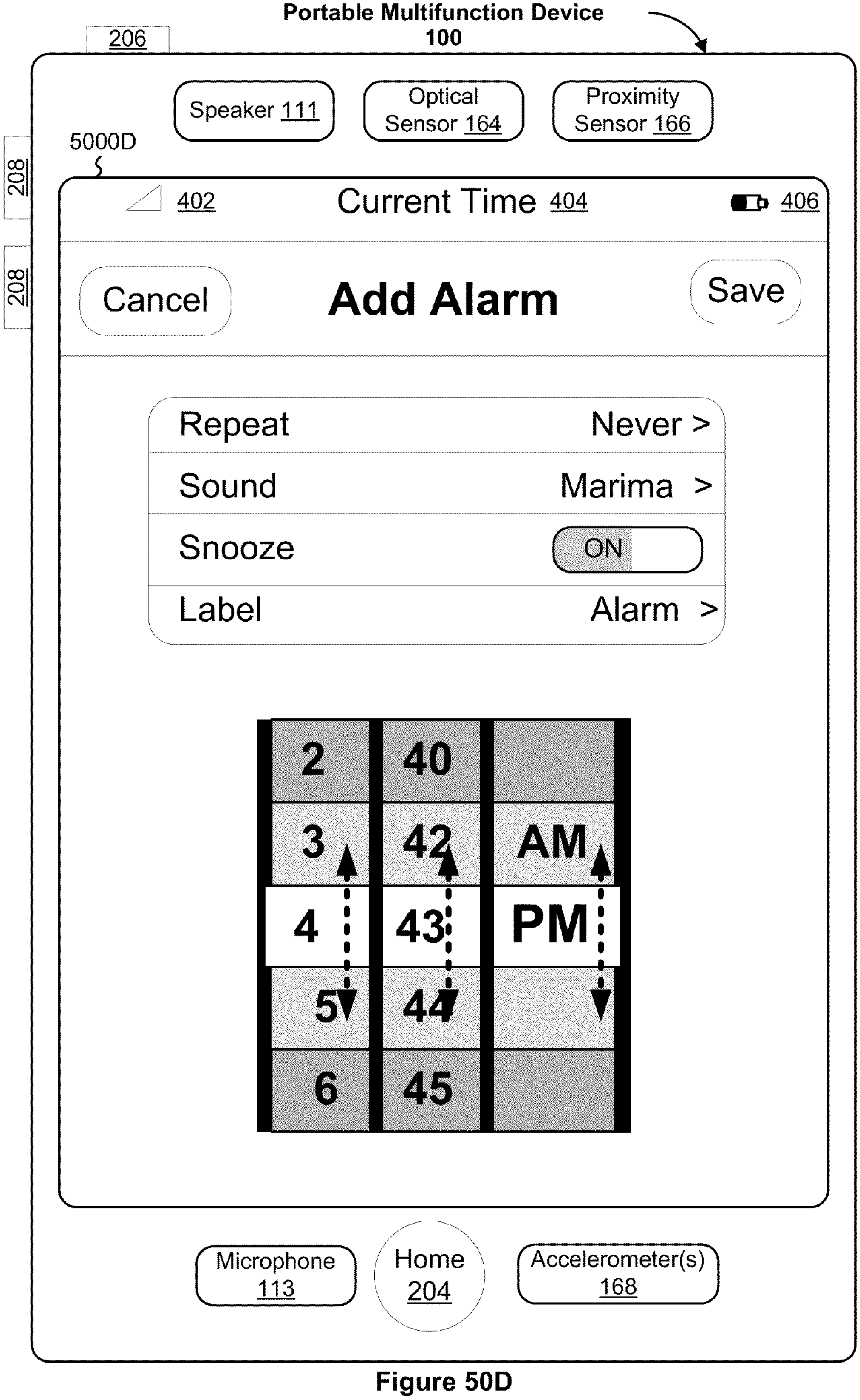
Figure 50E:
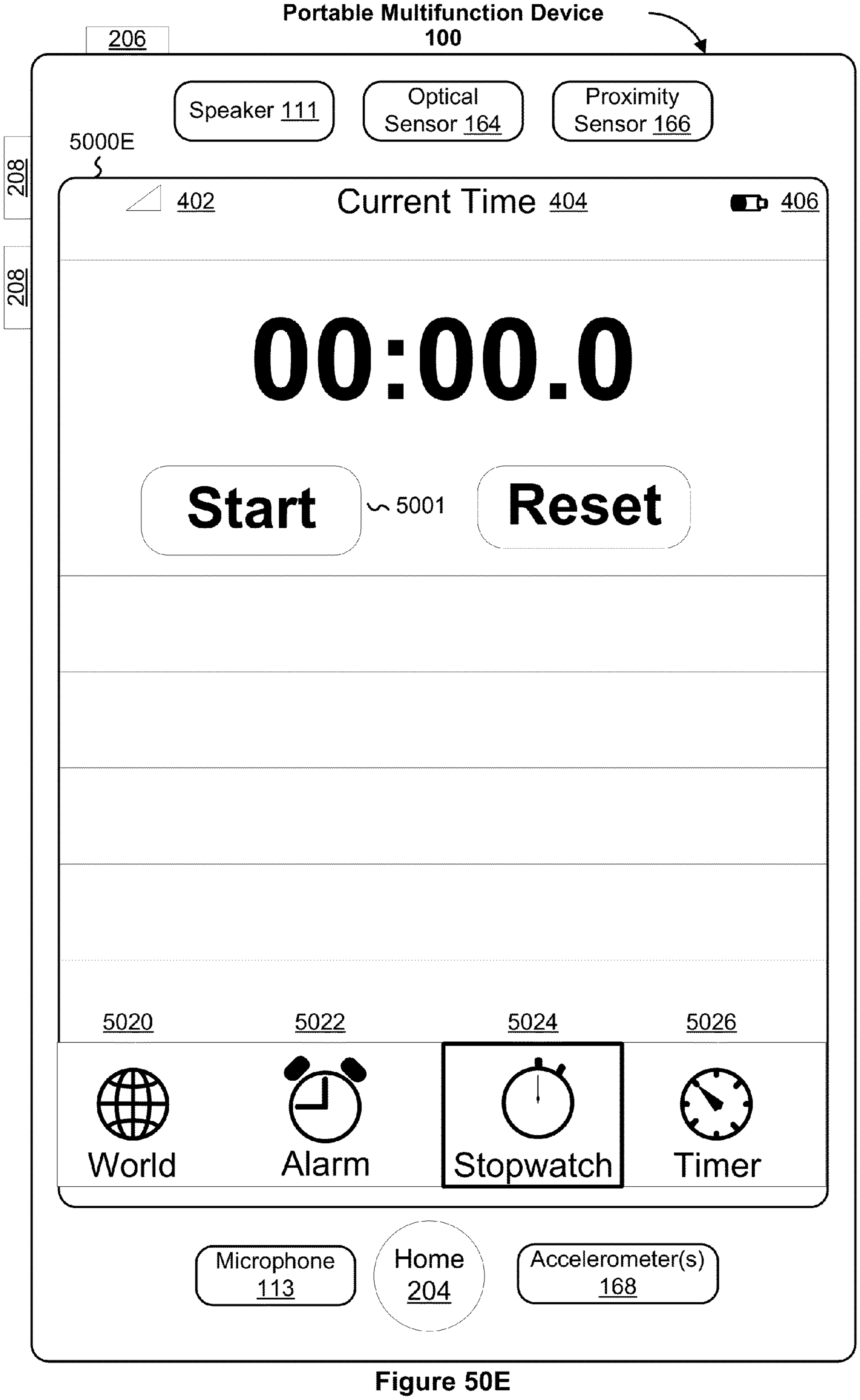
Figure 50F:
Figure 50G:
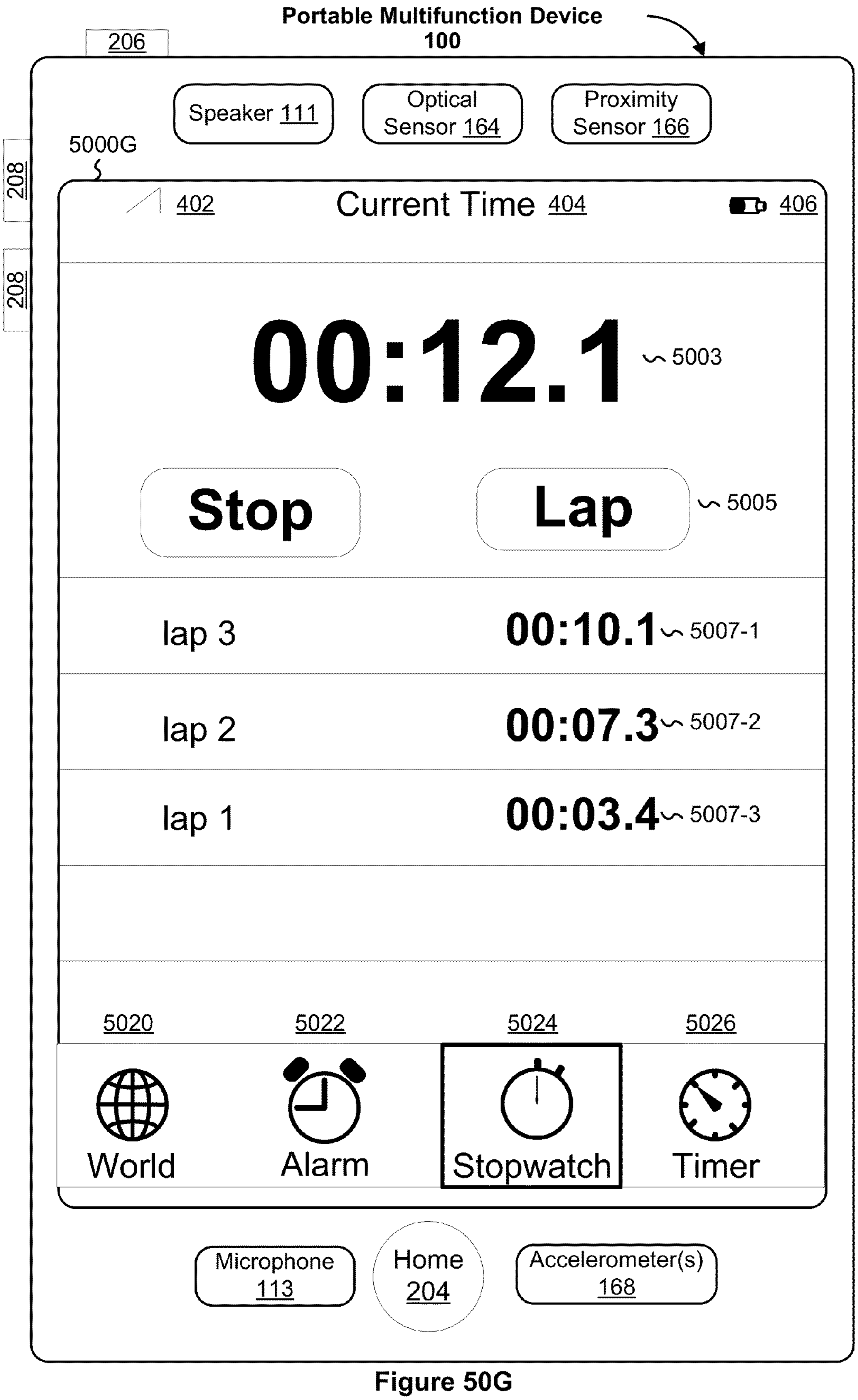
Figure 50H:
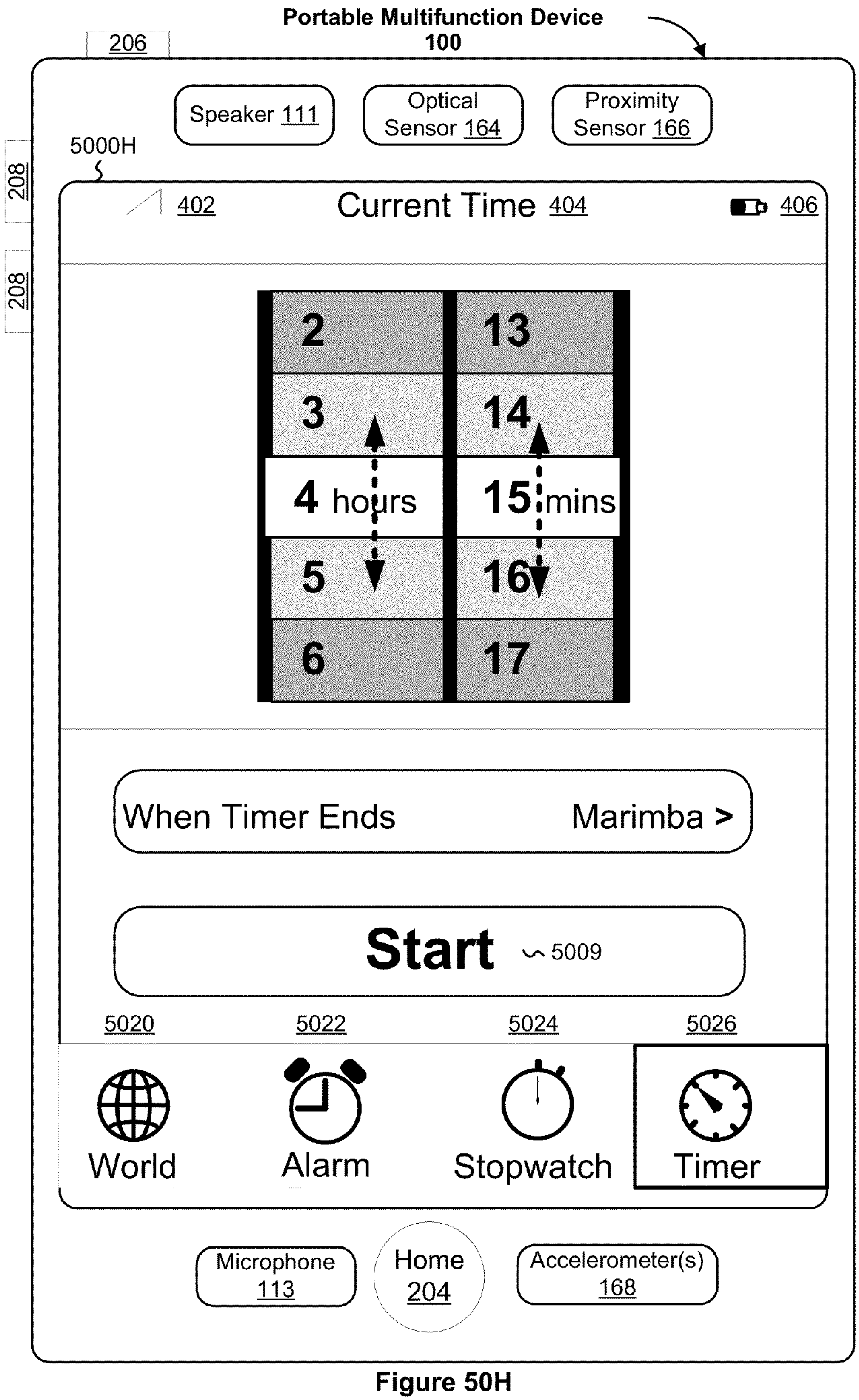
Figure 50I:
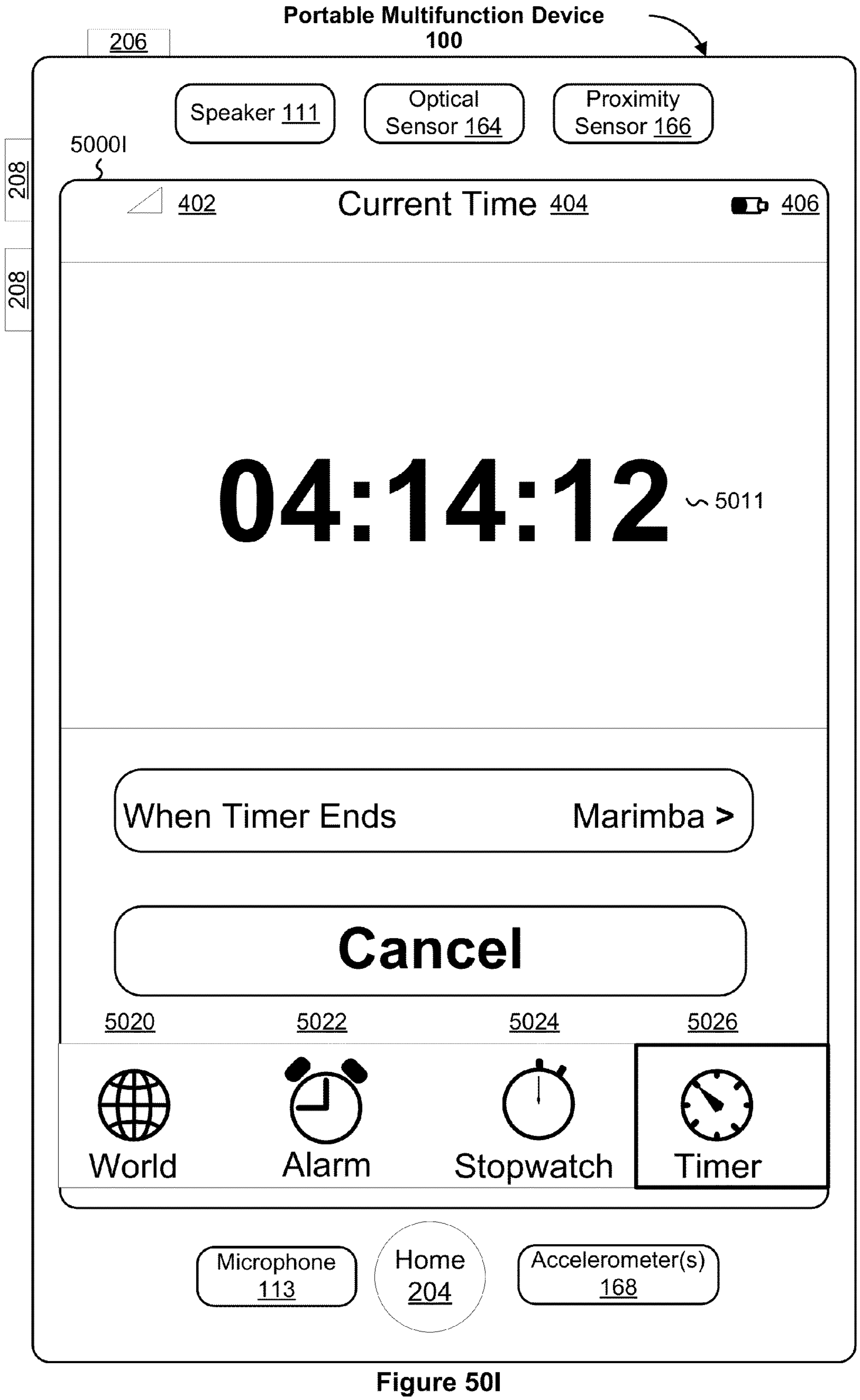

FIGS. 50A-50I illustrate exemplary user interfaces for a clock in accordance with some embodiments. In some embodiments, user interface 5000A includes the following elements, or a subset or superset thereof:

- 402, 404, and 406, as described above;
- Names of locations 5010;
- Clock icons 5012 and time and day information 5104 for each location 5010;
- World clock icon 5020 that when activated in a UI other than UI 5000A (e.g., by a finger tap on the icon) initiates display of a world clock (e.g., UI 5000A);
- Alarm icon 5022 that when activated (e.g., by a finger tap on the icon) initiates display of an alarm clock (e.g., UI 5000B, FIG. 50B or UI 500C, FIG. 5C);
- Stopwatch icon 5024 that when activated (e.g., by a finger tap on the icon) initiates display of a stopwatch (e.g., UI 5000E, FIG. 50E); and
- Timer icon 5026 that when activated (e.g., by a finger tap on the icon) initiates display of a timer (e.g., UI 5000H, FIG. 50H).

FIG. 50B illustrates an exemplary user interface for setting an alarm clock in accordance with some embodiments. In some embodiments, user interface 5000B includes the following elements, or a subset or superset thereof:

- 402, 404, and 406, as described above;
- alarm frequency setting icons 5036, 5038, 5040, and 5042 for setting the frequency of the alarm;
- sound icon 5044 and beep icon 5046 for setting the sound associated with the alarm;
- additional setting options icon 5048 that when activated (e.g., by a finger tap on the icon) initiates display of a user interface for specifying additional alarm settings;
- wheels of time 5052 for displaying and setting the alarm time;
- enter icon 5060 for entering the alarm time displayed on the wheel of time 5052;
- cancel icon 5032 that when activated (e.g., by a finger tap on the icon) returns the device to the previous user interface; and
- done icon 5034 that when activated (e.g., by a finger tap on the icon) saves the alarm settings specified by the user and returns the device to the previous user interface.

In some embodiments, the wheels of time 5052 are displayed in response to detection of a finger contact 5050. The alarm time displayed on the wheels of time 5052 may be modified in response to detection of a substantially vertical swipe 5054 to change the hour setting, a substantially vertical swipe 5056 to change the minutes setting, and/or a substantially vertical swipe (e.g., 4988, FIG. 49F or 5058, FIG. 50B) to change the AM/PM setting. In some embodiments, in response to detection of a finger contact on the enter icon 5060, the alarm time displayed on the wheels of time 5052 is saved and display of the wheels of time 5052 is ceased.

In some embodiments, the use of time wheels simplifies the input of time information using finger gestures on a touch screen display.

In some embodiments, a portable multifunction device (e.g., device 100) with a touch screen display (e.g., display 112) displays: an hour column (e.g., column 5062, FIG. 50B) comprising a sequence of hour numbers; a minute column (e.g., column 5064, FIG. 50B) comprising a sequence of minute numbers; and a selection row (e.g., row 5068, FIG. 50B) that intersects the hour column and the minute column and contains a single hour number (e.g., "6" 5076) and a single minute number (e.g., "25" 5078).

A gesture (e.g., gesture 5054) is detected on the hour column. In some embodiments, the gesture on the hour column is a finger gesture. In some embodiments, the gesture on the hour column is a substantially vertical swipe.

In response to detecting the gesture on the hour column, the hour numbers in the hour column are scrolled without scrolling the minute numbers in the minute column. In some embodiments, the hour numbers form a continuous loop in the hour column.

A gesture (e.g., gesture 5056) is detected on the minute column. In some embodiments, the gesture on the minute column is a finger gesture. In some embodiments, the gesture on the minute column is a substantially vertical swipe.

In response to detecting the gesture on the minute column, the minute numbers in the minute column are scrolled without scrolling the hour numbers in the hour column. In some embodiments, the minute numbers form a continuous loop in the minute column.

The single hour number and the single minute number in the selection row after scrolling the hour numbers and the date numbers, respectively, are used as time input for a function or application on the multifunction device.

A graphical user interface on a portable multifunction device with a touch screen display comprises: a hour column comprising a sequence of hour numbers; a minute column comprising a sequence of minute numbers; and a selection row that intersects the hour column and the minute column and contains a single hour number and a single minute number. In response to detecting a gesture on the hour column, the hour numbers in the hour column are scrolled without scrolling the minute numbers in the minute column. In response to detecting a gesture on the minute column, the minute numbers in the minute column are scrolled without scrolling the hour numbers in the hour column. The single hour number and the single minute number in the selection row after scrolling the hour numbers and the minute numbers, respectively, are used as time input for a function or application on the multifunction device.

In some embodiments, the date and time wheels are combined to make it easy to set a date and time with finger gestures. For example, FIG. 49F shows date and time wheels with a single month and date column, an hour column, a minutes column, and an AM/PM column for inputting date and time information for calendar events.

In some embodiments, a portable multifunction device (e.g., device 100) with a touch screen display (e.g., display 112) displays a date column (e.g., column 4960, FIG. 49F) comprising a sequence of dates, an hour column (e.g., column 4962) comprising a sequence of hour numbers; and a minute column (e.g., column 4964) comprising a sequence of minute numbers. A respective date in the sequence of dates comprises a name of a month (e.g., "Dec." 4972) and a date number (e.g., "18" 4974) of a day within the month. In some embodiments, the respective date in the sequence of dates further comprises a day of the week (e.g., "Mon." 4970) corresponding to the name of the month and the date number of the day within the month.

The device also displays a selection row (e.g., row 4968) that intersects the date column, the hour column, and the minute column and contains a single date (e.g., 4970, 4972, and 4974), a single hour number (e.g., "12" 4976), and a single minute number (e.g., "35" 4978).

A gesture (e.g., gesture 4982) on the date column is detected. In response to detecting the gesture on the date column, the dates in the date column are scrolled without scrolling the hour numbers in the hour column or the minute numbers in the minute column. In some embodiments, the gesture on the date column is a finger gesture. In some embodiments, the gesture on the date column is a substantially vertical swipe.

A gesture (e.g., gesture 4984) on the hour column is detected. In response to detecting the gesture on the hour column, the hour numbers in the hour column are scrolled without scrolling the dates in the date column or the minute numbers in the minute column. In some embodiments, the gesture on the hour column is a finger gesture. In some embodiments, the gesture on the hour column is a substantially vertical swipe. In some embodiments, the hour numbers form a continuous loop in the hour column.

A gesture (e.g., gesture 4986) on the minute column is detected. In response to detecting the gesture on the minute column, the minute numbers in the minute column are scrolled without scrolling the dates in the date column or the hour numbers in the hour column. In some embodiments, the gesture on the minute column is a finger gesture. In some embodiments, the gesture on the minute column is a substantially vertical swipe. In some embodiments, the minute numbers form a continuous loop in the minute column.

The single date, the single hour number, and the single minute number in the selection row after scrolling the dates, the hour numbers and the minute numbers, respectively, are used as time input for a function or application (e.g., calendar 148) on the multifunction device.

FIG. 50D illustrates another exemplary user interface for setting an alarm in accordance with some embodiments For the stopwatch (FIGS. 50E-50G), in response to activation of a start icon 5001 (FIG. 50E), an elapsed time 5003 (FIG. 50F) is displayed. In response to each activation of a lap icon 5005 (FIG. 50F), corresponding lap times 5007 (FIG. 50G) are displayed.

For the timer (FIGS. 50H-50I), in response to activation of a start icon 5009 (FIG. 50H), a remaining time 5011 (FIG. 50I) is displayed.

Widget Creation Application

Figure 51A:
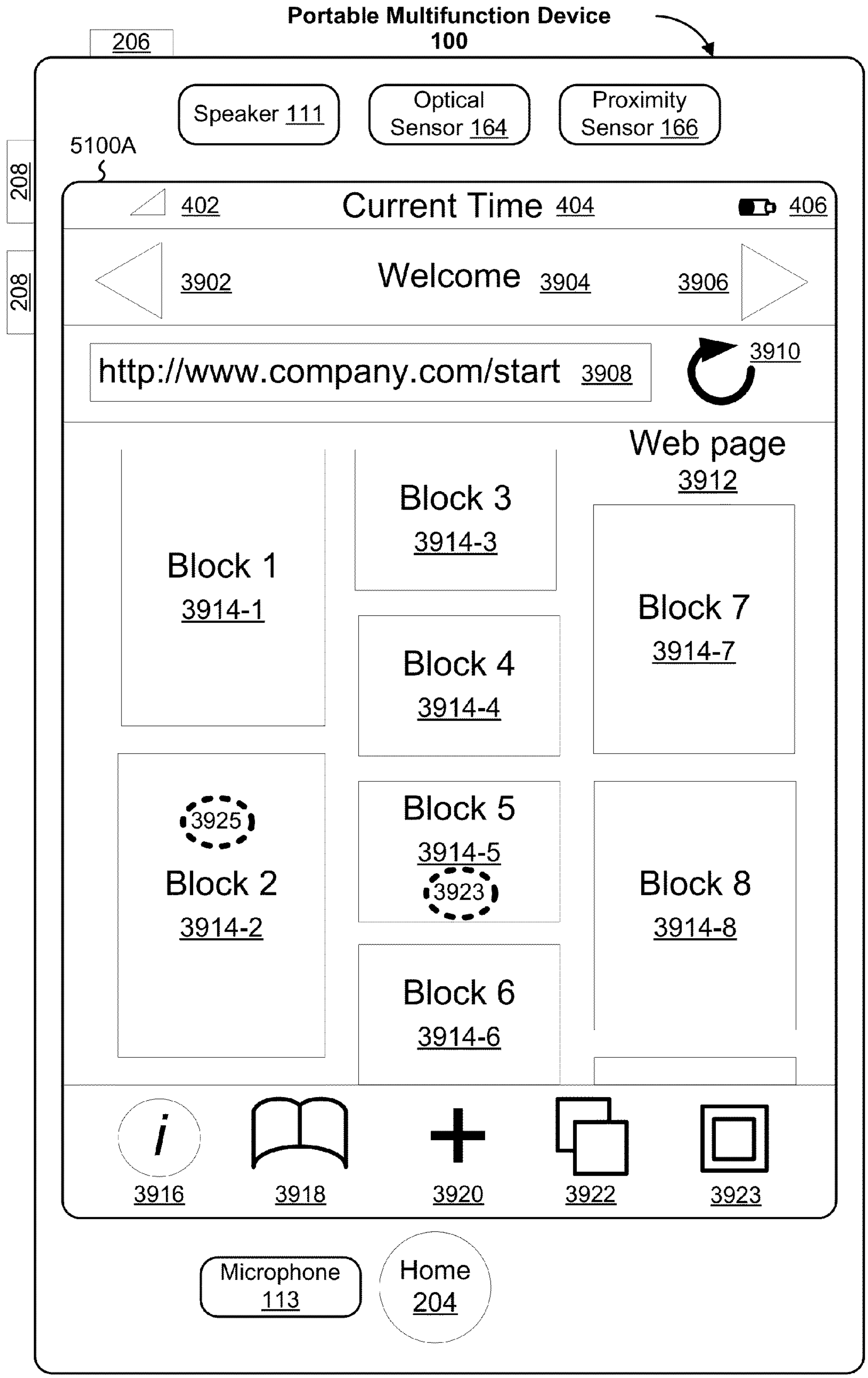
FIGS. 51A-51B illustrate exemplary user interfaces for creating a widget in accordance with some embodiments.
Figure 51B:
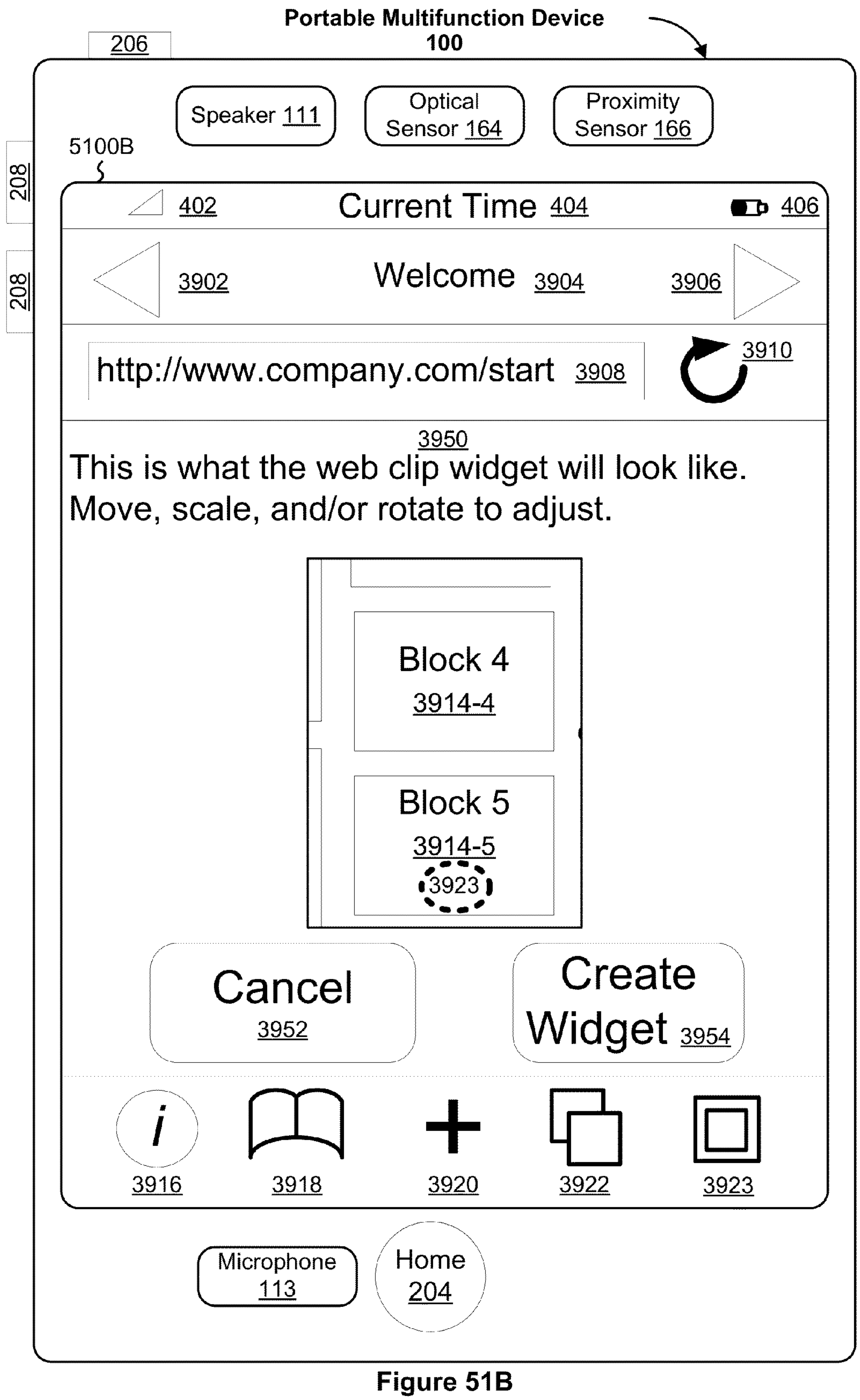

FIGS. 51A-51B illustrate exemplary user interfaces for creating a widget in accordance with some embodiments.

Additional description of user created widgets can be found in U.S. Provisional Patent Application Nos. 60/883,805, "Web Clip Widgets On A Portable Multifunction Device," filed Jan. 7, 2007 and 60/946,712, "Web Clip Widgets on a Portable Multifunction Device," filed Jun. 27, 2007, the contents of which are hereby incorporated by reference.

Map Application

FIGS. 52A-52H illustrate exemplary user interfaces for a map application in accordance with some embodiments.

Upon detecting a user selection of the map icon 154 in FIG. 4B, the device renders the user interface 5200A on its touch screen display. The user interface 5200A includes a text box 5202 for a user to enter search term(s) and a bookmark icon 5204. A default map is displayed on the touch screen display.

Figure 52A:
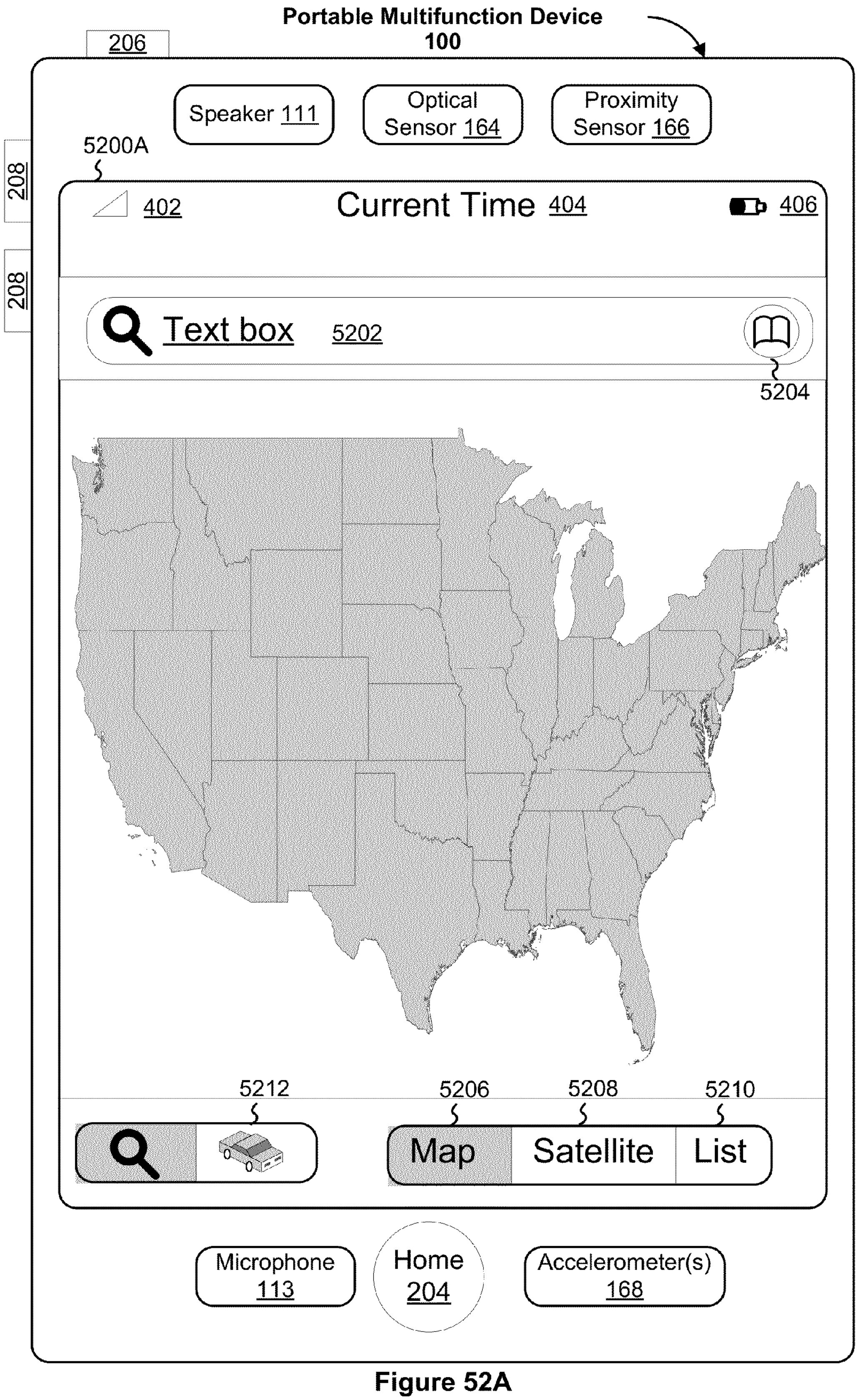
FIGS. 52A-52H illustrate exemplary user interfaces for a map application in accordance with some embodiments.

In some embodiments, the default map is a large map (e.g., the continental portion of the United States in FIG. 52A). In some other embodiments, the default map is the last map displayed when the map module was previously used. In some other embodiments, the default map is a map of the geographical area that the device is currently located. To generate this map, data about the current location of the device is retrieved from a remote data center or the GPS module built into the device. This data is then submitted to a remote map server to generate a map of the local area.

In some embodiments, the device, periodically or not, generates a new version of the local map to replace the old version. When the user activates the map module, the latest version of the local map is displayed as the default map.

The user interface 5200A also includes several application icons. For example, a user selection of the direction icon 5212 replaces the user interface 5200A with a new interface through which the user can enter a begin address and an end address. For a given pair of addresses, the device can display information about the driving direction from the begin address to the end address and also the return driving directions.

A map search result may be displayed in one of three different views: (i) map view 5206, (ii) satellite view 5208, and (iii) list view 5210. As shown in FIG. 52C, the map view 5206 displays a geographical map covering the map search result with one or more clickable icons corresponding to the entities matching a user-provided search query within the geographical area. The satellite view 5210 replaces the geographical map with a satellite image of the same geographical area. The list view 5210 arranges the matching entities in the map search result into a list and displays the list in a primarily text format.

Figure 52B:
Figure 52C:
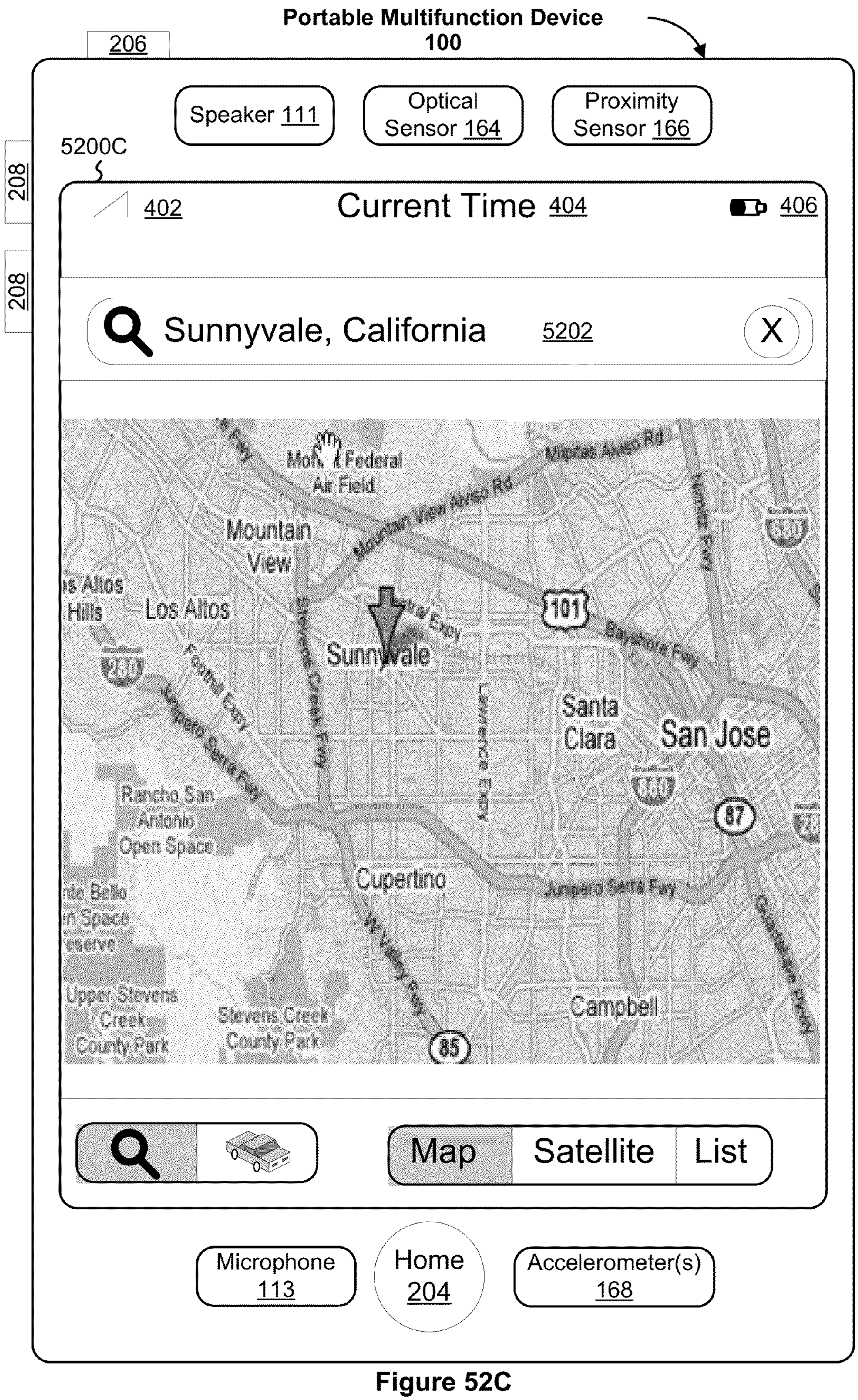

As shown in FIG. 52B, a user selection of the text box 5202 replaces the bookmark icon 5204 with a delete icon 5214. A soft keyboard 5216 appears in the lower portion of the touch screen display. The user can enter a search query by finger taps on the key icons. For example, the user enters the term "Sunnyvale, Calif." into the text field and then hits the search icon at the lower right corner of the keyboard.

FIG. 52C depicts a graphical user interface 5200C illustrating the map search result associated with the search query "Sunnyvale, Calif.". Note that the map search result is displayed in a map view. There is an arrow in the central region of map pointing to the City of Sunnyvale.

In some embodiments, a user can move the map on the touch screen display by a single stationary finger contact with the map followed by finger movements on the touch screen display. Through this operation, the user can view the neighboring areas not shown initially on the touch screen display. Various finger gestures discussed above in connection with FIG. 39C can be used here to manipulate the map. For example, a finger de-pinching gesture zooms into the map to display more details of the local geographical information. A finger pinching gesture zooms out of the map to provide a map of a broader area including the area covered by the map.

Figure 52D:
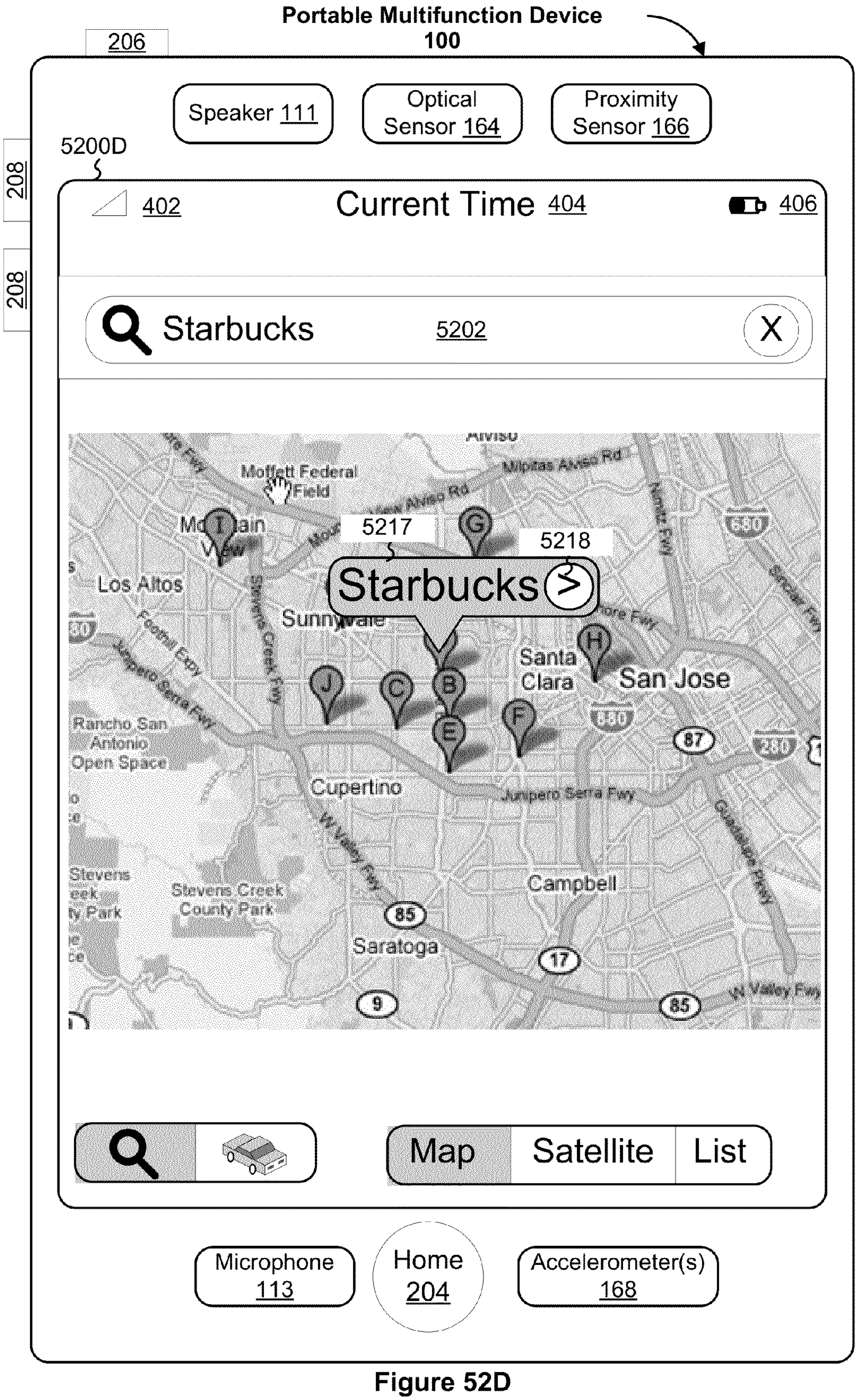

FIG. 52D depicts a graphical user interface 5200D illustrating the map search result associated with the query "Starbucks". The map search result includes the locations of Starbucks Coffee stores in the Sunnyvale area, each clickable balloon on the map representing one store in the area. One of the stores at approximately the center of the map is highlighted by a larger label icon 5217. The label icon 5217 includes an arrow icon 5218.

Figure 52E:
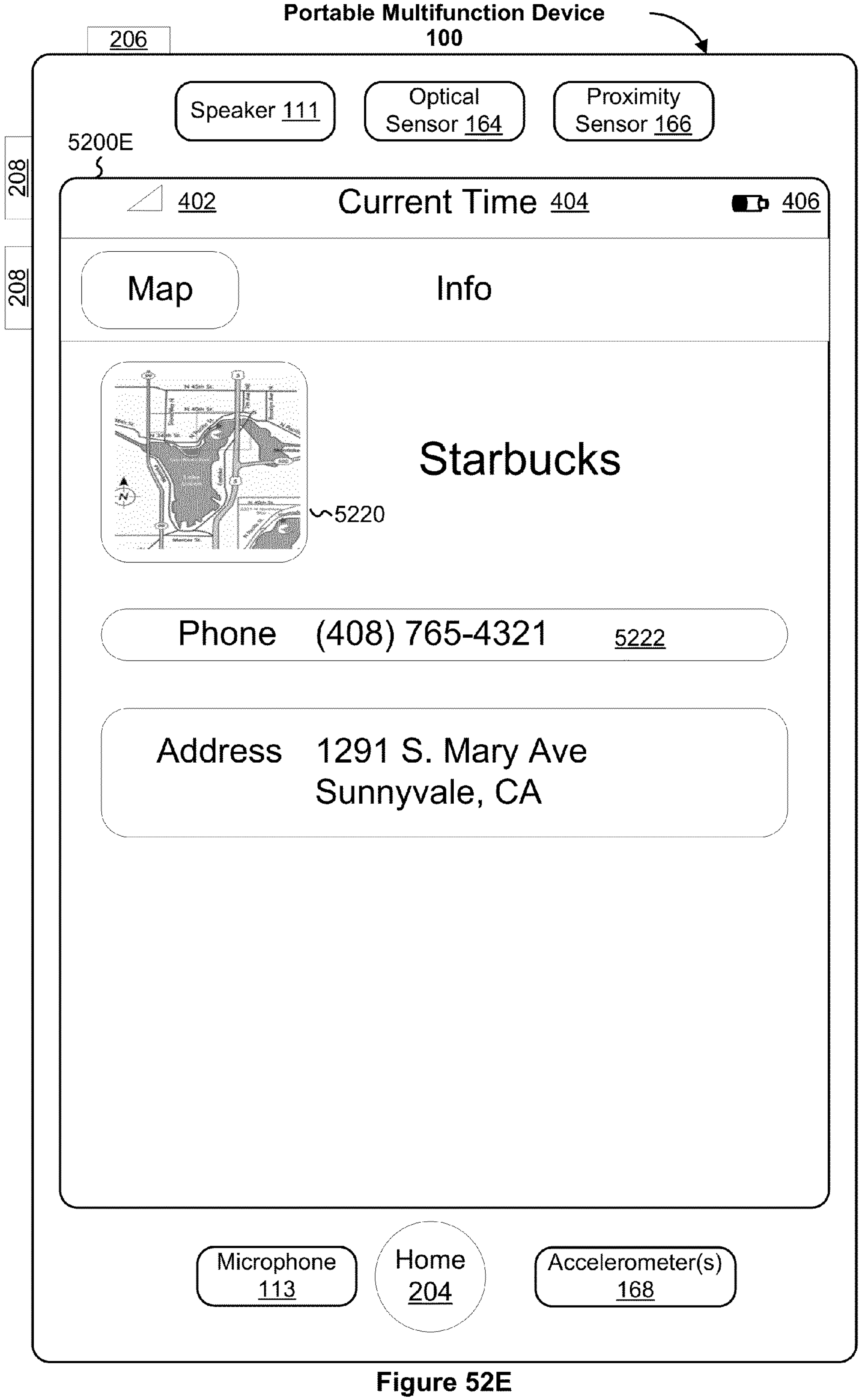

FIG. 52E depicts a graphical user interface 5200E illustrating the details of one Starbucks store, which are displayed in response to a user selection of the arrow icon 5218 in FIG. 52D. A local map 5220 provides more details about this Starbucks store. There is a phone call icon 5222 including the store's phone number. User selection of the phone call icon (e.g., by a finger tap on the icon) initiates a phone call to the store and the user interface 5200E is replaced with a phone call user interface (e.g., 3000A in FIG. 30A).

Figure 52F:
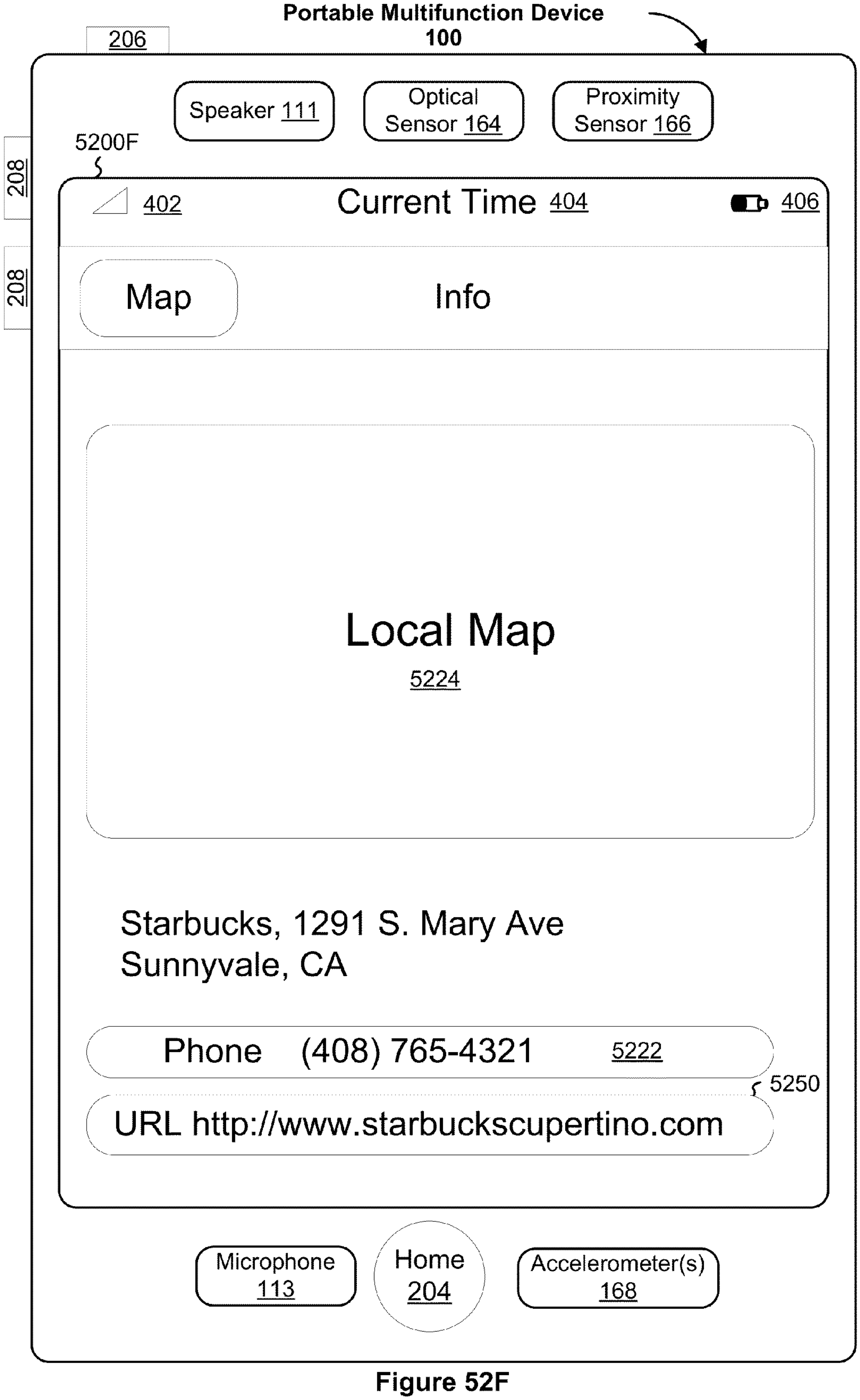

FIG. 52F depicts a graphical user interface 5200F that is displayed in response to a user selection of the local map 5220. An enlarged version of the map 5224 occupies most of the touch screen display. In addition to the phone call icon 5222, there may also be a URL link icon 5250 to the store's homepage. User selection of the URL link icon 5250 (e.g., by a finger tap on the icon) may initiate display of the corresponding web page in the browser application 147.

Figure 52G:
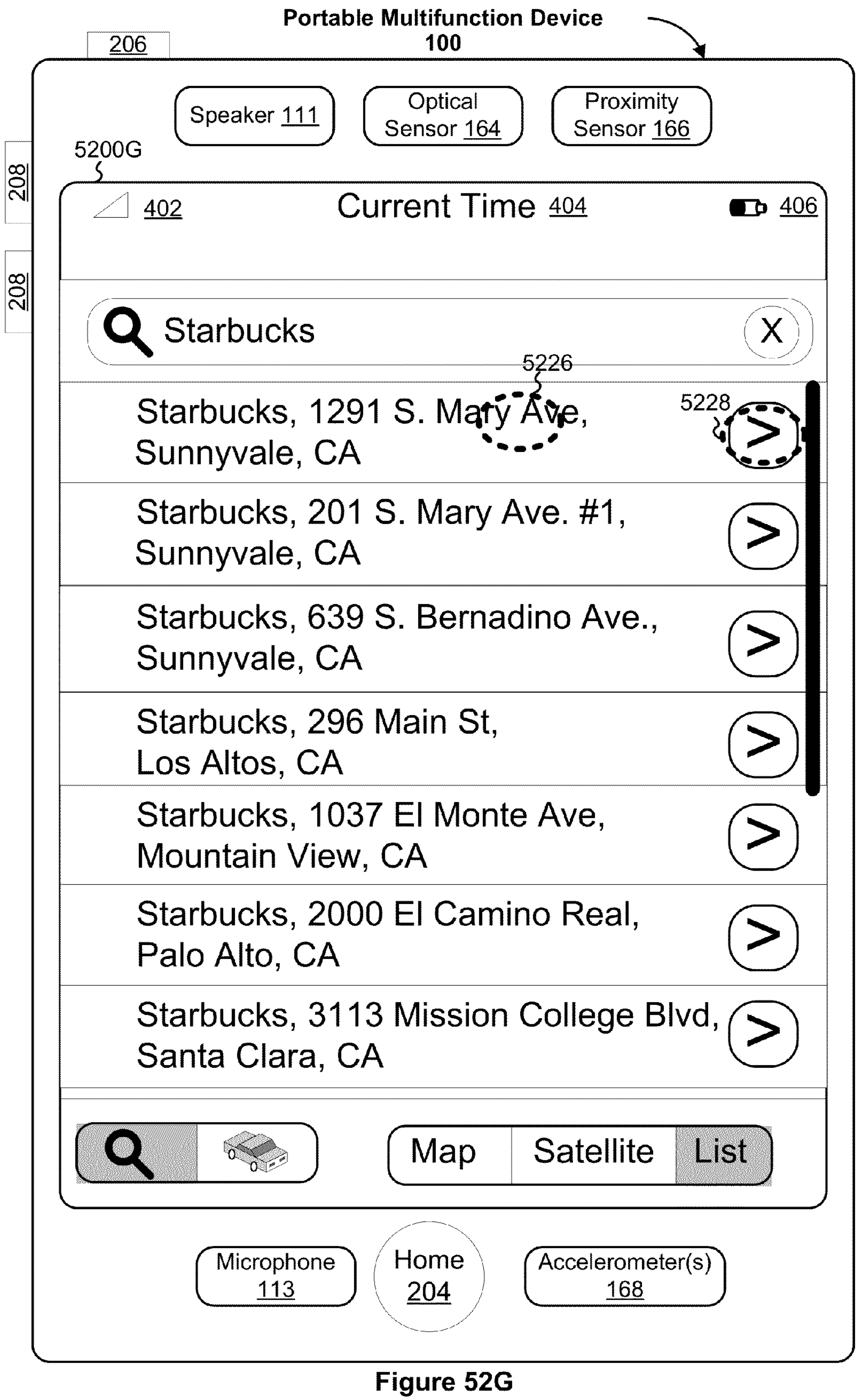

FIG. 52G depicts a graphical user interface 5200G that is displayed in response to a user selection of the list view icon in FIG. 52D. A user selection 5226 of a store address in the list brings the user back to interface 5200D shown in FIG. 52D. The label icon 5217 is next to the user-selected store in the list. A user selection 5228 of the more detail icon brings back the user interface 5200E shown in FIG. 52E for the corresponding store.

Figure 52H:
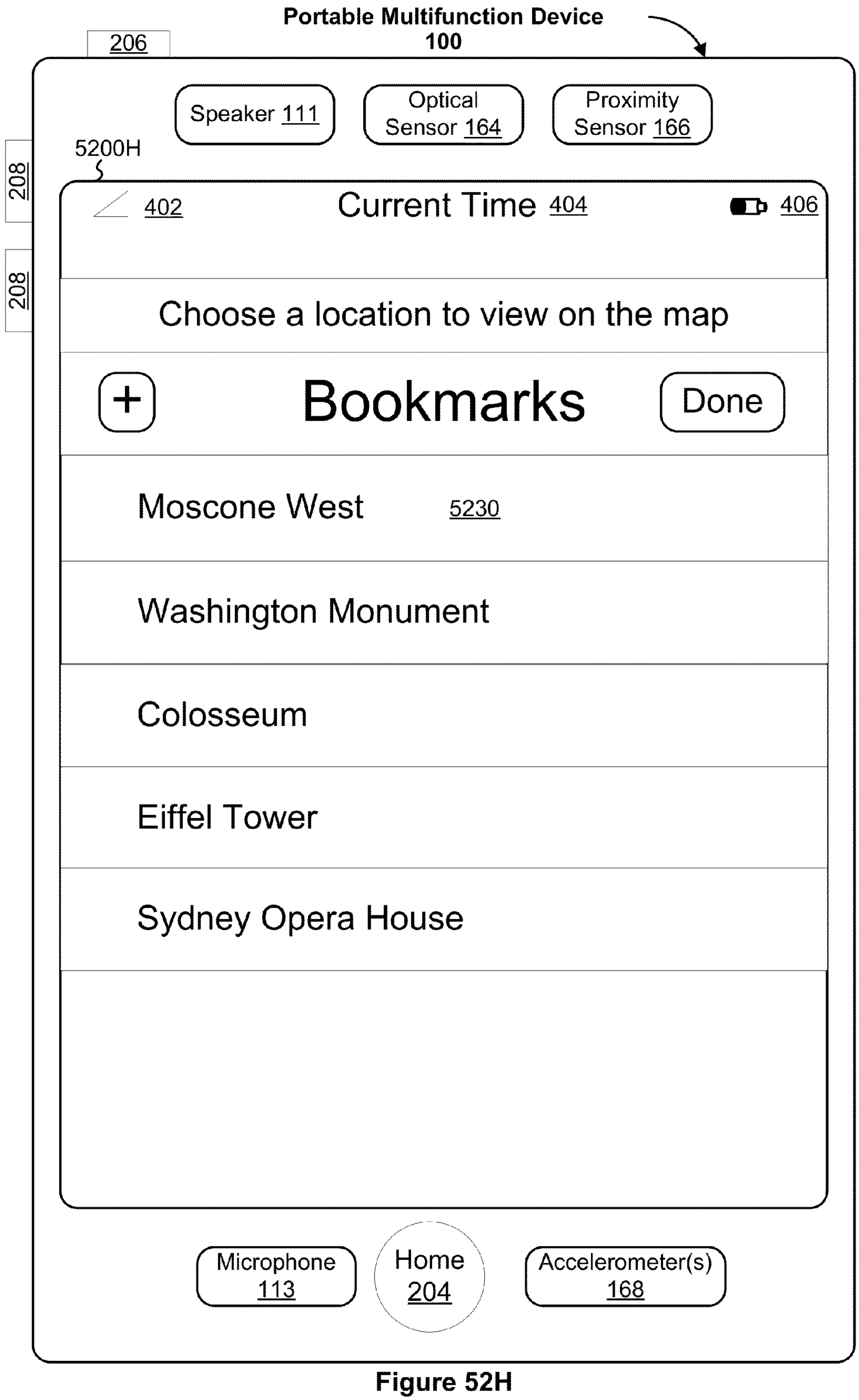

FIG. 52H depicts a graphical user interface 5200H with a list of user-specified address bookmarks, which is displayed in response to a user selection of the bookmark icon 5204 in FIG. 52A. A finger tap on one bookmark item (e.g., Moscone West) causes the current user interface to be replaced by a map covering the bookmark item. For example, a user selection of Colosseum causes the device to display a map or satellite image of the area in Rome that includes the Colosseum.

Additional description of providing maps and directions can be found in U.S. Provisional Patent Application No. 60/936,725, "Portable Multifunction Device, Method, and Graphical User Interface for Providing Maps and Directions," filed Jun. 22, 2007, the content of which is hereby incorporated by reference.

General Touch Screen/System UI Features

Start Up/Shut Down/Wake Up

FIGS. 53A-53D illustrate exemplary user interfaces for displaying notification information for missed communications in accordance with some embodiments.

Additional description of displaying notification information for missed communications can be found in U.S. Provisional Patent Application No. 60/883,804, "System And Method For Displaying Communication Notifications," filed Jan. 7, 2007 and U.S. patent application Ser. No. 11/770,718, "Portable Multifunction Device, Method, and Graphical User Interface for Managing Communications Received While in a Locked State," filed Jun. 28, 2007, the contents of which are hereby incorporated by reference.

Figure 54:
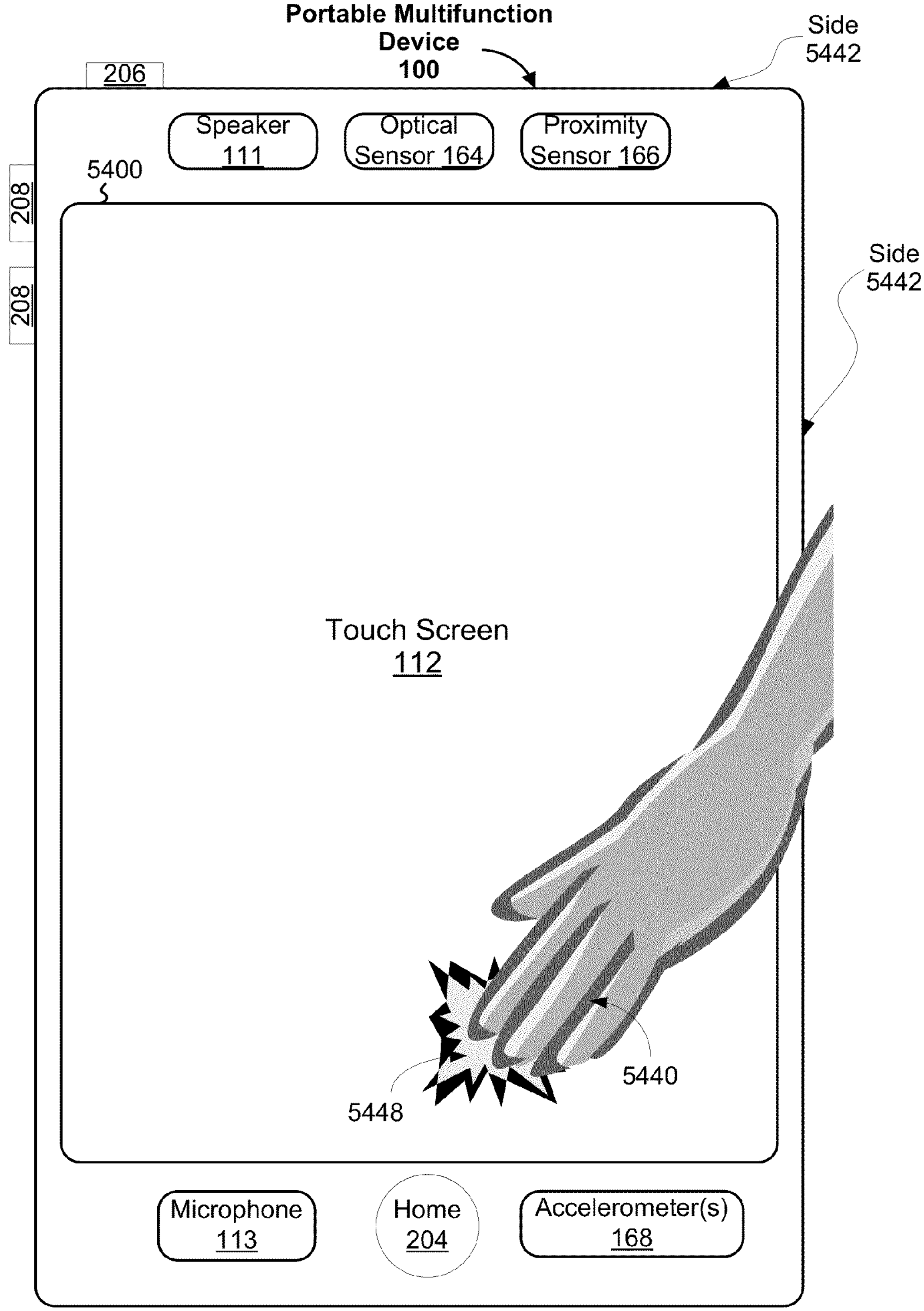
FIG. 54 illustrates a method for silencing a portable device in accordance with some embodiments.
Figure 55A:
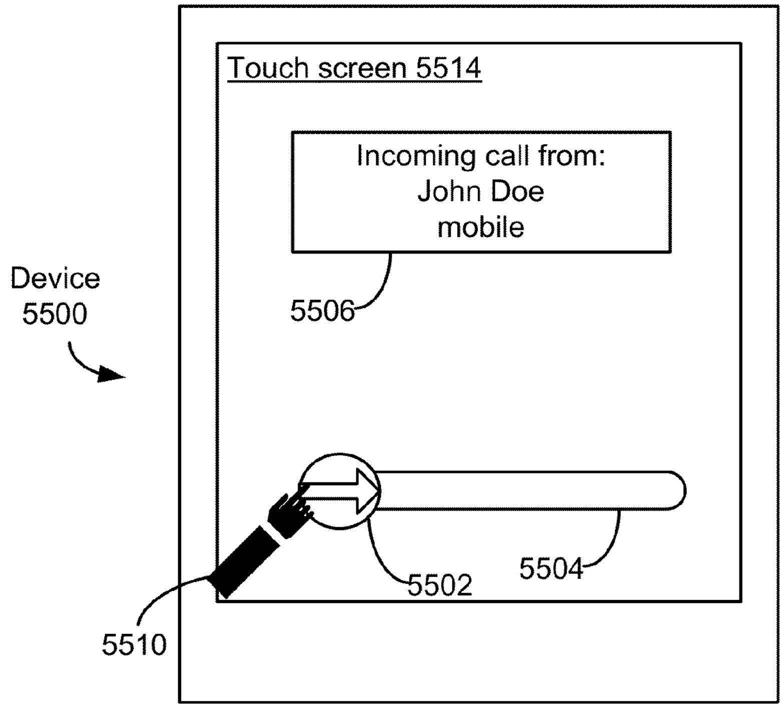
FIGS. 55A-55D illustrate a method for turning off a portable device in accordance with some embodiments.
Figure 55B:
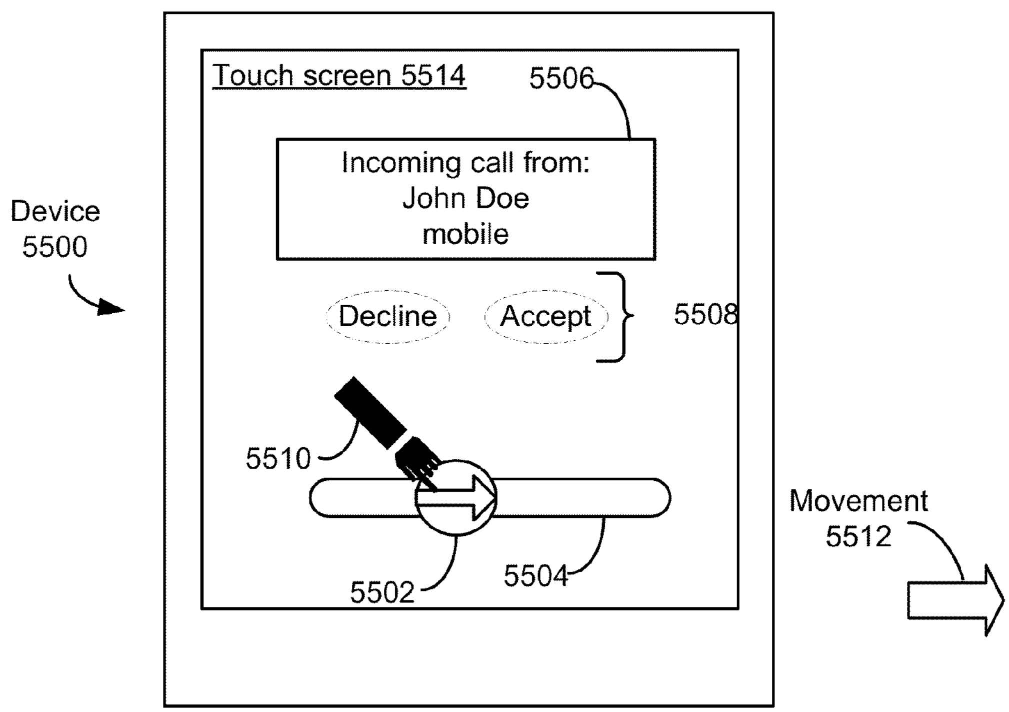
Figure 55C:
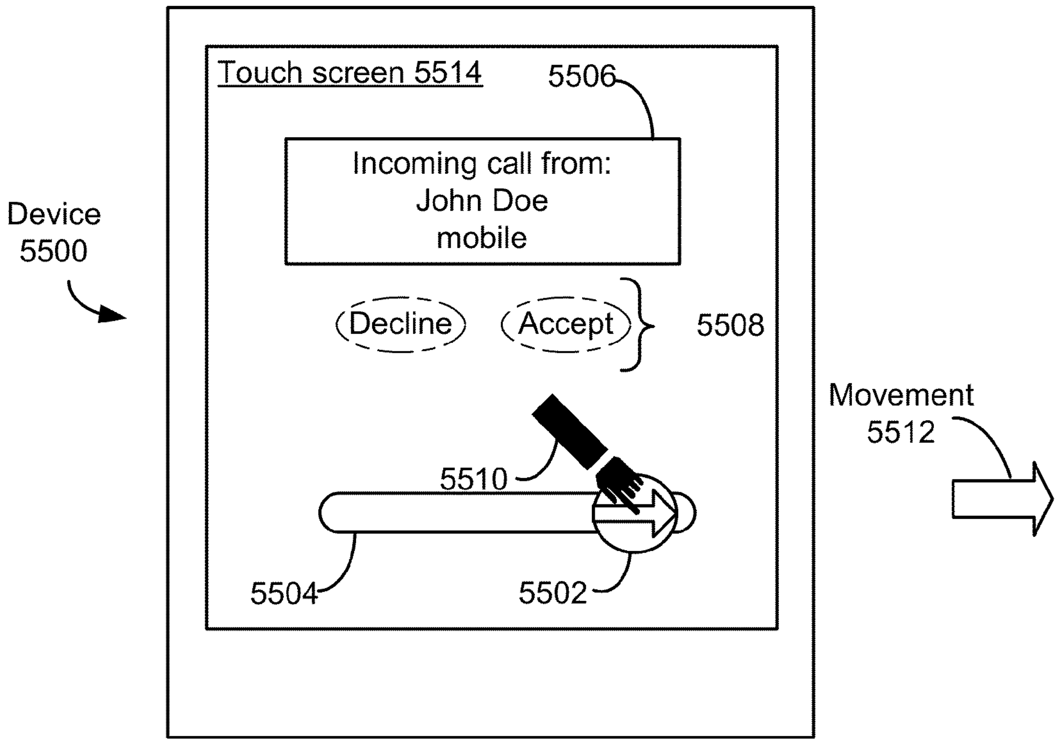
Figure 55D:
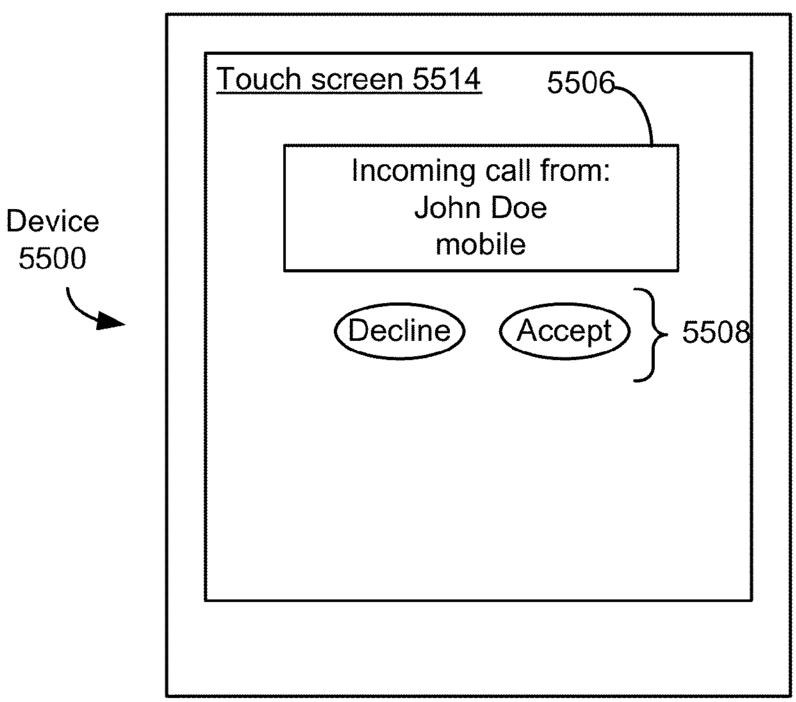

FIG. 54 illustrates a method for silencing a portable device in accordance with some embodiments.

Additional description of methods for silencing a portable device can be found in U.S. Provisional Patent Application No. 60/883,802, "Portable Electronic Device With Alert Silencing," filed Jan. 7, 2007 and U.S. patent application Ser. No. 11/770,727, "Portable Electronic Device with Alert Silencing," filed Jun. 28, 2007, the contents of which are hereby incorporated by reference.

FIGS. 55A-55D illustrate a method for turning off a portable device in accordance with some embodiments.

Additional description of methods for turning off a portable device can be found in U.S. Provisional Patent Application No. 60/883,786, "Power-Off Methods For Portable Electronic Devices," filed Jan. 6, 2007 and U.S. patent application Ser. No. 11/770,722, "Power-Off Methods For Portable Electronic Devices," filed Jun. 28, 2007, the contents of which are hereby incorporated by reference.

Cursor

FIGS. 56A-56L illustrate exemplary methods for determining a cursor position in accordance with some embodiments.

In some embodiments, as shown in FIG. 56A, the touch screen display displays multiple user interface objects 5602-5608. Exemplary user interface objects include an open icon, a close icon, a delete icon, an exit icon, or soft keyboard key icons. Some of these icons may be deployed within a small region on the touch screen display such that one icon is adjacent to another icon.

When there is a finger contact with the touch screen display, unlike the conventional mouse click, the finger has a certain contact area (e.g., 5610 in FIG. 56A) on the touch screen display. In some embodiments, a cursor position corresponding to the finger's contact area 5610 with the touch screen display needs to be determined. A user interface object at or near the cursor position may then be activated to perform a predefined operation.

As shown in FIGS. 59A-59D, a finger contact with the touch screen display (e.g., a finger tap) is a process involving multiple actions including the finger approaching the display, the finger being in contact with the display, and the finger leaving the display. During this process, the finger's contact area increases from zero to a maximum contact area and then reduces to zero. In some embodiments, for a stationary finger contact with the display, the detected contact area 5610 corresponds to the maximum contact area of the finger with the display during a time period corresponding to the stationary contact.

A first position associated with the contact area 5610 is determined. As will be explained below, the first position may or may not be the cursor position corresponding to the finger contact. But the first position will be used to determine the cursor position.

In some embodiments, as shown in FIG. 56B, the first position $P_1$ is the centroid of the contact area 5610.

Figure 56G:
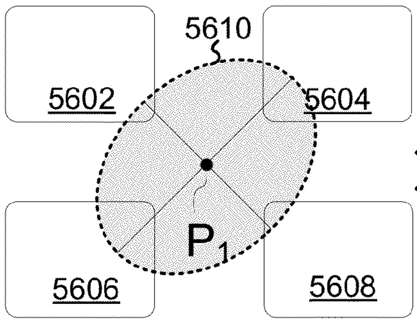
Figure 56H:
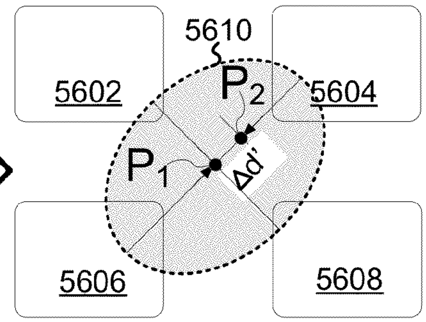

In some other embodiments, when a finger is in physical contact with the touch screen display, the finger's pressure on the display is detected, which varies from one position to another position. Sometimes, the position at which a user applies the maximum pressure may not be the centroid $P_1$ of the contact area. But the maximum pressure position $P_2$ is probably closer to the user's target. There is often a fixed distance between the centroid of the contact area and the corresponding maximum pressure's position. As shown in FIG. 56H, the contact area 5610 is elliptical with a major axis, a minor axis perpendicular to the major axis, and a centroid $P_1$. Given that there is a substantially constant offset Δd' from the centroid $P_1$ to the maximum pressure position $P_2$ along the major axis, the first position or the maximum pressure position $P_2$ can be determined from $P_1$ and Δd'.

Figure 56I:
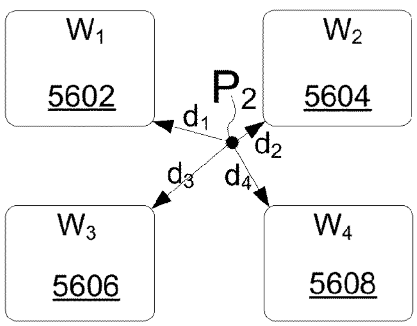

A cursor position P associated with the finger contact is determined based on one or more parameters, including the location of the first position, i.e., $P_1$ in FIG. 56B or $P_2$ in FIG. 56H, one or more distances between the first position and one or more of the user interface objects near the first position, and, in some embodiments, one or more activation susceptibility numbers associated with the user interface objects (e.g., $W_1$-$W_4$ in FIG. 56C or FIG. 56I).

In some embodiments, as shown in FIGS. 56C and 56I, the distance between the first position ($P_1$ in FIG. 56C or $P_2$ in FIG. 56I) and a respective user interface object (5602, 5604, 5606, or 5608) is the distance between the first position and a point on the user interface object that is closest to the first position.

Figure 56J:
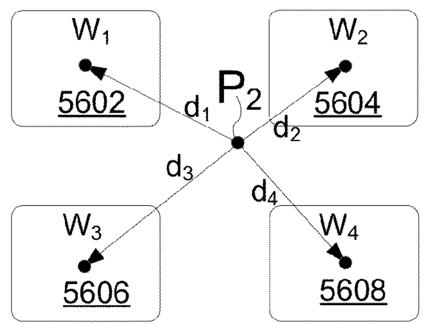

In some other embodiments, as shown in FIGS. 56D and 56J, the distance between the first position ($P_1$ in FIG. 56D or $P_2$ in FIG. 56L) and a user interface object (5602, 5604, 5606, or 5608) is the distance between the first position and the center of the user interface object.

In some embodiments, the offset between the cursor position and the first position (e.g., Δd in FIGS. 56E and 56F) is given by the formula as follows:

$$\Delta\vec{d} = \sum_i \Delta\vec{d}_i = \sum_i \frac{W_i}{d_i^n}\vec{u}_i,$$

where:

$\Delta\vec{d}$ is the offset between the cursor position P and the first position $P_1$, $\Delta\vec{d}_i$ is an offset component associated with a user interface object I along the direction between the first position and the user interface object i, $W_i$ is an activation susceptibility number associated with the user interface object i, $d_i$ is a distance between the first position and the user interface object i, n is a real number (e.g., 1), and $\vec{u}_i$ is a unit vector along the direction of $\Delta\vec{d}_i$.

If the determined cursor position P is on a particular user interface object (e.g., 5602 in FIG. 56E), the user interface object is activated to perform a predefined operation such as playing a song, deleting an email message, or entering a character to an input field.

In some embodiments, the activation susceptibility numbers assigned to different user interface objects have different values and signs depending on the operation associated with each object.

Figure 23C:
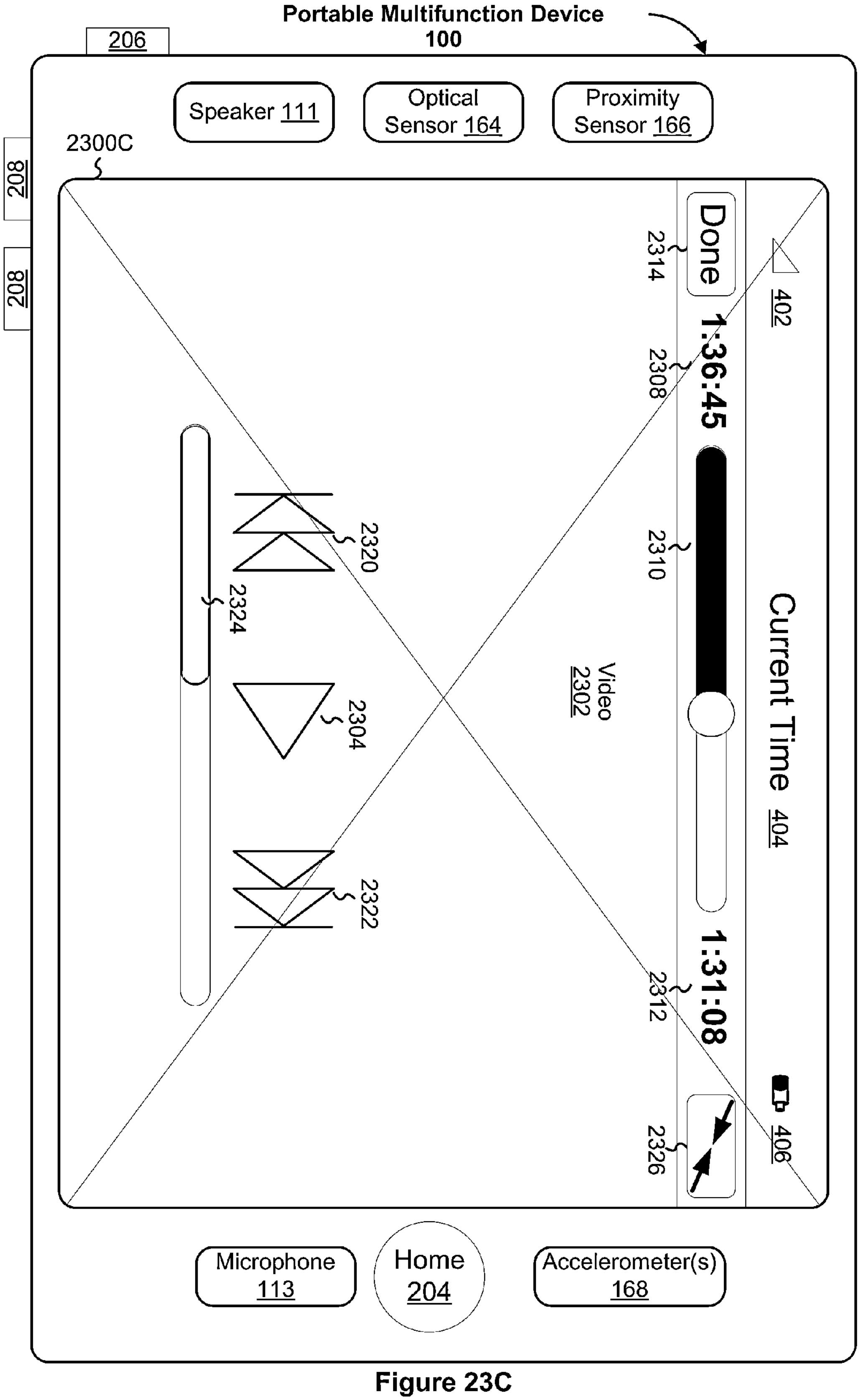
Figure 23D:
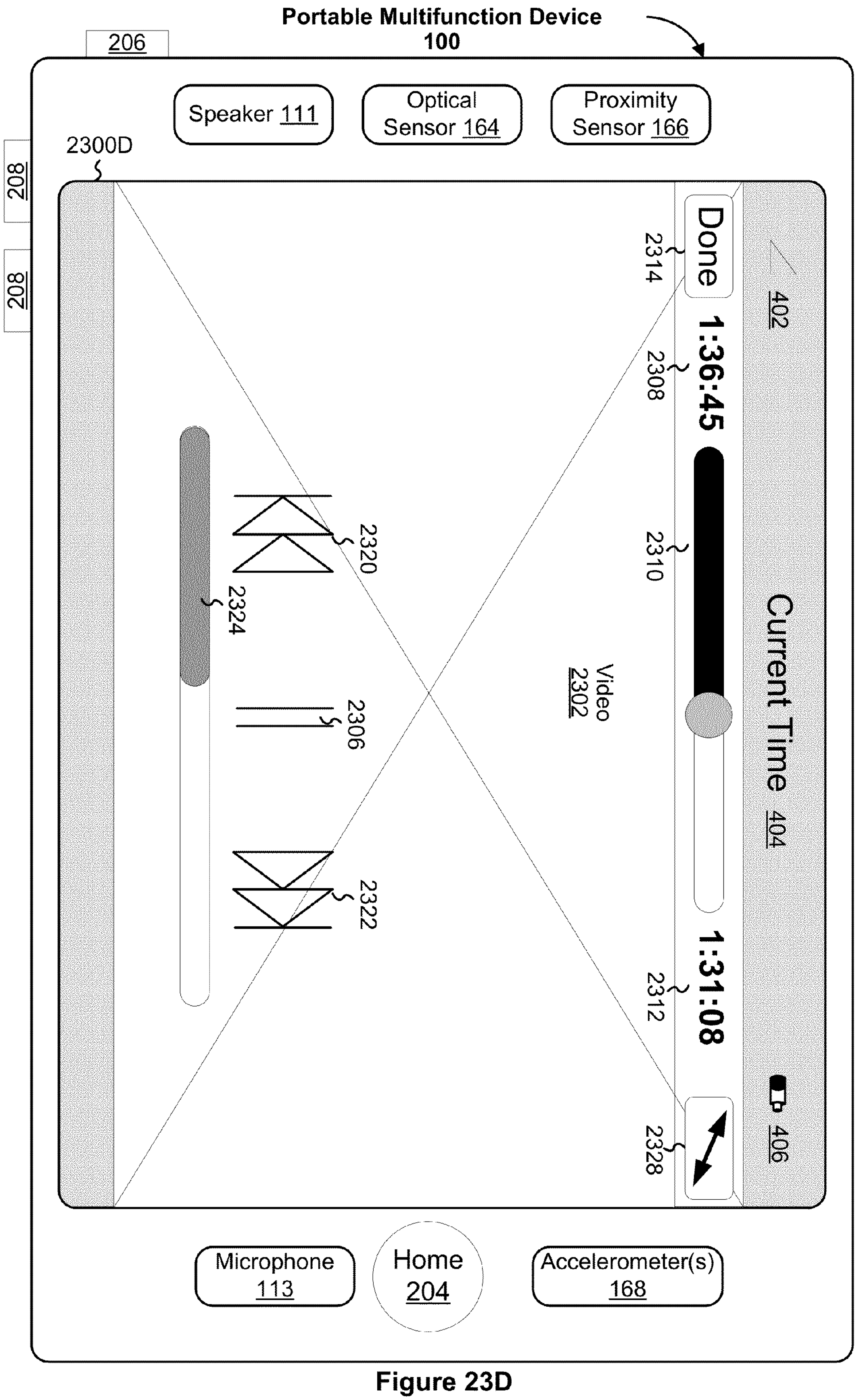

For example, as shown in FIG. 56E, if the operation associated with the user interface object 5602 is reversible or otherwise non-destructive (e.g., the user interface object 5602 is the play icon 2304 of the music and video player module in FIG. 23C), an activation susceptibility number $W_1$' having a first sign (e.g., "+") is assigned to the object 5602 such that the determined cursor position P is drawn closer to the object 5602 than the first position $P_1$, rendering the object 5602 easier to be activated. In this context, "non-destructive" is defined to mean an action that will not cause a permanent loss of information.

In contrast, as shown in FIG. 56F, if the operation associated with the user interface object 5602 is irreversible or destructive of user information (e.g., the user interface object 5602 is the delete icon 3542 of the email module in FIG. 35E), an activation susceptibility number $W_1$" having a second sign (e.g., "–") opposite to the first sign is assigned to the object 5602 such that the determined cursor position P may be further away from the object 5602 than the first position $P_1$, rendering the object 5602 harder to activate. Thus, when an object's associated activation susceptibility number has the second sign, the contact must be relatively precisely positioned over the object in order to activate it, with larger values of the activation susceptibility number corresponding to higher degrees of precision.

Figure 56K:
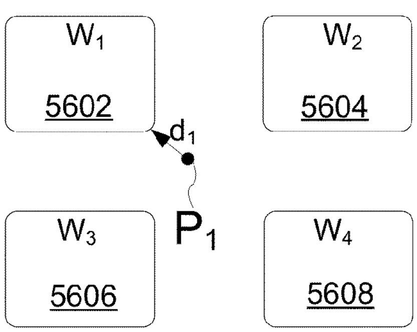

In some embodiments, the cursor position P is determined based on the first position, the activation susceptibility number associated with a user interface object that is closest to the first position, and the distance between the first position and the user interface object that is closest to the first position. In these embodiments, the cursor position P is not affected by the parameters associated with other neighboring user interface objects. For example, as shown in FIG. 56K, the first position $P_1$ is closest to the user interface object 5602 that has an associated activation susceptibility number $W_1$. The distance between the first position $P_1$ and the object 5602 is $d_1$. The cursor position P to be determined is only affected by these parameters, not by other neighboring user interface objects 5604, 5606 or 5608.

Figure 56L:
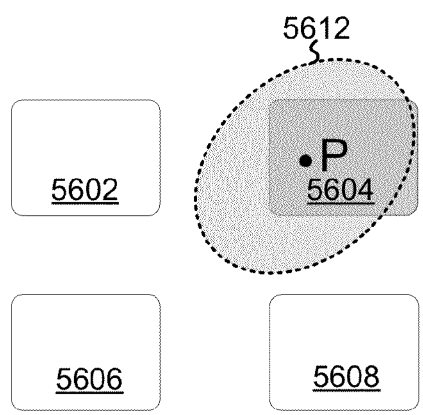

In some embodiments, as shown in FIG. 56L, the cursor position is the same as the first position, which may be $P_1$ in FIG. 56B or $P_2$ in FIG. 56H, if the first position is within a particular user interface object (e.g., 5604) on the display. In this case, there is no need to further offset the cursor position from the first position.

In some embodiments, as shown in FIG. 56E, a finger contact does not have to occur exactly at an object to activate the object. Rather, the user interface object is activated as long as the determined cursor position falls within the user interface object. In some embodiments, a user interface object is activated if the determined cursor position falls within a user interface object's hidden hit region. For more information about an object's hidden hit region, please refer to the description below in connection with FIGS. 58A-58D.

In some embodiments, at least some of the user interface objects involved in determining the cursor position in the formula above are visible on the touch screen display.

In some embodiments, the activation susceptibility numbers associated with the user interface objects (e.g., $W_1$-$W_4$) are context-dependent in a specific application module and change from one context to another context within the specific application module. For example, an object may have a first activation susceptibility number that is attractive to a cursor position at a first moment (in a first context of a specific application module), but a second activation susceptibility number that is less attractive or even repulsive (e.g., if the second activation susceptibility number has an opposite sign) to the cursor position at a second moment (in a second context of the specific application module).

Figure 56M:
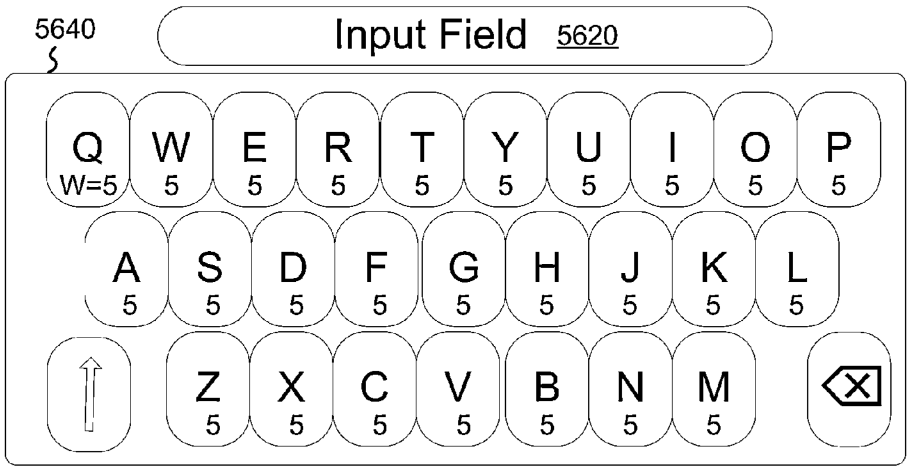
FIGS. 56M-56O illustrate an exemplary method for dynamically adjusting numbers associated with soft keyboard keys as a word is typed with the soft keyboard keys in accordance with some embodiments.
Figure 56N:
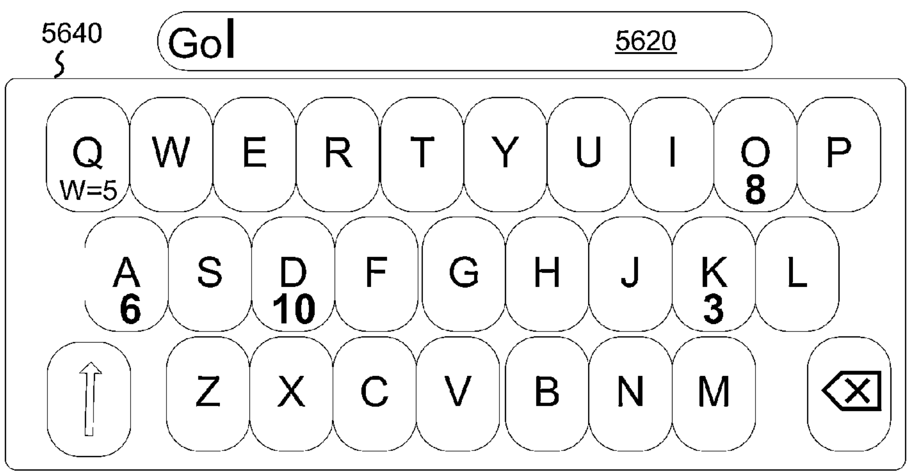
Figure 56O:
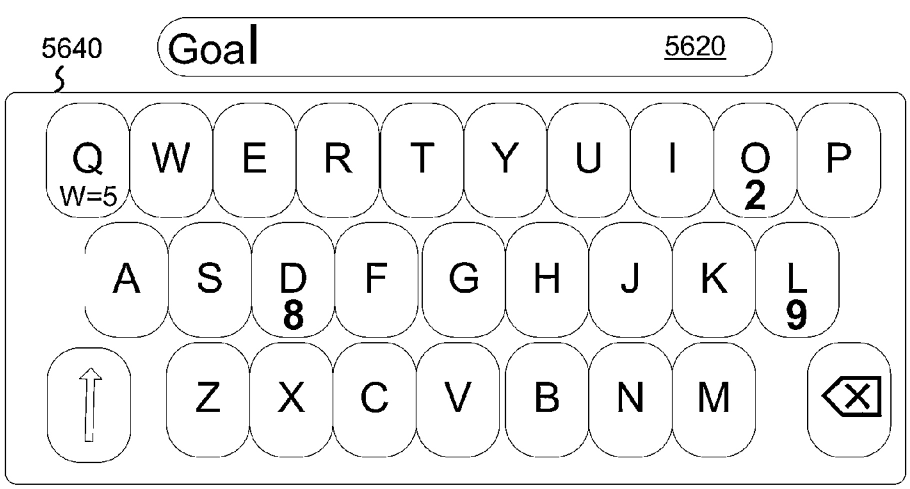

FIGS. 56M-56O illustrate an exemplary method for dynamically adjusting activation susceptibility numbers associated with soft keyboard keys as a word is typed with the soft keyboard keys in accordance with some embodiments. The user interface includes an input field 5620 and a soft keyboard 5640. A user selection of any key icon of the soft keyboard 5640 enters a corresponding user-selected character in the input field 5620. For illustrative purposes, as shown in FIG. 56M, all the key icons initially have the same activation susceptibility number, 5.

FIG. 56N depicts the activation susceptibility numbers associated with different key icons after two characters "Go" are entered into the input field 5620. The activation susceptibility numbers associated with the key icons have been adjusted in accordance with the previously entered characters. For example, the activation susceptibility number of key icon "D" changes from 5 to 10 because "God" is a common English word. Thus, the key icon "D" may be activated even if the next finger contact is closer to the key icon "F" than to the key icon "D" itself. Similarly, the activation susceptibility numbers associated with key icons "A" and "O" are also increased because each of the strings "Goa" and "Goo" leads to one or more legitimate English words such as "Goal", "Good", or "Goad." In contrast, the activation susceptibility number of key icon "K" drops to 3 because the string "Gok" is not found at the beginning of any common English words.

FIG. 56O depicts the updated activation susceptibility numbers associated with different key icons after another character "a" is entered into the input field 5620. Given the string "Goa" that has been entered, the user may be typing the word "Goal." Accordingly, the activation susceptibility number associated with the key icon "L" increases to 9 whereas the activation susceptibility number associated with the key icon "O" drops to 2 because the string "Goao" is not found at the beginning of any common English words.

Additional description of determining a cursor position from a finger contact can be found in U.S. Provisional Patent Application No. 60/946,716, "Methods for Determining a Cursor Position from a Finger Contact with a Touch Screen Display," filed Jun. 27, 2007, the content of which is hereby incorporated by reference.

Vertical and Horizontal Bars

As noted above, vertical and horizontal bars help a user understand what portion of a list or document is being displayed.

Vertical Bar for a List of Items

In some embodiments, a portable multifunction device displays a portion of a list of items on a touch screen display. The displayed portion of the list has a vertical position in the list.

In some embodiments, the list of items is a list of contacts (e.g. FIG. 8A), a list of instant message conversations (e.g. FIG. 5), a list of instant messages (e.g. FIG. 6A), a list of photo albums (e.g. FIG. 13B), a list of audio and/or video content (e.g. FIG. 21C), a list of calendar entries (e.g. FIG. 49A), a list of recent calls (e.g. FIG. 28B), a list of mailboxes (e.g. FIG. 33), a list of emails (e.g. FIG. 35A), a list of settings (e.g. FIG. 36), or a list of voicemail messages (e.g. FIG. 32A).

An object is detected on or near the displayed portion of the list. In some embodiments, the object is a finger.

In response to detecting the object on or near the displayed portion of the list, a vertical bar is displayed on top of the displayed portion of the list. See, for example, vertical bar 640 in FIG. 6G, and vertical bar 1314 in FIG. 13A. The vertical bar has a vertical position on top of the displayed portion of the list that corresponds to the vertical position in the list of the displayed portion of the list. In some embodiments, the vertical bar has a vertical length that corresponds to the portion of the list being displayed. In some embodiments, the vertical bar is located on the right hand side of the displayed portion of the list. In some embodiments, the vertical bar is translucent or transparent. The vertical bar has a major axis and a portion of the list along the major axis of the vertical bar is not covered by the vertical bar.

In some embodiments, a movement of the object is detected on or near the displayed portion of the list. In some embodiments, the movement of the object is on the touch screen display. In some embodiments, the movement is a substantially vertical movement.

In response to detecting the movement, the list of items displayed on the touch screen display is scrolled so that a new portion of the list is displayed and the vertical position of the vertical bar is moved to a new position such that the new position corresponds to the vertical position in the list of the displayed new portion of the list. In some embodiments, scrolling the list has an associated speed of translation that corresponds to a speed of movement of the object. In some embodiments, scrolling the list is in accordance with a simulation of an equation of motion having friction.

After a predetermined condition is met, the display of the vertical bar is ceased. In some embodiments, the predetermined condition comprises ceasing to detect the object on or near the touch screen display. In some embodiments, the predetermined condition comprises ceasing to detect the object on or near the touch screen display for a predetermined time period. In some embodiments, the predetermined condition comprises ceasing to detect the object on or near the displayed portion of the list.

A graphical user interface on a portable multifunction device with a touch screen display comprises a portion of a list of items displayed on the touch screen display, wherein the displayed portion of the list has a vertical position in the list, and a vertical bar displayed on top of the portion of the list of items. In response to detecting an object on or near the displayed portion of the list, the vertical bar is displayed on top of the portion of the list of items. The vertical bar has a vertical position on top of the displayed portion of the list that corresponds to the vertical position in the list of the displayed portion of the list. After a predetermined condition is met, the display of the vertical bar is ceased.

Vertical Bar for an Electronic Document

In some embodiments, a portable multifunction device displays a portion of an electronic document on a touch screen display. The displayed portion of the electronic document has a vertical position in the electronic document. In some embodiments, the electronic document is a web page. In some embodiments, the electronic document is a word processing, spreadsheet, email or presentation document.

An object is detected on or near the displayed portion of the electronic document. In some embodiments, the object is a finger.

In response to detecting the object on or near the displayed portion of the electronic document, a vertical bar is displayed on top of the displayed portion of the electronic document. See for example vertical bar 1222 in FIG. 12A and vertical bar 3962 in FIG. 39H. The vertical bar has a vertical position on top of the displayed portion of the electronic document that corresponds to the vertical position in the electronic document of the displayed portion of the electronic document. In some embodiments, the vertical bar has a vertical length that corresponds to the portion of the electronic document being displayed. In some embodiments, the vertical bar is located on the right hand side of the displayed portion of the electronic document. In some embodiments, the vertical bar is translucent or transparent. The vertical bar has a major axis and a portion of the electronic document along the major axis of the vertical bar is not covered by the vertical bar (see, for example, vertical bar 1222 in FIG. 12, and vertical bar 3962 in FIG. 39H).

In some embodiments, a movement of the object is detected on or near the displayed portion of the electronic document. In some embodiments, the movement of the object is on the touch screen display. In some embodiments, the movement is a substantially vertical movement.

In response to detecting the movement, the electronic document displayed on the touch screen display is scrolled so that a new portion of the electronic document is displayed, and the vertical position of the vertical bar is moved to a new position such that the new position corresponds to the vertical position in the electronic document of the displayed new portion of the electronic document. In some embodiments, scrolling the electronic document has an associated speed of translation that corresponds to a speed of movement of the object. In some embodiments, scrolling the electronic document is in accordance with a simulation of an equation of motion having friction.

After a predetermined condition is met, the display of the vertical bar is ceased. In some embodiments, the predetermined condition comprises ceasing to detect the object on or near the touch screen display. In some embodiments, the predetermined condition comprises ceasing to detect the object on or near the touch screen display for a predetermined time period. In some embodiments, the predetermined condition comprises ceasing to detect the object on or near the displayed portion of the electronic document.

A graphical user interface on a portable multifunction device with a touch screen display comprises a portion of an electronic document displayed on the touch screen display, wherein the displayed portion of the electronic document has a vertical position in the electronic document, and a vertical bar displayed on top of the portion of the electronic document. In response to detecting an object on or near the displayed portion of the electronic document, the vertical bar is displayed on top of the portion of the electronic document. The vertical bar has a vertical position on top of the displayed portion of the electronic document that corresponds to the vertical position in the electronic document of the displayed portion of the electronic document. After a predetermined condition is met, the display of the vertical bar is ceased.

Vertical Bar and Horizontal Bar for an Electronic Document

In some embodiments, a portable multifunction device displays a portion of an electronic document on a touch screen display. The displayed portion of the electronic document has a vertical position in the electronic document and a horizontal position in the electronic document. In some embodiments, the electronic document is a web page. See for example FIG. 39A. In some embodiments, the electronic document is a word processing, spreadsheet, email or presentation document.

An object is detected on or near the displayed portion of the electronic document. In some embodiments, the object is a finger.

In response to detecting the object on or near the displayed portion of the electronic document, a vertical bar and a horizontal bar are displayed on top of the displayed portion of the electronic document. See for example vertical bar 3962 and horizontal bar 3964 in FIG. 39H. In some embodiments, the vertical bar is located on the right hand side of the displayed portion of the electronic document and the horizontal bar is located on the bottom side of the displayed portion of the electronic document. In some embodiments, the vertical bar and the horizontal bar are translucent or transparent.

The vertical bar has a vertical position on top of the displayed portion of the electronic document that corresponds to the vertical position in the electronic document of the displayed portion of the electronic document. In some embodiments, the vertical bar has a vertical length that corresponds to the vertical portion of the electronic document being displayed. The vertical bar has a major axis and a portion of the electronic document along the major axis of the vertical bar is not covered by the vertical bar.

The horizontal bar has a horizontal position on top of the displayed portion of the electronic document that corresponds to the horizontal position in the electronic document of the displayed portion of the electronic document. In some embodiments, the horizontal bar has a horizontal length that corresponds to the horizontal portion of the electronic document being displayed. The horizontal bar has a major axis, substantially perpendicular to the major axis of the vertical bar, and a portion of the electronic document along the major axis of the horizontal bar is not covered by the horizontal bar.

In some embodiments, a movement of the object is detected on or near the displayed portion of the electronic document. In some embodiments, the movement of the object is on the touch screen display.

In response to detecting the movement, the electronic document displayed on the touch screen display is translated so that a new portion of the electronic document is displayed. In some embodiments, the electronic document is translated in a vertical direction, a horizontal direction, or a diagonal direction. In some embodiments, the electronic document is translated in accordance with the movement of the object. In some embodiments, translating the electronic document has an associated speed of translation that corresponds to a speed of movement of the object. In some embodiments, translating the electronic document is in accordance with a simulation of an equation of motion having friction.

In response to detecting the movement, the vertical position of the vertical bar is moved to a new vertical position such that the new vertical position corresponds to the vertical position in the electronic document of the displayed new portion of the electronic document.

In response to detecting the movement, the horizontal position of the horizontal bar is moved to a new horizontal position such that the new horizontal position corresponds to the horizontal position in the electronic document of the displayed new portion of the electronic document.

After a predetermined condition is met, the display of the vertical bar and the horizontal bar is ceased. In some embodiments, the predetermined condition comprises ceasing to detect the object on or near the touch screen display. In some embodiments, the predetermined condition comprises ceasing to detect the object on or near the touch screen display for a predetermined time period. In some embodiments, the predetermined condition comprises ceasing to detect the object on or near the displayed portion of the electronic document.

A graphical user interface on a portable multifunction device with a touch screen display comprises a portion of an electronic document displayed on the touch screen display. The displayed portion of the electronic document has a vertical position in the electronic document and a horizontal position in the electronic document. The GUI also comprises a vertical bar displayed on top of the portion of the electronic document, and a horizontal bar displayed on top of the portion of the electronic document. In response to detecting an object on or near the displayed portion of the electronic document, the vertical bar and the horizontal bar are displayed on top of the portion of the electronic document. The vertical bar has a vertical position on top of the displayed portion of the electronic document that corresponds to the vertical position in the electronic document of the displayed portion of the electronic document. The horizontal bar has a horizontal position on top of the displayed portion of the electronic document that corresponds to the horizontal position in the electronic document of the displayed portion of the electronic document. After a predetermined condition is met, the display of the vertical bar and the horizontal bar is ceased.

Vertical and horizontal bars may have, without limitation, a rectangular cross section, a rectangular cross section with rounded corners, or a racetrack oval cross section with two opposing flat sides and two opposing rounded sides.

Additional description of the horizontal and vertical bars can be found in U.S. Provisional Patent Application No. 60/947,386, "Portable Electronic Device, Method, and Graphical User Interface for Displaying Electronic Documents and Lists," filed Jun. 29, 2007, the content of which is hereby incorporated by reference.

Gestures

Figure 57A:
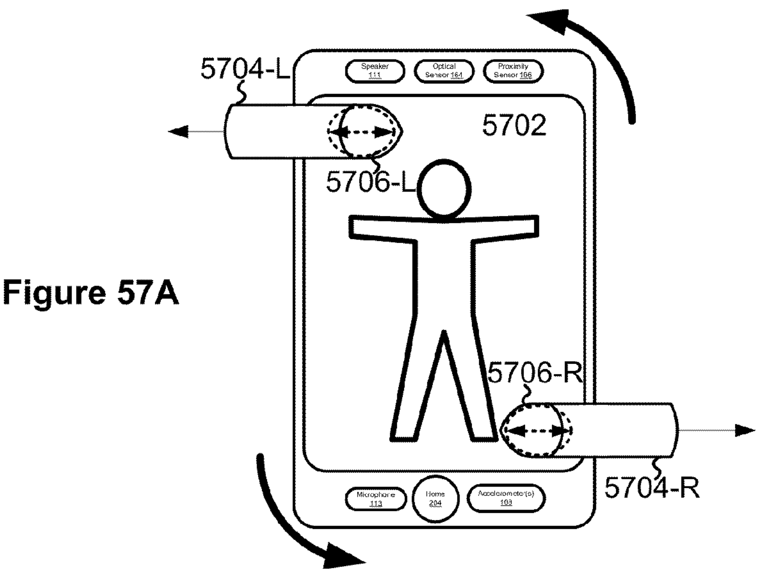
FIGS. 57A-57C illustrate an exemplary screen rotation gesture in accordance with some embodiments.
Figure 57B:
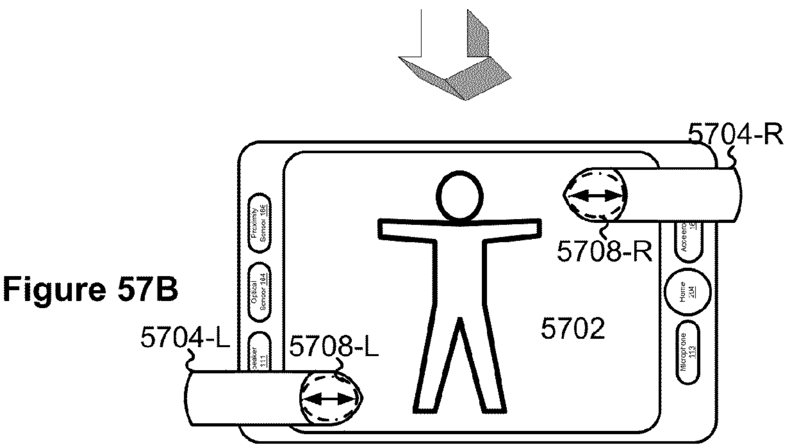
Figure 57C:
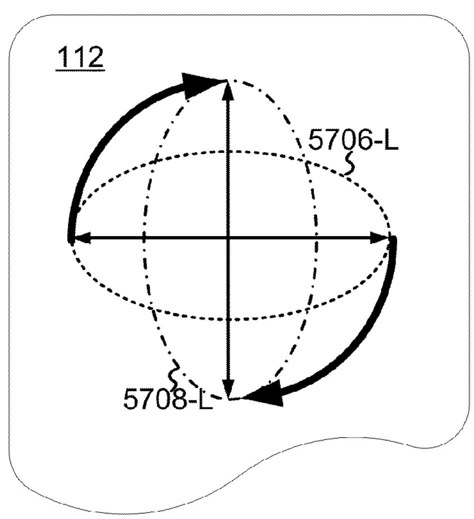

FIGS. 57A-57C illustrate an exemplary screen rotation gesture in accordance with some embodiments.

In some embodiments, a portable multifunction device (e.g., device 100) displays a first application 5702 on a touch screen display (e.g., 112) in a portrait orientation (e.g., FIG. 57A). In some embodiments, the first application is a browser, a photo manager, a music player, or a video player. In most implementations, but not necessarily all, the display is rectangular, or substantially rectangular (e.g., the display may have rounded corners, but otherwise have a rectangular shape).

Simultaneous rotation of two thumbs (e.g., 5704-L and 5704-R) in a first sense of rotation is detected on the touch screen display 112. In some embodiments, the first sense of rotation is a clockwise rotation (e.g., FIG. 57C).

In some embodiments, the sense of rotation for each thumb is detected by monitoring the change in orientation of the contact area of the thumb with the touch screen display. For example, if the contact area of the thumb is elliptical, the change in the orientation of an axis of the ellipse may be detected (e.g., from contact ellipse 5706-L in FIG. 57A to contact ellipse 5708-L in FIG. 57B, as shown on an enlarged portion of touch screen 112 in FIG. 57C). In some embodiments, at least some of a user's other fingers (i.e., fingers other than thumbs 5704-L and 5704-R) support the device 100 by contacting the backside of the device.

In some embodiments, the first sense of rotation is a counterclockwise rotation. For example, if thumb 5704-L is initially on the lower left side of touch screen 112 (rather than the upper left side in FIG. 57A), thumb 5704-R is initially on the upper right side of touch screen 112 (rather than the lower right side in FIG. 57A), and the thumbs are moved apart from each other, then the sense of rotation detected by the touch screen 112 will be counterclockwise for both thumbs.

In response to detecting the simultaneous rotation of the two thumbs in the first sense of rotation, the first application 5702 is displayed in a landscape orientation.

In some embodiments, the simultaneous two-thumb rotation gesture is used to override automatic changes in portrait/landscape orientation based on analysis of data from accelerometers 168 until a predetermined condition is met. In some embodiments, any changes in orientation of the device that are detected after the simultaneous rotation of the two thumbs is detected are disregarded until the device displays a second application different from the first application. In some embodiments, any changes in orientation of the device that are detected after the simultaneous rotation of the two thumbs is detected are disregarded until the device is put in a locked state or turned off. In some embodiments, any changes in orientation of the device that are detected after the simultaneous rotation of the two thumbs is detected are disregarded for a predetermined time period.

In some embodiments, simultaneous rotation of the two thumbs is detected in a second sense of rotation that is opposite the first sense of rotation on the touch screen display. In response to detecting the simultaneous rotation of the two thumbs in the second sense of rotation, the first application is displayed in a portrait orientation.

In some embodiments, any changes in orientation of the device that are detected after the simultaneous rotation of the two thumbs in the first sense is detected are disregarded until the simultaneous rotation of the two thumbs in the second sense is detected.

A graphical user interface on a portable multifunction device with a touch screen display comprises an application that is displayed in either a first orientation or a second orientation, the second orientation being 90° from the first orientation. In response to detecting simultaneous rotation of two thumbs in a first sense of rotation on the touch screen display, the display of the application changes from the first orientation to the second orientation. In some embodiments, the first orientation is a portrait orientation (e.g., FIG. 57A) and the second orientation is a landscape orientation (e.g., FIG. 57B). In some embodiments, the first orientation is a landscape orientation and the second orientation is a portrait orientation.

Additional description of gestures can be found in U.S. Provisional Patent Application Nos. 60/883,817, "Portable Electronic Device Performing Similar Operations For Different Gestures," filed Jan. 7, 2007, and 60/946,970, "Screen Rotation Gestures on a Portable Multifunction Device," filed Jun. 28, 2007, the contents of which are hereby incorporated by reference.

As noted above in connection with FIGS. 56A-56L, a cursor position for a finger contact with the touch screen display is adjusted in part based on the activation susceptibility numbers (or weights) assigned to user interface objects. Such cursor position adjustment helps to reduce the chance of selecting a user interface object by mistake. Another approach to improving the chance of hitting a user-desired object icon is to associate the object icon with a hidden hit region. The hidden hit region overlaps the object icon but is larger than the object icon.

An issue with the hidden hit region approach is how to choose one user interface object over another when the hit regions of the two objects partially overlap and a finger contact (as represented by its cursor position) happens to fall into the overlapping hit regions.

FIGS. 58A-58D illustrate a method of identifying a user-desired user interface object when a finger contact's corresponding cursor position falls into overlapping hit regions in accordance with some embodiments.

Two user interface objects, e.g., a button control user interface object 5802 and a slide control user interface object 5806, are deployed close to each other on the touch screen display. For example, the button control object 5802 may be the backup control icon 2320, the play icon 2304, or the forward icon 2322, and the slide control user interface object 5806 may be the volume control icon 2324 in the music and video player module (see, e.g., FIG. 23C).

The button control user interface object 5802 has a hidden hit region 5804 and the slide control user interface object 5806 has a hidden hit region 5816. The two hidden hit regions overlap at region 5810.

Initially, a finger-down event at a first position on the touch screen display is detected. As will be explained below in connection with FIGS. 59A-59G, a finger-down event may be a finger-in-range event or a finger-in-contact event at or near the touch screen display.

Figure 58A:
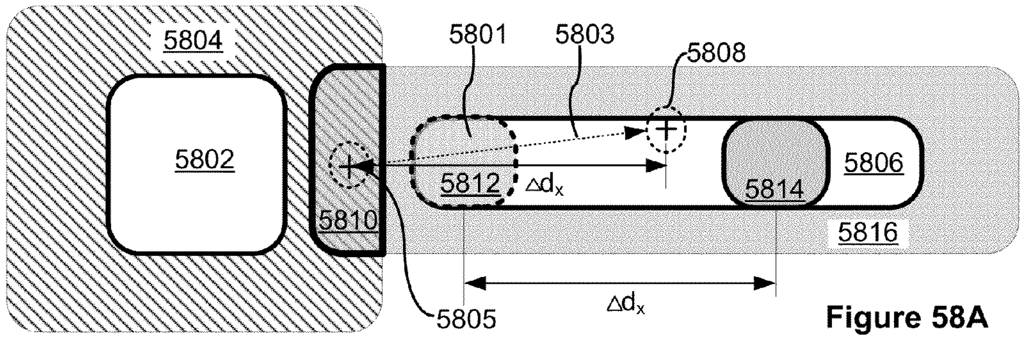
FIGS. 58A-58D illustrate an approach of identifying a user-desired user interface object when a finger contact's corresponding cursor position falls into an overlapping hit region in accordance with some embodiments.

In some embodiments, as shown in FIG. 58A, the finger-down event occurs at a position 5805 in the overlapping hit region 5810. From the single finger-down event, it is impossible to determine whether the user intends to activate the button control user interface object 5802 or the slide control user interface object 5806.

In some embodiments, given the finger-down event position 5805, which is also the current cursor position, all the user interface objects that are associated with the position are identified. A user interface object is associated with a position if the position is within the user interface object or its hidden hit region. For illustrative purposes, the button control user interface object 5802 and the slide control user interface object 5806 are identified as being associated with the first position 5805. Note that the slide control user interface object 5806 includes a slide bar 5803 and a slide object 5801.

Next, a finger-up event is detected at a second position on the touch screen display. As will be explained below in connection with FIGS. 59A-59G, a finger-up event may be a finger-out-of-contact event or a finger-out-of-range event at or near the touch screen display.

Figure 59A:
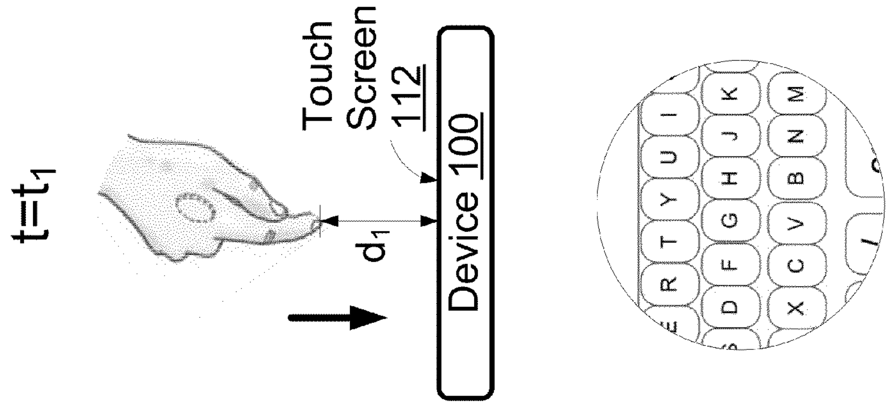
FIGS. 59A-59E illustrate how a finger tap gesture activates a soft key icon on a touch screen display in accordance with some embodiments.
Figure 59B:
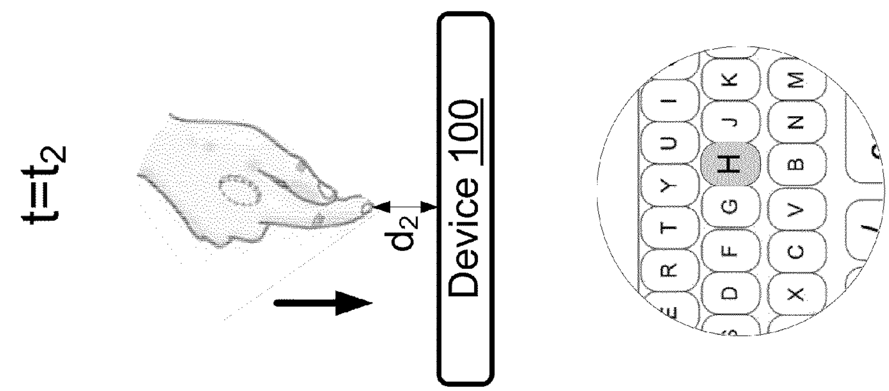
Figure 59C:
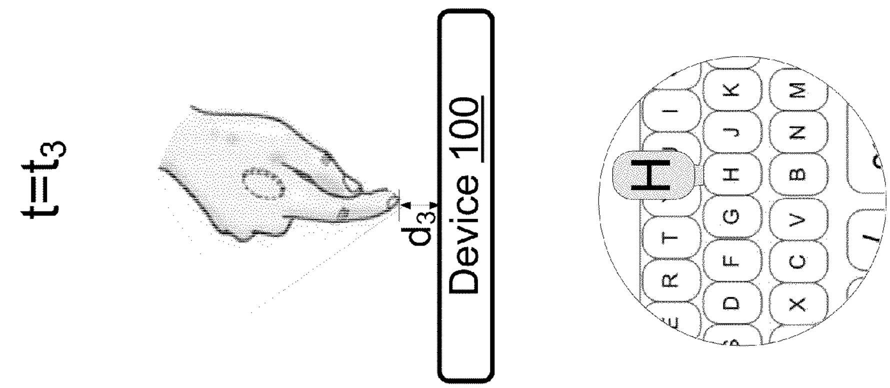
Figure 59D:
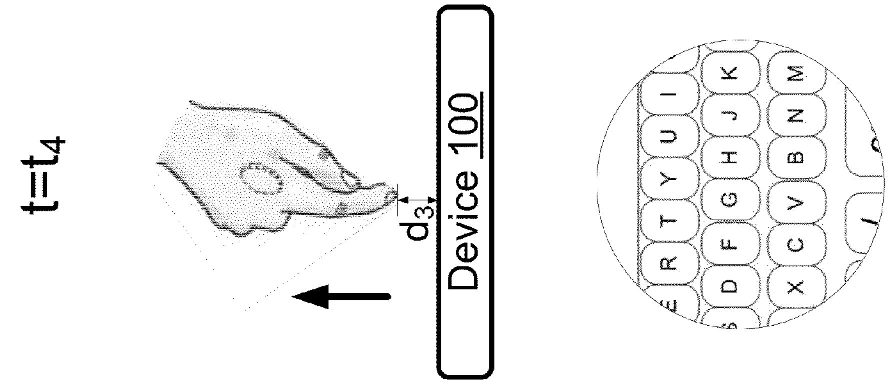
Figure 59E:
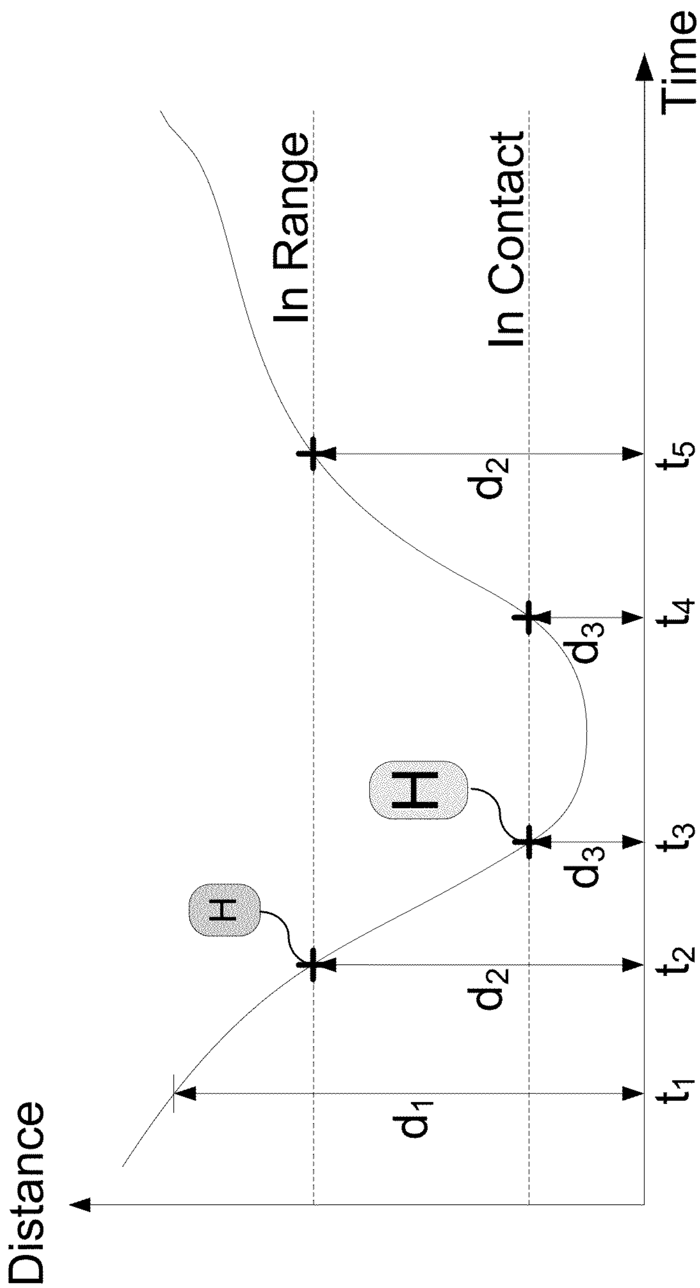

In some embodiments, or in some contexts of a specific application, the finger-out-of-contact event is used as the finger-up event instead of the finger-out-of-range event if the button control user interface object is activated, because a user receives a more prompt response. This is because, as shown in FIG. 59E, the finger-out-of-contact event occurs at an earlier time $t=t_4$ than the finger-out-of-range event, which occurs at time $t=t_5$.

In some embodiments, or in some contexts of a specific application, the finger-out-of-range event is used as the finger-up event instead of the finger-out-of-contact event if the slide control user interface object is activated because the pair of finger-in-range and finger-out-of-range events are often used to move the slide object along the slide bar.

Given the first and second positions corresponding to the finger-down and finger-up events, a distance between the two positions is determined. If the distance is equal to or less than a first predefined threshold, the device performs a first action with respect to a first user interface object. If the distance is greater than a second predefined threshold, the device performs a second action with respect to a second user interface object. The first user interface object is different from the second user interface object. In some embodiments, the first and second predefined thresholds are the same. In some other embodiments, the second predefined threshold is higher than the first predefined threshold. In the latter embodiments, if the distance is between the two positions is between the first and second thresholds, neither the first nor the second user interface object is activated (or more generally, no action is performed with respect to either object. As a result, the user will need to more clearly indicate his or her intent by performing another gesture.

Figure 58B:
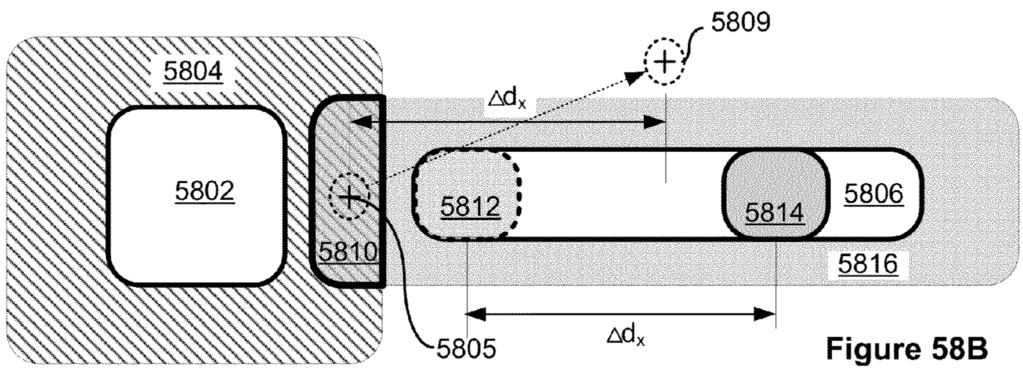

In some contexts in which the user gesture activates the slide control user interface object 5806, the second position is within the hit region 5816 of the slide control user interface object 5806 (5808 in FIG. 58A). In some other contexts in which the user gesture activates the slide control user interface object 5806, the second position is outside hit region 5816 (5809 in FIG. 58B), but has a projection onto the slide bar. In either case, the device moves the slide object 5801 along the slide bar 5803 in accordance with the distance between the first position and the second position. In some embodiments, the distance between the two positions is projected onto the slide bar. As shown in FIGS. 58A-58B, the projected distance $\Delta d_x$ corresponds to the amount by which the slide object 5801 is moved along the slide bar 5803.

Figure 58C:
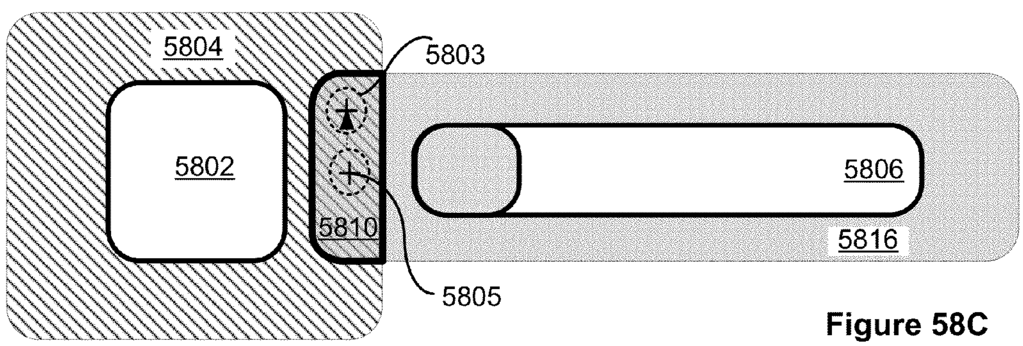
Figure 58D:
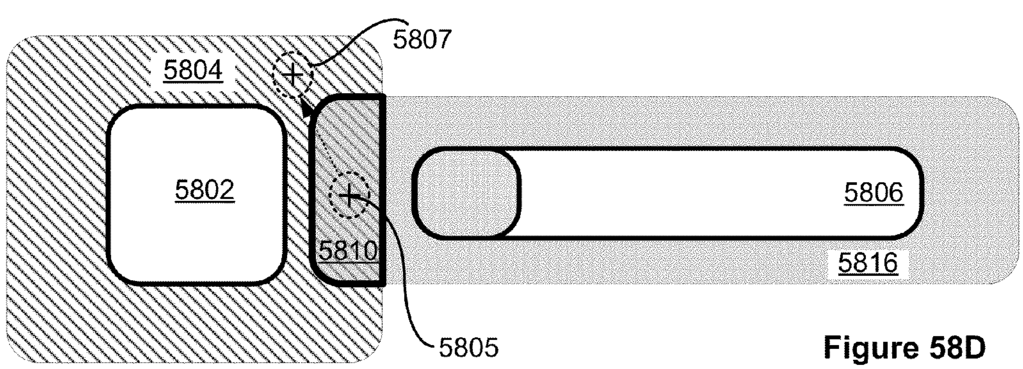

In some contexts in which the user gesture activates the button control user interface object 5802, the second position is also within the overlapping hit region (5803 in FIG. 58C). In some other contexts in which the user gesture activates the button control user interface object 5802, the second position is within the hit region 5804 of the object 5802, but not within the slide control user interface object 5806's hit region. In either case, the device activates the button control user interface object 5802 to perform a predefined operation.

In some embodiments, after the finger-down event and before the finger-up event, a series of finger-dragging events are detected at positions on the touch screen display, but outside the slide control user interface object 5806's hit region 5816. In this case, the device moves the slide object 5801 along the slide bar 5803 from its current position to a different position determined at least in part by each finger-dragging event's associated position on the touch screen display. The slide object 5801 stops at the second position when the finger-up event is detect. Exemplary graphical user interfaces of this embodiment are in FIGS. 47A-47E.

Additional description of interpreting a finger gesture can be found in U.S. Provisional Patent Application No. 60/946,977, "Portable Multifunction Device, Method, and Graphical User Interface for Interpreting a Finger Gesture on a Touch Screen Display," filed Jun. 28, 2007, the content of which is hereby incorporated by reference.

Two types of finger gestures that a user may apply to a touch screen display are: (i) a finger tap or (ii) a finger swipe. A finger tap often occurs at a button-style user interface object (e.g., a key icon of the soft keyboard) and a finger swipe is often (but not always) associated with a slide control user interface object (e.g., the volume control icon of the music and video player).

In some embodiments, a parameter is used to describe the process of a finger approaching a touch screen display, contacting the touch screen display, and leaving the touch screen display. The parameter can be a distance between the finger and the touch screen display, a pressure the finger has on the touch screen display, a contact area between the finger and the touch screen, a voltage between the finger and the touch screen, a capacitance between the finger and the touch screen display or a function of one or more of the physical parameters.

In some embodiments, depending on the magnitude of the parameter (e.g., capacitance) between the finger and the touch screen display, the finger is described as (i) out of range from the touch screen display if the parameter is below an in-range threshold, (ii) in-range but out of contact with the touch screen display if the parameter is above the in-range threshold but lower than an in-contact threshold, or (iii) in contact with the touch screen display if the parameter is above the in-contact threshold.

FIGS. 59A-59E illustrate how a finger tap gesture activates a soft key icon on a touch screen display in accordance with some embodiments.

At $t=t_1$ (FIG. 59A), a user's finger moves down to a distance $d_1$ away from the touch screen display 112 of the device 100. As shown in FIG. 59E, this distance $d_1$ is beyond the in-range distance threshold. Therefore, no key icon on the touch screen display gets highlighted.

At $t=t_2$ (FIG. 59B), the finger moves further down to a distance $d_2$ away from the touch screen display. As shown in FIG. 59E, this distance $d_2$ is at or slightly below (i.e., within) the in-range distance threshold. At this distance the user's finger is in-range of the touch screen display. As a result, the key icon "H" that is close to the finger on the touch screen display is highlighted. In some embodiments, an icon is highlighted by altering its color or altering its shape (e.g., magnifying the icon) or both to give an indication to the user of its status change.

At $t=t_3$ (FIG. 59C), the finger is distance $d_3$ away from the touch screen display. As shown in FIG. 59E, this distance $d_3$ is at or slightly below the in-contact distance threshold. At this distance, the user's finger is in-contact with the touch screen display. As a result, the key icon "H" is further highlighted. In some embodiments, an icon is further highlighted by displaying a magnified instance of the icon next to the icon. As shown in FIG. 59C, the magnified instance (which may have an appearance like a balloon) has a visual link with the key icon "H" on the soft keyboard.

At $t=t_4$ (FIG. 59D), the finger is lifted up to a distance $d_4$ away from the touch screen display. As shown in FIG. 59E, this distance $d_4$ is at or slightly above the in-contact distance threshold. In other words, the finger is just out of contact with the touch screen. In some embodiments, the sequence of finger movements from $t_1$ to $t_4$ corresponds to a finger tap gesture on the key icon "H". As a result, the key icon "H" is selected and entered into an input field at another location on the touch screen display.

At $t=t_5$ (FIG. 59E), the finger is further lifted up to a distance $d_5$ away from the touch screen display, indicating that the finger is just out of range from the touch screen. In some embodiments, the key icon is selected and entered into the input field at this moment.

In some embodiments, the in-contact threshold corresponds to a parameter such as capacitance between the finger and the touch screen display. It may or may not correlate with the event that the finger is in physical contact with the touch screen. For example, the finger may be deemed in contact with the screen if the capacitance between the two reaches the in-contact threshold while the finger has not physically touched the screen. Alternatively, the finger may be deemed out of contact with (but still in range from) the screen if the capacitance between the two is below the in-contact threshold while the finger has a slight physical contact the screen.

Note that the distances shown in FIG. 59A-59E or for that matter in other figures described in the application are exaggerated for illustrative purposes.

Additional description of interpreting a finger swipe gesture can be found in U.S. Provisional Patent Application No. 60/947,140, "Portable Multifunction Device, Method, and Graphical User Interface for Interpreting a Finger Swipe Gesture," filed Jun. 29, 2007, the content of which is hereby incorporated by reference.

Figure 59F:
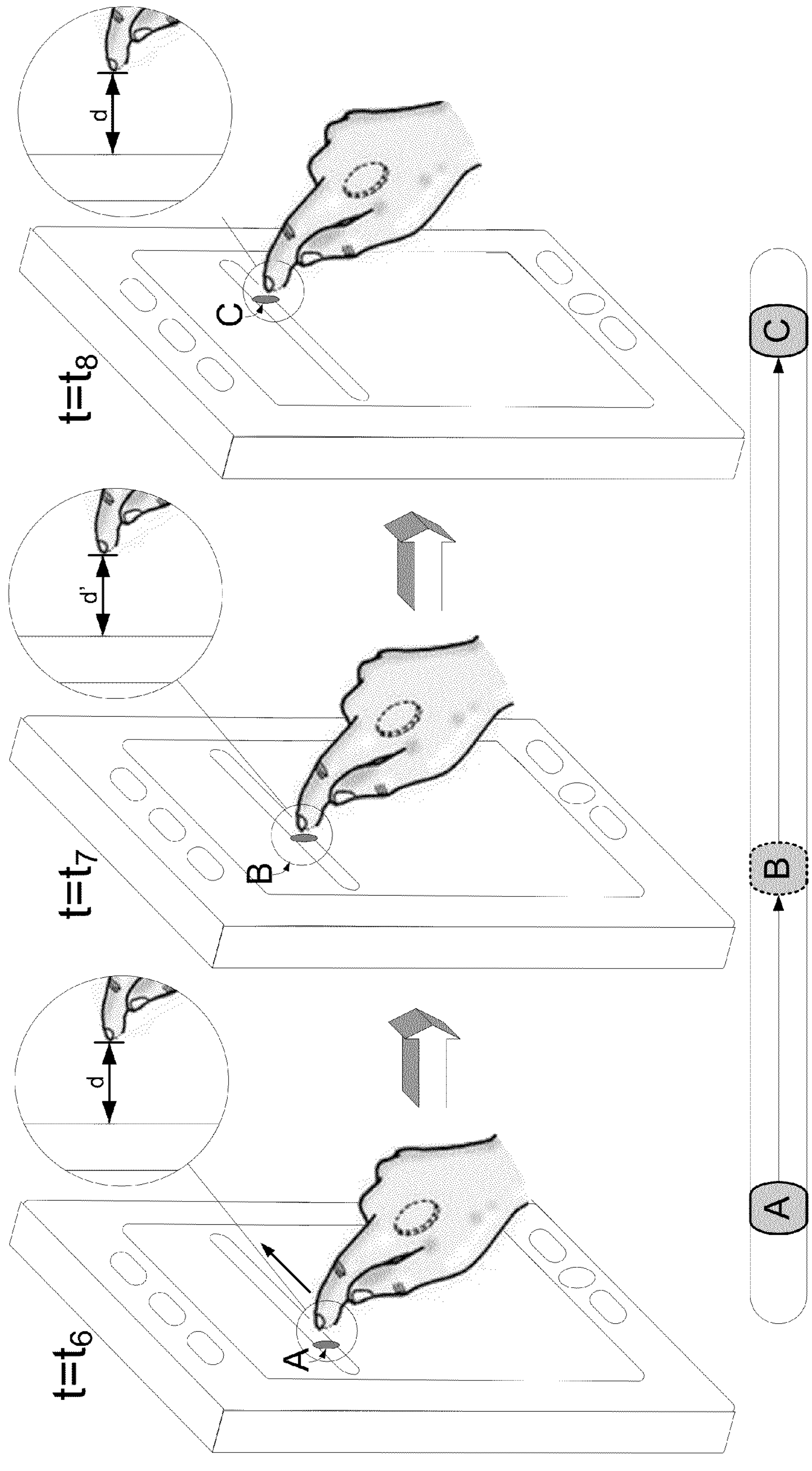
FIGS. 59F-59H illustrate how a finger swipe gesture controls a slide control icon on a touch screen display in accordance with some embodiments.
Figure 59G:
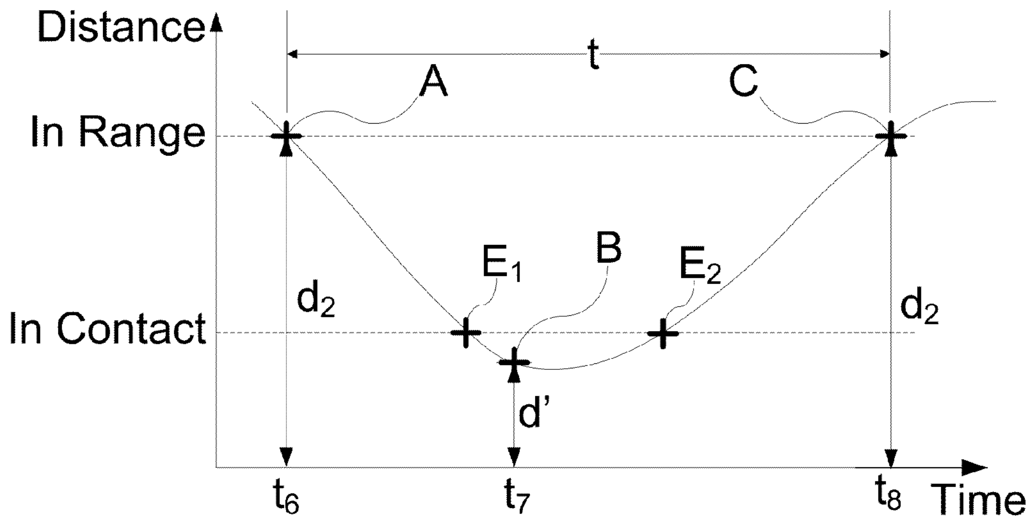
Figure 59H:
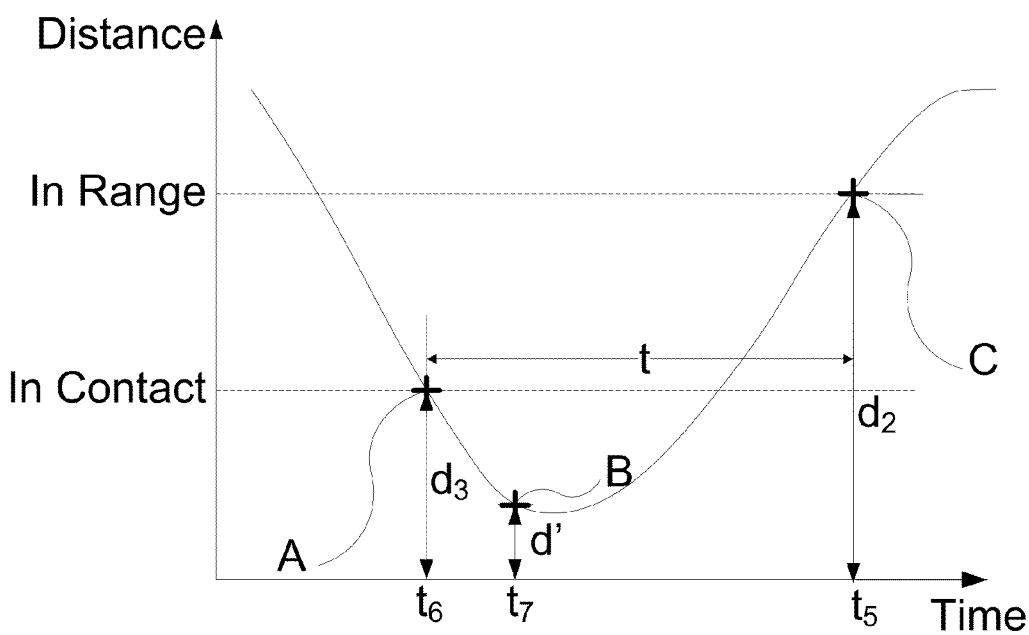

FIGS. 59F-59H illustrate how a finger swipe gesture controls a slide control icon on a touch screen display in accordance with some embodiments.

At $t=t_6$ (FIG. 59F), the finger is close enough to the touch screen display such that a finger-in-contact event (see the cross at position A in FIG. 59H) is detected at a first position A on the touch screen display. A user interface object such as a slide control icon is identified at the position A. The slide control icon may include a slide bar and a slide object that can move along the slide bar. In some embodiments, the slide object is at position A and the finger-in-contact event causes the slide object at position A to be activated.

In some embodiments, the slide object is activated by a finger-in-range event (see the cross at position A in FIG. 59G), not by a finger-in-contact event (see the cross at position $E_1$ in FIG. 59G).

At $t=t_8$ (FIG. 59F), the finger moves across the touch screen display until a finger-out-of-range event is detected at a second position C on the touch screen display (see, e.g., the crosses at position C in FIGS. 59G and 59H respectively).

Following the movement of the finger, the slide object on the touch screen display moves along the slide bar from the first position A to the second position C on the touch screen display. A distance between the first position A and the second position C on the touch screen display is determined.

In some embodiments, after the initial finger-in-contact or finger-in-range event at position A, the finger moves away from the slide control icon such that the finger is no longer in contact with the slide object when the finger-out-of-range event occurs. Please refer to the description in connection with FIGS. 47A-47E for detail. In this case, the distance by which the slide object is moved along the slide bar is determined by projecting the distance between the first position A and the second position C onto the slide bar.

In some embodiments, as shown in FIG. 59F, after the initial finger-in-contact event or finger-in-range event is detected, a finger-dragging event on or near the touch screen display is detected at $t=t_7$, which has an associated position on the touch screen display. Accordingly, the slide object is moved along the slide bar of the slider control icon from its first position A to position B, which is determined at least in part by the finger-dragging event's associated position on the touch screen display.

In some embodiments, the finger-dragging event is generated and detected repeatedly. Accordingly, the slide object is moved along the slide bar from one position to another position until the finger-out-of-range event is detected.

In some embodiments, as shown in FIGS. 59G and 59H, after the initial finger-in-contact or finger-in-range event is detected, the finger may be in contact with the touch screen display at one moment (see the cross at $E_1$ in FIGS. 59G and 59H), thereby generating a finger-in-contact event, and then out of contact with the display at another moment (see the cross at $E_2$ in FIGS. 59G and 59H), thereby generating a finger-out-contact event. But these pairs of finger-in-contact event and finger-out-of-contact event on the touch screen display have no effect on the movement of the slide object along the slide bar. In other words, during a particular finger swipe gesture on the display, the finger may be within a certain range from the touch screen display, but only in contact with the screen for a portion of the gesture (as shown in FIG. 59G), or it may even be the case that it is never in contact with the screen.

In some embodiments, a time period t from the moment $t_6$ of the finger-in-contact event or finger-in-range event to the moment $t_8$ of the finger-out-of-range event is determined. This time period t, in combination with the distance from the first position A to the second position C, determines whether a finger swipe gesture occurs on the touch screen display and if true, the distance by which (and the speed at which) the slide object needs to moved along the slide bar until the finger-out-of-range event is detected.

Heuristics

In some embodiments, heuristics are used to translate imprecise finger gestures into actions desired by the user.

Figure 64A:
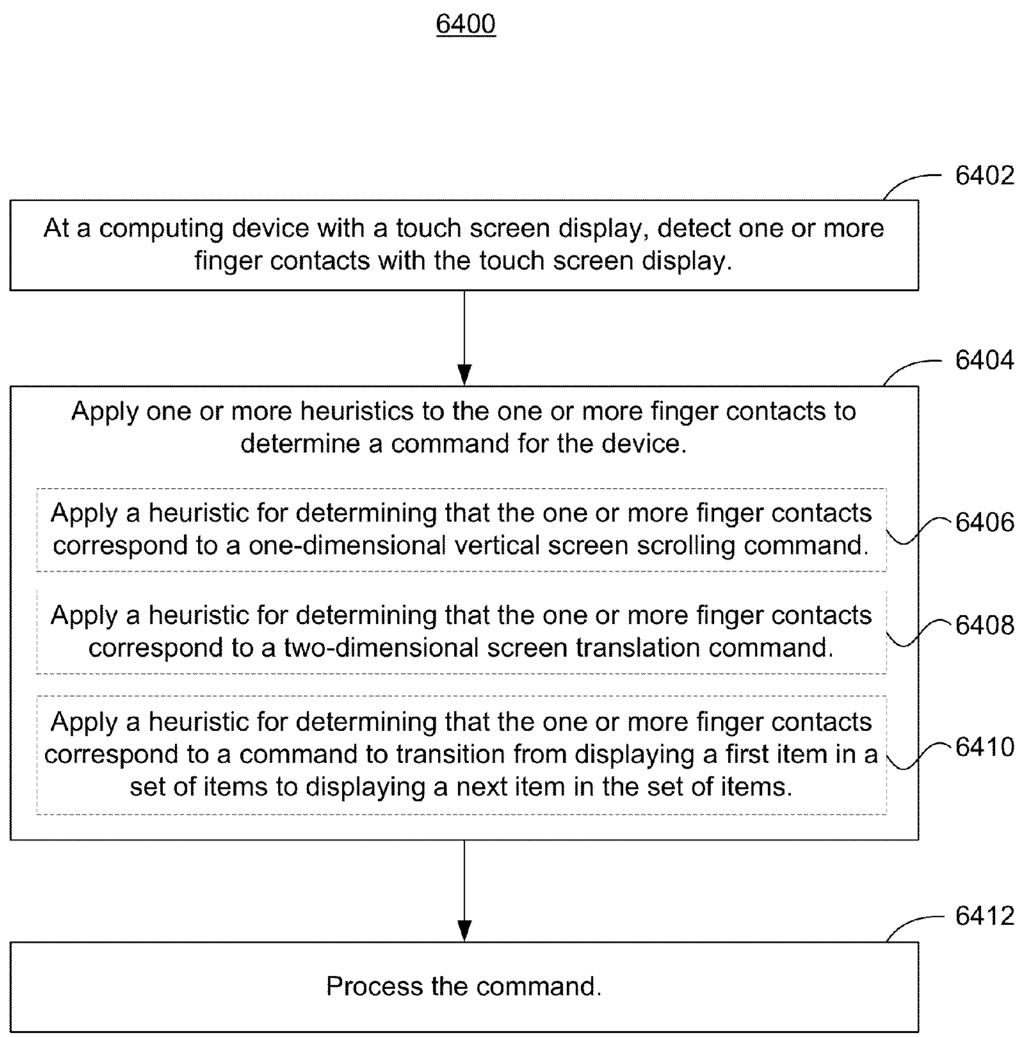
FIGS. 64A and 64B are flow diagrams illustrating methods of applying heuristics in accordance with some embodiments.

FIG. 64A is a flow diagram illustrating a method 6400 of applying one or more heuristics in accordance with some embodiments. A computing device with a touch screen display detects (6402) one or more finger contacts with the touch screen display. In some embodiments, the computing device is a portable multifunction device. In some embodiments, the computing device is a tablet computer. In some embodiments, the computing device is a desktop computer.

The device applies one or more heuristics to the one or more finger contacts to determine (6404) a command for the device. The device processes (6412) the command.

The one or more heuristics comprise: a heuristic for determining that the one or more finger contacts (e.g., 3937, FIG. 39C) correspond to a one-dimensional vertical screen scrolling command (6406); a heuristic for determining that the one or more finger contacts (e.g., 1626, FIG. 16A; 3532, FIG. 35B; or 3939, FIG. 39C) correspond to a two-dimensional screen translation command (6408); and a heuristic for determining that the one or more finger contacts (e.g., 1616 or 1620, FIG. 16A; 2416, FIG. 24A) correspond to a command to transition from displaying a respective item in a set of items to displaying a next item in the set of items (6410).

In some embodiments, the one or more heuristics include a heuristic for determining that the one or more finger contacts (e.g., 1616 or 1618, FIG. 16A; 2416, FIG. 24A) correspond to a command to transition from displaying a respective item in a set of items to displaying a previous item in the set of items.

In some embodiments, the one or more heuristics include a heuristic for determining that the one or more finger contacts correspond to a command to display a keyboard primarily comprising letters. For example, in some embodiments, gestures 1802 and 1818 (FIGS. 18D & 18E) correspond to a command to display a letter keyboard 616 (FIG. 18E). Similarly, in response to gestures 1804 and 1806 (FIGS. 18D & 18E), the letter keyboard 616 is displayed (FIG. 18E). In another example, a gesture 2506 (FIG. 25C) on a text entry box results in display of a letter keyboard 616 (FIG. 25D).

In some embodiments, the one or more heuristics include a heuristic for determining that the one or more finger contacts correspond to a command to display a keyboard primarily comprising numbers. For example, a gesture activating other number icon 812 (FIG. 8B) results in display of a numerical keyboard 624 (FIG. 9). In another example, a gesture on the zip code field 2654 in FIG. 26L results in display of a keyboard primarily comprising numbers (e.g., keyboard 624, FIG. 6C).

In some embodiments, the one or more heuristics include a heuristic for determining that the one or more finger contacts (e.g., gesture 3951, FIG. 39G) correspond to a one-dimensional horizontal screen scrolling command.

In some embodiments, the one or more heuristics include a heuristic for determining that the one or more finger contacts (e.g., contacts 3941 and 3943, FIG. 39C; contacts 3945 and 3947, FIG. 39D; contact by thumbs 5704-L and 5704-R, FIGS. 57A-57C) correspond to a 90° screen rotation command.

In some embodiments, the one or more heuristics include a heuristic for determining that the one or more finger contacts (e.g., gesture 1216 or 1218, FIG. 12A; gesture 1618 or 1620, FIG. 16A; gesture 3923, FIG. 39A) correspond to a command to zoom in by a predetermined amount.

In some embodiments, the one or more heuristics include a heuristic for determining that the one or more finger contacts (e.g., contacts 1910 and 1912, FIG. 19B; contacts 2010 and 2012, FIG. 20; contacts 3931 and 3933, FIG. 39C) correspond to a command to zoom in by a user-specified amount.

In some embodiments, the one or more heuristics include a heuristic for determining that the one or more finger contacts correspond to a command to show a heads up display. For example, contact with the touch screen 112 detected while a video 2302 (FIG. 23A) is playing results in showing the heads up display of FIG. 23C. In another example, detection of gesture 4030 (FIG. 40B) results in the display of one or more playback controls, as shown in FIG. 40C. The heads up display or playback controls may be displayed or superimposed over other content displayed on the touch screen 112.

In some embodiments, the one or more heuristics include a heuristic for determining that the one or more finger contacts (e.g., contact 2722, FIG. 27B) correspond to a command to reorder an item in a list.

In some embodiments, the one or more heuristics include a heuristic for determining that the one or more finger contacts (e.g., contact 4346, FIG. 43L) correspond to a command to replace a first user interface object with a second user interface object.

In some embodiments, the one or more heuristics include a heuristic for determining that the one or more finger contacts (e.g., contacts 4214, FIGS. 42A & 42C) correspond to a command to translate content within a frame (e.g., frame 4204) rather than translating an entire page that includes the frame.

In some embodiments, the one or more heuristics include a heuristic for determining that the one or more finger contacts correspond to a command to operate a slider icon (e.g., slider bar 4704, FIGS. 47A-47B; icon 4732, FIGS. 47C-47E) with one or more finger contacts (e.g., movements 4710, 4712, and 4714, FIG. 47B; movements 4738, 4740, and 4742, FIG. 47D) outside an area that includes the slider icon.

Figure 53A:
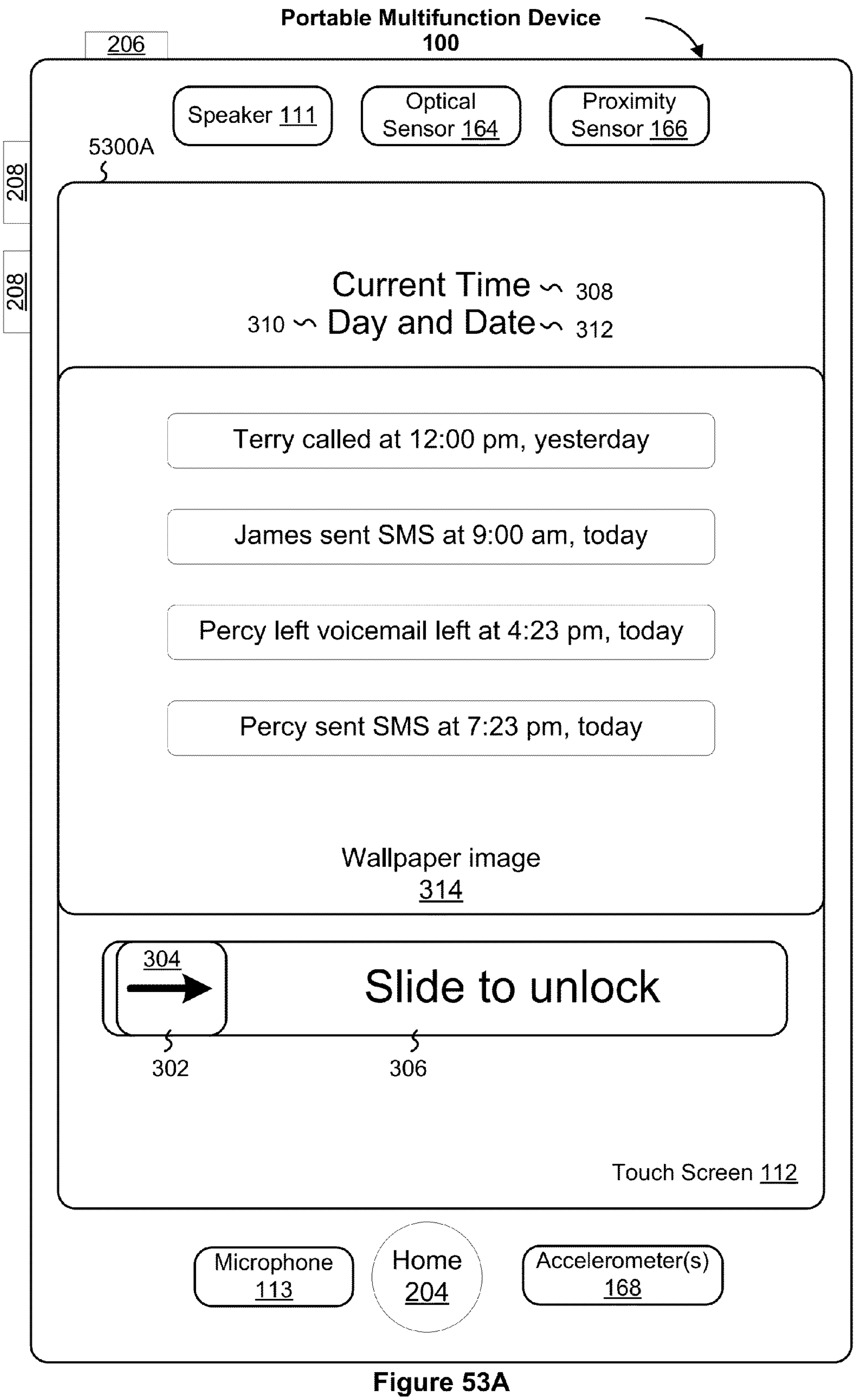
FIGS. 53A-53D illustrate exemplary user interfaces for displaying notification information for missed communications in accordance with some embodiments.
Figure 53B:
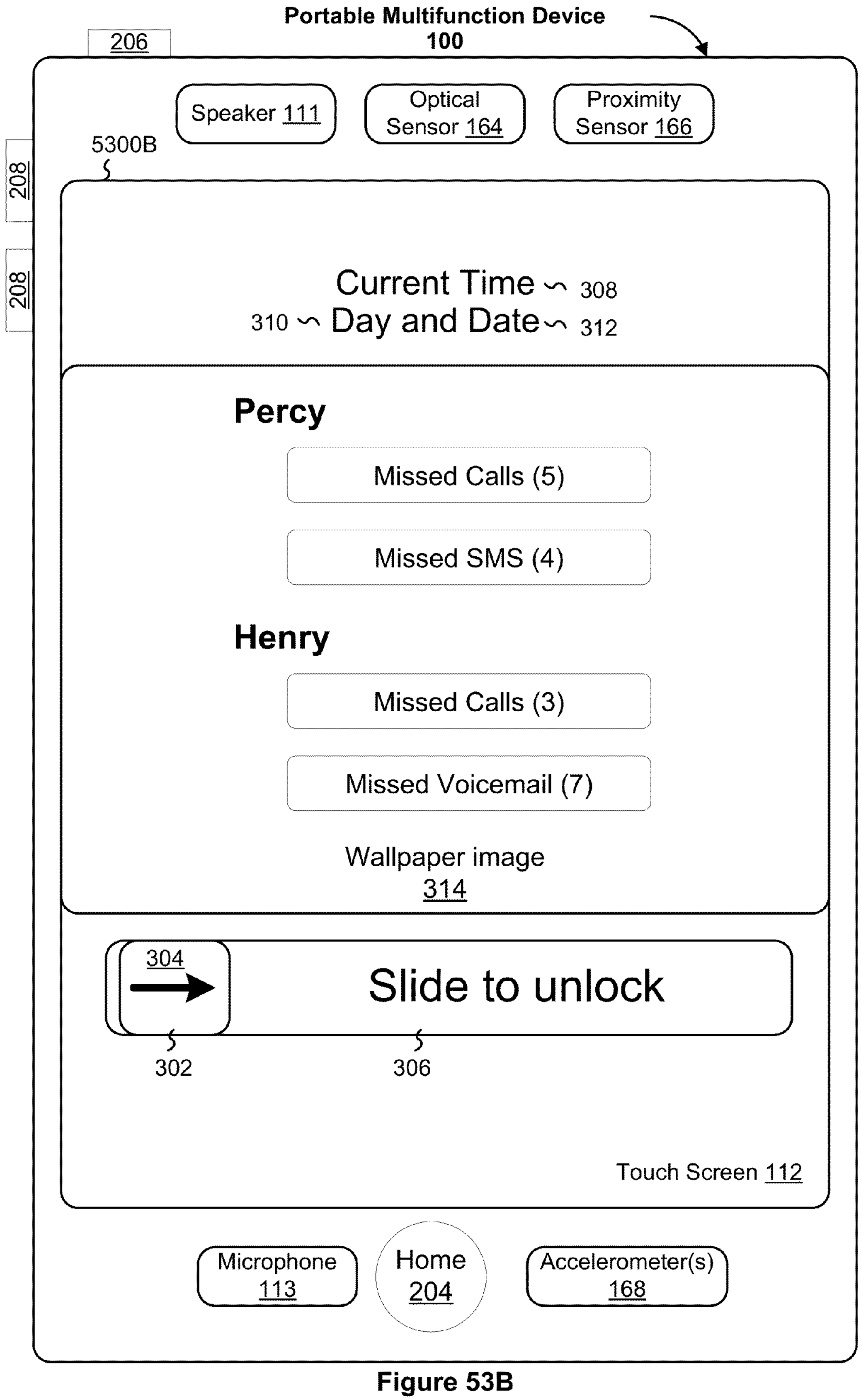
Figure 53C:
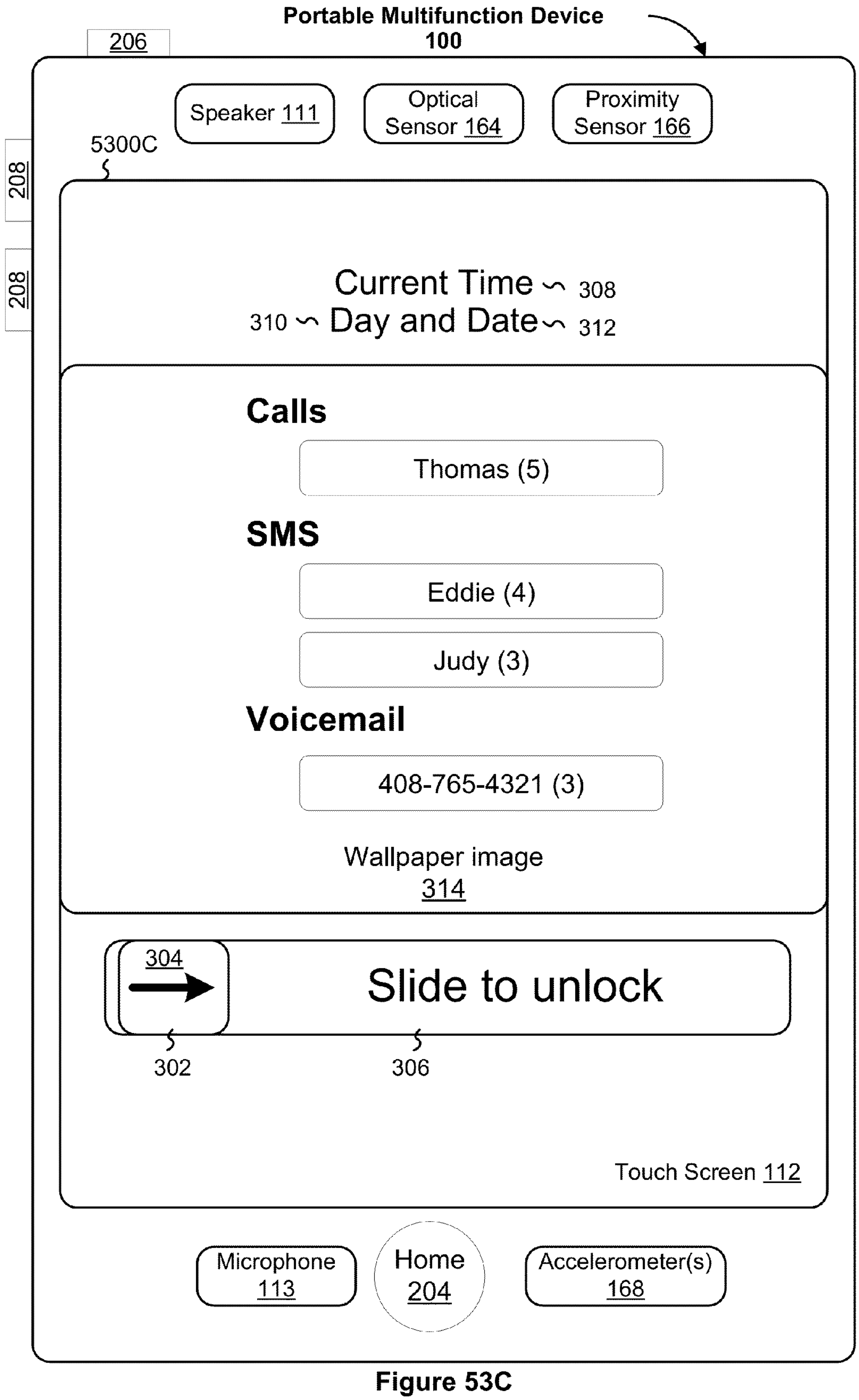
Figure 53D:
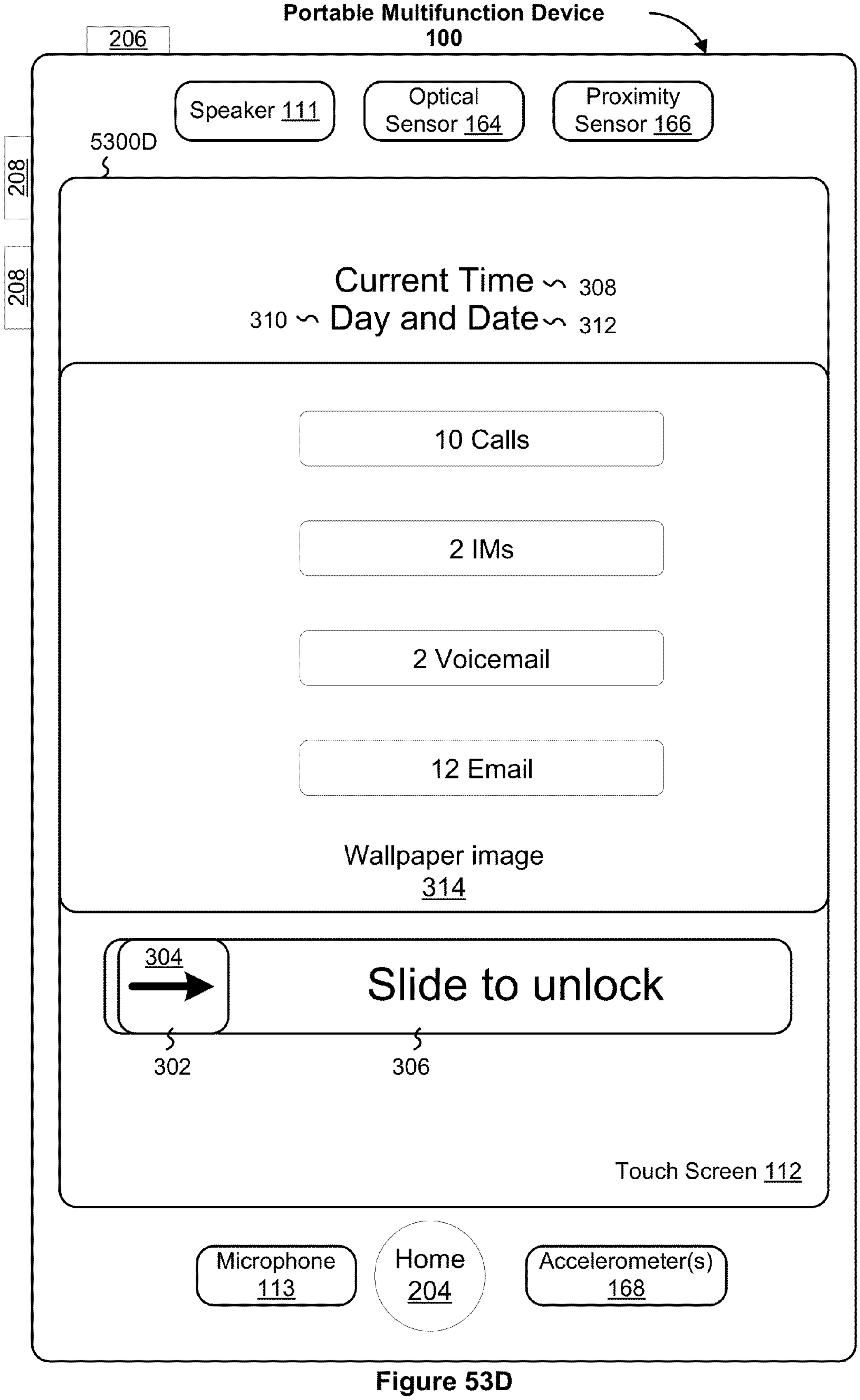

In some embodiments, the one or more heuristics include a heuristic for determining that the one or more finger contacts (e.g., a gesture moving the unlock image 302 across the channel 306, FIGS. 3 & 53B) correspond to a user interface unlock command.

In some embodiments, the one or more heuristics include a heuristic for determining which user interface object is selected when two user interface objects (e.g., button control user interface object 5802 and slide control user interface object 5806, FIGS. 58A-D) have overlapping hit regions (e.g., hit regions 5804 and 5816).

In some embodiments, in one heuristic of the one or more heuristics, a contact (e.g., contact 3937, FIG. 39C) comprising a finger swipe gesture that initially moves within a predetermined angle of being perfectly vertical with respect to the touch screen display corresponds to a one-dimensional vertical screen scrolling command.

In some embodiments, in one heuristic of the one or more heuristics, a contact (e.g., contact 3939, FIG. 39C) comprising a moving finger gesture that initially moves within a predefined range of angles corresponds to a two-dimensional screen translation command.

In some embodiments, in one heuristic of the one or more heuristics, a contact comprising a finger swipe gesture that initially moves within a predetermined angle of being perfectly horizontal with respect to the touch screen display corresponds to a one-dimensional horizontal screen scrolling command. For example, a finger swipe gesture that initially moves within 27° of being perfectly horizontal corresponds to a horizontal scrolling command, in a manner analogous to vertical swipe gesture 3937 (FIG. 39C).

In some embodiments, in one heuristic of the one or more heuristics, a contact (e.g., gestures 1802 and 1818, FIGS. 18D & 18E; gesture 2506, FIG. 25C) comprising a finger tap gesture on a text box corresponds to a command to display a keyboard (e.g., keyboard 616) primarily comprising letters.

In some embodiments, in one heuristic of the one or more heuristics, a contact (e.g., contacting other number icon 812, FIG. 8B; contacting the zip code field 2654 in FIG. 26L) comprising a finger tap gesture on a number field corresponds to a command to display a keyboard primarily comprising numbers (e.g., keyboard 624, FIG. 6C).

In some embodiments, in one heuristic of the one or more heuristics, a contact (e.g., gesture 3941 and 3943, FIG. 39C; gesture 3945 and 3947, FIG. 39D) comprising a multifinger twisting gesture corresponds to a 90° screen rotation command.

In some embodiments, in one heuristic of the one or more heuristics, a contact (e.g., by thumbs 5704-L and 5704-R, FIGS. 57A-57C) comprising a simultaneous two-thumb twisting gesture corresponds to a 90° screen rotation command.

In some embodiments, in one heuristic of the one or more heuristics, a contact comprising a double tap gesture on a box of content in a structured electronic document (e.g., a double tap gesture on block 3914-5, FIG. 39A) corresponds to a command to enlarge and substantially center the box of content. In some embodiments, repeating the double tap gesture reverses the prior zoom-in operation, causing the prior view of the document to be restored.

In some embodiments, in one heuristic of the one or more heuristics, a multi-finger de-pinch gesture (e.g., gesture 3931 and 3933, FIG. 39C) corresponds to a command to enlarge information in a portion of the touch screen display in accordance with a position of the multi-finger de-pinch gesture and an amount of finger movement in the multi-finger de-pinch gesture.

In some embodiments, in one heuristic of the one or more heuristics, an N-finger translation gesture (e.g., 4210, FIGS. 42A-42B) corresponds to a command to translate an entire page of content and an M-finger translation gesture (e.g., 4214, FIGS. 42A & 42C) corresponds to a command to translate content within a frame (e.g., frame 4204, FIGS. 42A-42C) rather than translating the entire page of content that includes the frame.

In some embodiments, in one heuristic of the one or more heuristics, a swipe gesture on an unlock icon (e.g., a gesture moving the unlock image 302 across the channel 306, FIGS. 3 & 53B) corresponds to a user interface unlock command.

These heuristics help the device to behave in the manner desired by the user despite inaccurate input by the user.

Figure 64B:
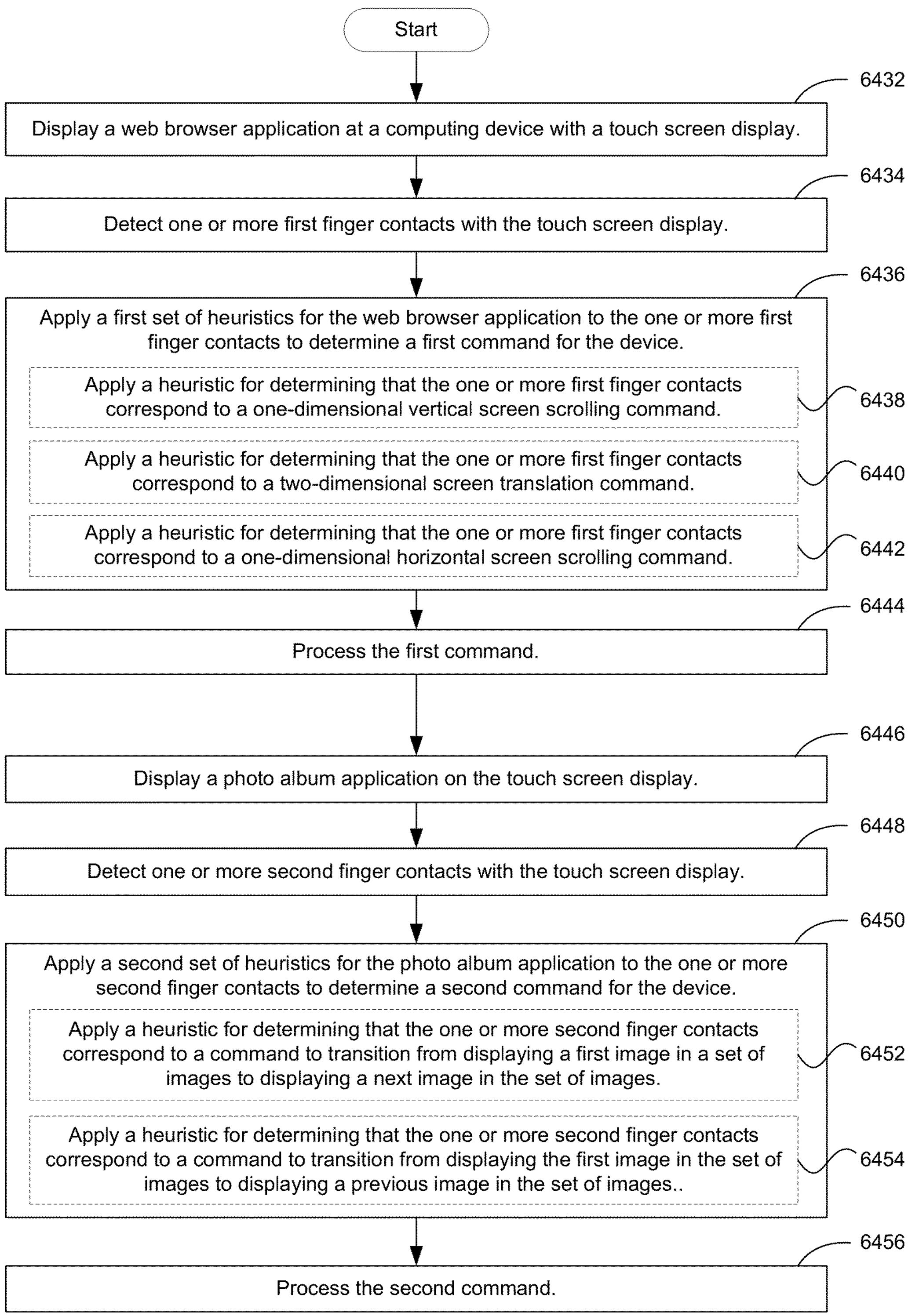

FIG. 64B is a flow diagram illustrating a method 6430 of applying one or more heuristics in accordance with some embodiments. While the method 6430 described below includes a number of operations that appear to occur in a specific order, it should be apparent that the method 6430 can include more or fewer operations, that an order of two or more operations may be changed and/or that two or more operations may be combined into a single operation. For example, operations 6446-6456 may be performed prior to operations 6432-6444.

A computing device with a touch screen display displays (6432) a web browser application (e.g., UI 3900A, FIG. 39A). In some embodiments, the computing device is a portable multifunction device. In some embodiments, the computing device is a tablet computer. In some embodiments, the computing device is a desktop computer.

While the computing device displays the web browser application, one or more first finger contacts with the touch screen display are detected (6434).

A first set of heuristics for the web browser application is applied (6436) to the one or more first finger contacts to determine a first command for the device. The first set of heuristics includes: a heuristic for determining that the one or more first finger contacts (e.g., 3937, FIG. 39C) correspond to a one-dimensional vertical screen scrolling command (6438); a heuristic for determining that the one or more first finger contacts (e.g., 1626, FIG. 16A; 3532, FIG. 35B; or 3939, FIG. 39C) correspond to a two-dimensional screen translation command (6440); and a heuristic for determining that the one or more first finger contacts (e.g., gesture 3951, FIG. 39G) correspond to a one-dimensional horizontal screen scrolling command (6442).

The first command is processed (6444). For example, the device executes the first command.

In some embodiments, the first set of heuristics includes a heuristic for determining that the one or more first finger contacts (e.g., contacts 3941 and 3943, FIG. 39C; contacts 3945 and 3947, FIG. 39D; contact by thumbs 5704-L and 5704-R, FIGS. 57A-57C) correspond to a 90° screen rotation command.

In some embodiments, the first set of heuristics includes a heuristic for determining that the one or more first finger contacts (e.g., gesture 1216 or 1218, FIG. 12A; gesture 1618 or 1620, FIG. 16A; gesture 3923, FIG. 39A) correspond to a command to zoom in by a predetermined amount.

In some embodiments, the first set of heuristics includes a heuristic for determining that the one or more first finger contacts (e.g., contacts 1910 and 1912, FIG. 19B; contacts 2010 and 2012, FIG. 20; contacts 3931 and 3933, FIG. 39C) correspond to a command to zoom in by a user-specified amount.

In some embodiments, the first set of heuristics includes a heuristic for determining that the one or more first finger contacts (e.g., contact 3923 on block 3914-5, FIG. 39A) correspond to a command to enlarge and substantially center a box of content.

In some embodiments, the first set of heuristics includes a heuristic for determining that the one or more first finger contacts (e.g., contacts 4214, FIGS. 42A & 42C) correspond to a command to translate content within a frame (e.g., frame 4204) rather than translating an entire page that includes the frame.

In some embodiments, the first set of heuristics includes: a heuristic for determining that the one or more first finger contacts correspond to a command to zoom in by a predetermined amount; a heuristic for determining that the one or more first finger contacts correspond to a command to zoom in by a user-specified amount; and a heuristic for determining that the one or more first finger contacts correspond to a command to enlarge and substantially center a box of content. In some embodiments, the first set of heuristics (or another set of heuristics) include one or more heuristics for reversing the prior zoom in operation, causing the prior view of a document or image to be restored in response to a repeat of the gesture (e.g., a double tap gesture).

While the device displays (6446) a photo album application (e.g., UI 1200A, FIG. 12A; UI 1600A, FIG. 16A; or UI 4300CC, FIG. 43CC), one or more second finger contacts with the touch screen display are detected (6448).

A second set of heuristics for the web browser application is applied (6450) to the one or more second finger contacts to determine a second command for the device. The second set of heuristics includes: a heuristic for determining that the one or more second finger contacts (e.g., 1218 or 1220, FIG. 12A; 1616 or 1620, FIG. 16A; 4399, FIG. 43CC) correspond to a command to transition from displaying a first image in a set of images to displaying a next image in the set of images (6452) and a heuristic for determining that the one or more second finger contacts (e.g., 1216 or 1220, FIG. 12A; 1616 or 1618, FIG. 16A; 4399, FIG. 43CC) correspond to a command to transition from displaying the first image in the set of images to displaying a previous image in the set of images (6454).

The second command is processed (6456). For example, the device executes the second command.

In some embodiments, the second set of heuristics includes a heuristic for determining that the one or more second finger contacts correspond to a command to zoom in by a predetermined amount. In some embodiments, the second set of heuristics (or another set of heuristics) include one or more heuristics for reversing the prior zoom in operation, causing the prior view of an image to be restored in response to a repeat of the gesture (e.g., a double tap gesture).

In some embodiments, the second set of heuristics includes a heuristic for determining that the one or more second finger contacts correspond to a command to zoom in by a user-specified amount.

In some embodiments, the second set of heuristics includes: a heuristic for determining that the one or more second finger contacts correspond to a one-dimensional vertical screen scrolling command; a heuristic for determining that the one or more second finger contacts correspond to a two-dimensional screen translation command; and a heuristic for determining that the one or more second finger contacts correspond to a one-dimensional horizontal screen scrolling command.

In some embodiments, while the device displays an application that receives text input via the touch screen display (e.g., UI 1800D and UI 1800E, FIGS. 18D & 18E; UI 2600L, FIG. 26L), one or more third finger contacts with the touch screen display are detected. A third set of heuristics for the application that receives text input is applied to the one or more third finger contacts to determine a third command for the device. The third set of heuristics includes a heuristic for determining that the one or more third finger contacts (e.g., gestures 1802 and 1818, FIGS. 18D & 18E) correspond to a command to display a keyboard primarily comprising letters (e.g., letter keyboard 616, FIG. 18E) and a heuristic for determining that the one or more third finger contacts (e.g., a gesture on the zip code field 2654, FIG. 26L) correspond to a command to display a keyboard primarily comprising numbers (e.g., numerical keyboard 624, FIG. 9). The third command is processed.

In some embodiments, while the device displays a video player application (e.g., UI 2300A, FIG. 23A), one or more fourth finger contacts with the touch screen display are detected. A fourth set of heuristics for the video player application is applied to the one or more fourth finger contacts to determine a fourth command for the device. The fourth set of heuristics includes a heuristic for determining that the one or more fourth finger contacts correspond to a command to operate a slider icon (e.g., slider bar 4704, FIGS. 47A-47B; icon 4732, FIGS. 47C-47E) with one or more finger contacts (e.g., movements 4710, 4712, and 4714, FIG. 47B; movements 4738, 4740, and 4742, FIG. 47D) outside an area that includes the slider icon. The fourth set of heuristics also includes a heuristic for determining that the one or more fourth finger contacts correspond to a command to show a heads up display. For example, contact with the touch screen 112 detected while a video 2302 (FIG. 23A) is playing results in showing the heads up display of FIG. 23C. The heads up display is superimposed over the video 2302 that is also being displayed on the touch screen 112. In another example, detection of gesture 4030 (FIG. 40B) results in the display of one or more playback controls, as shown in FIG. 40C. En the example shown in FIG. 40C, the playback controls are superimposed over inline multimedia content 4002-1 that is also being displayed on the touch screen 112. The fourth command is processed.

The heuristics of method 6430, like the heuristics of method 6400, help the device to behave in the manner desired by the user despite inaccurate input by the user.

Additional description of heuristics can be found in U.S. Provisional Patent Application No. 60/937,991, "Touch Screen Device, Method, and Graphical User Interface for Determining Commands by Applying Heuristics," filed Jun. 29, 2007, the content of which is hereby incorporated by reference.

Keyboards

FIGS. 60A-60M illustrate exemplary soft keyboards in accordance with some embodiments.

A brief description of finger tap and finger swipe gestures is provided above in connection with FIGS. 59A-59H. The same model is used below to illustrate how the device responds to a continuous finger movement on its touch screen display.

FIGS. 60A-60G illustrate exemplary user interfaces for displaying one or more key icons in response to a continuous finger movement on or near a soft keyboard on a touch screen display in accordance with some embodiments. The soft keyboard includes multiple key icons.

At time $t=t_1$ (FIG. 60A), a finger-in-contact event is detected at the key icon "H" and the key icon "H" is highlighted.

Figure 60A:
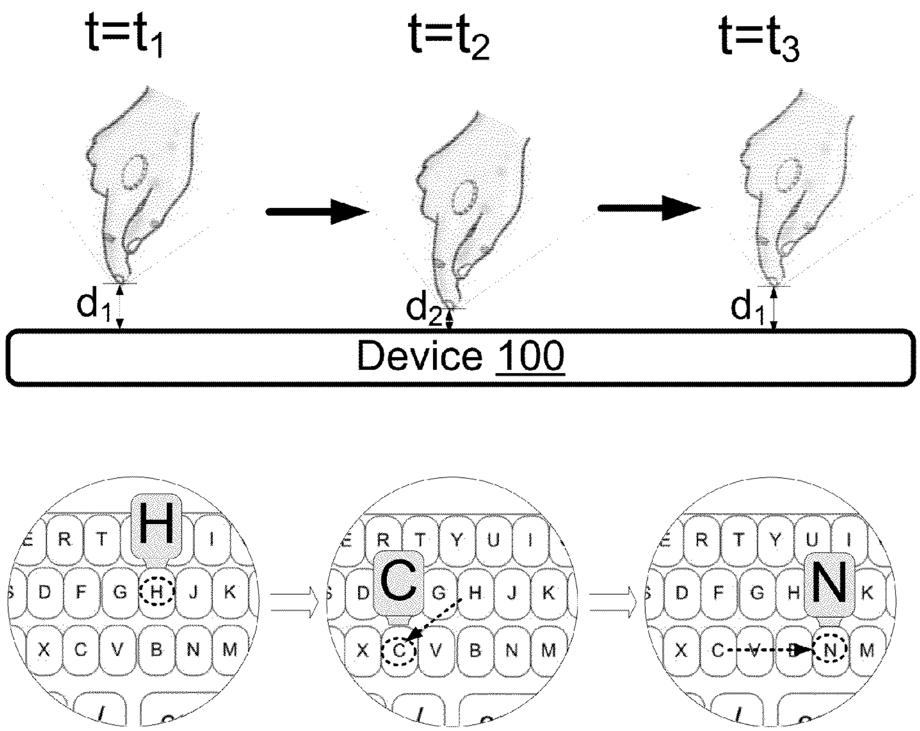
FIGS. 60A-60M illustrate exemplary soft keyboards in accordance with some embodiments.

In some embodiments, the key icon is highlighted by displaying a balloon-type symbol near the key icon. For example, as shown in FIG. 60A, the symbol is a magnified instance of the key icon "H". There is a visual link between the magnified instance and the key icon "H" to further highlight their relationship.

In some embodiments, the highlighted key icon is activated if a finger-out-of-contact event is detected at the key icon. If so, the character "H" is entered into a predefined location on the display (e.g., in an input field).

Figure 60B:
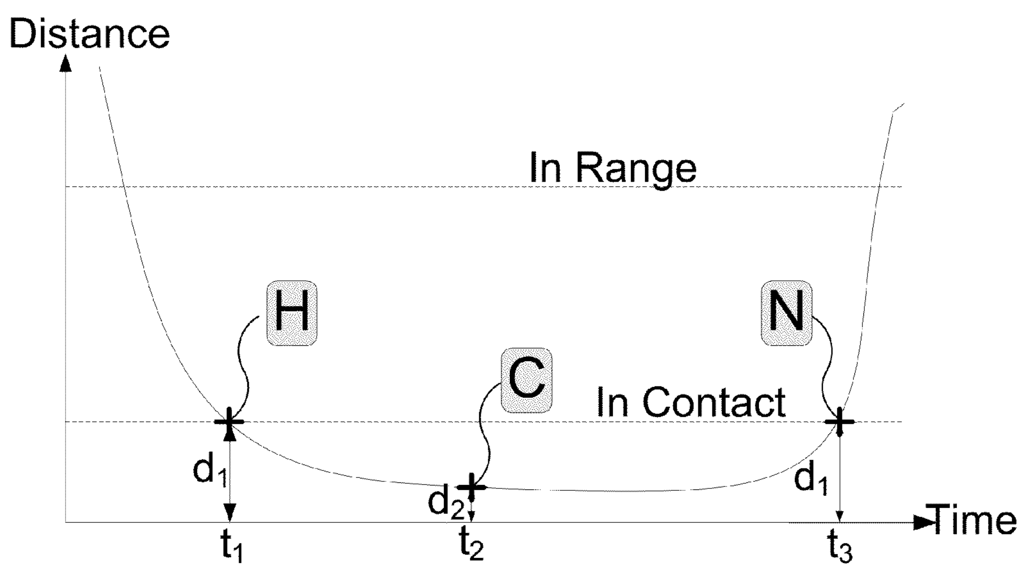

Subsequently, when the finger moves away from the key icon "H", the key icon "H" is de-highlighted. As shown in FIG. 60B, although the finger moves away from the key icon "H", it is still in contact with the touch screen display. In other words, no finger-out-of-contact event is detected yet after the initial finger-in-contact event at $t=t_1$.

In some embodiments, the key icon is de-highlighted by removing the balloon-type symbol near the key icon "H". Sometimes, there is a predefined time delay between moving the finger away from the key icon "H" and removing the adjacent symbol.

Next, while being in consistent contact with the touch screen display, the finger is detected to be in contact with a second key icon "C" at time $t=t_2$ and this key icon is highlighted accordingly.

In some embodiments, the second key icon "C" is highlighted by displaying a balloon-type symbol near the key icon. As shown in FIG. 60A, the symbol is a magnified instance of the key icon "C" near the key icon. There is also a visual link between the magnified instance and the key icon "C".

When the finger moves away from the second key icon "C", the second key icon is de-highlighted. The aforementioned series of operations repeats until a finger-out-of-contact event is detected at a particular location (e.g., the location occupied by the key icon "N") on the touch screen at time $t=t_3$.

In some embodiments, the finger-out-of-contact event is triggered when the finger is lifted off the touch screen display, and this event causes the selection or activation of a corresponding object if the finger-out-of-contact event occurs over or within a predefined range of the object. Continuing with the exemplary user gesture shown in FIG. 60C, as a result of the finger-out-of-contact event, not only is the key icon "N" de-highlighted by removing its magnified instance, but an instance of the character "N" is displayed at a predefined location on the touch screen display (e.g., in a text input field).

As noted above, the distances $d_1$ and $d_2$ shown in FIG. 60A are exaggerated for illustrative purposes. In some embodiments, the finger is always in physical contact with the touch screen from time $t=t_1$ to time $t=t_3$. The distances may be correlated with the finger's contact area or contact pressure on the touch screen display or the voltage or capacitance between the finger and the display.

As noted above in connection with FIG. 59B, a user interface object (e.g., a key icon) may be highlighted whenever a finger is within a predefined range from the object. Therefore, in some embodiments, as shown in FIGS. 60C-60D, a key icon is highlighted by altering its original appearance (without showing the balloon-type symbol) when the finger is within a predefined distance $d_4$ from the key icon at time $t=t_4$.

Figure 60C:
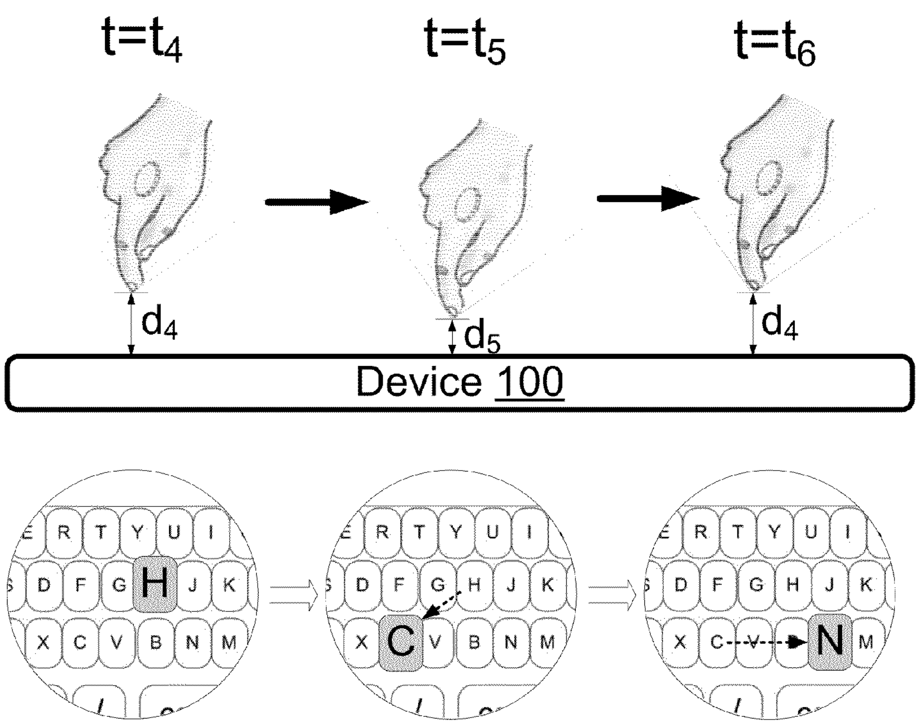
Figure 60D:
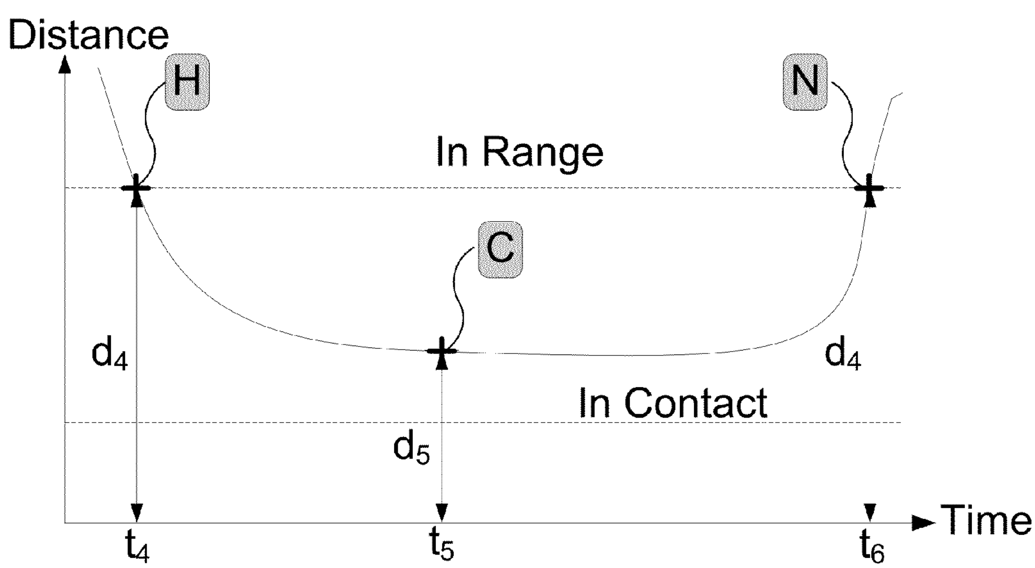
Figure 60E:
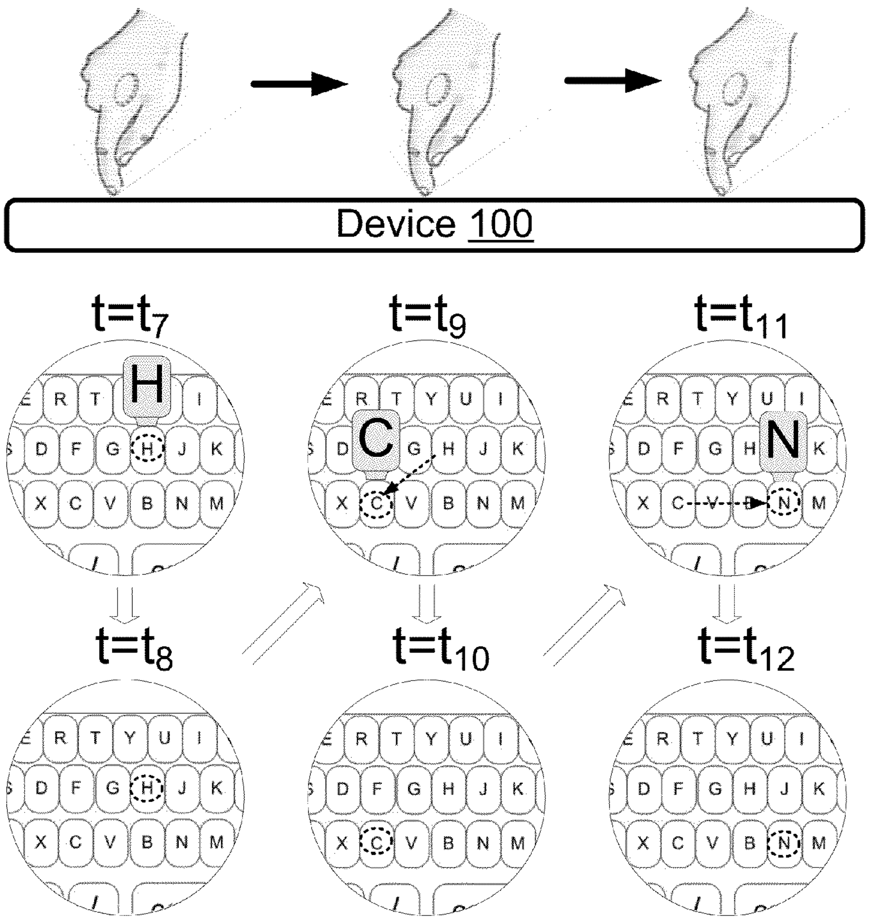

When the finger moves outside the predefined distance from the key icon, but still within a predefined range from the display (as shown in FIG. 60D), the key icon resumes its original appearance.

In some embodiments, an icon's appearance is altered by changing its color or shape or both. In some other embodiments, an icon's appearance is altered by covering it with a magnified instance of the same icon.

As shown in FIG. 60C, when the finger is moved within a predefined distance from the second key icon "C" at time $t=t_5$, the second key icon's original appearance is altered accordingly and then resumes to its original appearance when the finger subsequently moves outside the predefined distance from the second key icon.

Note that a difference between the embodiment shown in FIGS. 60A-60B and the embodiment shown in FIGS. 60C-60D is that a character "N" is selected and entered into an input field at time $t=t_3$ in FIGS. 60A-60B, whereas no key icon is selected at time $t=t_6$ in FIGS. 60C-60D because no finger-in-contact event was detected in the latter case.

As noted above, a parameter is used to characterize the relationship between the finger and the touch screen display in some embodiments. This parameter may be a function of one or more other parameters such as a distance, a pressure, a contact area, a voltage, or a capacitance between the finger and the touch screen display.

In some embodiments, as shown in FIG. 60D, a user interface object (e.g., a first key icon) is highlighted (e.g., by altering its original appearance) when the parameter associated with the finger and the touch screen display occupied by the first key icon reaches or passes a first predefined level (e.g., the in-range threshold in FIG. 60D) in a first direction (e.g., in a decreasing direction).

In some embodiments, a highlighted key icon is then de-highlighted (e.g., by resuming its original appearance) when the parameter associated with the finger and the touch screen display occupied by the highlighted key icon reaches or passes the first predefined level (e.g., the in-range threshold in FIG. 60D) in a second direction that is opposite to the first direction (e.g., in an increasing direction).

In some embodiments, the first key icon is further highlighted (e.g., by displaying a balloon-type symbol next to the key icon) when the parameter associated with the finger and the touch screen display occupied by the first key icon reaches or passes a second predefined level (e.g., the in-contact threshold in FIG. 60B) in the first direction (e.g., in the decreasing direction).

In some embodiments, the highlighted key icon is de-highlighted (e.g., by removing the balloon-type symbol next to the key icon) when the parameter associated with the finger and the touch screen display occupied by the first key icon reaches or passes the second predefined level (e.g., the in-contact threshold in FIG. 60B) in a second direction that is opposite to the first direction (e.g., in an increasing direction). In some embodiments, the key icon's associated character is selected and entered into a predefined text input field.

In some embodiments, as shown in FIGS. 60B and 60D, the first and second predefined levels are configured such that the parameter reaches the first predefined level before reaching the second predefined level in the first direction. But the parameter does not have to reach the second predefined level before reaching the first predefined level in the second direction that is opposite to the first direction. For example, the parameter has to first reach the in-range threshold before it reaches the in-contact threshold. But the parameter may never reach the in-contact threshold before it moves out of the range from the key icon.

As noted above, only one key icon is selected in the embodiment shown in FIGS. 60A-60B when the finger-out-of-contact event is detected at the key icon "N". Alternatively, a series of key icons can be selected without any finger-out-of-contact event if the parameter associated with the finger and the display is compared against another threshold level.

Figure 60F:
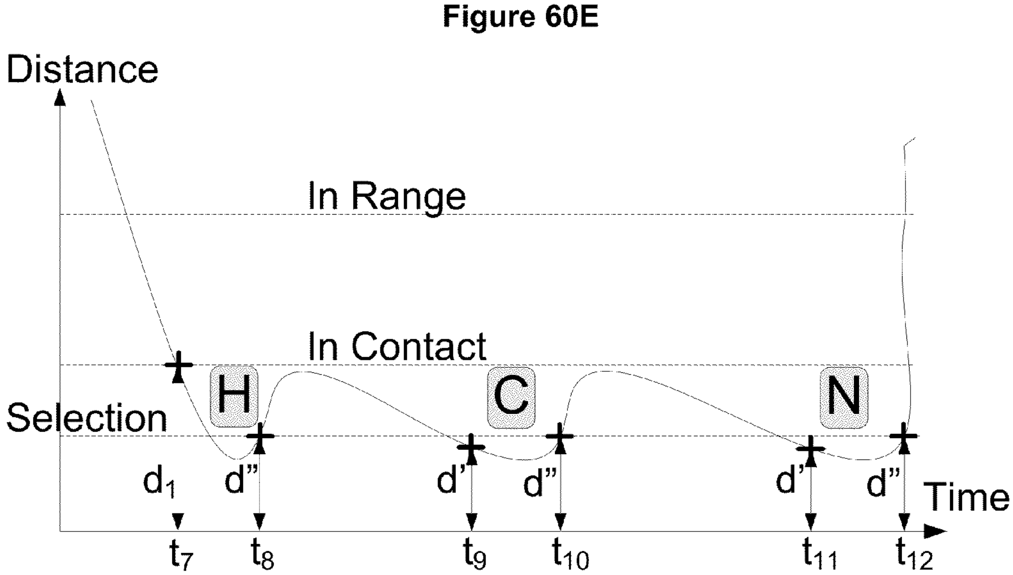

As shown in FIG. 60F, a new "selection" threshold is used to compare with the parameters. In this particular embodiment, the selection threshold is set to be below the in-contact threshold.

At time $t=t_7$, a key icon "H" is highlighted when the finger meets a first predefined condition.

In some embodiments, the first predefined condition is that the parameter associated with the finger and the touch screen display occupied by the key icon reaches or passes a first predefined level (e.g., the in-contact threshold) in a first direction (e.g., in an decreasing direction).

At time $t=t_8$, the key icon "H" is selected when the finger meets a second predefined condition and the finger stays within a predefined distance from the touch screen display.

In some embodiments, the second predefined condition is that the parameter associated with the finger and the touch screen display occupied by the key icon reaches or passes a second predefined level in a second direction that is opposite to the first direction while the finger is still within a predefined distance from the first icon. In some embodiments, an instance of the selected key icon is entered at a predefined location on the touch screen display.

At time $t=t_9$, a key icon "C" is highlighted when the finger meets the first predefined condition.

At time $t=t_{10}$, the key icon "C" is selected when the finger meets the second predefined condition and the finger stays within a predefined distance from the touch screen display.

The aforementioned operations repeat until a finger-out-of-contact event is detected at time $t=t_{12}$ and an instance of the character "N" is the last one entered into the corresponding text input field.

Figure 60G:
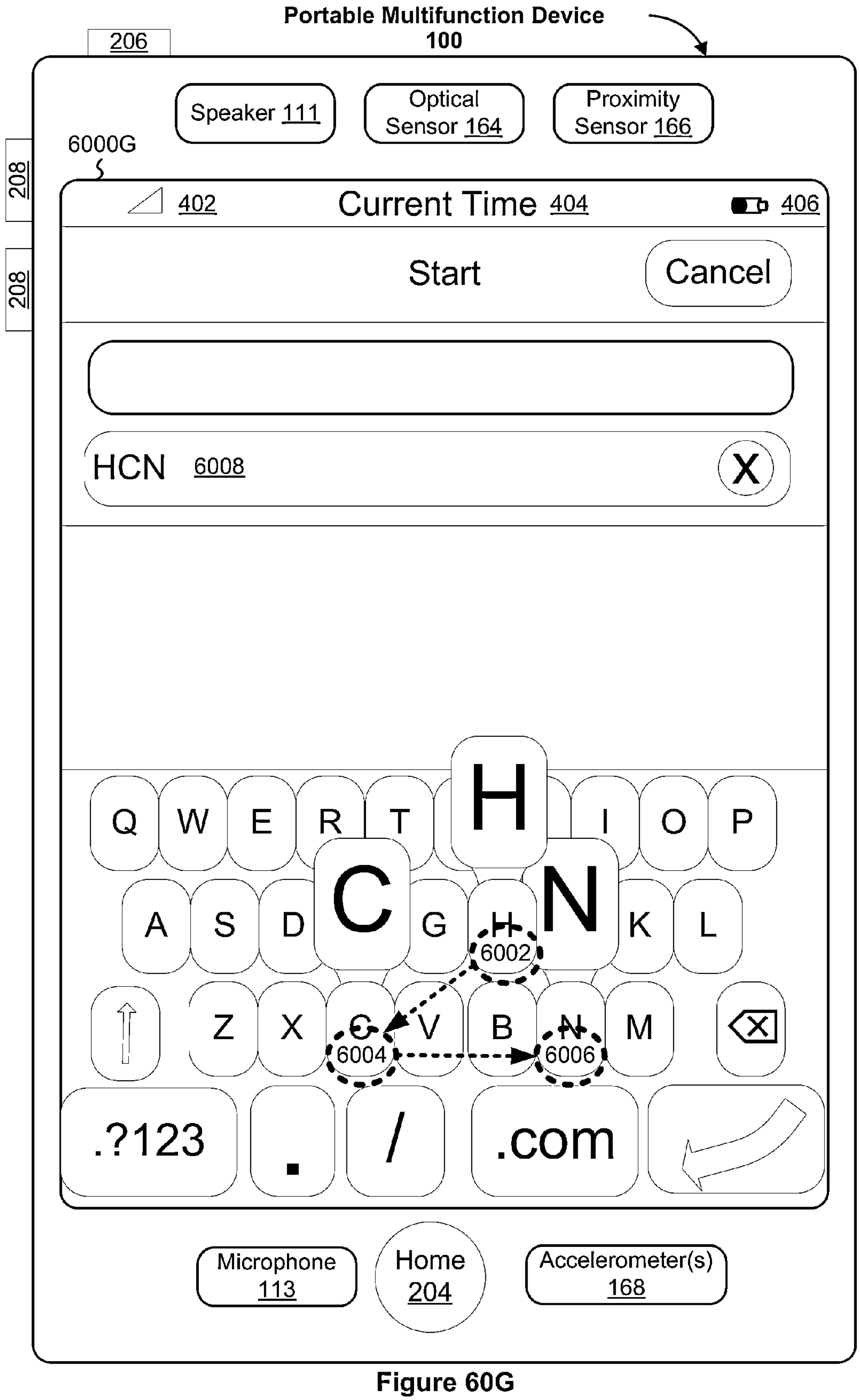

FIG. 60G is an exemplary graphical user interface illustrating a character string "HCN" is entered into the text field 6008 when the finger moves from position 6002 to 6004 and then to 6006. The three balloon-type symbols are displayed temporarily when the finger is in contact with their corresponding key icons on the soft keyboard. Advantageously, the aforementioned character input approach is faster than the approach as shown in FIGS. 59A-59D.

In some embodiments, a plurality of icons including first and second icons are displayed on the touch screen display. When a finger is in contact with the first icon, its appearance is altered to visually distinguish the first icon from other icons on the touch screen display. When the finger subsequently moves away from the first icon while still being in contact with the touch screen display, the visual distinction associated with the first icon is removed. Subsequently, the second icon's appearance is altered to visually distinguish the second icon from other icons on the touch screen display when the finger is in contact with the second icon.

One challenge with entering characters through the soft keyboard shown in FIG. 60G is that the size of the key icons may be too small to hit for some users. Accordingly, FIGS. 60H-60M are exemplary graphical user interfaces illustrating different types of soft keyboards in accordance with some embodiments. These soft keyboards have larger key icons and are therefore more convenient for those users having difficulty with keyboards like that shown in FIG. 60G.

In response to a user request for soft keyboard, a first keyboard is displayed on the touch screen display. The first keyboard includes at least one multi-symbol key icon.

Figure 60H:
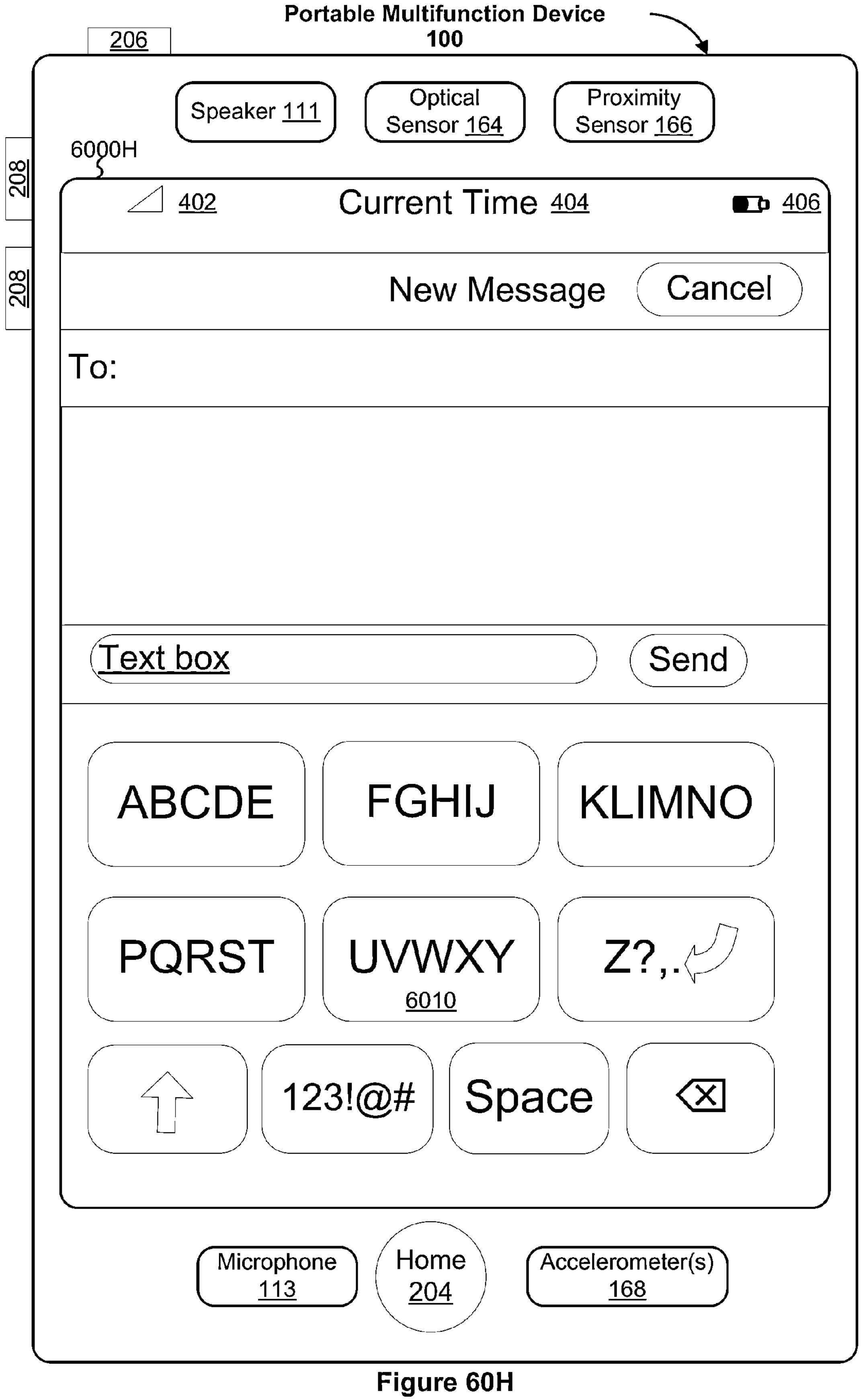

In some embodiments (as shown in FIG. 60H), the first soft keyboard includes multiple multi-symbol key icons. For example, the key icon 6010 includes five symbols "U", "V", "W", "X", and "Y".

Upon detecting a user selection of the multi-symbol key icon, the device replaces the first keyboard with a second keyboard. The second keyboard includes a plurality of single-symbol key icons and each single-symbol key icon corresponds to a respective symbol associated with the multi-symbol key icon.

Figure 60I:

FIG. 60I depicts a second keyboard replacing the first keyboard shown in FIG. 60H. Note that the top two rows of six multi-symbol key icons are replaced by two rows of five single-symbol key icons and a back key icon. Each of the five single-symbol key icons include one symbol from the multi-symbol key icon 6010.

In response to a user selection of one of the single-symbol key icons, an instance of a symbol associated with the user-selected single-symbol key icon is displayed at a predefined location on the touch screen display.

As shown in FIG. 60I, in response to a user selection of the single-symbol key icon 6017, a letter "U" is entered into the text field 6019. A user can easily tap any of the five single-symbol key icons because they are quite large. To return to the first keyboard with multi-symbol key icons, the user can tap the back key icon at the center of the top row of the second keyboard.

Figure 60J:
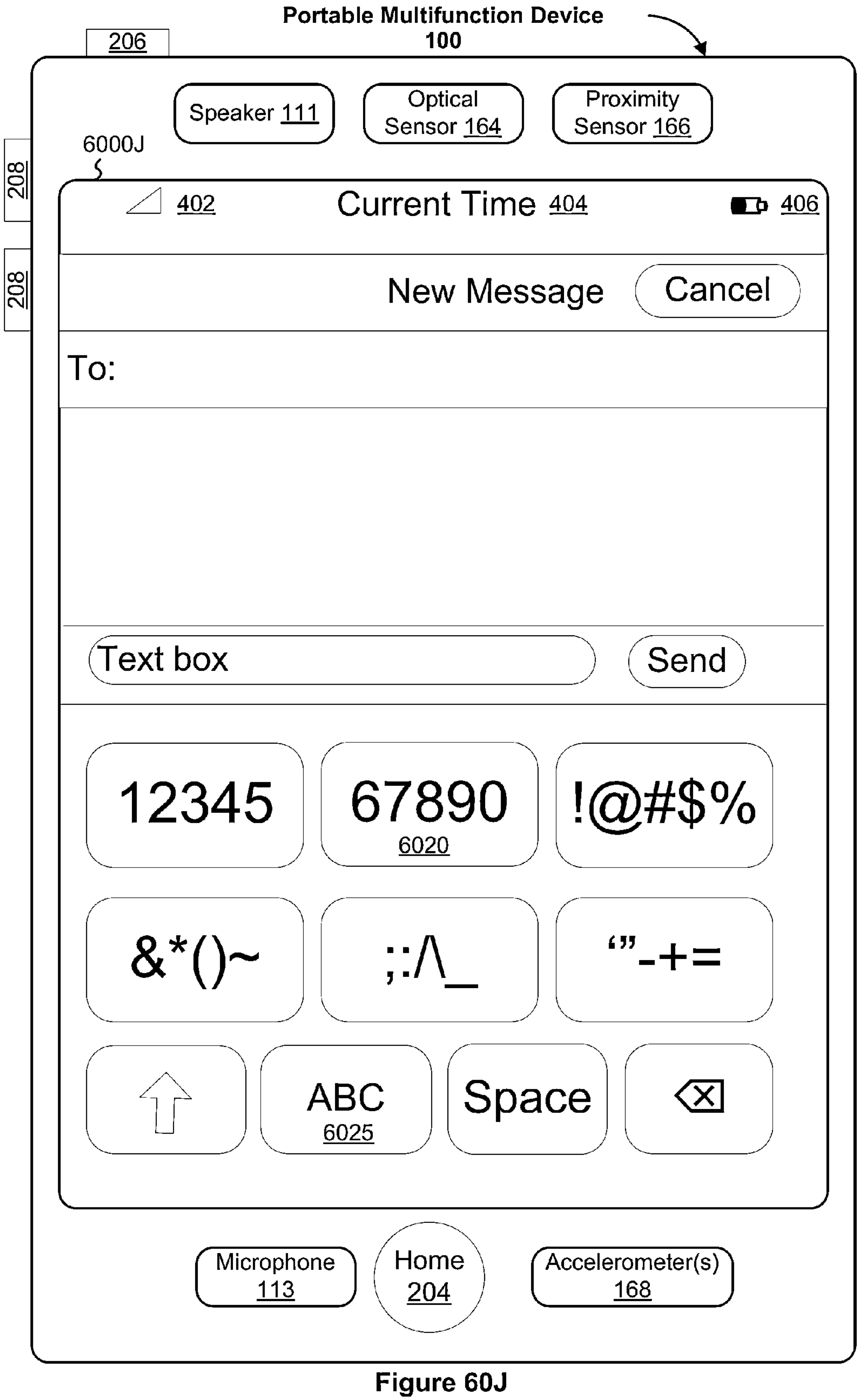

To enter a non-alphabetic character, the user can tap the keyboard switch icon 6015. As shown in FIG. 60J, a third soft keyboard replaces the second keyboard shown in FIG. 60I. In particular, each of the top two rows is a multi-symbol key icon including multiple non-alphabetic characters. For example, the key icon 6020 includes five digit symbols "6", "7", "8", "9", and "0".

Figure 60K:

A user selection of the key icon 6020 replaces the third keyboard with the fourth keyboard shown in FIG. 60K. Note that the top two rows of six multi-symbol key icons are now replaced by two rows of five single-symbol key icons and a back key icon. Each of the five single-symbol key icons include one digit symbol from the multi-symbol key icon 6020. A finger tap of the keyboard switch icon 6025 brings back the alphabetic multi-symbol keyboard shown in FIG. 60H.

In some embodiments, the top row of a soft keyboard is reserved for those single-symbol key icons and the second row of the keyboard displays multiple multi-symbol key icons.

Figure 60L:
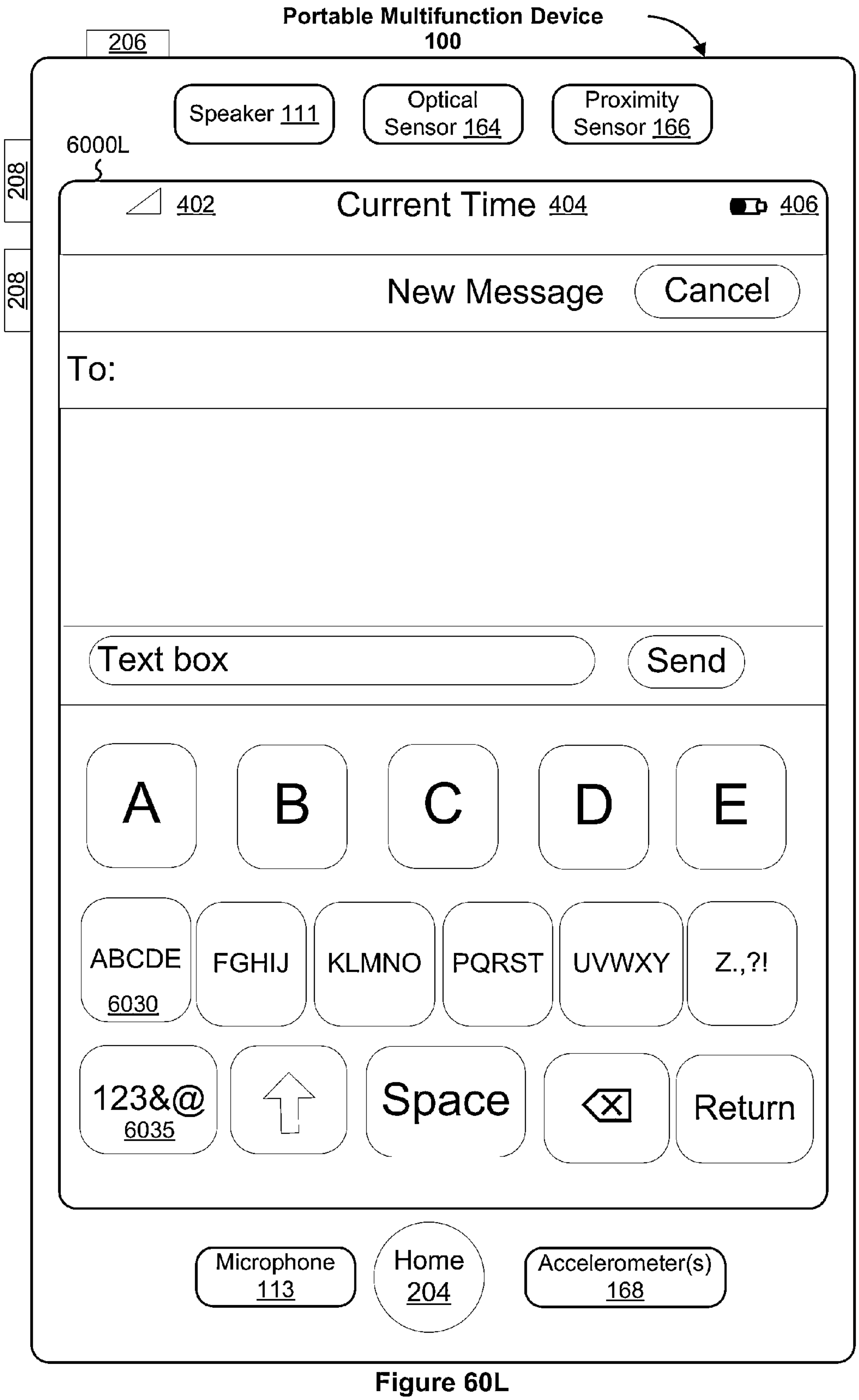

As shown in FIG. 60L, a user selection of the multi-symbol key icon 6030 causes the top row to display five single-symbol key icons, each icon including one character from the multi-symbol key icon 6030.

In some embodiments, as shown in FIG. 60L, the user-selected multi-symbol key icon 6030 is displayed in a manner visually distinguishable from other icons on the same soft keyboard. The manner may include changing its color, shape or the like that is known to one skilled in the art.

Figure 60M:
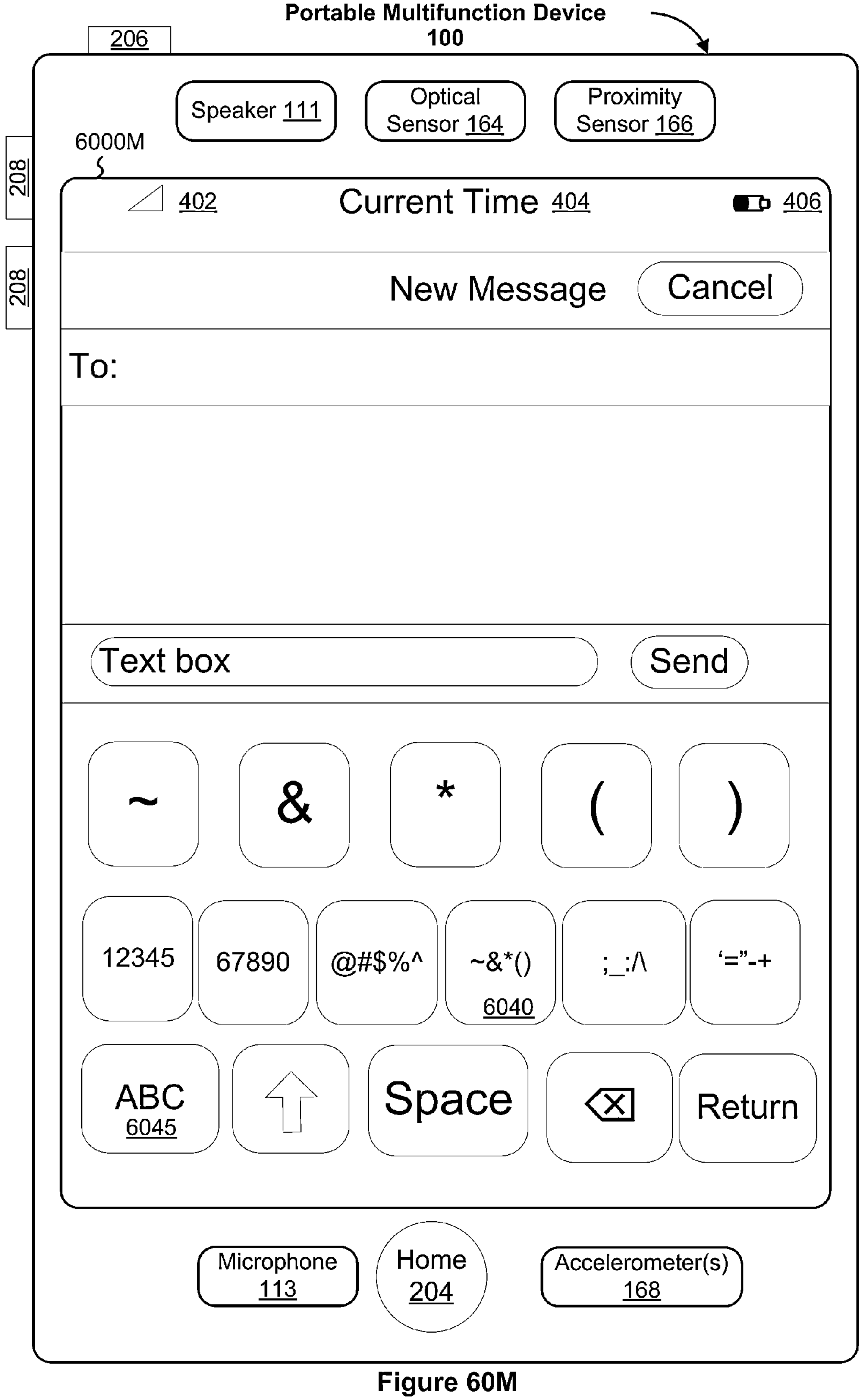

The keyboard shown in FIG. 60L also includes a keyboard switch icon 6035. Upon detecting a user selection of the keyboard switch icon 35, the device replaces the keyboard with another one as shown in FIG. 60M. Note that the keyboard in FIG. 60M includes another set of multi-symbol key icons such as 6040 in replacement of the multi-symbol key icons shown in the previous keyboard.

Additional description of soft keyboards can be found in U.S. Provisional Patent Application No. 60/946,714, "Portable Multifunction Device with Soft Keyboards," filed Jun. 27, 2007, the content of which is hereby incorporated by reference.

Figure 61:
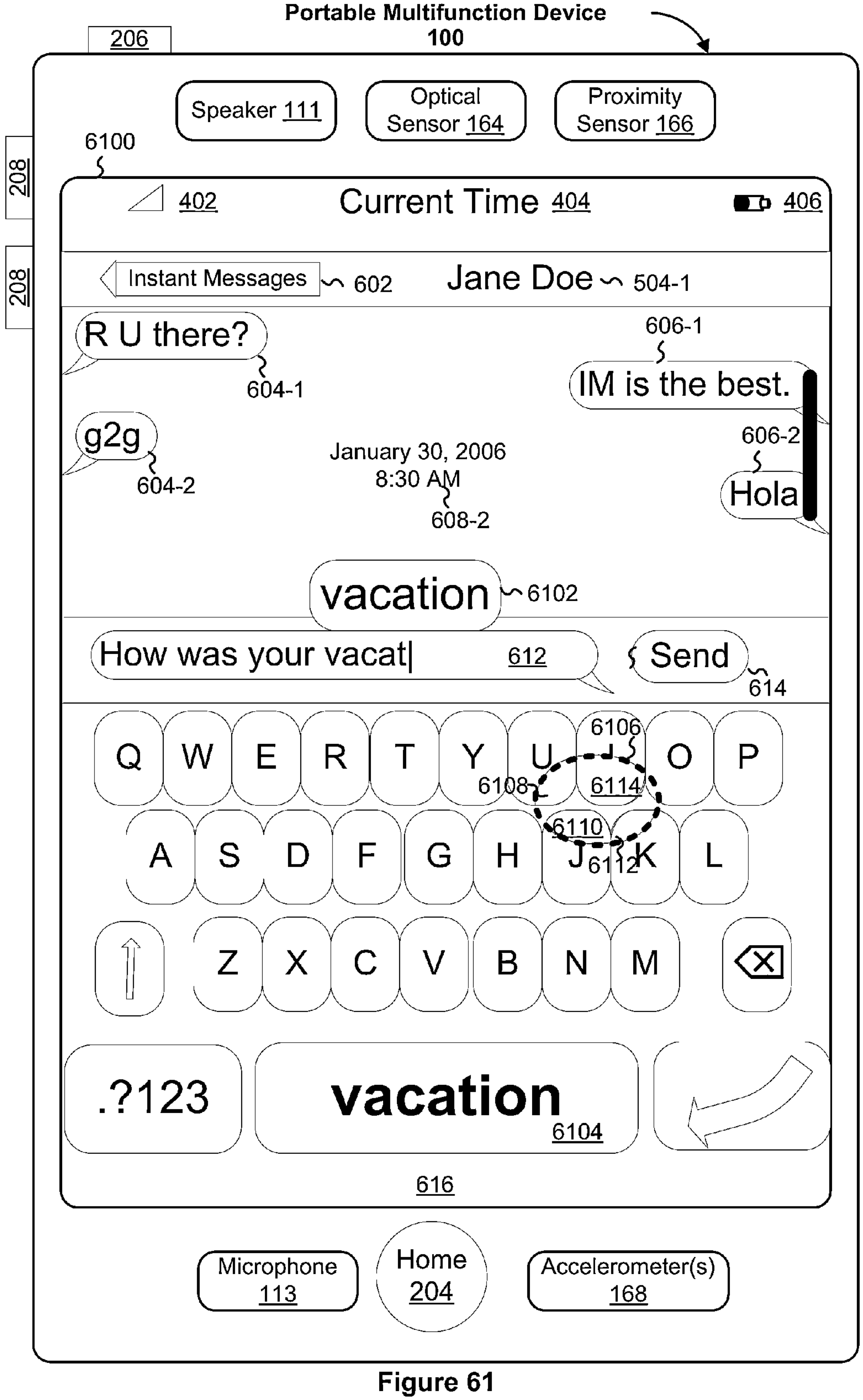
FIG. 61 illustrates an exemplary finger contact with a soft keyboard in accordance with some embodiments.

FIG. 61 illustrates an exemplary finger contact with a soft keyboard in accordance with some embodiments.

In some embodiments, user interface 6100 (FIG. 61) includes the following elements, or a subset or superset thereof:

- 402, 404, and 406, as described above;
- Instant messages icon 602 that when activated (e.g., by a finger tap on the icon) initiates transition to a UI listing instant message conversations (e.g., UI 500);

Names 504 of the people a user is having instant message conversations with (e.g., Jane Doe 504-1) or the phone number if the person's name is not available (e.g., 408-123-4567 504-3);

Instant messages 604 from the other party, typically listed in order along one side of UI 6100;

Instant messages 606 to the other party, typically listed in order along the opposite side of UI 6100 to show the back and forth interplay of messages in the conversation;

Timestamps 608 for at least some of the instant messages;

Text entry box 612;

Send icon 614 that when activated (e.g., by a finger tap on the icon) initiates sending of the message in text entry box 612 to the other party (e.g., Jane Doe 504-1);

Letter keyboard 616 for entering text in box 612;

Word suggestion boxes 6102 and/or 6104 that when activated (e.g., by a finger tap on the icon) initiate display of a suggested word in text entry box 612 in place of a partially entered word.

In some embodiments, a finger contact detected on letter keyboard 616 partially overlaps two or more key icons. For example, finger contact 6106 includes overlap with the letter "u" 6108, with the letter "j" 6110, with the letter "k" 6112, and with the letter "i" 6114. In some embodiments, the letter with the largest partial overlap with the detected finger contact (i.e., with the highest percentage of overlap) is selected. Based on this letter and on previously entered text corresponding to an incomplete word, a suggested word is displayed in word suggestion boxes 6102 and/or 6104.

In some embodiments, in response to detecting a finger contact on letter keyboard 616, a letter is selected based on the extent of partial overlap with key icons and on the previously entered text corresponding to an incomplete word. For example, if a finger contact overlaps with four letter key icons, but only two of the letters when added to the previously entered text produce a possible correctly spelled word, whichever of the two letters has the largest partial overlap is selected. Based on the selected letter and on the previously entered text, a suggested word is then displayed in word suggestion boxes 6102 and/or 6104.

Although FIG. 61 illustrates an exemplary user interface for predicting words based on detecting contact with a keyboard and on previously entered text in the context of instant messaging, analogous user interfaces are possible for any application involving text entry.

Additional description of keyboards can be found in U.S. Provisional Patent Application No. 60/883,806, "Soft Keyboard Display For A Portable Multifunction Device," filed Jan. 7, 2007, the content of which is hereby incorporated by reference.

Settings

FIGS. 62A-62G illustrate exemplary user interfaces for displaying and adjusting settings in accordance with some embodiments.

In some embodiments, a portable multifunction device (e.g., device 100) displays an airplane mode switch icon (e.g., icon 6202, FIG. 62A) on a touch screen display (e.g., display 112). The airplane mode switch icon has an "on" position (e.g., 6206, FIG. 62B) and an "off" position (e.g., 6204, FIG. 62A).

If the airplane mode switch icon is at the "off" position, a communications signal strength icon (e.g., 402) is displayed on the touch screen display.

Figure 62A:
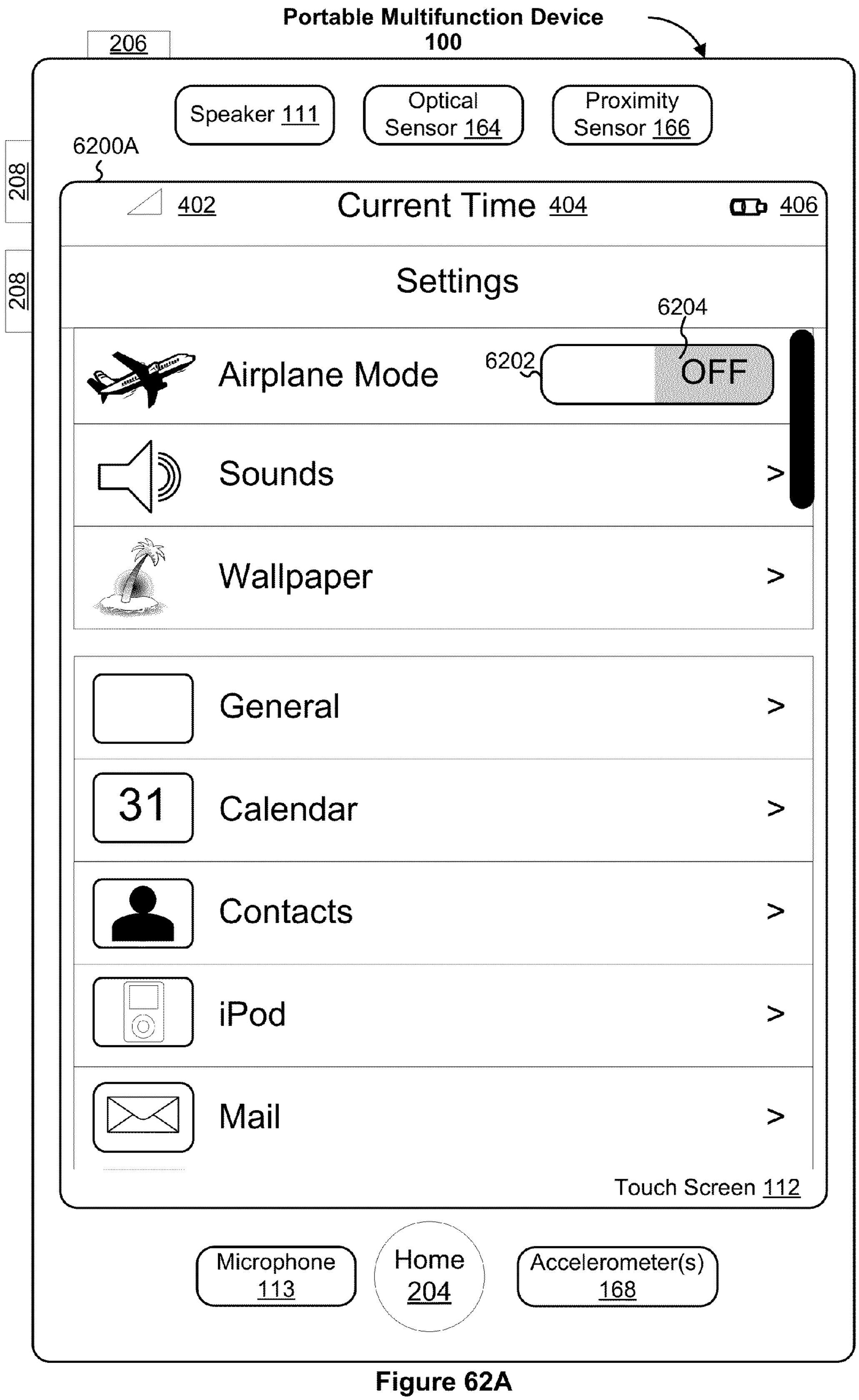
FIGS. 62A-62G illustrate exemplary user interfaces for displaying and adjusting settings in accordance with some embodiments.
Figure 62B:
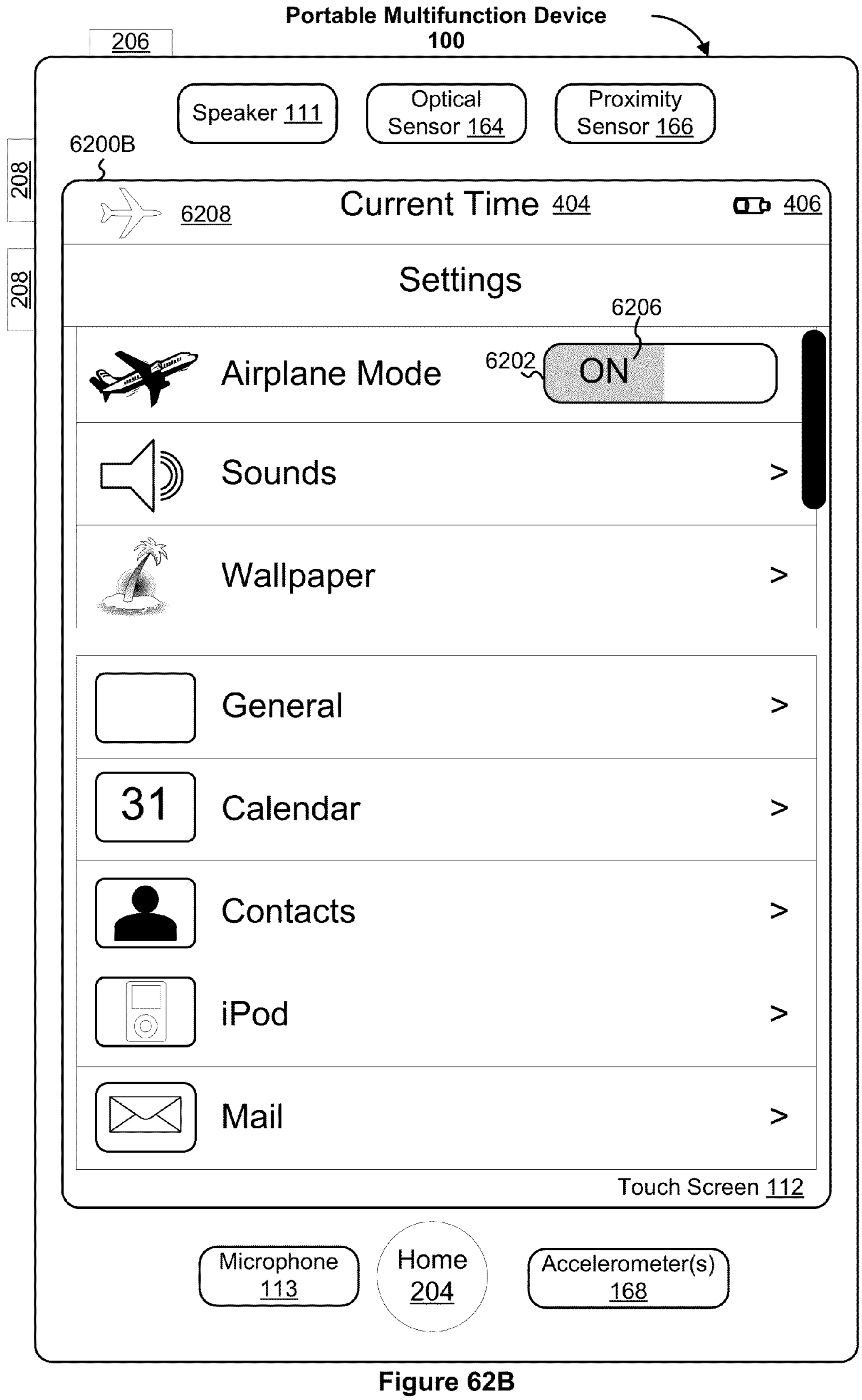

Upon detecting a movement of a finger contact on or near the airplane mode switch icon from the "off" position to the "on" position, the communications signal strength icon is replaced with an airplane icon (e.g., 6208, FIG. 62B). In some embodiments, detecting the movement of the finger contact comprises detecting a finger-down event at or near the airplane mode switch icon at the "off" position, one or more finger-dragging events, and a finger-up event at or near the airplane mode switch icon at the "on" position.

For example, in UI 6200A (FIG. 62A), a swipe gesture from the "off" position 6204 to the "on" position 6206 may be detected. In response to detecting the swipe gesture, the communications signal strength icon 402 is replaced with the airplane icon 6208 (FIG. 62B).

In some embodiments, replacing the communications signal strength icon with the plane icon includes moving the plane icon on the touch screen display towards the communications signal strength icon and then moving the plane icon over the communications signal strength icon. For example, the plane icon 6208 may appear at the edge of UI 6200A (FIG. 62A) and move toward the communications signal strength icon 402. Upon reaching the communications signal strength icon 402, the plane icon 6208 moves over the communications signal strength icon 402 until the icon 402 is no longer displayed, as shown in FIG. 62B.

In some embodiments, the portable multifunction device includes a speaker and a sound is played while replacing the communications signal strength icon with the airplane icon.

In some embodiments, if the airplane mode switch icon is at the "on" position, upon detecting a finger-down event at or near the airplane mode switch icon at the "on" position, one or more finger-dragging events, and a finger-up event at or near the airplane mode switch icon at the "off" position, the airplane mode switch icon is moved from the "on" position to the "off" position and the plane icon is replaced with the communications signal strength icon.

For example, in UI 6200B (FIG. 62B), a swipe gesture from the "on" position 6206 to the "off" position 6204 may be detected. In response to detecting the swipe gesture, the airplane mode switch icon 6202 is displayed in the "off" position and the airplane icon 6208 is replaced with the communications signal strength icon 402, as shown in FIG. 62A.

Additional description of airplane mode indicators can be found in U.S. Provisional Patent Application No. 60/947,315, "Airplane Mode Indicator on a Portable Multifunction Device," filed Jun. 29, 2007, the content of which is hereby incorporated by reference.

Figure 62C:
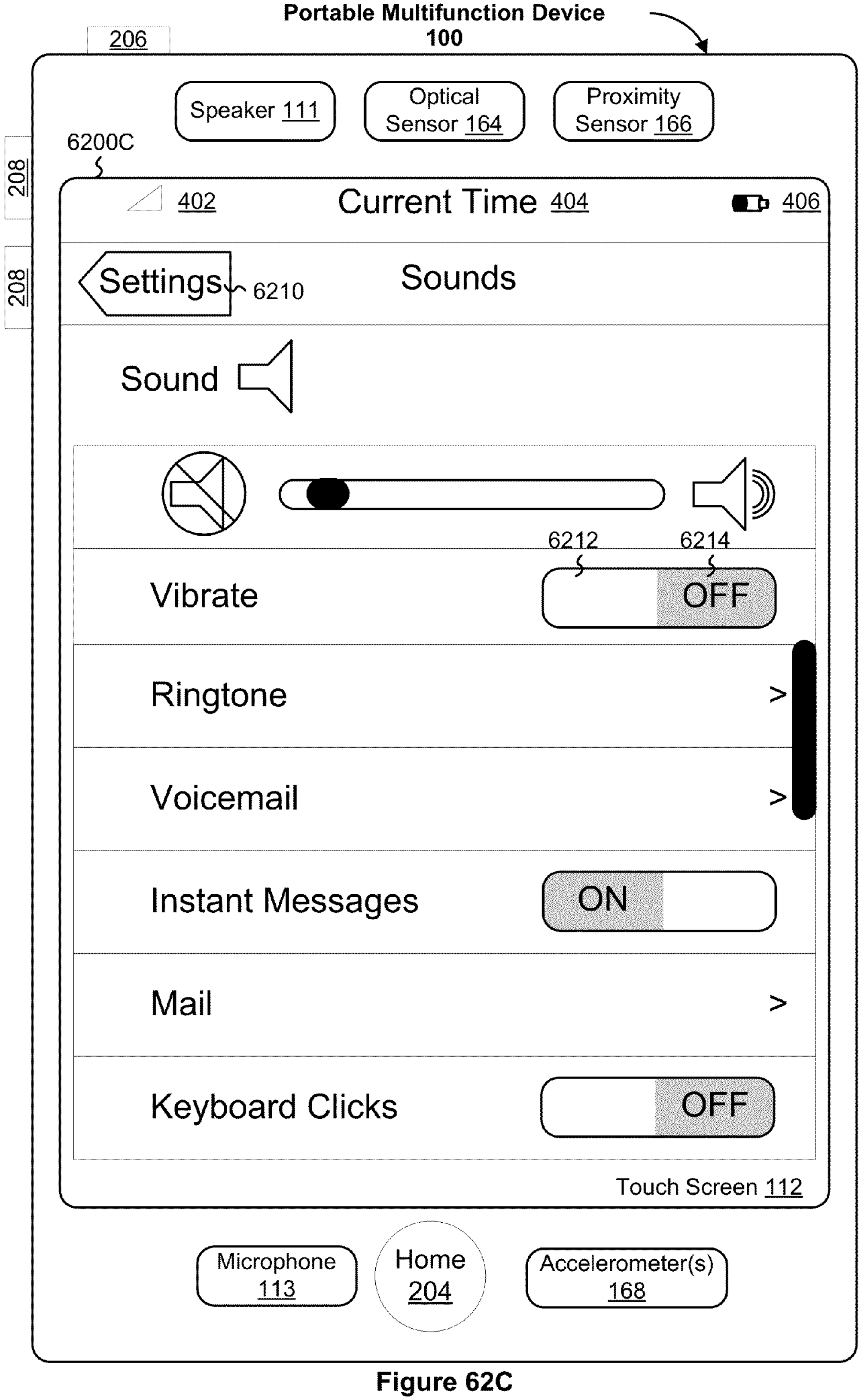

FIG. 62C illustrates exemplary user interfaces for displaying and adjusting sound settings in accordance with some embodiments. In some embodiments, if user selects to adjust sound settings, UI 6200C (FIG. 62C) is displayed.

In some embodiments, a portable multifunction device (e.g., device 100) displays a vibrate mode switch icon (e.g., icon 6212, FIG. 62C) on a touch screen display (e.g., display 112). The vibrate mode switch icon has an "on" position (not shown) and an "off" position (e.g., 6214, FIG. 62C).

For example, in UI 6200C (FIG. 62C), a swipe gesture from the "off" position 6214 to the "on" position is detected. In response to detecting the swipe gesture, the vibrate mode switch icon 6212 is displayed in the "on position" and the device is set to be on vibrate mode.

In some embodiments, a contact with the settings icon 6210 (FIG. 62C) is detected. In response to detecting the contact, the list of settings is displayed (UI 6200A, FIG. 62A).

Figure 62D:
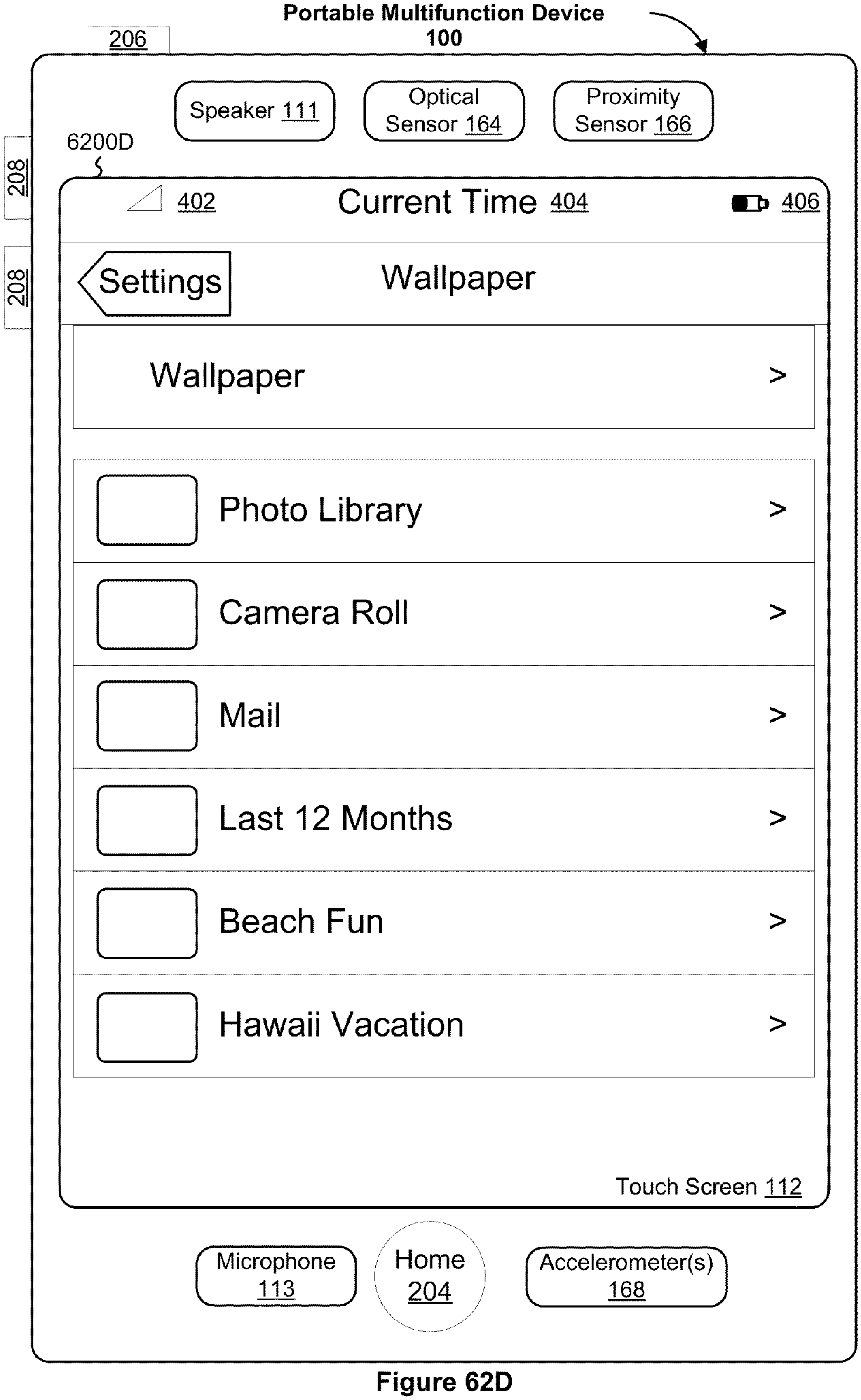

FIG. 62D illustrates exemplary user interfaces for displaying and adjusting wallpaper settings in accordance with some embodiments. In some embodiments, if a user selects to adjust wallpaper settings (e.g., by a finger tap anywhere in the wallpaper row in UI 6200A (FIG. 62A)), UI 6200D (FIG.

62D) is displayed. A user may change the wallpaper displayed on the device by making the desired selections on UI 6200D.

Figure 62E:
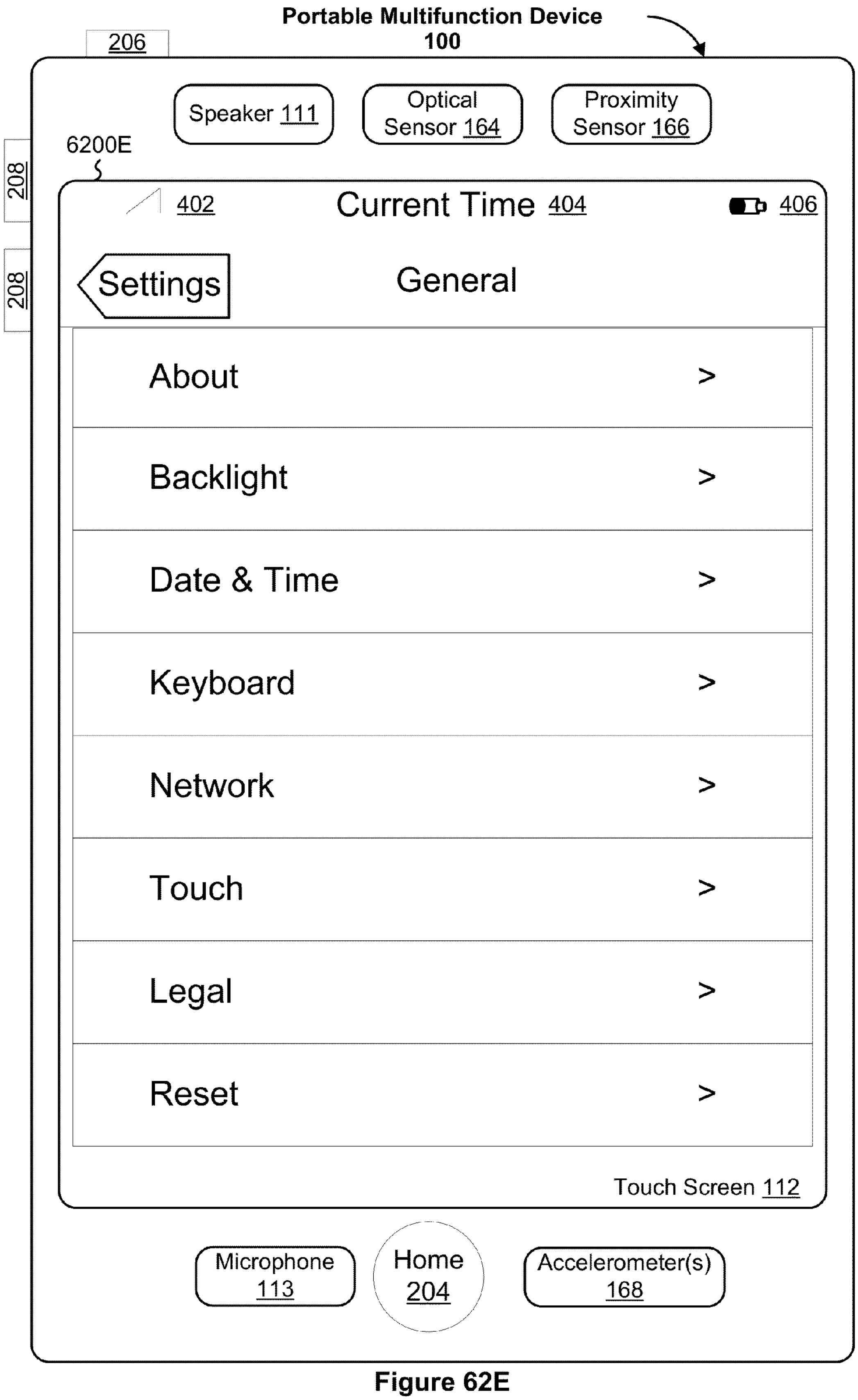

FIG. 62E illustrates exemplary user interfaces for displaying and adjusting general settings in accordance with some embodiments. In some embodiments, if user selects to adjust general settings, UI 6200E (FIG. 62E) is displayed. Some general settings may include about, backlight, date and time, keyboard, network, touch, legal, and reset settings.

Figure 62F:
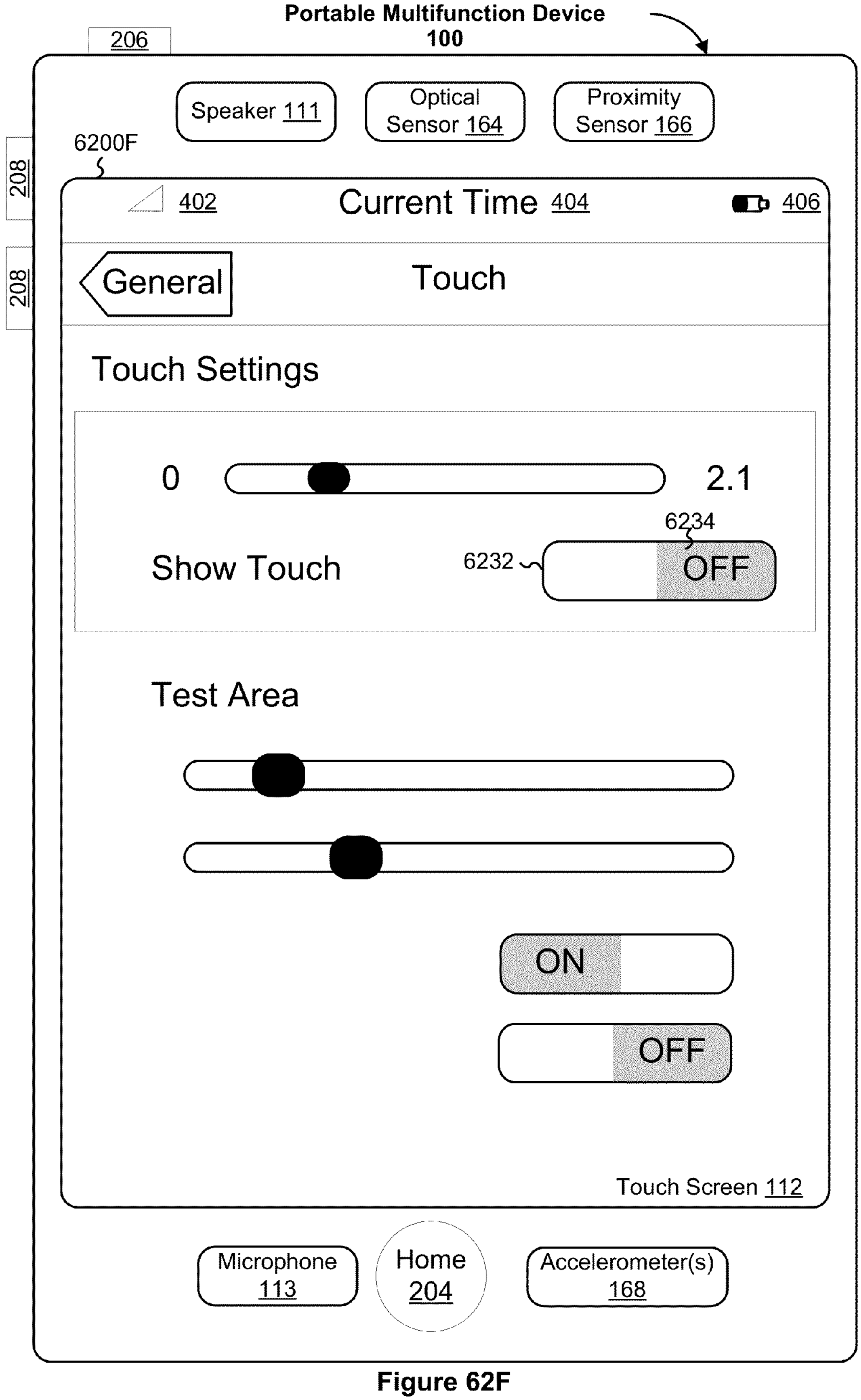

For example, FIG. 62F illustrates exemplary user interfaces for displaying and adjusting touch settings in accordance with some embodiments. In some embodiments, if a user selects to adjust touch settings (by selecting "touch" in UI 6200E in FIG. 62E), UI 6200F (FIG. 62F) is displayed.

In some embodiments, a portable multifunction device (e.g., device 100) displays a show touch setting switch icon (e.g., icon 6232, FIG. 62F) on a touch screen display (e.g., display 112). The slow touch setting switch icon has an "on" position (not shown) and an "off" position (e.g., 6234, FIG. 62F).

For example, in UI 6200F (FIG. 62F), a swipe gesture from the "off" position 6234 to the "on" position is detected. In response to detecting the swipe gesture, the show touch setting icon switch 6232 is displayed in the "on" position and the device is set to a show touch mode in which a shaded area corresponding to a user's finger contact area is displayed on the touch screen to aid the user in interacting with the touch screen.

Figure 62G:
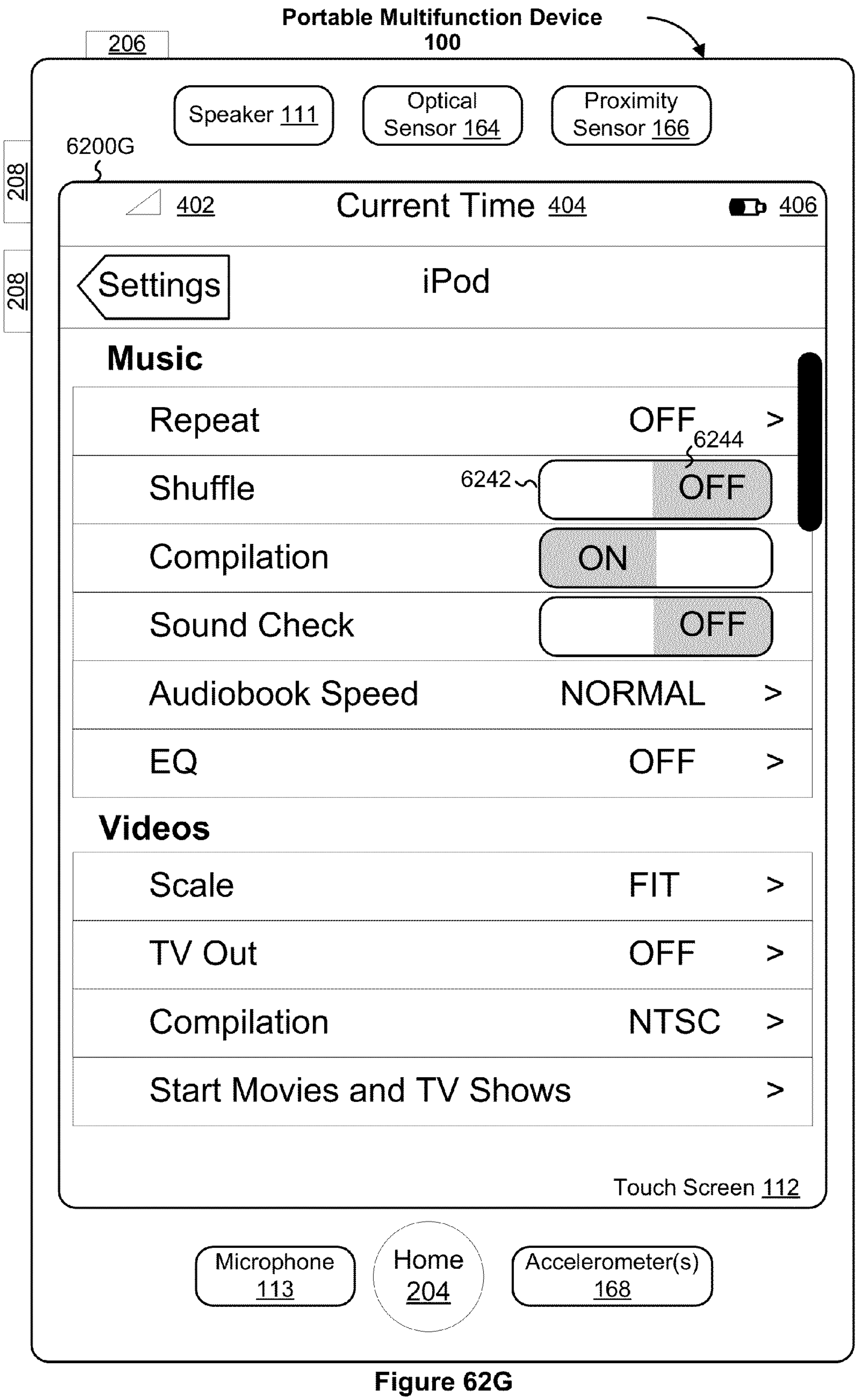
Figure 63A:
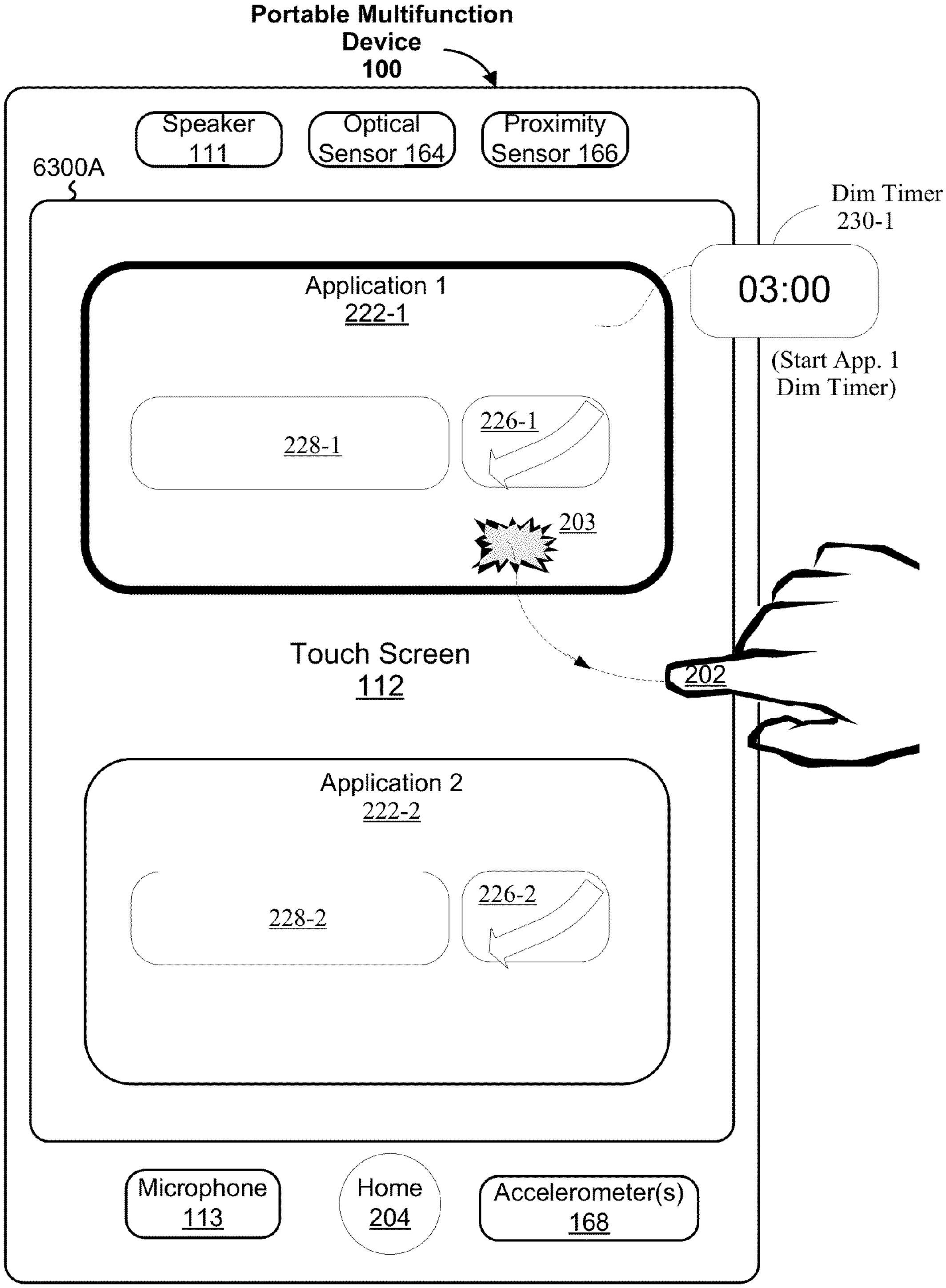
FIGS. 63A-63J illustrate an exemplary method for adjusting dimming timers in accordance with some embodiments.
Figure 63B:
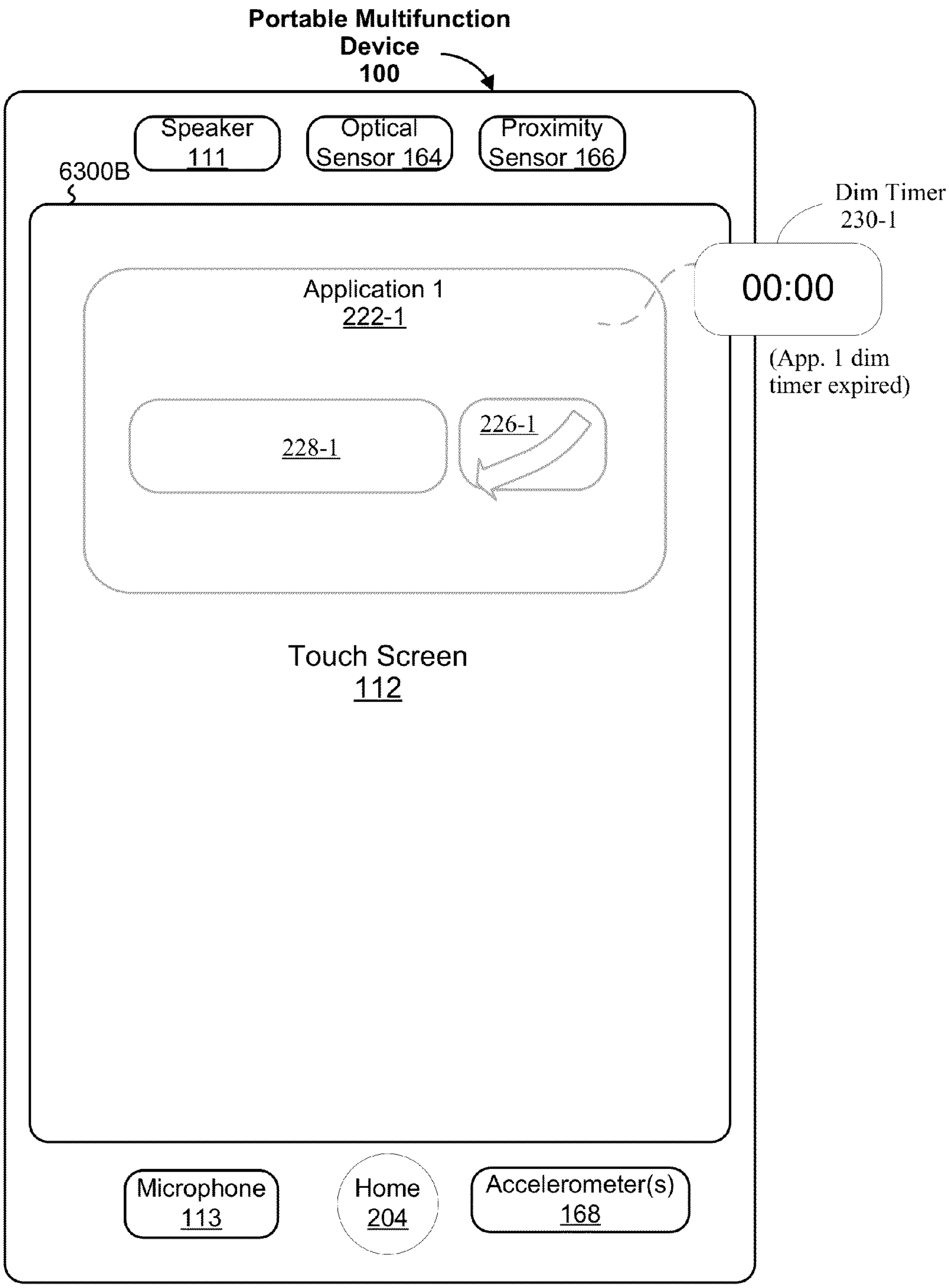
Figure 63C:
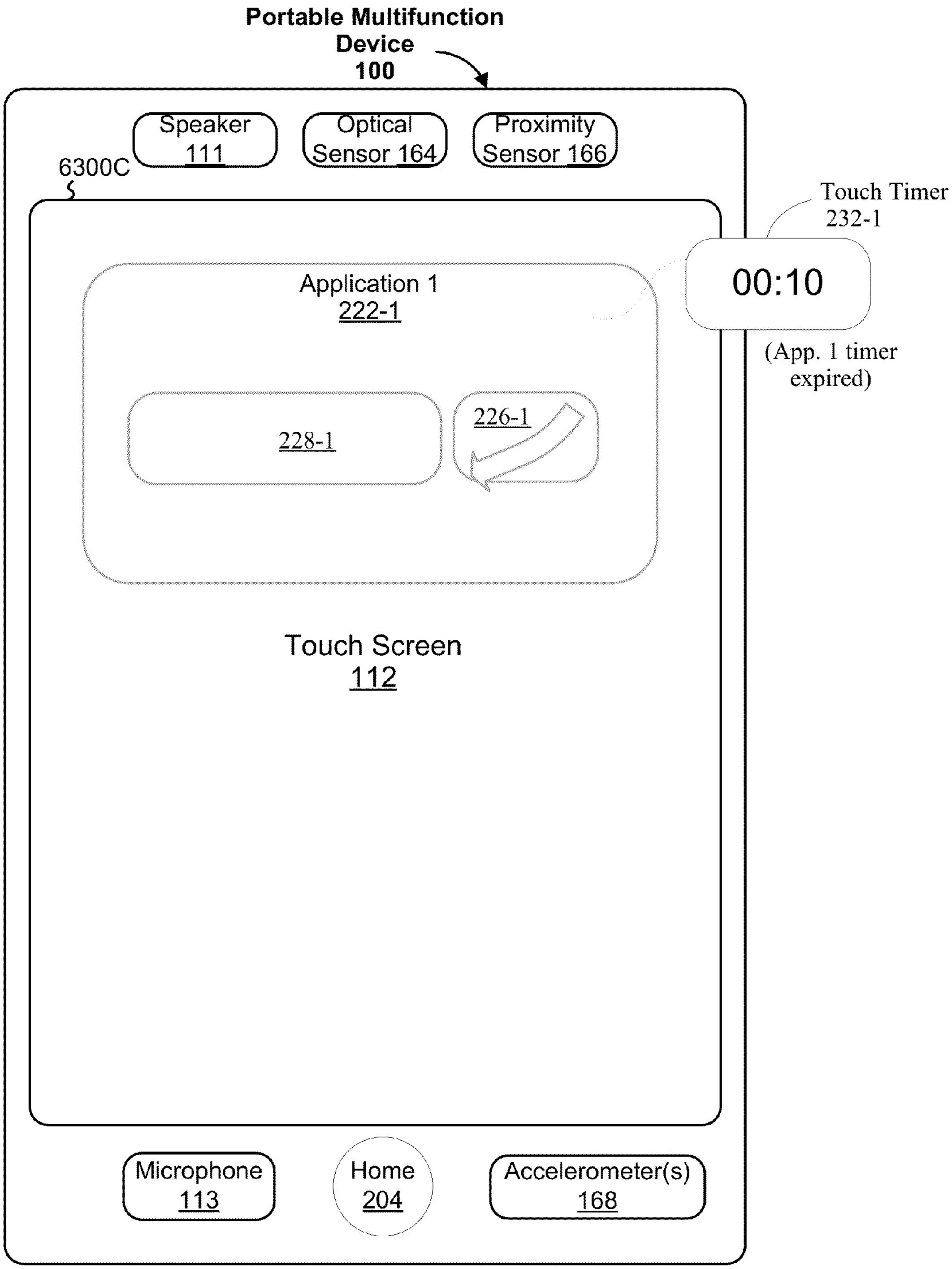
Figure 63D:
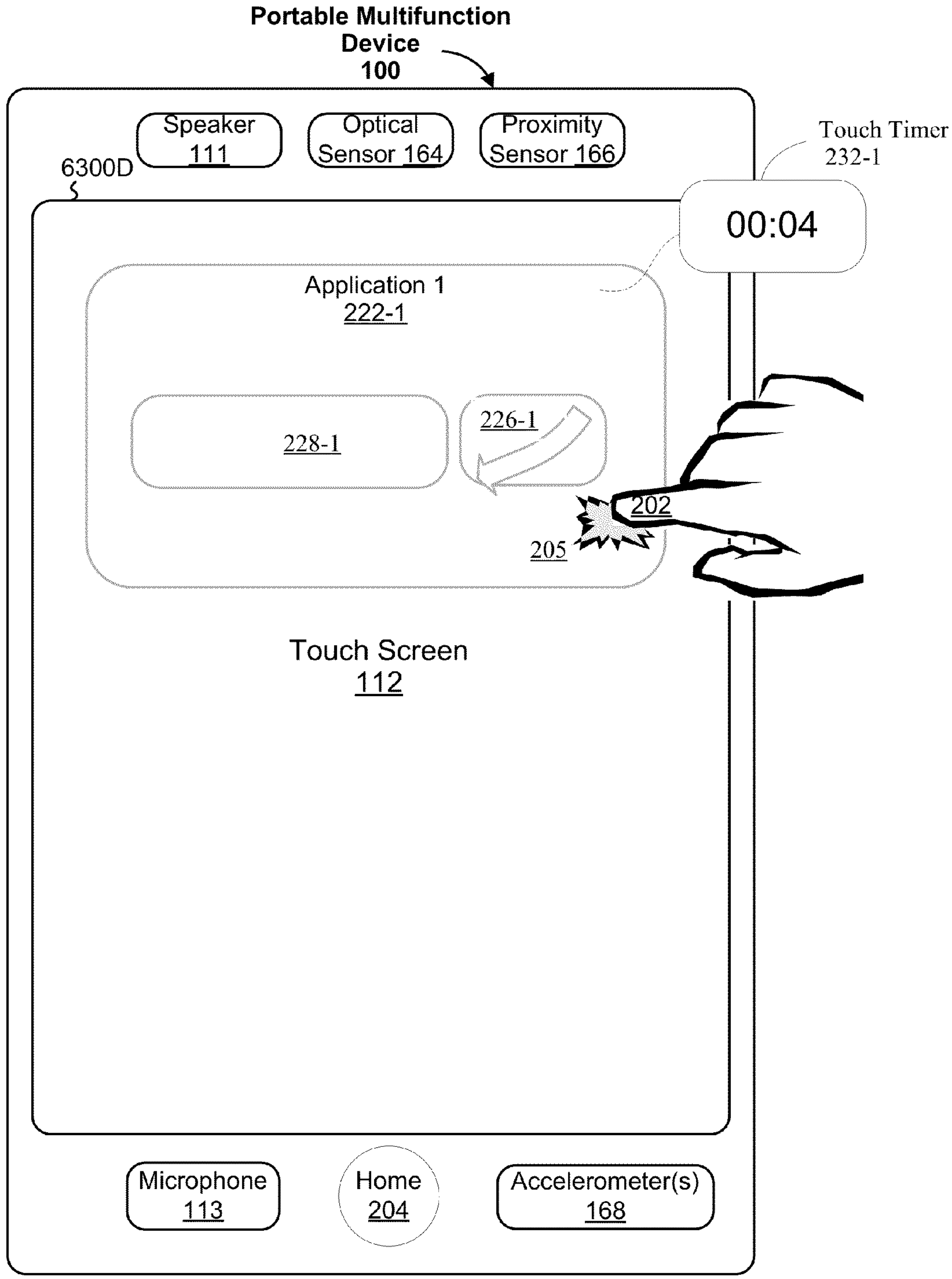
Figure 63E:
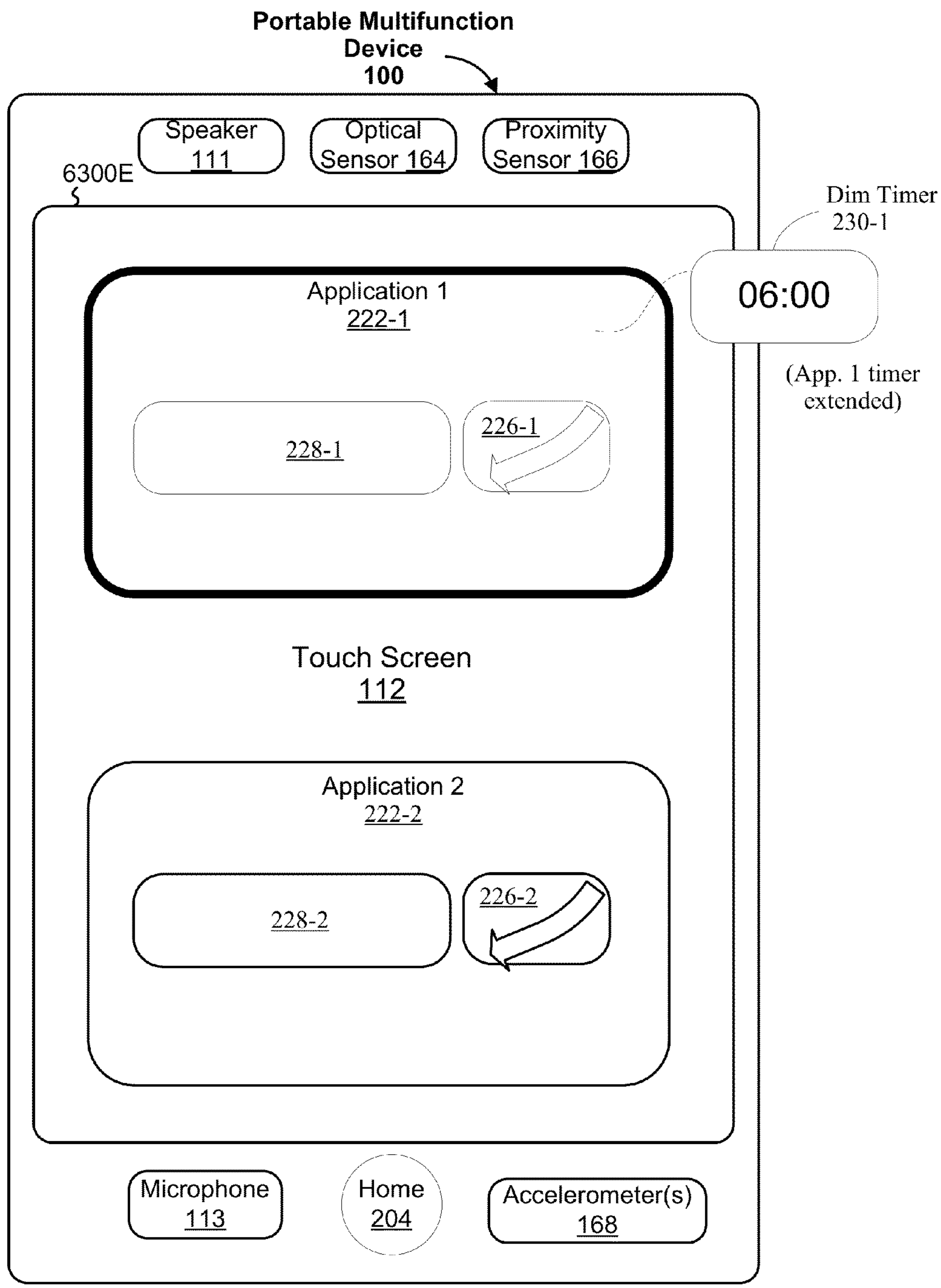
Figure 63F:
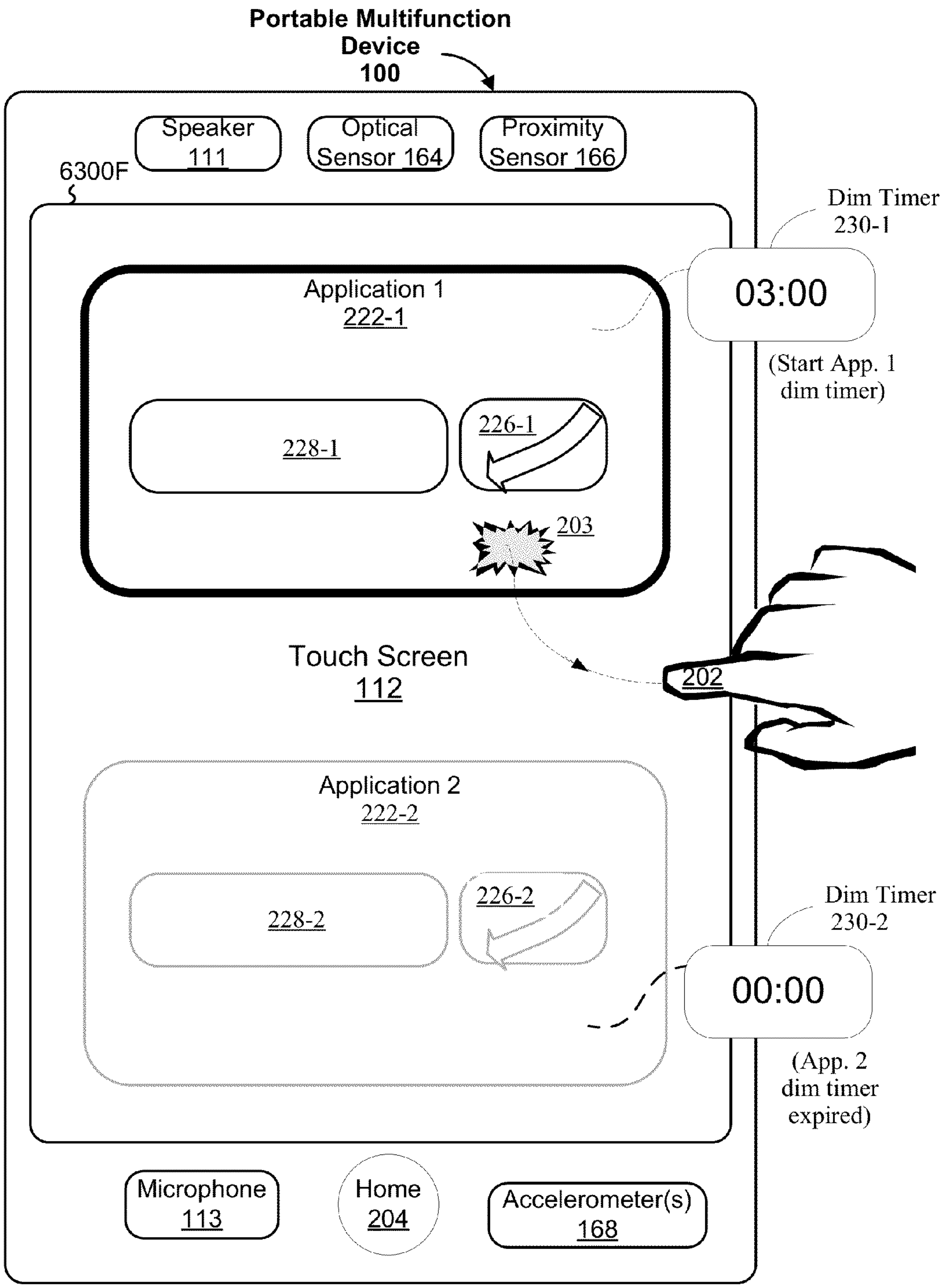
Figure 63G:
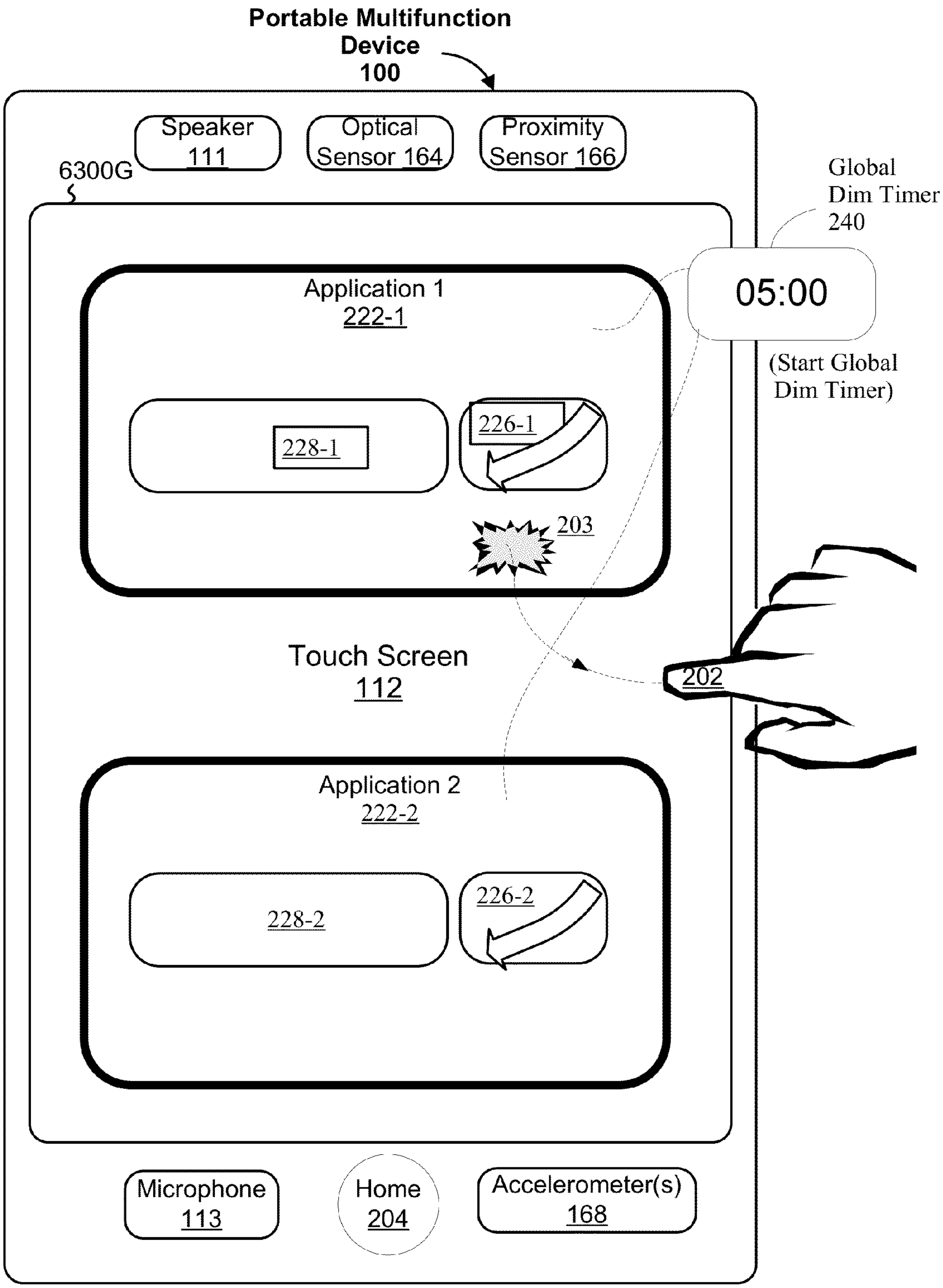
Figure 63H:
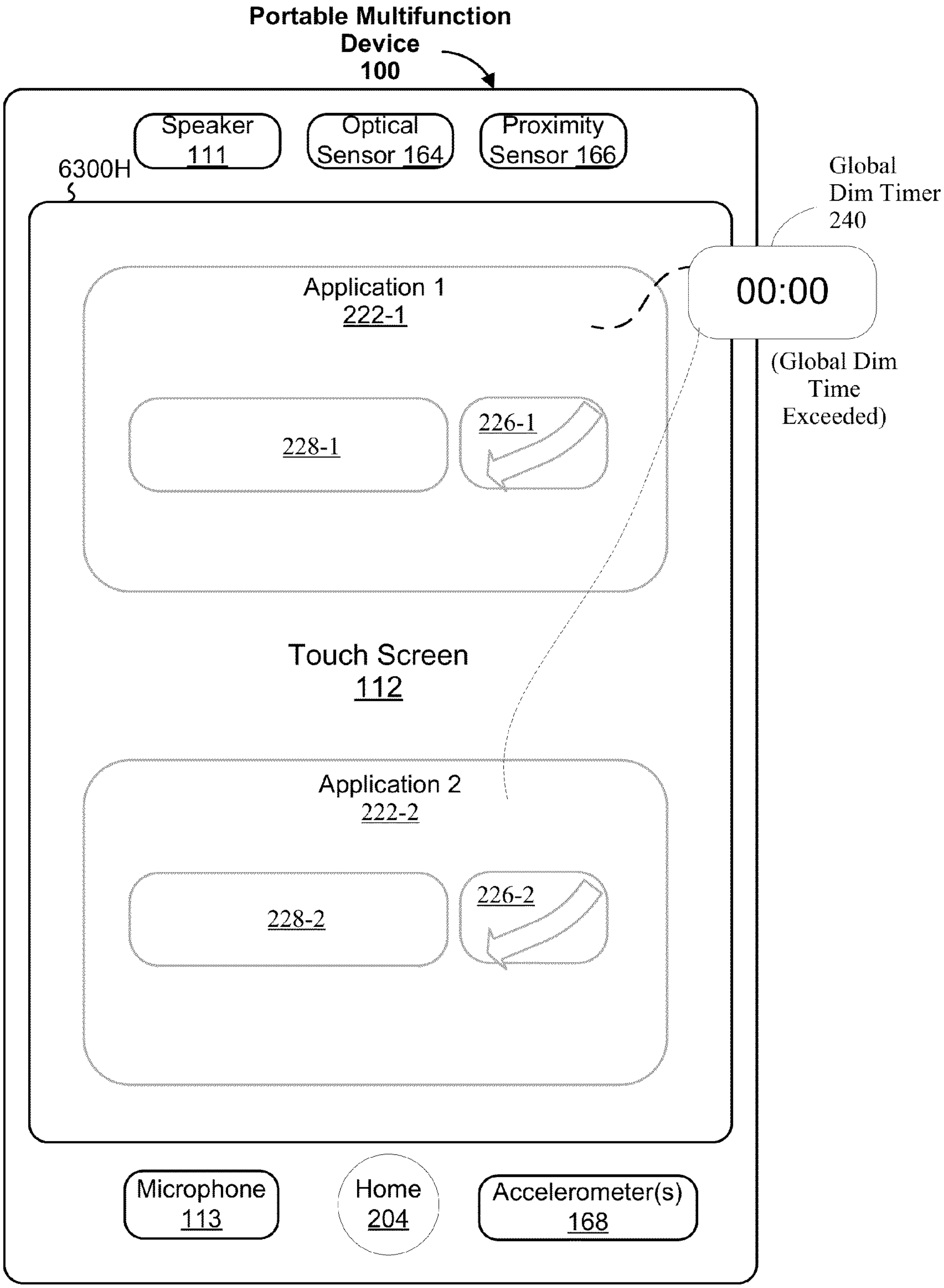
Figure 63I:
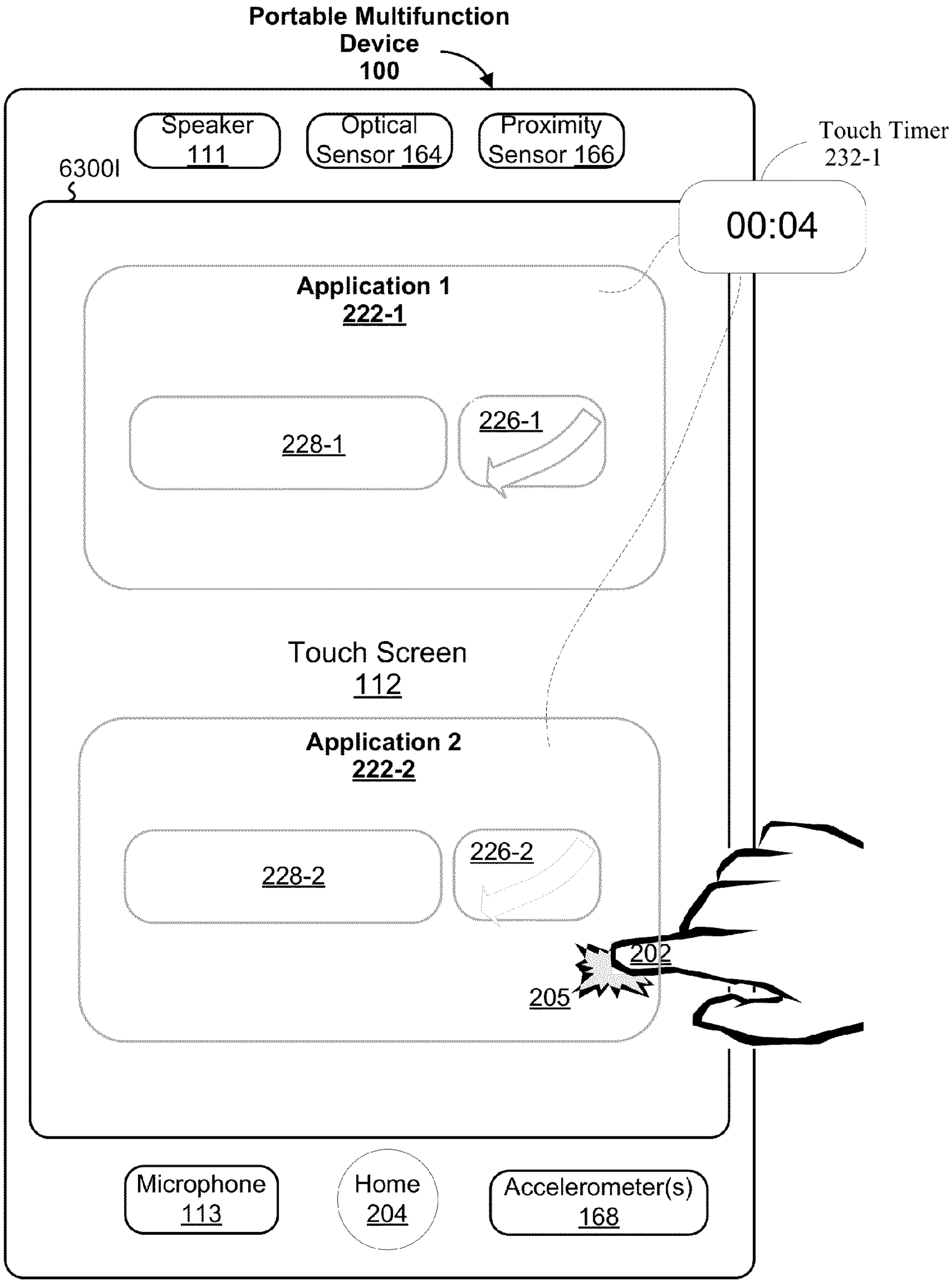
Figure 63J:
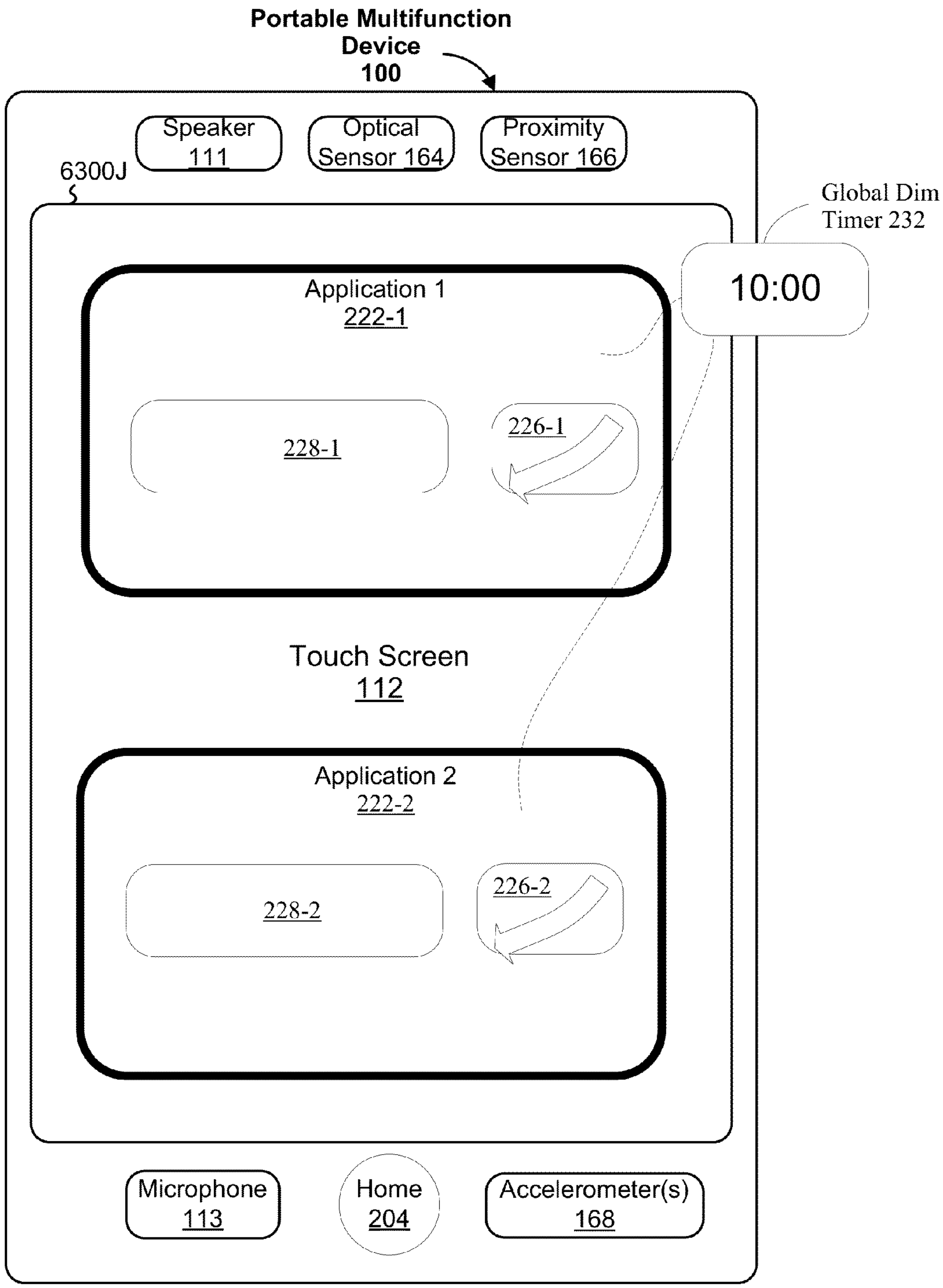

FIG. 62G illustrates exemplary user interfaces for displaying and adjusting iPod (trademark of Apple Computer, Inc.) settings in accordance with some embodiments. In some embodiments, if user selects iPod (trademark of Apple Computer, Inc.) settings, UI 6200G (FIG. 62G) is displayed.

In some embodiments, a portable multifunction device (e.g., device 100) displays a shuffle mode icon (e.g., icon 6242, FIG. 62F) on a touch screen display (e.g., display 112). The shuffle mode icon has an "on" position (not shown) and an "off" position (e.g., 6244, FIG. 62G).

For example, in UI 6200G (FIG. 62G), a swipe gesture from the "off" position 6244 to the "on" position is detected. In response to detecting the swipe gesture, the shuffle mode switch 6242 is displayed in the "on" position and the iPod (trademark of Apple Computer, Inc.) feature of the device is set to a shuffle mode.

FIGS. 63A-63J illustrate an exemplary method for adjusting dimming timers in accordance with some embodiments. Additional description of dimming techniques can be found in U.S. Provisional Patent Application No. 60/883,821, "Portable Electronic Device With Auto-Dim Timers," filed Jan. 7, 2007, the content of which is hereby incorporated by reference.

Additional description of settings-related techniques can be found in U.S. Provisional Patent Application No. 60/883,812, "Portable Electronic Device With A Global Setting User Interface," filed Jan. 7, 2007, the content of which is hereby incorporated by reference.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computing device, comprising:
- a touch screen display;
- one or more processors operative coupled with the touch screen display;
- memory; and
- one or more programs, wherein the one or more programs are stored in the memory and configured to be executed by the one or more processors, the one or more programs when executed by the one or more processors cause the device to perform:
- while a first application user interface is displayed on the touch screen display:
  - detecting one or more first finger contacts on the first application user interface;
  - applying a first set of heuristics to the one or more first finger contacts to determine a first command in the first application, wherein the first set of heuristics comprises:
    - a vertical screen scrolling heuristic for determining that the one or more first finger contacts correspond to a one-dimensional vertical screen scrolling command rather than a two-dimensional screen translation command based on an angle of movement of a finger contact with respect to the touch screen display; and
    - a two-dimension screen translation heuristic for determining that the one or more first finger contacts correspond to a two-dimensional screen translation command rather than the one-dimensional vertical screen scrolling command based on the angle of the movement of the first finger contact with respect to the touch screen display; and
  - processing the first command; and
- while a second application user interface is displayed on the touch screen display:
  - detecting one or more second finger contacts on the second application user interface;
  - applying a second set of heuristics to the one or more second finger contacts to determine a second command in the second application, wherein:
    - the second set of heuristics is different from the first set of heuristics, and
    - the second set of heuristics comprises a next-item heuristic for determining that the one or more second finger contacts correspond to a command to transition from displaying a first element in a collection of elements to displaying a next element in the collection; and
- processing the second command.

2. The device of claim 1, wherein the first application is a web browser application and the second application is a photo album application.

3. The device of claim 1, wherein for the first set of heuristics:
- the vertical screen scrolling heuristic determines that the one or more first finger contacts correspond to a one-dimensional vertical screen scrolling command rather than a two-dimensional screen translation command based on a determination that the angle of the movement of the finger contact with respect to the touch screen display is within a predetermined angle; and
- the two-dimension screen translation heuristic determines that the one or more first finger contacts correspond to a two-dimensional screen translation command rather than the one-dimensional vertical screen scrolling command based on a determination that the angle of the movement of the first finger contact with respect to the touch screen display is not within the predetermined angle.

4. The device of claim 1, wherein at least one of the first set of heuristics and the second set of heuristics further comprise a zoom-in heuristic for determining that the respective finger contacts correspond to a command to zoom in by a predetermined amount.

5. The device of claim 1, wherein at least one of the first set of heuristics and the second set of heuristics further comprise a zoom-in heuristic for determining that the respective finger contacts correspond to a command to zoom in by a user-specified amount, and the user-specified is determined based on an amount of movement of the respective finger contacts.

6. A non-transitory computer readable storage medium having stored therein instructions, which when executed by a computing device with a touch screen display, cause the device to:

while a first application user interface is displayed on the touch screen display:

detecting one or more first finger contacts on the first application user interface;

applying a first set of heuristics to the one or more first finger contacts to determine a first command in the first application, wherein the first set of heuristics comprises:

a vertical screen scrolling heuristic for determining that the one or more first finger contacts correspond to a one-dimensional vertical screen scrolling command rather than a two-dimensional screen translation command based on an angle of movement of a finger contact with respect to the touch screen display; and a two-dimension screen translation heuristic for determining that the one or more first finger contacts correspond to a two-dimensional screen translation command rather than the one-dimensional vertical screen scrolling command based on the angle of the movement of the first finger contact with respect to the touch screen display; and processing the first command; and while a second application user interface is displayed on the touch screen display:

detecting one or more second finger contacts on the second application user interface;

applying a second set of heuristics to the one or more second finger contacts to determine a second command in the second application, wherein:

the second set of heuristics is different from the first set of heuristics, and the second set of heuristics comprises a next-item heuristic for determining that the one or more second finger contacts correspond to a command to transition from displaying a first element in a collection of elements to displaying a next element in the collection; and processing the second command.

7. The non-transitory computer readable storage medium of claim 6, wherein the first application is a web browser application and the second application is a photo album application.

8. The non-transitory computer readable storage medium of claim 6, wherein for the first set of heuristics:

the vertical screen scrolling heuristic determines that the one or more first finger contacts correspond to a one-dimensional vertical screen scrolling command rather than a two-dimensional screen translation command based on a determination that the angle of the movement of the finger contact with respect to the touch screen display is within a predetermined angle; and the two-dimension screen translation heuristic determines that the one or more first finger contacts correspond to a two-dimensional screen translation command rather than the one-dimensional vertical screen scrolling command based on a determination that the angle of the movement of the first finger contact with respect to the touch screen display is not within the predetermined angle.

9. The non-transitory computer readable storage medium of claim 6, wherein at least one of the first set of heuristics and the second set of heuristics further comprise a zoom-in heuristic for determining that the respective finger contacts correspond to a command to zoom in by a predetermined amount.

10. The non-transitory computer readable storage medium of claim 6, wherein at least one of the first set of heuristics and the second set of heuristics further comprise a zoom-in heuristic for determining that the respective finger contacts correspond to a command to zoom in by a user-specified amount, and the user-specified is determined based on an amount of movement of the respective finger contacts.

11. A method, comprising:

at a computing device with a touch screen display:

while a first application user interface is displayed on the touch screen display:

detecting one or more first finger contacts on the first application user interface;

applying a first set of heuristics to the one or more first finger contacts to determine a first command in the first application, wherein the first set of heuristics comprises:

a vertical screen scrolling heuristic for determining that the one or more first finger contacts correspond to a one-dimensional vertical screen scrolling command rather than a two-dimensional screen translation command based on an angle of movement of a finger contact with respect to the touch screen display; and a two-dimension screen translation heuristic for determining that the one or more first finger contacts correspond to a two-dimensional screen translation command rather than the one-dimensional vertical screen scrolling command based on the angle of the movement of the first finger contact with respect to the touch screen display; and processing the first command; and while a second application user interface is displayed on the touch screen display:

detecting one or more second finger contacts on the second application user interface;

applying a second set of heuristics to the one or more second finger contacts to determine a second command in the second application, wherein:

the second set of heuristics is different from the first set of heuristics, and the second set of heuristics comprises a next-item heuristic for determining that the one or more second finger contacts correspond to a command to transition from displaying a first element in a collection of elements to displaying a next element in the collection; and processing the second command.

12. The method of claim 11, wherein the first application is a web browser application and the second application is a photo album application.

13. The method of claim 11, wherein for the first set of heuristics:

the vertical screen scrolling heuristic determines that the one or more first finger contacts correspond to a one-dimensional vertical screen scrolling command rather than a two-dimensional screen translation command based on a determination that the angle of the movement of the finger contact with respect to the touch screen display is within a predetermined angle; and the two-dimension screen translation heuristic determines that the one or more first finger contacts correspond to a two-dimensional screen translation command rather than the one-dimensional vertical screen scrolling command based on a determination that the angle of the movement of the first finger contact with respect to the touch screen display is not within the predetermined angle.

14. The method of claim 11, wherein at least one of the first set of heuristics and the second set of heuristics further comprise a zoom-in heuristic for determining that the respective finger contacts correspond to a command to zoom in by a predetermined amount.

15. The method of claim 11, wherein at least one of the first set of heuristics and the second set of heuristics further comprise a zoom-in heuristic for determining that the respective finger contacts correspond to a command to zoom in by a user-specified amount, and the user-specified is determined based on an amount of movement of the respective finger contacts.

16. The device of claim 1, wherein the one or more first finger contacts on the first application user interface is one first finger contact on the first application user interface.

* * * * *